US012737795B2

(12) United States Patent
Catino et al.

(10) Patent No.: US 12,737,795 B2
(45) **Date of Patent: *Sep. 15, 2026**

(54) LABOR MARKETPLACE EXCHANGE AND METHODS THEREOF

(71) Applicant: GigSmart, Inc., Denver, CO (US)

(72) Inventors: Theodore A. Catino, Denver, CO (US); Beverly A. Catino, Denver, CO (US); Mitchell A. Catino, Denver, CO (US)

(73) Assignee: GigSmart, Inc., Denver, CO (US)

( * ) Notice: Subject to any disclaimer, the term of this patent is extended or adjusted under 35 U.S.C. 154(b) by 101 days.

This patent is subject to a terminal disclaimer.

(21) Appl. No.: 18/801,908

(22) Filed: Aug. 13, 2024

(65) Prior Publication Data

US 2024/0420207 A1 Dec. 19, 2024

Related U.S. Application Data

(63) Continuation of application No. 18/205,510, filed on Jun. 3, 2023, now Pat. No. 12,100,033, which is a continuation of application No. 16/342,734, filed as application No. PCT/US2017/057299 on Oct. 19, 2017, now Pat. No. 11,694,250, which is a continuation-in-part of application No. 15/112,894, (Continued)

(51) Int. Cl.

| | |
|---|---|
| ***G06Q 30/00*** | (2023.01) |
| ***G06F 16/29*** | (2019.01) |
| ***G06Q 30/0601*** | (2023.01) |
| *G06Q 10/0631* | (2023.01) |

(52) U.S. Cl.
CPC ......... *G06Q 30/0625* (2013.01); *G06F 16/29* (2019.01); *G06Q 10/063112* (2013.01)

(58) Field of Classification Search
CPC .... G06Q 30/00; G06Q 30/0601; G06Q 30/06; G06Q 30/0623; G06Q 30/0625
See application file for complete search history.

(56) References Cited

U.S. PATENT DOCUMENTS 7,096,193 B1 * 8/2006 Beaudoin ......... G06Q 10/06311 705/26.1
7,529,689 B2 5/2009 Rowan (Continued)

OTHER PUBLICATIONS

Cesarini, M., et al. "SEEMP: A Marketplace for the Labor Market." Proc. E-Challenges Conference, The Hague. 2007. (Year: 2007).*

(Continued)

*Primary Examiner* — Christopher B Seibert
(74) *Attorney, Agent, or Firm* — FBT Gibbons LLP

(57) ABSTRACT

A labor marketplace exchange (LME) computing system and method are provided. The LME computing system communicates with communications devices of service providers and service users. The LME computing system receives service provider profile data from the service providers. Service users can submit service queries to the LME computing system. Based on the parameters of the service query, service providers are identified by the LME computing system. A service request is then sent to a service provider identified by the LME computing system and selected by the service user.

20 Claims, 329 Drawing Sheets

Related U.S. Application Data filed as application No. PCT/US2015/068094 on Dec. 30, 2015, now Pat. No. 10,592,952.

(60) Provisional application No. 62/409,929, filed on Oct. 19, 2016, provisional application No. 62/100,211, filed on Jan. 6, 2015.

(56) References Cited

U.S. PATENT DOCUMENTS 8,548,870 B1 10/2013 Herbette et al.
8,660,912 B1 * 2/2014 Dandekar .............. G06Q 30/02 705/26.1
2005/0261917 A1 11/2005 Forget Shield
2006/0034494 A1 * 2/2006 Holloran ............... H04L 9/3231 382/116
2006/0184381 A1 * 8/2006 Rice ................... G06Q 30/0206 705/317
2007/0106567 A1 5/2007 Harvey et al.
2007/0106570 A1 * 5/2007 Hartman ............ G06Q 30/0635 705/26.8
2008/0104542 A1 * 5/2008 Cohen ................. G06F 16/9038 715/810
2008/0313005 A1 * 12/2008 Nessland ............... G06Q 10/06 705/7.29
2009/0037291 A1 * 2/2009 Dawson ............. G06Q 30/0603 705/27.2
2009/0282353 A1 * 11/2009 Halbherr ............ G01C 21/3682 715/769
2010/0114654 A1 * 5/2010 Lukose .................. G06Q 30/00 705/14.54
2010/0228618 A1 * 9/2010 Mitchell ............ G06Q 30/0239 705/26.1
2010/0233989 A1 * 9/2010 Constien ........... H04W 52/0258 455/343.1
2010/0235007 A1 * 9/2010 Constien .............. G01R 31/392 700/291
2010/0235121 A1 * 9/2010 Constien ............. H01M 10/488 702/63
2011/0202874 A1 * 8/2011 Ramer ................ G06F 16/2428 715/810
2011/0307282 A1 12/2011 Camp et al.
2012/0084319 A1 * 4/2012 Bansode ............... G06F 16/252 707/769
2012/0136756 A1 * 5/2012 Jitkoff ................. G06F 16/9577 715/224
2012/0137203 A1 * 5/2012 Schodl .................... G06F 40/18 715/219
2013/0002863 A1 * 1/2013 Jia ....................... G06F 18/2185 382/190
2013/0055060 A1 * 2/2013 Folsom ................. G06F 40/143 715/222
2013/0297439 A1 * 11/2013 Chanoine ............... G06Q 30/06 705/26.4
2014/0108066 A1 * 4/2014 Lam ....................... G06Q 10/02 705/5
2014/0278638 A1 9/2014 Kreuzkamp et al.
2014/0380179 A1 * 12/2014 Bose ...................... G06Q 10/10 715/738
2015/0046206 A1 2/2015 Kelley
2015/0208042 A1 * 7/2015 Jia ....................... G06F 18/2185 348/143
2015/0242781 A1 8/2015 Mancuso et al.
2016/0054865 A1 * 2/2016 Kerr ........................ H04L 67/55 715/739
2016/0140507 A1 * 5/2016 Stevens .............. G06Q 10/1093 705/7.19
2017/0185656 A1 * 6/2017 Nelson .................. G06F 16/248
2017/0187655 A1 * 6/2017 Kronenberg ............ H04L 67/53
2018/0097768 A1 * 4/2018 Ragsdale ............ G06F 3/04883
2018/0350455 A1 * 12/2018 Rosen .................... G16H 80/00
2020/0013023 A1 * 1/2020 Sells ...................... G06Q 10/20
2021/0268564 A1 * 9/2021 Macdonald .......... G05B 19/402
2021/0406673 A1 * 12/2021 Pardeshi ............... G06F 3/0481

OTHER PUBLICATIONS

Agrawal, Ajay, et al. "Digitization and the contract labor market: A research agenda." Economic analysis of the digital economy (2015): 219-250. (Year: 2015).*

Skogberg, A. et al.; "Usable and Dynamic Interface for Mobile Reoprting"; Department of Computer Science and Information Technology, Chalmers University of Technology, Goteburg, Sweden, 2010; 132 pages.

* cited by examiner 100
102
110
104
PROCESSOR
108
MEMORY UNIT
112
LABOR MARKETPLACE EXCHANGE ENGINE
132
USER PROFILES
134
SERVICE APPOINTMENTS
136
SERVICE ANALYTICS
114
WEB SERVER
116
APPLICATION SERVER
118
SERVERS
103
COMMUNICATIONS NETWORK
142
SERVICE USER
COMMUNICATIONS DEVICE
120
COMMUNICATIONS DEVICE
120
144
SERVICE PROVIDER ooooo Carrier 9:41 AM 42%

Figure 24:
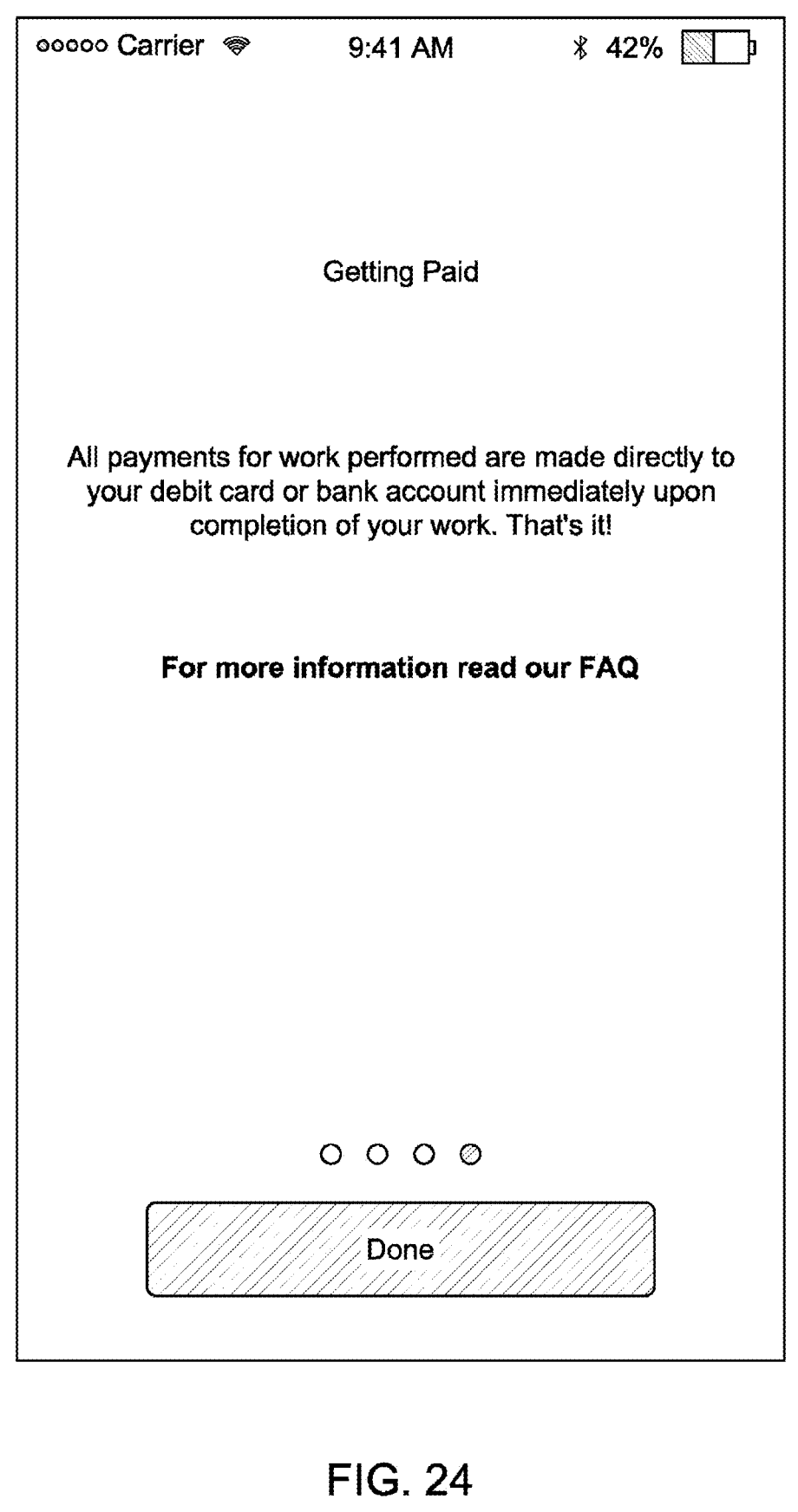

Getting Paid

All payments for work performed are made directly to your debit card or bank account immediately upon completion of your work. That's it!

For more information read our FAQ

Done

FIG. 24 ooooo Carrier 9:41 AM 42%

Figure 29:
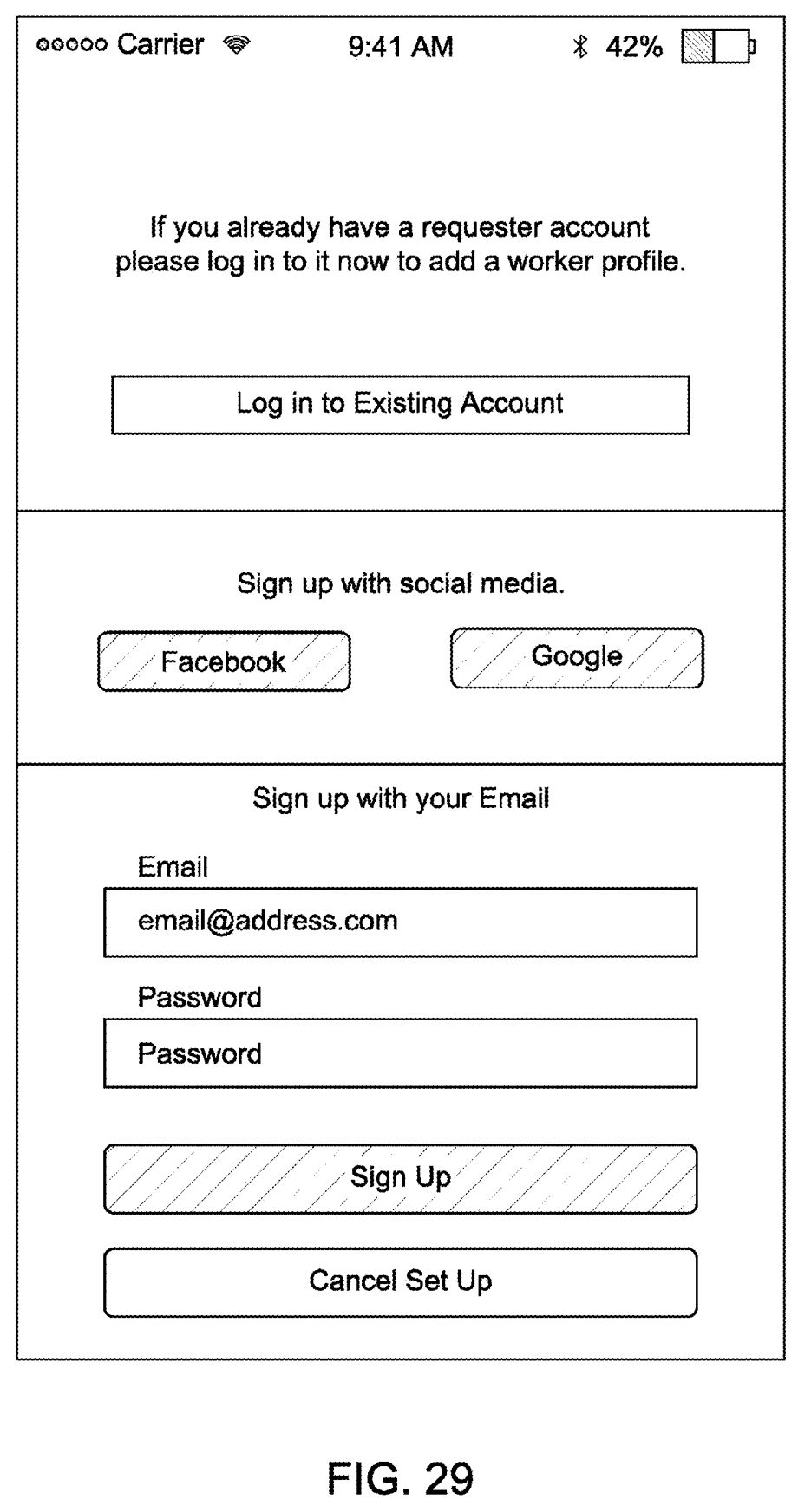

If you already have a requester account please log in to it now to add a worker profile.

Log in to Existing Account

Sign up with social media.

Facebook

Google

Sign up with your Email

Email email@address.com

Password

Password

Sign Up

Cancel Set Up

FIG. 37 ooooo Carrier 9:41 AM 42%

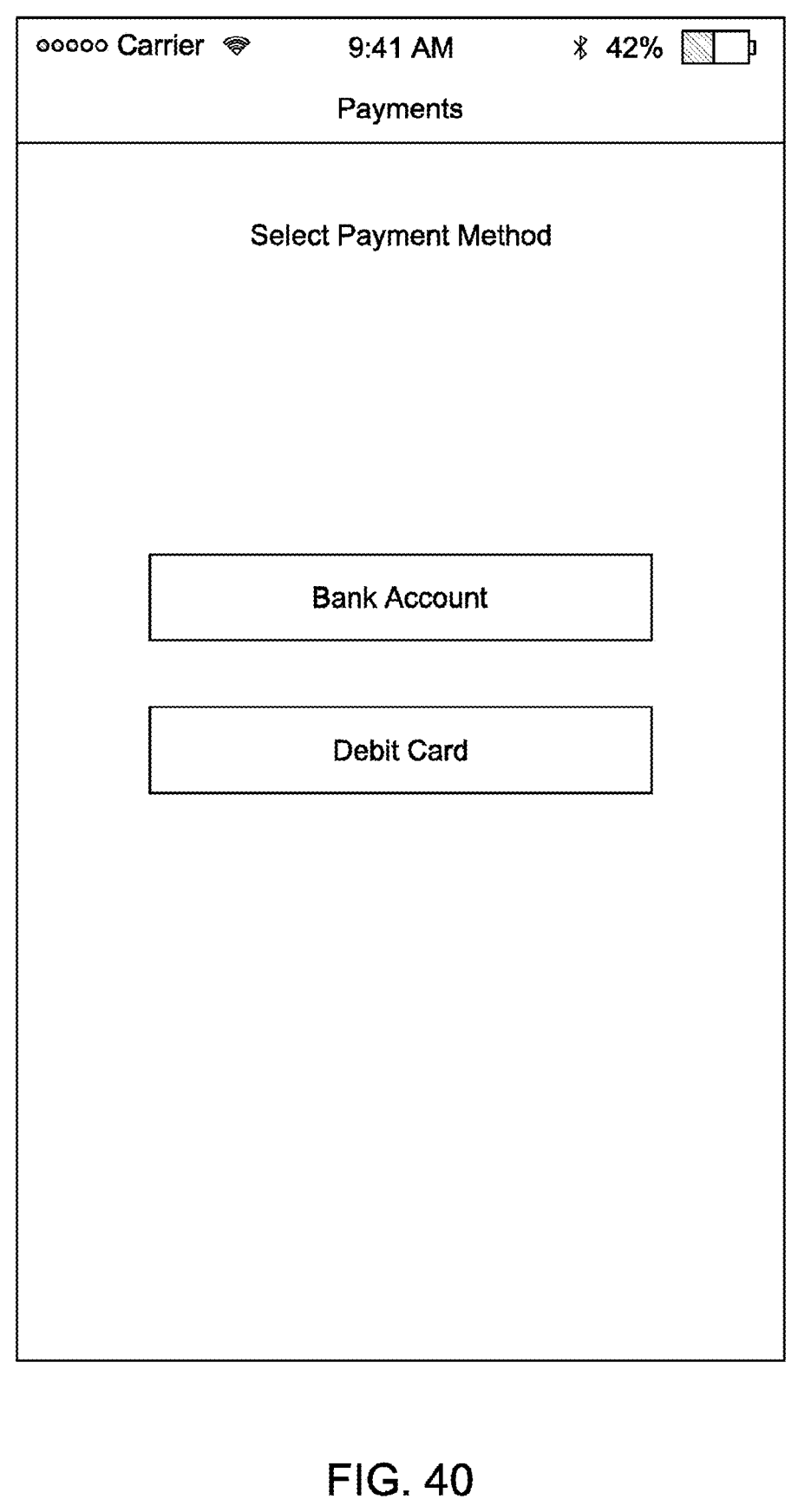

Payments

Select Payment Method

Bank Account

Debit Card

FIG. 40

FIG. 41 ooooo Carrier 9:41 AM 42%

Figure 42:
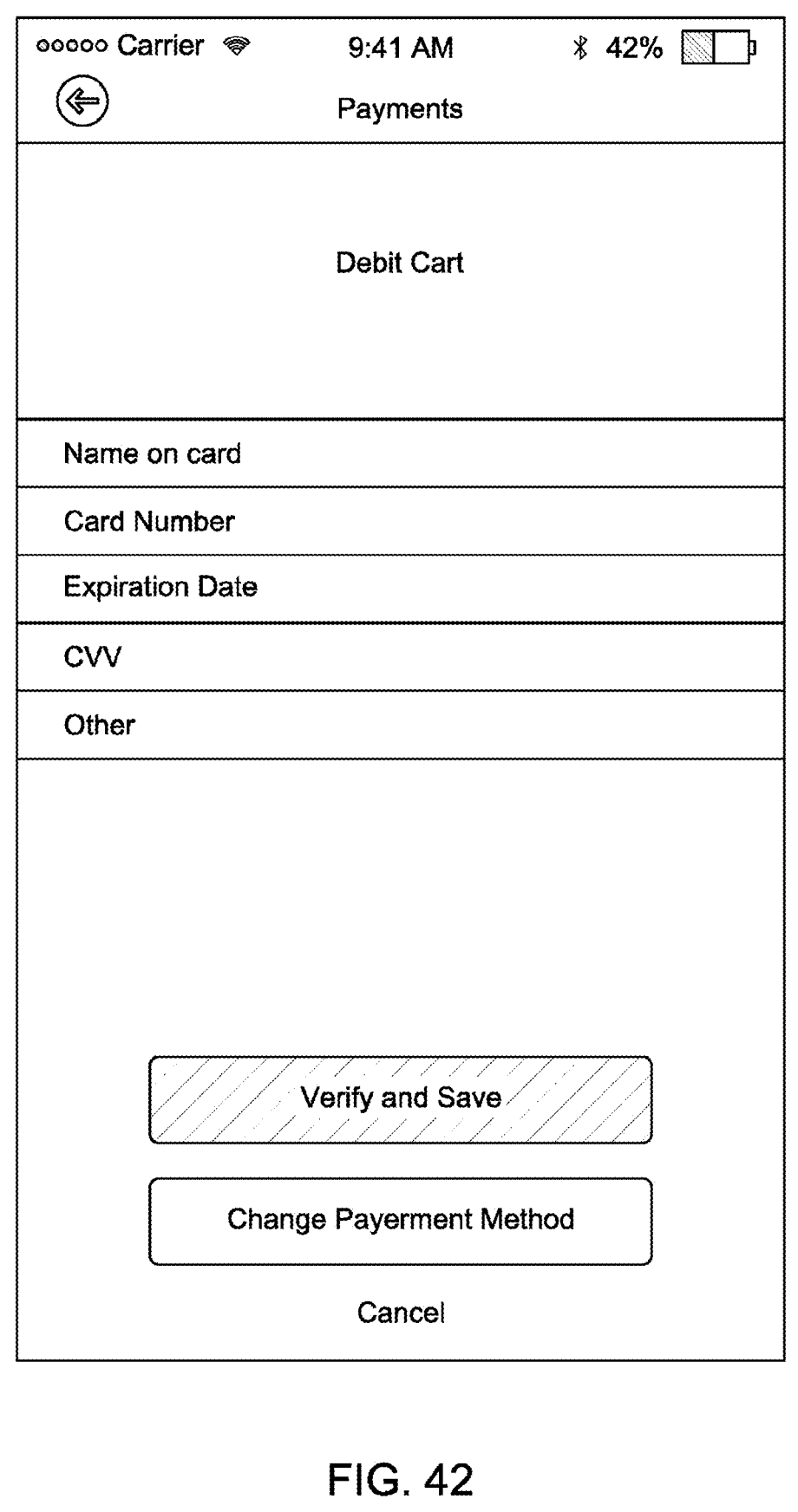

Payments

Debit Cart

Name on card

Card Number

Expiration Date

CVV

Other

Verify and Save

Change Payerment Method

Cancel

FIG. 42 ooooo Carrier 9:41 AM 42%

Cancel Edit Availability Done

Method of Transportation

Gig Availability

All

Painter

Dishwasher

Cook

Carpenter

FIG. 45 ooooo Carrier 9:41 AM 42%

Cancel Edit Availability Done

Method of Transportation

Gig Availability

All

Painter

Dishwasher

Cook

Carpenter

FIG. 46 ooooo Carrier 9:41 AM 42%

Figure 66:
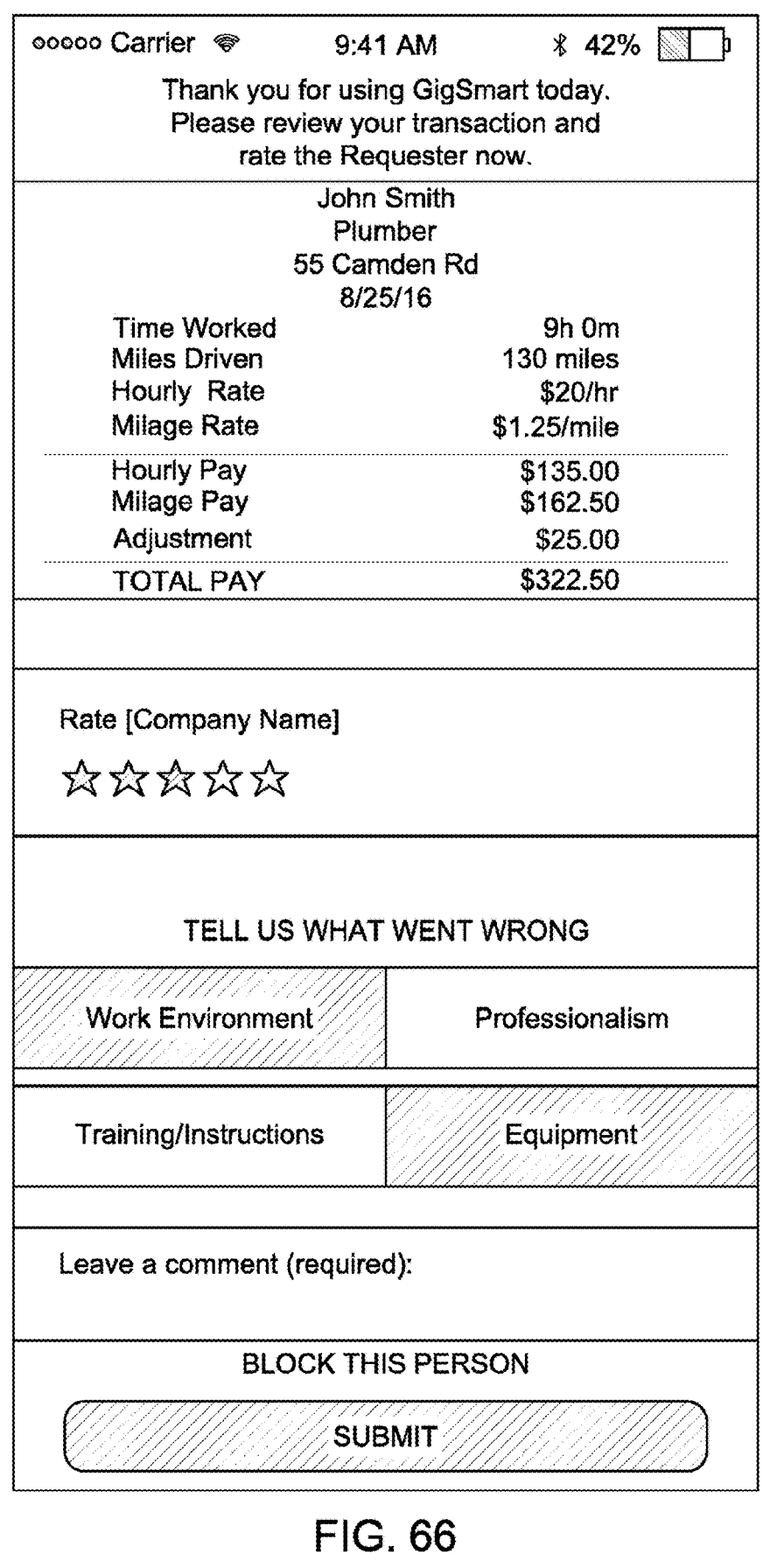

Thank you for using GigSmart today.
Please review your transaction and
rate the Requester now.

John Smith
Plumber
55 Camden Rd
8/25/16

| | |
|---|---|
| Time Worked | 9h 0m |
| Miles Driven | 130 miles |
| Hourly Rate | $20/hr |
| Milage Rate | $1.25/mile |
| Hourly Pay | $135.00 |
| Milage Pay | $162.50 |
| Adjustment | $25.00 |
| TOTAL PAY | $322.50 |

Rate [Company Name]

☆☆☆☆☆

TELL US WHAT WENT WRONG

| | |
|---|---|
| Work Environment | Professionalism |
| Training/Instructions | Equipment |

Leave a comment (required):

BLOCK THIS PERSON

SUBMIT

FIG. 66 ooooo Carrier 9:41 AM 42%

My Profile

Jane Doe
jane@doemail.com
(123)-456-7890

| ABOUT ME | SKILLS |
| --- | --- |
| WORK HISTORY | RATINGS AND REVIEWS |
| AFFILIATIONS | EMERGENCY CONTACT |
| EDUCATION, TRAINING, AND CERTIFICATIONS | SPECIAL ABILITIES |
| TRANSPORTATION, SPECIALTY VEHICLES, AND OPERATOR LICENSES | INSURANCE |
| TOOLS AND EQUIPMENT | PHYSICAL AND HEALTH LIMITATIONS |
| BACKGROUND CHECKS, DRUG TESTS AND FINGERPRINTS | PAYMENTS |
| BADGES | ACCOUNT SETTINGS |

FIG. 69

FIG. 70 ooooo Carrier 9:41 AM 42%

Figure 71:
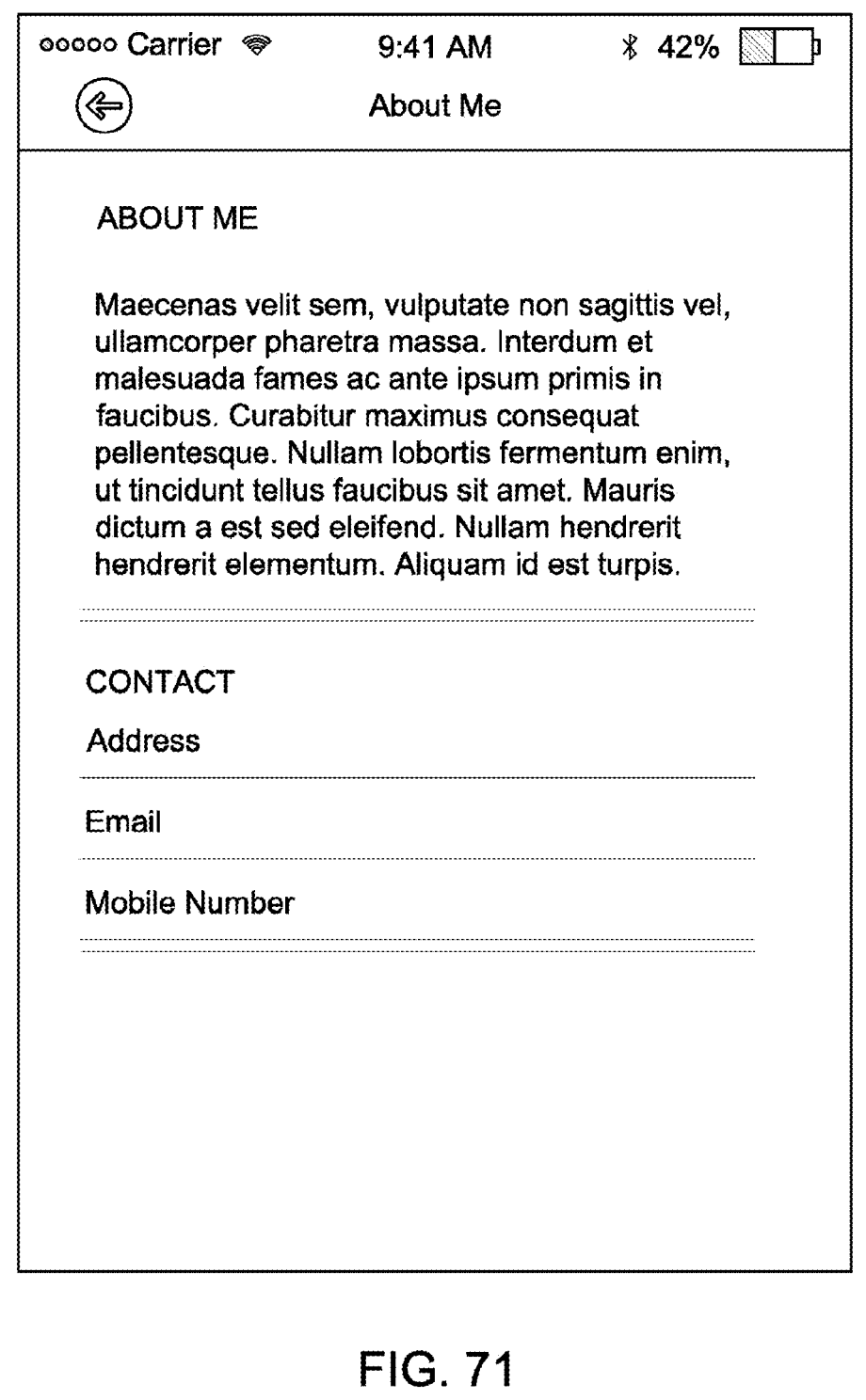

About Me

ABOUT ME

Maecenas velit sem, vulputate non sagittis vel, ullamcorper pharetra massa. Interdum et malesuada fames ac ante ipsum primis in faucibus. Curabitur maximus consequat pellentesque. Nullam lobortis fermentum enim, ut tincidunt tellus faucibus sit amet. Mauris dictum a est sed eleifend. Nullam hendrerit hendrerit elementum. Aliquam id est turpis.

CONTACT

Address

Email

Mobile Number

FIG. 71 ooooo Carrier 9:41 AM 42%

Figure 73:
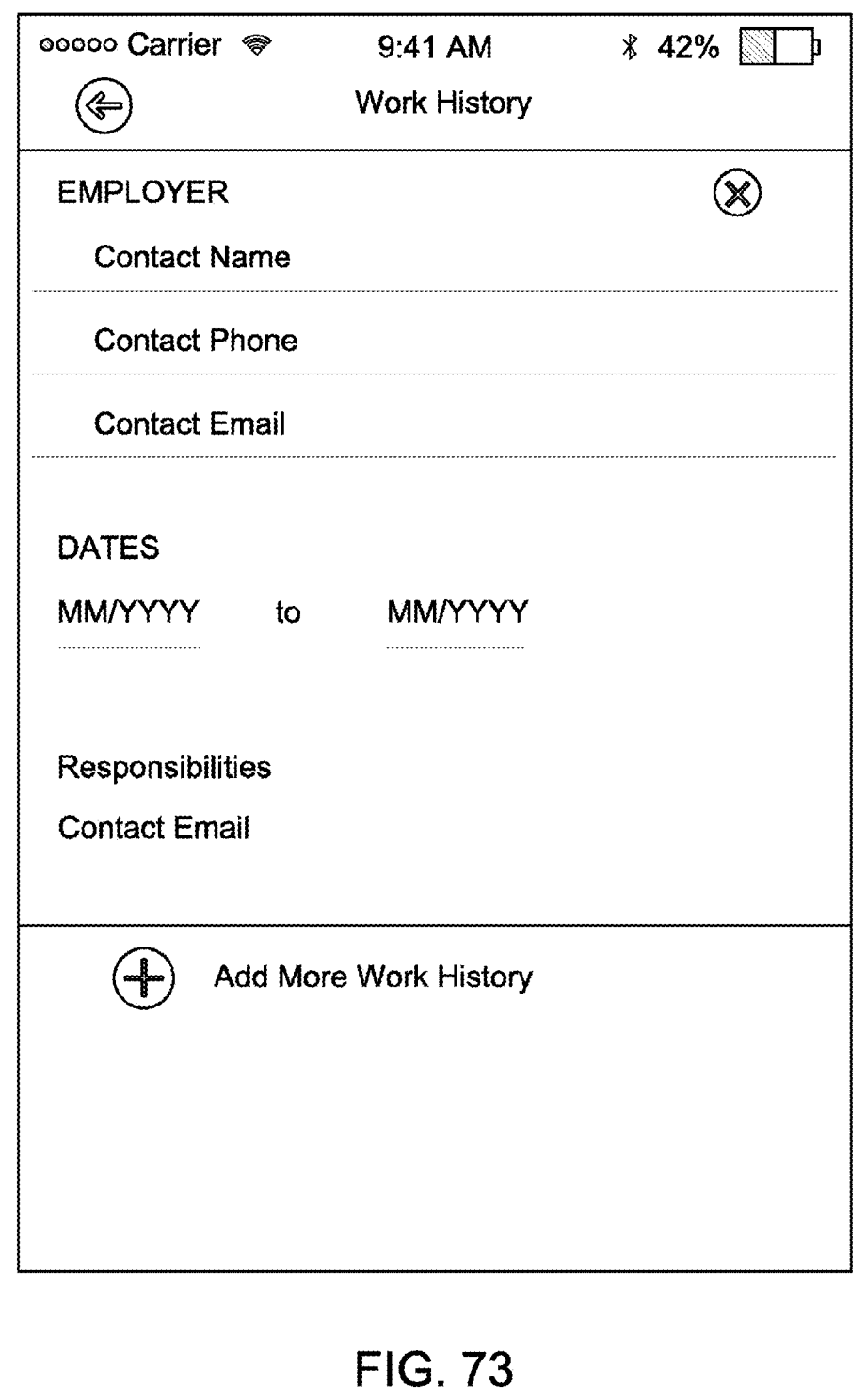

Work History

EMPLOYER

Contact Name

Contact Phone

Contact Email

DATES

MM/YYYY to MM/YYYY

Responsibilities

Contact Email

Add More Work History

FIG. 73 ooooo Carrier 9:41 AM 42%

Education-Training-Certifications

EDUCATION-HIGHEST LEVEL ACHIEVED

Please make selection

School

Year of graduation

Add More Education

LICENSING/SPECIAL TRAINING

Technical Training

Please describe technical training

Add More Technical Training

Certifications

Licenses

Please add license types

Add a photo of any licenses

Add More Licenses

FIG. 74 ooooo Carrier 9:41 AM 42%

Figure 75:
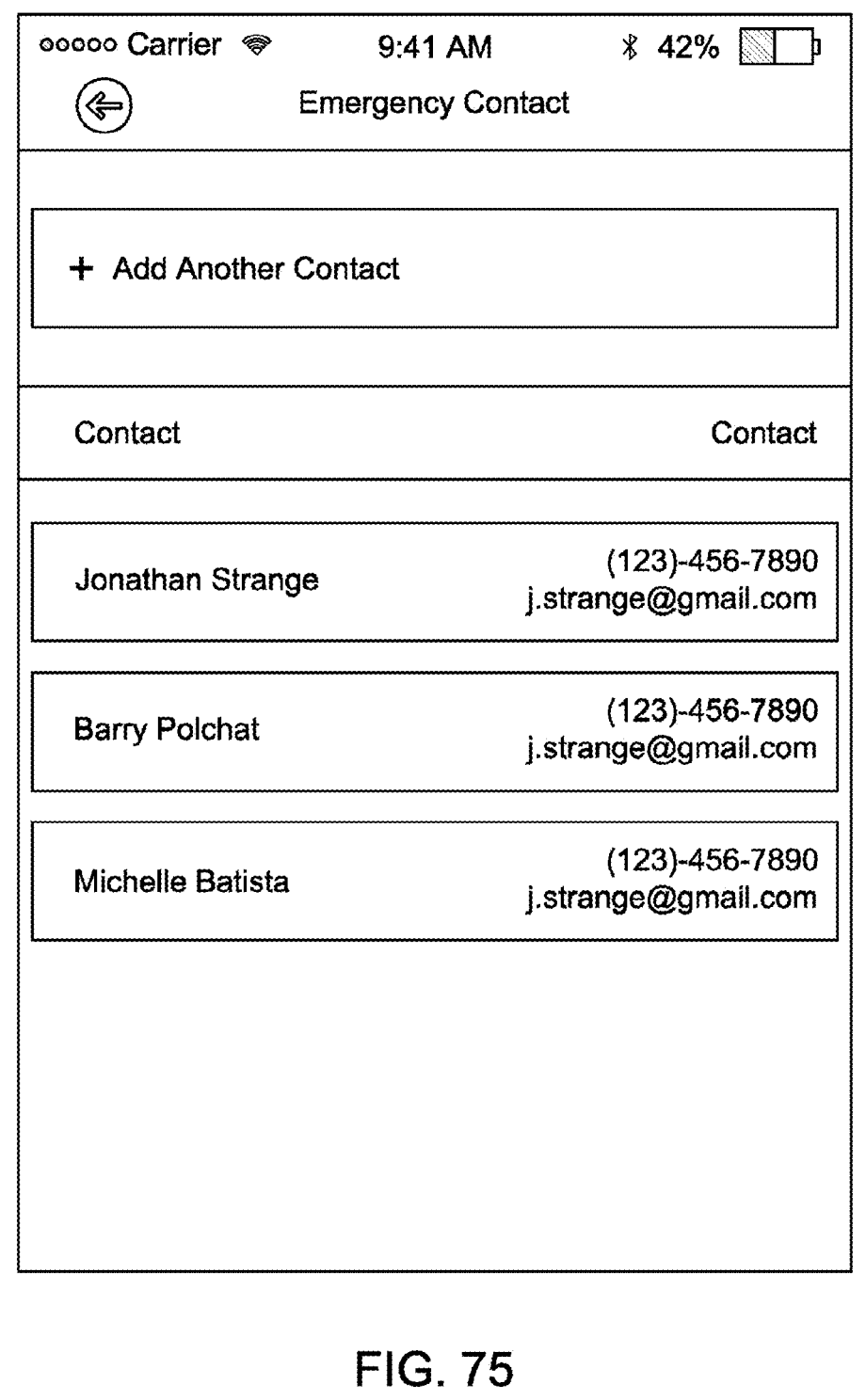

Emergency Contact

+ Add Another Contact

Contact

Contact

Jonathan Strange (123)-456-7890 j.strange@gmail.com

Barry Polchat (123)-456-7890 j.strange@gmail.com

Michelle Batista (123)-456-7890 j.strange@gmail.com

FIG. 83 ooooo Carrier 9:41 AM 42%

Figure 84:
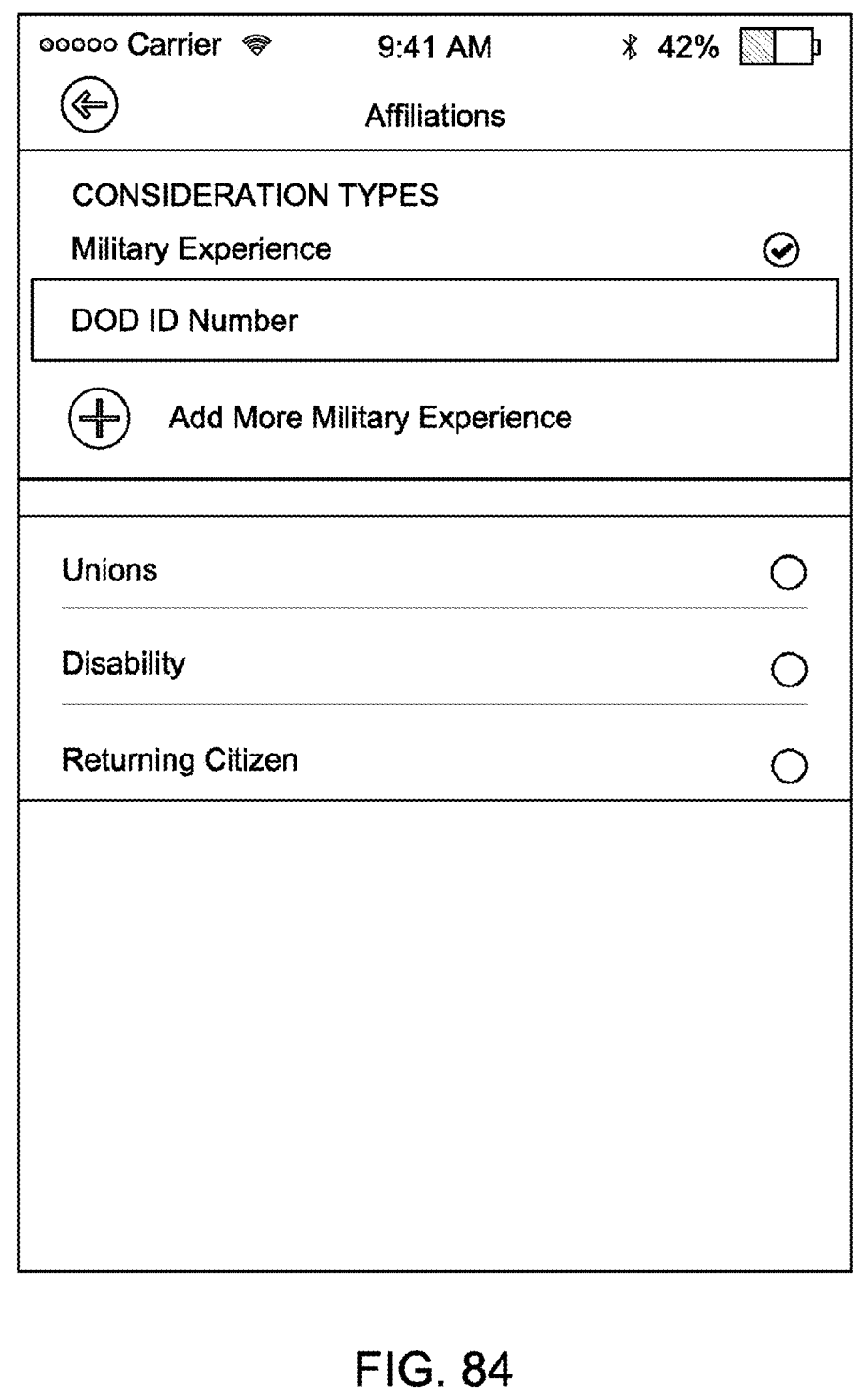

Affiliations

CONSIDERATION TYPES

Military Experience

DOD ID Number

Add More Military Experience

Unions

Disability

Returning Citizen

FIG. 86 ooooo Carrier 9:41 AM 42%

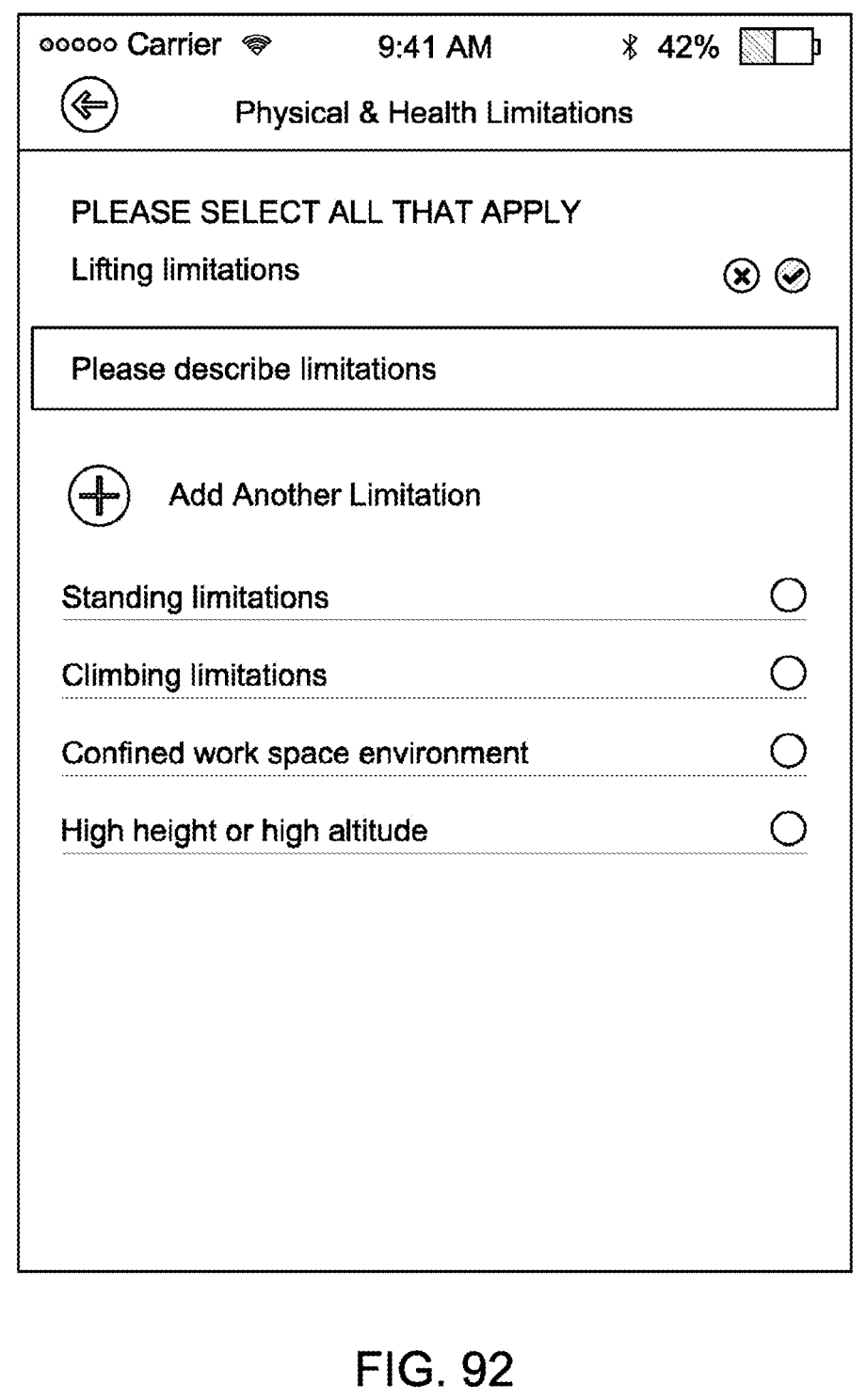

Physical & Health Limitations

PLEASE SELECT ALL THAT APPLY

Lifting limitations

Please describe limitations

Add Another Limitation

Standing limitations

Climbing limitations

Confined work space environment

High height or high altitude

FIG. 92

FIG. 94 ooooo Carrier 9:41 AM 42%

Month Calendar 19

AUGUST 2016

| SUN | MON | TUE | WED | THU | FRI | SAT |
|---|---|---|---|---|---|---|
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |

SEPTEMBER 2016

| SUN | MON | TUE | WED | THU | FRI | SAT |
|---|---|---|---|---|---|---|
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |

OCTOBER 2016

| SUN | MON | TUE | WED | THU | FRI | SAT |
|---|---|---|---|---|---|---|
| 1 | 2 | 3 | 4 | 5 | 6 | 7 |
| 8 | 9 | 10 | 11 | 12 | 13 | 14 |

Calendar Positions Data Center Gig Board

FIG. 96

FIG. 97 ooooo Carrier 9:41 AM 42%

Figure 99:
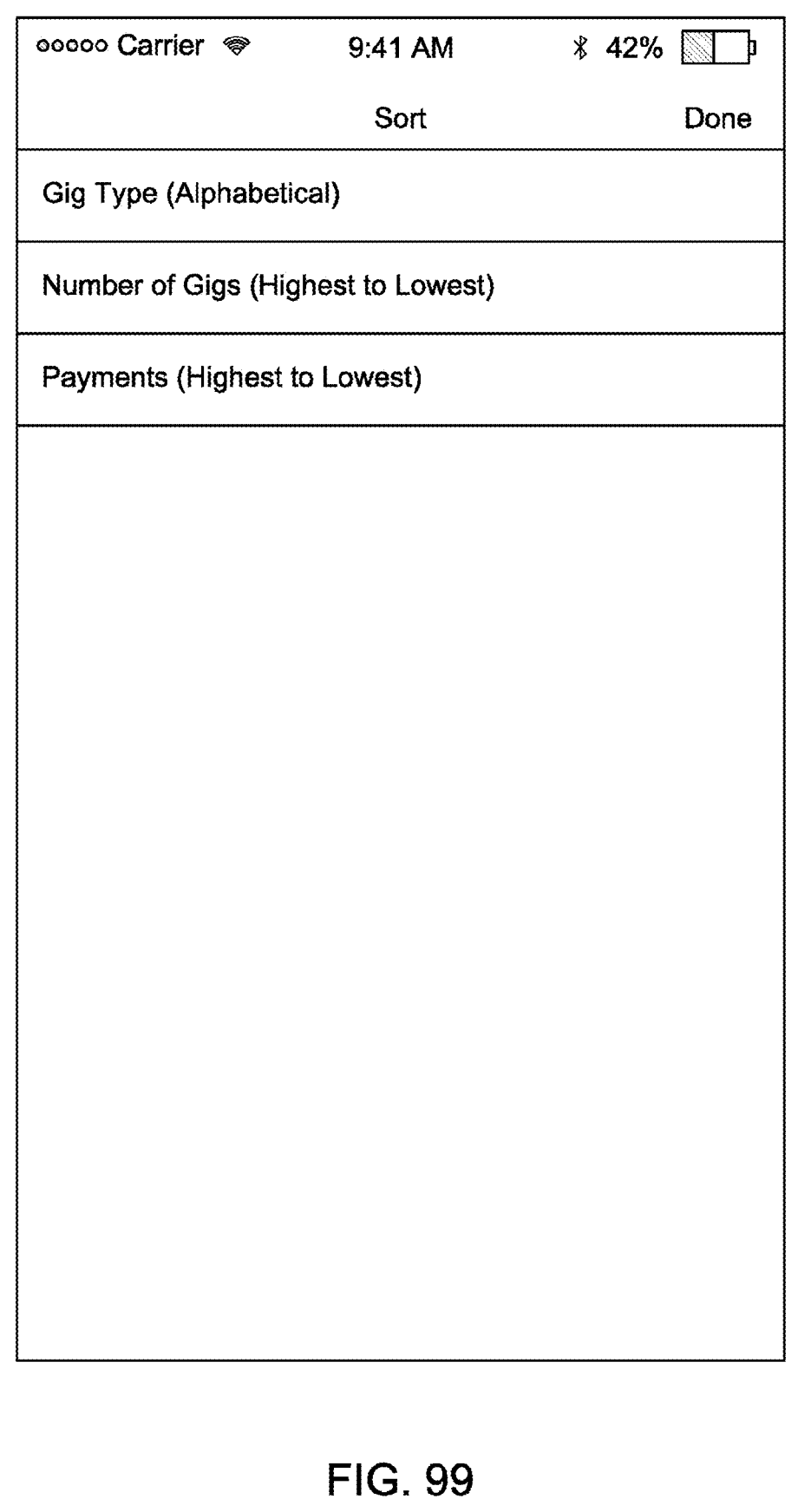

Sort Done

Gig Type (Alphabetical)

Number of Gigs (Highest to Lowest)

Payments (Highest to Lowest)

FIG. 99 ooooo Carrier 9:41 AM 42%

Figure 101:
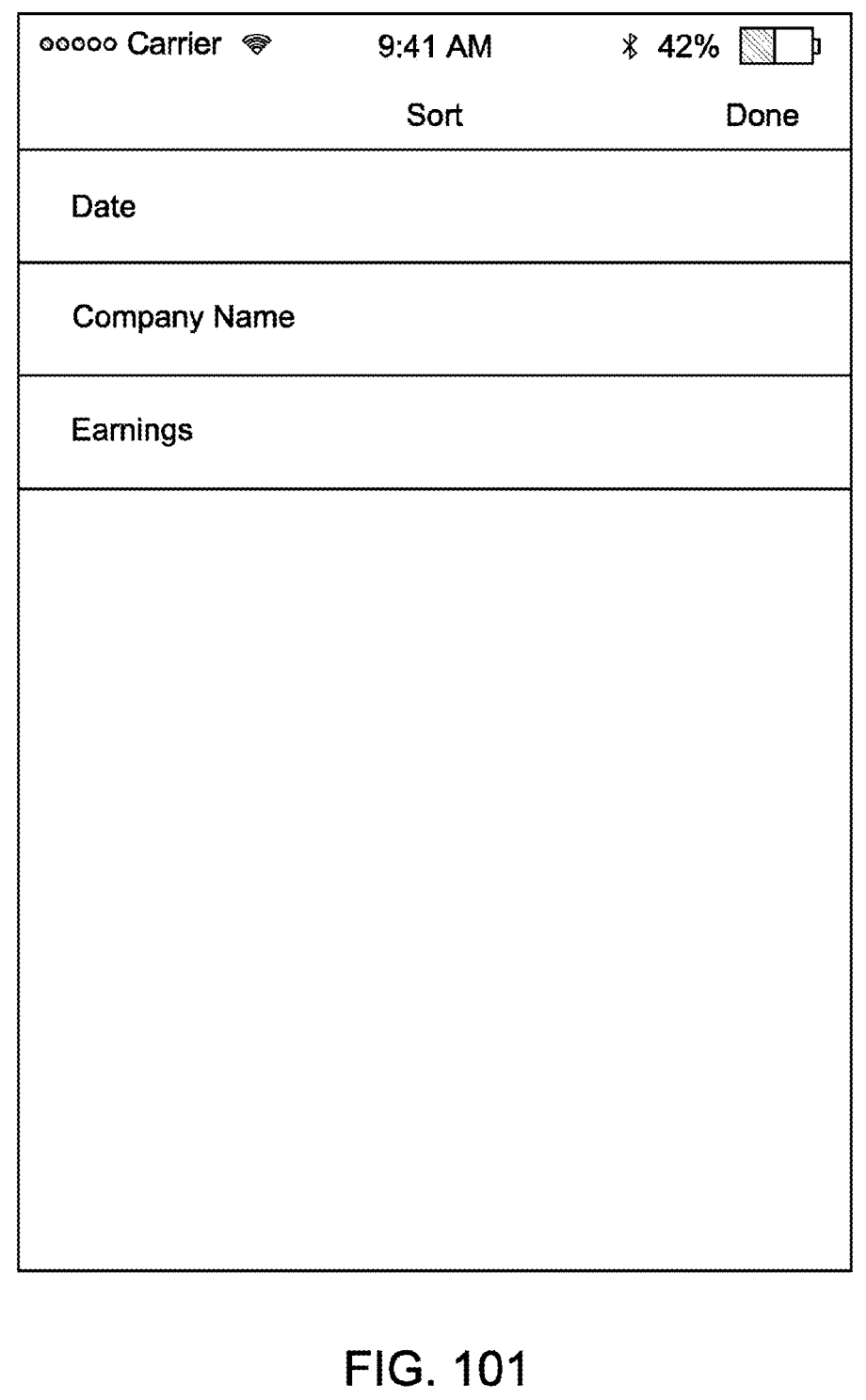

Sort Done

Date

Company Name

Earnings

FIG. 109 ooooo Carrier 9:41 AM 42%

Figure 110:
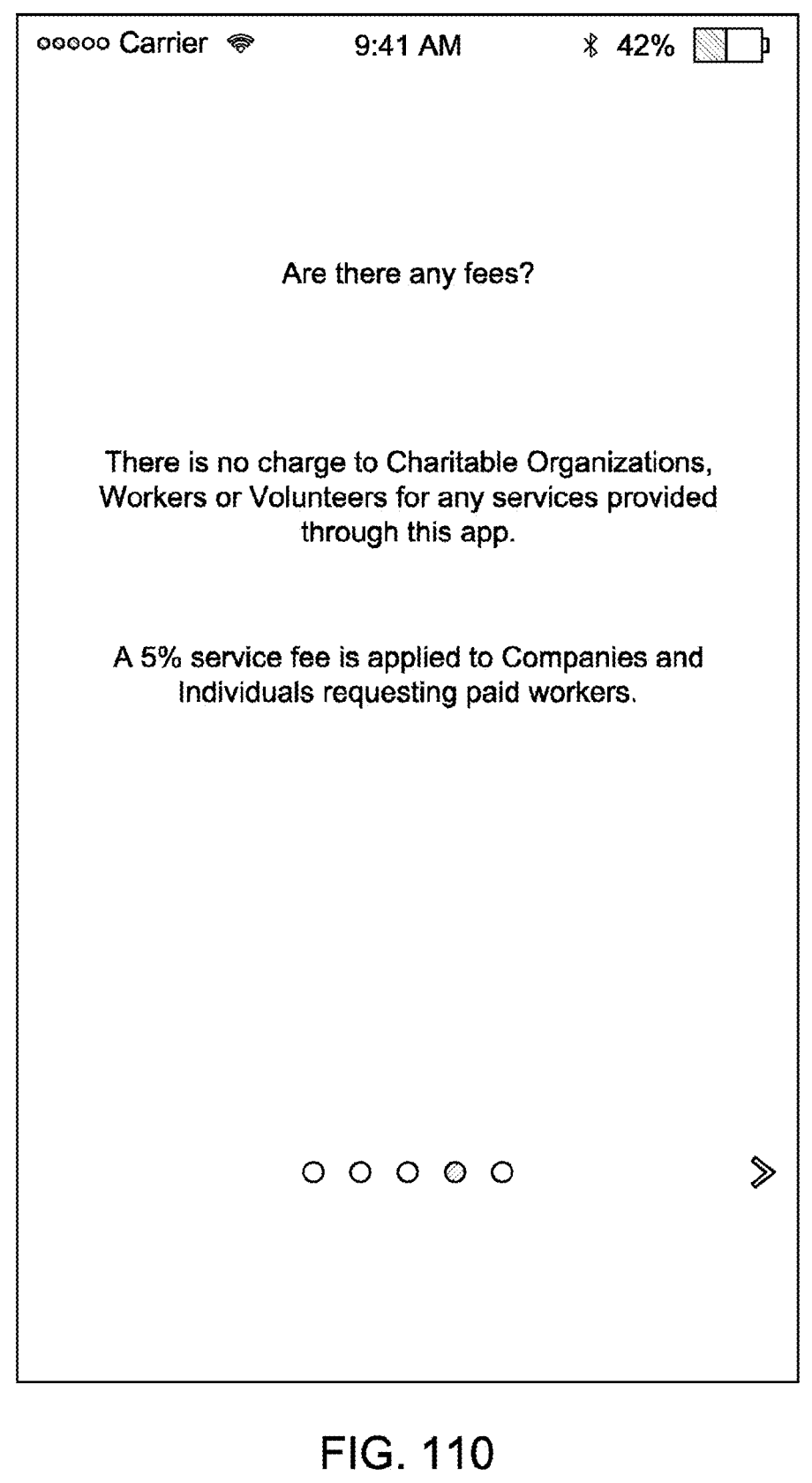

Are there any fees?

There is no charge to Charitable Organizations, Workers or Volunteers for any services provided through this app.

A 5% service fee is applied to Companies and Individuals requesting paid workers.

FIG. 118 ooooo Carrier 9:41 AM 42%

Figure 119:
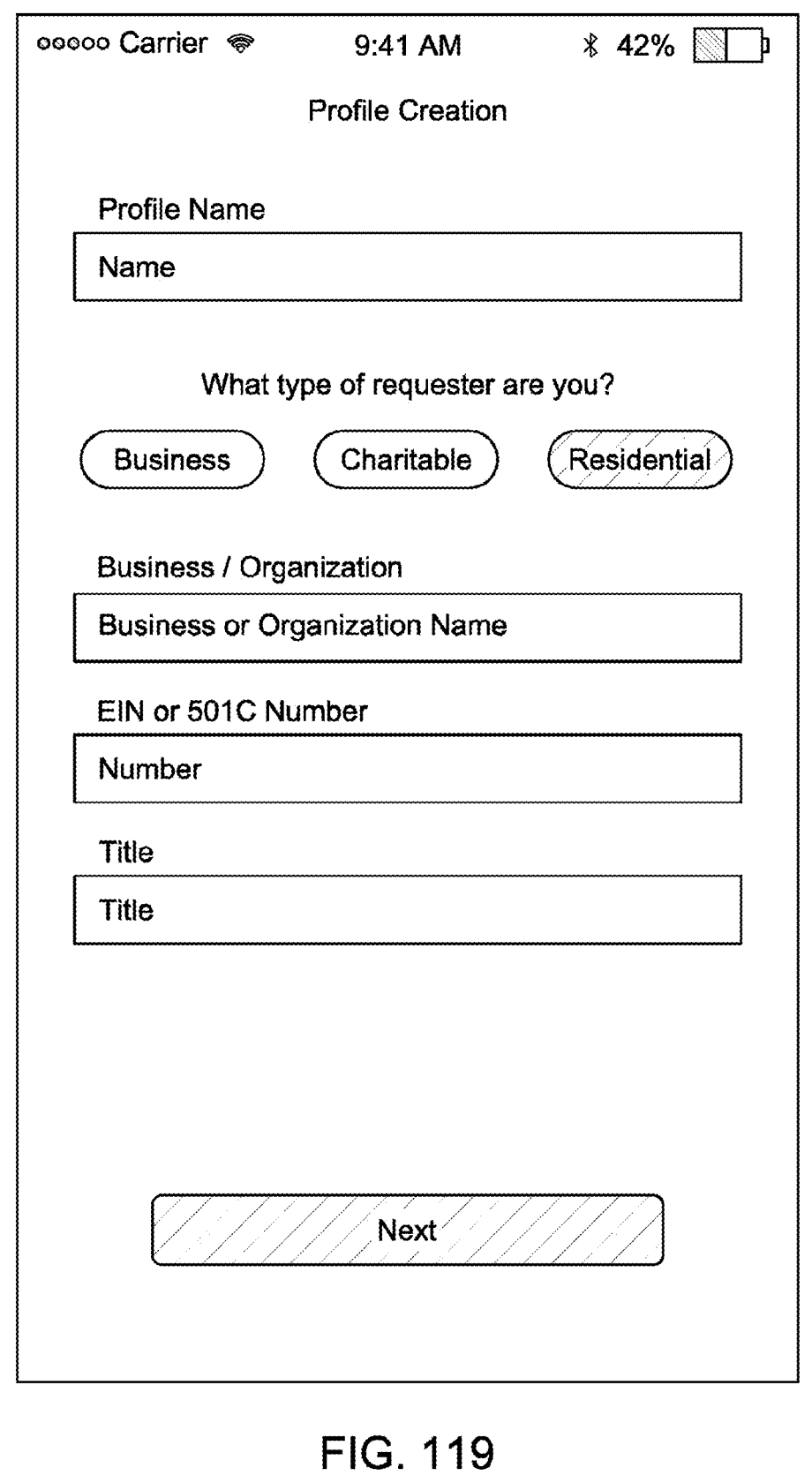

Profile Creation

Profile Name

Name

What type of requester are you?

Business Charitable Residential

Business / Organization

Business or Organization Name

EIN or 501C Number

Number

Title

Title

Next

FIG. 119 ooooo Carrier 9:41 AM 42%

Figure 120:
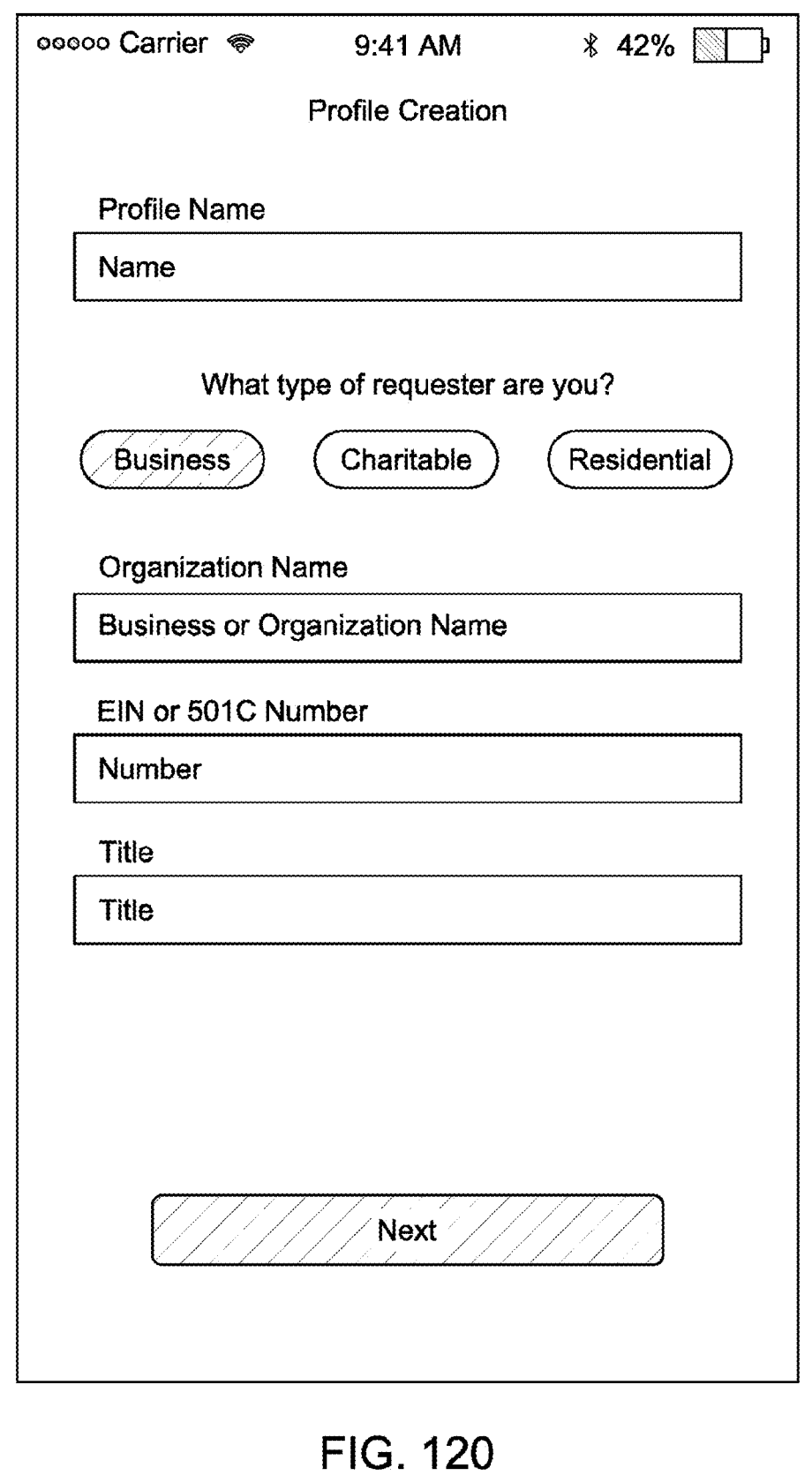

Profile Creation

Profile Name

Name

What type of requester are you?

Business Charitable Residential

Organization Name

Business or Organization Name

EIN or 501C Number

Number

Title

Title

Next

FIG. 120 ooooo Carrier 9:41 AM 42%

Figure 121:
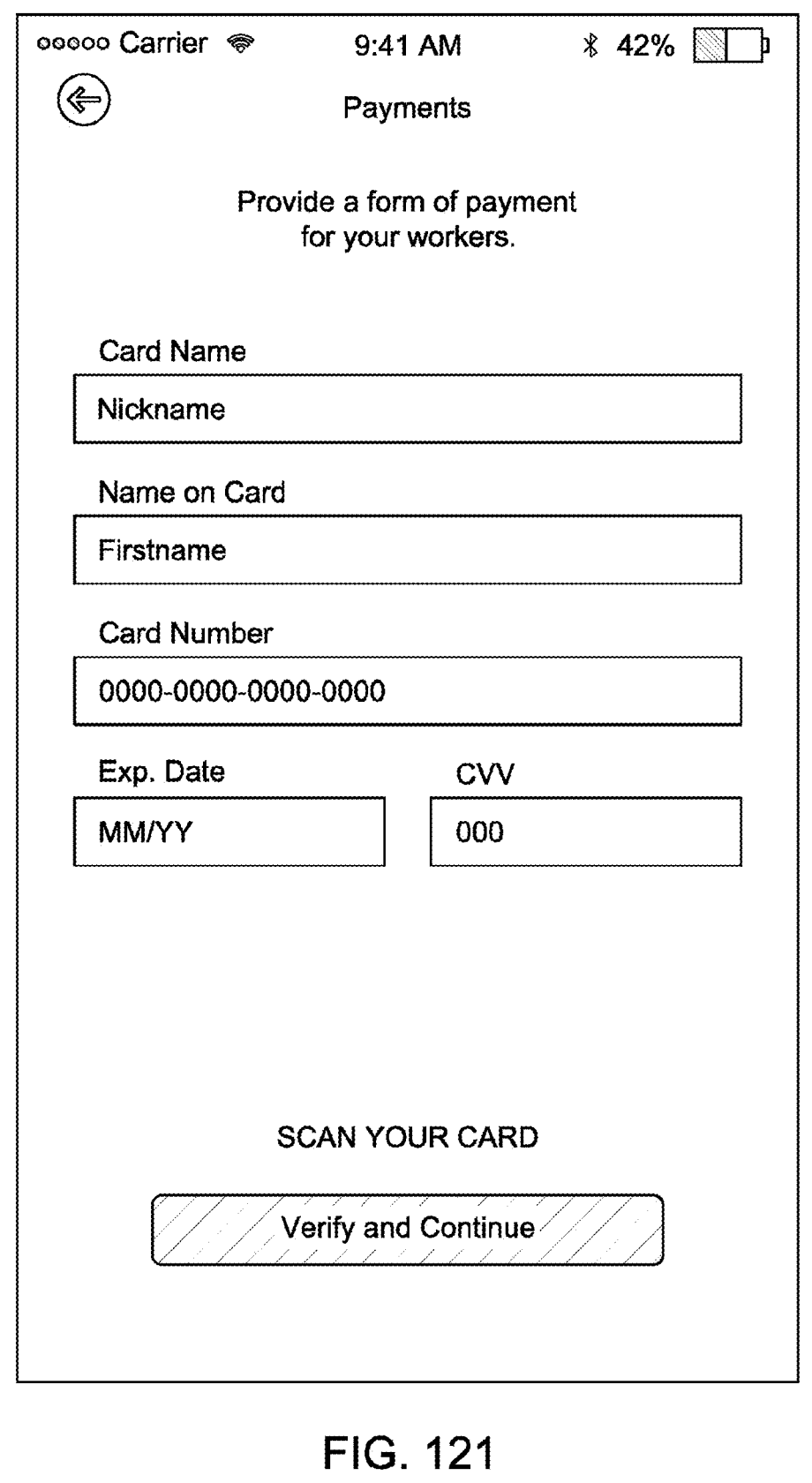

Payments

Provide a form of payment
for your workers.

Card Name

Nickname

Name on Card

Firstname

Card Number 0000-0000-0000-0000

Exp. Date

MM/YY

CVV

000

SCAN YOUR CARD

Verify and Continue

FIG. 123 ooooo Carrier 9:41 AM 42%

GigSmart

Search | Cart | Gig Details

Hammer | Current Location

475 Workers

Filter/Sort

| Distance Milies | Name / # of Skills | Years Exp | Pay Rate / hr | Milage Rate / mile |
|---|---|---|---|---|
| 0.15 miles | **John Doe** (5) ☆☆☆☆☆ (30) | 3 | $18 | $0.75 |
| 0.36 miles | **Marcy Pendelton** (8) ☆☆☆☆☆ (30) | 1 | $15 | $1.75 |
| 0.5 miles | **Barry Allen** (3) ☆☆☆☆☆ (30) | 1 | $15 | $0.25 |
| 2.98 miles | **Thadius Bipperton** (5) ☆☆☆☆☆ (30) | 2 | $17 | $3.25 |
| 5.13 miles | **Ulysses Bronte** (2) ☆☆☆☆☆ (30) | 4 | $20 | $1.00 |

Work Rosters | Find Workers | Calendar

FIG. 127 ooooo Carrier 9:41 AM 42%

Figure 129:
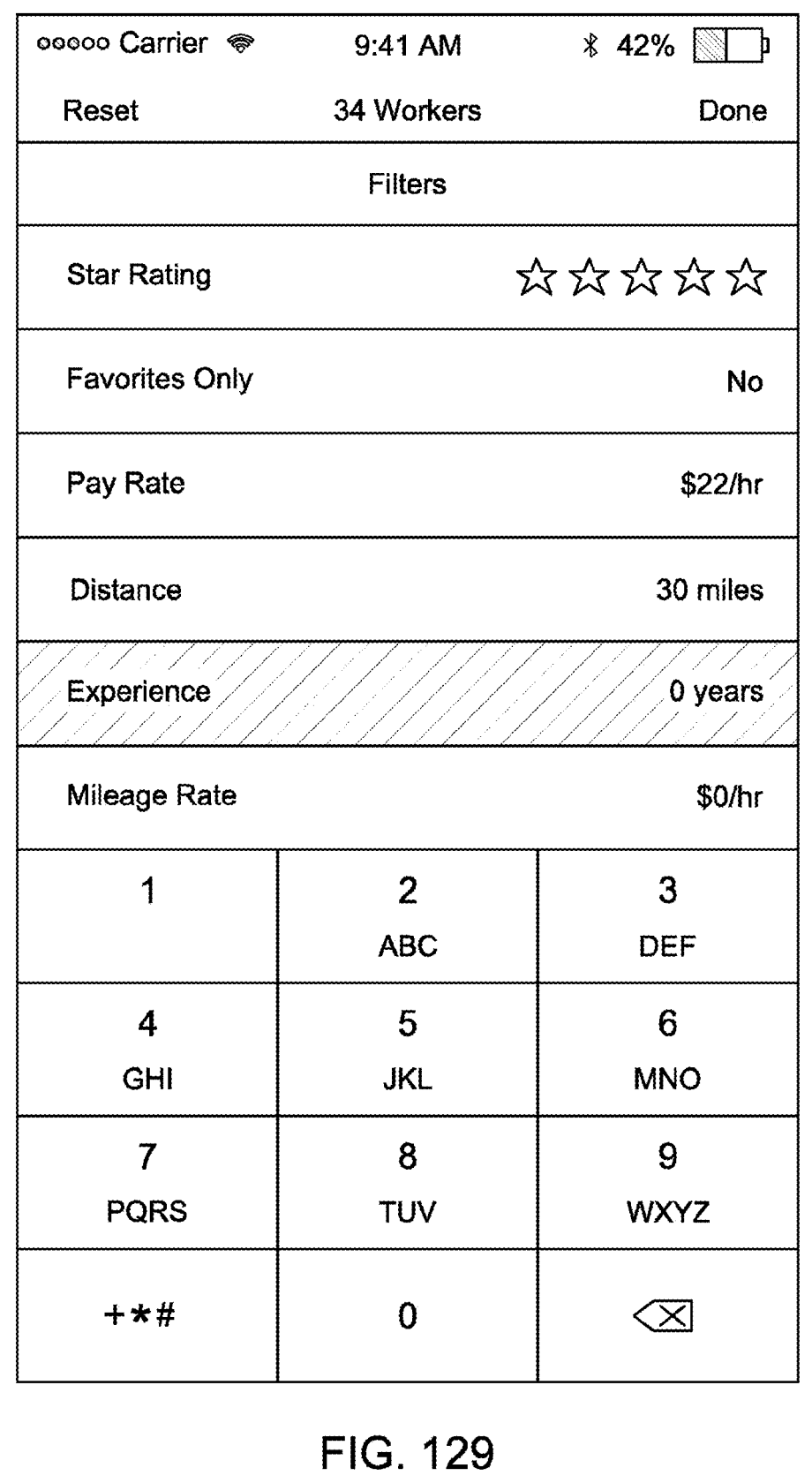

Reset 34 Workers Done

Filters

Star Rating ☆☆☆☆☆

Favorites Only No

Pay Rate $22/hr

Distance 30 miles

Experience 0 years

Mileage Rate $0/hr 1
2 ABC
3 DEF
4 GHI
5 JKL
6 MNO
7 PQRS
8 TUV
9 WXYZ
+*#
0

FIG. 131
ooooo Carrier
9:41 AM
42%
Worker Information
Done
Favorite
Jack Smith
(30 Reviews)
jack@doemail.com
(123)-456-7890
Cancelation Rate: 5%
Badges
Badge
Badge
Badge
Badge
Bad
Available for these Gigs
Pay Rate
Experience
Carpenter
$15/hr
1 Yrs
House Painter
$12/hr
5 Yrs
Mover
$12/hr
2 Yrs
Reviews
Intelligent Movers
Jack was a highly professional and motivated mover that worked tirelessly and without complaint. Even with relatively tough clients, his demeanor was appreciated where tempers often flair.
Read More Reviews
Add to Roster

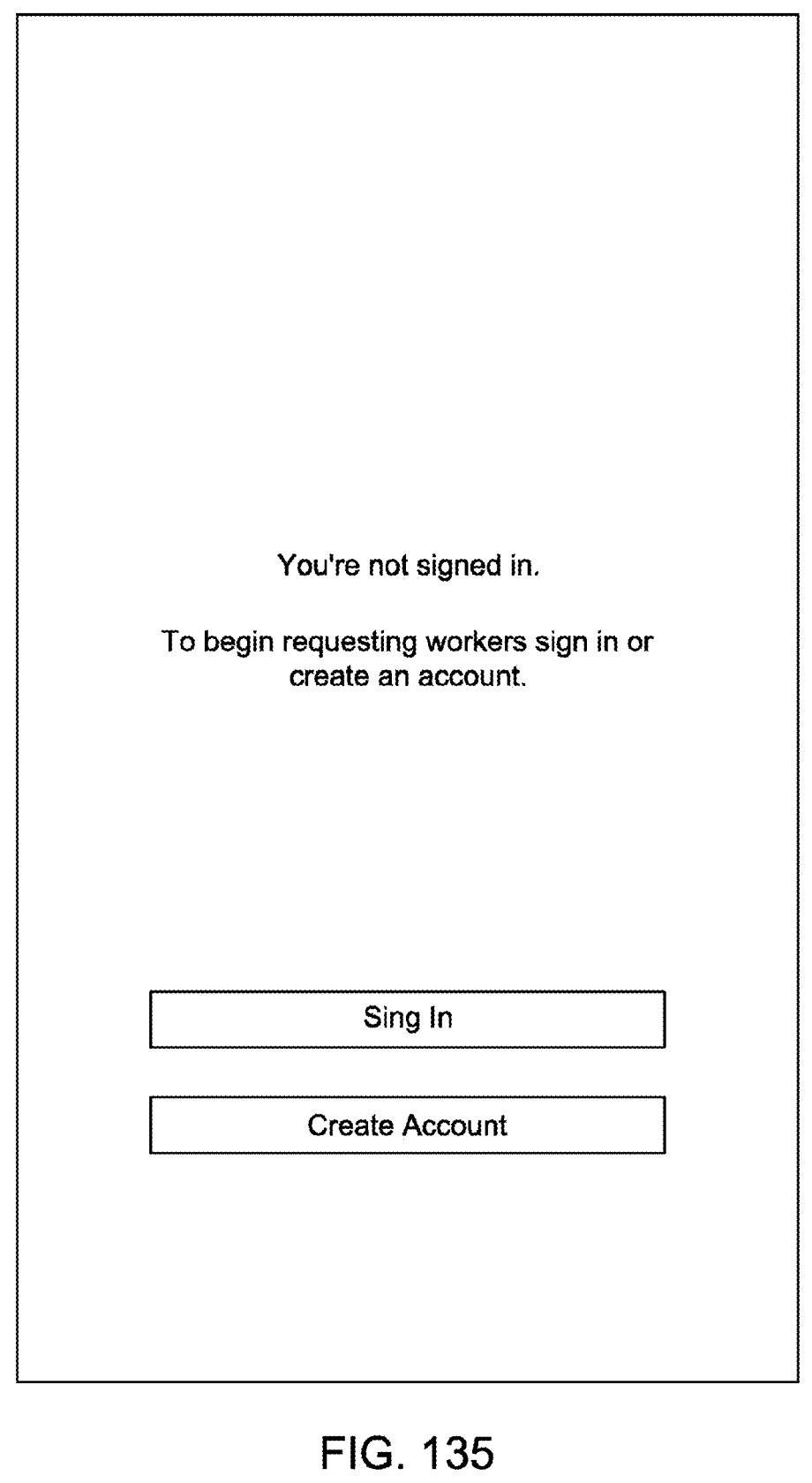

You're not signed in.

To begin requesting workers sign in or create an account.

Sing In

Create Account

FIG. 135

Figure 136:
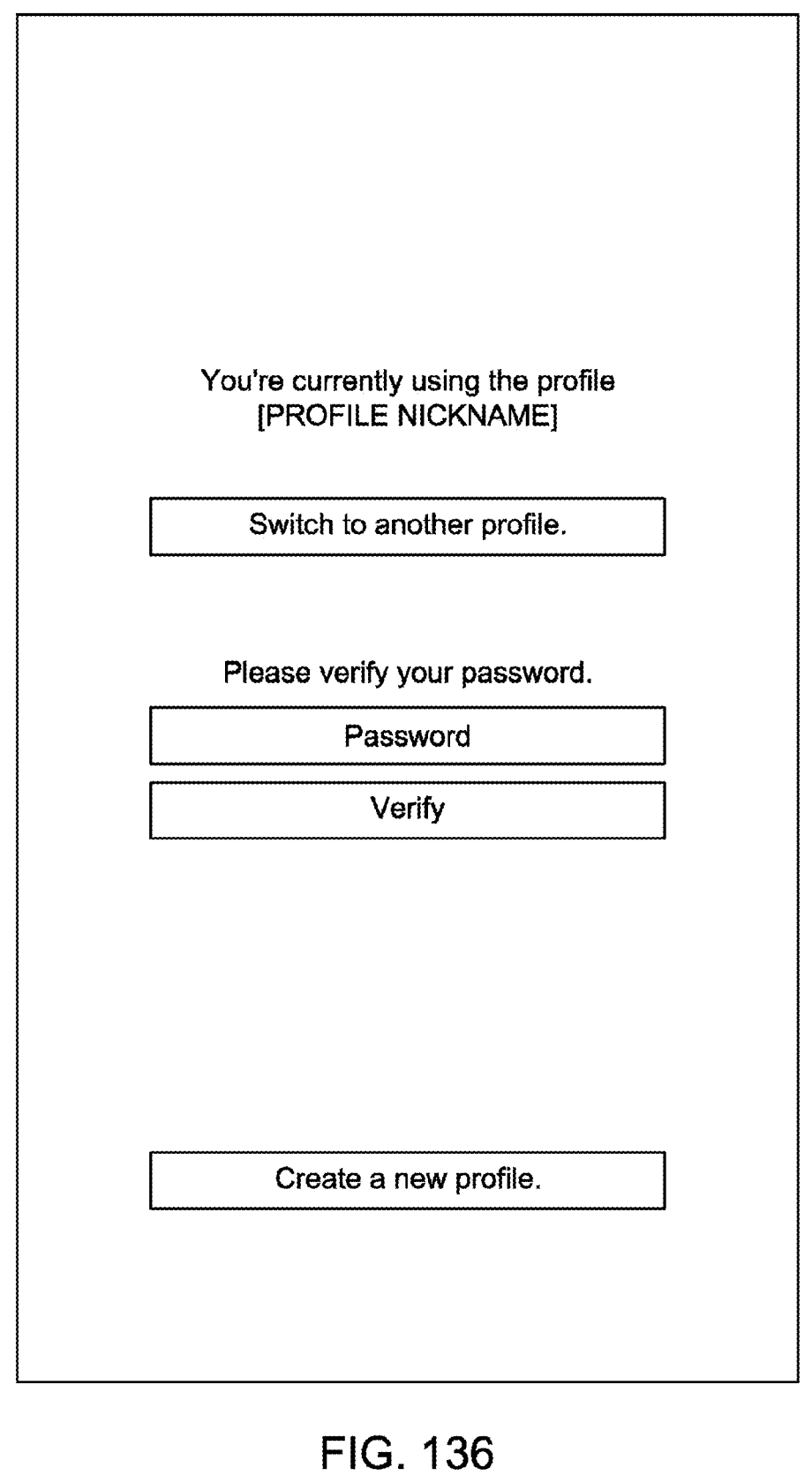

You're currently using the profile
[PROFILE NICKNAME]

Switch to another profile.

Please verify your password.

Password

Verify

Create a new profile.

FIG. 136 ooooo Carrier 9:41 AM 42%

Figure 137:
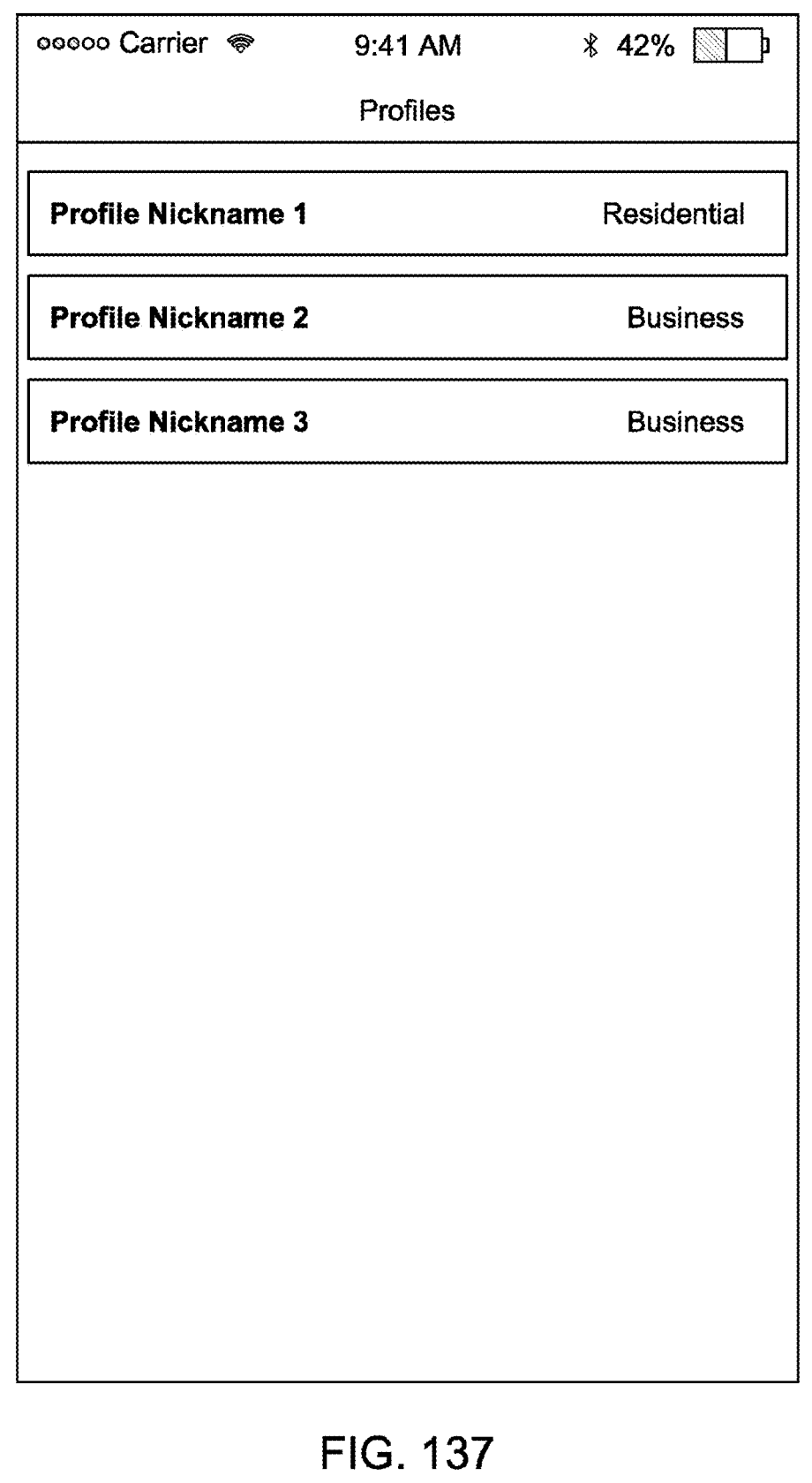

Profiles

Profile Nickname 1 Residential

Profile Nickname 2 Business

Profile Nickname 3 Business

FIG. 137 ooooo Carrier 9:41 AM 42%

Figure 140:
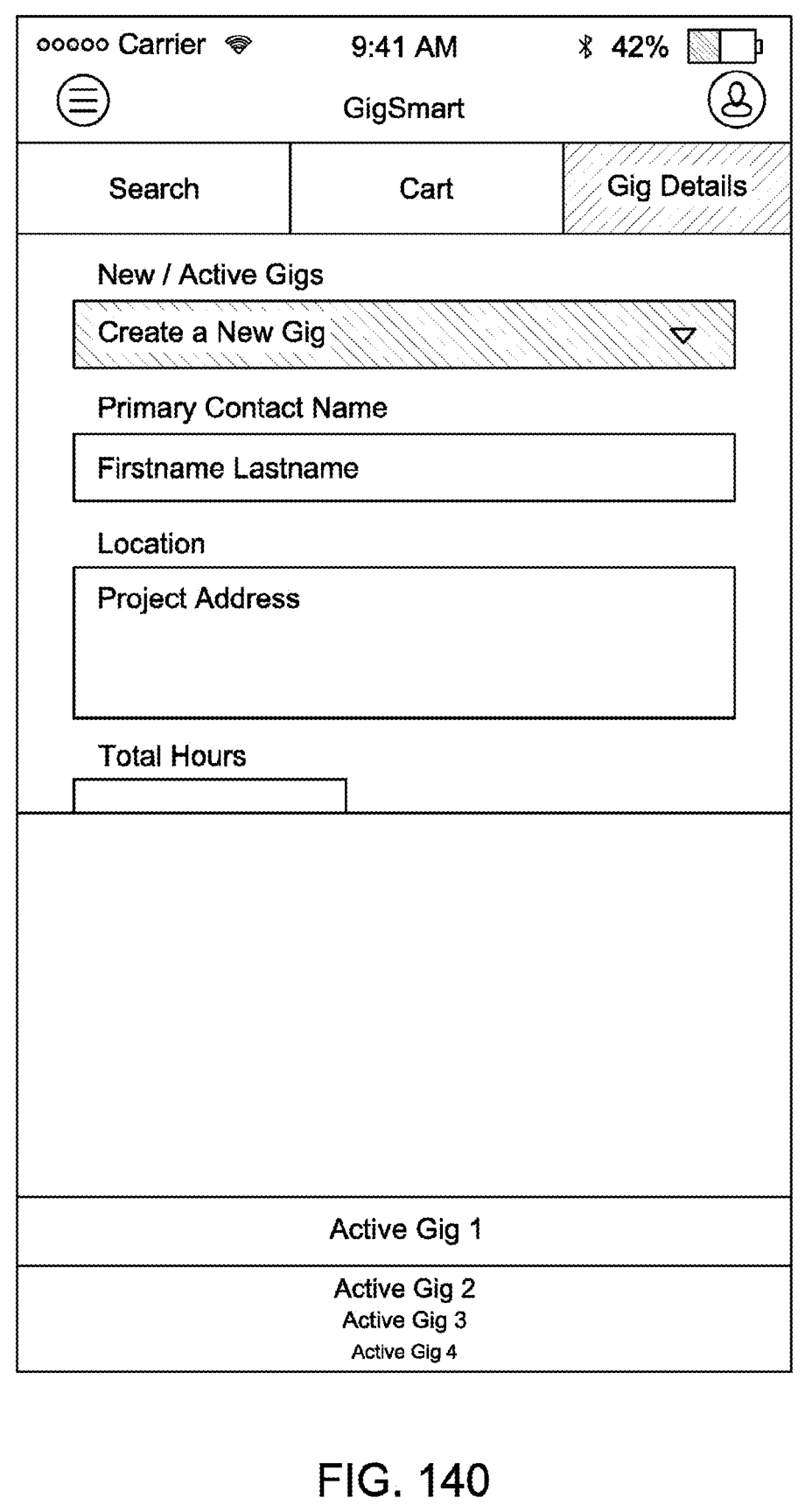

GigSmart

Search | Cart | Gig Details

New / Active Gigs

Create a New Gig

Primary Contact Name

Firstname Lastname

Location

Project Address

Total Hours

Active Gig 1

Active Gig 2

Active Gig 3

Active Gig 4

FIG. 155 ooooo Carrier 9:41 AM 42%

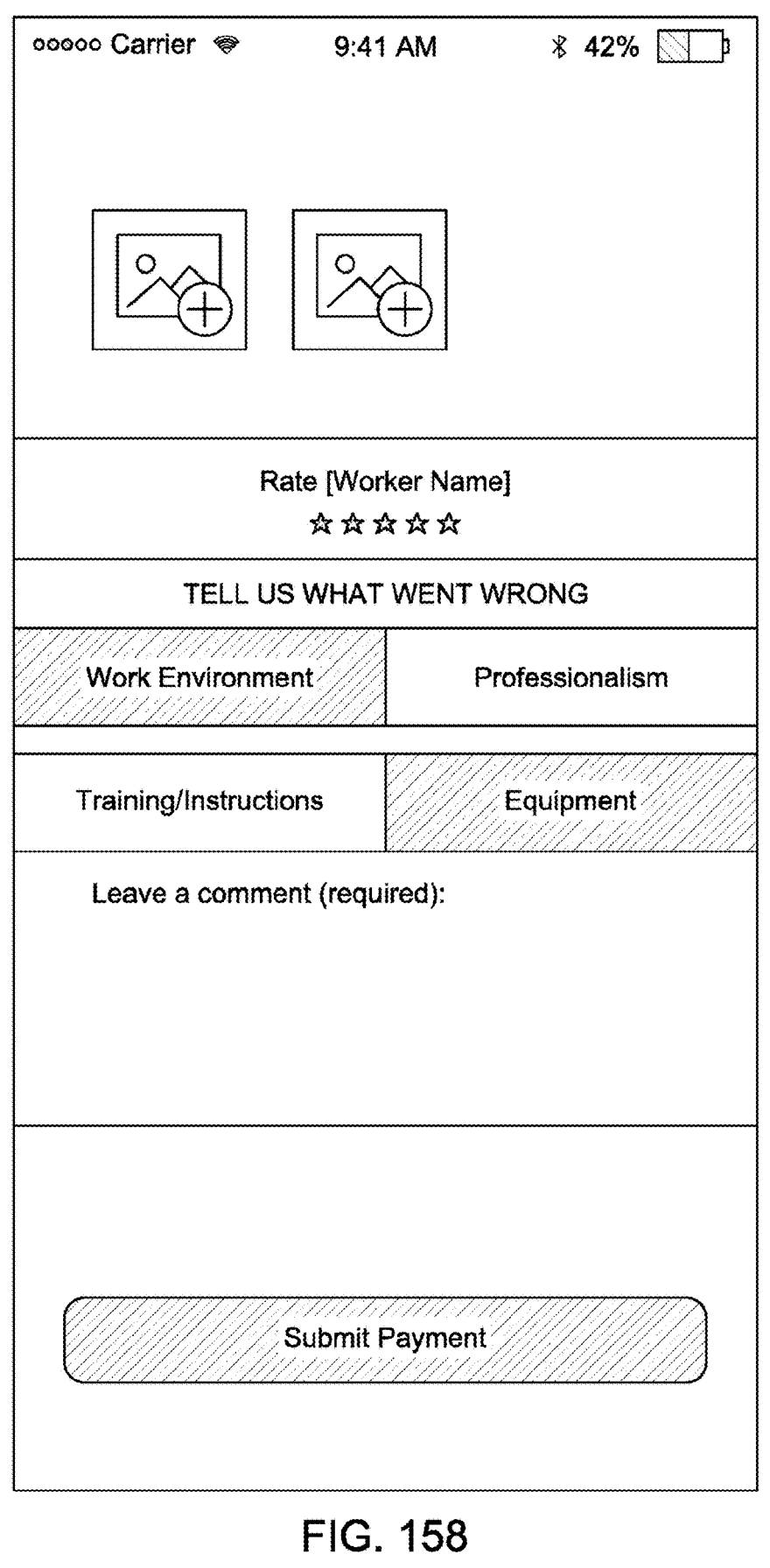

Rate [Worker Name]

☆☆☆☆☆

TELL US WHAT WENT WRONG

Work Environment

Professionalism

Training/Instructions

Equipment

Leave a comment (required):

Submit Payment

FIG. 158

FIG. 159 ooooo Carrier 9:41 AM 42%

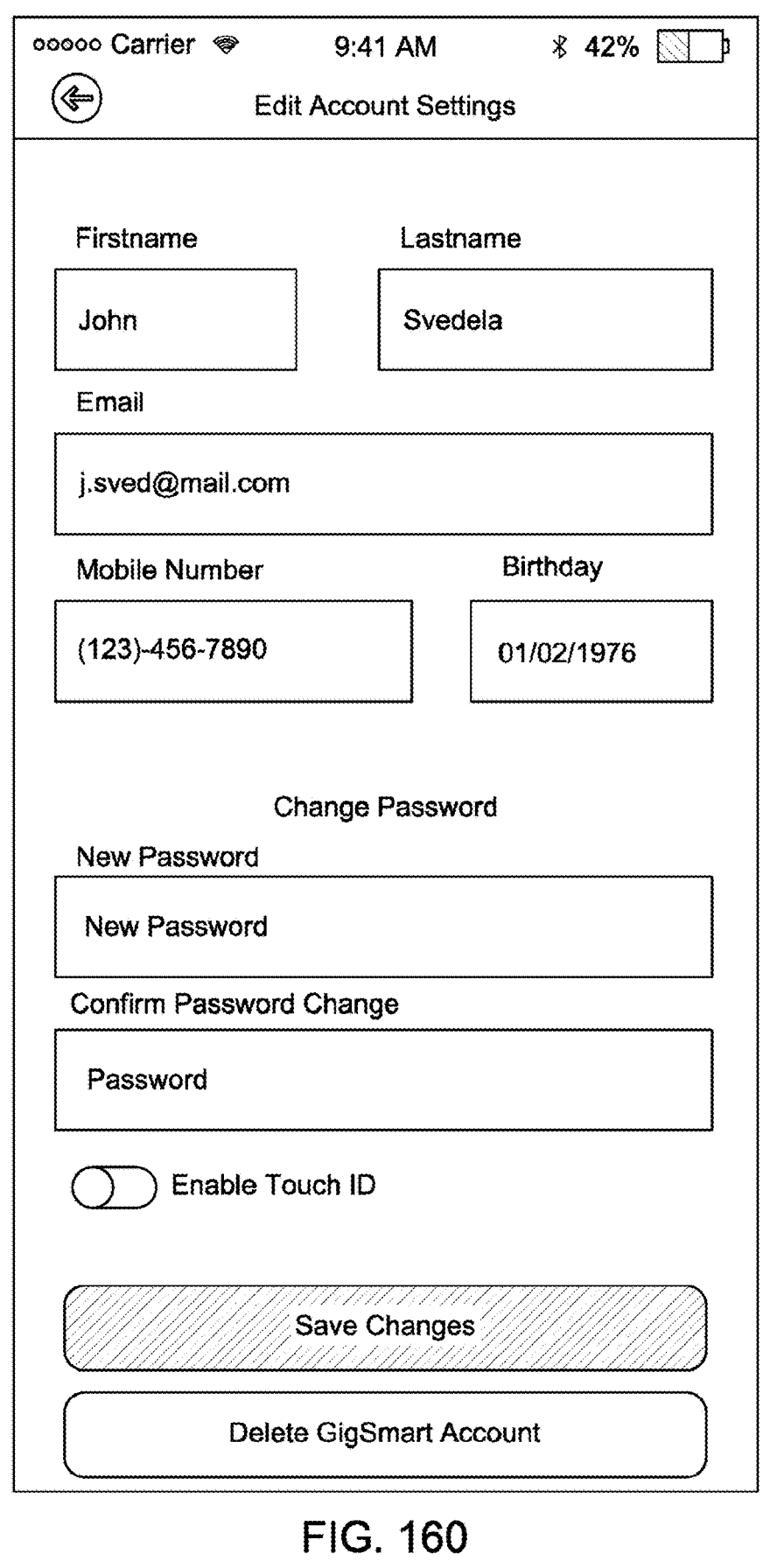

Edit Account Settings

Firstname

John

Lastname

Svedela

Email j.sved@mail.com

Mobile Number (123)-456-7890

Birthday

01/02/1976

Change Password

New Password

New Password

Confirm Password Change

Password

Enable Touch ID

Save Changes

Delete GigSmart Account

FIG. 160

FIG. 161 ooooo Carrier 9:41 AM 42%

Edit Profile

Delete Profile

Profile Name

Profile Nickname 1

What type of requester are you?

Business Charitable Residential

Business

Name

Title

Title (Optional)

Email profile.email@address.com

Profile Number (123)-456-7890

| Payment ID | Last 4 Digits | Exp. |
| --- | --- | --- |
| **Name on Card** | 5555 | 08/20 |

Save Changes

Cancel

FIG. 164 ooooo Carrier 9:41 AM 42%

Figure 165:
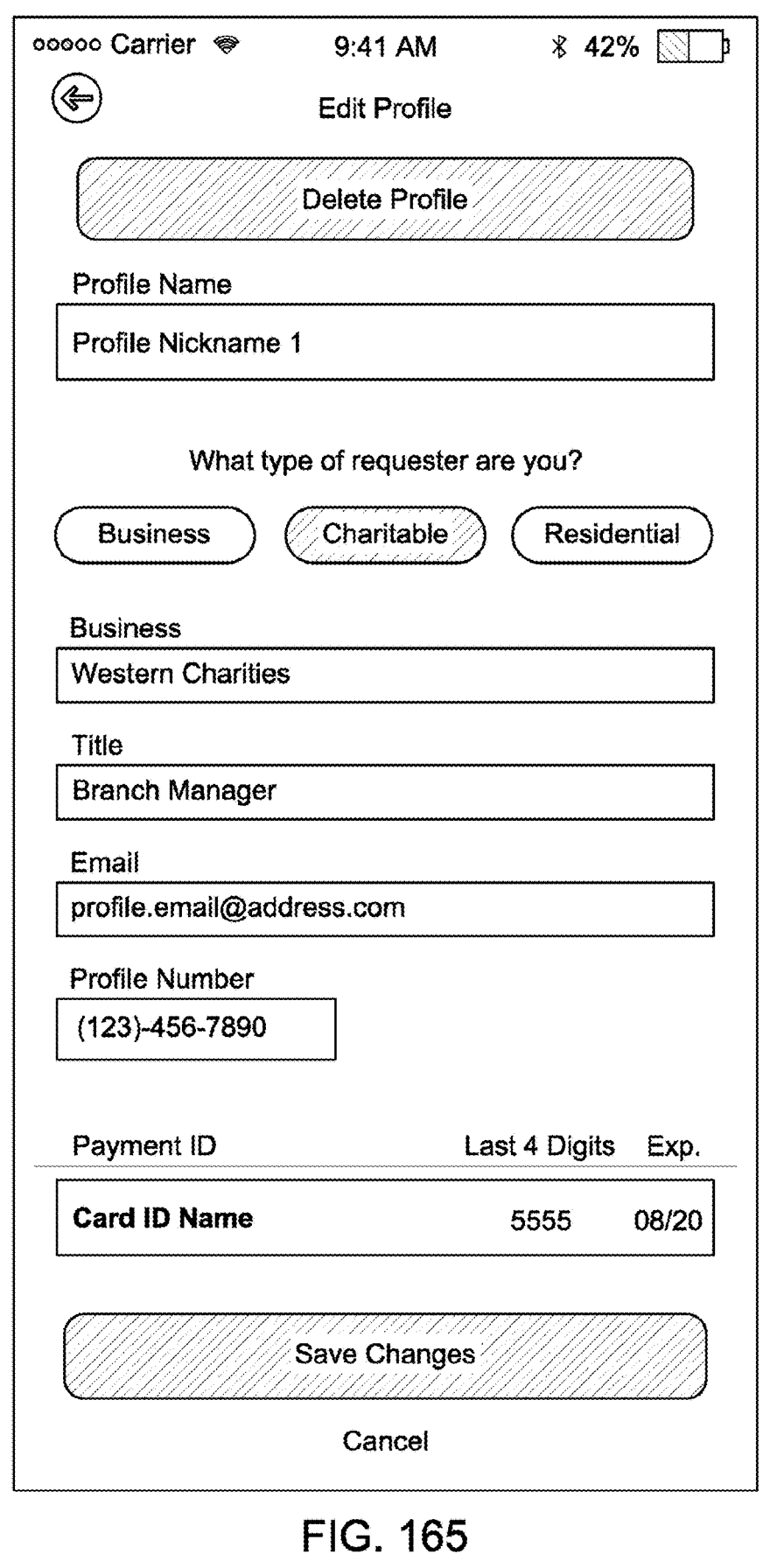

Edit Profile

Delete Profile

Profile Name

Profile Nickname 1

What type of requester are you?

Business Charitable Residential

Business

Western Charities

Title

Branch Manager

Email profile.email@address.com

Profile Number (123)-456-7890

| Payment ID | Last 4 Digits | Exp. |
|---|---|---|
| **Card ID Name** | 5555 | 08/20 |

Save Changes

Cancel

FIG. 172 ooooo Carrier 9:41 AM 42%

Figure 176:
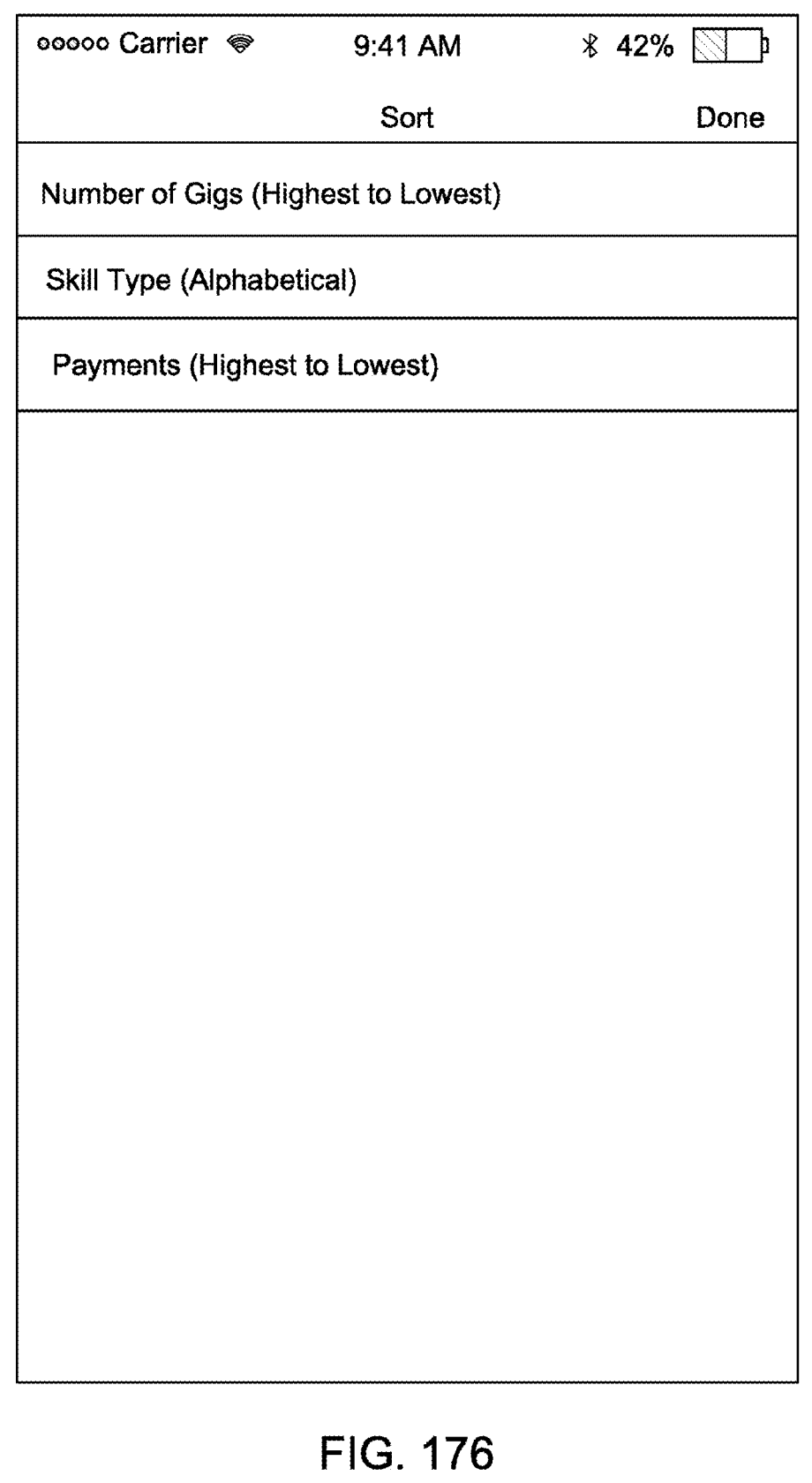

Sort Done

Number of Gigs (Highest to Lowest)

Skill Type (Alphabetical)

Payments (Highest to Lowest)

FIG. 176 ooooo Carrier 9:41 AM 42%

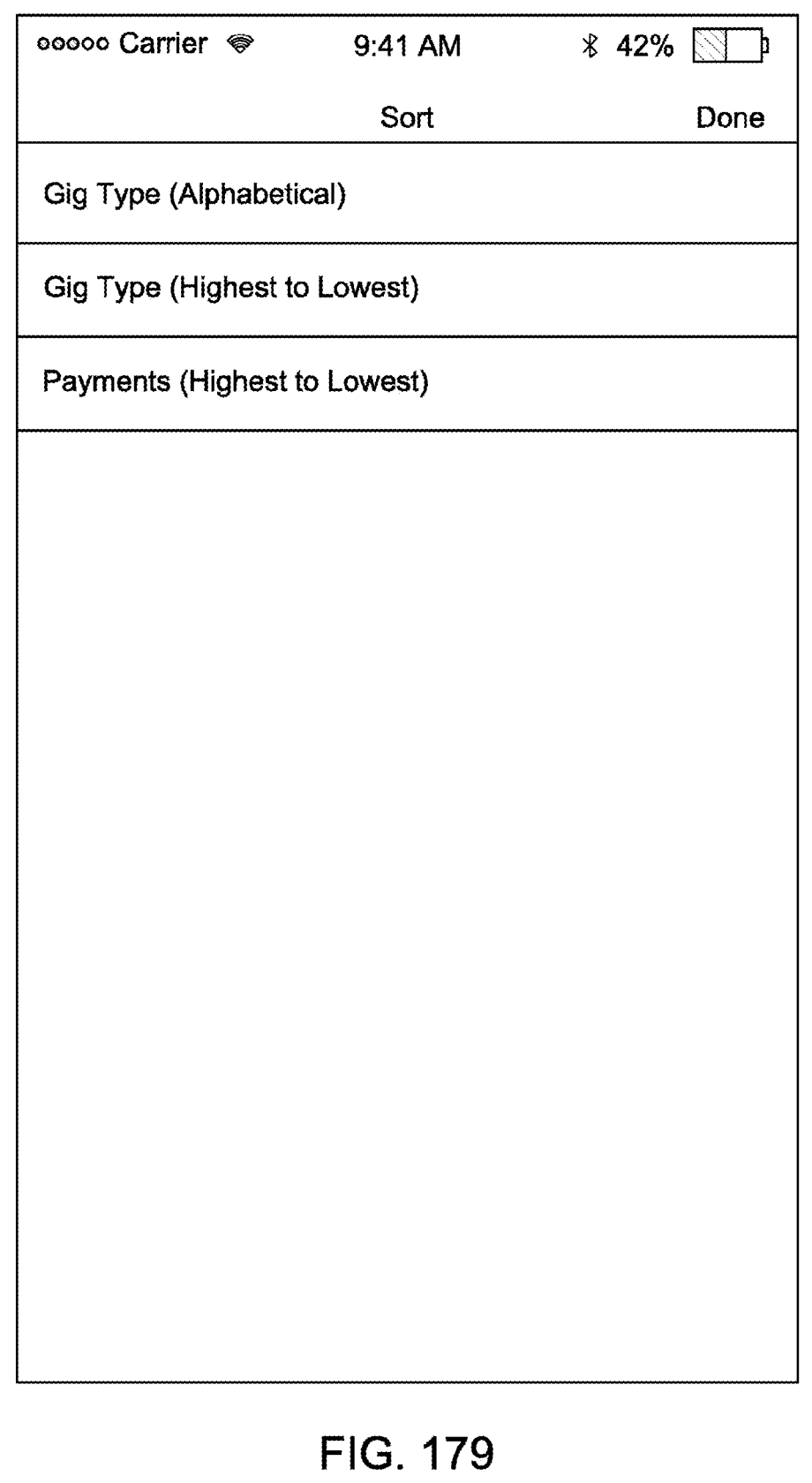

Sort Done

Gig Type (Alphabetical)

Gig Type (Highest to Lowest)

Payments (Highest to Lowest)

FIG. 179

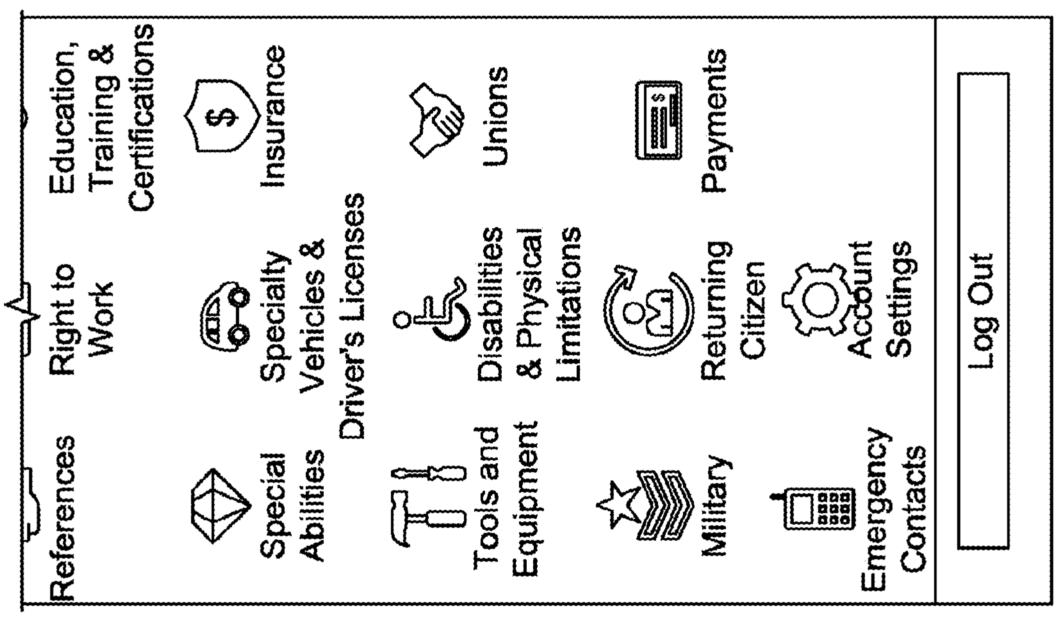
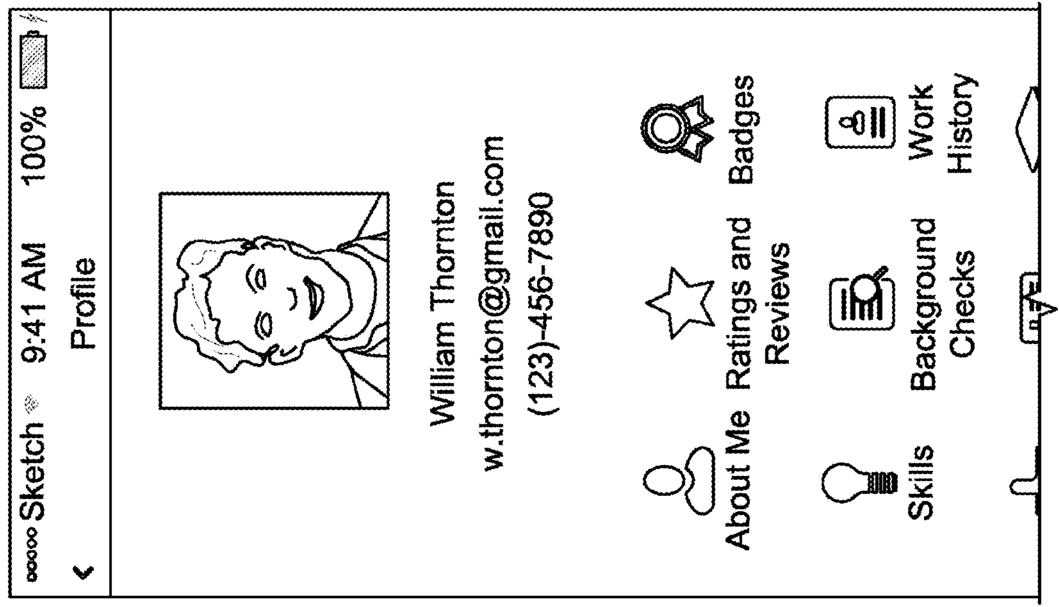
FIG. 191

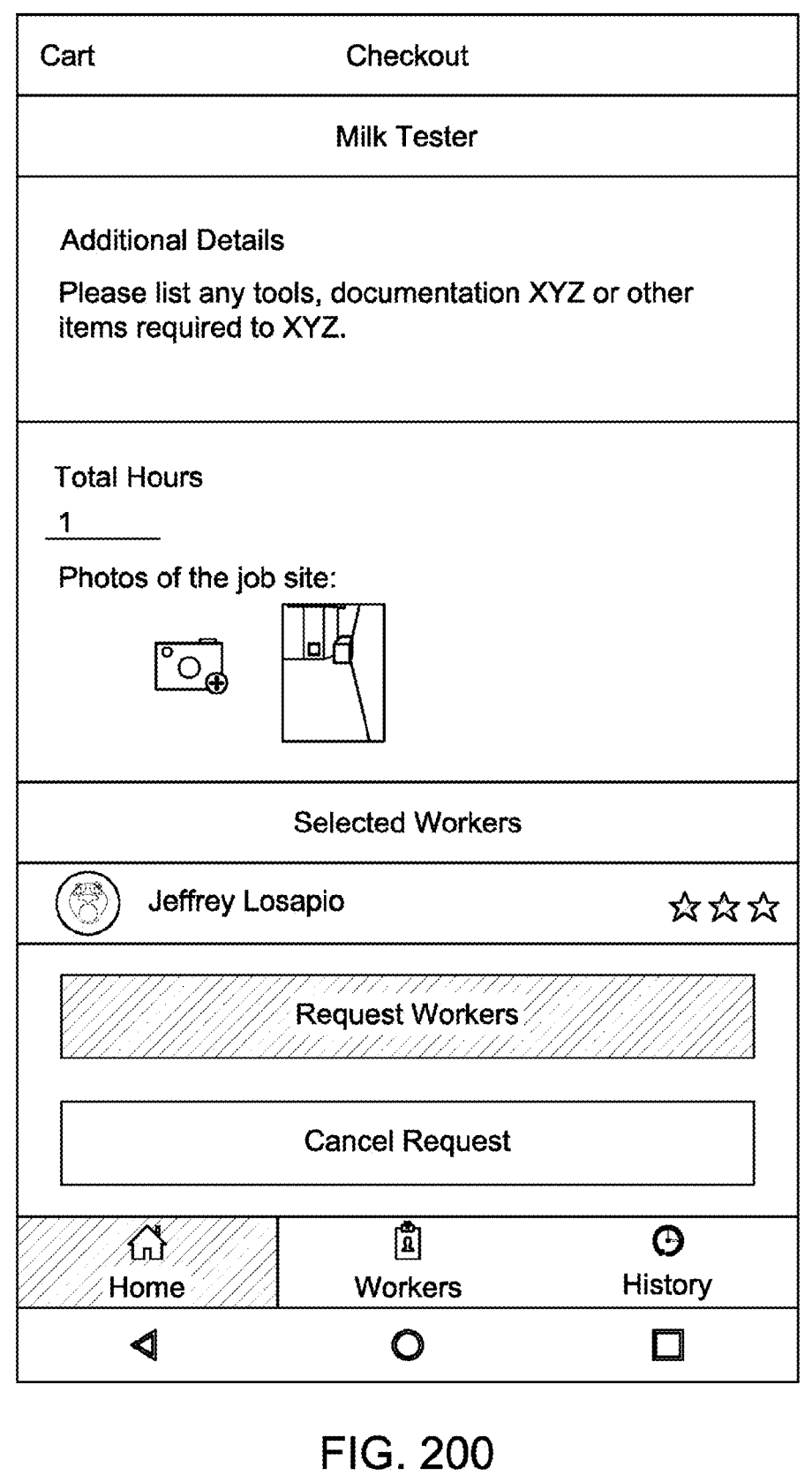

Cart
Checkout
Milk Tester
Additional Details
Please list any tools, documentation XYZ or other items required to XYZ.
Total Hours
1
Photos of the job site:
Selected Workers
Jeffrey Losapio
Request Workers
Cancel Request
Home
Workers
History

FIG. 200

Figure 201:
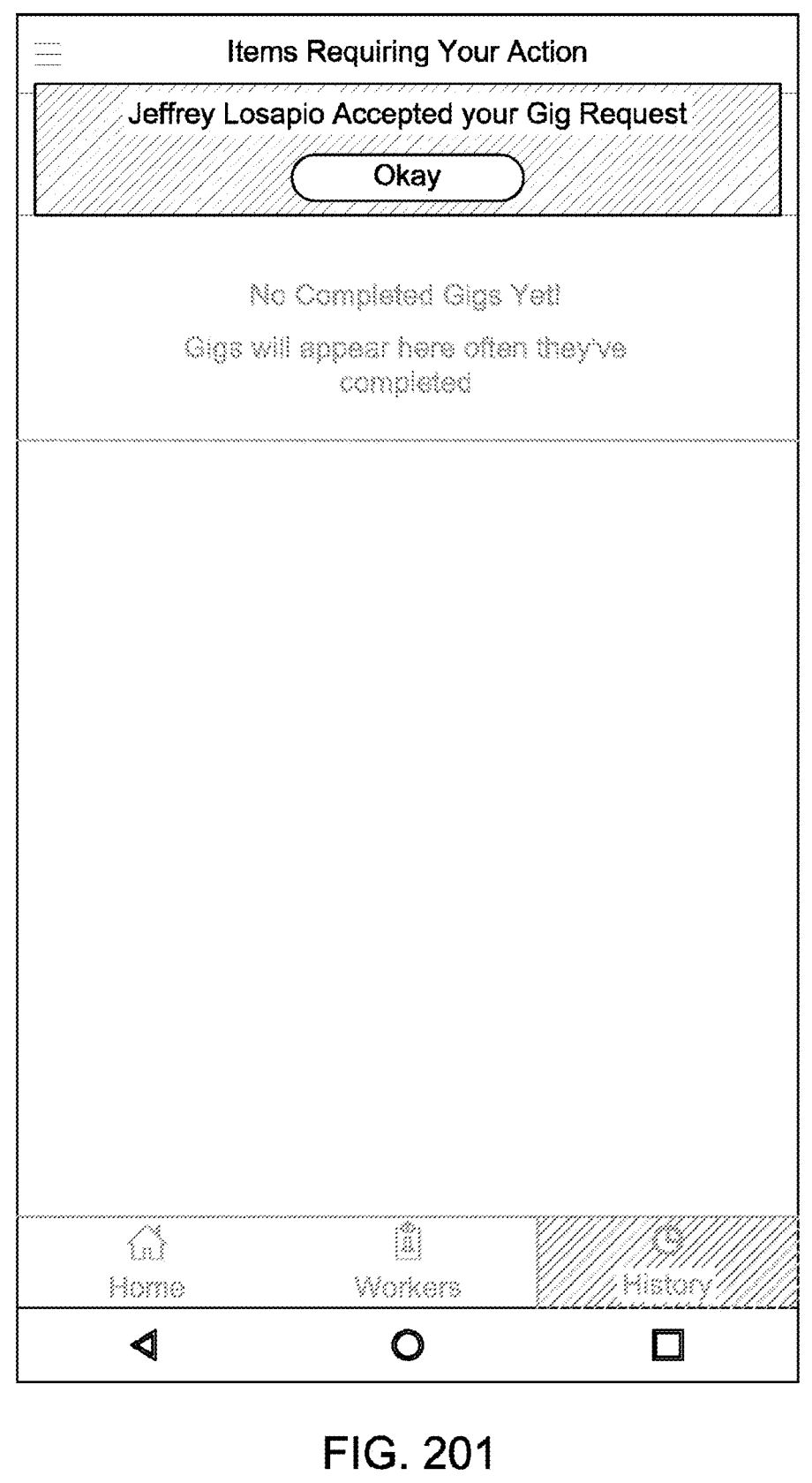

Items Requiring Your Action

Jeffrey Losapio Accepted your Gig Request

Okay

No Completed Gigs Yet!

Gigs will appear here often they've completed

Home

Workers

History

Figure 202:
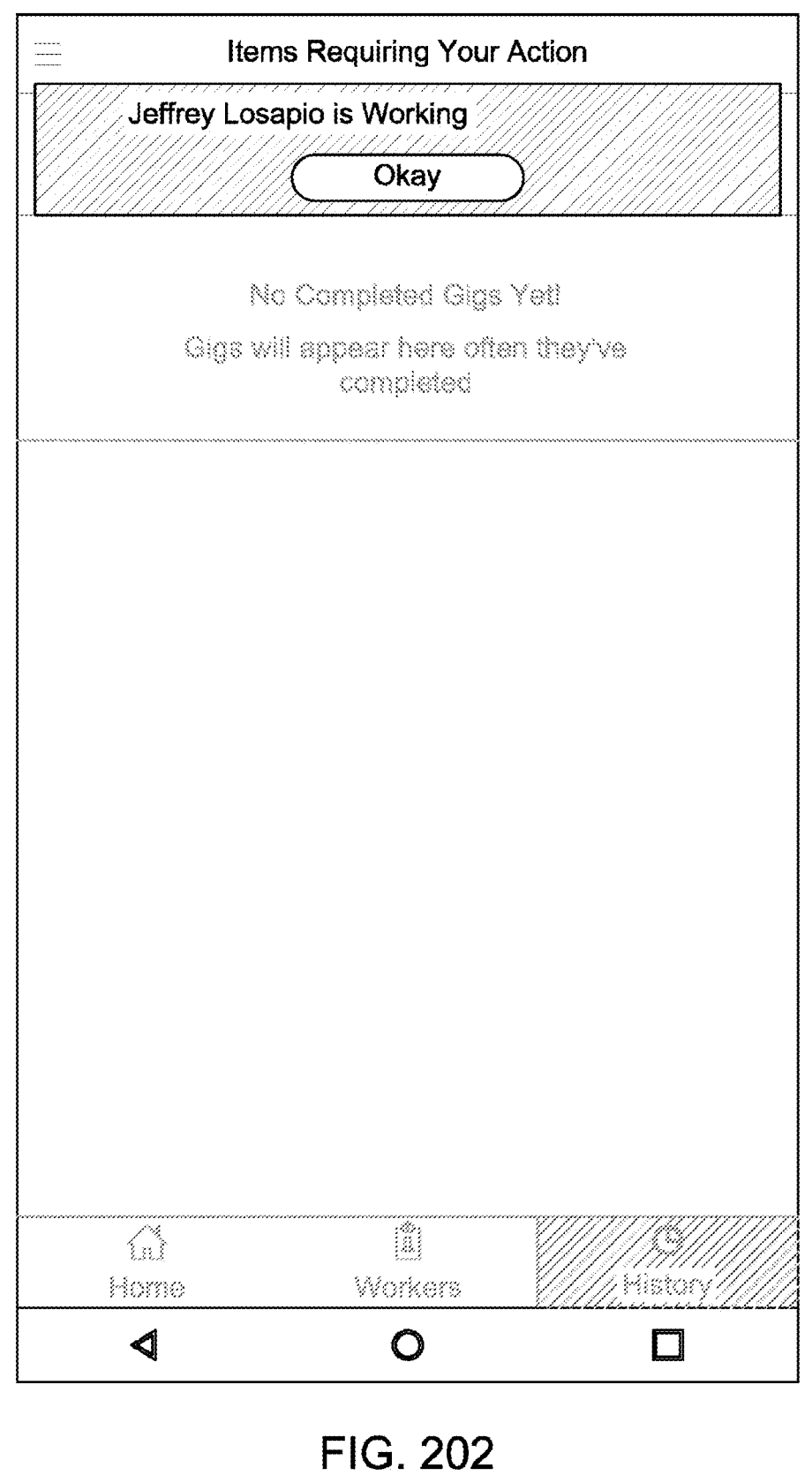

Figure 206:
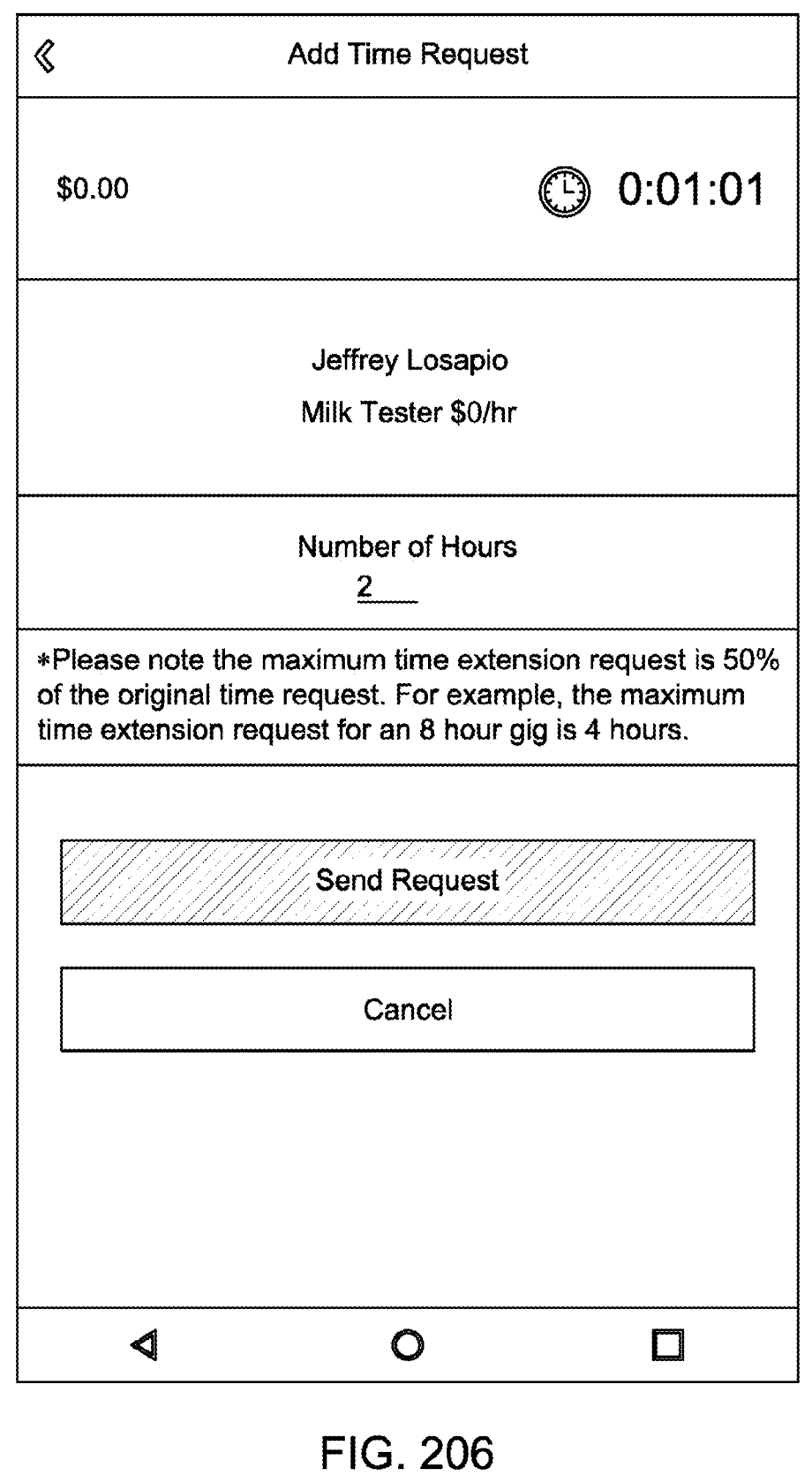

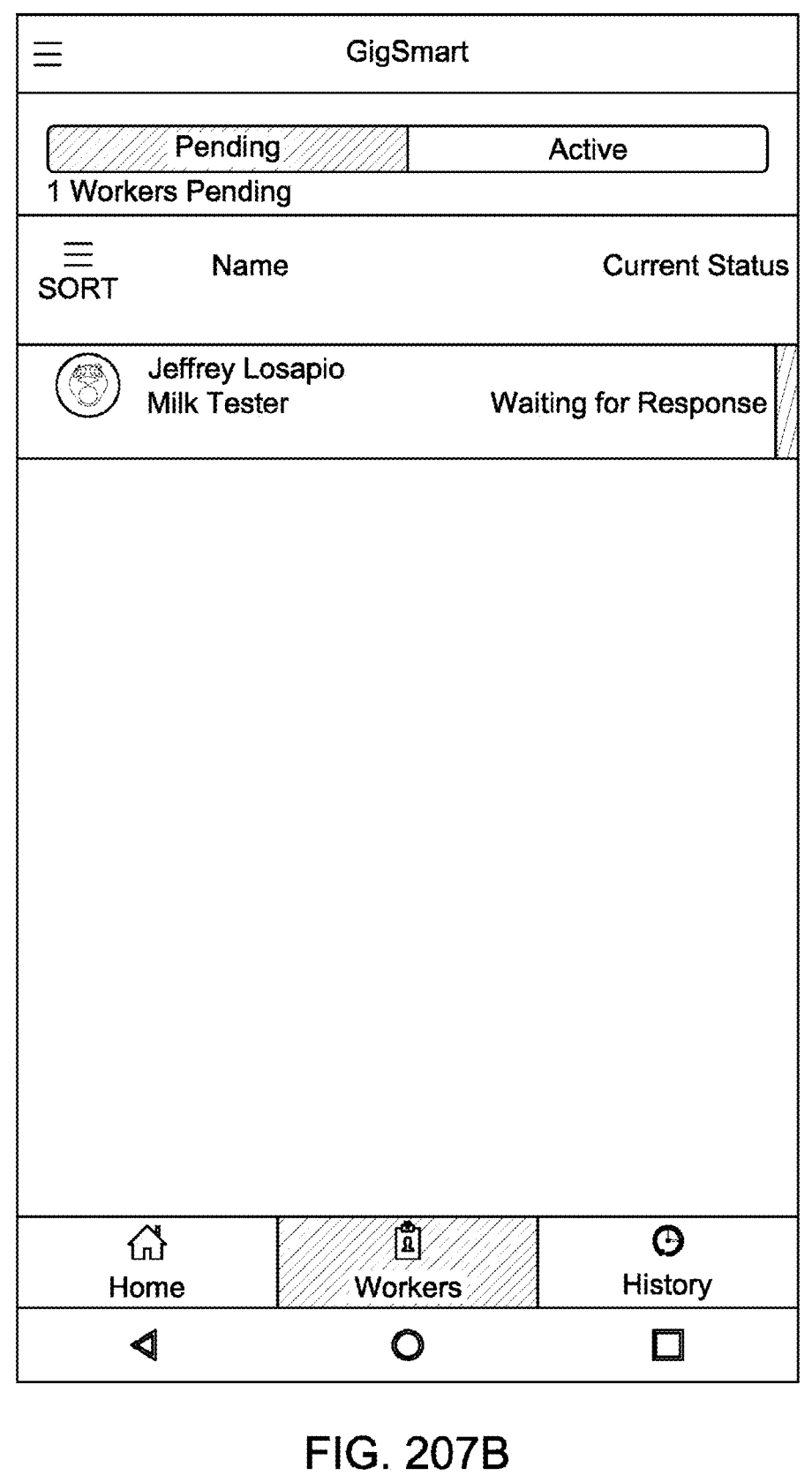

GigSmart

Pending
Active

1 Workers Pending

SORT
Name
Current Status

Jeffrey Losapio
Milk Tester
Waiting for Response

Home
Workers
History

FIG. 207B

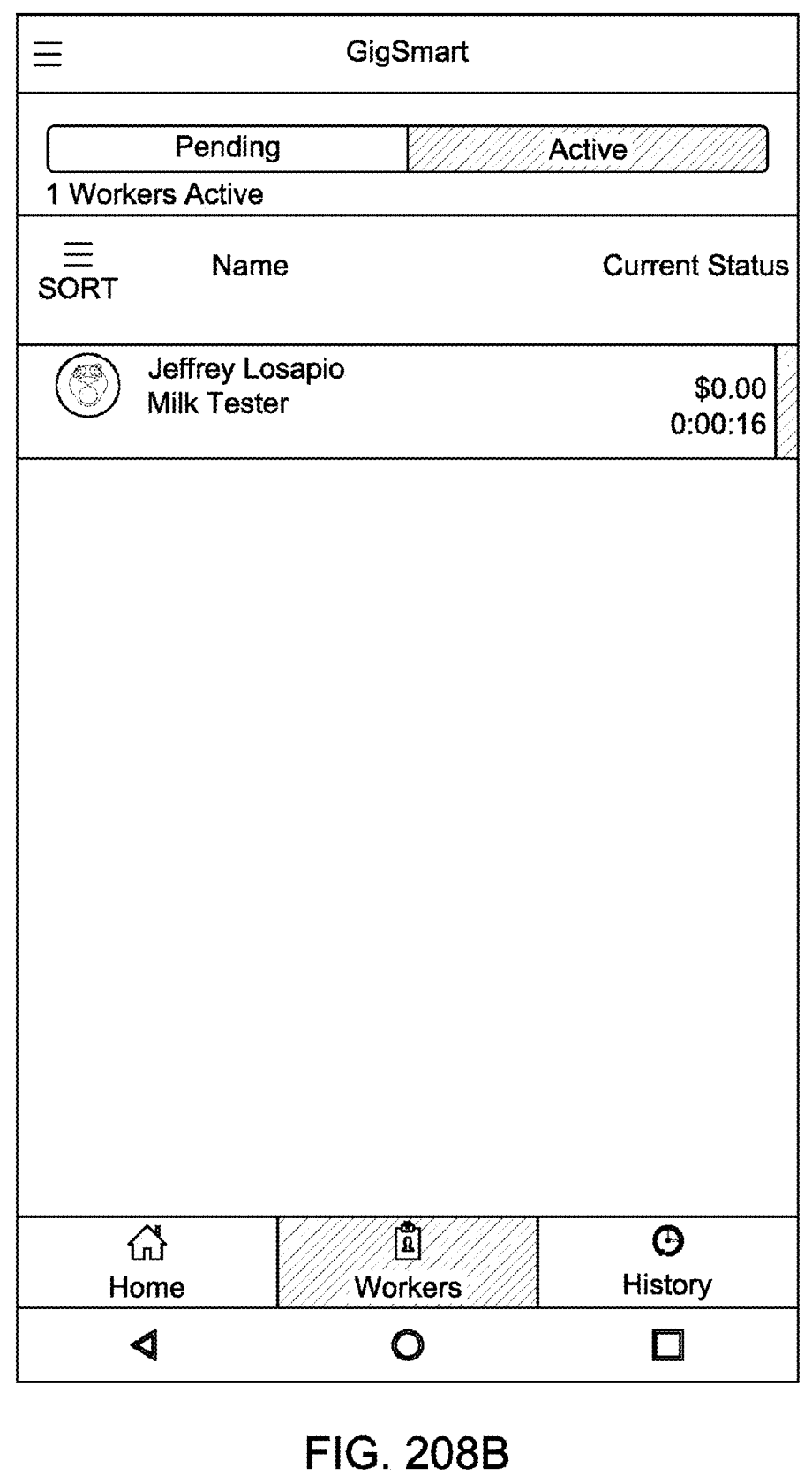

GigSmart

Pending | Active

1 Workers Active

SORT Name Current Status

Jeffrey Losapio
Milk Tester
$0.00
0:00:16

Home Workers History

FIG. 208B

Figure 209:
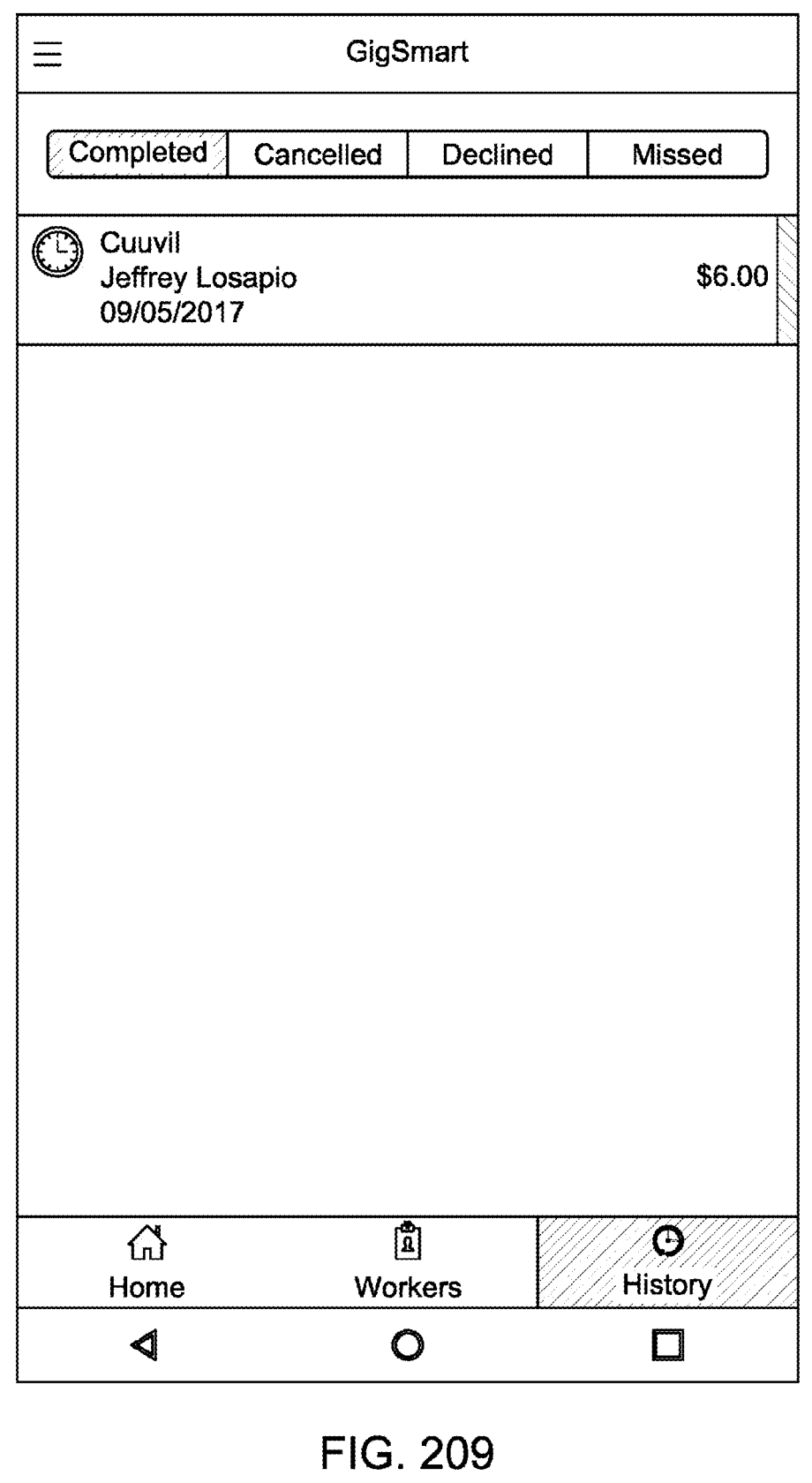

GigSmart

Completed | Cancelled | Declined | Missed

Cuuvil
Jeffrey Losapio
09/05/2017
$6.00

Home
Workers
History

Figure 210B:
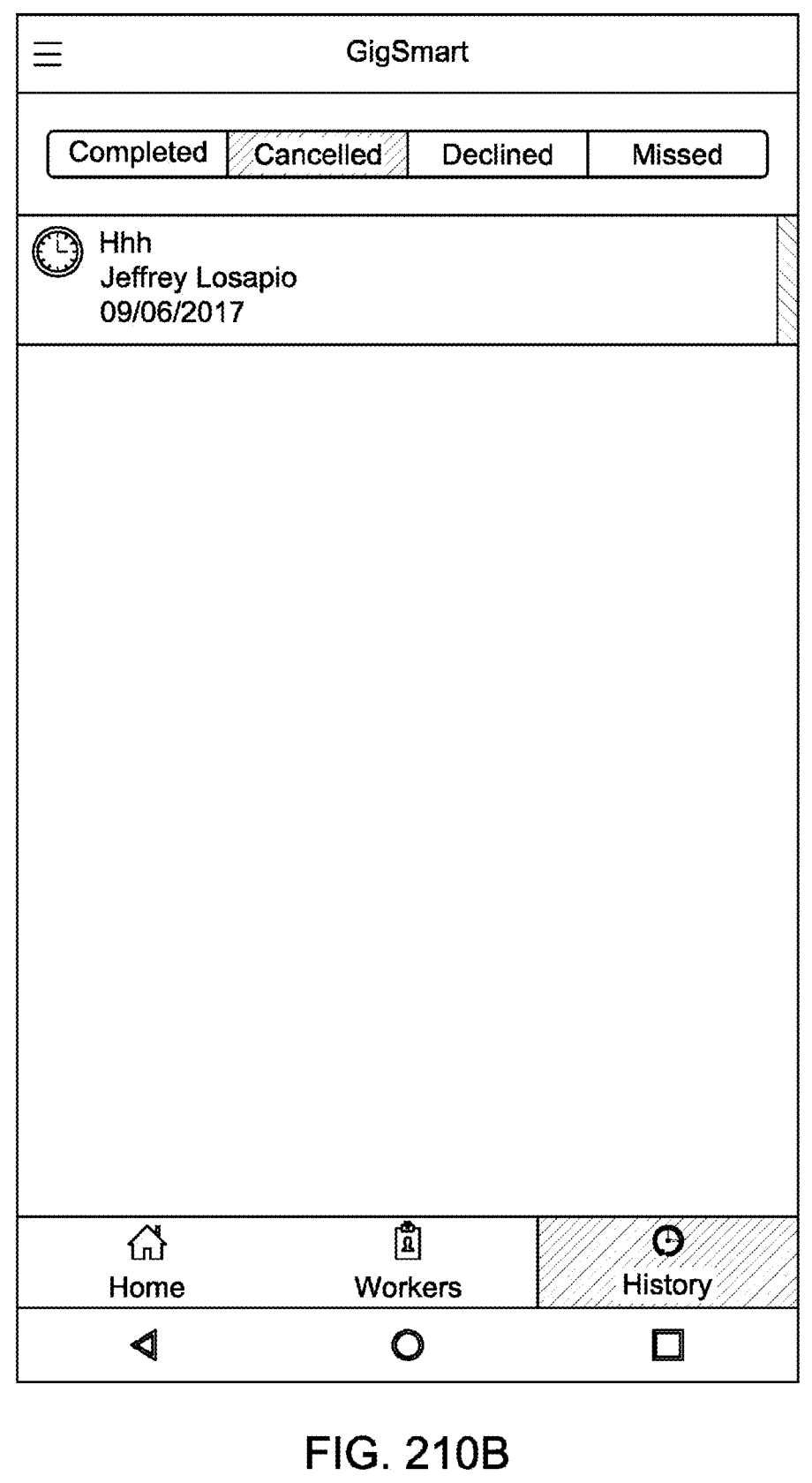

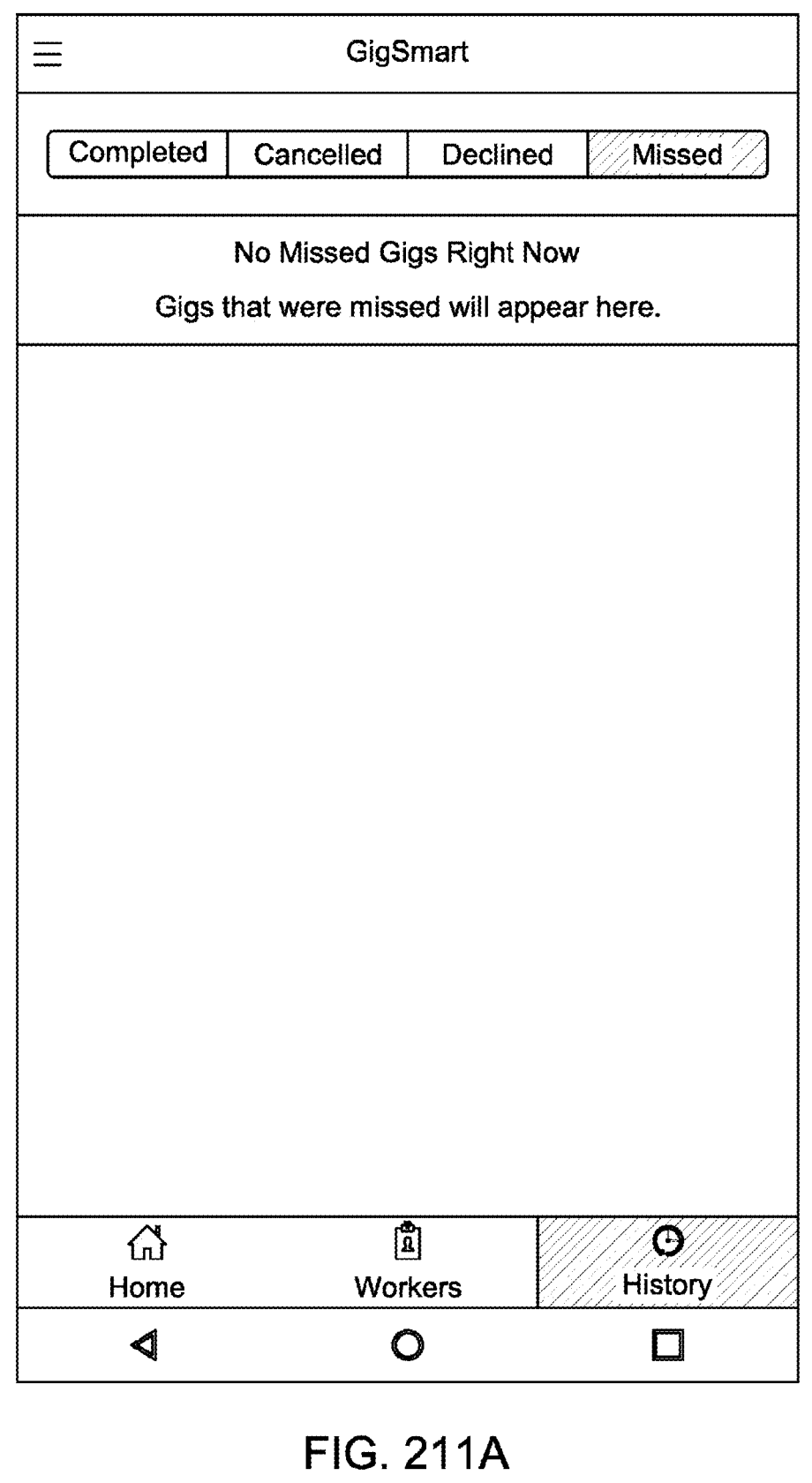

GigSmart

Completed | Cancelled | Declined | Missed

No Missed Gigs Right Now

Gigs that were missed will appear here.

Home Workers History

FIG. 211A

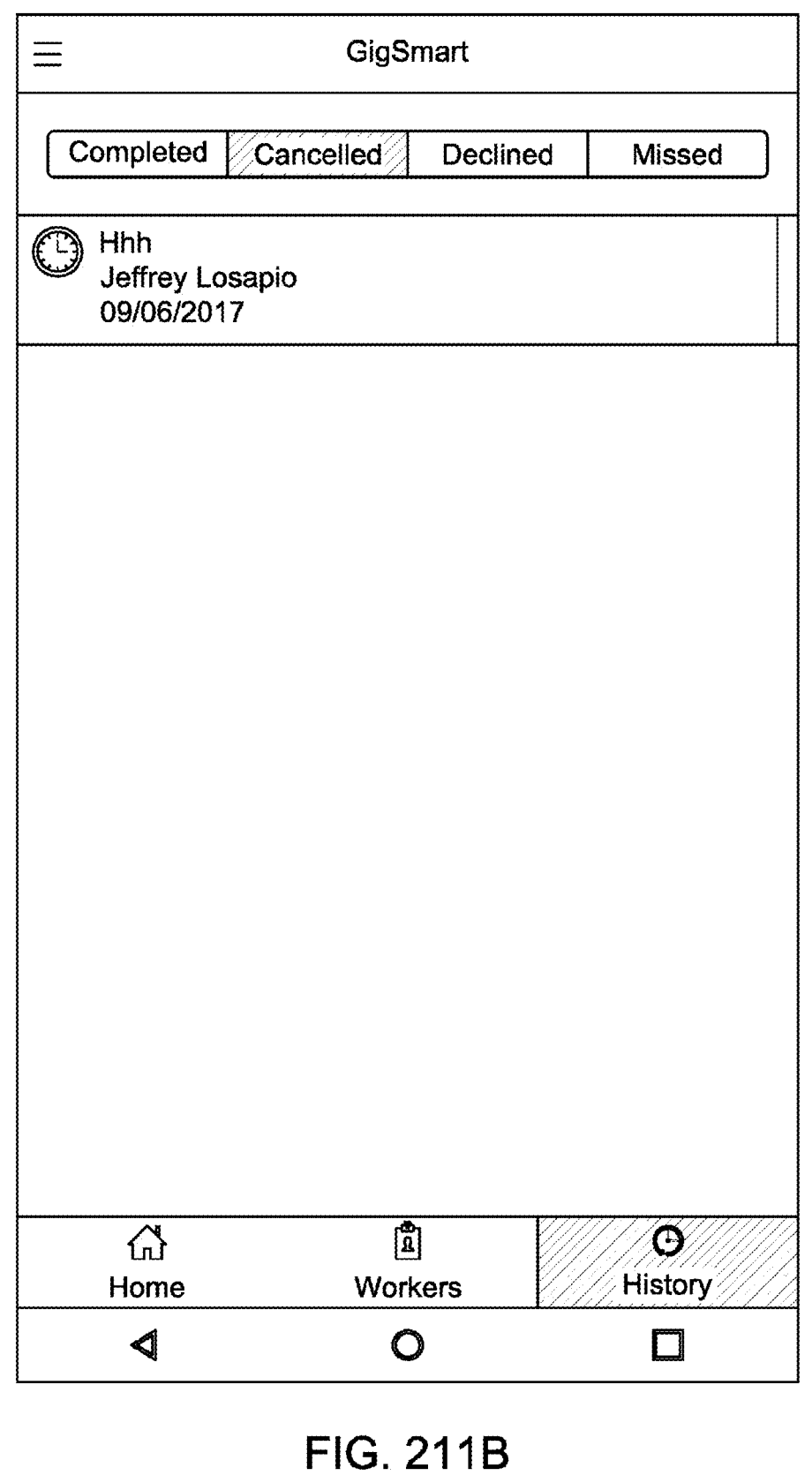

GigSmart

Completed | Cancelled | Declined | Missed

Hhh
Jeffrey Losapio
09/06/2017

Home Workers History

FIG. 211B

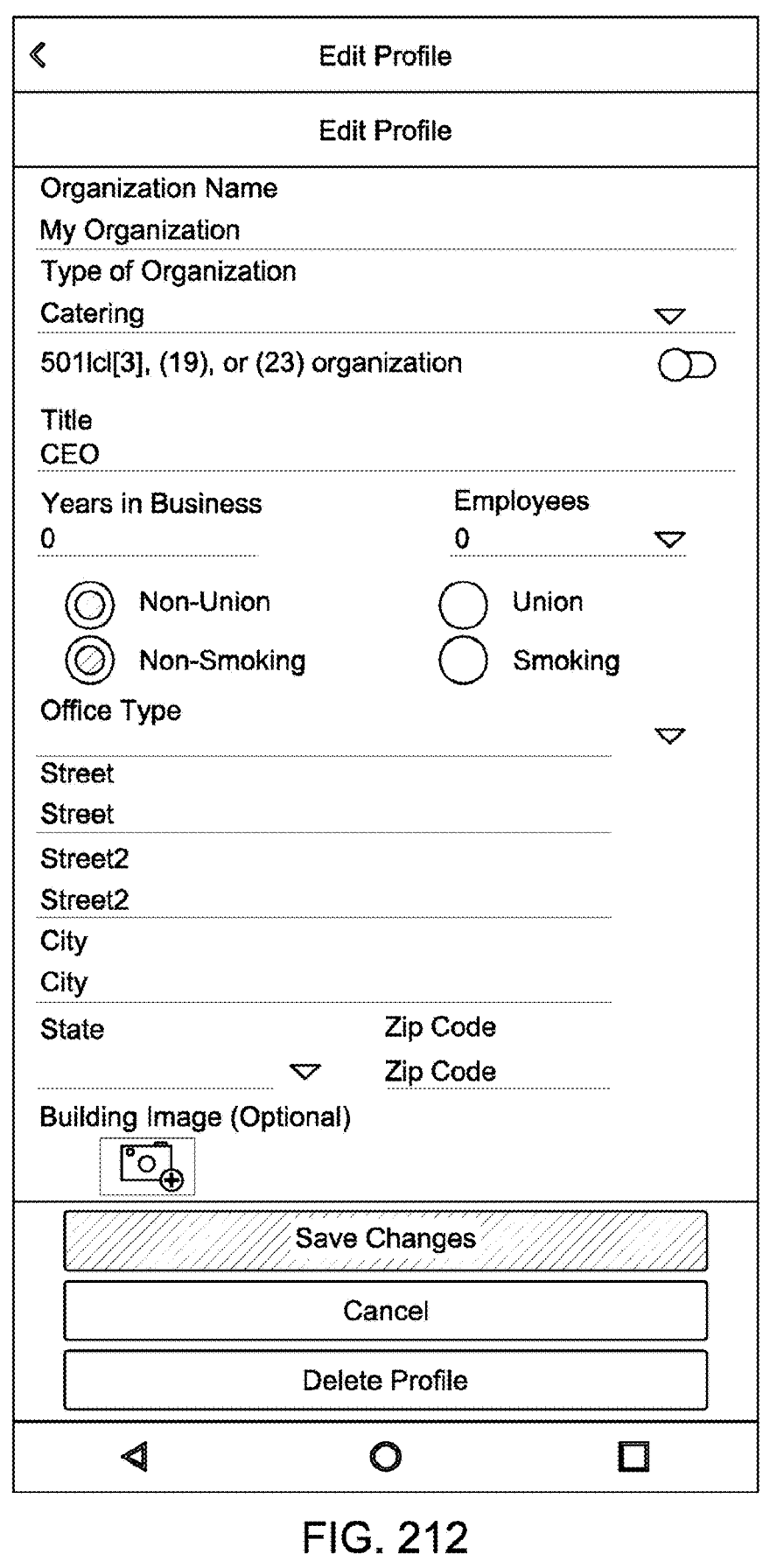

Edit Profile

Edit Profile

Organization Name
My Organization

Type of Organization
Catering

501lcl[3], (19), or (23) organization

Title
CEO

Years in Business
0

Employees
0

Non-Union

Union

Non-Smoking

Smoking

Office Type

Street
Street

Street2
Street2

City
City

State

Zip Code
Zip Code

Building Image (Optional)

Save Changes

Cancel

Delete Profile

FIG. 212

FIG. 232B ooooo Sketch 9:41 AM 100%

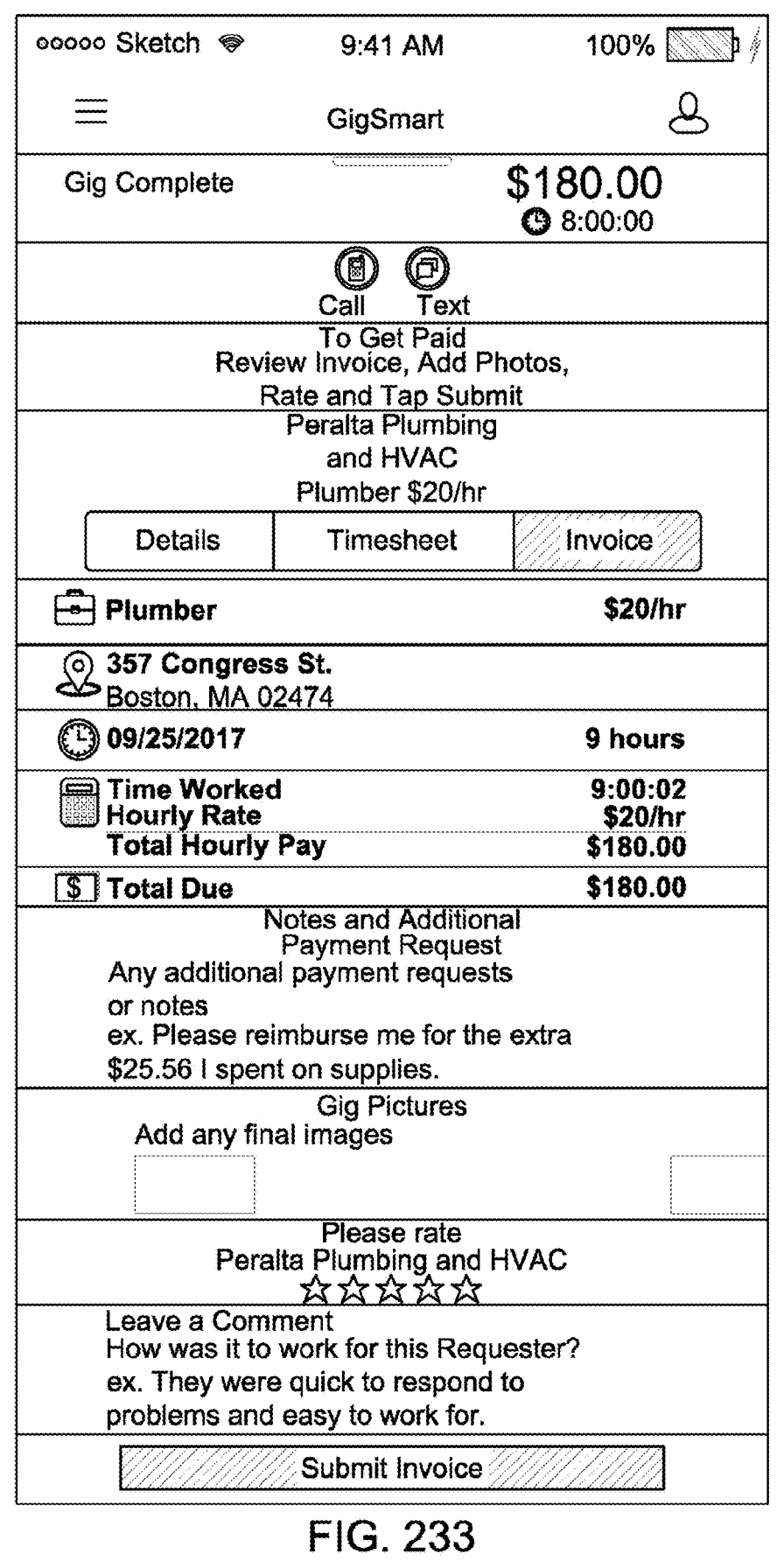

GigSmart

Gig Complete $180.00
8:00:00

Call Text

To Get Paid
Review Invoice, Add Photos,
Rate and Tap Submit

Peralta Plumbing
and HVAC
Plumber $20/hr

Details | Timesheet | Invoice

Plumber $20/hr

357 Congress St.
Boston, MA 02474

09/25/2017 9 hours

Time Worked 9:00:02
Hourly Rate $20/hr
Total Hourly Pay $180.00

Total Due $180.00

Notes and Additional
Payment Request
Any additional payment requests
or notes
ex. Please reimburse me for the extra
$25.56 I spent on supplies.

Gig Pictures
Add any final images

Please rate
Peralta Plumbing and HVAC
☆☆☆☆☆

Leave a Comment
How was it to work for this Requester?
ex. They were quick to respond to
problems and easy to work for.

Submit Invoice

FIG. 233

FIG. 234A ooooo Sketch 9:41 AM 100%

Figure 234B:
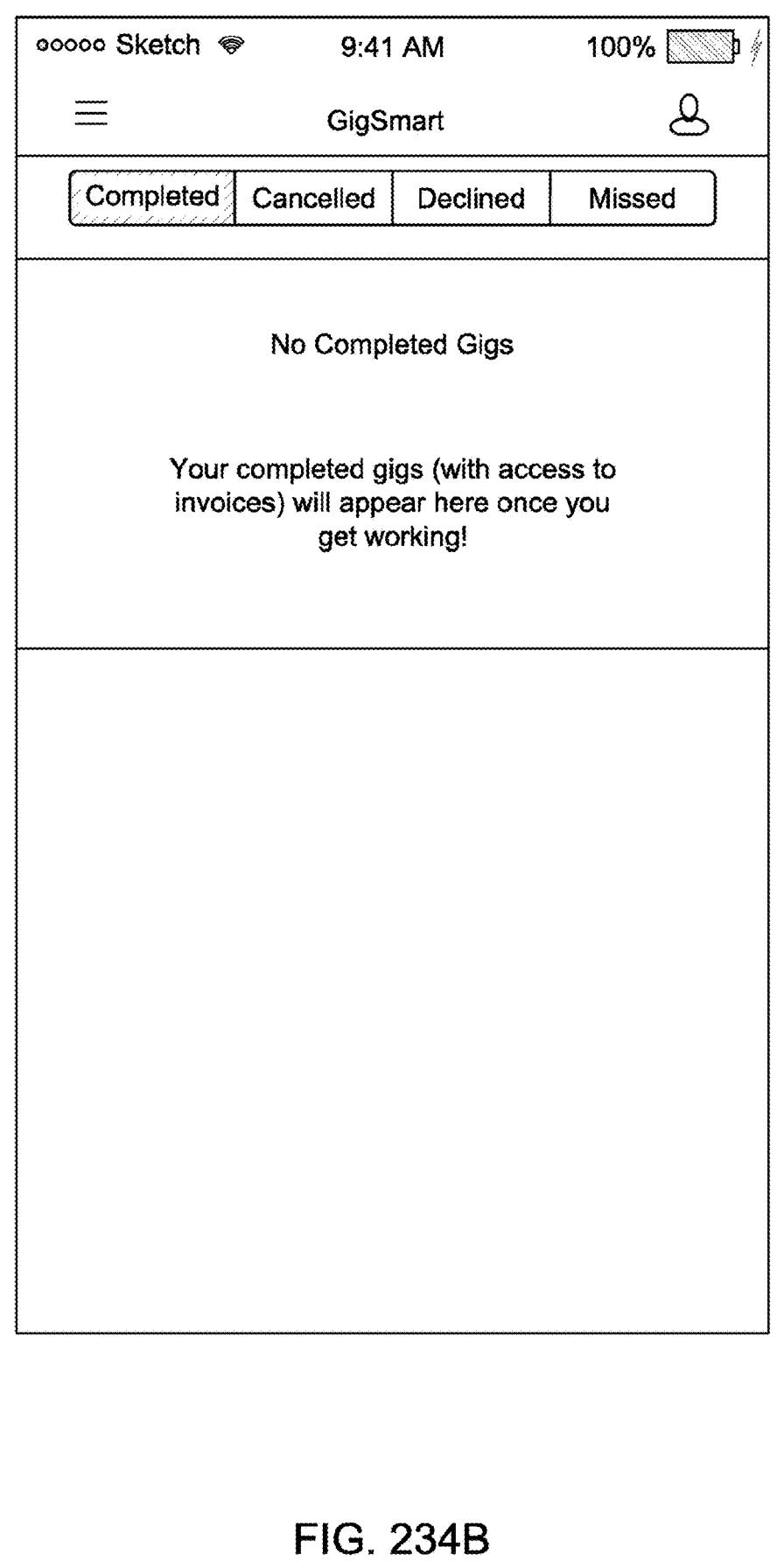

GigSmart

Completed | Cancelled | Declined | Missed

No Completed Gigs

Your completed gigs (with access to invoices) will appear here once you get working!

FIG. 234B ooooo Sketch 9:41 AM 100%

Figure 235:
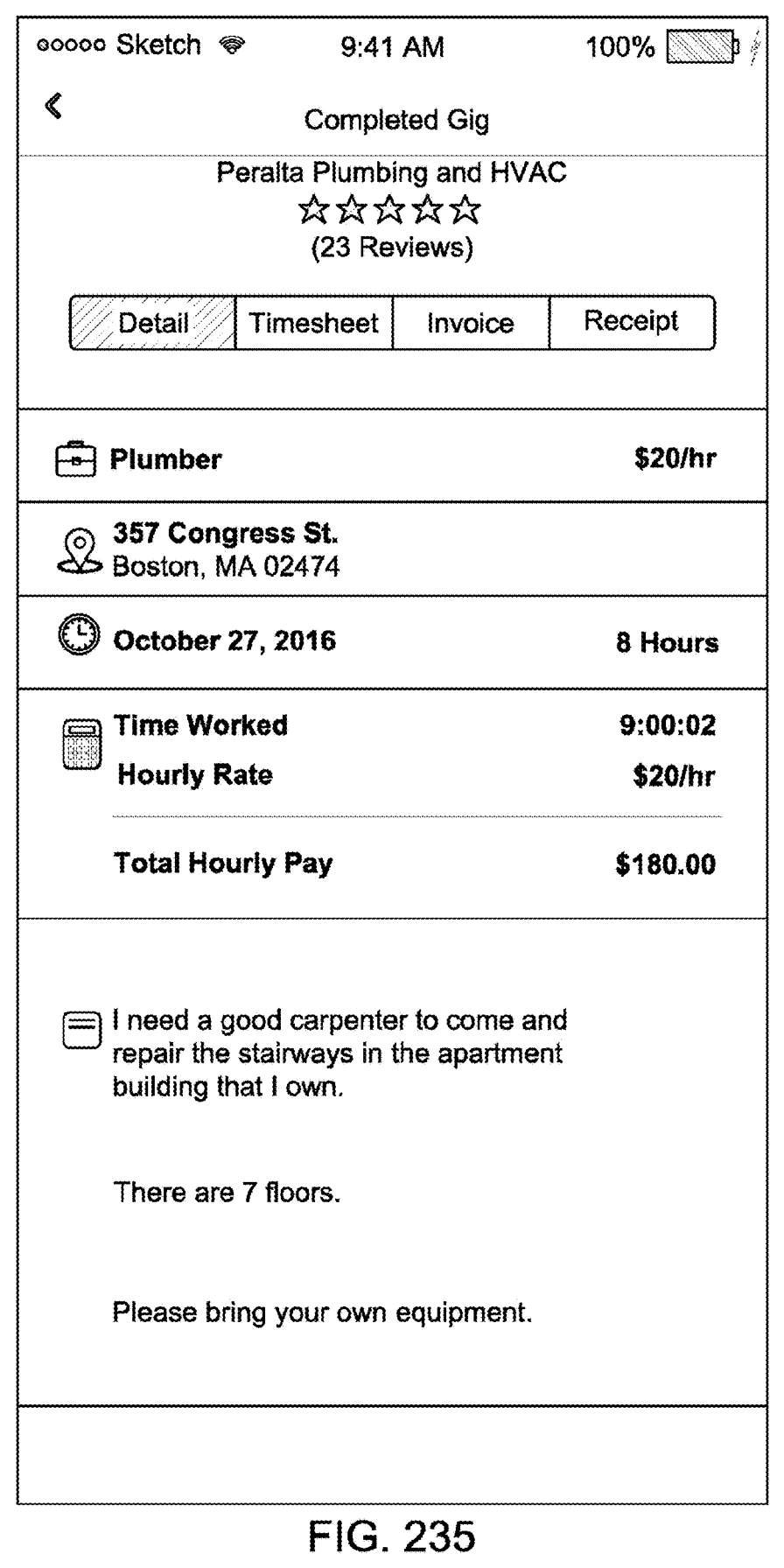

Completed Gig

Peralta Plumbing and HVAC

☆☆☆☆☆

(23 Reviews)

Detail | Timesheet | Invoice | Receipt

Plumber $20/hr

357 Congress St.
Boston, MA 02474

October 27, 2016 8 Hours

Time Worked 9:00:02

Hourly Rate $20/hr

Total Hourly Pay $180.00

I need a good carpenter to come and repair the stairways in the apartment building that I own.

There are 7 floors.

Please bring your own equipment.

FIG. 235 ooooo Sketch 9:41 AM 100%

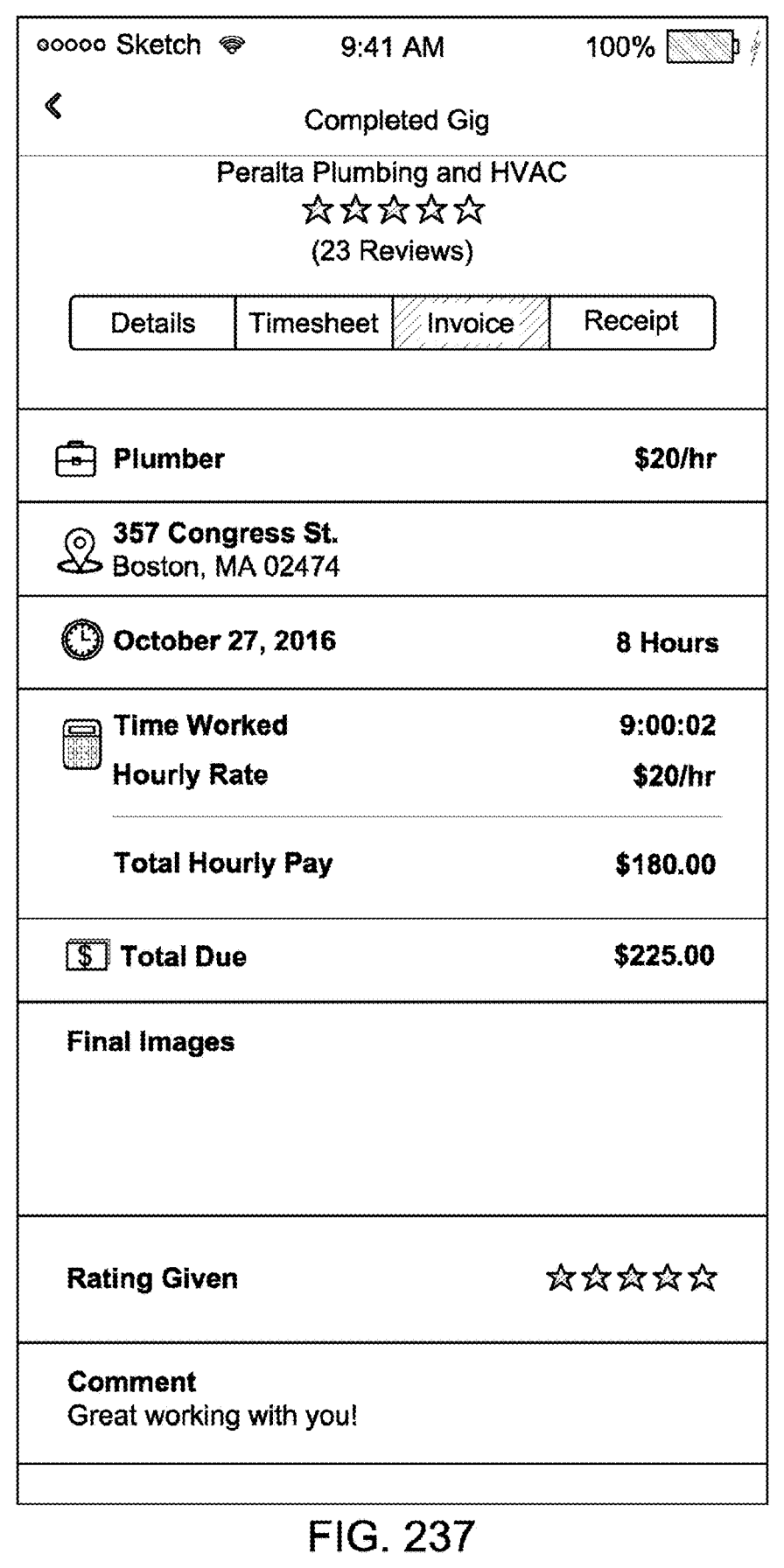

Completed Gig

Peralta Plumbing and HVAC

☆☆☆☆☆

(23 Reviews)

Details | Timesheet | Invoice | Receipt

Plumber $20/hr

357 Congress St.
Boston, MA 02474

October 27, 2016 8 Hours

Time Worked 9:00:02

Hourly Rate $20/hr

Total Hourly Pay $180.00

Total Due $225.00

Final Images

Rating Given ☆☆☆☆☆

Comment
Great working with you!

FIG. 237

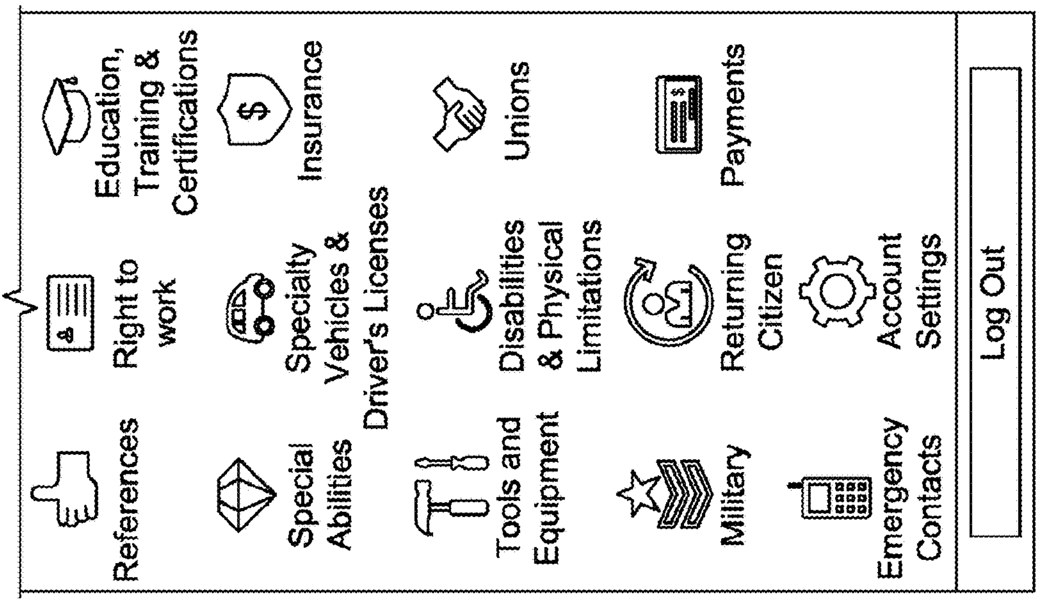
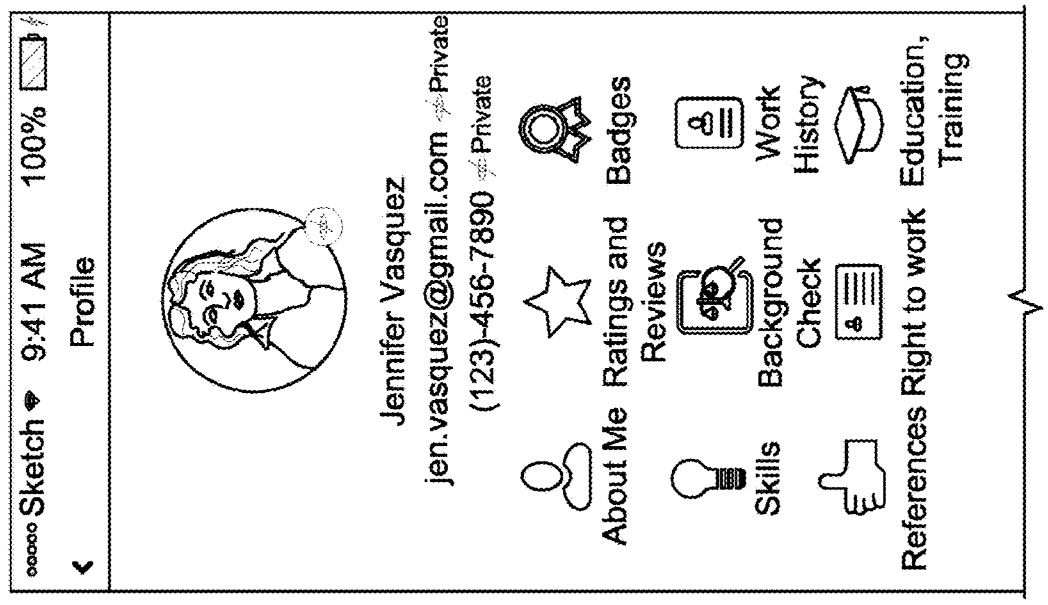
FIG. 239 ooooo Sketch 9:41 AM 100%

Figure 241B:
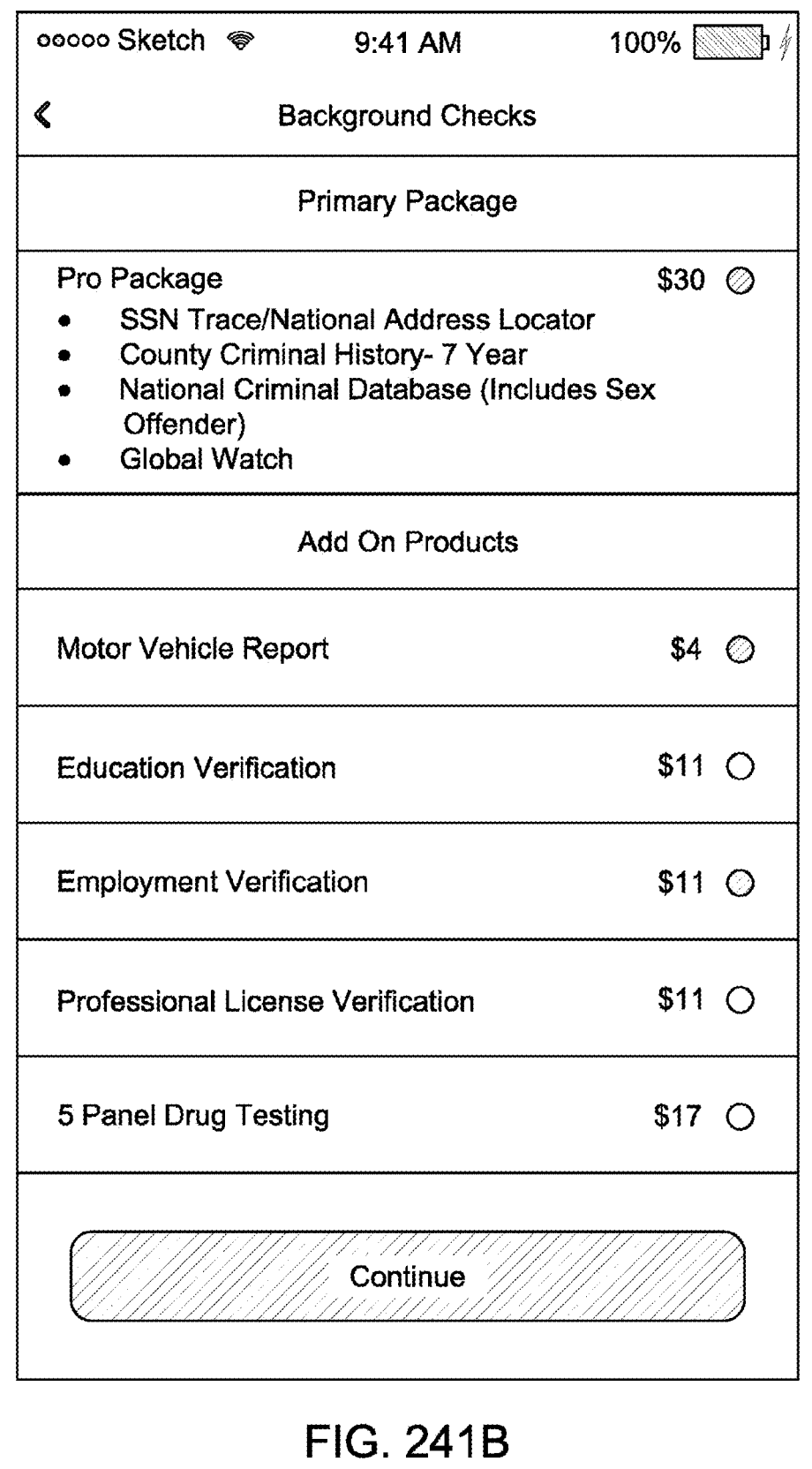

Background Checks

Primary Package

Pro Package $30

- SSN Trace/National Address Locator
- County Criminal History- 7 Year
- National Criminal Database (Includes Sex Offender)
- Global Watch Add On Products Motor Vehicle Report $4

Education Verification $11

Employment Verification $11

Professional License Verification $11

5 Panel Drug Testing $17

FIG. 241C ooooo Sketch 9:41 AM 100%

Background Checks

Account Information

This Information will be used to set up an account with Accurate Background and will not be stored by GigSmart.

William

Last Name
Thornton

Email
w.thornton@gmail.com

Confirm Email
Email Address

City
City

State
Select State

Continue

FIG. 241D ooooo Sketch 9:41 AM 100%

Figure 243:
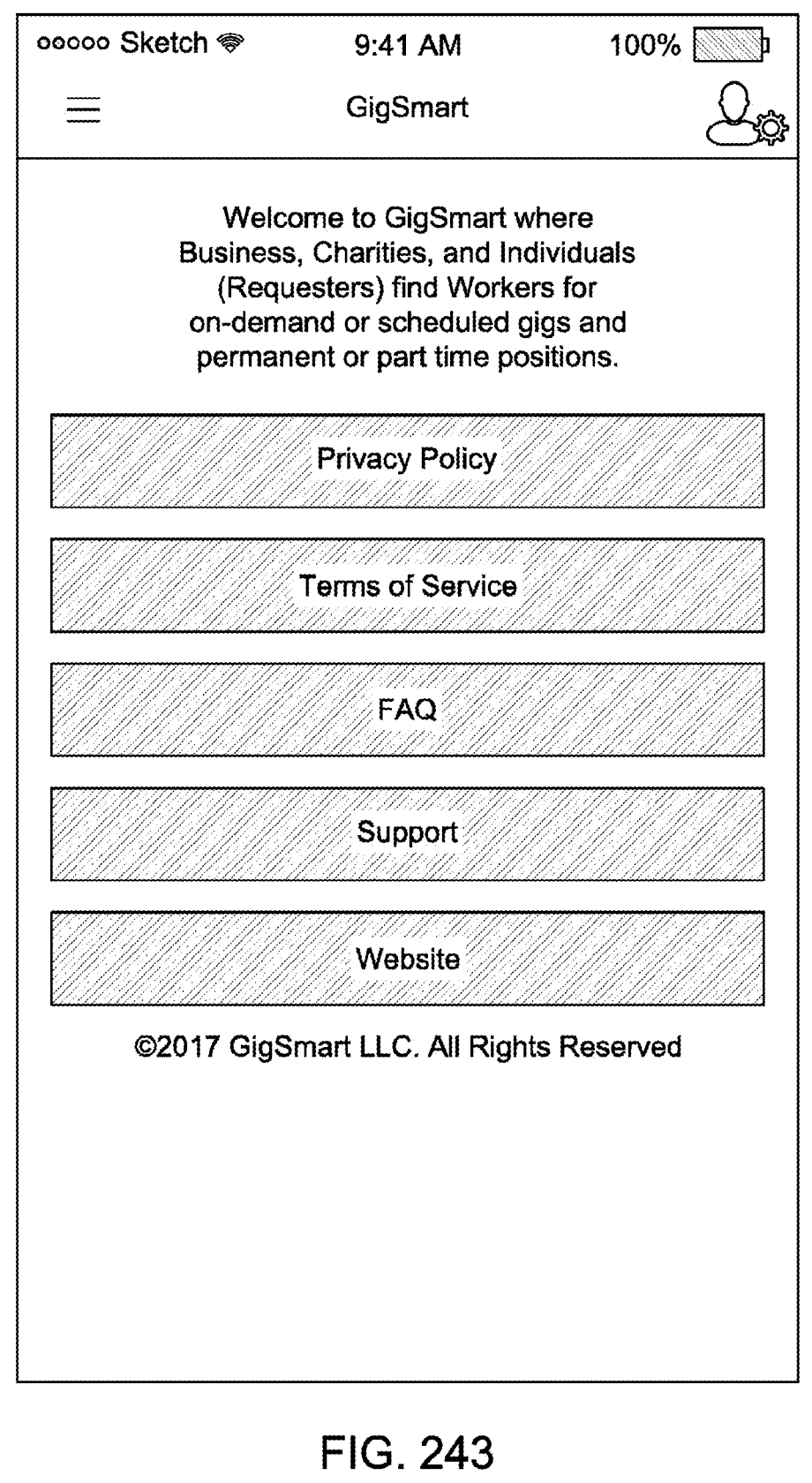

GigSmart

Welcome to GigSmart where Business, Charities, and Individuals (Requesters) find Workers for on-demand or scheduled gigs and permanent or part time positions.

Privacy Policy

Terms of Service

FAQ

Support

Website

©2017 GigSmart LLC. All Rights Reserved

FIG. 243 ooooo Sketch 9:41 AM 100%

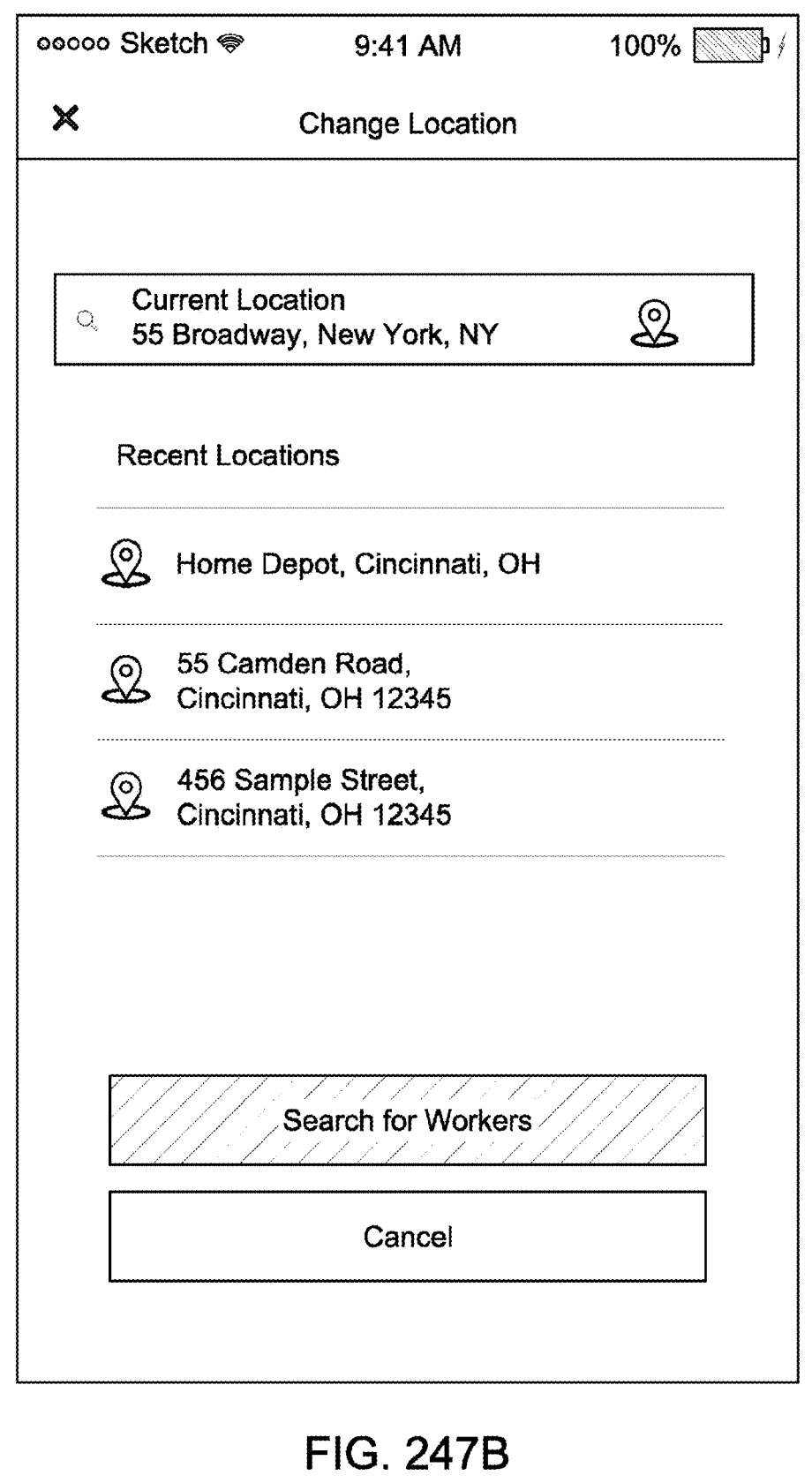

Change Location

Current Location
55 Broadway, New York, NY

Recent Locations

Home Depot, Cincinnati, OH

55 Camden Road,
Cincinnati, OH 12345

456 Sample Street,
Cincinnati, OH 12345

Search for Workers

Cancel

FIG. 247B

FIG. 248B ooooo RocketFarm 9:41 AM 100%

Figure 256B:
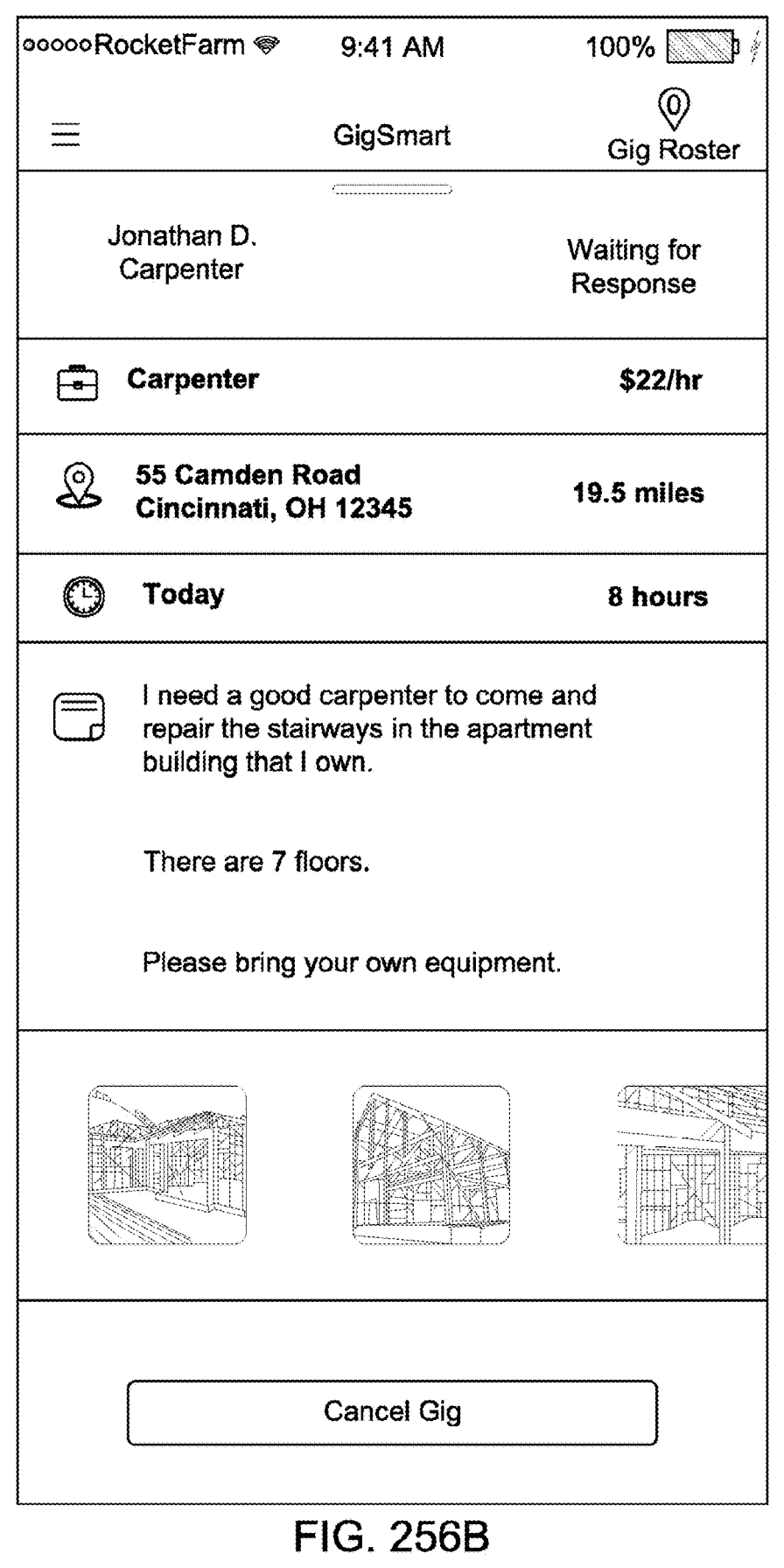

GigSmart

0
Gig Roster

Jonathan D.
Carpenter

Waiting for Response

Carpenter $22/hr

55 Camden Road
Cincinnati, OH 12345 19.5 miles

Today 8 hours

I need a good carpenter to come and repair the stairways in the apartment building that I own.

There are 7 floors.

Please bring your own equipment.

Cancel Gig

FIG. 256B ooooo RocketFarm 9:41 AM 100%

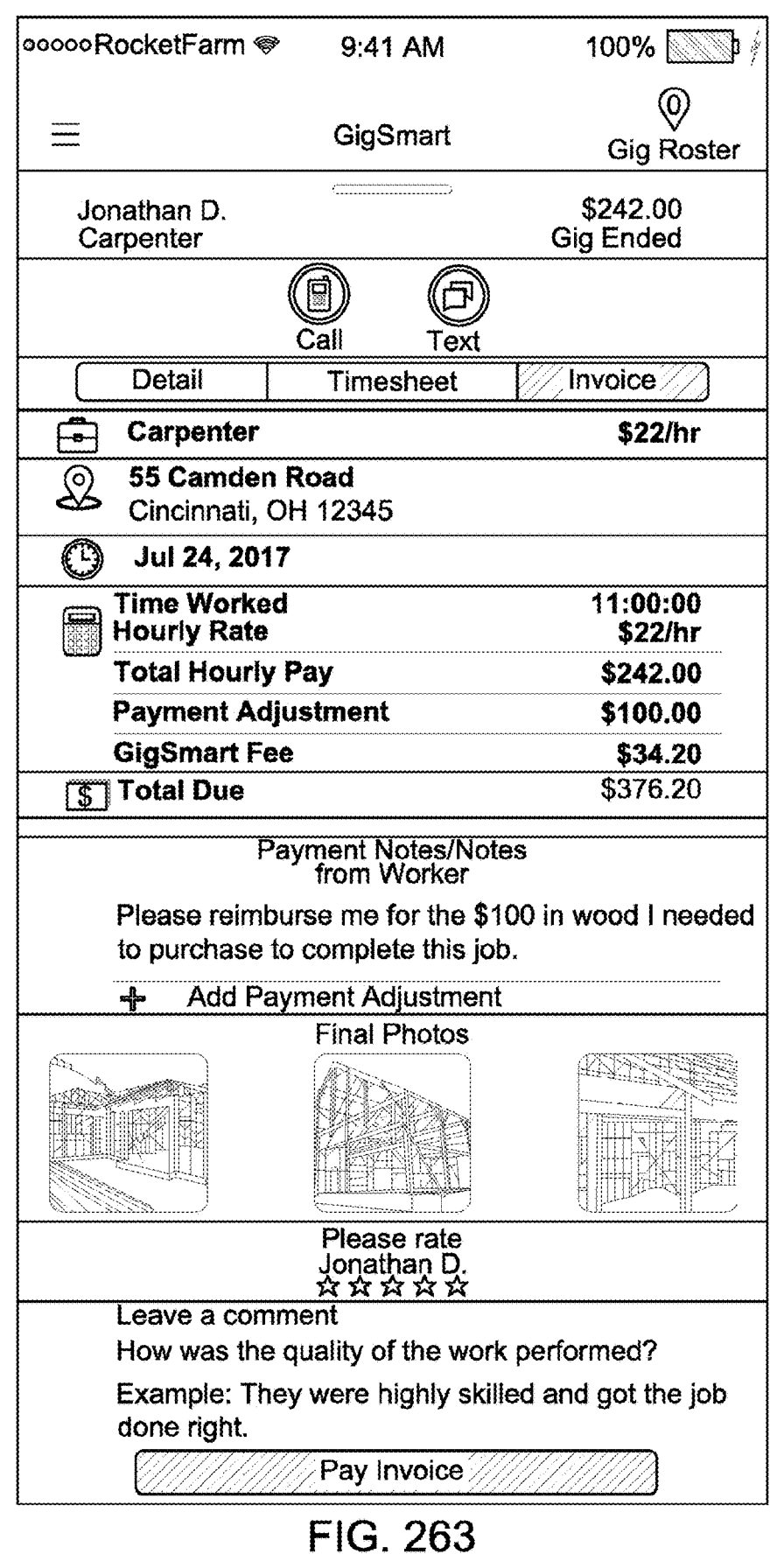

GigSmart

Gig Roster

Jonathan D.
Carpenter $242.00
Gig Ended

Call

Text

Detail | Timesheet | Invoice

Carpenter $22/hr

55 Camden Road
Cincinnati, OH 12345

Jul 24, 2017

| | |
|---|---|
| **Time Worked** | **11:00:00** |
| **Hourly Rate** | **$22/hr** |
| **Total Hourly Pay** | **$242.00** |
| **Payment Adjustment** | **$100.00** |
| **GigSmart Fee** | **$34.20** |
| **Total Due** | $376.20 |

Payment Notes/Notes from Worker

Please reimburse me for the $100 in wood I needed to purchase to complete this job.

+ Add Payment Adjustment

Final Photos

Please rate Jonathan D.

☆☆☆☆☆

Leave a comment

How was the quality of the work performed?

Example: They were highly skilled and got the job done right.

Pay Invoice

FIG. 263

FIG. 264 ooooo RocketFarm 9:41 AM 100%

Figure 266B:
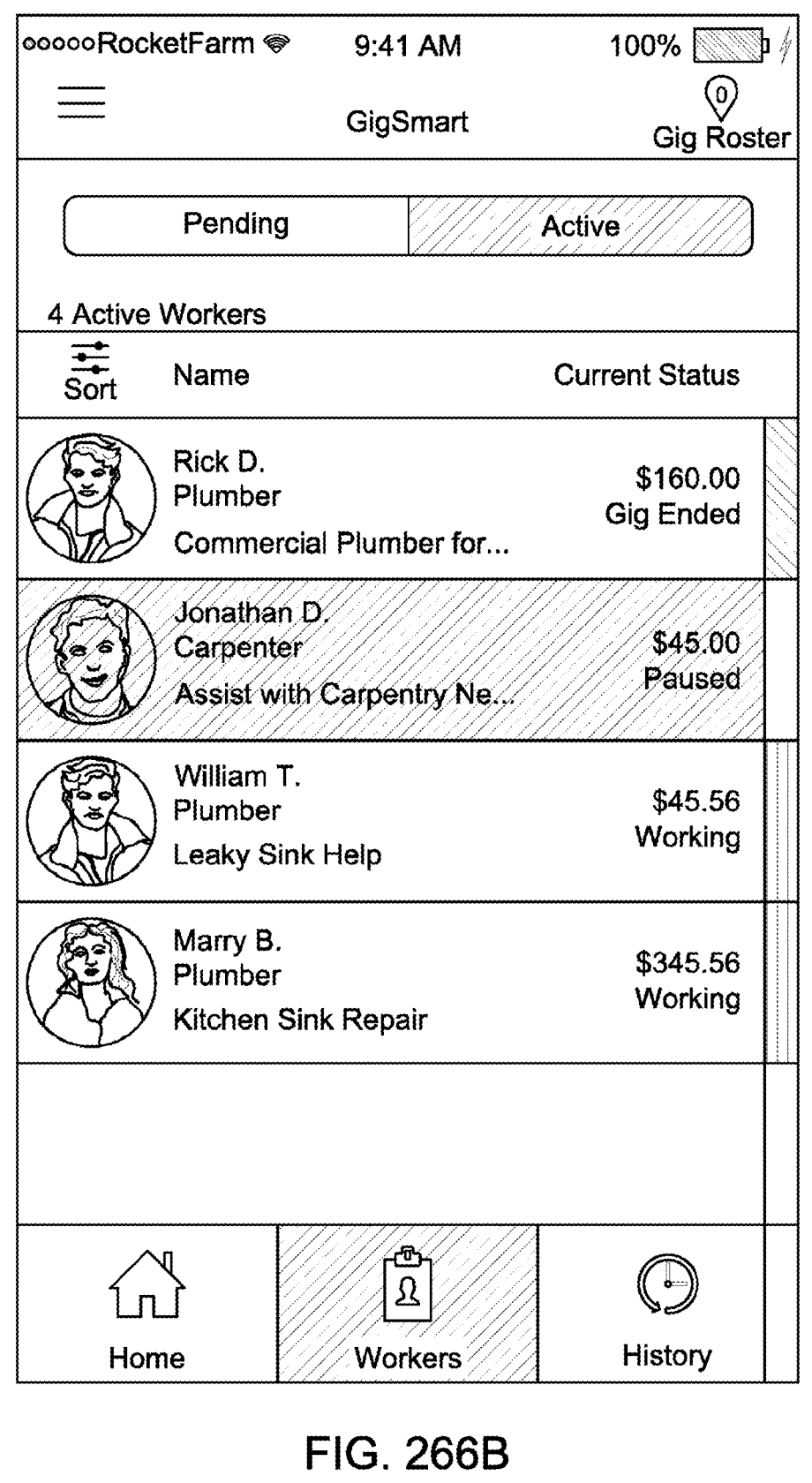

GigSmart

0
Gig Roster

Pending Active

4 Active Workers

Sort Name Current Status

Rick D.
Plumber
Commercial Plumber for...
$160.00
Gig Ended

Jonathan D.
Carpenter
Assist with Carpentry Ne...
$45.00
Paused

William T.
Plumber
Leaky Sink Help
$45.56
Working

Marry B.
Plumber
Kitchen Sink Repair
$345.56
Working

Home Workers History

FIG. 266B ooooo RocketFarm 9:41 AM 100%

Figure 268B:
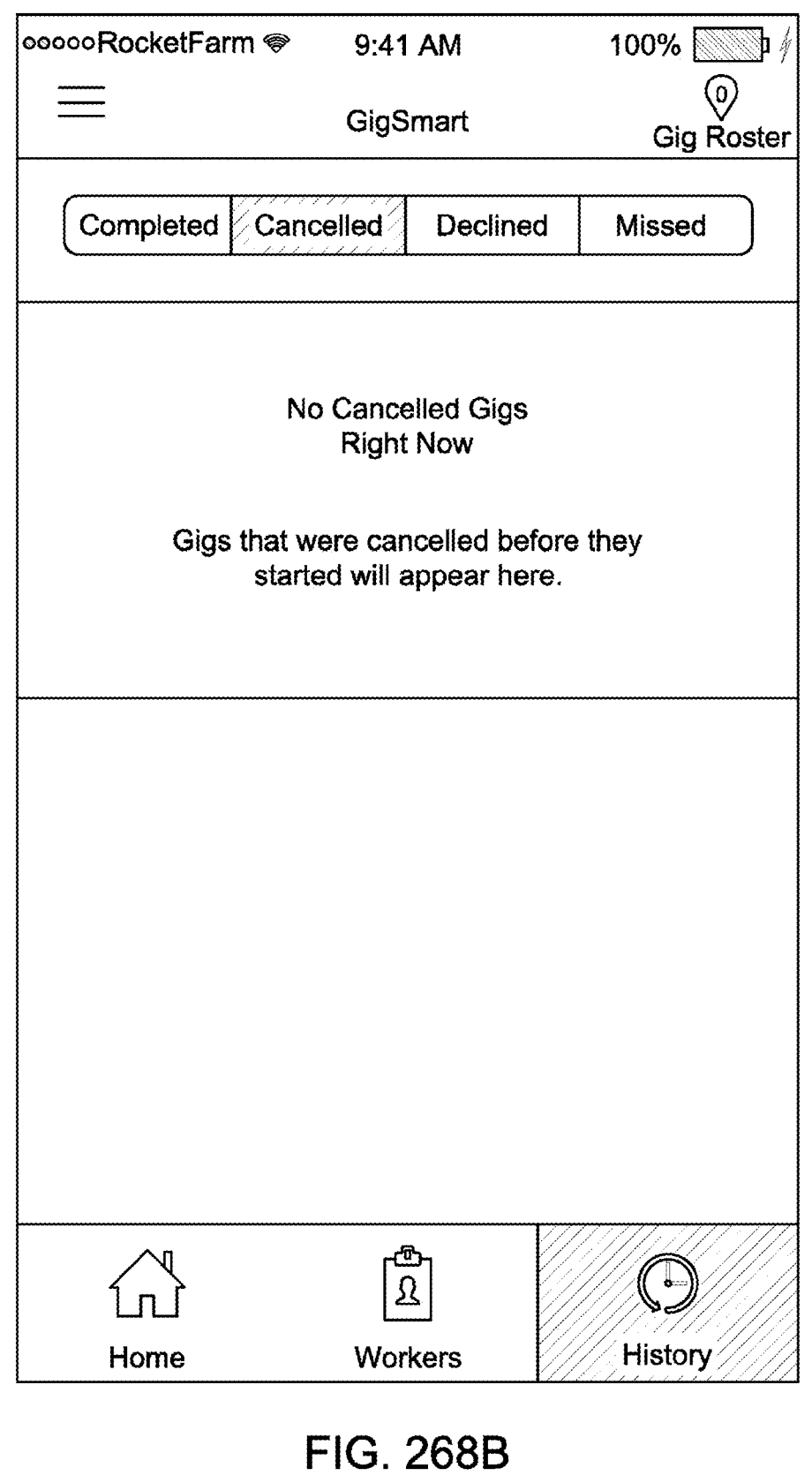

GigSmart

0

Gig Roster

Completed | Cancelled | Declined | Missed

No Cancelled Gigs
Right Now

Gigs that were cancelled before they
started will appear here.

Home

Workers

History

FIG. 268B ooooo RocketFarm 9:41 AM 100%

Figure 269B:
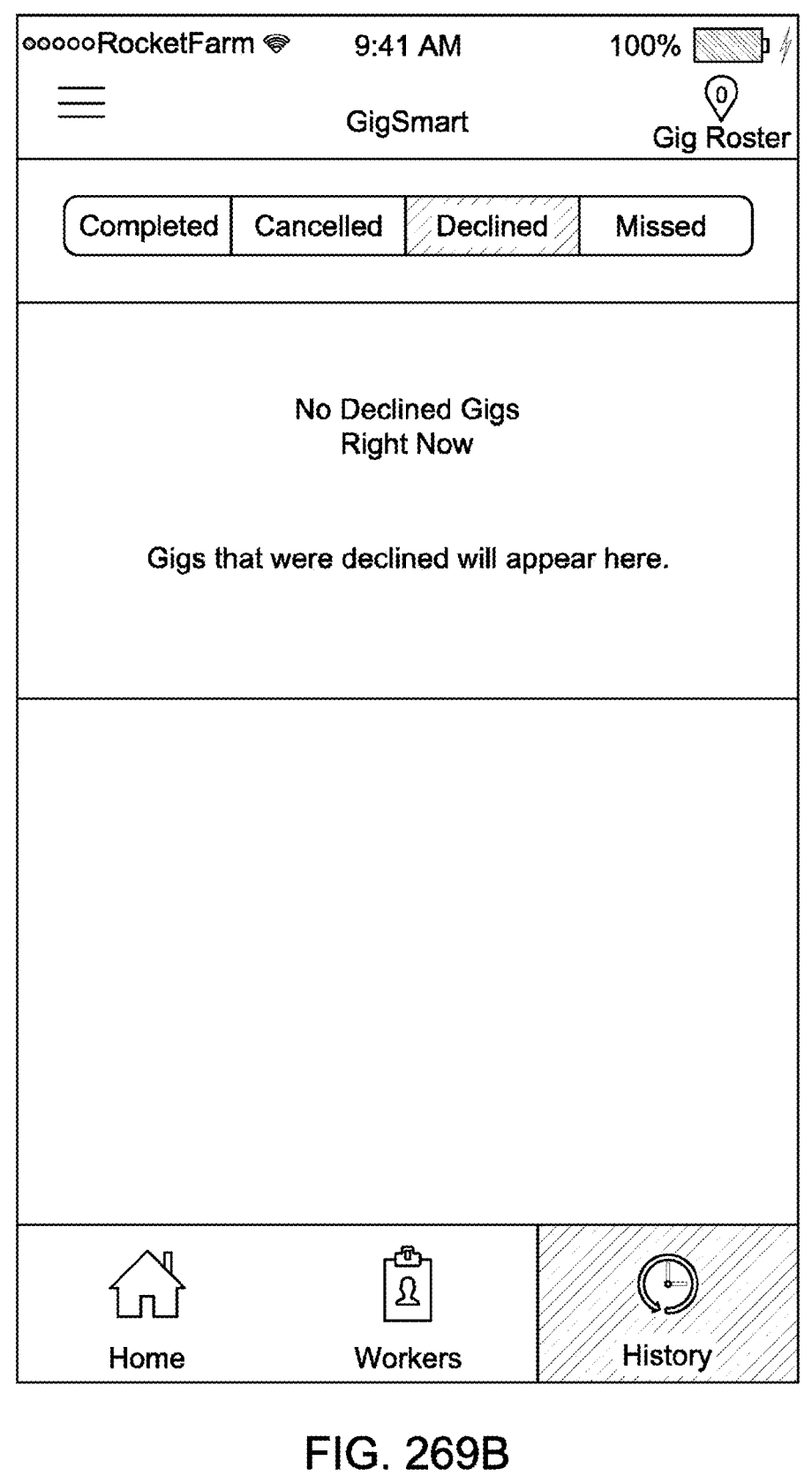

GigSmart

0

Gig Roster

Completed | Cancelled | Declined | Missed

No Declined Gigs
Right Now

Gigs that were declined will appear here.

Home

Workers

History

FIG. 269B ooooo RocketFarm 9:41 AM 100%

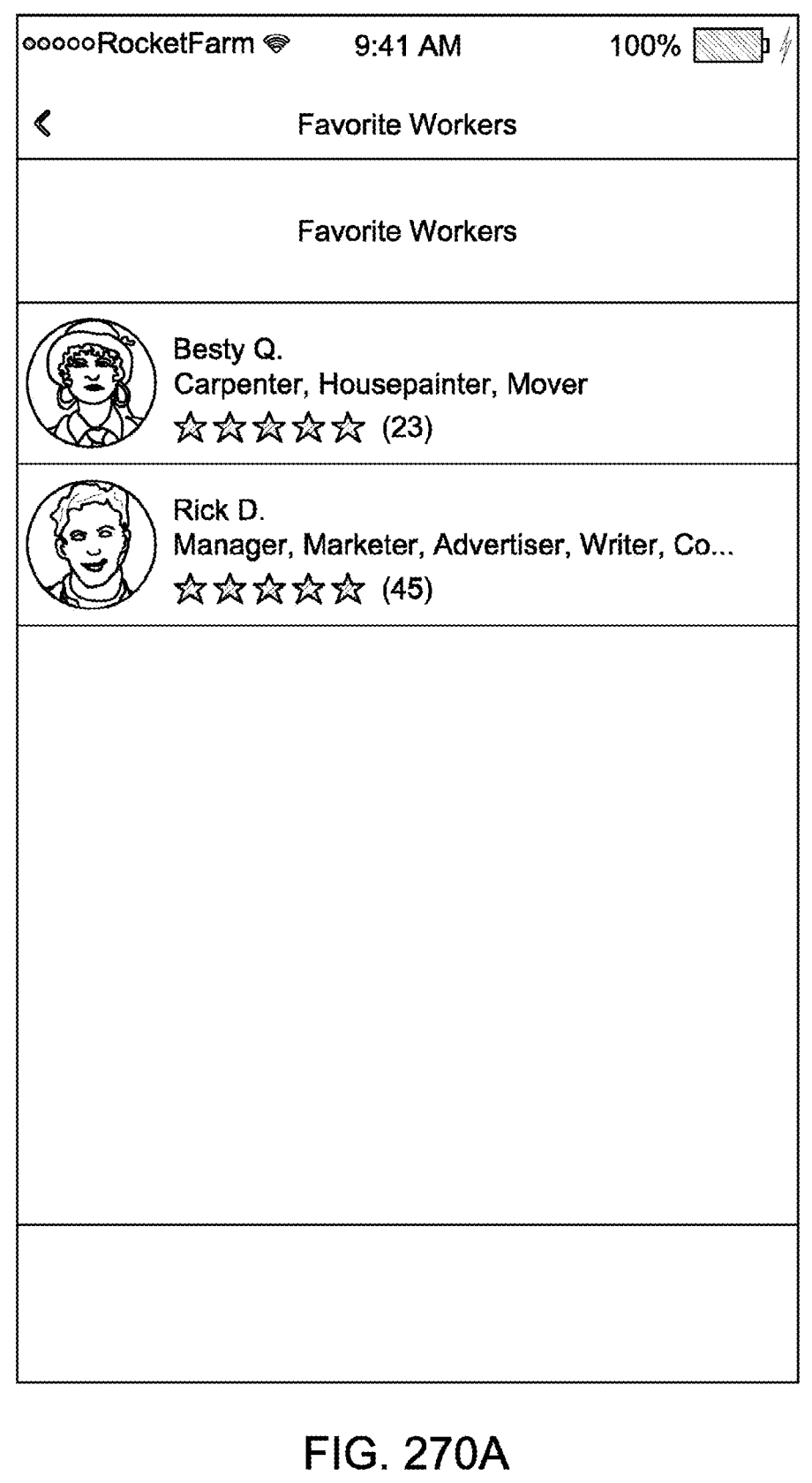

Favorite Workers

Favorite Workers

Besty Q.
Carpenter, Housepainter, Mover
(23)

Rick D.
Manager, Marketer, Advertiser, Writer, Co...
(45)

FIG. 270A

LABOR MARKETPLACE EXCHANGE AND METHODS THEREOF

BACKGROUND

Unemployment and underemployment are persistent drags on economic growth. For a number of reasons, including increased government regulation, the effects of the Affordable Care Act, and excessive employment related litigation, businesses can be hesitant to hire part-time and full-time workers. Compliance, legal defense, benefits, recruiting and onboarding costs that are needed to put a worker on the payroll can discourage employers from committing to additional full and part-time employees. These challenges are compounded in industries which experience regular fluctuations in labor requirements, such as construction and tax accounting, for example. Many organizations experience periods when they carry a larger work force than may be required or, more likely, too few providers when they are required.

BRIEF DESCRIPTION OF THE DRAWINGS

It is believed that certain embodiments will be better understood from the following description taken in conjunction with the accompanying drawings, in which like references indicate similar elements and in which:

FIGS. 185-193 depict select exemplary user interfaces that can be generated by an example LME computing system for presentation to service providers in accordance with various non-limiting embodiments.

FIGS. 194A-213 depict select exemplary user interfaces that can be generated by an example LME computing system for presentation to service users in accordance with various non-limiting embodiments.

FIGS. 214A-243 depict select exemplary user interfaces that can be generated by an example LME computing system for presentation to service providers in accordance with various non-limiting embodiments.

FIGS. 244A-274 depict select exemplary user interfaces that can be generated by an example LME computing system for presentation to service users in accordance with various non-limiting embodiments.

DETAILED DESCRIPTION

Figure 1:
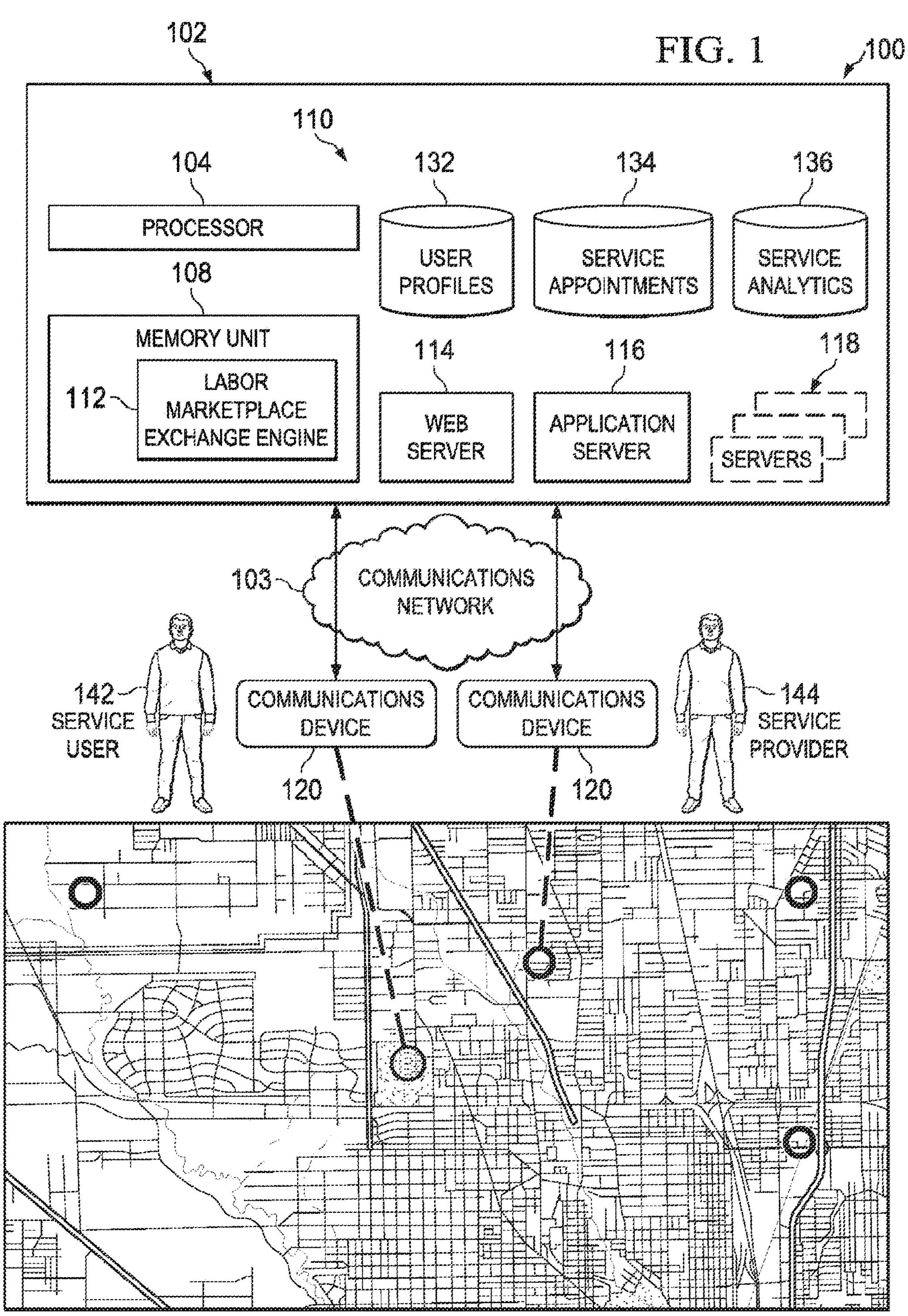
FIG. 1 depicts a simplified block diagram of a non-limiting example of a labor market exchange (LME) computing system.

Various non-limiting embodiments of the present disclosure will now be described to provide an overall understanding of the principles of the structure, function, and use of systems and methods for providing a labor marketplace exchange to match service users and service providers. One or more examples of these non-limiting embodiments are illustrated in the selected examples disclosed and described in detail with reference made to FIGS. 1-274 in the accompanying drawings. Those of ordinary skill in the art will understand that systems, apparatuses, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding, some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

The presently disclosed systems, methods, and apparatuses can generally provide a labor marketplace exchange (LME), sometimes referred to as an on-demand labor management system. In some embodiments, an LME is hosted by a service provider and is accessible to both service providers (e.g., people looking for work) and service users (e.g., people or entities with a need for service) to allow for the matching of the service providers to the service users. Such LME can, in some embodiments, connect service providers to service users in substantially real-time, thus allowing service users to access an on-demand supply of labor.

An on-demand labor management system in accordance with the present disclosure can, among other benefits, allow for greater flexibility and adjustment for time-sensitive hires. For example, service providers can be given more control over their schedule, the type of work they do, as well as other types of labor preferences. With the traditional work week and schedule falling out of favor as people seek more flexibility and autonomy in their work schedule, an LME in accordance with the present disclosure can allow for service providers to work on their own time and makes them selectively available to those seeking their labor.

As described in more detail below, an LME in accordance with the presently disclosed systems, methods, and apparatuses can enable users, both commercial and/or non-commercial, in need of a service to quickly and conveniently match with a service provider on either a scheduled or an on-demand basis. Matches between a service user and a service provider can be based on any number of factors and/or parameters, such as service user preferences, job details, and preferences and background of the service providers. An LME can facilitate communication between service user and service provider and can also facilitate a payment function and a rating function. The LME can also utilize geolocation information to aid in providing matches to a service user as well as provide the service user with substantially real-time updates of the service provider's geolocation position.

As discussed in more detail below, systems, methods, and apparatuses are disclosed in which a service user can select from a group of service providers who meet minimum requirements. Using filters, or other searching or matching techniques, these service providers can be drawn from a large database of available service providers. The service user can then select the service provider they wish to perform the labor and communicate with that service provider through the LME platform. In some embodiments service users can geospatially track service providers as they travel to and arrive and complete the job requested. Furthermore, service users can rate service providers on the quality of their work and/or other metrics. These ratings can become part of the service provider's profile and can be factored into the matching system in future transactions.

Furthermore, as described in more detail below, systems, methods, and apparatuses are disclosed in which service providers can each maintain a profile which can include, but is not limited to, skills, education, certifications, licenses, preferred wage, and/or ratings from previous jobs. In some embodiments, service providers can set their availability in substantially real-time to indicate if he or she is available on-demand for immediate service requests. Additionally or alternatively, service providers can set their calendars for availability in the future and manage service requests.

Generally, an LME in accordance with the present disclosure can provide a platform for both a service user and a service provider to complete labor transactions based on service provider qualifications and service user needs. The service user and service provider can interact with the LME through any suitable user interfaces, such as a mobile application (sometimes referred to as an "app") executing on a mobile communications device, a laptop computer, a mobile computing device, a handheld computer, a smart phone, a tablet computer, a personal digital assistant, and the like. Additionally or alternatively, the LME can be accessed through a web-based interface that can be provided on any suitable type of networked device, such as a mobile computing device, a desktop computer, a smart TV, a gaming system, and the like.

An example operational scenario is provided below to illustrate a non-limiting example of an LME in accordance with the present disclosure. While the exemplary scenario is provided in the context of a construction worker seeking to find labor for him to perform, it is to be understood that an LME in accordance with the present disclosure can be used to facilitate the matching of a wide array of service provider types to a wide array of service users. For example, in some implementations, a corporate-based service user can utilize an LME to identify potential service providers to perform specialized or unspecialized tasks for a corporation (e.g., clerical tasks, retail tasks, catering tasks, etc.). In other implementations, an industrial-based service user can utilize an LME to identify potential service providers to perform industrial tasks (e.g., manual labor, delivery, cleaning, etc.). In other implementations, a residential-based service user can utilize an LME to identify potential service providers to perform domestic or housekeeping tasks for the user (e.g., babysitting, lawn care, handyman services, etc.). As is to be appreciated, a wide array of other types of service providers can utilize an LME without departing from the scope of the present disclosure.

In one example implementation, a service provider, such as a construction worker, desires to earn extra income but is not currently employed by a particular construction company. The construction worker can create a profile on an LME in accordance with the present disclosure and enter information that satisfies all required fields and enter any additional fields they choose to complete during an account creation process. The service provider can then select the times and dates he or she would be available to work in the future through a calendaring functionality. In some embodiments, the service provider can make himself or herself available for on-demand labor through activation of an on-demand indicator provided by the LME. The LME can store this availability information, along with availability information from other services providers in suitable data stores.

Continuing with the example scenario, a service user (e.g., a construction company, general contractor, etc.) is in need of manpower to complete a job. The service user can create a user profile on the LME and disclose can general information about the company and its selection preferences including, but not limited to, preferred experience of the service provider, preferred wage to be paid, preferred skills, preferred rating and preferred distance from the service user.

Once the account has been created, or the service user logs into an existing account, the service user can search for construction workers using any suitable searching technique, such as an interactive search bar that suggests jobs as the service user types, for example. Once the search has been made, in one embodiment the construction workers that meet all of the preferences can be displayed in ascending order of time for the service provider to travel to the job site. The service user can sort or filter based on any other suitable parameters, such as rate, experience level, and so forth. The service user (e.g., a site supervisor, a foreman, or other liaison at the construction company) can then review the profiles of all the matches and select one of the service providers that match the requirements and that is available either on-demand or at the desired time. Upon receiving a selection of a particular service provider, a service request can be processed by the LME.

Continuing with the non-limiting example scenario, the service provider that is selected by the service user can be notified of his or her selection and can have a certain period of time to respond to the request before it times out or otherwise expires. If the service user is selected for on-demand service, he or she may have a relatively short amount of time to respond to the service request, such as a matter of minutes. If the request is for a scheduled service, there can be more time given to respond, as can be determined by the LME and/or the service user. If the service provider declines the request, or otherwise does not respond within the allotted time, the service user can be sent a notification via any suitable technique (e.g., in-app messaging, text message, instant message, email, etc.) and be directed to matches from their original search, which can in some cases include newly added service providers, in order to select another service provider. If the newly selected service provider accepts the service request, the service appointment can be placed on both the calendar of the service user (i.e., the person from the construction company requesting labor in this example scenario) and the service provider (i.e., the construction worker in this example scenario).

Fifteen minutes prior to the scheduled start time of the service appointment, or any other suitable timeframe (e.g. 60 minutes, 30 minutes, 5 minutes, etc.) the service user can view a map in which the service provider is tracked in real-time (or substantially real-time) as he or she proceeds to the location to perform the labor.

Throughout the searching, matching, and tracking processes, the labor marketplace exchange can facilitate various means of communication between the selected service provider and the service user. These means of communication can include, without limitation, in-app messaging, text messaging, email messaging, instant messaging, telephone calls, video calls, multimedia messaging, among of forms of communication.

Continuing with the non-limiting example scenario, the service provider can check-in or “clock-in” once he or she has arrived at the work site. In some embodiments, a GPS function within the LME can confirm the service provider’s location relative to the site of the service before proving the service provider with the option to clock-in. The LME can be configured to not allow the service provider to check-in until the ETA based on the GPS system is a minute or less, or other suitable period of time. The service user can be notified that the provider has checked in and can be required to accept this “clock-in” before a timer begins. Once the timer has started, it can appear on the graphical user interface of both the service provider’s computing device and the service user’s computing device.

The timer can be stopped by the service user, such as a site supervisor or foreman in the context of construction services, for any number of reasons. For example, the service user may decide the job has been completed or does not wish to pay for any additional labor at this time even if the job is not completed. The service user can also be given the ability to file a complaint, which can be based on, for example, incomplete or unsatisfactory work, poor behavior, and so forth. In some embodiments, the service provider is given a chance to respond to the complaint through interactions with the LME. In some embodiments, if the service provider accepts the complaint, there is no charge and both the service user and the service provider can be directed to the home page, with no ratings, feedback or reviews permitted to be given to either party. In accordance with one embodiment, no ratings are given in this situation since it is assumed that if a complaint is filed, both parties would have reviewed each other poorly. Therefore, in this example embodiment, neither party is permitted to input a review or other feedback when a complaint is filed. In some embodiments, as described in more detail below, the provider of the LME (or other entity) can compensate both parties for the transaction; therefore neither party has the ability to diminish the other’s ratings. If the service provider does not agree with the complaint, in some embodiments, the provider of the LME (or other entity) can agree to pay the service provider an amount of compensation, such as a percentage or a fixed fee amount, based on the total amount billed based on the amount of service provided (e.g., the hourly rate and time worked based on the timer). In such a scenario, the service user would not necessarily be charged. In an alternate arrangement, a complaint resolution policy can include compensating services providers a percentage of the owed labor costs, with a per transaction cap and an annual cap. Additionally, a service user can be given the ability to cancel a predetermined number of transactions per year, which can also have a capped amount.

Continuing with the non-limiting example scenario, the service user can supply a rating for the service provider, such as on the service provider’s overall quality of labor and work provided. The service user can be permitted, prompted, or required in some cases, to provide specific comments on the review of performance after the work is completed. Likewise, the service provider can rate the service user or otherwise provide feedback regarding his or her experience. The service user can then indicate to the LME to provide payment to the service provider using a payment mechanism. Both parties can receive e-receipts describing the details of the transaction. The payment mechanism can vary, but in some embodiments a payment card of the service user is kept on file with the LME. The payment card is charged with an amount based on services rendered by the service provide, plus any applicable fees. Payment can be provided to the service provider using any suitable vehicle, such a peer-to-peer transfer (such as PAYPAL), a check can be mailed to the service provider, a stored value card held by the service provider can be loaded with funds, among other types of payment techniques.

While the example scenario described above is based on a relatively unskilled, commercial use of a LME, the system and methods described herein are applicable across a wide range of service environments, including skilled services (e.g., tutoring, computer coding) and unskilled services (e.g., construction work, landscaping) which can be in both commercial (e.g., restaurant, janitorial) and non-commercial (e.g., music lessons, babysitting) settings.

Figure 3:
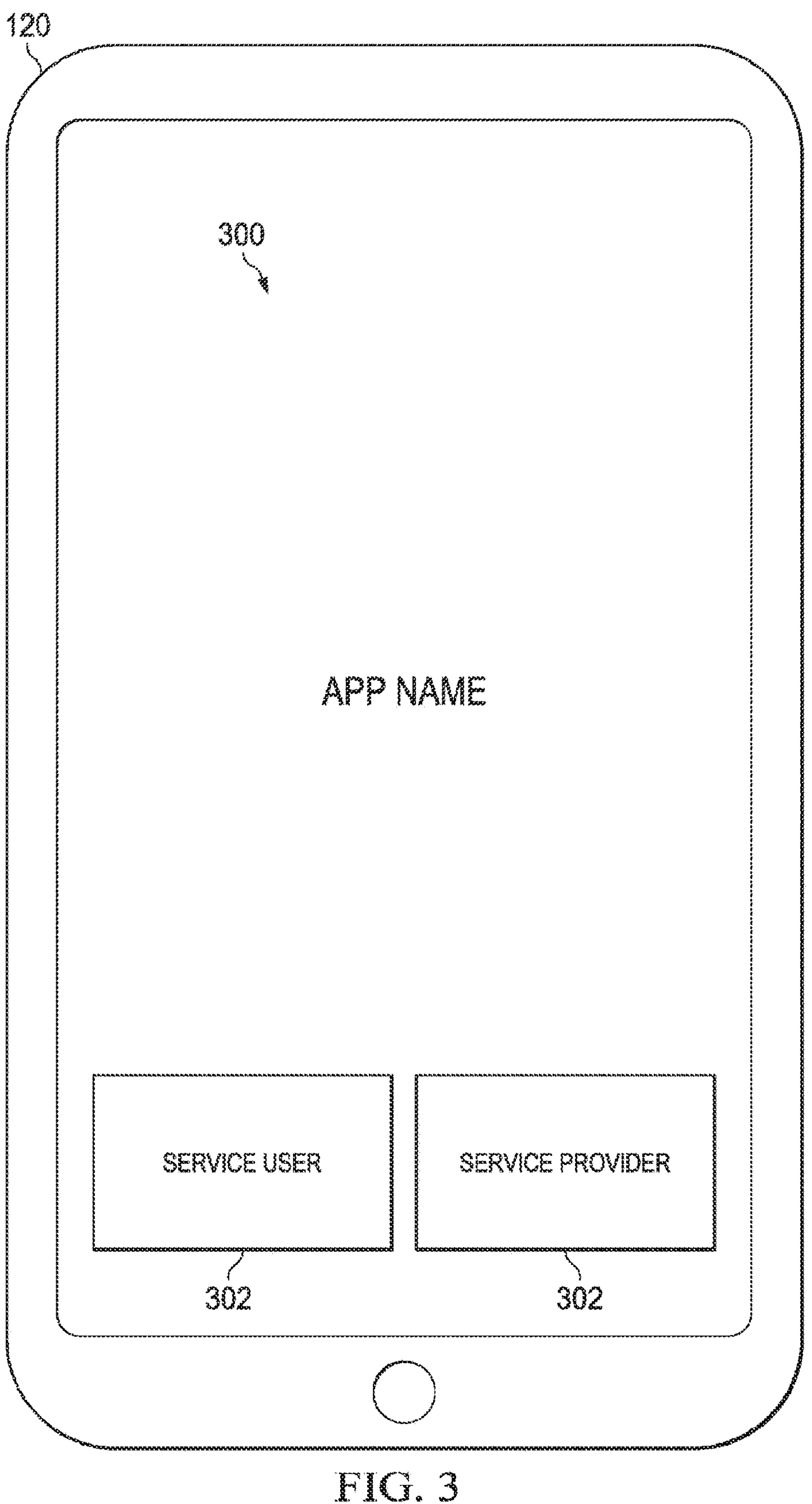
FIGS. 3-17 depict exemplary simplified user interfaces that can be generated by the LME computing system of FIGS. 1-2.

Service providers and service users can access their respective accounts on the LME through any suitable networked device, such as a through a specialized mobile application (sometimes referred to as an "app") executing on a mobile computing device that is connected to the Internet and has GPS capabilities. In some embodiments, the service user and/or service provider can access the LME and/or their profiles through a website accessed through the internet on any number of different devices. In any event, services users and service providers can have the ability to update and view their profiles and schedules and request service through any suitable device connected to the Internet. However, in some embodiments, certain types of interactions are only offered on devices having GPS capabilities so that the real-time tracking functionality of the LME platform can be utilized. Furthermore, in some embodiments, when the LME is accessed via a networked device, the user will decide whether to enter as a user or provider, as shown in FIG. 3, below. In other embodiments, a service user can utilize a first specialized application to access the LME and a service provider can utilize a second specialized application to access the LME.

Turning now to FIG. 1, a simplified block diagram of a non-limiting example of an LME 100 is depicted. An LME computing system 102 is configured to communicate with one or more remote communications devices 120 over one or more communications networks 130. In operation, the LME computing system 102 can receive profile data, search queries, tracking data, among other types of instructions from the communications devices 120 and/or one or more other computing devices that can be communicatively coupled to the LME computing system 102 via the communications networks 130. The LME computing system 102 can generate user interfaces (e.g., user interfaces illustratively shown in FIGS. 3-17) based on the user (e.g., a service user 142, a service provider 144, and an administrator (not shown) of the LME computing system 102). The user interfaces can be accessible through the communications devices 120 and can generally enable the users 142, 144 of the LME computing system 102 to interact with the LME computing system 102. As schematically depicted in FIG. 1, a real-time, or substantially real-time, geographic position of each user 142, 144 can be provided to the LME computing system 102, such as through GPS data received by the communications devices 120 and provided to the LME computing system 102. As described herein, the geolocation of the communications device 120 of the service provider 144 can be utilized by the LME computing system 102 during various stages of a transaction. For example, the position of the service provider 144 at the time a search query is provided by the service user 142 can determine whether that service provider 144 is identified in a list of potential service providers and/or determine a ranking of that service provider 144 relative to other service providers in the geographic area. Additionally, the geolocation of the communication device 120 of the service provider 144 can be used to provide the service user 142 with an indication of the service provider's 144 location when the service provider 144 is traveling to a service appointment. The LME computing system 102 may be embodied as any type of server or computing device capable of processing, communicating, storing, maintaining, and transferring data. For example, the LME computing system 102 may be embodied as a server, a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. In some embodiments, the LME computing system 102 may be embodied as a computing device integrated with other systems or subsystems. Therefore, the LME computing system 102 can be, for example, a standalone processing platform or the LME computing system 102 can be a part of an enterprise human resources computing platform, or other type of computing system.

In the illustrative embodiment of FIG. 1, the LME computing system 102 includes a processor 104 and a memory unit 108 for storing a labor marketplace exchange engine 112. Data used by the marketplace exchange engine 112 can be from various data sources 110, such as a user profiles database 132, a service appointments database 134, and a service analytics database 136, among others, as is to be appreciated by one skilled in the art. The data stored in the databases 132, 134, 136 can be stored in a non-volatile computer memory, such as a hard disk drive, a read only memory (e.g., a ROM IC), or other types of non-volatile memory. In some embodiments, one or more databases 132, 134, 136 can be stored on a remote electronic computer system, such as cloud-based storage, for example. As it to be appreciated, a variety of other databases, or other types of memory storage structures, can be utilized or otherwise associated with the LME computing system 102. As such, the data sources 110 may be embodied as any type of device or devices configured for short-term or long-term storage of data such as, for example, memory devices and circuits, memory cards, hard disk drives, solid-state drives, or other data storage devices. For example, in some embodiments, the data sources 110 include storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or Blu-Ray disk, and so forth. Storage media such as flash drives, solid state hard drives, redundant array of individual disks (RAID), virtual drives, networked drives and other memory means including storage media on the processor 104, or the memory unit 108 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

The LME computing system 102 can include several computer servers and databases. For example, the LME computing system 102 can include one or more web servers 114, application servers 116, and/or any other type of servers 118. For convenience, only one web server 114 and one application server 116 are shown in FIG. 1, although it should be recognized that the disclosure is not so limited. The servers can cause content to be sent to the communications devices 120 in any number of formats, such as text-based messages, multimedia message, email messages, smart phone notifications, web pages, and so forth. The servers 114, 116, 118 can comprise processors (e.g., CPUs), memory units (e.g., RAM, ROM), non-volatile storage systems (e.g., hard disk drive systems), etc. The servers 114, 116, 118 can utilize operating systems, such as Solaris, Linux, or Windows Server operating systems, for example.

The web server 114 can provide a graphical web user interface through which various users of the system can interact with the LME computing system 102. The web server 114 can accept requests, such as HTTP requests, from clients (such as web browsers on the communications devices 120), and serve the client's responses, such as HTTP responses, along with optional data content, such as web pages (e.g., HTML documents) and linked objects (such as images, video, and so forth).

The application server 116 can provide a user interface for users who do not communicate with the LME computing system 102 using a web browser. Such users can have special software installed on their communications device 120 that allows them to communicate with the application server 116 via the communications network 130. Such software can be downloaded, for example, from the LME computing system 102, or other software application provider (such as an App Store), over a network to such communications devices 120.

Of course, the LME computing system 102 may include other or additional components, such as those commonly found in a server and/or computer (e.g., various input/output devices), in other embodiments. Additionally, in some embodiments, one or more of the illustrative components may be incorporated in, or otherwise from a portion of, another component. For example, the memory unit 108, or portions thereof, may be incorporated in the processor 104 in some embodiments. Furthermore, it should be appreciated that the LME computing system 102 may include other components, sub-components, and devices commonly found in a computer and/or computing device, which are not illustrated in FIG. 1 for clarity of the description.

The processor 104 may be embodied as any type of processor capable of performing the functions described herein. For example, the processor 104 may be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

The memory unit 108 may be embodied as any type of volatile or non-volatile memory or data storage capable of performing the functions described herein. For example, the memory unit 108 may be embodied as read only memory (ROM), random access memory (RAM), cache memory associated with the processor 104, or other memories such as dynamic RAM (DRAM), static ram (SRAM), programmable ROM (PROM), electrically erasable PROM (EEPROM), flash memory, a removable memory card or disk, a solid state drive, and so forth. In operation, the memory unit 108 may store various data and software used during operation of the LME computing system 102 such as operating systems, applications, programs, libraries, and drivers.

In some embodiments, the LME computing system 102 and the communications devices 120 can communicate with each other over the communications network 130. The communications network 130 can be embodied as any number of various wired and/or wireless communication networks. For example, the communications network 130 can be embodied as or otherwise include a local area network (LAN), a wide area network (WAN), a cellular network, or a publicly-accessible, global network such as the Internet. Additionally, the communications network 130 can include any number of additional devices to facilitate communication between the LME computing system 102, the communication devices 120 and/or the other computing devices.

Additionally, in some embodiments, the LME computing system 102 can further include one or more peripheral devices (not shown). Such peripheral devices can include any type of peripheral device commonly found in a computing device such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device.

The communication devices 120 may be embodied as any type of computing devices capable of performing the functions described herein. As such, the communications devices 120 may include devices and structures commonly found in computing devices such as processors, memory devices, communication circuitry, and data storages, which are not shown in FIG. 1 for clarity of the description. In some embodiments, the communications devices 120 are configured to send and receive GPS-based data to and from the LME computing system 102, as discussed. Additionally, the communications devices 120 are configured to enable one or more users 142, 144 to access the LME computing system 102. To do so, in some embodiments, the communications devices 120 can be configured to access or otherwise communicate with the LME computing system 102 via one or more web pages (e.g., HTML pages, PHP pages, etc.) or a web-browser application (e.g., an HTML application or the like). For example, in such embodiments, the user 142, 144 can utilize a web-browser executing on the communications devices 120 such as Safari™, Opera™, Google™ Chrome™, Internet Explorer™, or the like to interact with the LME computing system 102. As discussed in more detail below, the LME computing system 102 can be configured to generate user interfaces (e.g., the user interfaces/web pages illustratively shown in FIGS. 3-17) for presenting to the users 142, 144. The communications devices 120 can be any type computer device suitable for communication over the network, such as a wearable computing device, a mobile telephone, a tablet computer, a device that is a combination handheld computer and mobile telephone (sometimes referred to as a "smart phone"), a smart TV, a gaming system, a personal computer (such as a laptop computer, netbook computer, desktop computer, and so forth), or any other suitable mobile communications device, such as personal digital assistants (PDA), mobile gaming devices, or media players, for example.

While accessing the LME computing system 102, a service user 142 can be directed to set up an account either through, for example, connection with a social media website or through an email address. Once an account is created by the LME computing system 102, the service user 142 can be required to disclose information about themselves or their business, depending on their status as a commercial or non-commercial user, for example. This information can include payment information, such as credit card information or peer-to-peer payment information, for the facilitation of payments. In some embodiments, to further build the profile of the service user 142, the service user 142 can then be asked to answer general preference questions or otherwise provide additional information to provide the LME computing system 102 with additional data to aid in the subsequent matching of service providers 144.

While accessing the LME computing system 102, a service provider 144 can also be directed to set up an account either through, for example, connection with a social media website or through an email address. Once an account is created by the LME computing system 102, the service provider 144 can be required to disclose information about themselves, such as skill level, skill sets, certifications, experience level, and well as other preferences. At least some of the information associated with the service provider 144 can be updated in substantially real-time by the service provider 144, such that results provided to a service user 142 can include up to date profile and preference information for the service providers 144 that are affiliated with the LME computing system 102. Compensation information can also be gathered from the service provider 144.

Figure 2:
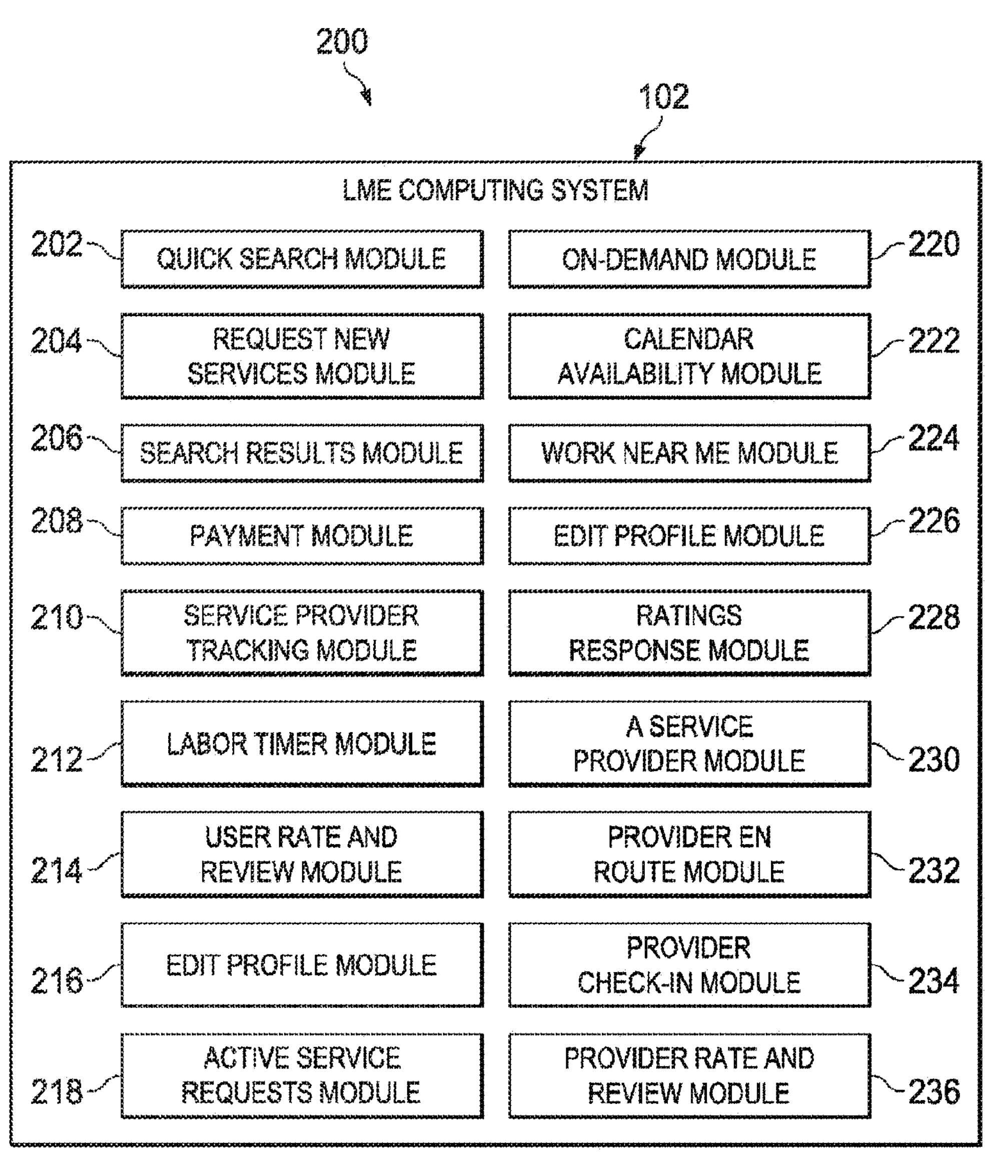
FIG. 2 depicts an exemplary environment established by the LME computing system of FIG. 1.

Referring now to FIG. 2, in the illustrative embodiment, the LME computing system 102 establishes an environment 200 during operation. The illustrative embodiment 200 includes, for example, a quick search module 202, a request new services module 204, a search results module 206, a payment module 208, a service provider tracking module 210, a labor timer module 212, a service user rate and review module 214, an edit profile module 216, an active service requests module 218, an on-demand module 220, a calendar availability module 222, a work near me module 224, an edit profile module 226, a ratings response module 228, a service provider module 230, a provider en route module 232, a provider check-in module 234, and a service provider rate and review module 236. The various modules of the environment 200 may be embodied as hardware, firmware, software, or a combination thereof. For example, each of the modules of the environment 200 may be embodied as a processor and/or a controller configured to provide the functionality described below. Of course, it should be appreciated that the LME computing system 102 may include other components, sub-components, modules, and devices commonly found in a computing device, which are not illustrated in FIG. 2 for clarity of the description.

The quick search module 202 can be configured to allow a service user 142 to repeat a service request they made in the past with the same preferences (e.g., a quick search), thus creating a repeat search for providers based on recent searches. Another feature of the quick search can allow for the service user 142 to select a previous request and edit the preferences, thus creating a new search with similar but not identical preferences as the previous search. Another feature of the quick search can allow for the selection of specific service providers and subsequently, scheduling service requests in the coming days.

The request new services module 204 can be configured to generate an interactive search bar that gives suggestions for specific labor types, by category, as the service user types based on popular searches and past user search history. This module can also include a category list with multiple subcategories that can assist with a service user 142 narrowing their search down to a specific labor type. Once a service user 142 has selected the desired type of labor, they can answer job-specific questions.

The search results module 206 can be configured to list a selection of service providers 144 who meet some or all requirements of a search query. The list of service providers can be ordered or ranked based on any number of parameters, such as real-time proximity to the job site. A variety of information regarding each service provider 144 can be displayed, as may be available, such as a name, a profile picture, and other relevant profile information, such as a rating, experience and wage rate, and so forth. The service user 142 can view a profile of a selected service provider 144 and, if they would like to commission the service provider 144, can interact with the LME computing system 102 to request one or more of them to perform a service. If, however, the service user 142 is not satisfied with the matches identified by the LME computing system 102, they can expand the search parameters to instruct the LME computing system 102 to increase the number of matches displayed to the service user 142. In some embodiments, before a service user 142 finalizes a service request, the LME computing system 102 can provide the service user 142 an opportunity to purchase varying degrees of background checks, as may be conduct using a third party service provider. Once a service request is provided to a selected service provider 144 by the LME computing system 102, if the service provider 144 does not respond within an allotted time or rejects the request, the service user 142 can be directed back to the search results module 206 in order to select a different service provider 144 that matches the desired preferences and characteristics of the service user 142.

The payment module 208 can be configured to facilitate payment for the services rendered by a service provider 144. At the time of payment to the service provider 144, the service user 142 can be asked to elect a method of electronic payment. The service user 142 can, for example, enter new credit card information or select from cards already stored in the third party system database. In some embodiments, a payment vehicle is required to be on file for every transaction before contact with a service provider 144 is facilitated through the LME computing system 102.

The service provider tracking module 210 can be configured to be available to a service user 142 once certain requirements are satisfied, such as the service provider 144 being 15 minutes away from the job site (based on ETA) or 15 minutes before the start time of a service appointment. The service provider tracking module 21 can be available for both on-demand and scheduled services. In some embodiments, an indicator of the service provider's 144 geographic position can be provided on a map that is viewable on a screen of the communications device 120 of the service user 142. The service provider's 144 geographic position can be based on GPS information received by the LME computing system 102 from a GPS on a mobile computing device of the service provider (e.g., the communications device 120). Additional information, such as ETA, etc., can also be provided to the service user 142 by the service provider tracking module 210. In some embodiments, additional channels of communication can be utilized (e.g., cellular networks, data networks) to allow for communication between service users 142 and service providers 144 during various stages of the transaction, such as to clarify directions or give specific instructions, for example.

The labor timer module 212 can be configured to be activated by a service provider 144 once he or she arrives at a work site and begins working, for example, as confirmed through GPS. Once this labor time module 212 is engaged, a screen on the communications device 120 of the service user 142 can display a timer counting the minutes the service provider 144 has worked. The labor time module 212 can be exited through confirmation by the service user 142. In some embodiments, a service user 142 can have the option to end the session because the job was successfully completed, the service user 142 no longer wishes to pay for more labor, or to file a complaint. If the service user 142 files a complaint, the service provider 144 can either accept or dispute the complaint. If accepted, in some embodiments, there is no payment rendered and both parties are directed to a home page or home screen of the LME interface. In some embodiments, if the service provider 144 disputes the complaint, the service provider 144 can be reimbursed for at least some of the services rendered by an entity hosting the LME computing system 102, based on certain limits. For example, there can be limits to the total dollar amount of both the complaint payments a service provider 144 is entitled to and the amount of complaints a service user 142 can initiate before being having its account status impacted (e.g., terminated).

The service user rate and review module 214 can be configured to generate e-receipts for payments and provide and an opportunity for the service user 142 to rate the service provider 144 on a scale-based system across a range of aspects. In some embodiments, the service user 142 can be asked to provide an additional comment if a rating falls below a certain threshold.

The edit profile module 216 can be configured to enables service users 142 to view and edit their profiles, which can include a picture, a brief background, their general preferences for providers, and their payment methods, for example.

The active service requests 218 can be configured to allow users to review service requests they have pending.

The on-demand module 220 can be configured to allow the service provider 144 to make himself or herself available to particular service users 142, such as service users 142 within a certain specified radius or satisfying other requirements. There can also be options for the service provider 144 to change his or her preferences before making himself or herself available for on-demand services. This module can require that the service provider 144 respond to service requests within a predetermined time period (such as 30 minutes or 10 minutes) and perform the service within a certain period of time as well.

The calendar availability module 222 can be configured to enable service providers 144 to set the times, or blocks of time, when they will be available to work in the near future, view their upcoming assignments, and respond to service requests. A calendar view can also enable service providers 144 to view their upcoming assignments in greater depth. For service appointments on their calendar, service providers 144 can view the service user profile, the location of the job with directions, contact the user, and so forth.

The work near me module 224 can be configured to allow a service provider 144 to view various types of information about recent labor transactions and requests within a certain radius of their location. This module can include, for example, a map feature that allows the service provider 144 to view the labor information geographically. As such, service providers 144 can be educated about the marketplace around them and assist them in matching themselves with nearby users. Example types of maps can include heat maps that are color coded to identify rates, types of jobs, booked service appointments, and so forth. Data for such maps, or other analytics as may be provided by the LME computing system 102 can be stored in the service analytics database 136.

The edit profile module 226 can be configured to allow service providers 144 to view and edit their profile which can include, but is not limited to, a picture, jobs the provider is capable and willing to perform, skills, and preferred wage.

The ratings response module 228 can be configured to enable service providers 144 to write responses to reviews, to thank service users 142 for their business, or to explain a bad review by a particular user.

The service provider module 230 can be configured to offer certain functionality to the service provider 144, such as the option to create a 1099 form, or other documentation. In some embodiments, the LME computing system 102 can maintain records of work a service provider 144 performed over the year or other period of time.

The provider en route module 232 can be configured to provide a service provider 144 with information prior to the start of a service appointment. In some embodiments, the information is provided to the service provider 144 about 10 minutes before the service provider 144 should leave to arrive at the job-site on time, based on their mode of transportation, for calendar scheduled jobs. For on-demand jobs, the information generated by the provider en route module 232 can appear immediately once an on-demand job is accepted. This module can also be configured to display to the service provider 144 their location, ETA, and turn-by-turn directions to the job-site. It can also facilitate communication between the service user 142 and the service provider 144 provider over cellular and/or data networks.

The provider check-in module 234 can be configured to allow a service provider 144 to check-in to a service appointment when the service provider's 144 ETA is less than a threshold time period (e.g., a minute) as determined by the GPS functionality in the LME computing system 102.

The service provider rate and review module 236 can be configured generate an c-receipt for the services provided and an opportunity for the service provider 144 to rate the service user 142 on a scale-based system across a range of aspects. The service provider 144 can be asked to provide an additional comment if a rating falls below a certain threshold.

FIGS. 3-17 depict example simplified user interfaces that can be generated by the LME computing system 102 of FIGS. 1-2 for enabling service users 142 and service providers 144 to interact with the LME computing system 102. While FIGS. 3-17 depict a handheld mobile communications device 120, it is to be appreciated that similar interfaces can be configured to different types of communications devices (such as laptops, tablet computers, and so forth).

FIG. 3 depicts an example user type selection screen 300. The user type selection screen 300 can include selection buttons 302 for allowing a user of the communications device 120 to identify themselves as either a service user or a service provider.

Figure 4:
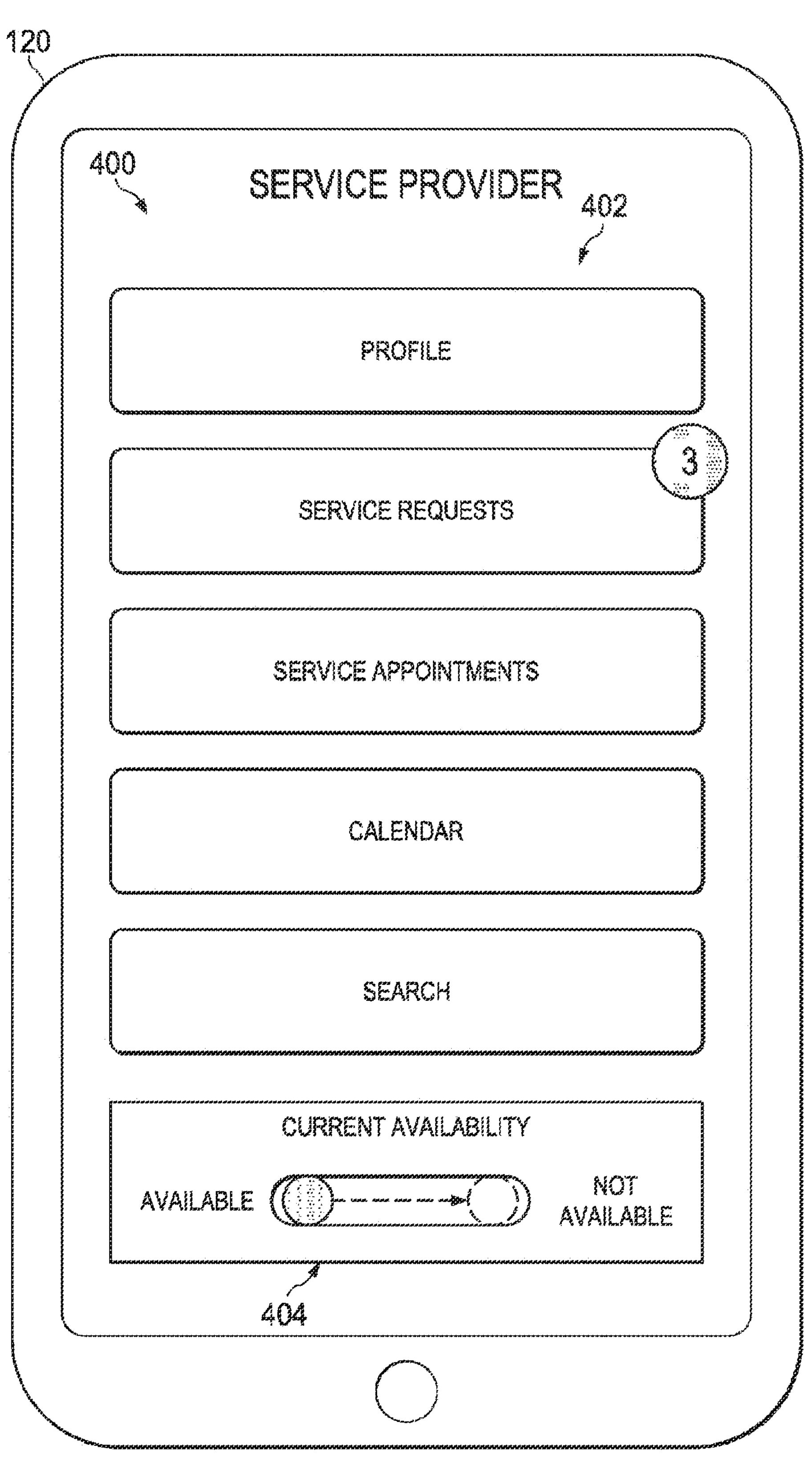

FIG. 4 depicts an example service provider home screen 400, which can include a plurality of selectable elements 402 to allow a service provider 144 to interact with the LME computing system 102. Example selectable elements 402 can include, without limitation, a profile button, a service requests button, a service appointments button, a calendar button, and a search button. In the illustrated embodiment, the service requests button has an indicator to alert the service provider 144 to unanswered service requests. As it is to be appreciated, activation of various selectable elements 402 can initiate various modules, as depicted in FIG. 2, to offer certain functionality to the service provider 144. In the illustrated embodiment, the service provider home screen 400 comprises a current availability status indicator 404. The service provider 144 can interact with the current availability status indicator 404 to indicate to the LME computing system 102 that the service provider 144 is available for on-demand service or not-available for on demand service.

Figure 5:
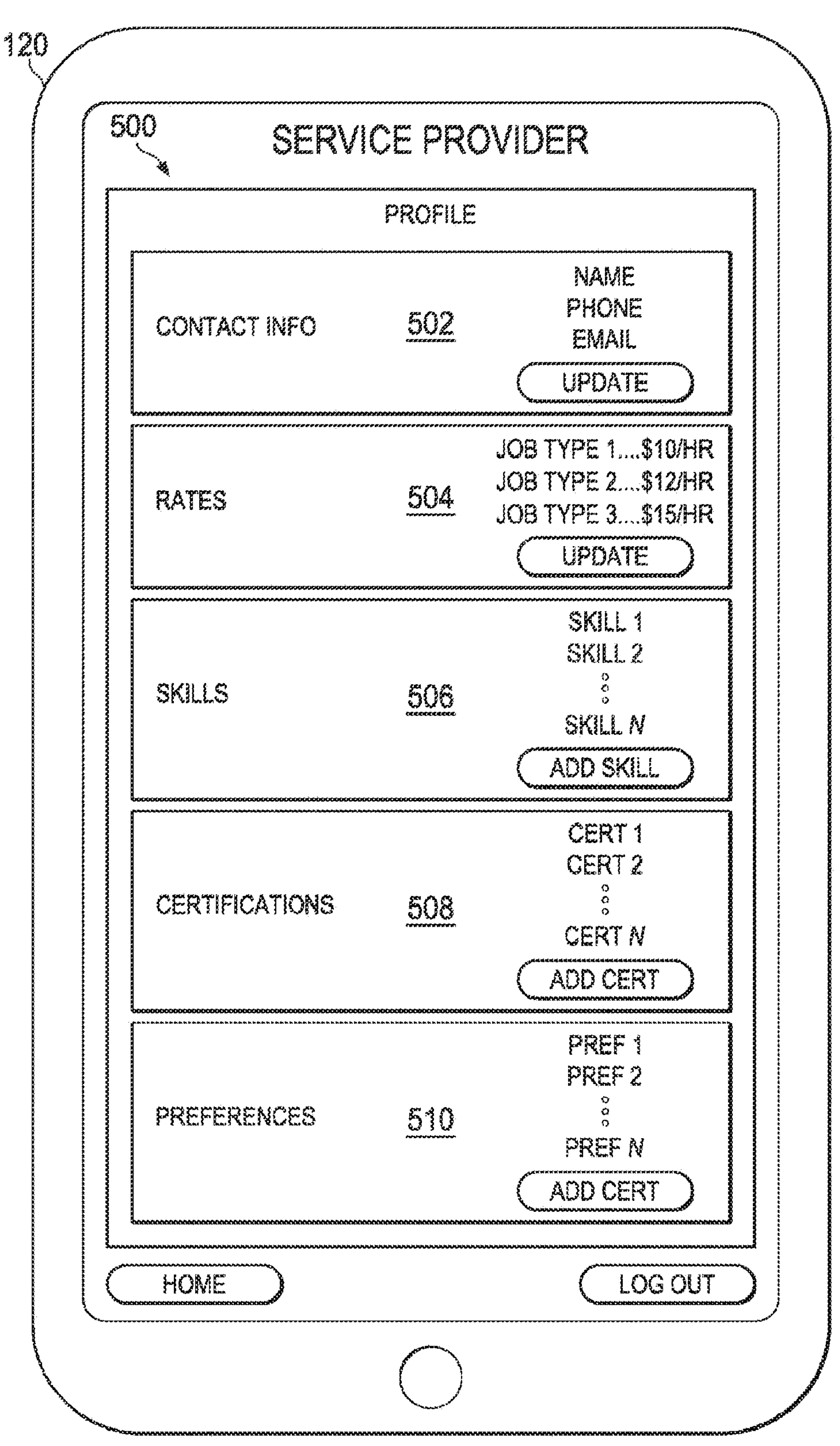

FIG. 5 depicts an example service provider profile screen 500 through which a service provider 144 can selectively provide and subsequently update their profile information stored by the user profiles database 132 (FIG. 1). For illustration purposes, the service provider profile screen 500 is depicted having a contact information section 502, a rates section 504, a skills section 506, a certifications section 508, and a preferences section 510. The contact information section 502 can include, for example, a mobile number, an email address, a SKYPE number, and so forth. The rates section 504 can include, for example, an hourly wage or collection of hourly wages, as defined by the service provider 144. The skills section 506 can include, without limitation, selections of particular skills or abilities possessed by the service provider 144. These skills can be used by the LME computing system 102 when matching particular service providers 144 to search queries. The certifications section 508 can include, for example, licenses (e.g., commercial driver's license (CDL)) or other certifications (e.g., home inspector certification, OSHA certification). The preferences section 510 can include, for example, labor preferences that have been provided by the service provider 144 to the LME computing system 102. These preferences can be updated in real time by the service provider 144 and can be used by the LME computing system 102 when matching particular service providers 144 to search queries.

Figure 6:
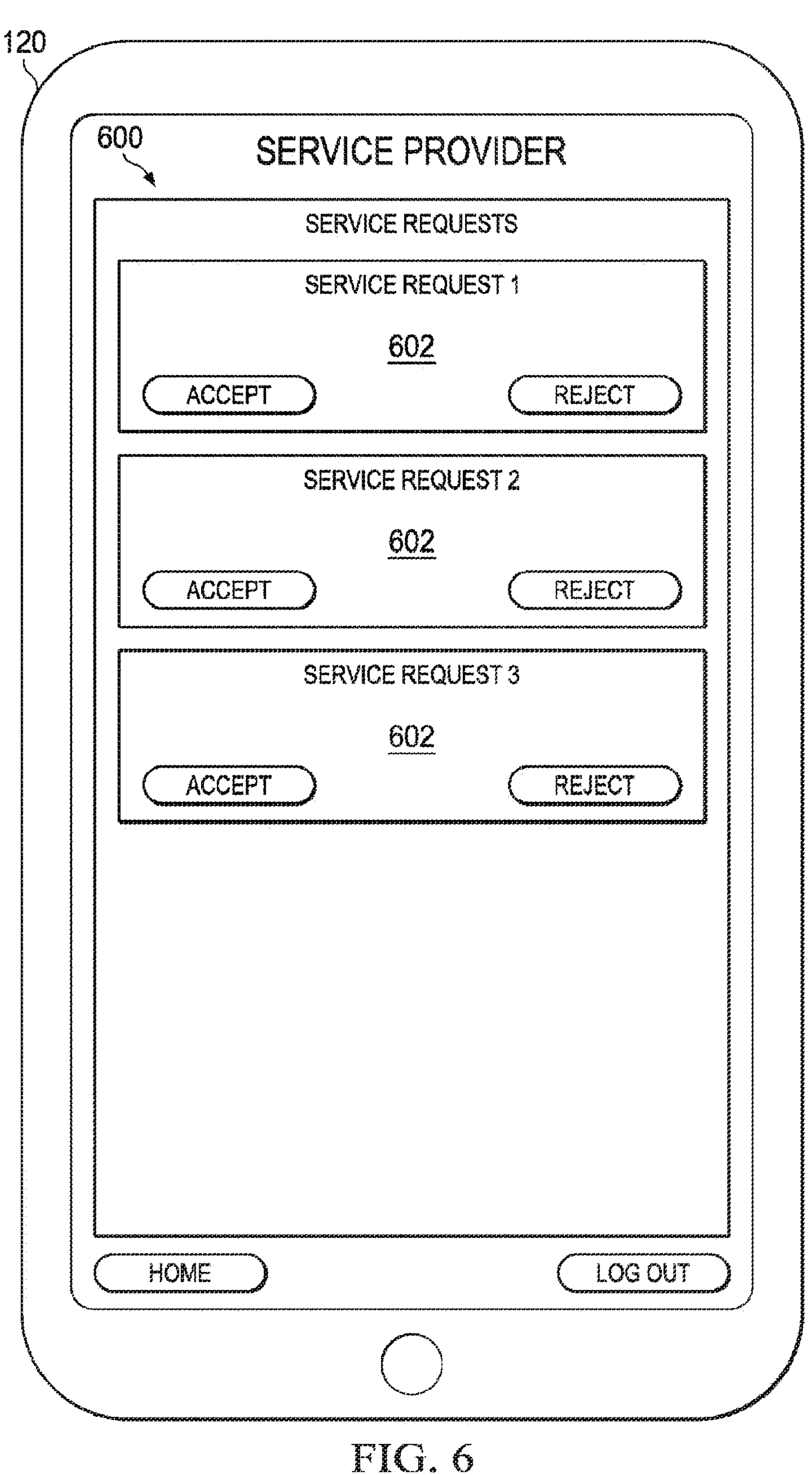

FIG. 6 depicts an example service requests screen 600 through which a service provider 144 can selectively respond to service requests 602 submitted by various service users 142. The service requests 602 can include relevant information, such as the type of service, the location of the job site, the amount (for fixed fee work) or the hourly rate, the requesting service user, and so forth. If the service provider 144 accepts the service request 602 it can be added to the calendar of both the service provider 144 and the service user 142 requesting the service.

Figure 7:
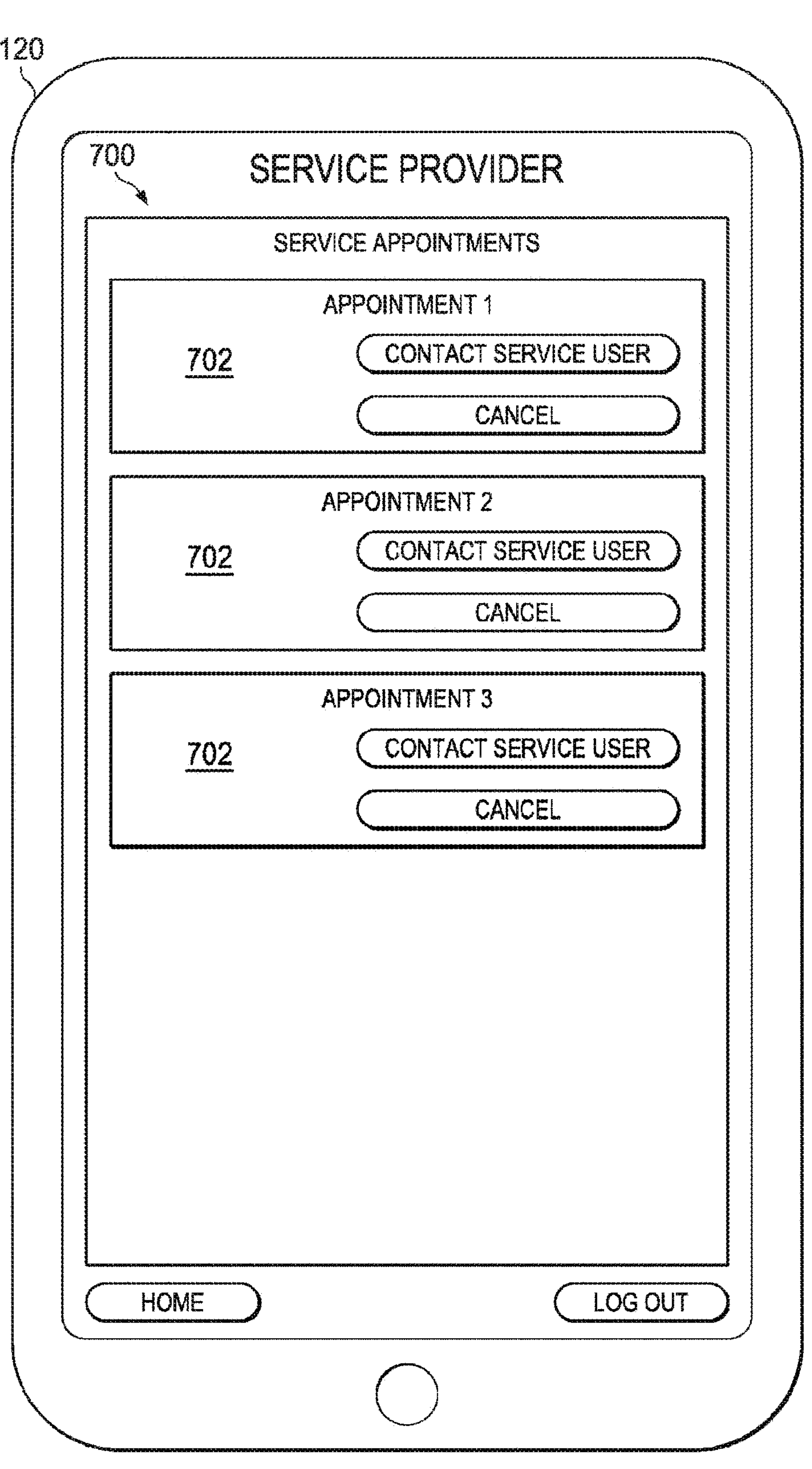

FIG. 7 depicts an example service appointments screen 700 through which a service provider 144 can view upcoming service appointments 702. The service appointments 702 can include relevant information, such as the type of service, the location of the job site, the amount (for fixed fee work) or the hourly rate, the requesting service user, and so forth.

Figure 8:
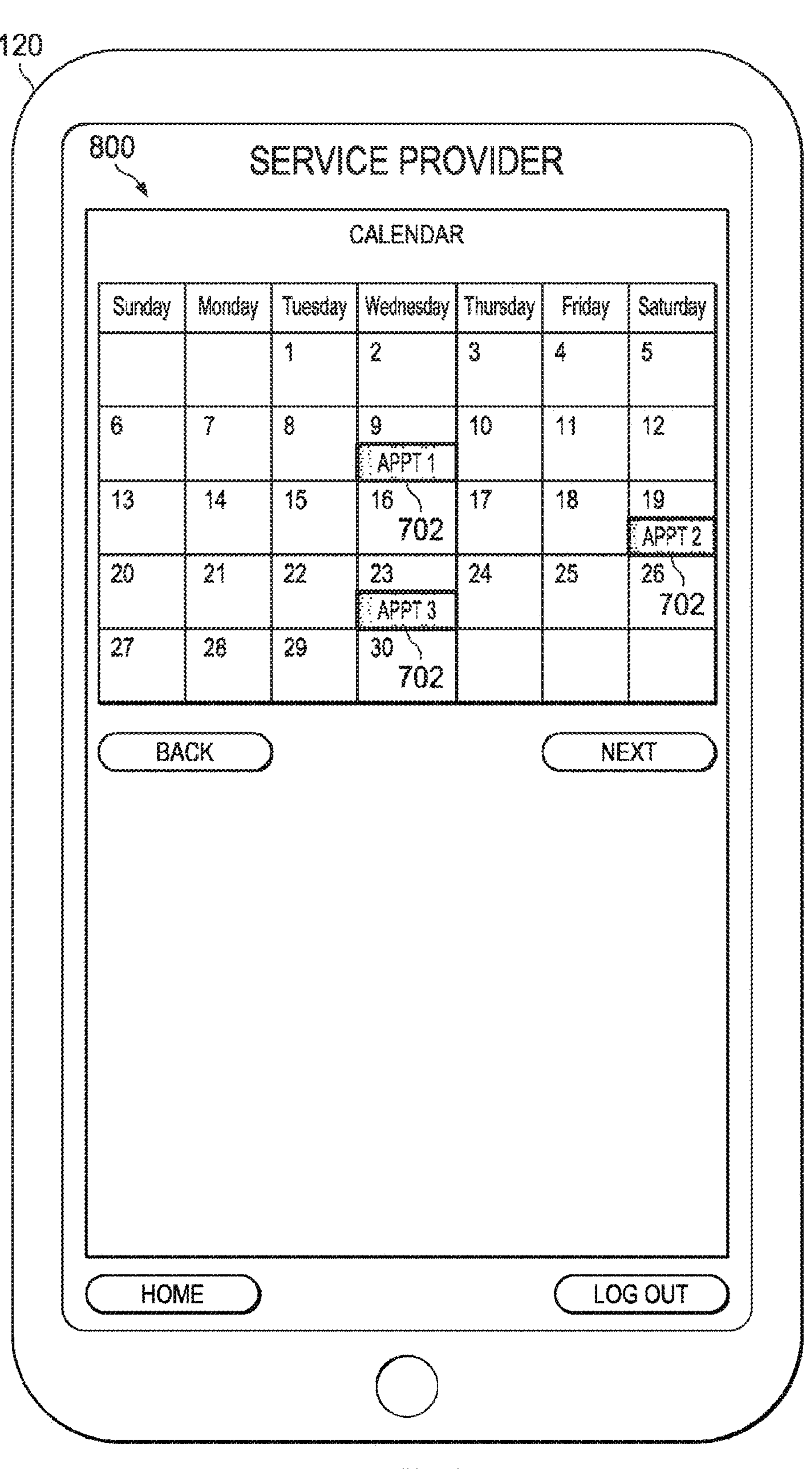

FIG. 8 depicts an example calendar screen 800 through which a service provider 144 can view upcoming service appointments 702. In some embodiments, the service provider 144 can also indicate available blocks of time for scheduling of future appointments. These available blocks of time can be used by the LME computing system 102 for selecting which service provider 144 to identify to a service user 142 in response to a query.

Figure 9:
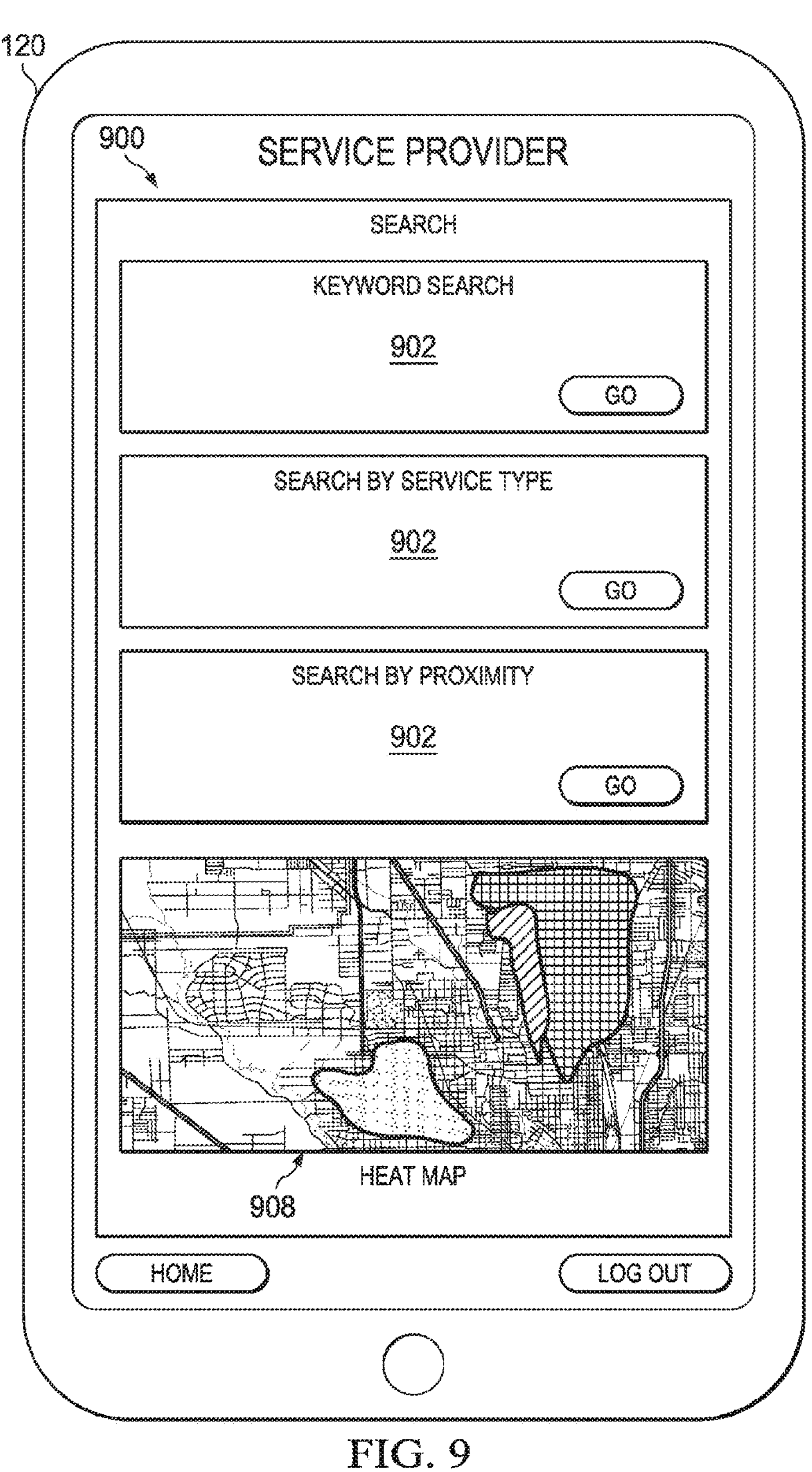

FIG. 9 depicts an example search screen 900 through which a service provider 144 can search for available service needs. In the illustrated embodiment, a variety of different search options are provided through the search screen 900, including a keyword search 902, a service type search 904, and a proximity search 906. In some embodiments, the search screen 900 (or other screen) can include a heat map 908 for visually displaying various forms of data to a service provider 144, as collected and analyzed by the LME computing system 102. While a wide variety of information can be collected and analyzed for display on the heat map 908, example information that can be mapped includes wage information, number of service requests submitted, number of complaints received, type of service requested, and number of service providers working in an area.

Figure 10:
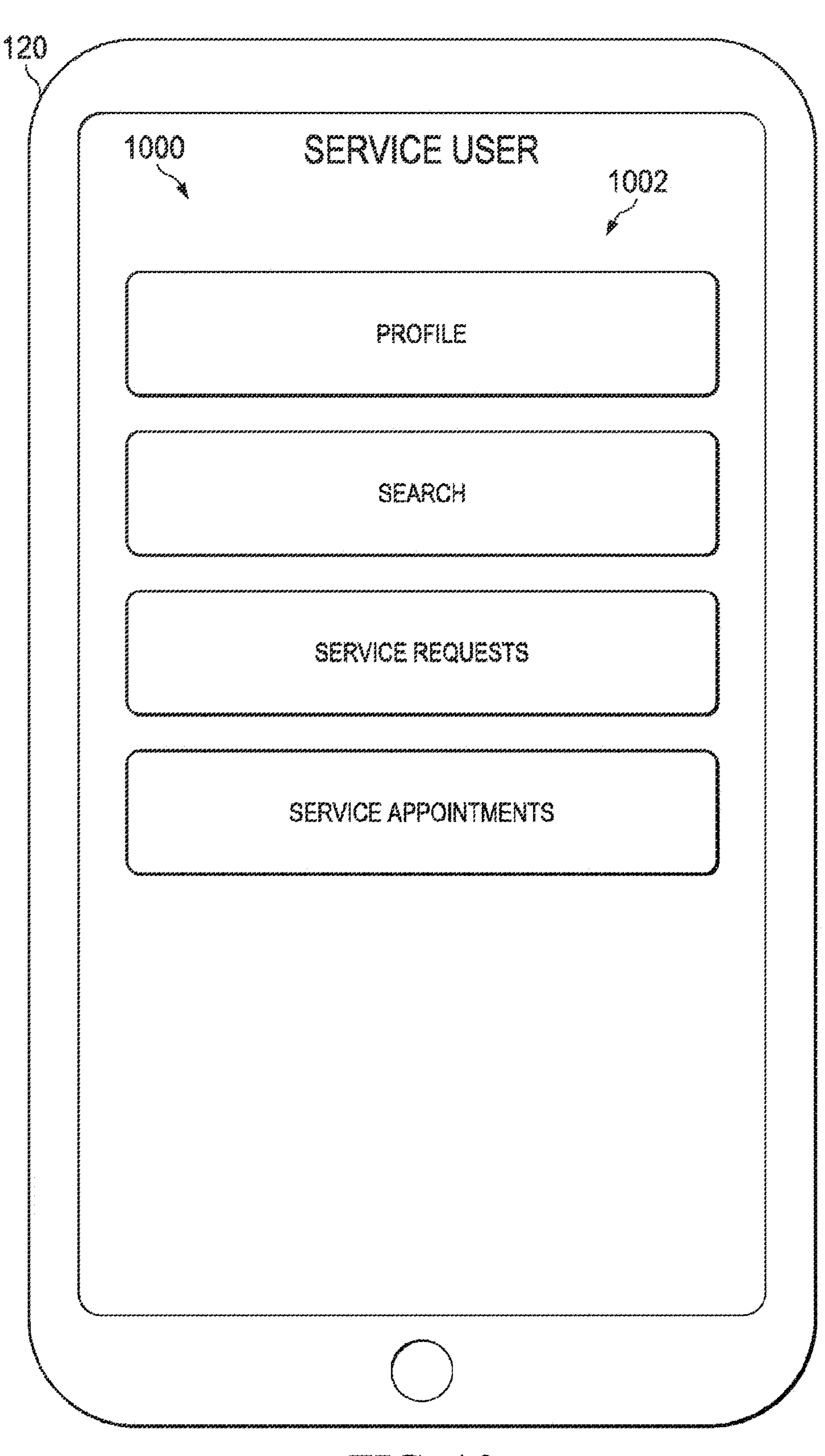

FIG. 10 depicts an example service user home screen 1000, which can include a plurality of selectable elements 1002 to allow a service user 142 to interact with the LME computing system 102. Example selectable elements 1002 can include, without limitation, a profile button, a search button, a service requests button, and a service appointments button. As it should be appreciated, activation of various selectable elements 1002 can initiate various modules, as depicted in FIG. 2, to offer certain functionality to the service user 142.

Figure 11:
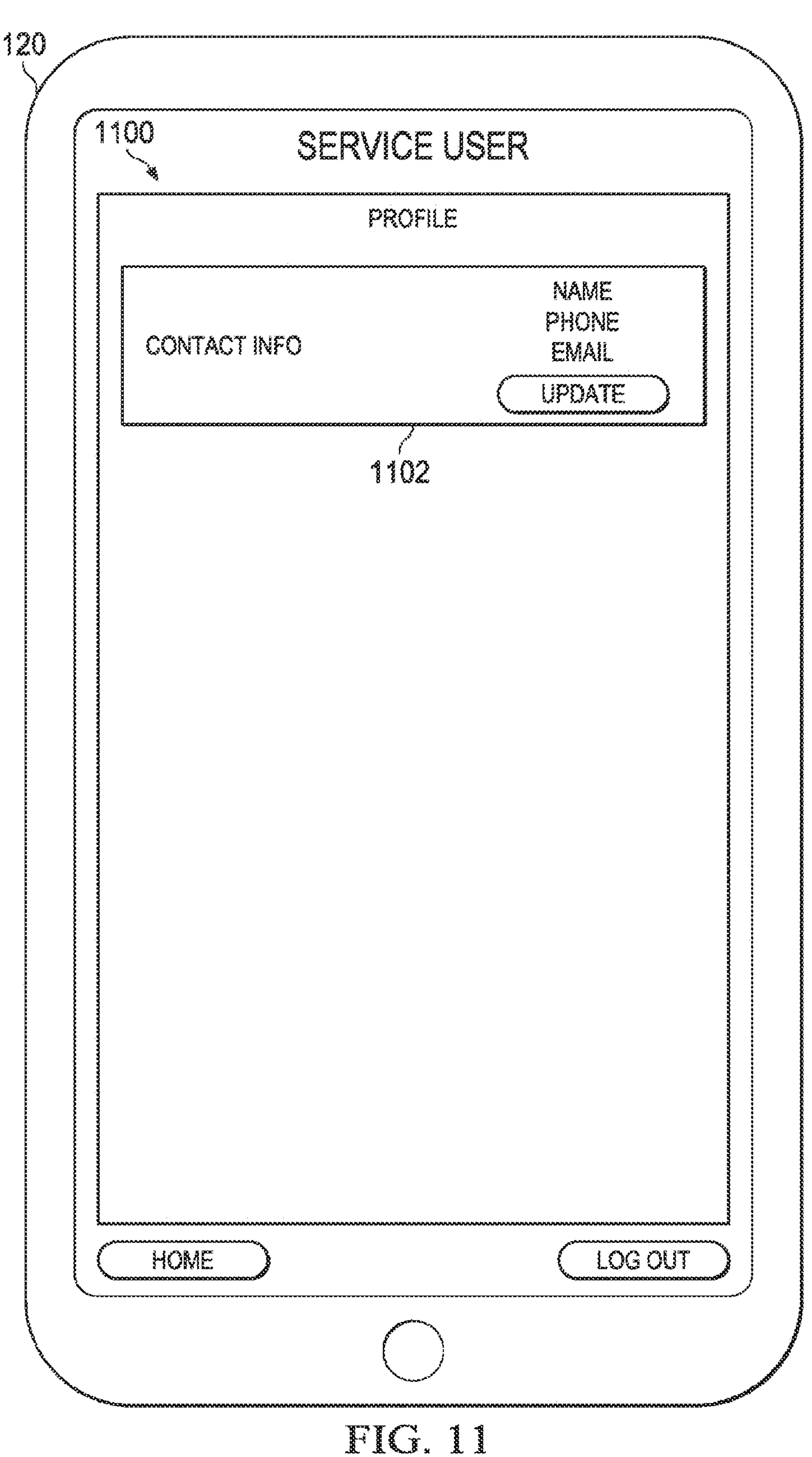
Figure 12:
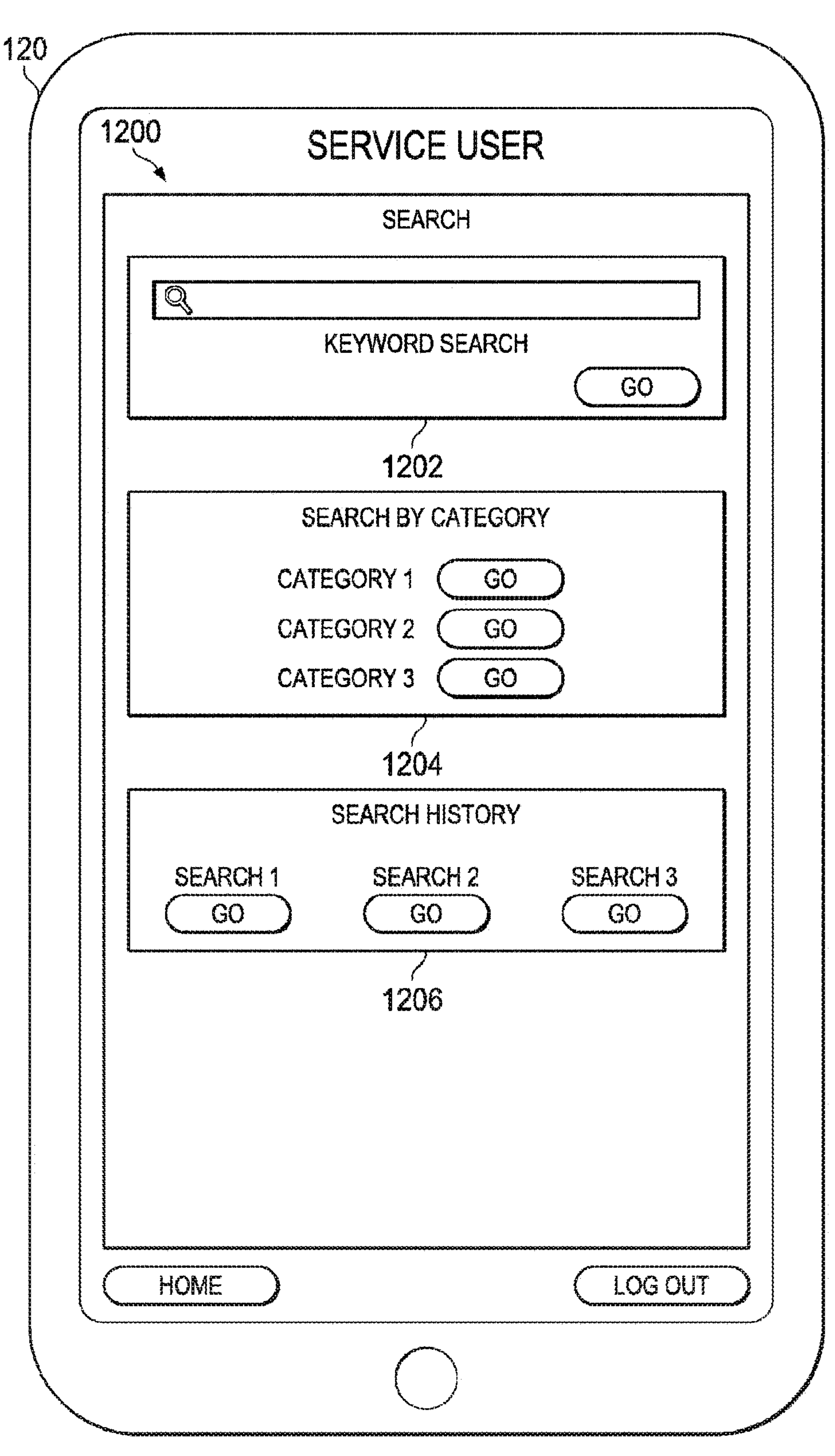

FIG. 11 depicts an example service user profile screen 1100 through which a service user 142 can selectively provide and subsequently update their profile information stored by the user profiles database 132 (FIG. 1). For illustration purposes, the service provider profile screen 1100 is depicted having a contact information section 1102. The contact information section 1102 can include, for example, a mobile number, an email address, a SKYPE number, and so forth FIG. 12 depicts an example search screen 1200 through which a service user 142 can search for service providers 144. In the illustrated embodiment, a variety of different search options are provided through the search screen 1200, including a keyword search 1202 and a category search 1204. A search history 1206 can allow the service user 142 to recall previously executed searches and re-run the search or modify one or more of the search parameters prior to re-running the search. Since service providers 144 can update skills and preferences in real-time and may be traveling, the same search executed at two different points in time can yield much different results.

Figure 13:
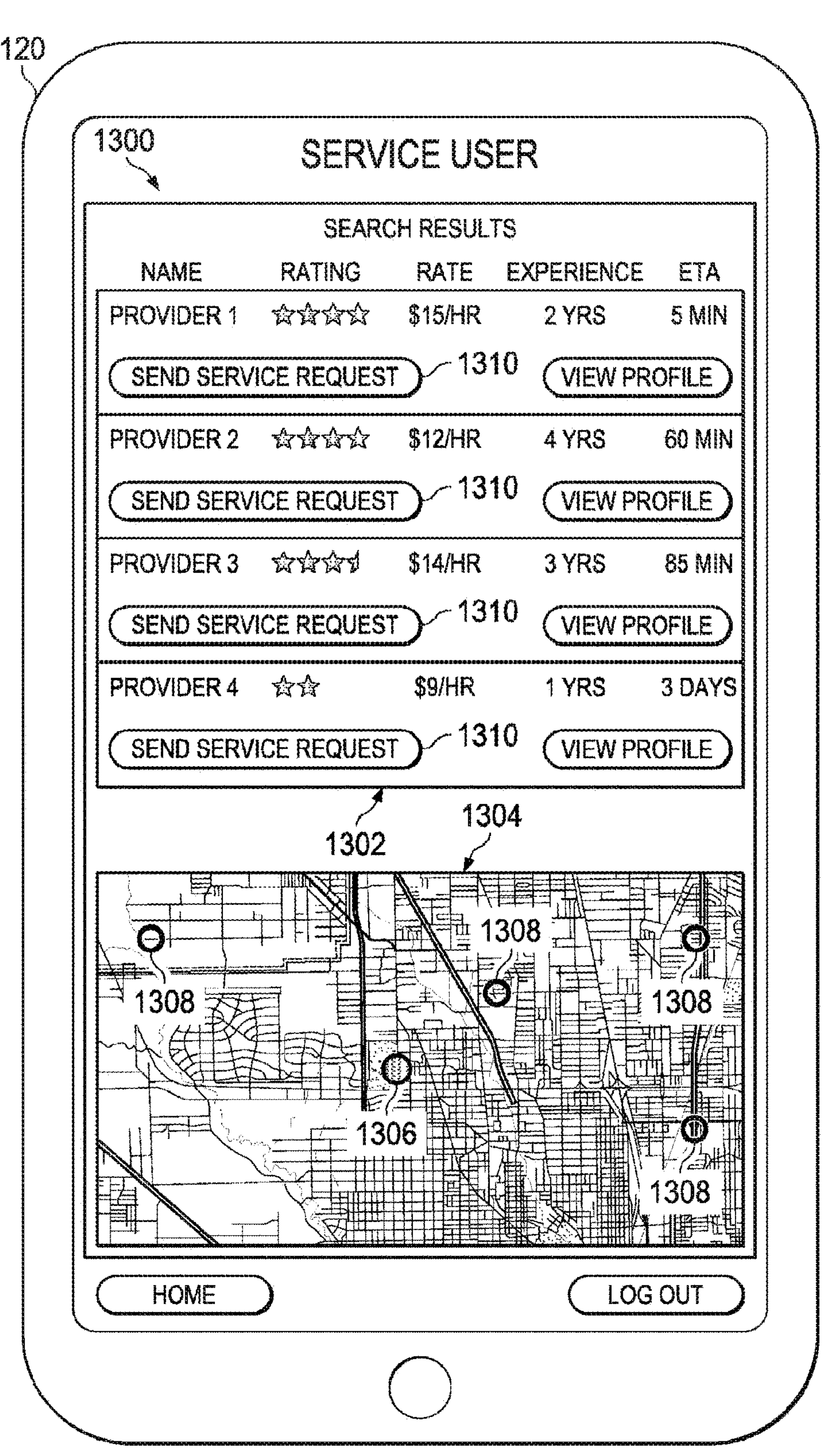

FIG. 13 depicts an example search results screen 1300 resulting from a search executed by the service user 142. A list of identified service providers 1302 can be graphically presented on the search results screen 1300. The identified service providers 1302 can be ranked or ordered based on various parameters, such as rating, rate, experience, or ETA. The ETA for the service provider 144 can be determined by the LME computing system 102 based on the location of the service and the last reported location of the communications device 120 of the respective service provider 144. A map 1304 on the search results screen 1300 can include an indication of the service user's location 1306, as well as the location 1308 of the identified service providers 1302. Once the service user 142 has identified an acceptable service provider from the list of identified service providers 1302, the service user 142 can activate the send service request button 1310 to begin the transaction with the selected service provider 144. The selected service provider 144 can then receive a notification that they have a pending service request (as shown in FIG. 4, for example). If they accept the service request (as shown in FIG. 6), the service appointment can be added to calendars of both users.

Figure 14:
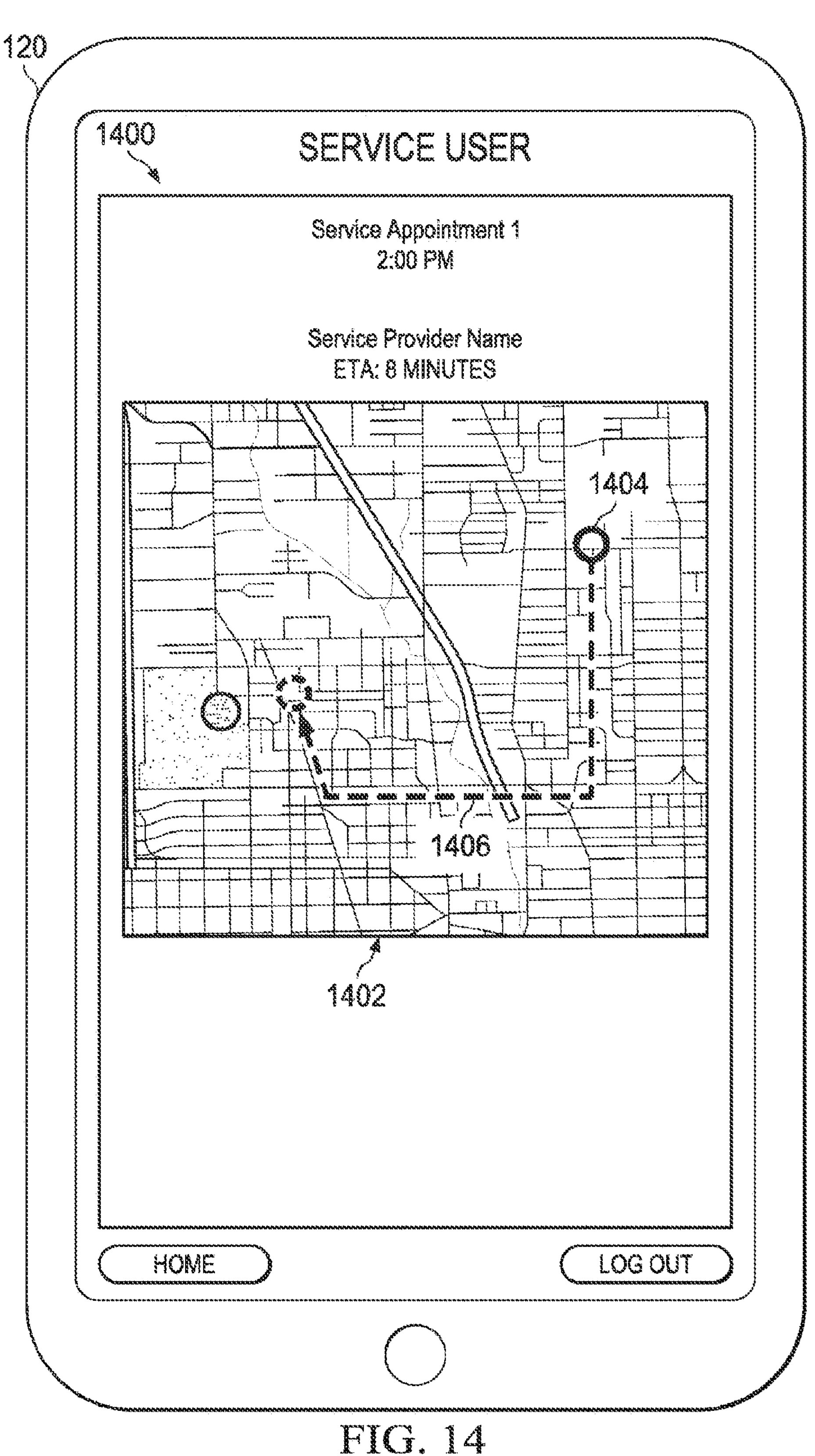

FIG. 14 depicts an example service appointment screen 1400 that can become available once certain conditions are satisfied, such as when the start time of the service appointment is within a certain timeframe and/or the ETA of the selected service provider 144 is within a certain timeframe. A map 1402 can be provided that graphically depicts the location 1404 of the selected service provider 144, with the travel path 1406 of the selected service provider updated in real-time, or substantially real-time, based on communications received from communications device 120 of the selected service provider 144 by the LME computing system 102.

Figure 15:
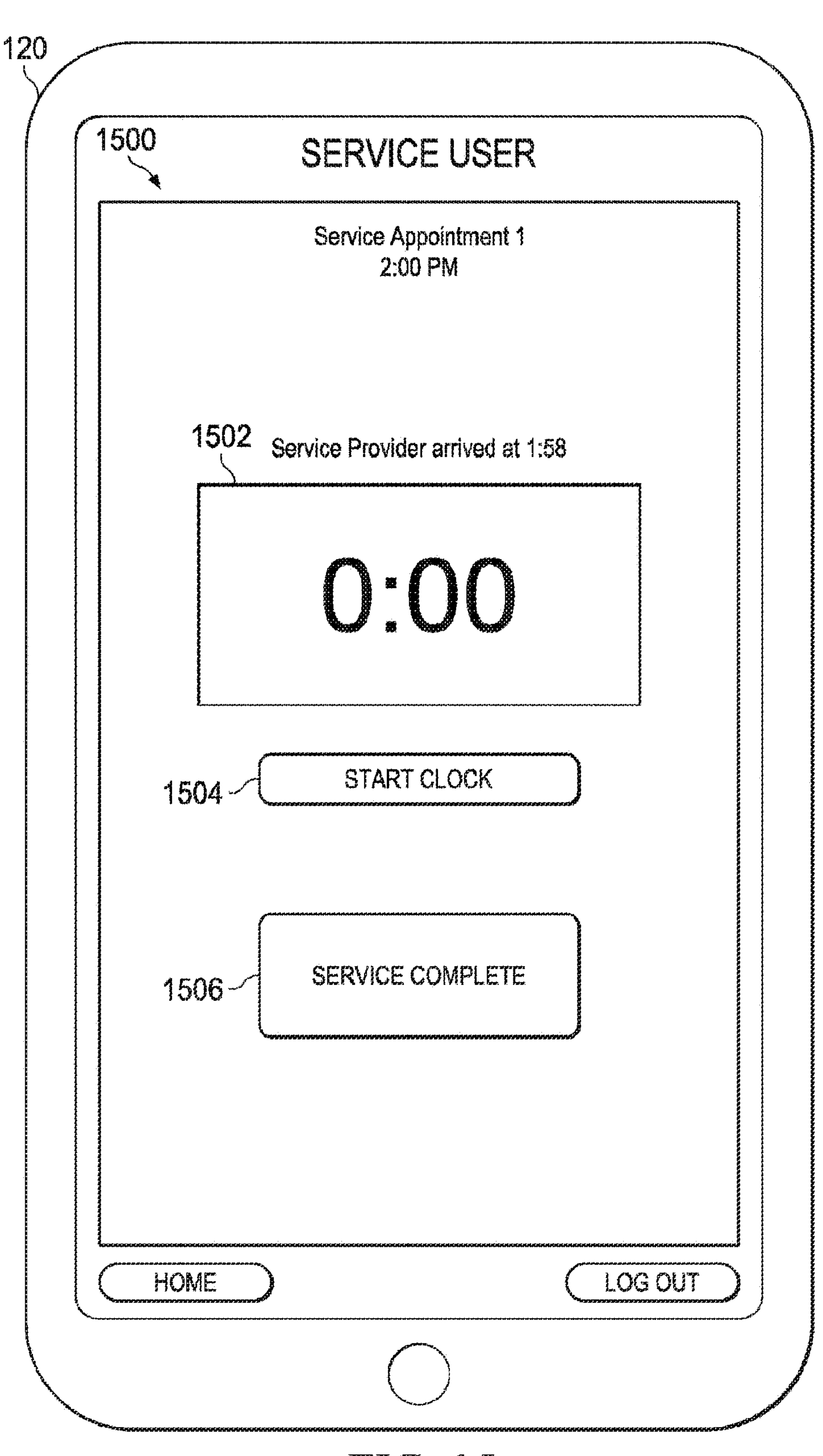

FIG. 15 depicts an example timer screen 1500 that can be used to track a service provider's time on a job site and, for services paid by the hour, can be used to determine the amount owed to the service provider 144. In some embodiments, the service provider 144 can interact with a similar timer screen and request initiation of the time. The service user 142 can confirm the imitation of a timer 1502 by selecting a start clock button 1504. At the conclusion of the service the service, user 142 can activate a service complete button 1506 to stop the timer 1502 and being the payment process.

Figure 16:
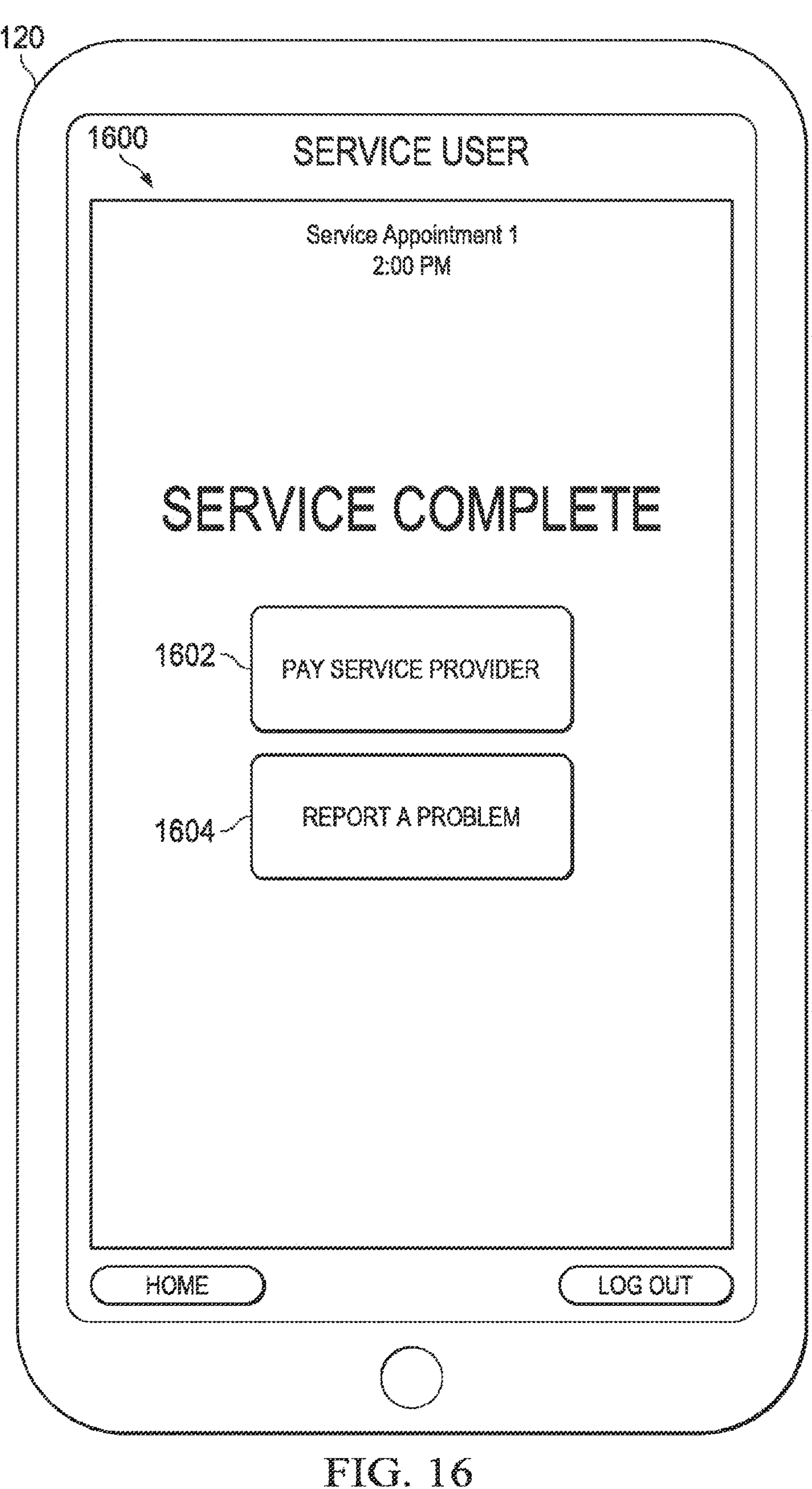

FIG. 16 depicts an example service complete screen 1600 for the service user 142. Through interactions with the service complete screen 1600, the service user 142 can initiate payment to the service provider 144 by selecting the pay service provider button 1602 and/or can report a problem to the LME computing system 102 by selecting the report a problem button 1604.

Figure 17:
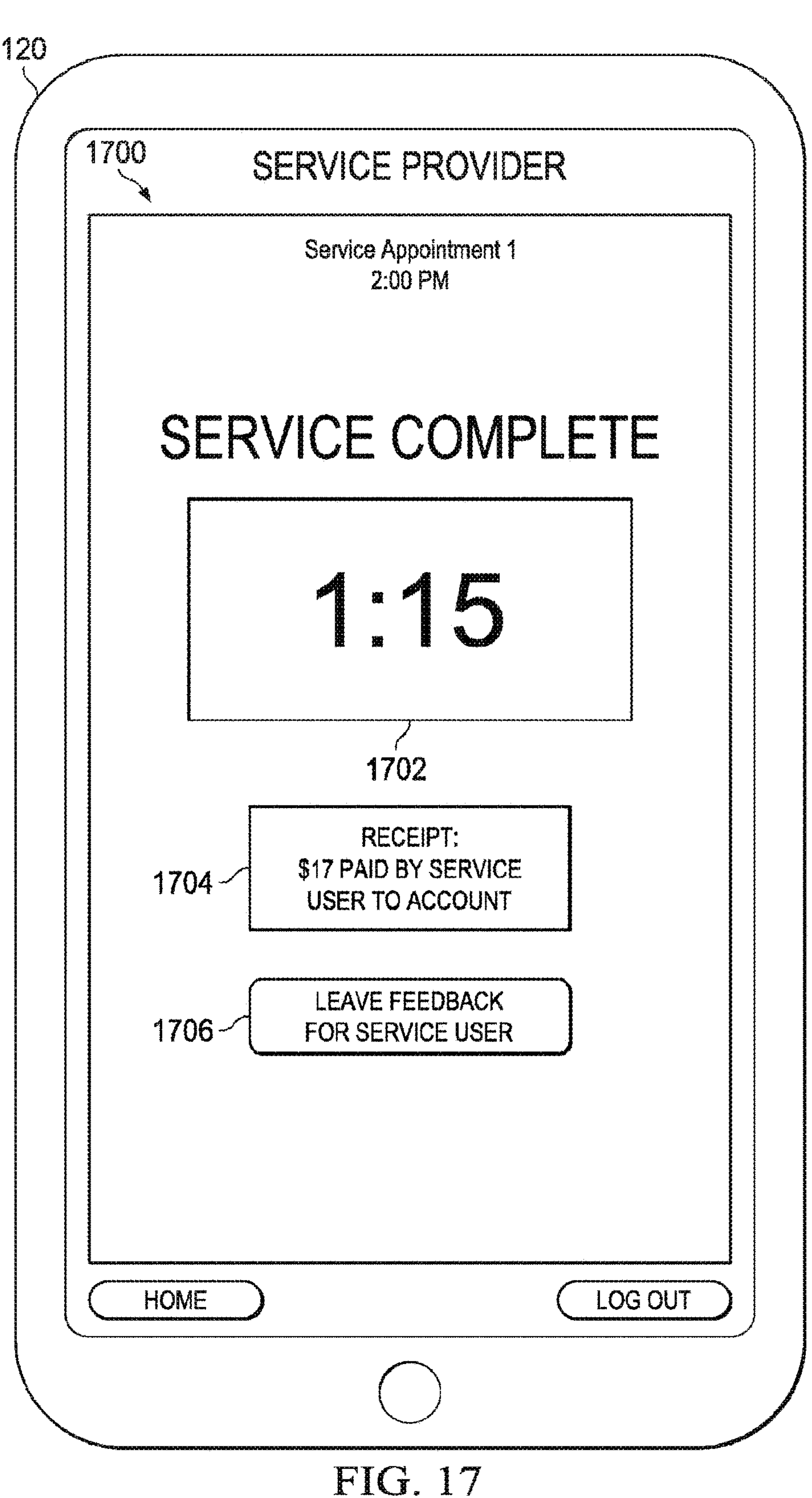

FIG. 17 depicts an example service complete screen 1700 for the service provider 144. The service complete screen 1700 can indicate the total time 1702 spent providing the service, provide an e-receipt 1704, and allow the service provider 144 to leave feedback for the service user 142 through activation of the leave feedback for service user button 1706.

Figure 18:
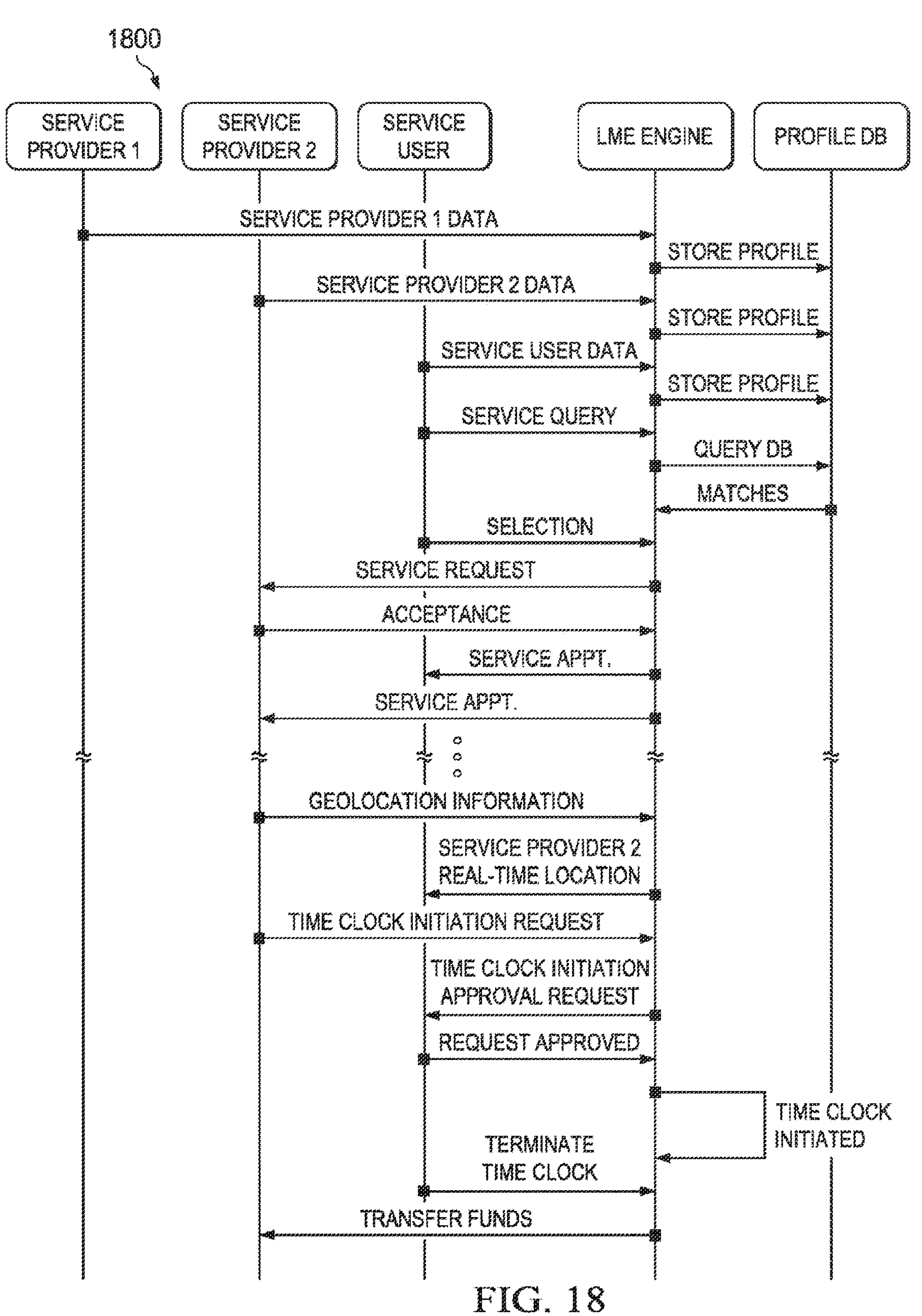
FIG. 18 depicts an example message sequence chart in accordance with one non-limiting embodiment.

Turning now to FIG. 18, an example message sequence chart 1800 is depicted in accordance with one non-limiting embodiment. The message sequence chart 1800 depicts example messaging between a service provider 1, a service provider 2, a service user, an LME engine, and a profile database. First, the service provider 1 provides service provider 1 data to the LME engine, which, in turn, stores a profile for service provider 1 in the profile database. Next, the service provider 2 provides service provider 2 data to the LME engine, which, in turn, stores a profile for service provider 2 in the profile database. The data received from the service providers 1 and 2 can include, without limitation, skills, certifications, contact information, preferences, communications device information, and so forth. A service user then submits service user data to the LME engine and a profile for the service user is stored in the profile database. Next, the service user submits a service query to the LME engine. Based on the service query, the LME engine queries the profile DB to determine which, if any, service providers can be identified to the service user based on the query. In some cases, the real time locations of the service provider 1 and/or service provider 2 are polled by the LME engine. The matches are returned to the LME engine and a selection of an identified service provider is received from the LME engine by the service user. The LME engine then sends a request to the selected service provider (shown as service provider 2). In the illustrated message sequence chart, the selected service provider indicates the acceptance of the service request to the LME engine. In response, the LME engine generates a service appointment and puts in on the calendars of both the service user and the service provider 2. Geolocation information of the service provider 2 is provided to the LME engine. When the start time of the service appointment is within predetermined window (e.g., a 15 minute window) the LME engine provides real-time location information to the service user. When the service provider 2 arrives at the service site, a time clock initiation request is submitted to the LME engine. The LME engine then transmits a time clock initiation approval request to the service user. When the service user approves the request, the LME initiates the time clock. The service user then sends a message to the LME engine to terminate the time clock. The LME engine then facilities the transfer of funds to the service provider 2.

Figure 19:
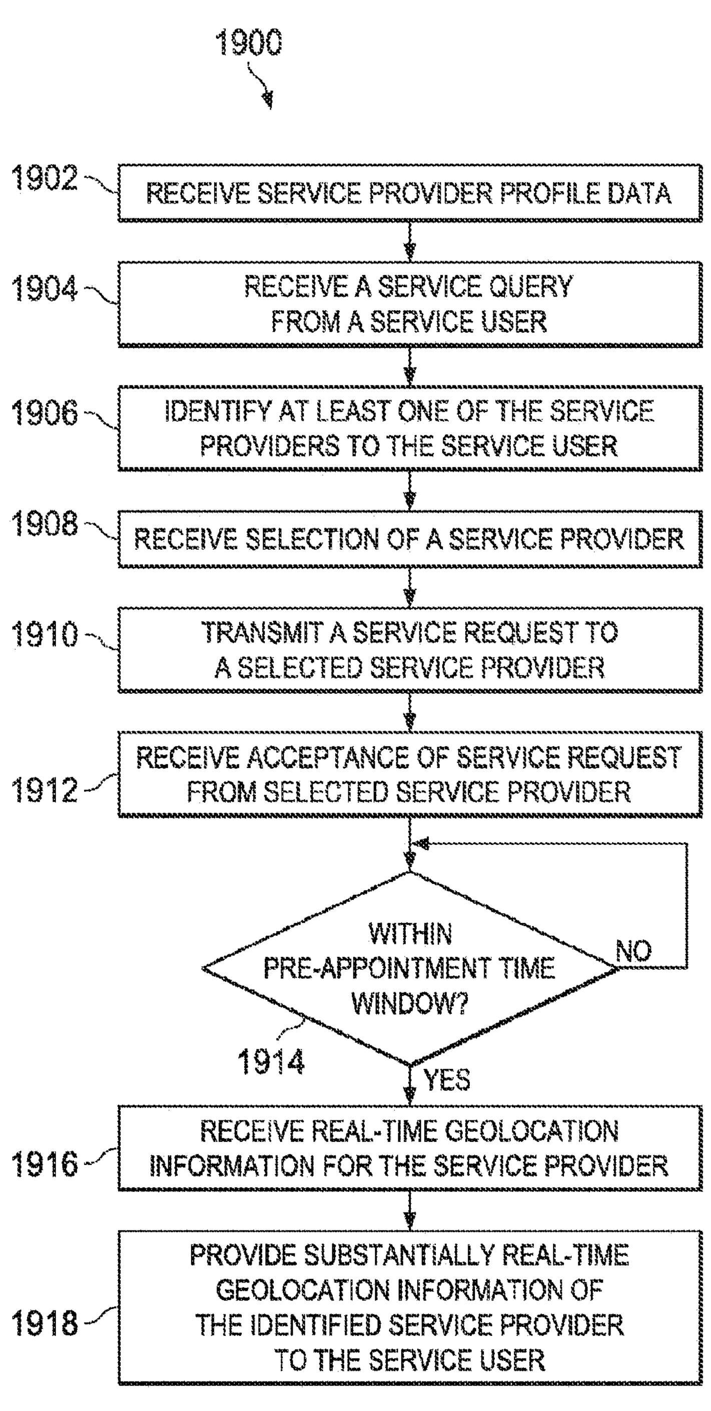
FIG. 19 is a simplified flow diagram of at least one embodiment of a method for matching a service user to a service provider that can be executed by the LME computing system of FIGS. 1 and 2.

FIG. 19 is a simplified flow diagram 1900 of at least one embodiment of a method for matching a service provider to a service user that can be executed by the LME computing system 102 of FIGS. 1 and 2. At block 1902, service provider profile data is received from each of a plurality of service providers. The service provider profile data can comprise at least one type of service offering. At block 1904, a service query is received from a service user. The service query comprises a plurality of query parameters, wherein the query parameters can comprise a geolocation parameter and a service type parameter. At block 1906, at least one of the service providers is identified to the service user. The identification can be based on the service provider profile data, the query parameters, and a geolocation position associated with the at least one service provider. At block 1908, a selection of one of the identified service providers is received from the service user. At block 1910, a service request is transmitted to the selected service provider. At block 1912, an acceptance of the service request is received from the selected service provider. At 1914, it is determined whether the current time is within the pre-appointment time window. When the current time is determined to be within the pre-appointment time window, at block 1916, real-time geolocation information of the identified service provider is received and provided to the service user at block 1918.

Figure 20:
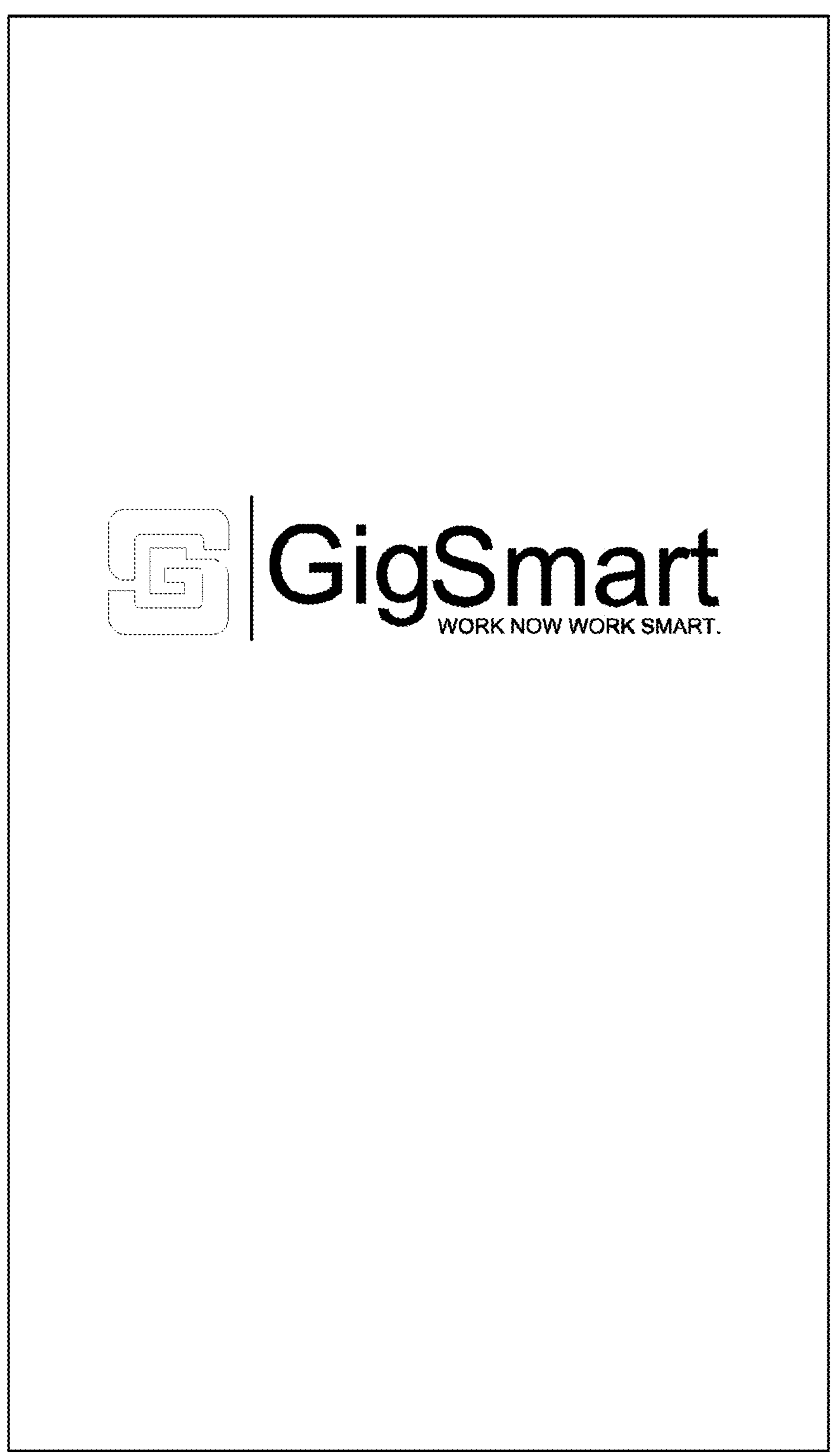
FIGS. 20-105 depict select exemplary user interfaces that can be generated by an example LME computing system for presentation to service providers in accordance with various non-limiting embodiments.
Figure 21:
Figure 22:
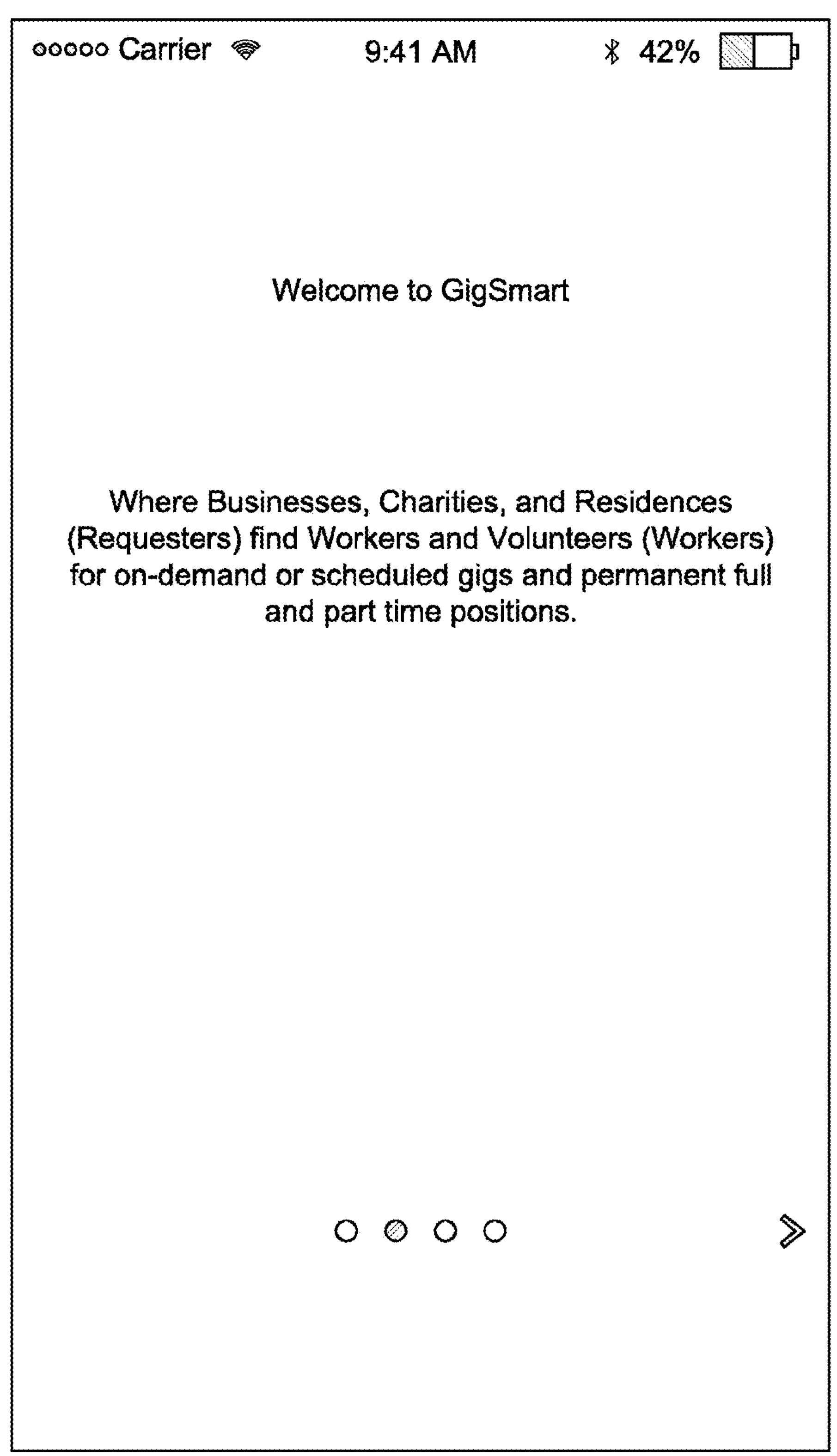
Figure 23:
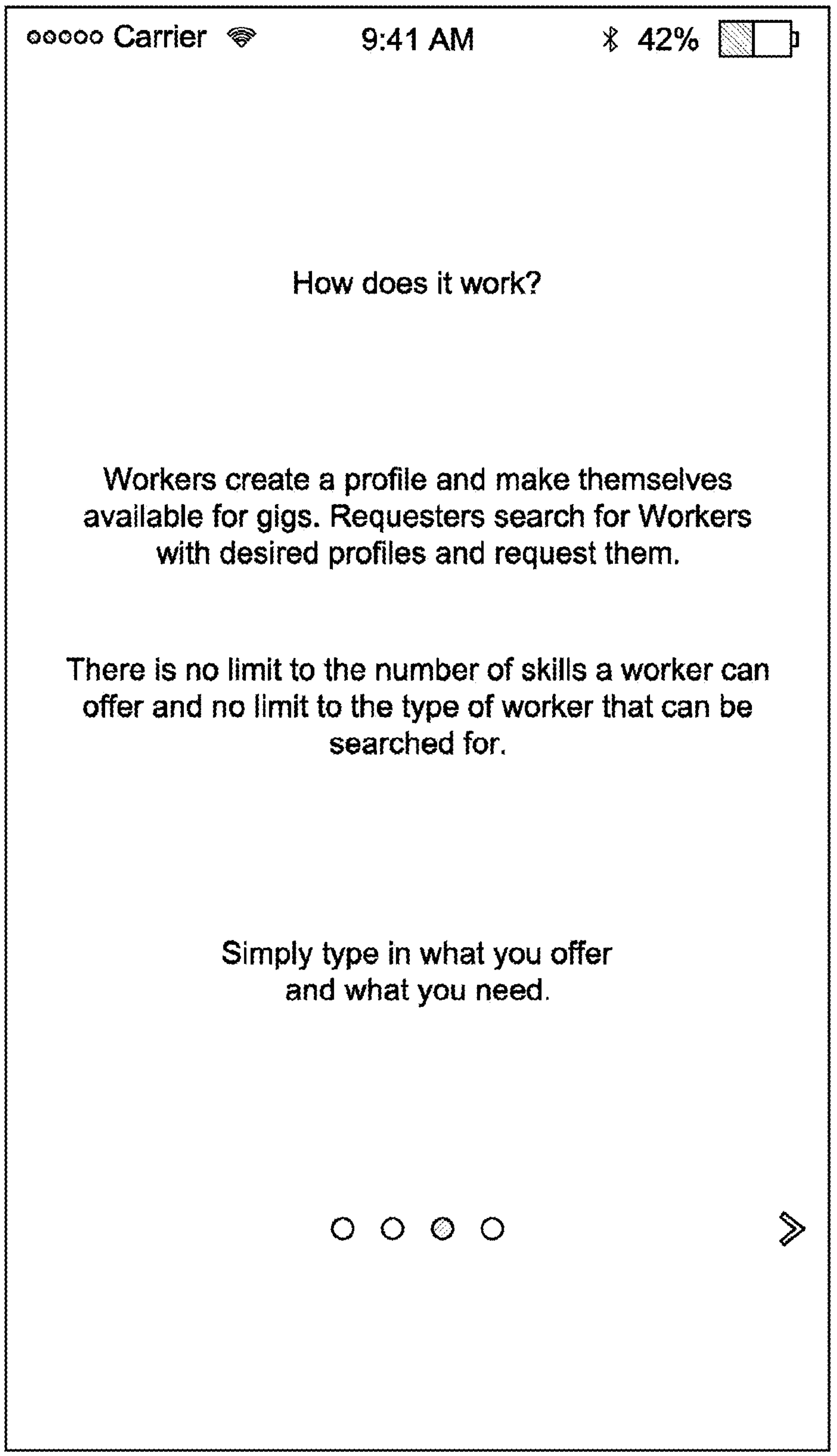
Figure 25:
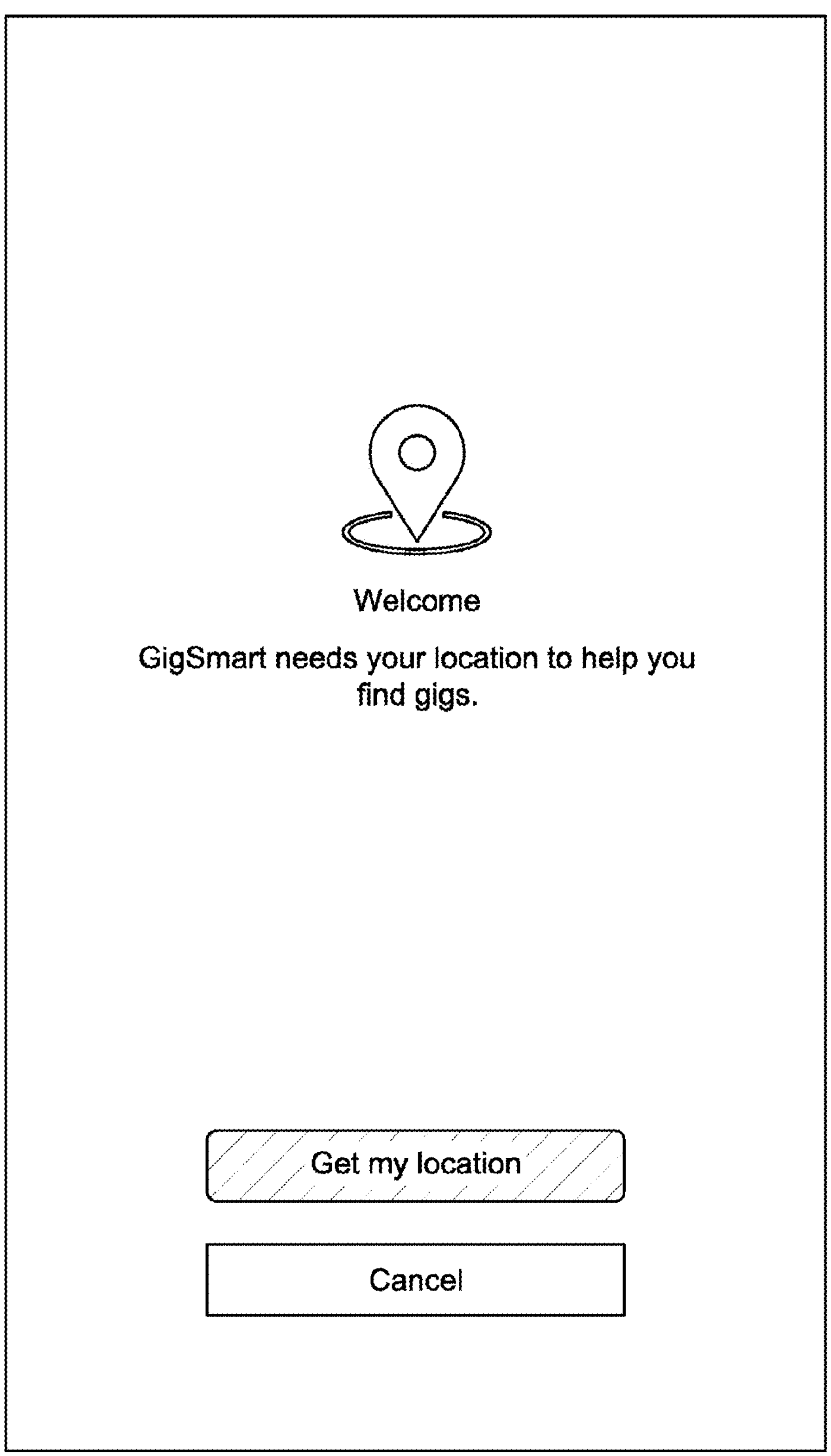
Figure 26:
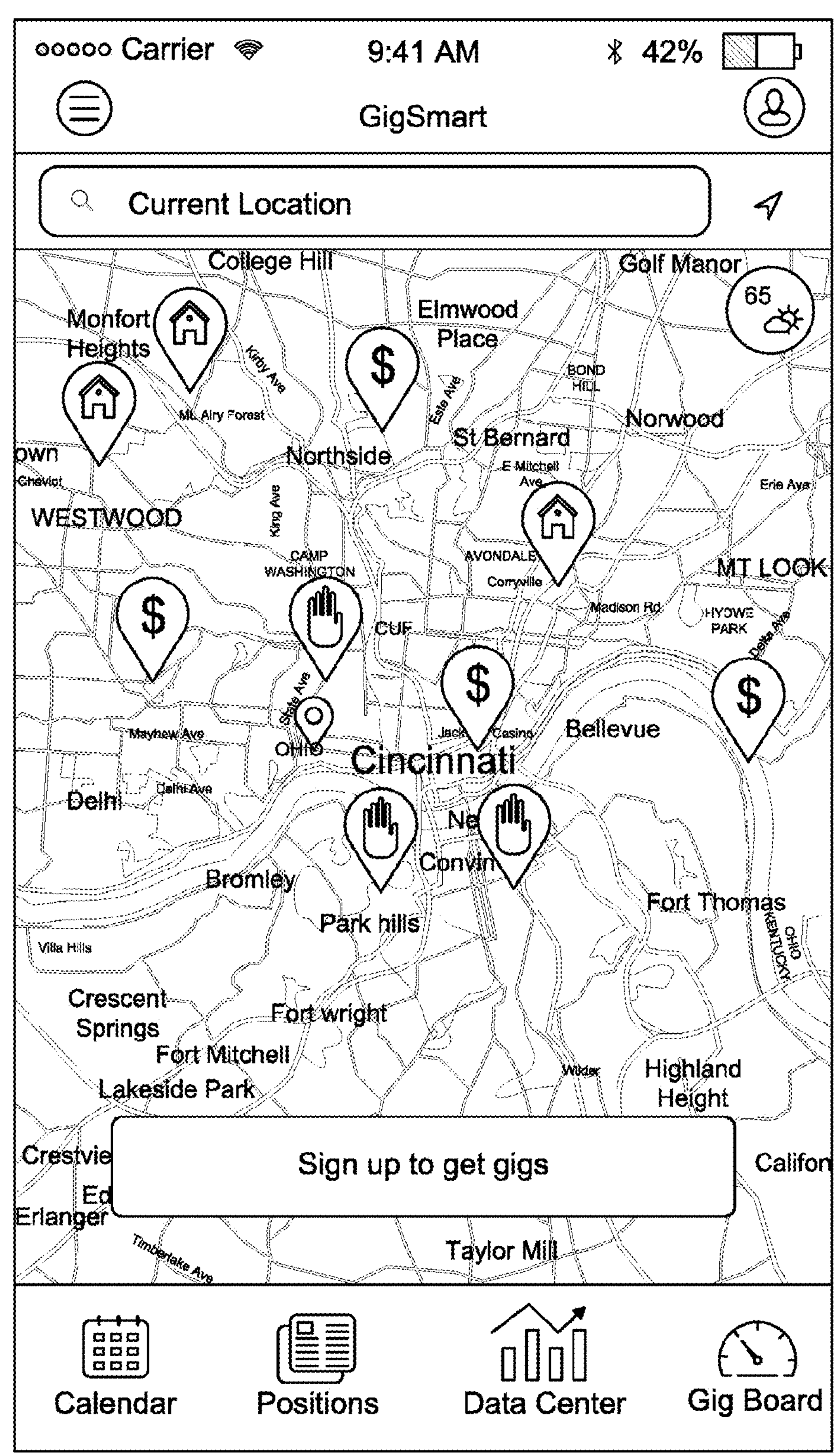
Figure 27:
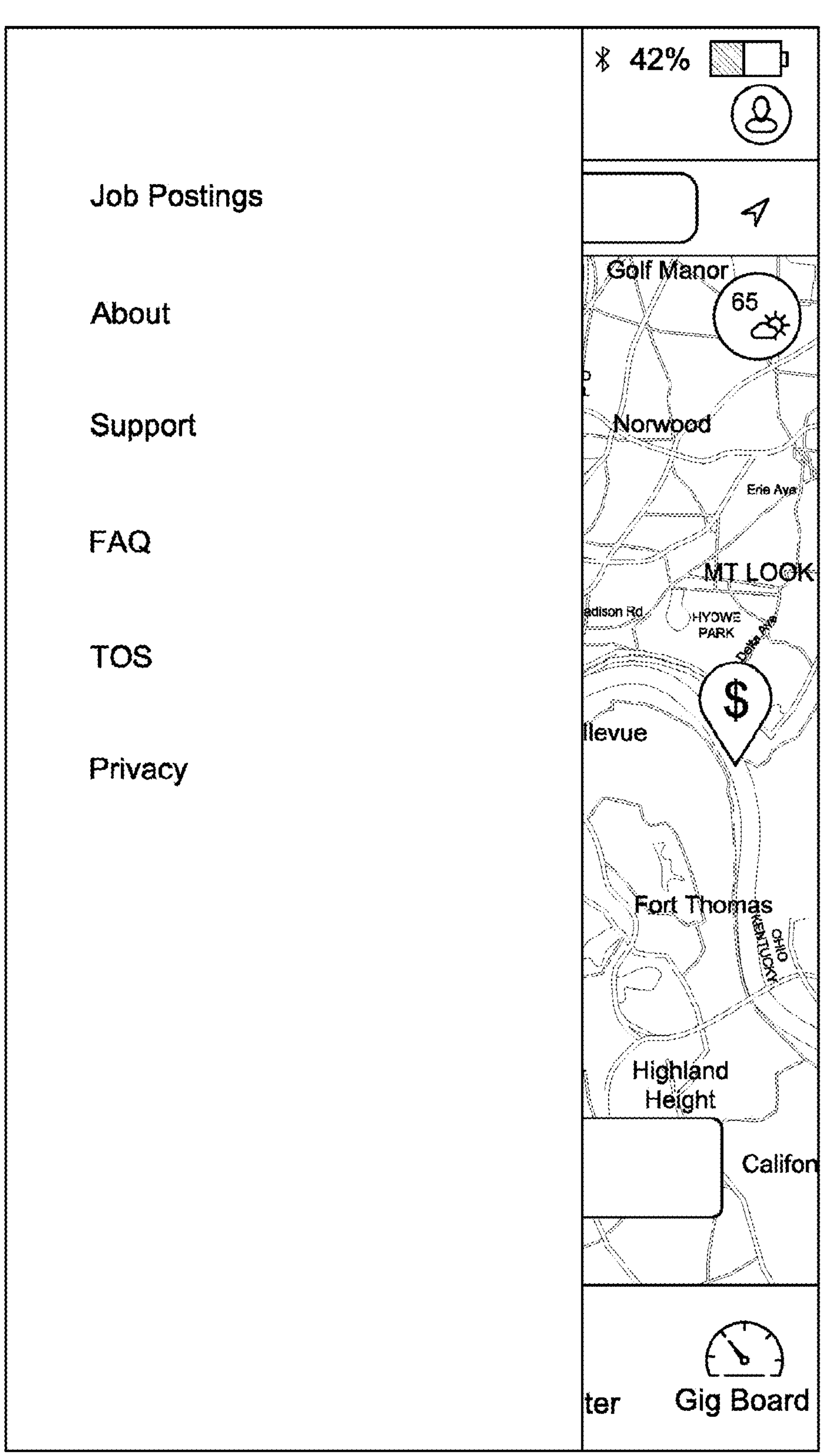
Figure 28:
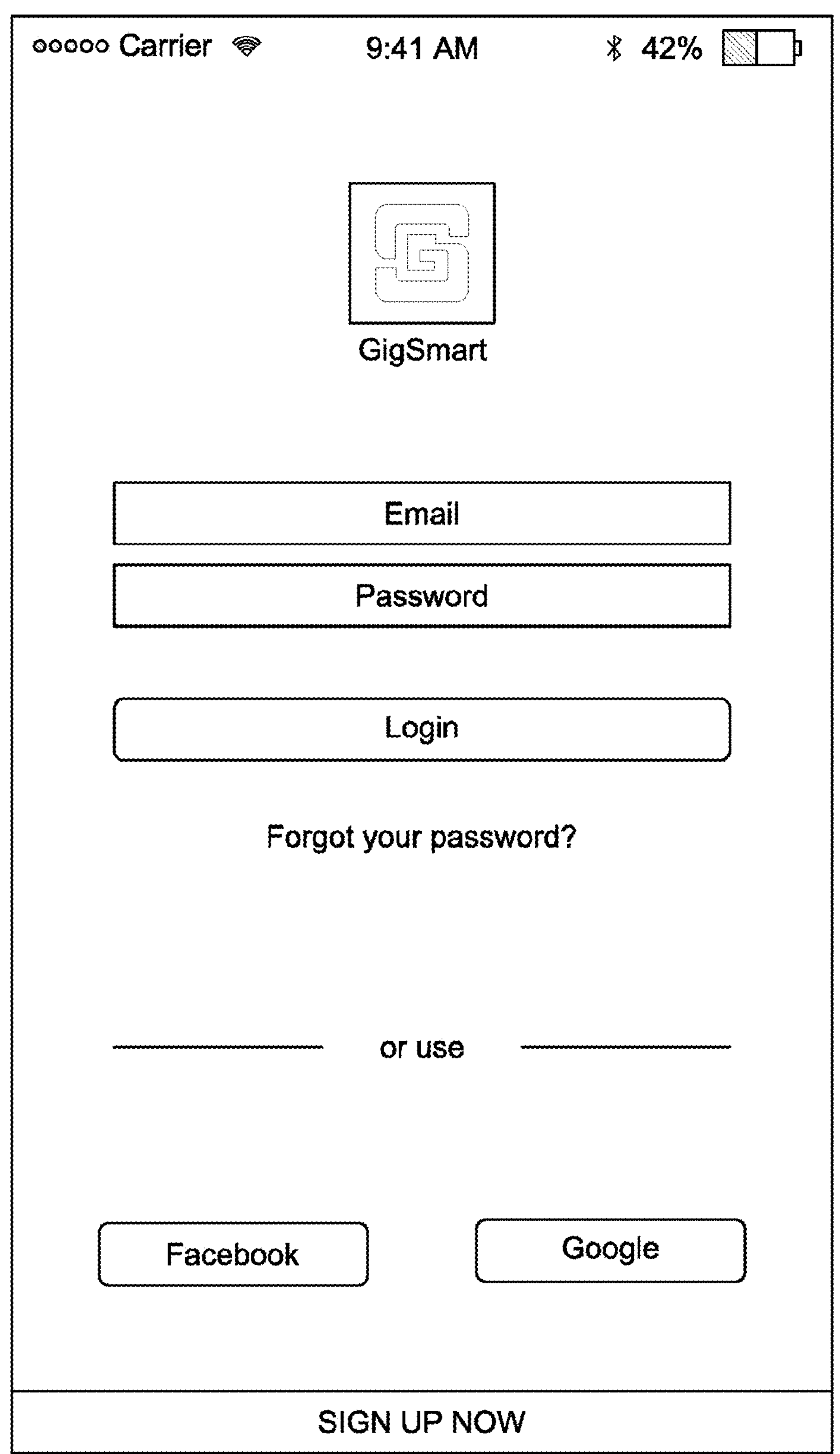
Figure 34:
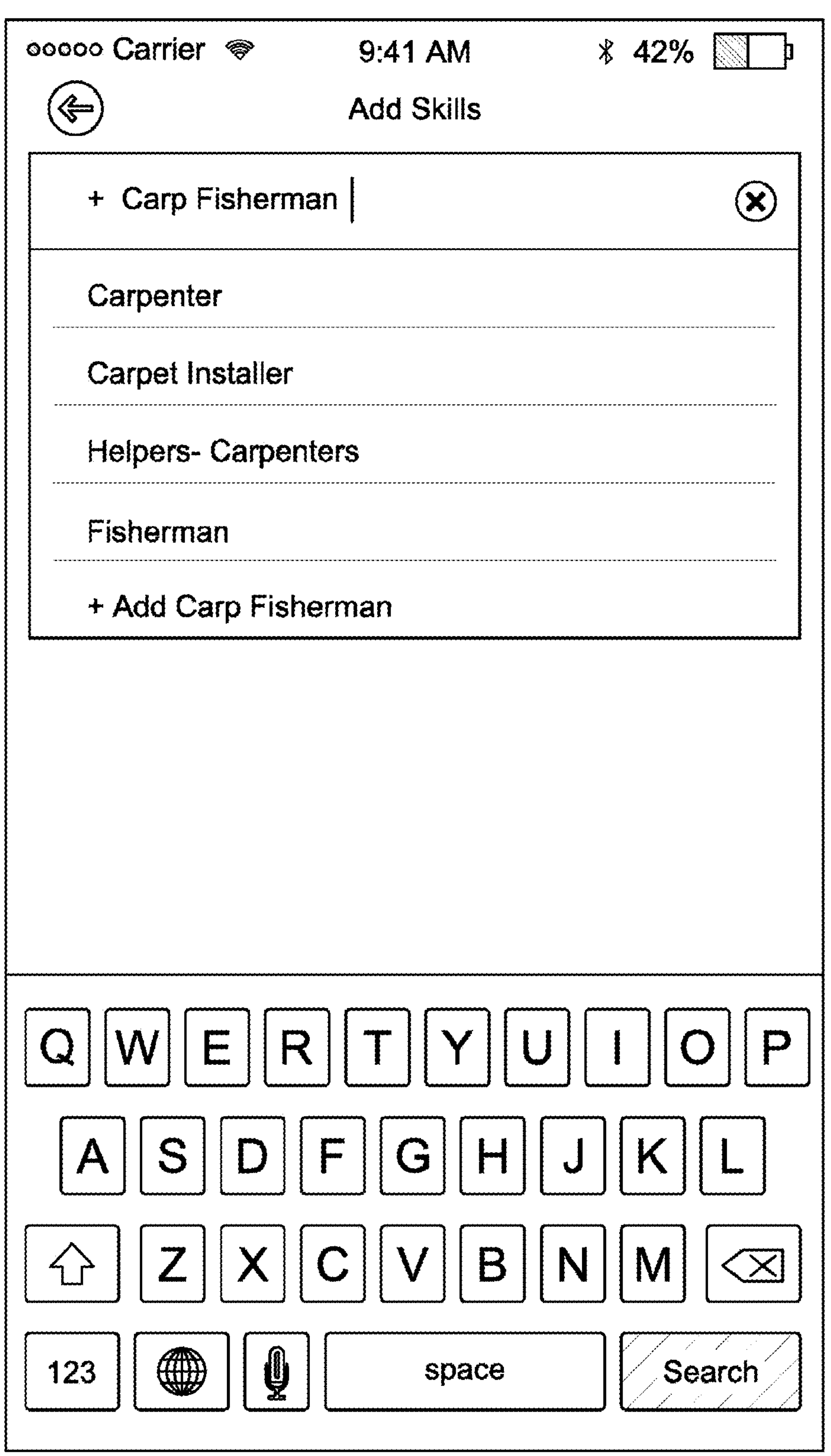
Figure 38:
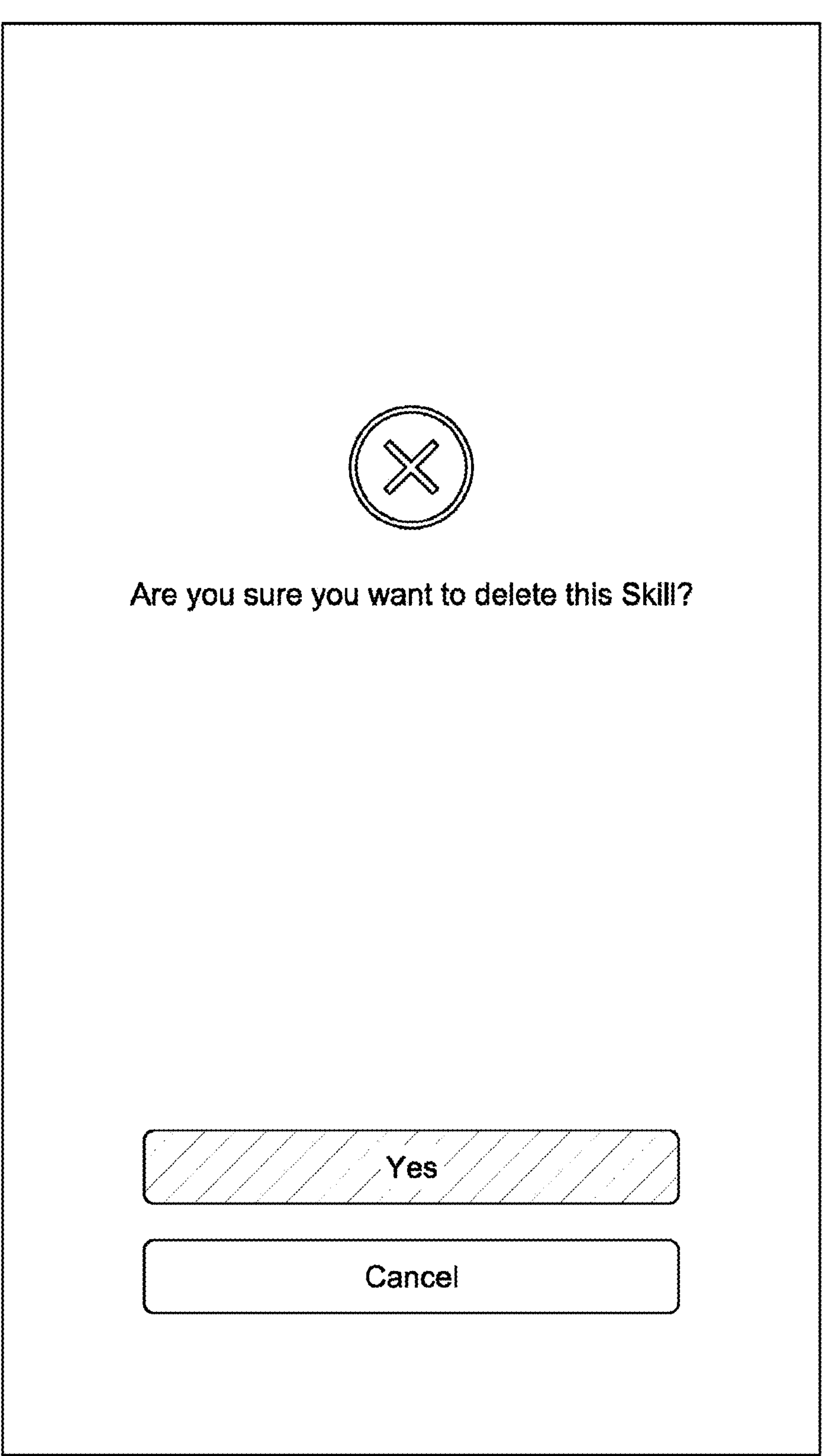
Figure 39:
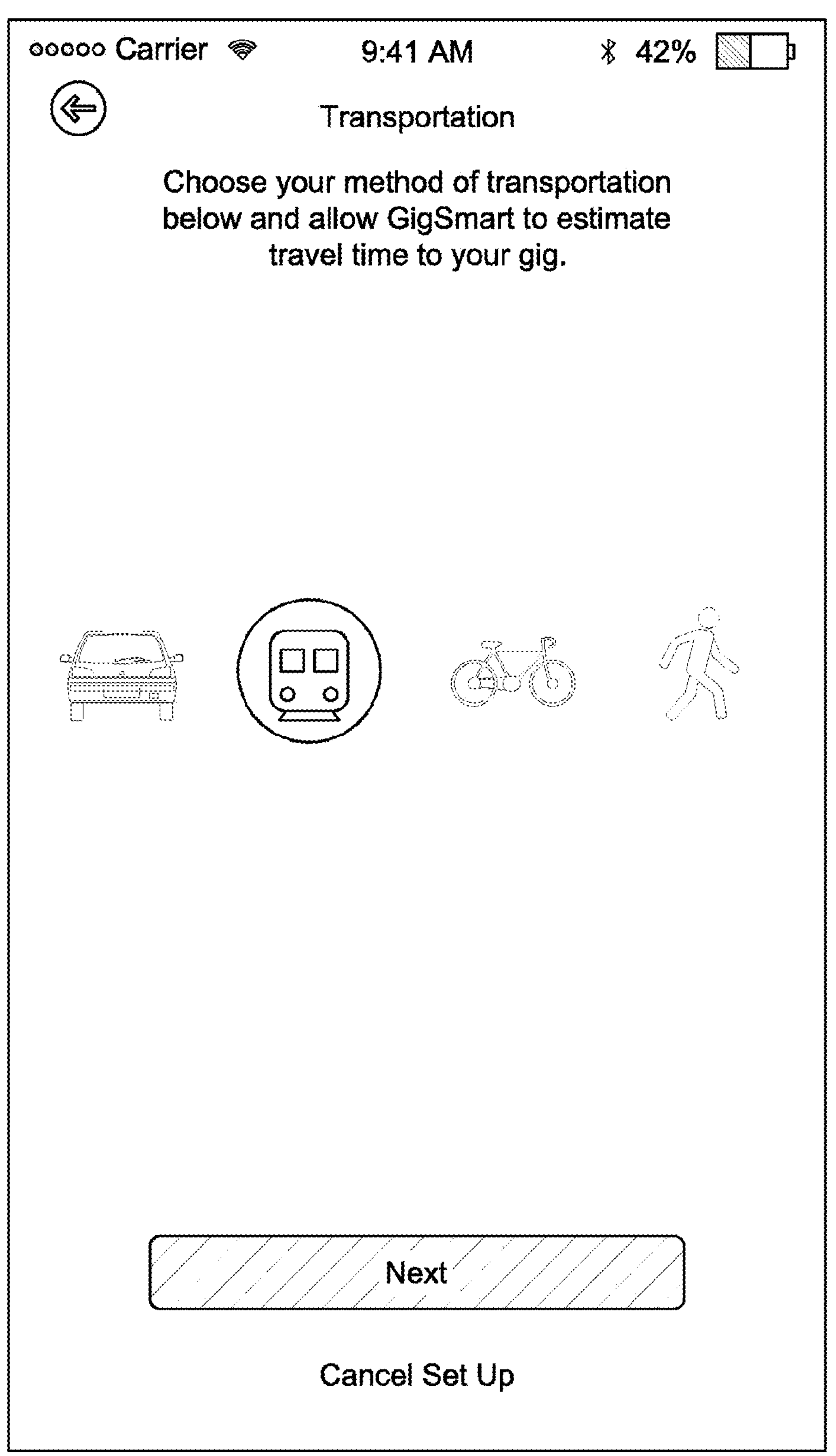
Figure 43:
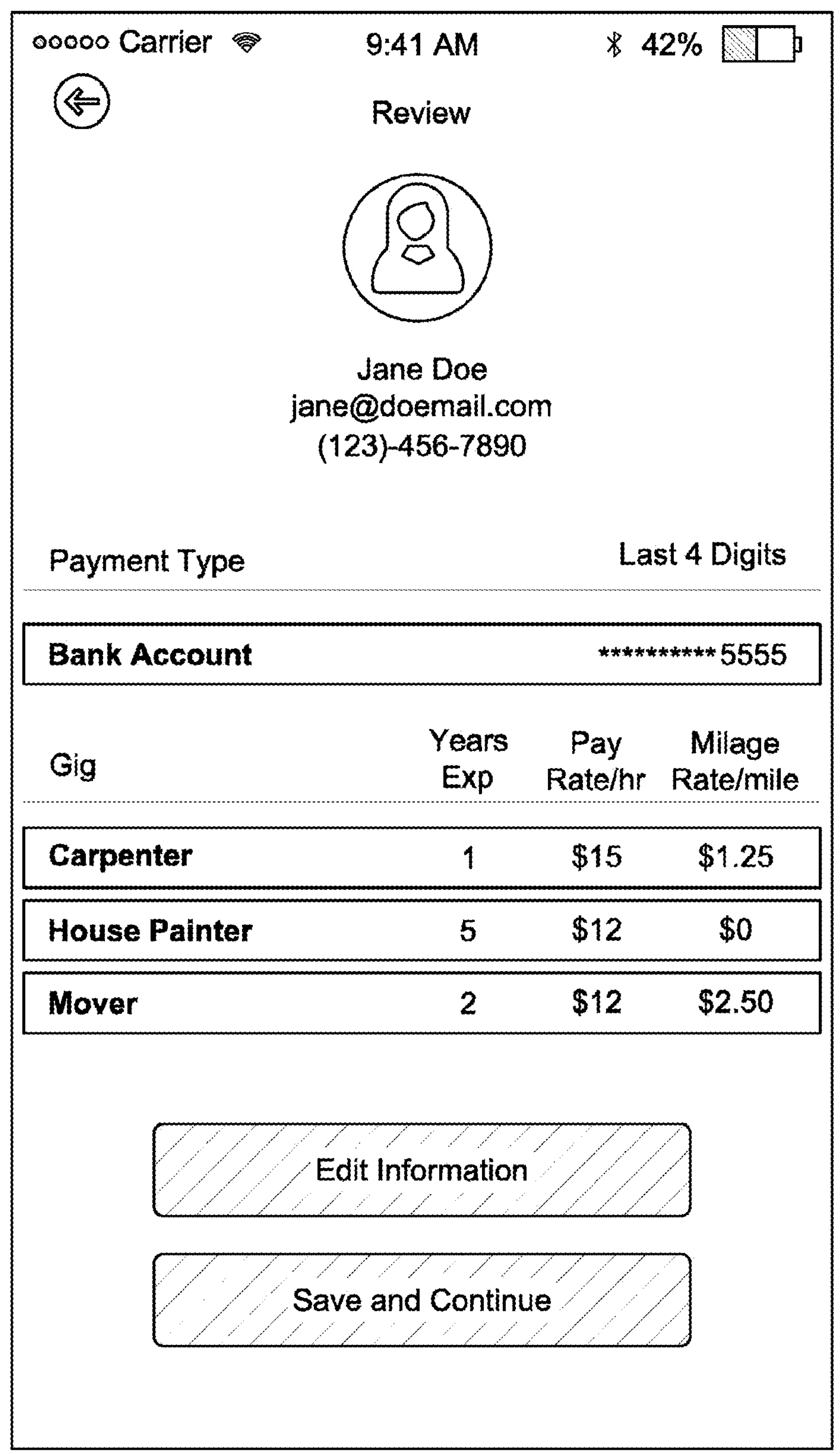
Figure 44:
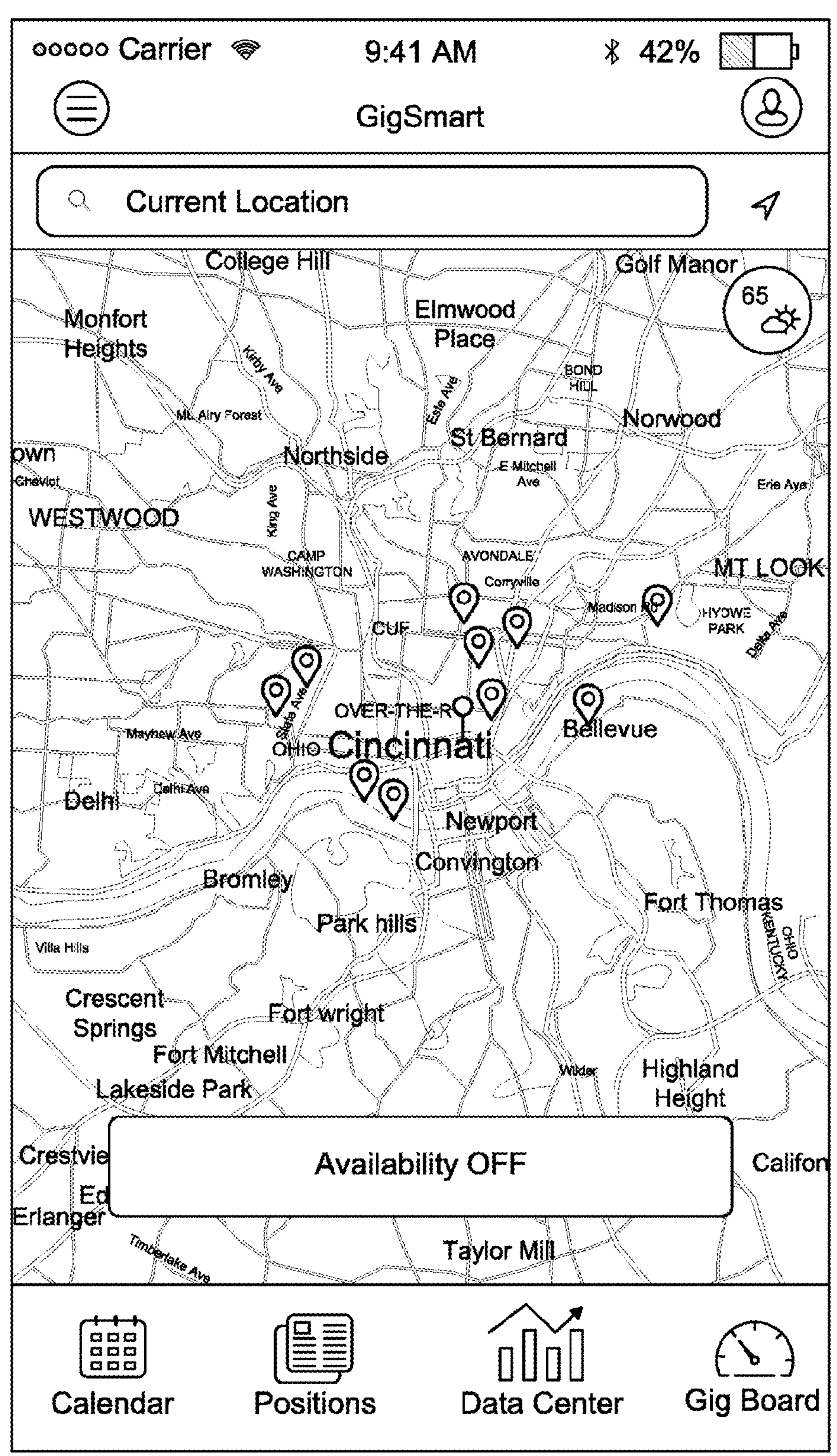
Figure 47:
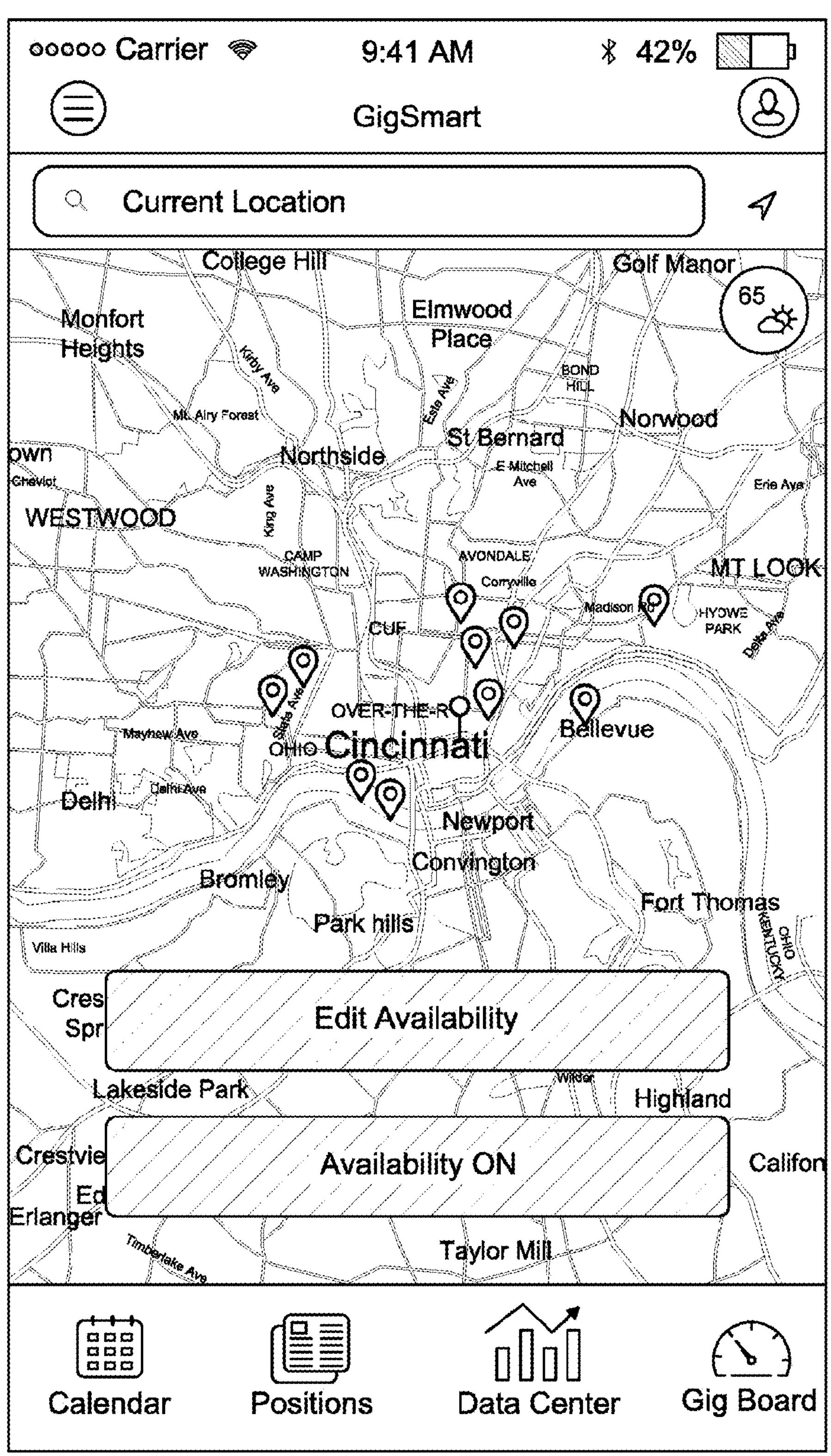
Figure 48:
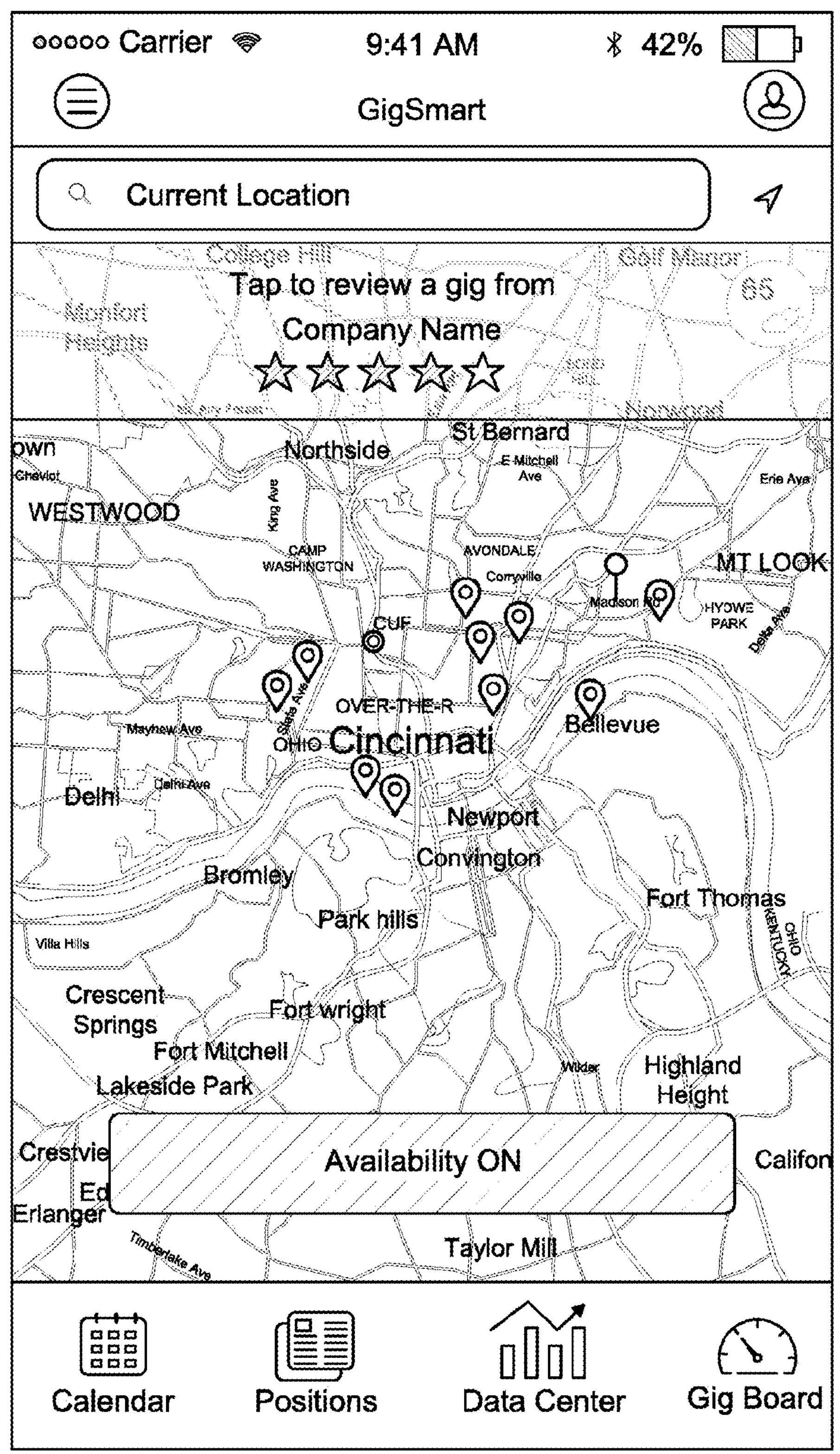
Figure 49:
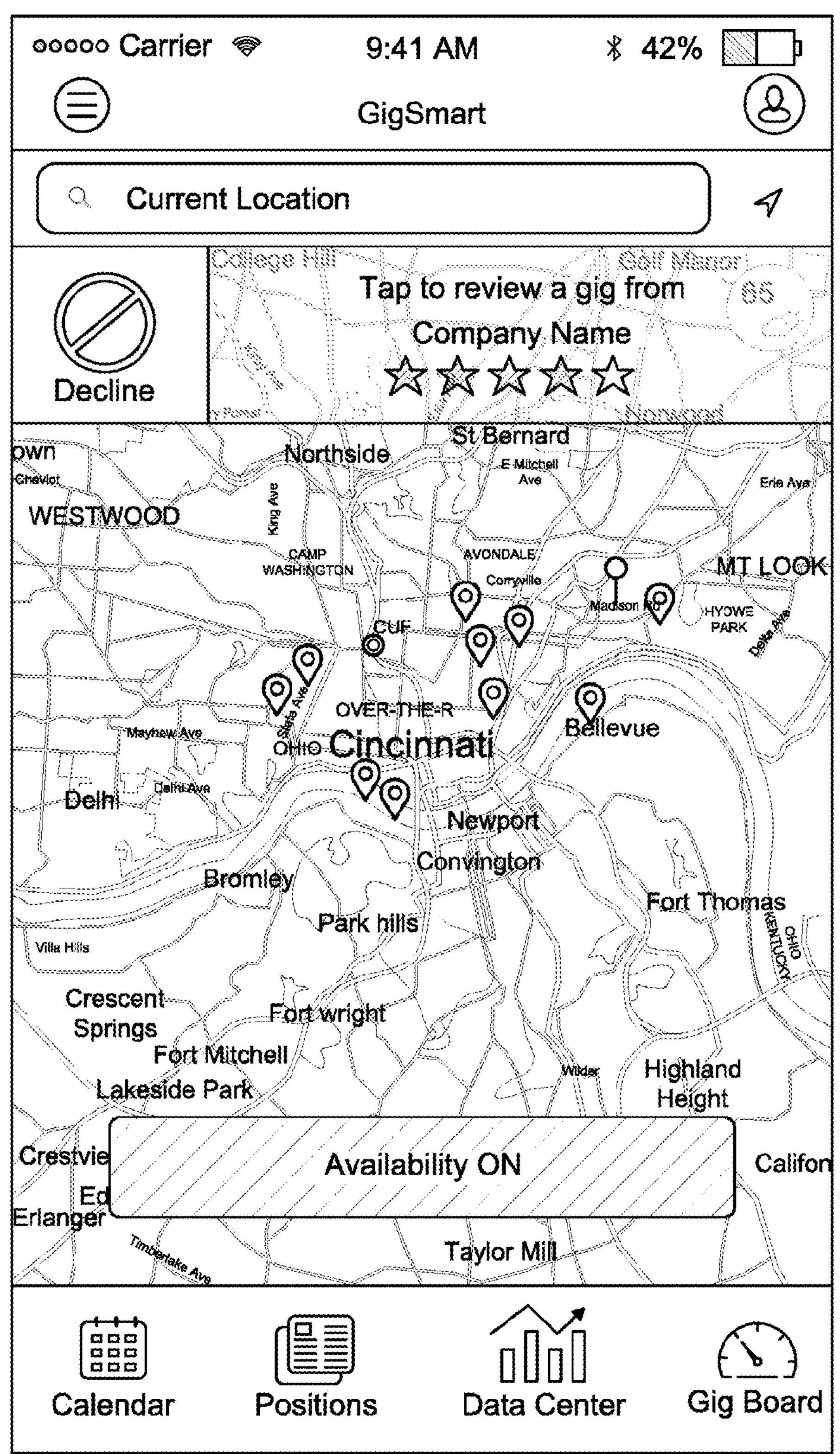
Figure 50:
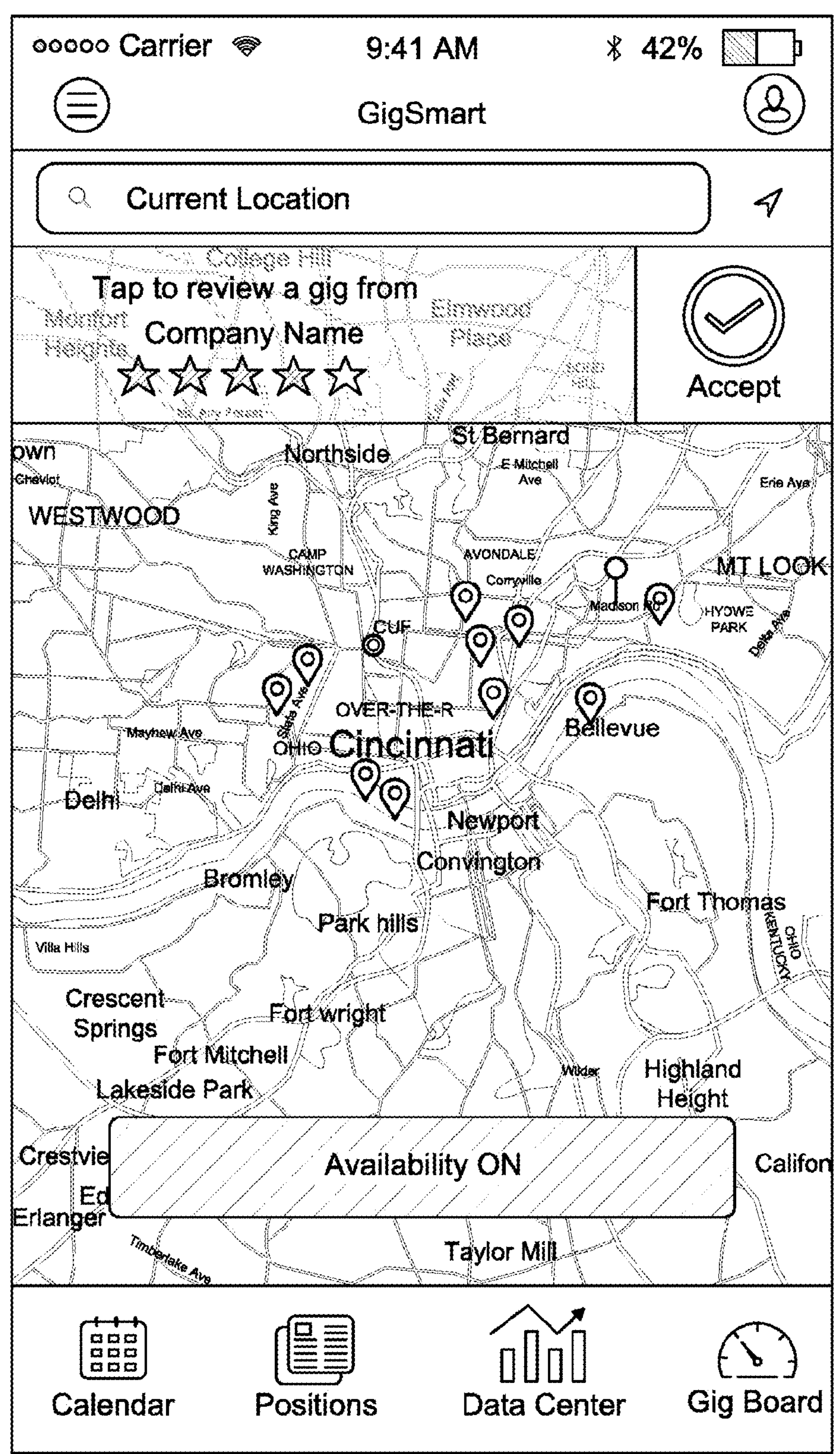
Figure 51:
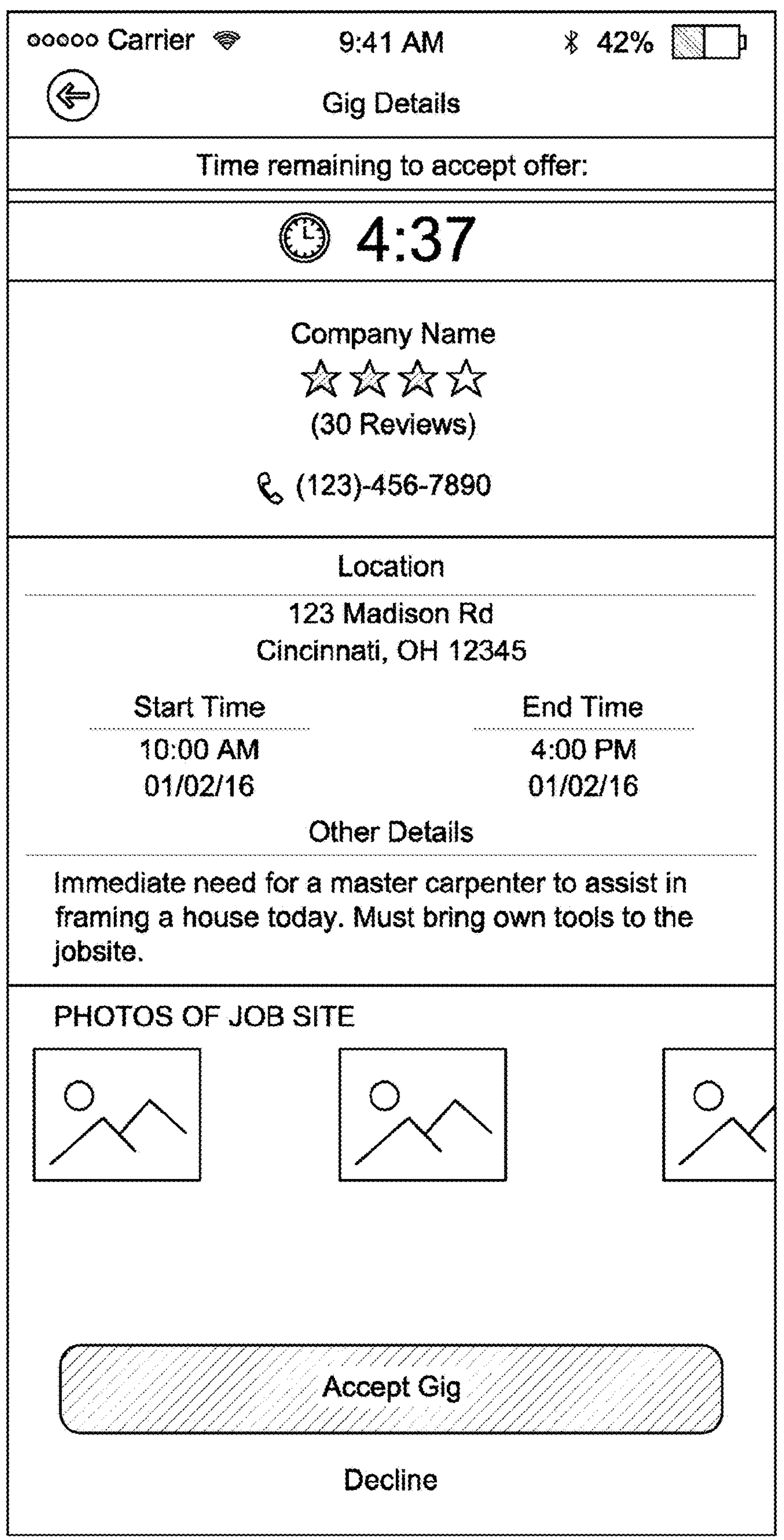
Figure 52:
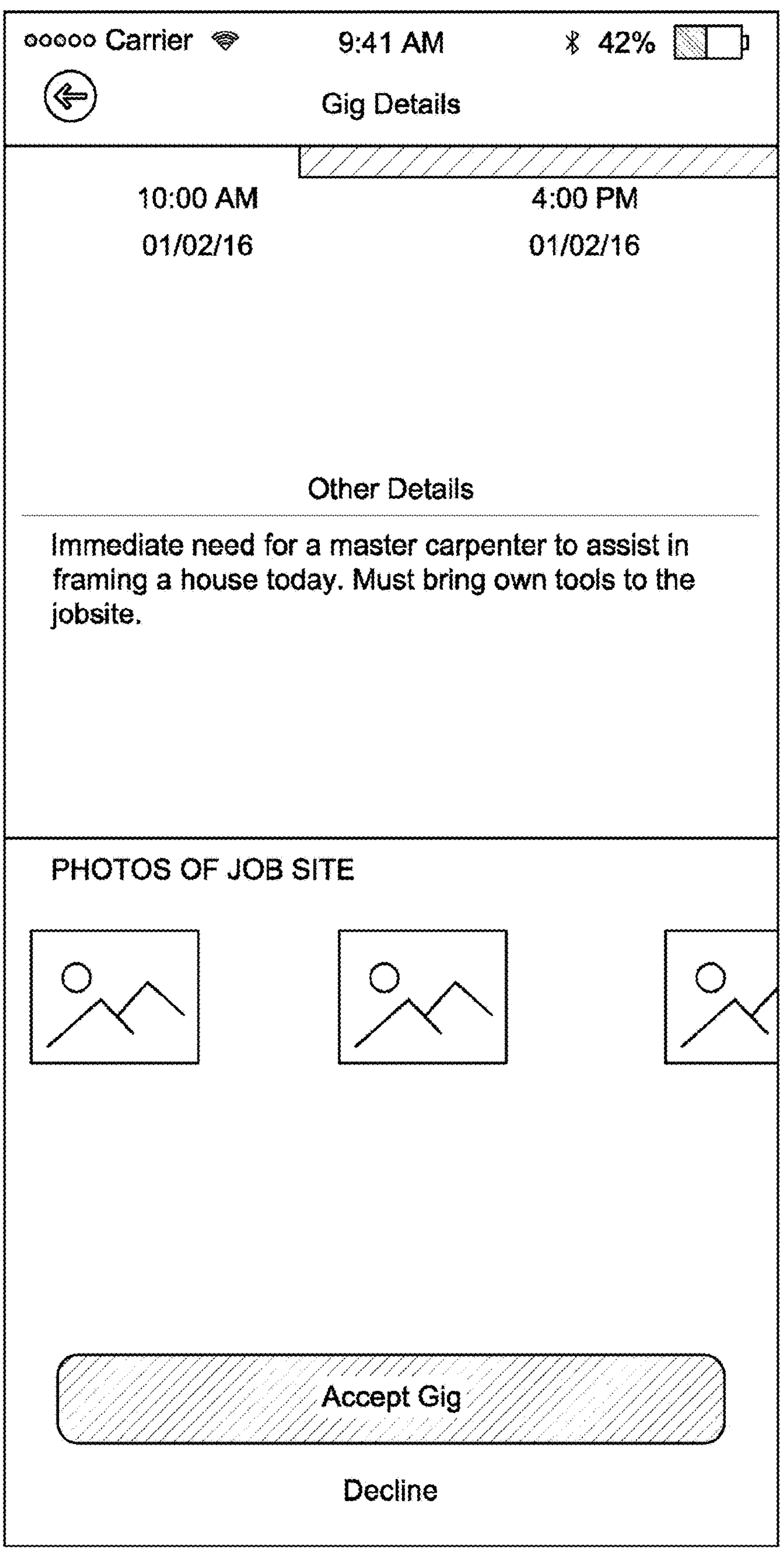
Figure 53:
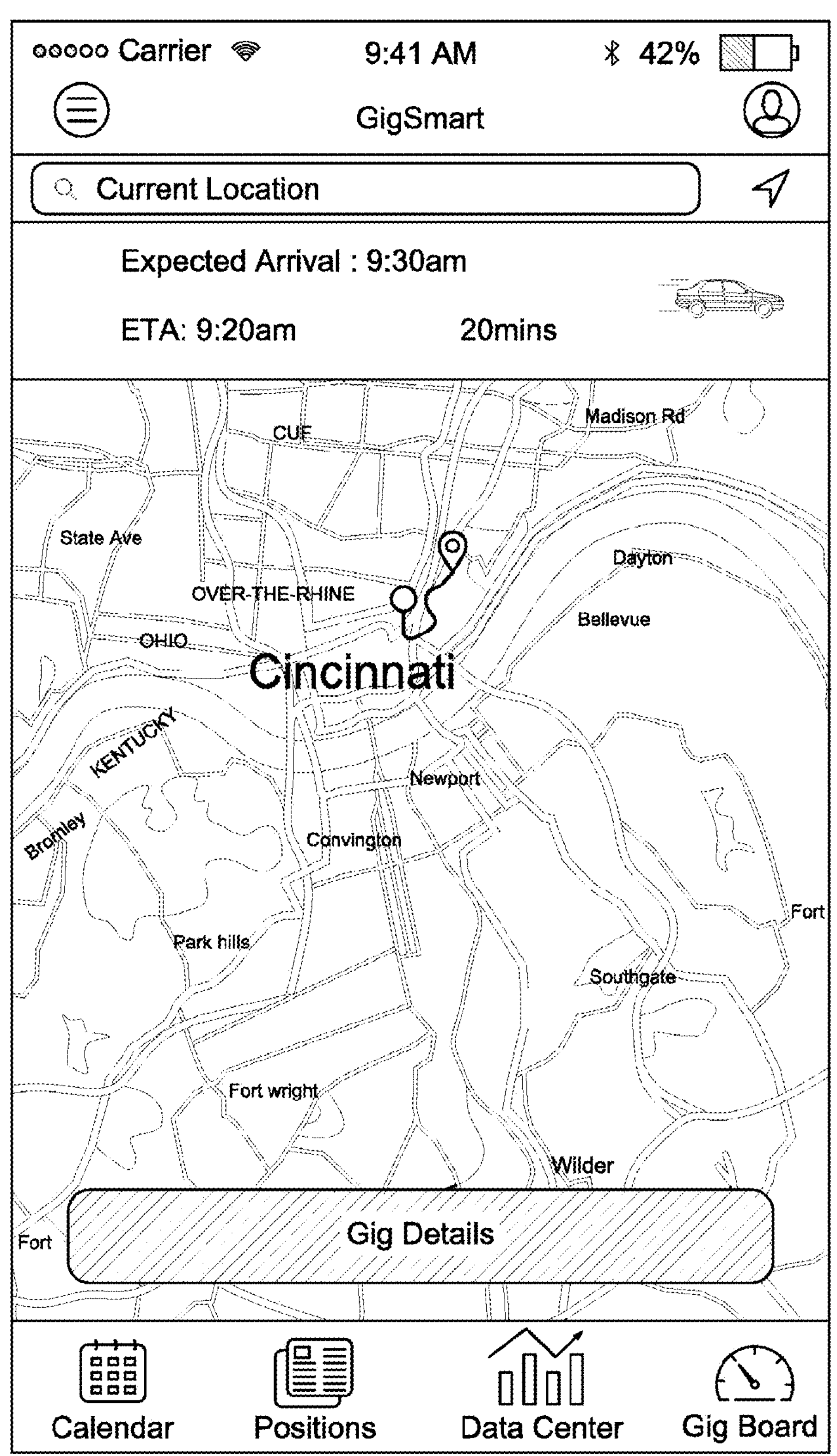
Figure 54:
Figure 55:
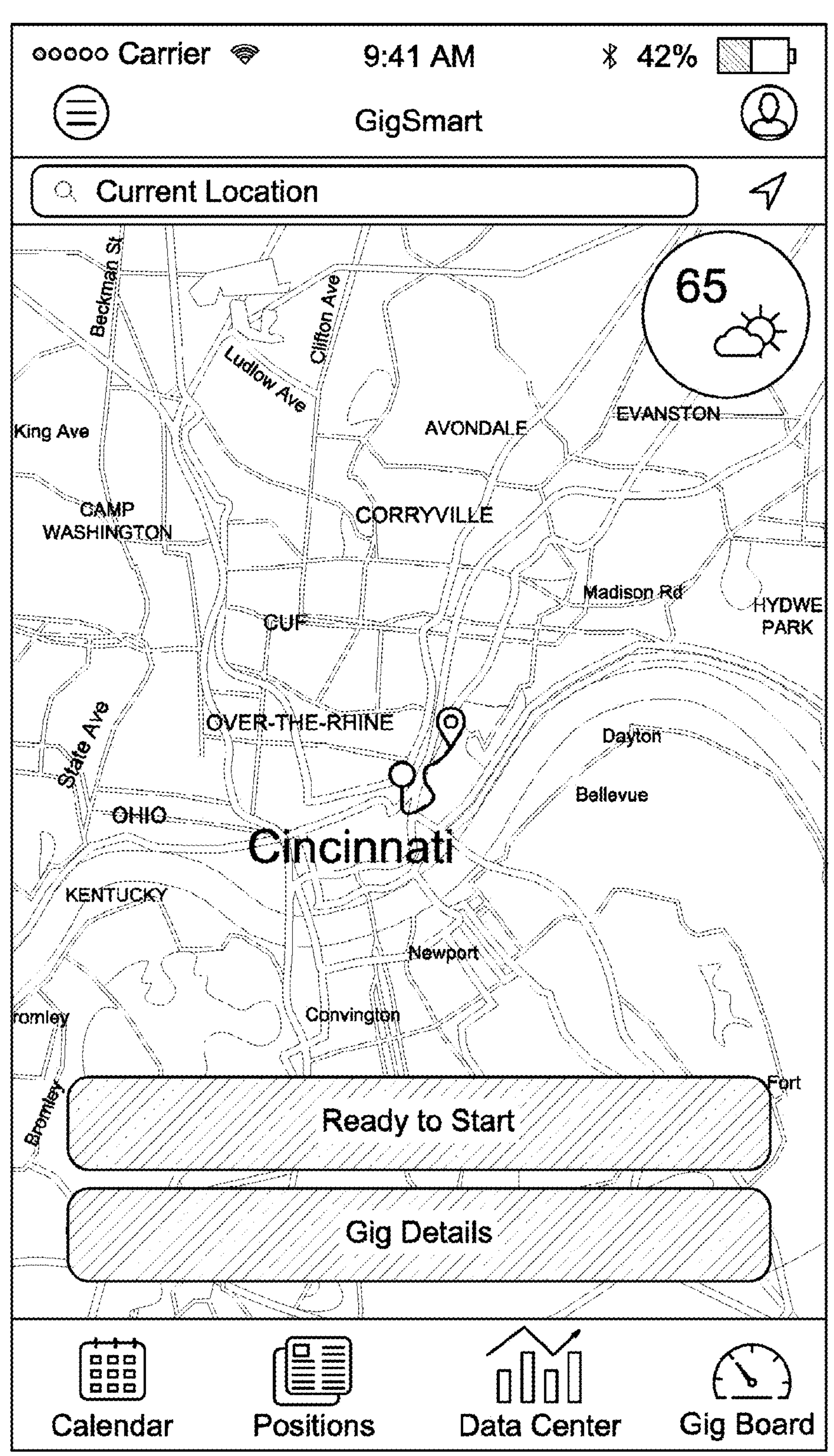
Figure 56:
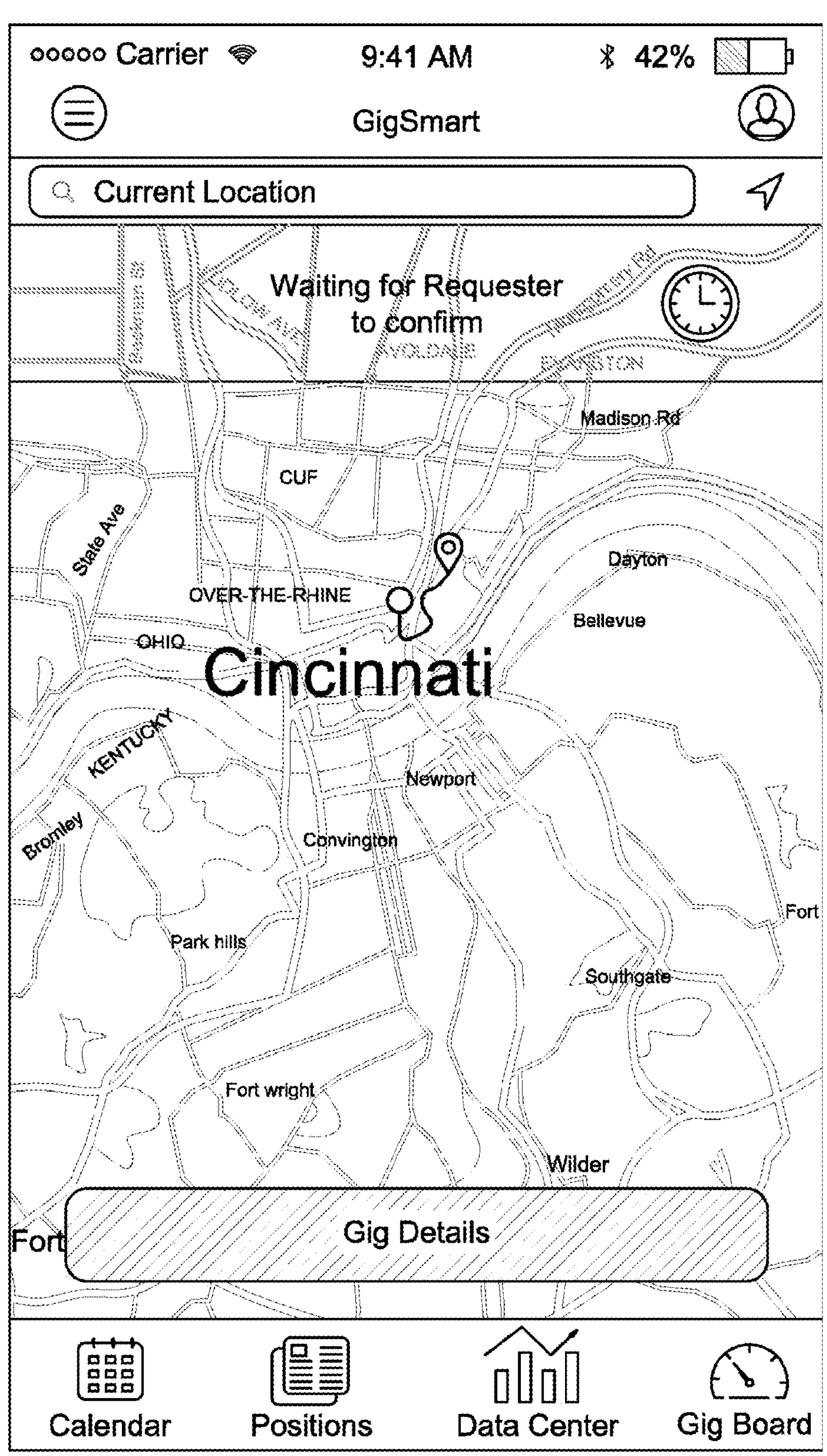
Figure 57:
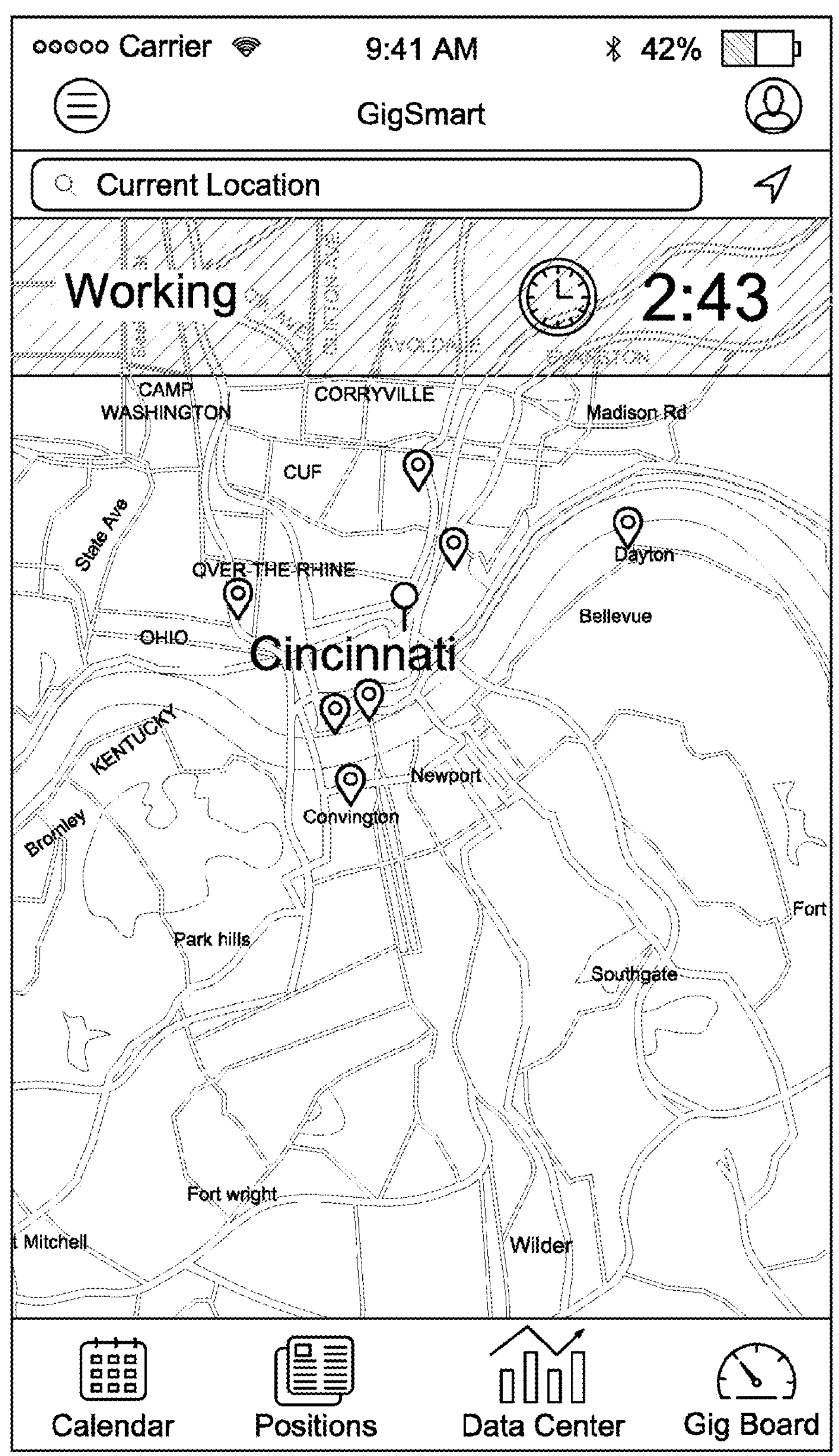
Figure 58:
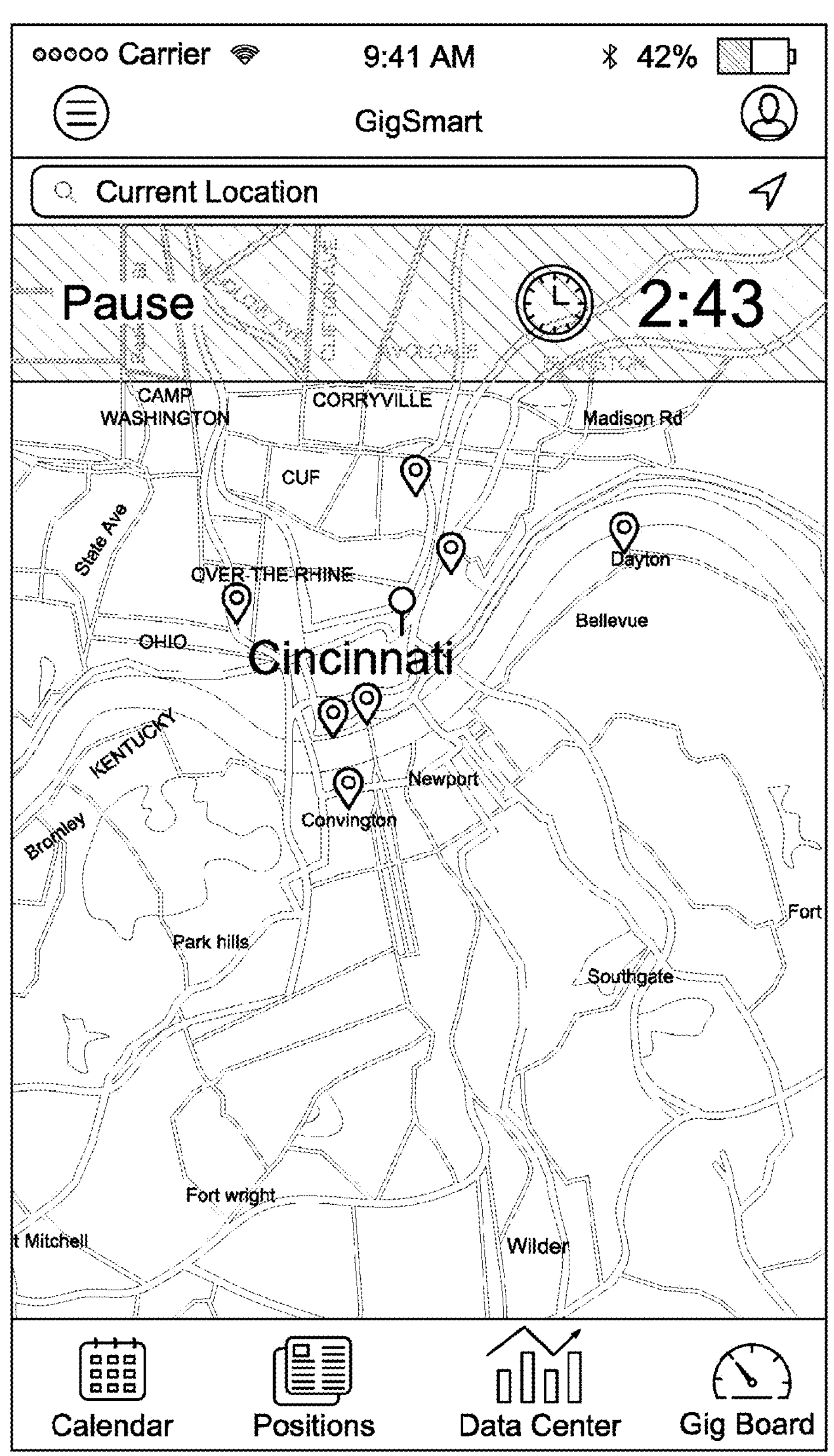
Figure 59:
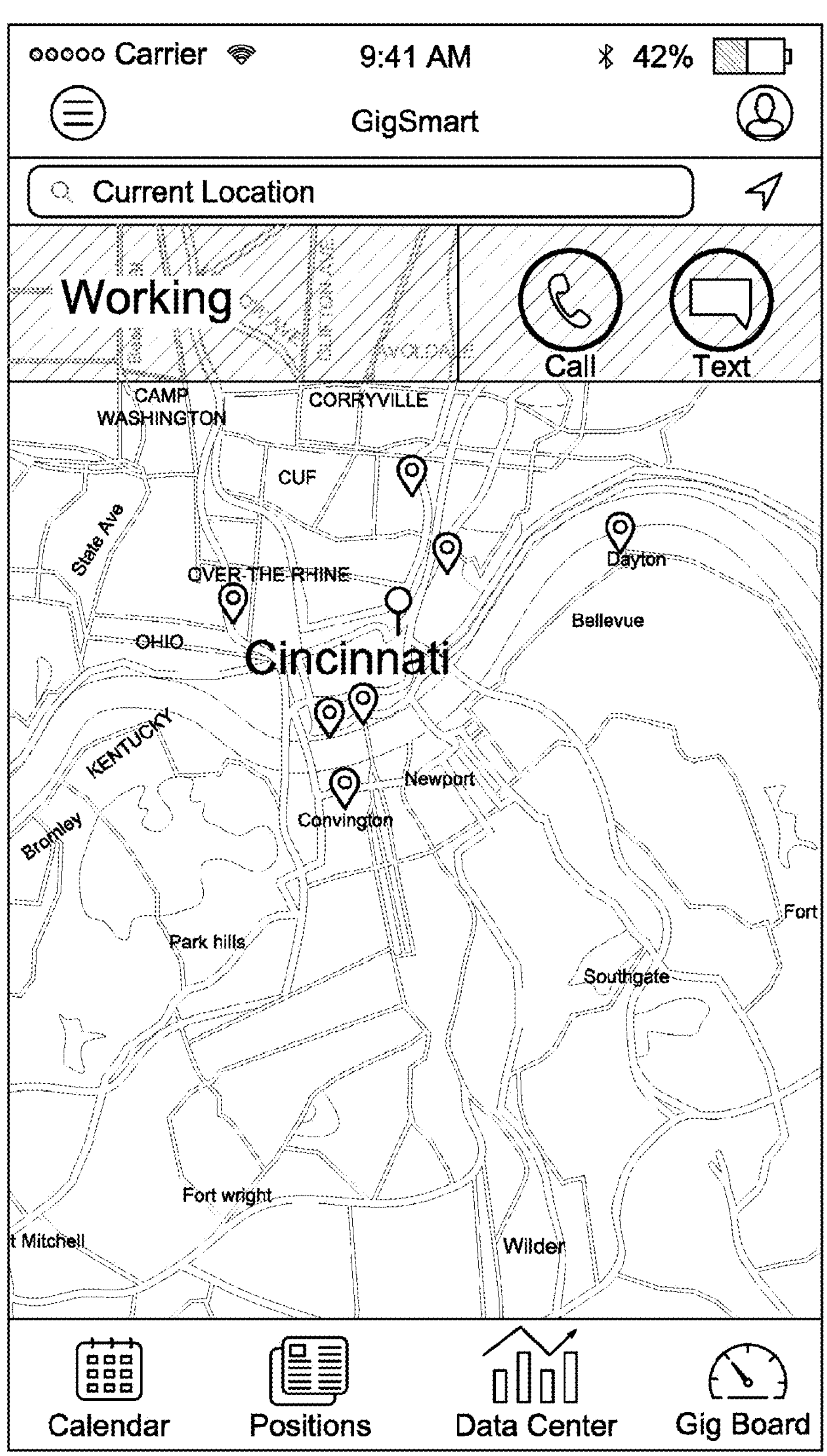
Figure 60:
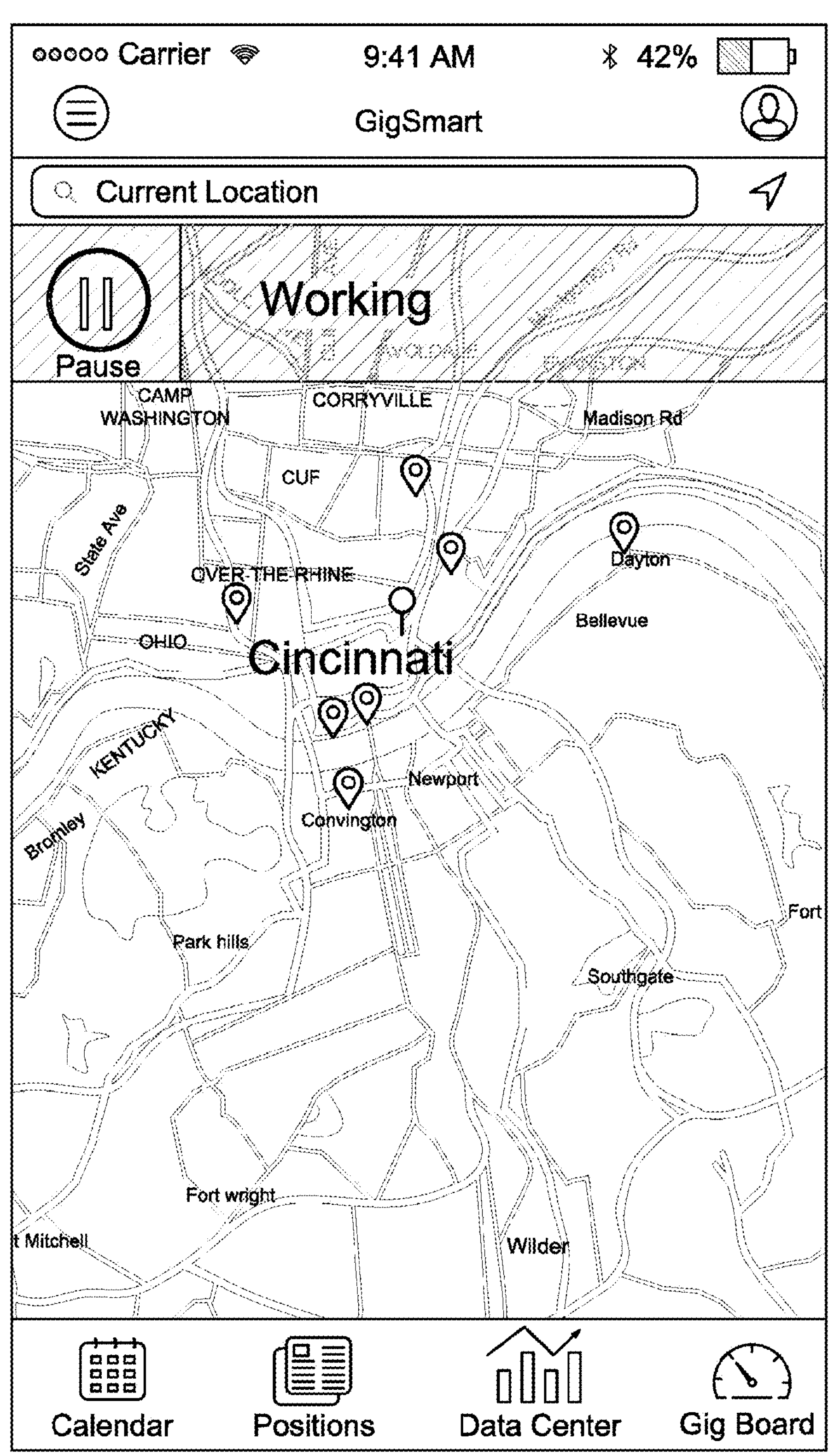
Figure 61:
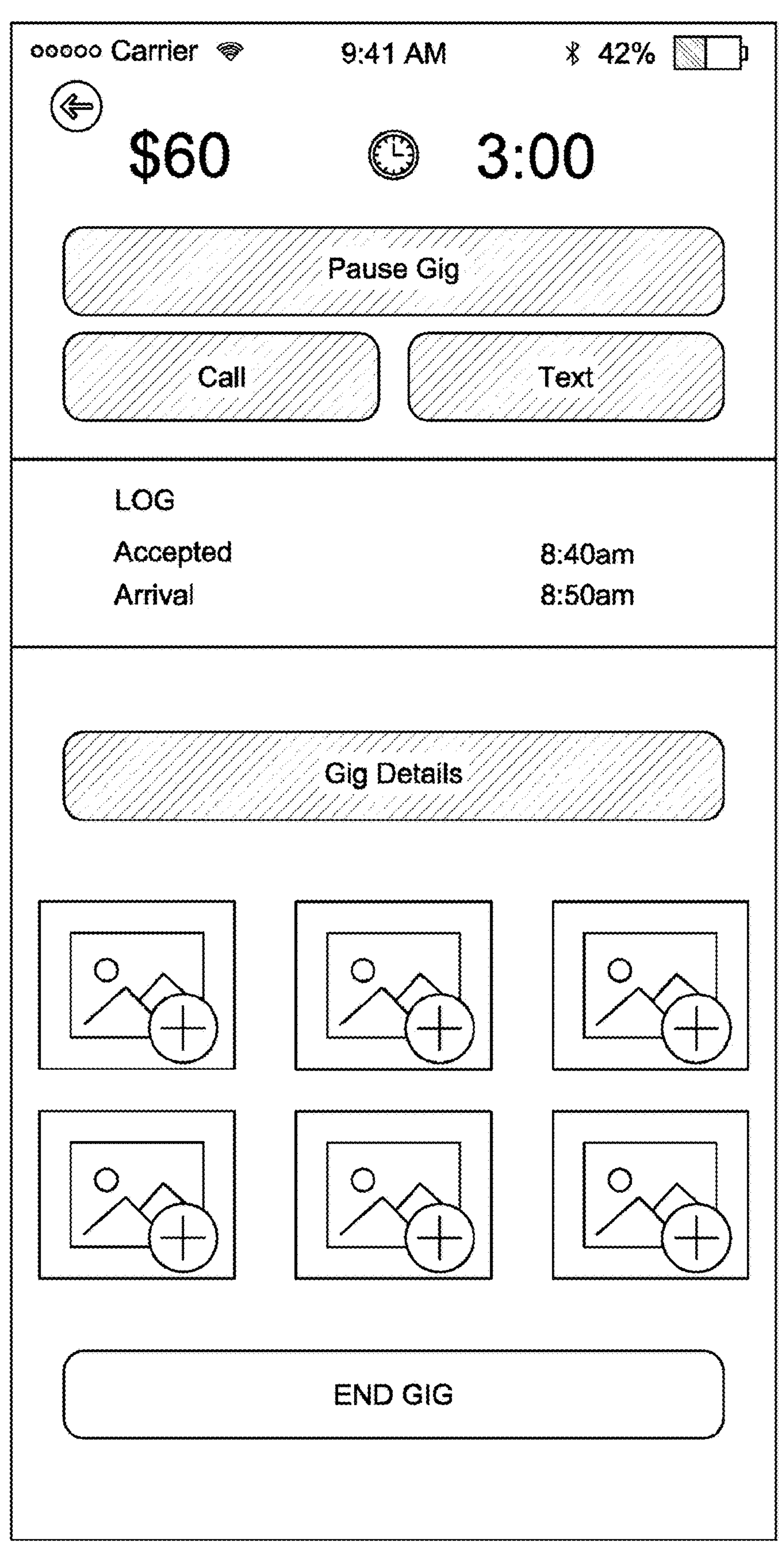
Figure 62:
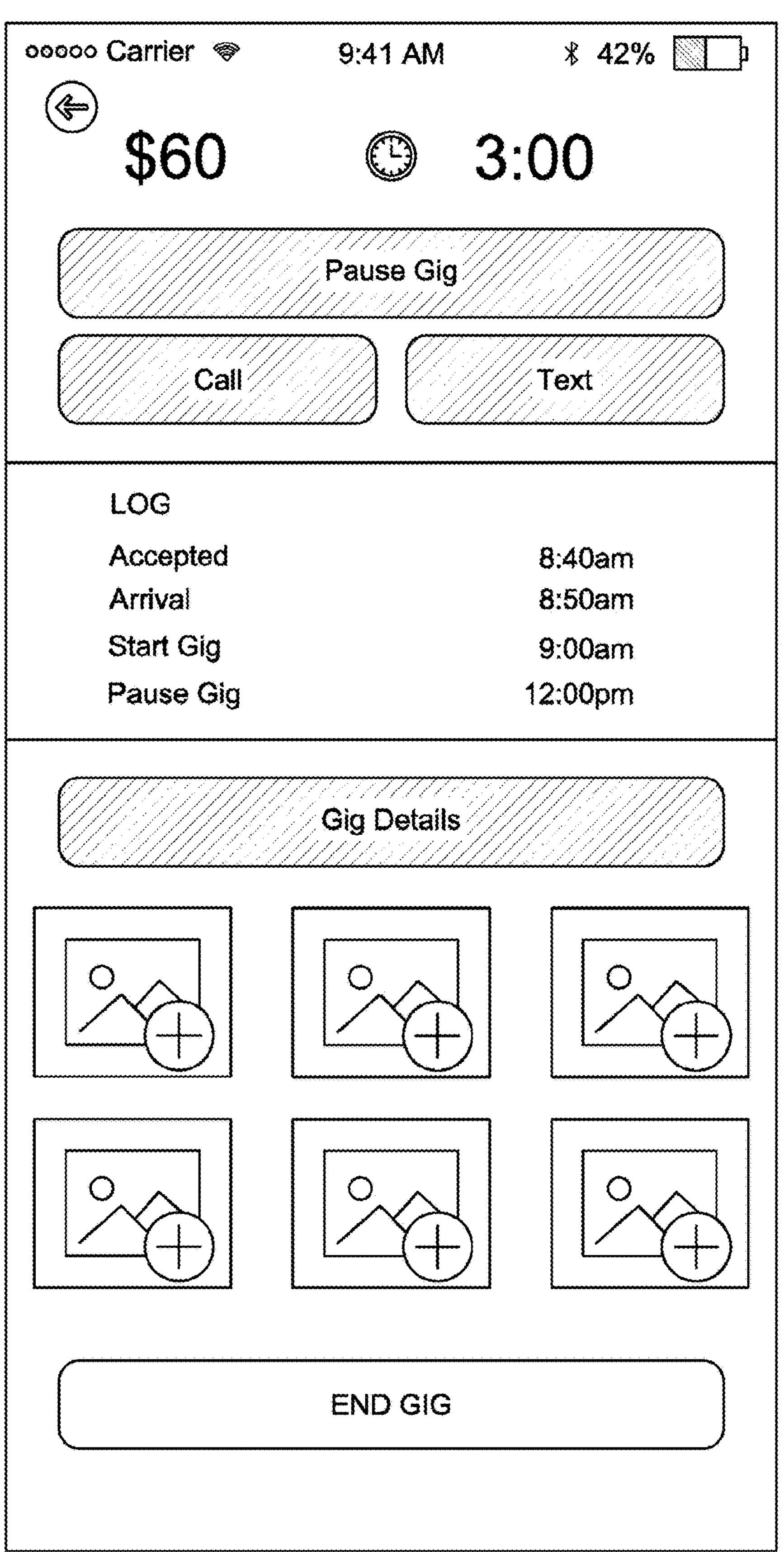
Figure 63:
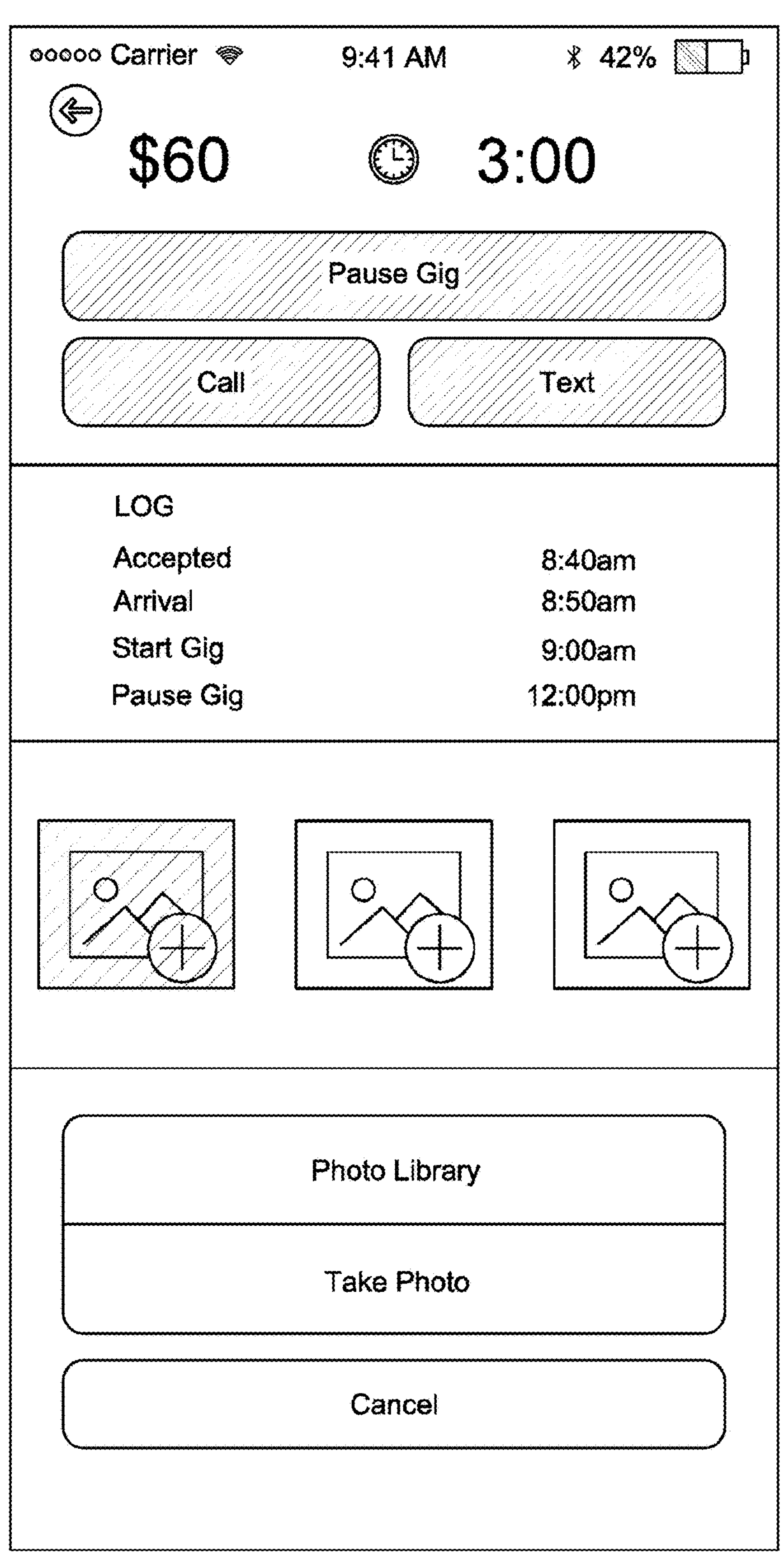
Figure 64:
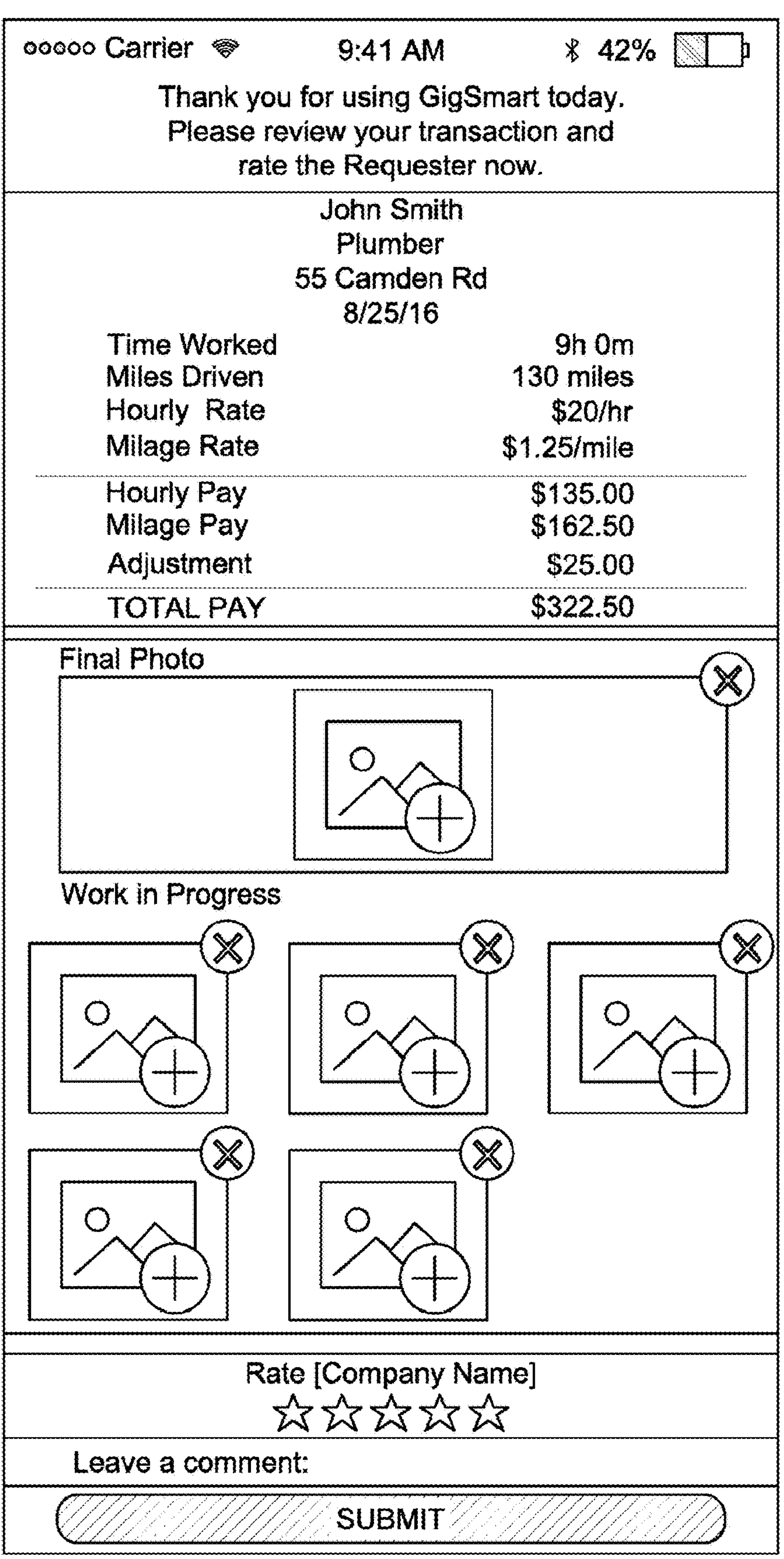
Figure 65:
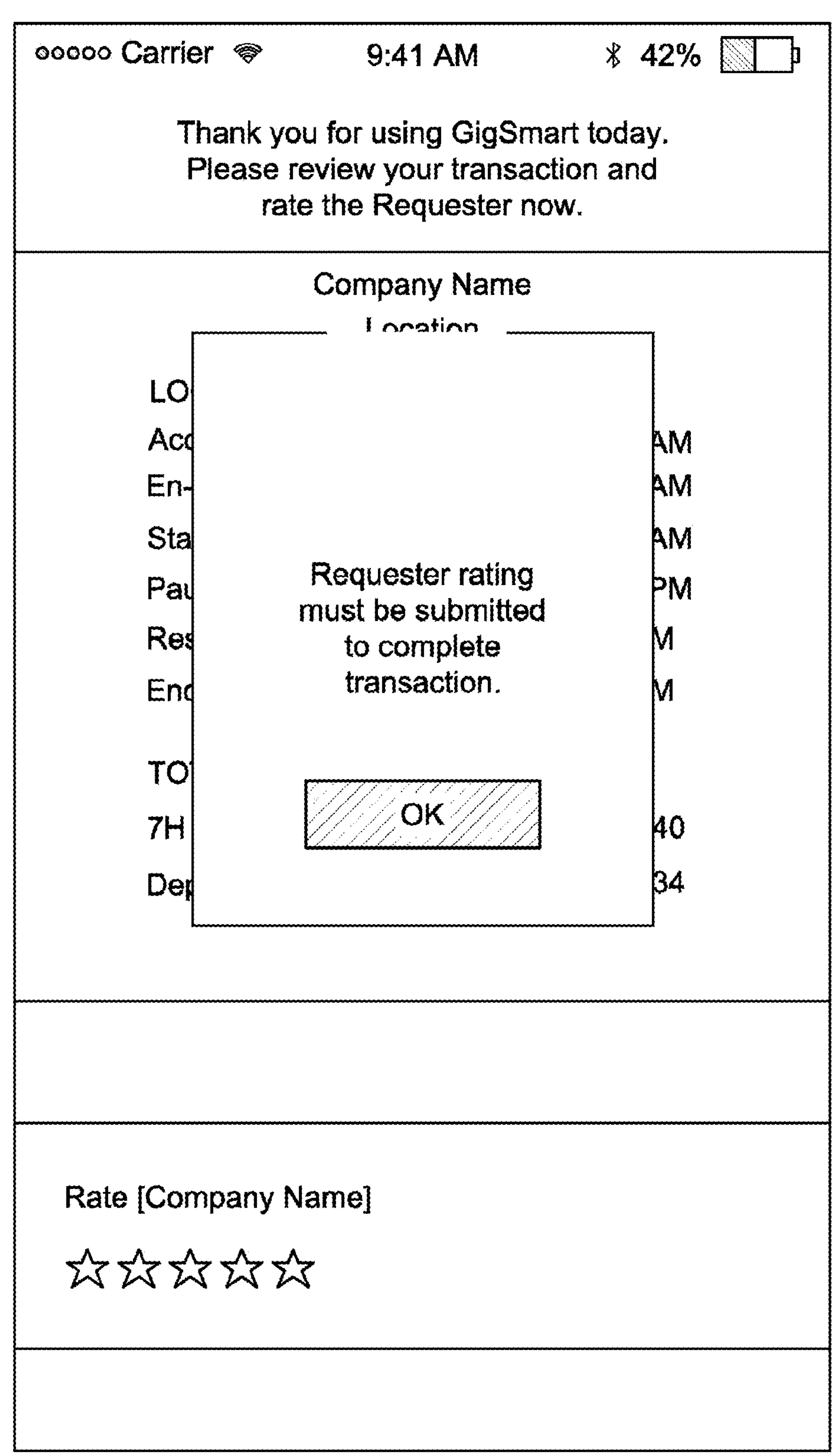
Figure 67:
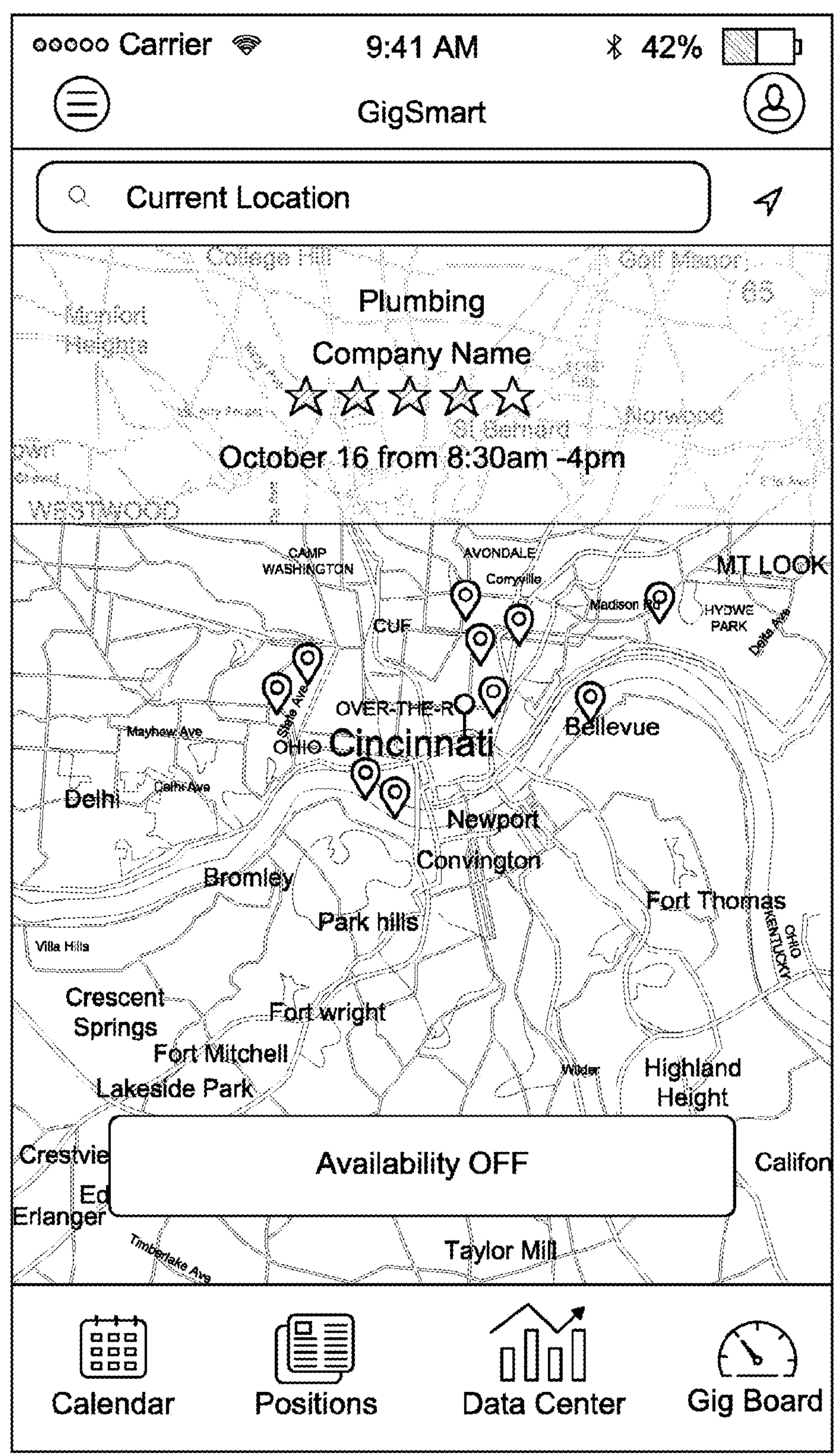
Figure 68:
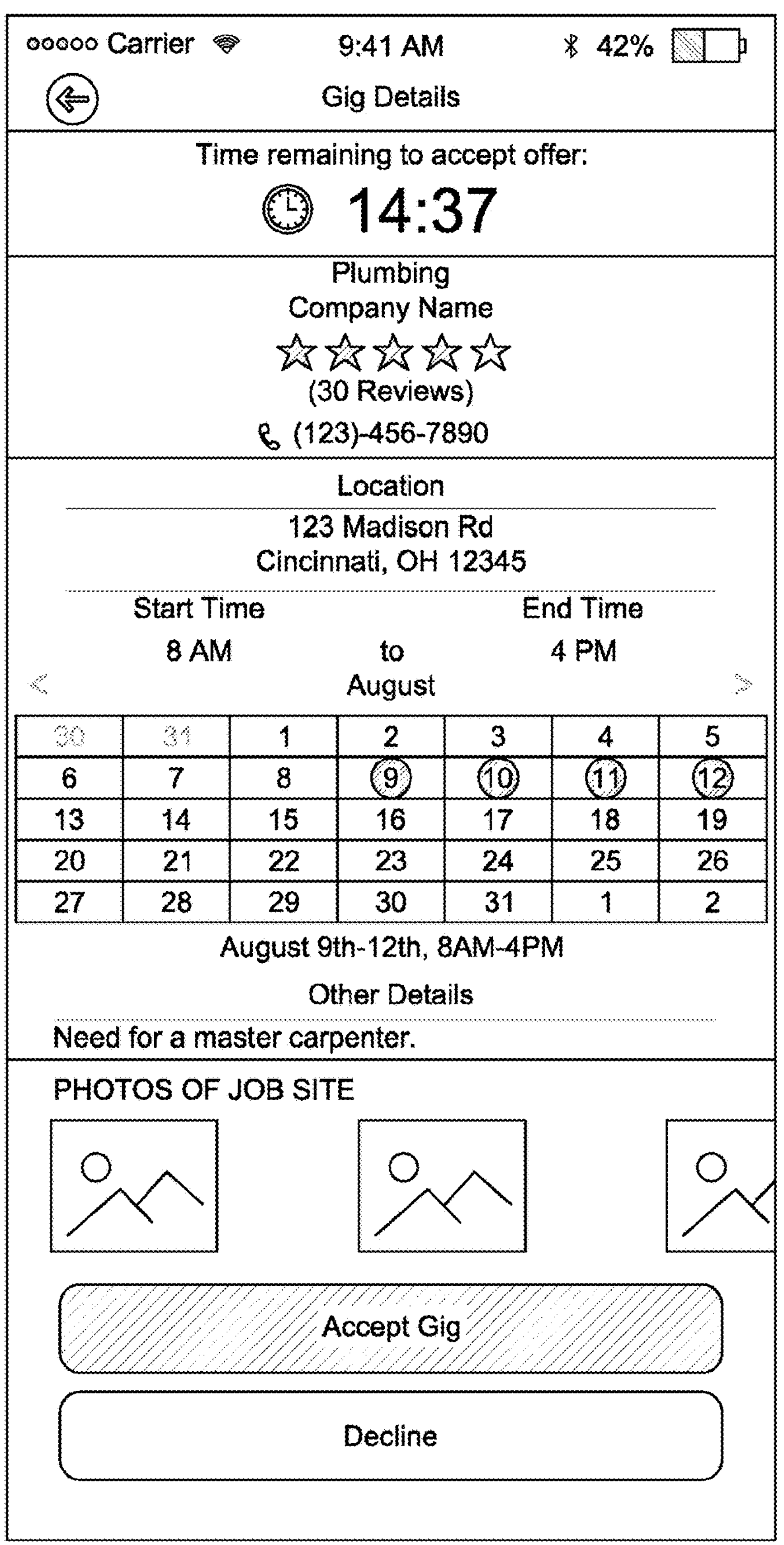
Figure 72:
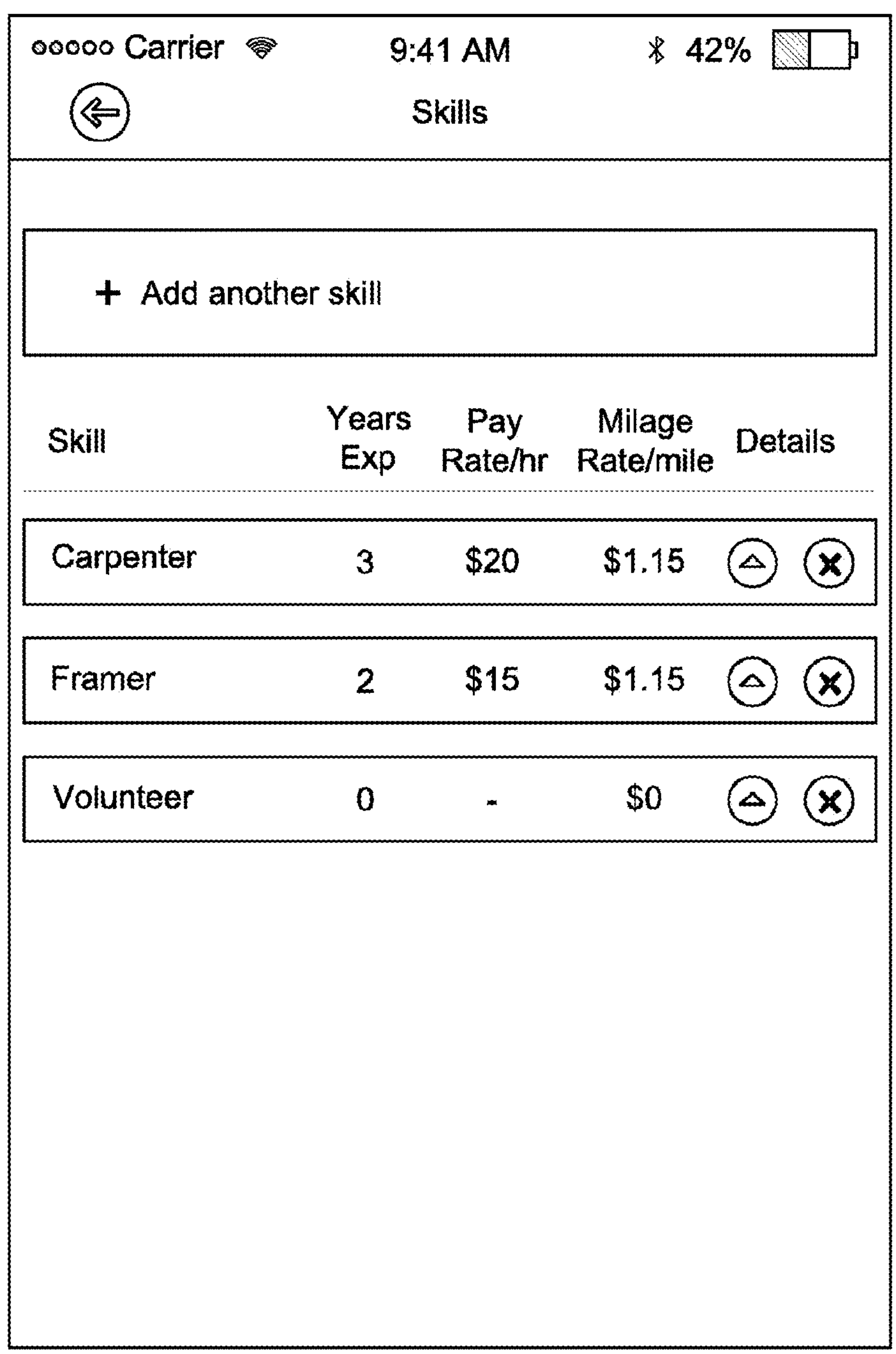
Figure 77:
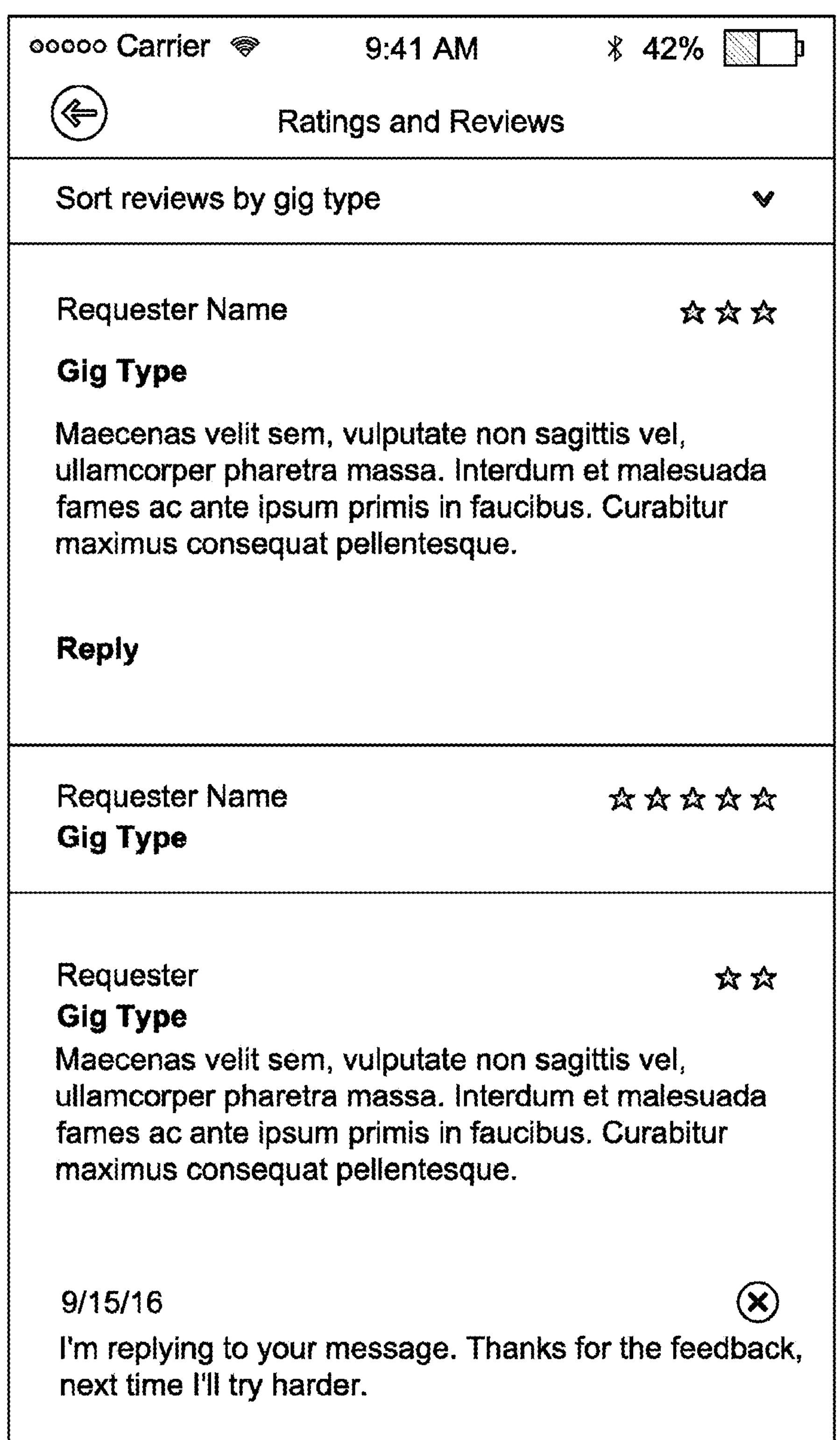
Figure 79:
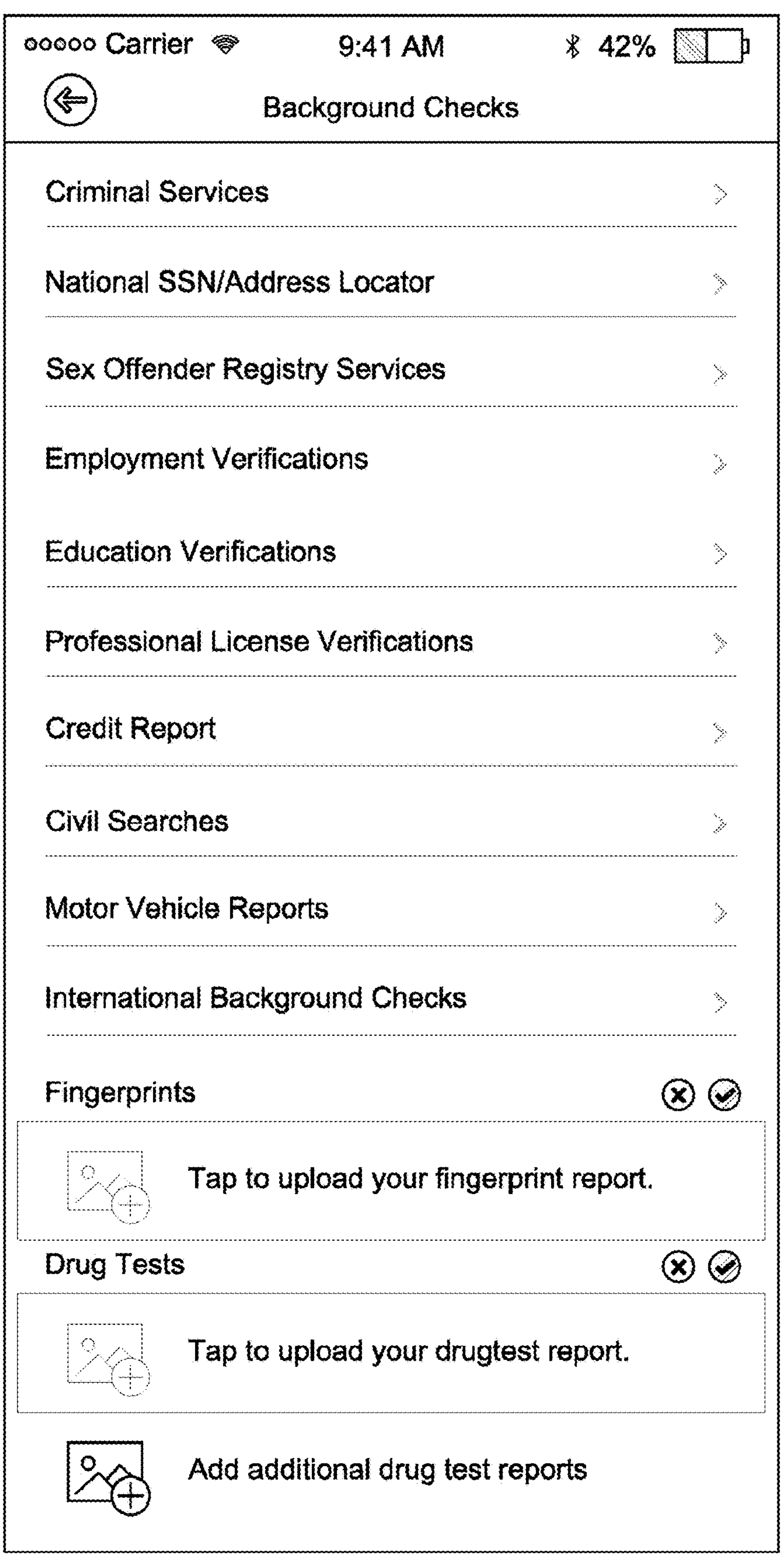
Figure 80:
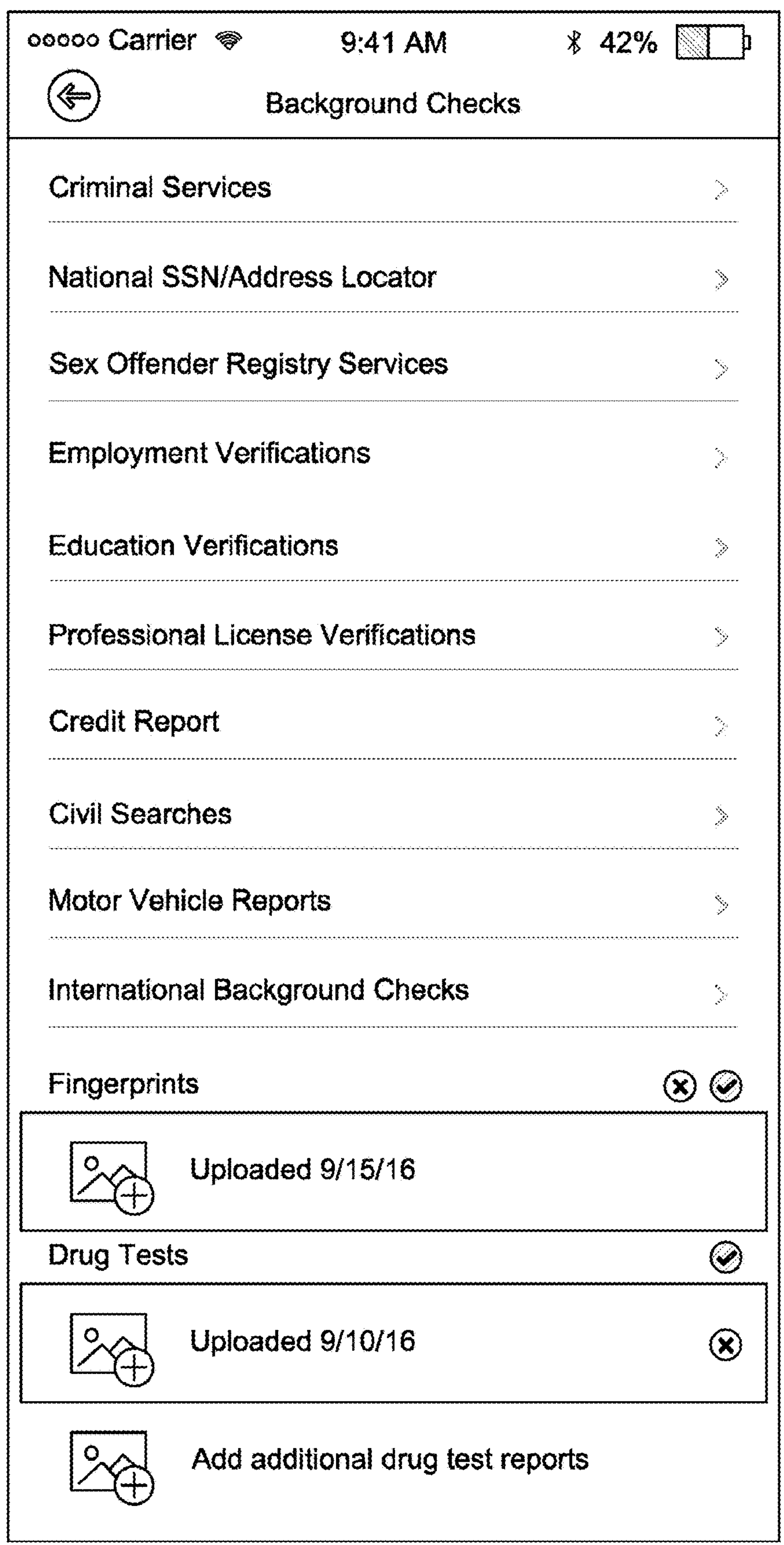
Figure 82:
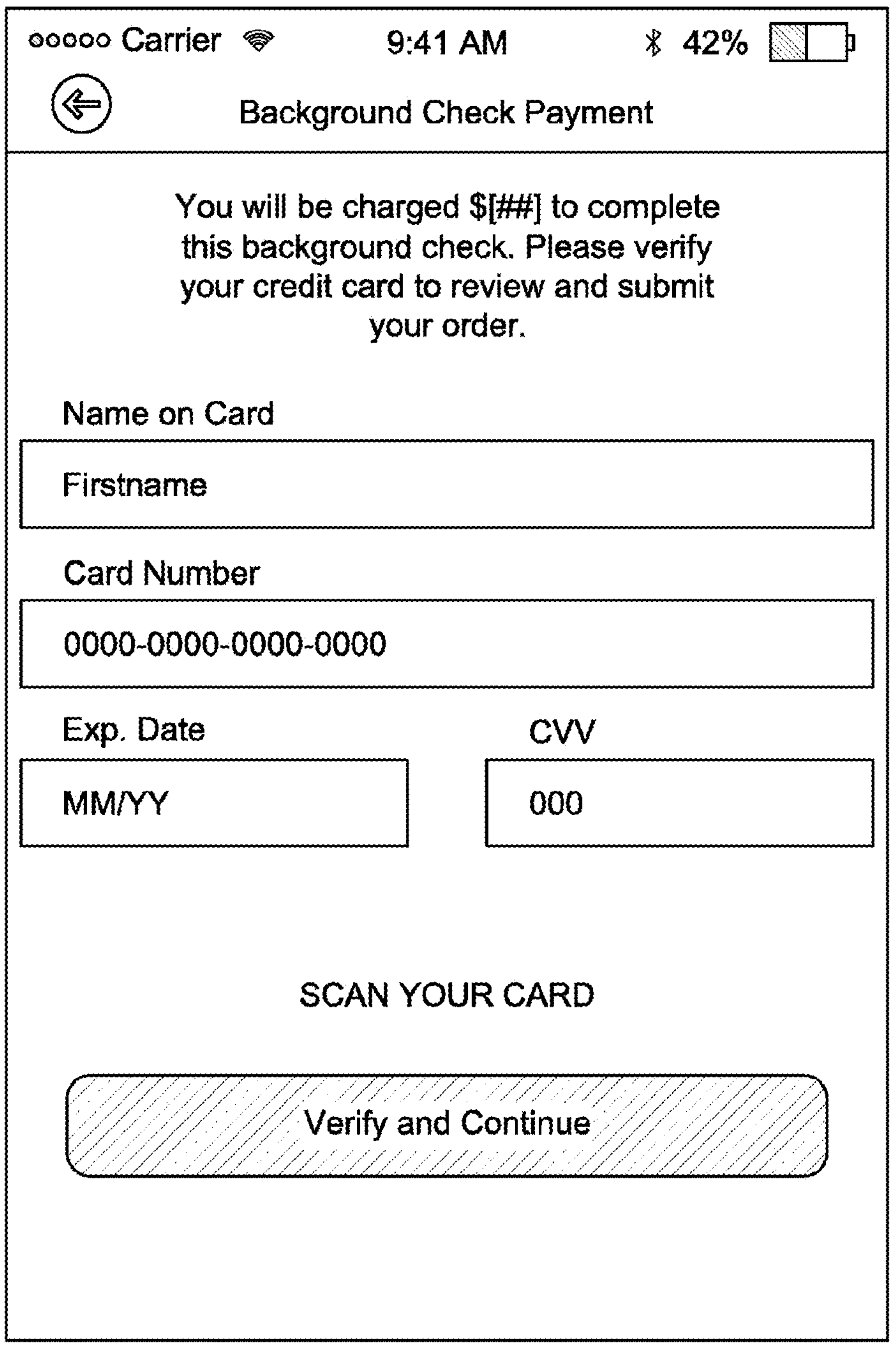
Figure 87:
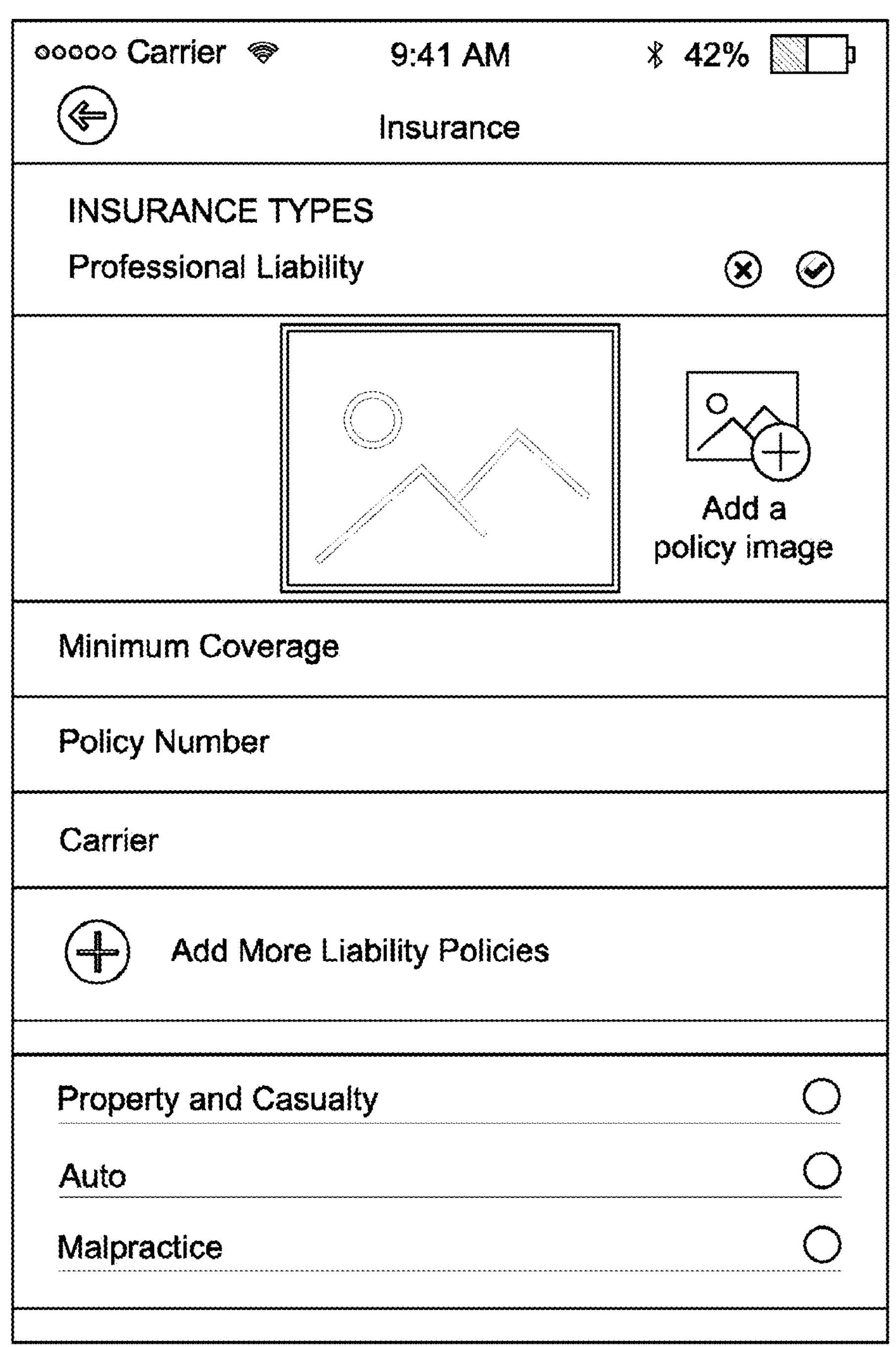
Figure 88:
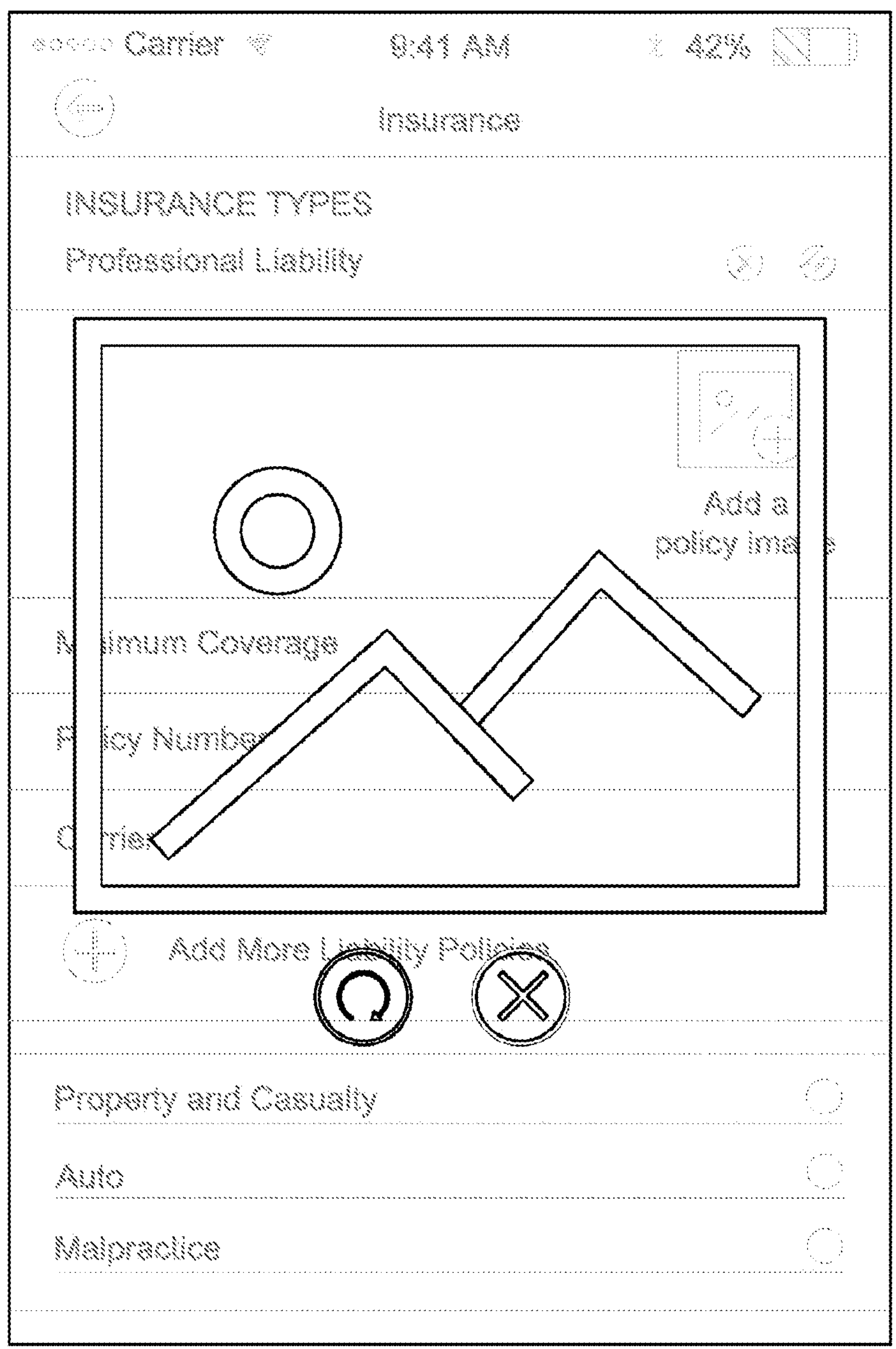
Figure 89:
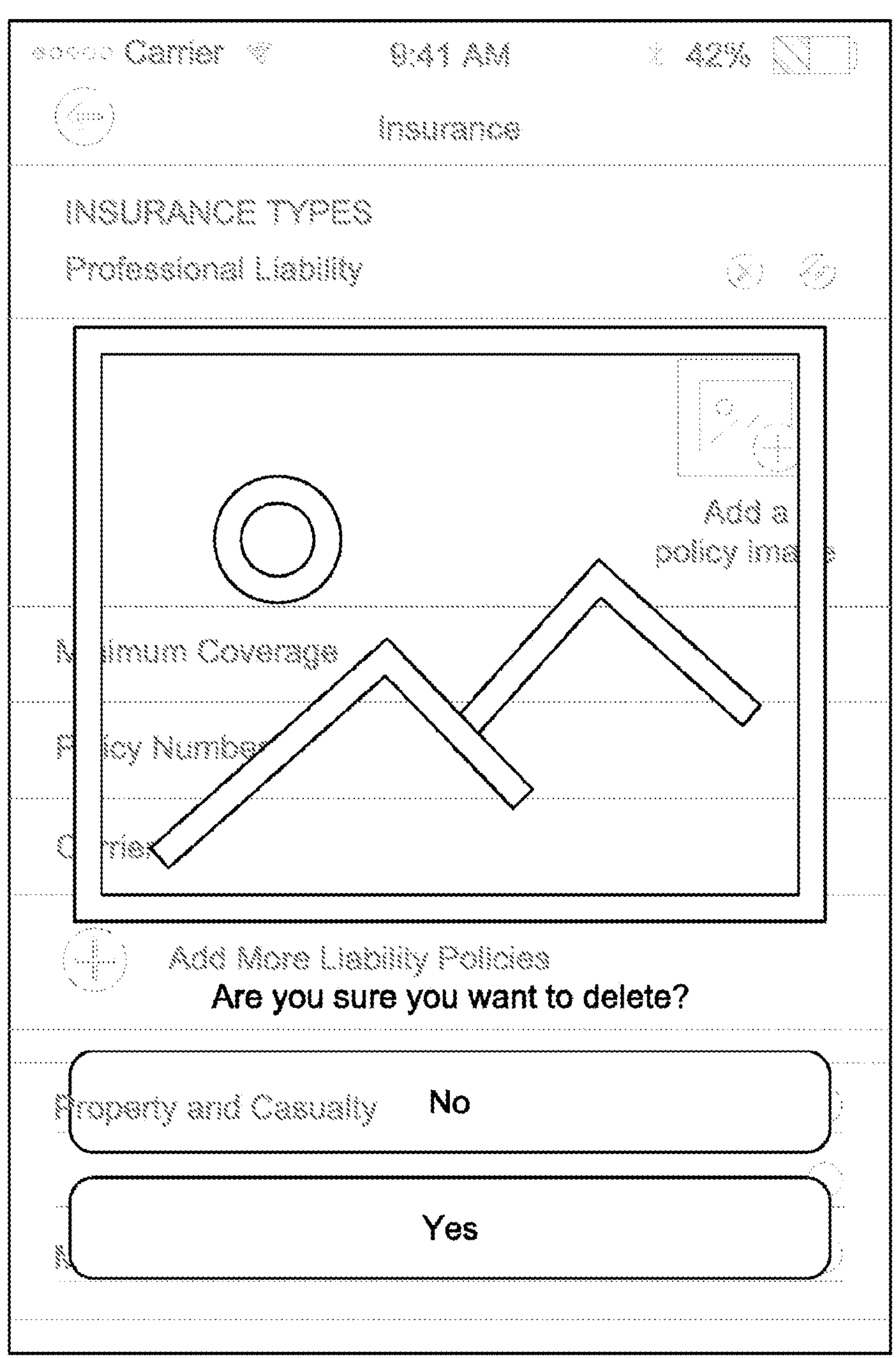
Figure 90:
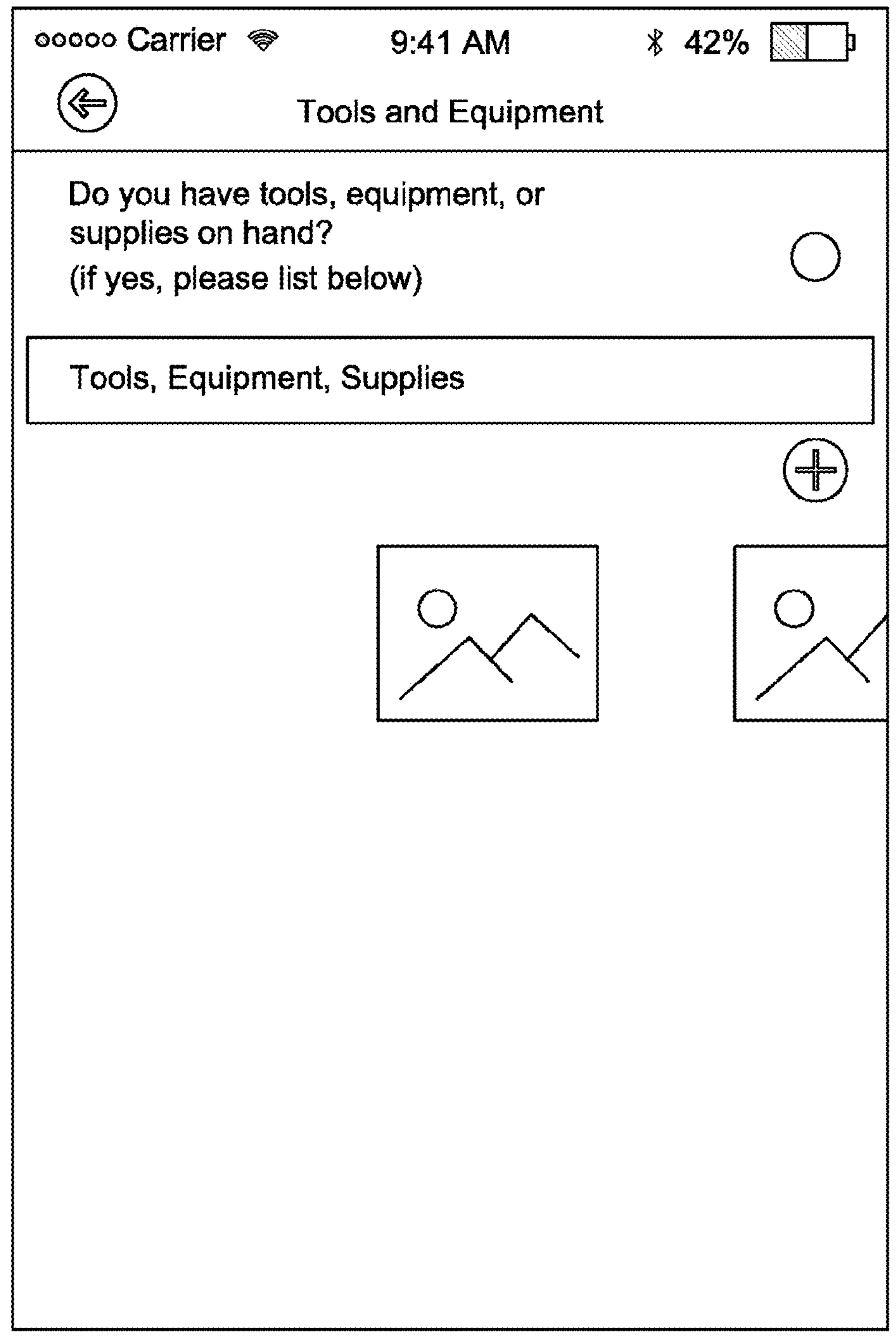
Figure 91:
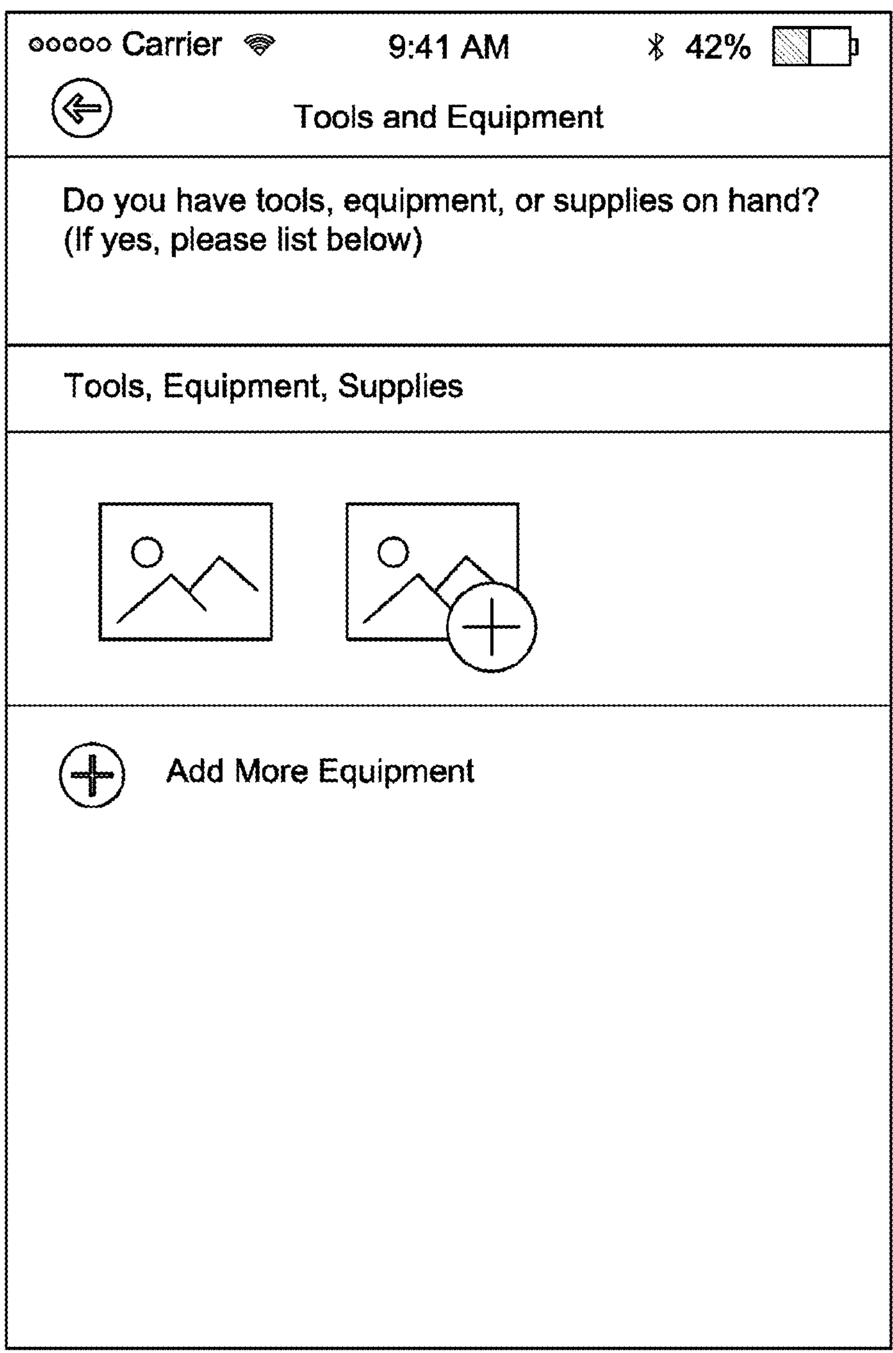
Figure 93:
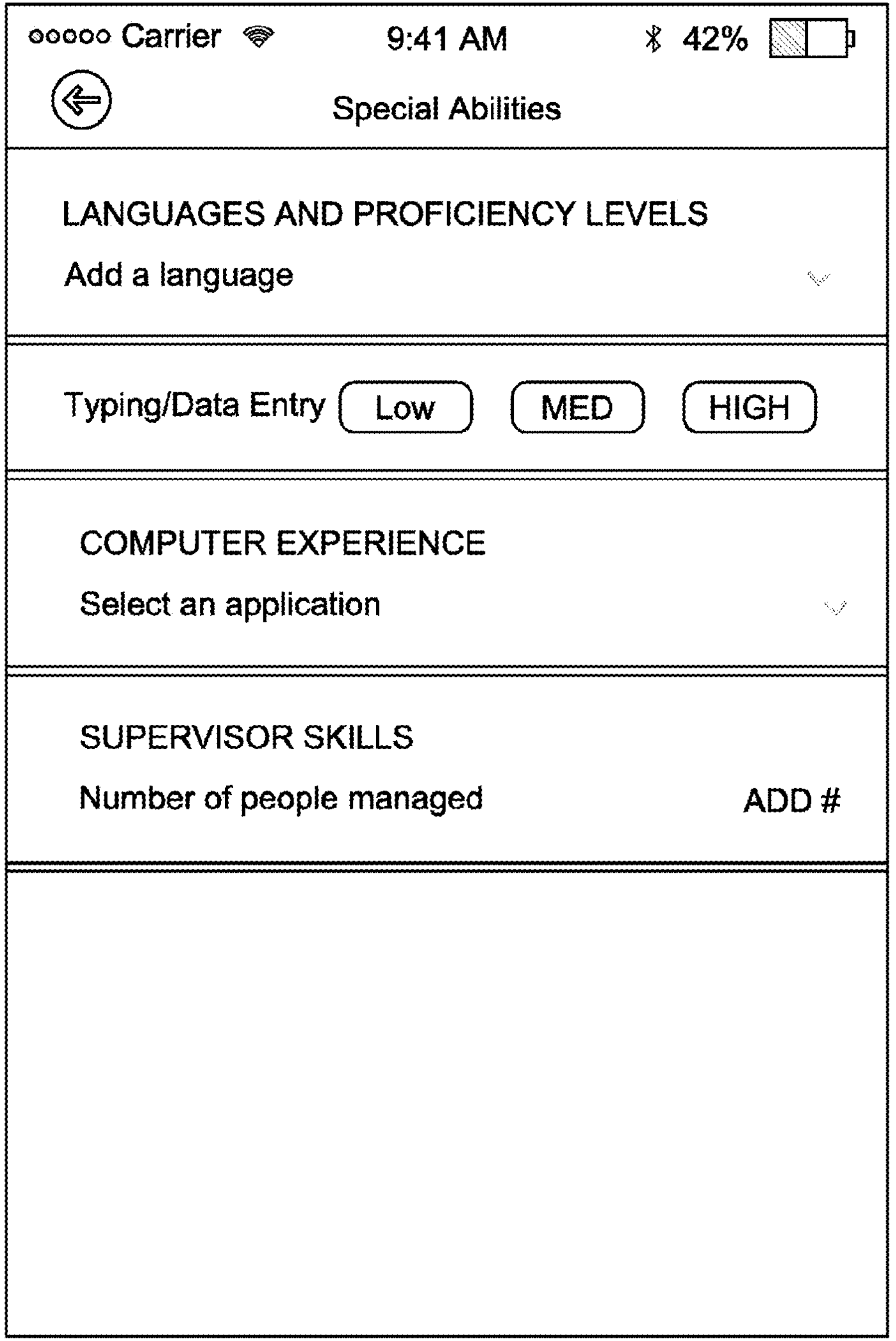
Figure 95:
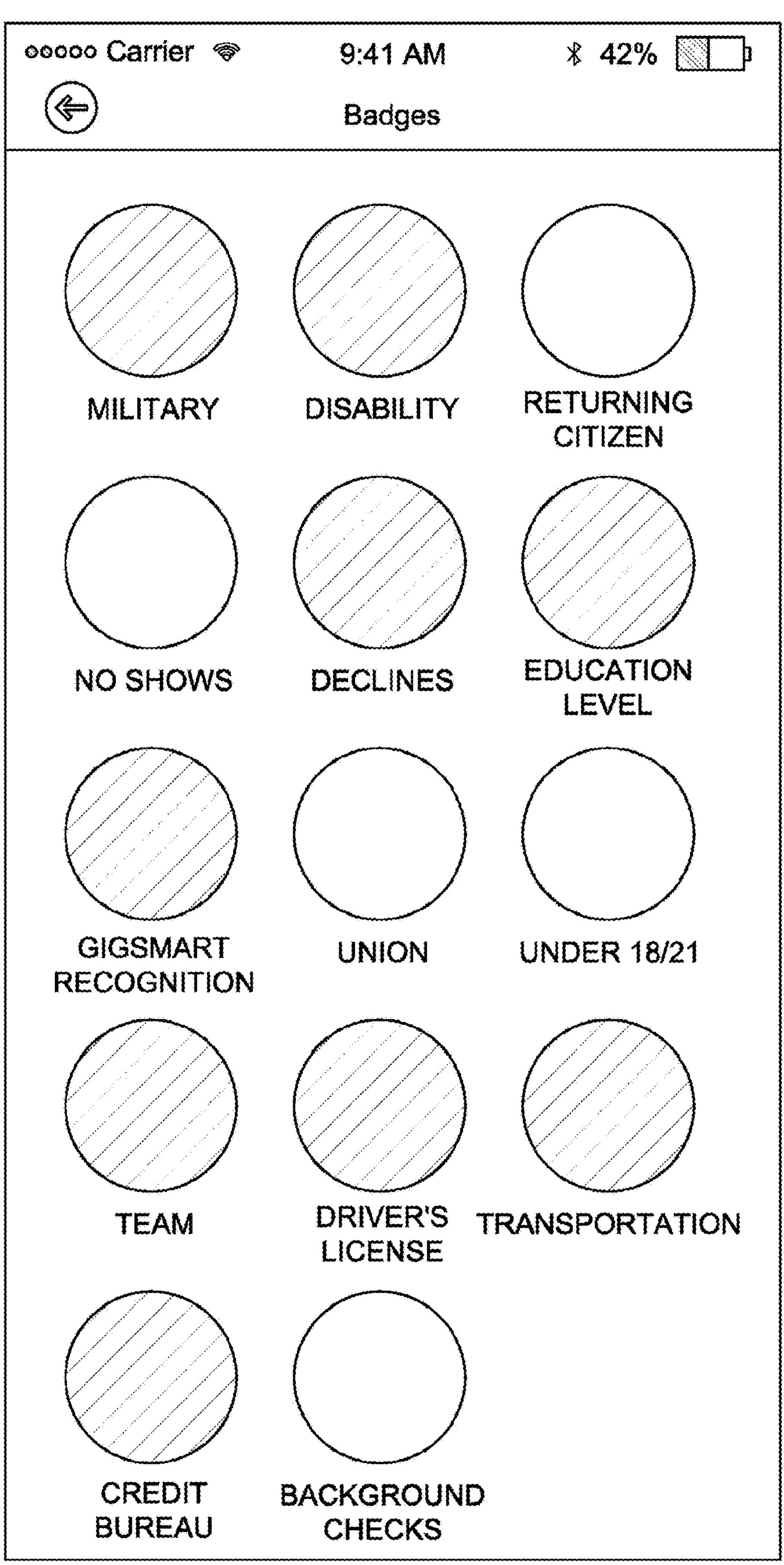
Figure 98:
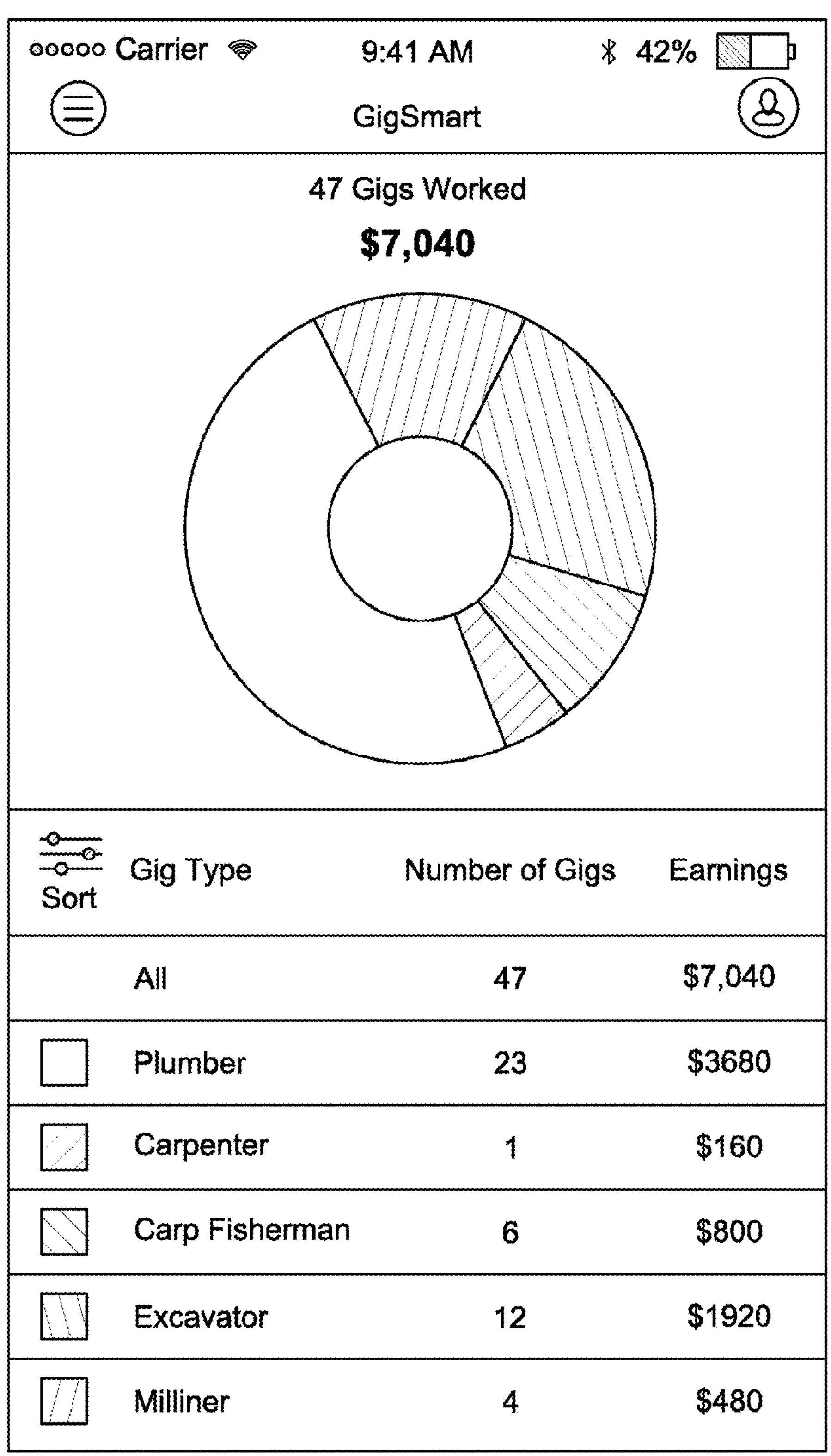
Figure 100:
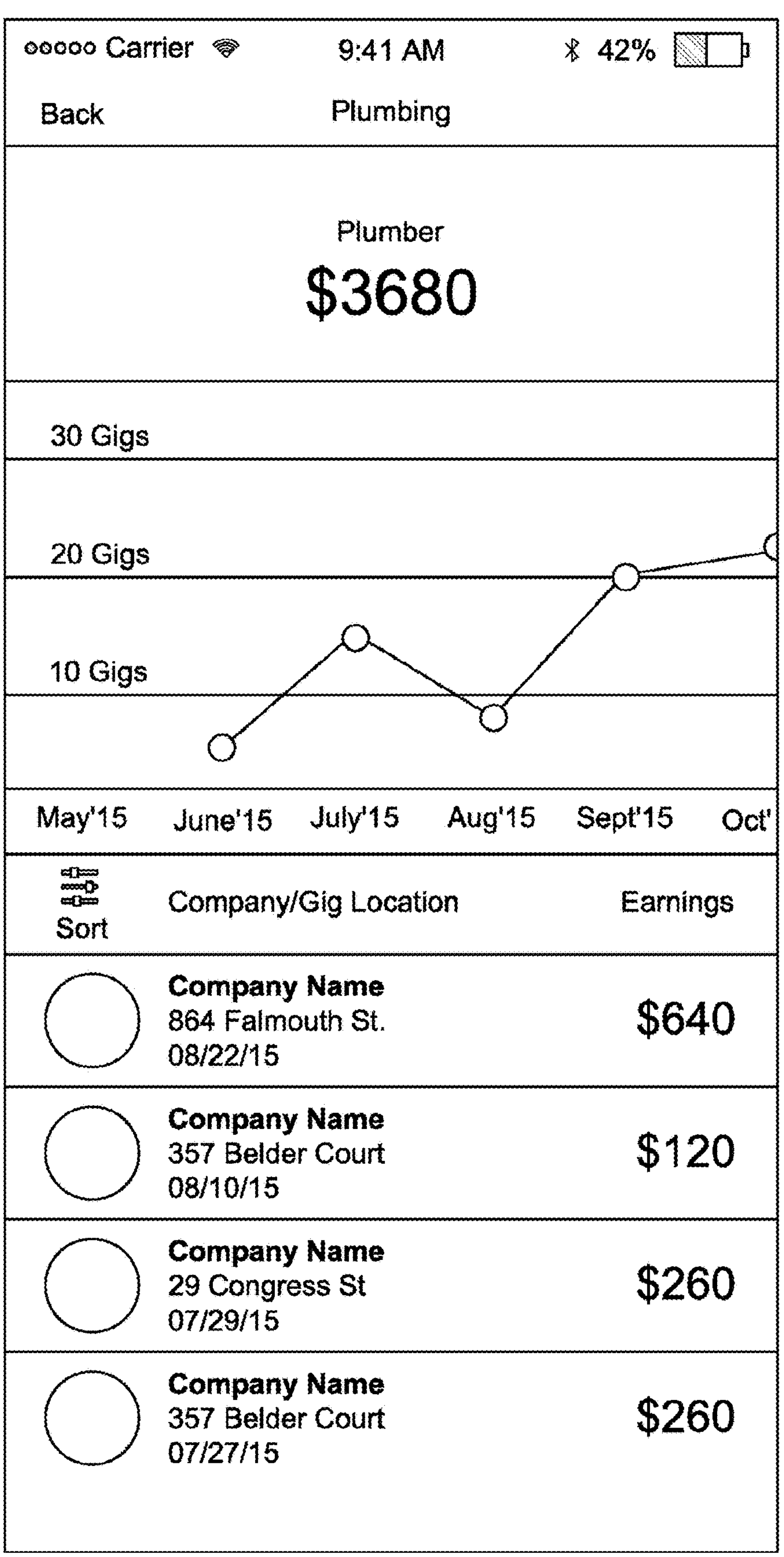
Figure 102:
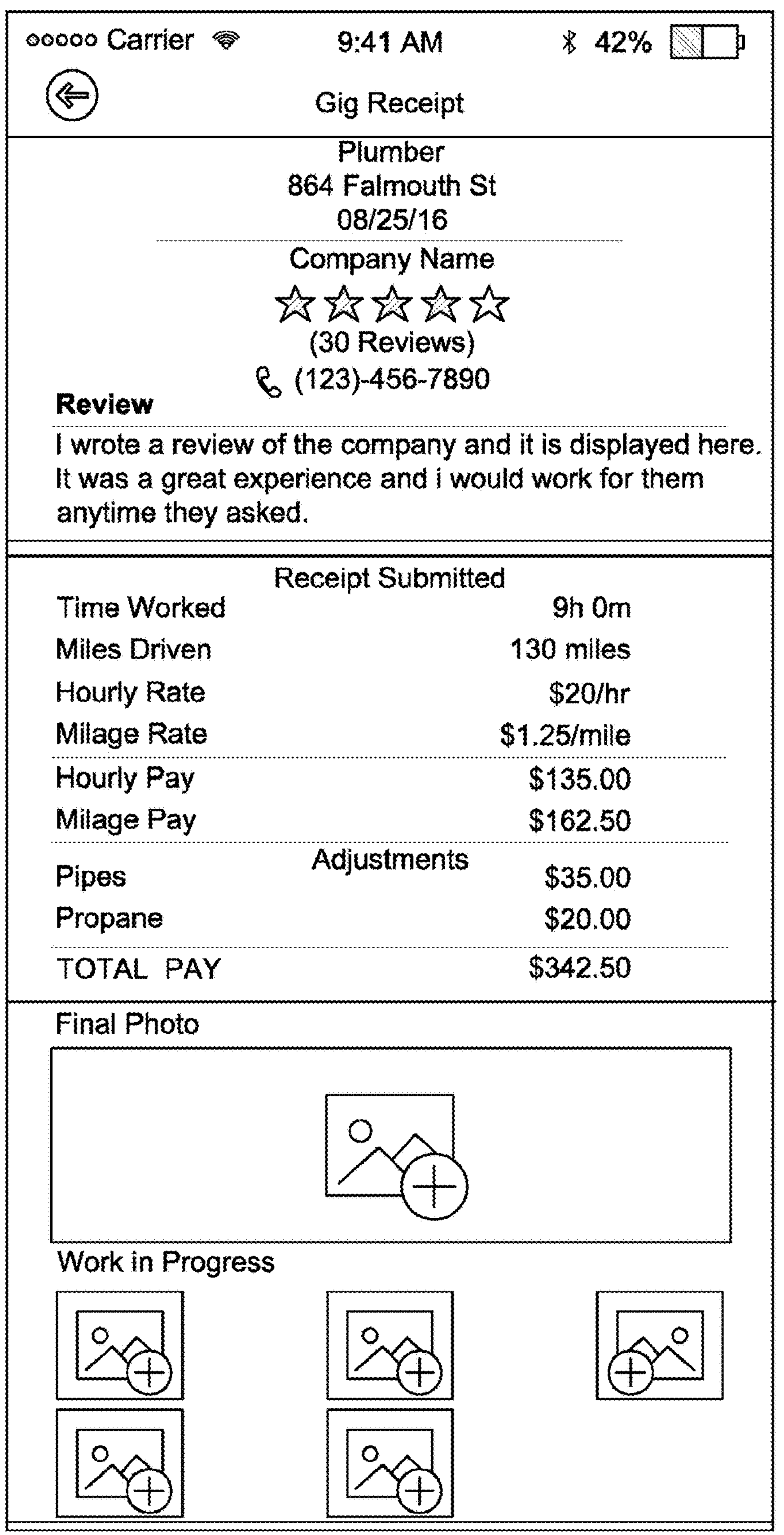
Figure 103:
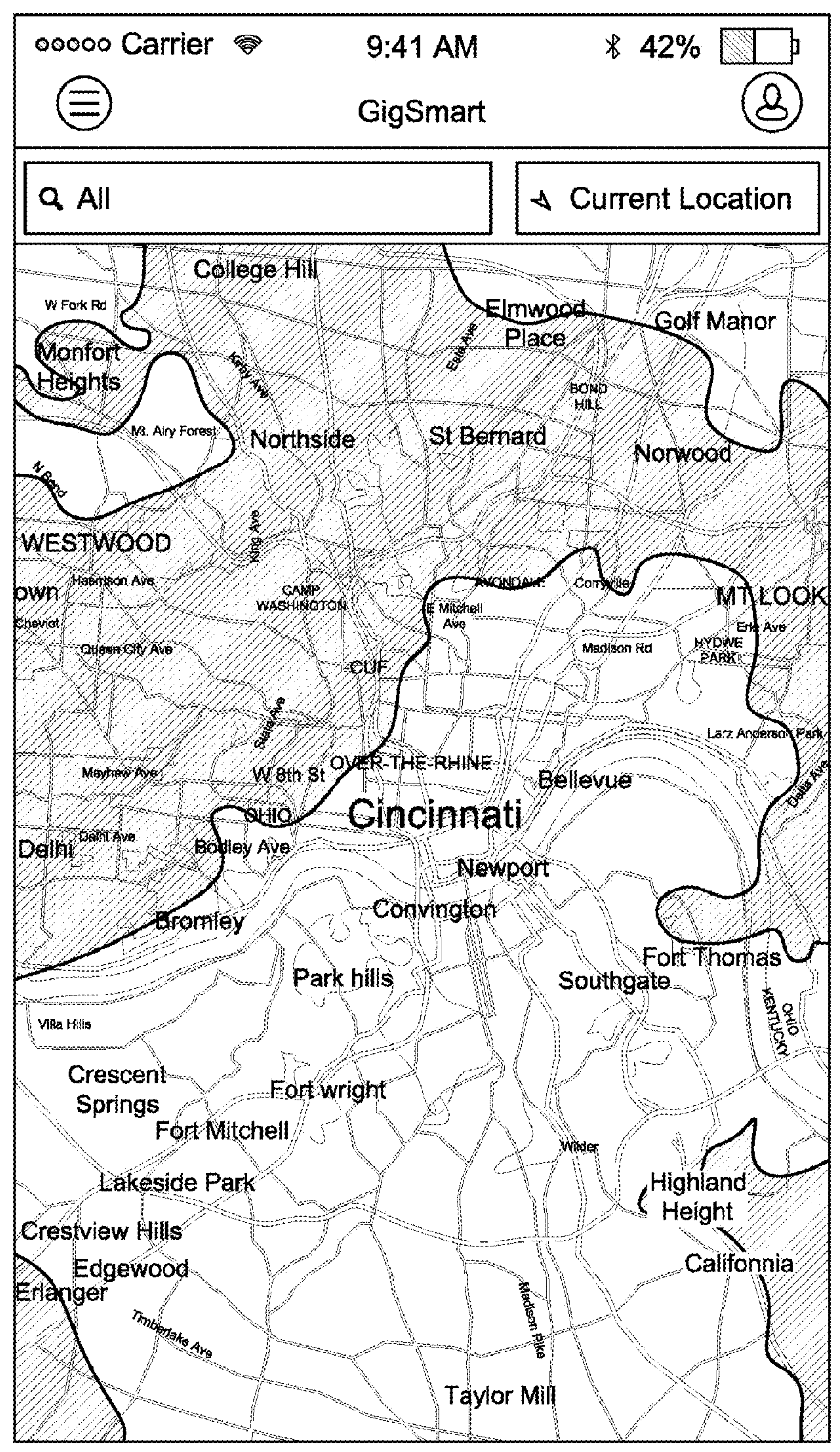
Figure 104:
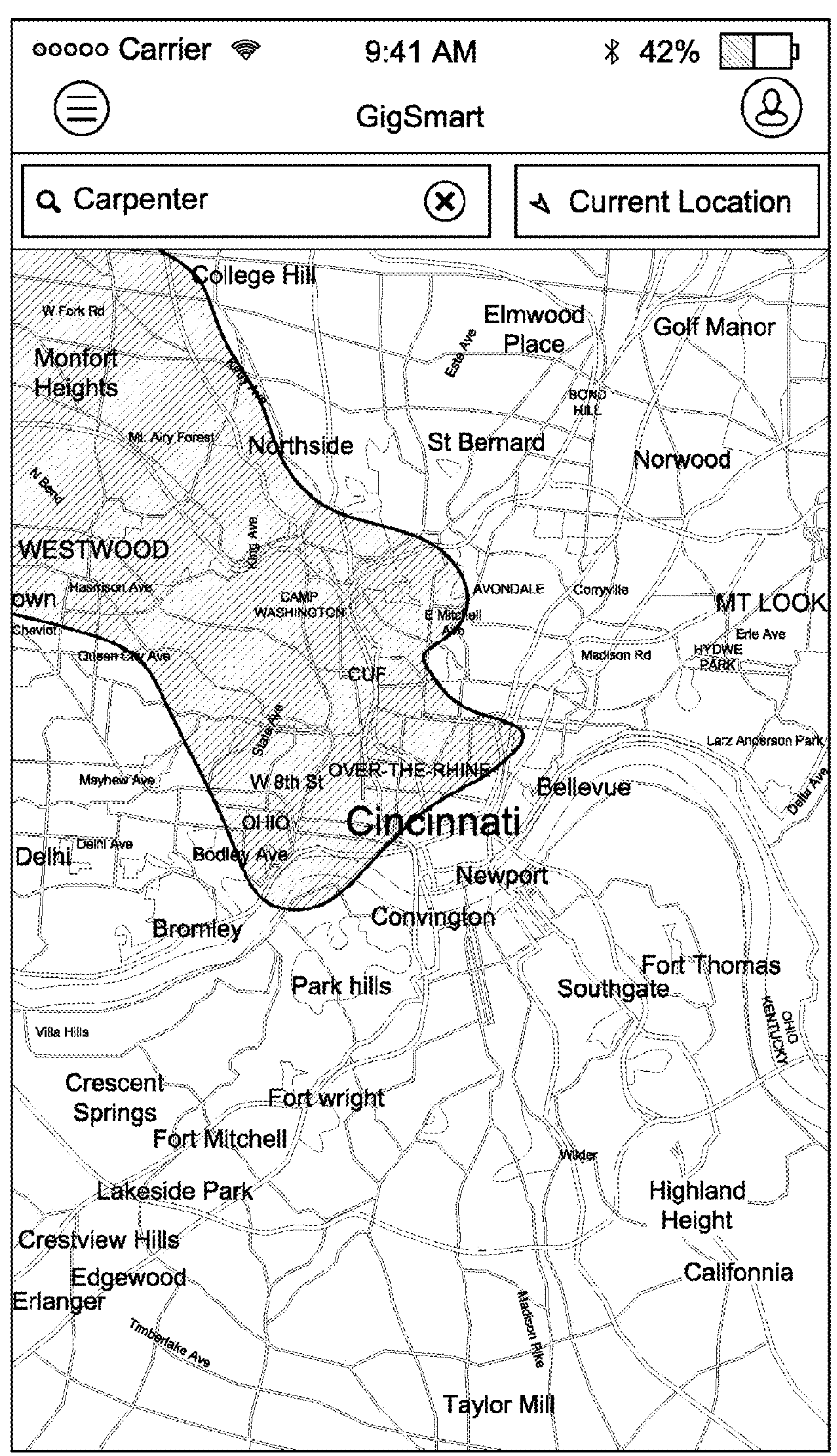
Figure 274:
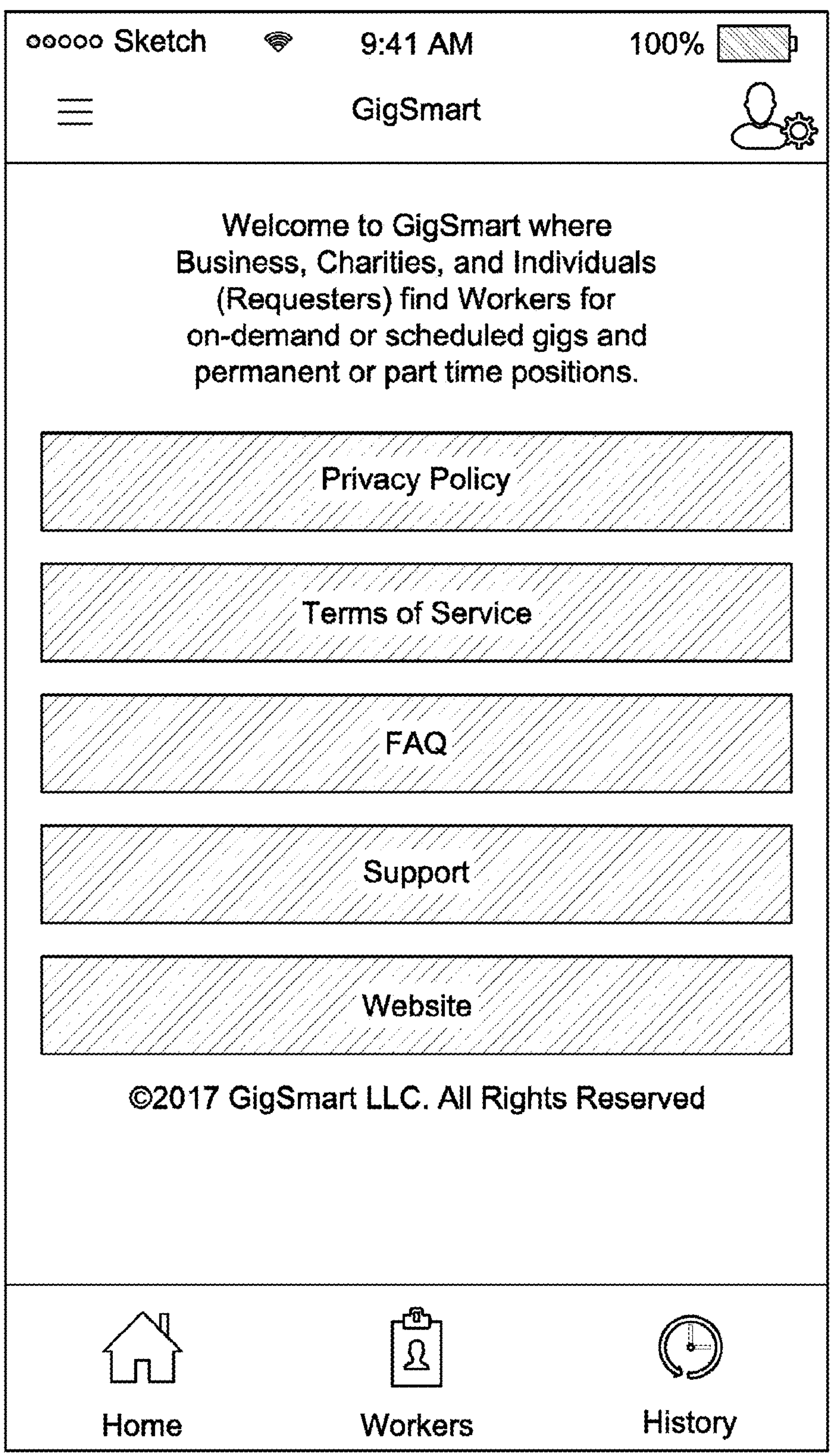

Various example graphical user displays are shown in FIGS. 20-274, as may be hosted or otherwise provided by an LME computing system in accordance with the present disclosure. Such graphical displays may be presented on any suitable computing device, such as a mobile communications device, a laptop computer, a mobile computing device, a handheld computer, a smart phone, a tablet computer, a wearable, a personal digital assistant, and the like. Similar to the graphical user displays shown in FIGS. 3-17, the example graphical user displays may be presented through a specialized mobile application executing on the computing device. Additionally or alternatively, various graphical user displays shown in FIGS. 20-274 can be accessed through a web-based interface that can be provided on any suitable type of networked device, such as a mobile computing device, a desktop computer, a smart TV, a tablet computer, a gaming system, or any other device having web access through Internet connectivity.

Figure 105:
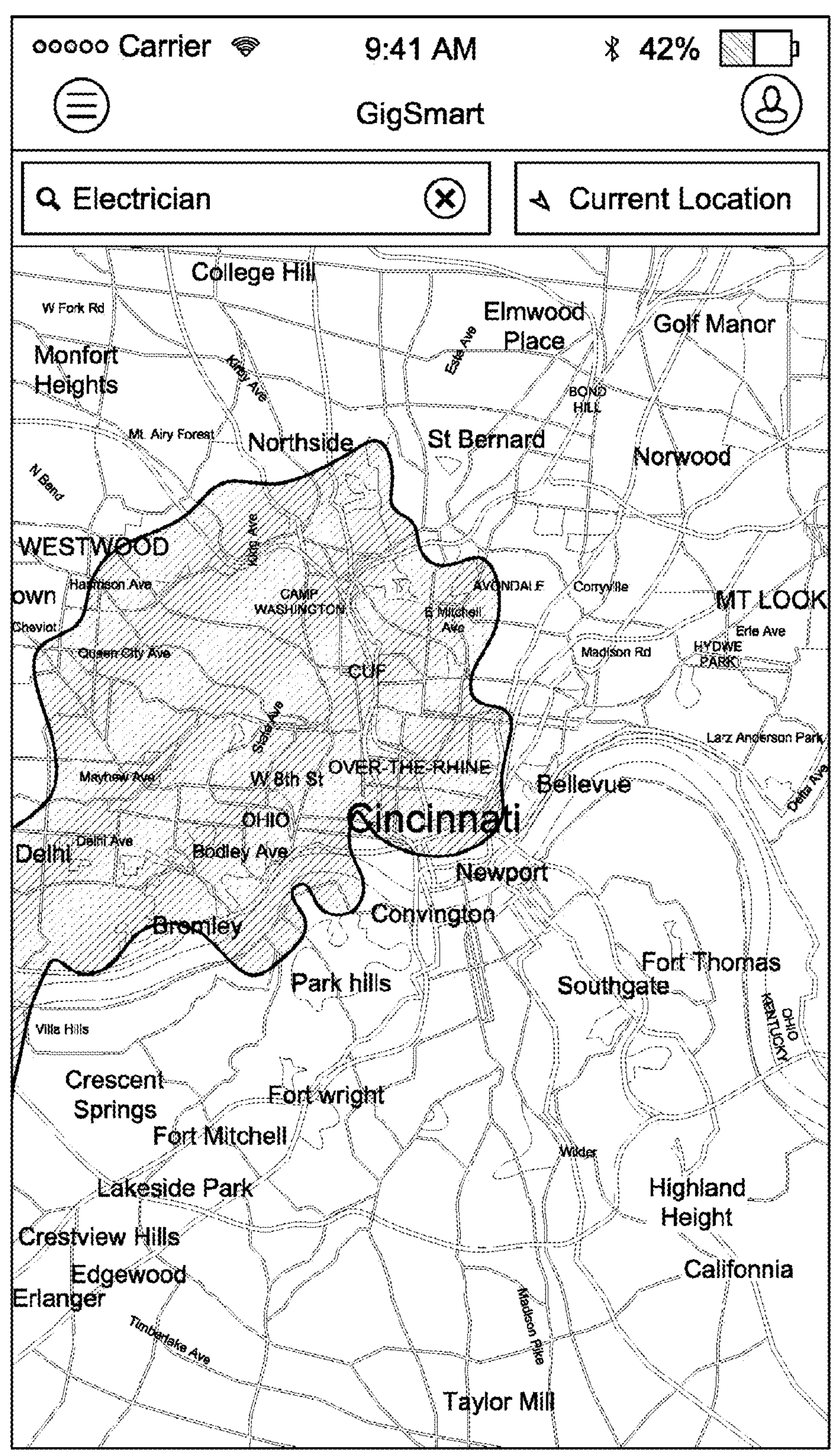
Figure 106:
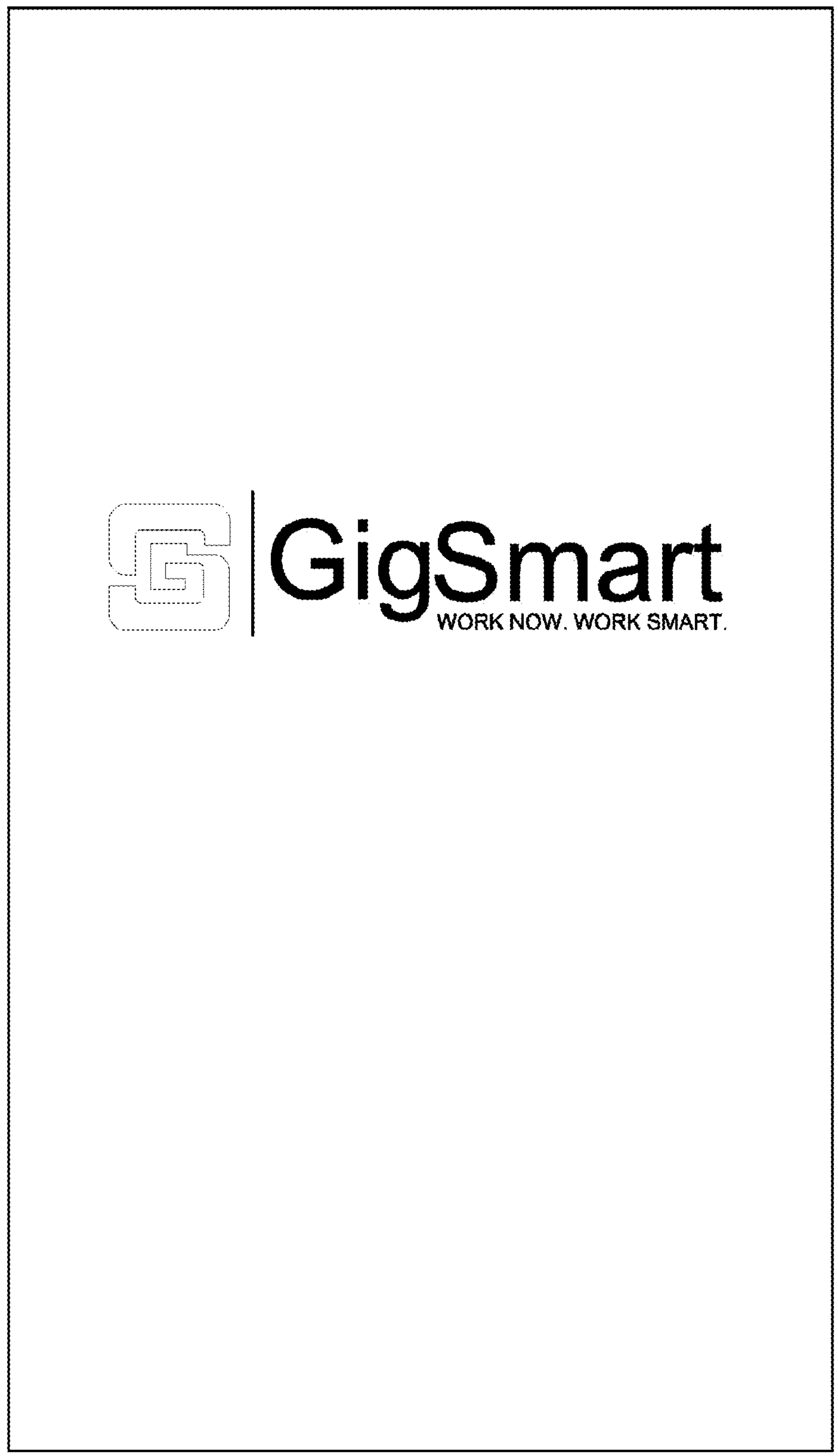
FIGS. 106-184 depict select exemplary user interfaces that can be generated by an example LME computing system for presentation to service users in accordance with various non-limiting embodiments.
Figure 111:
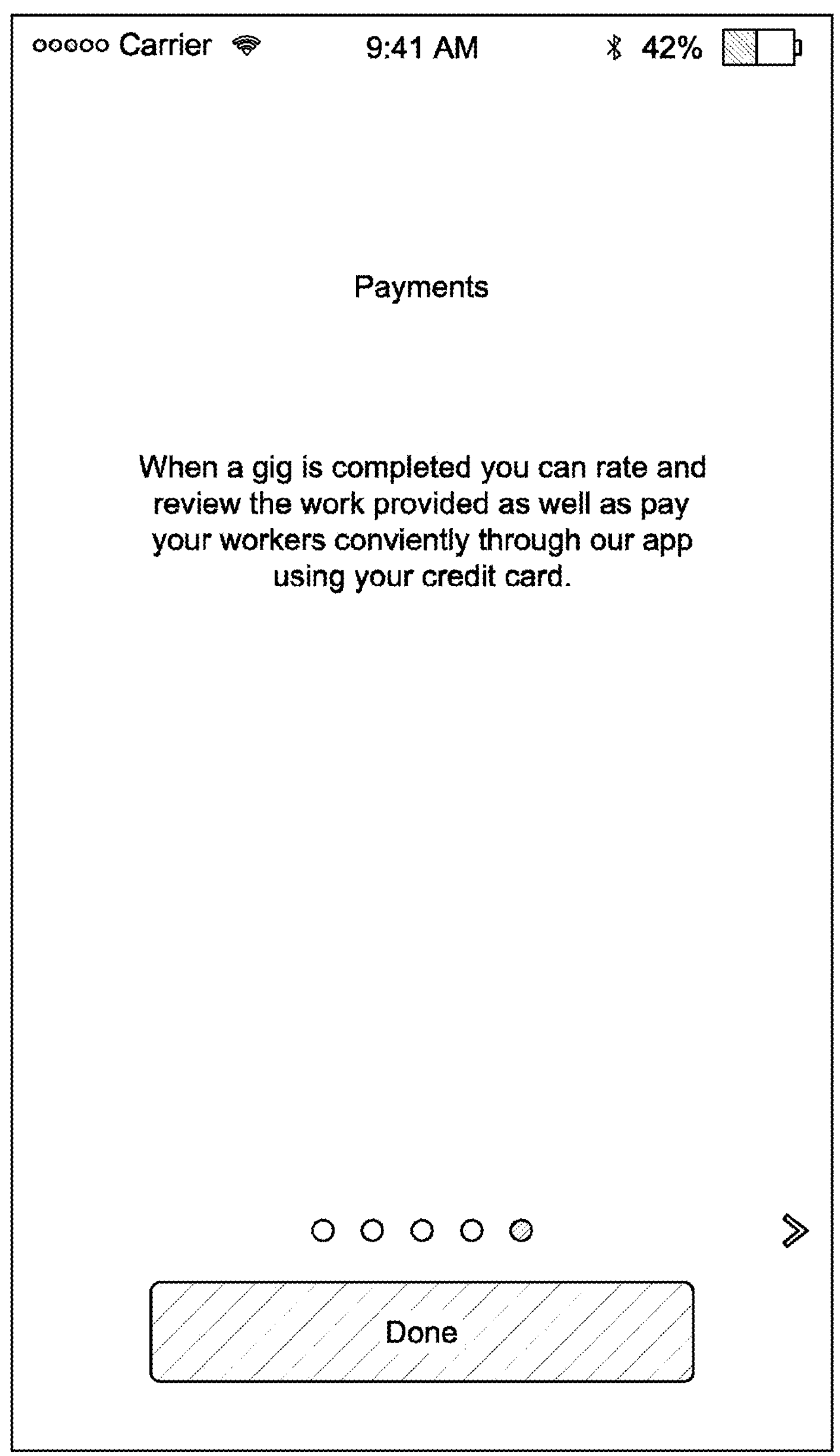
Figure 112:
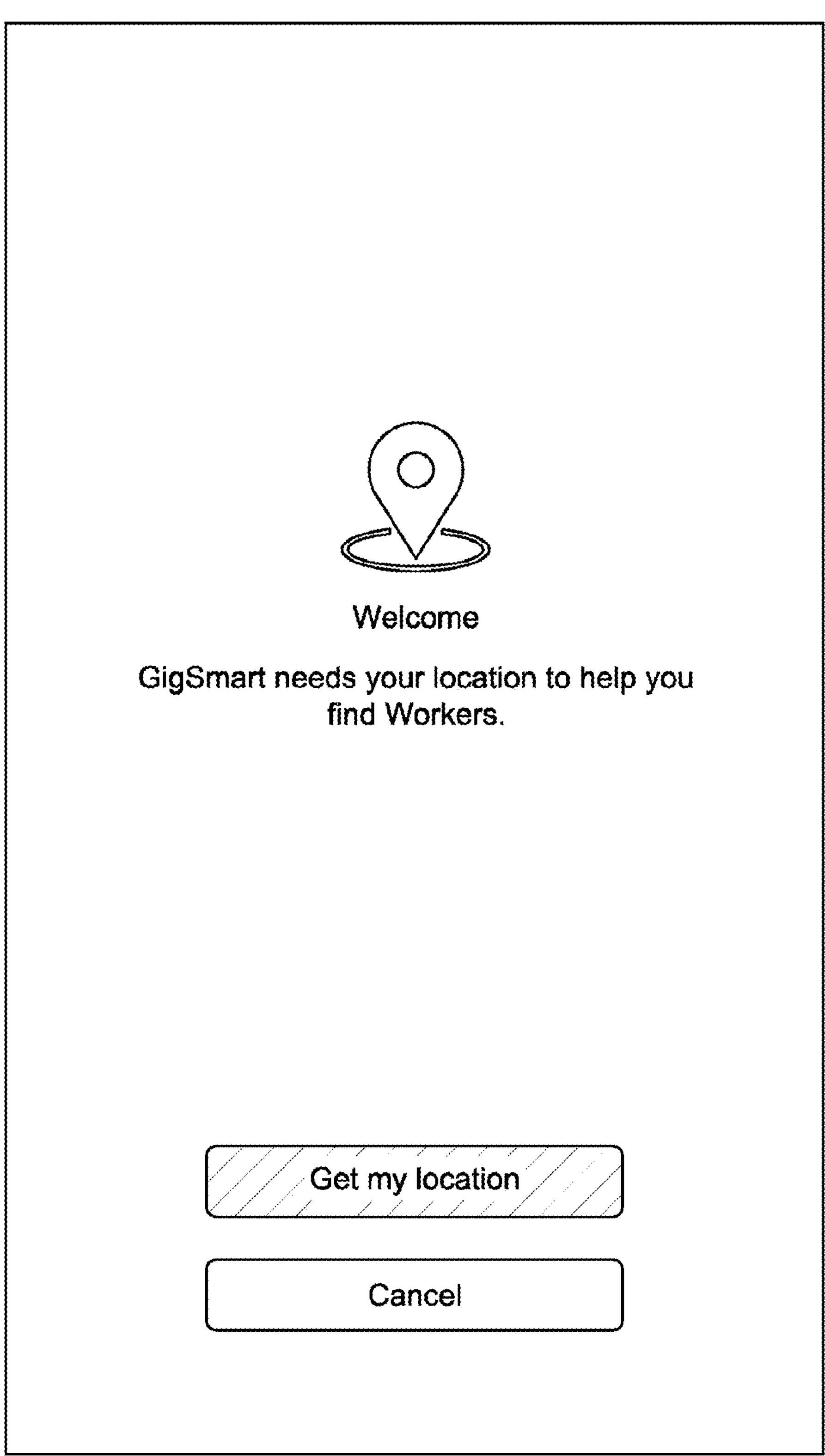
Figure 113:
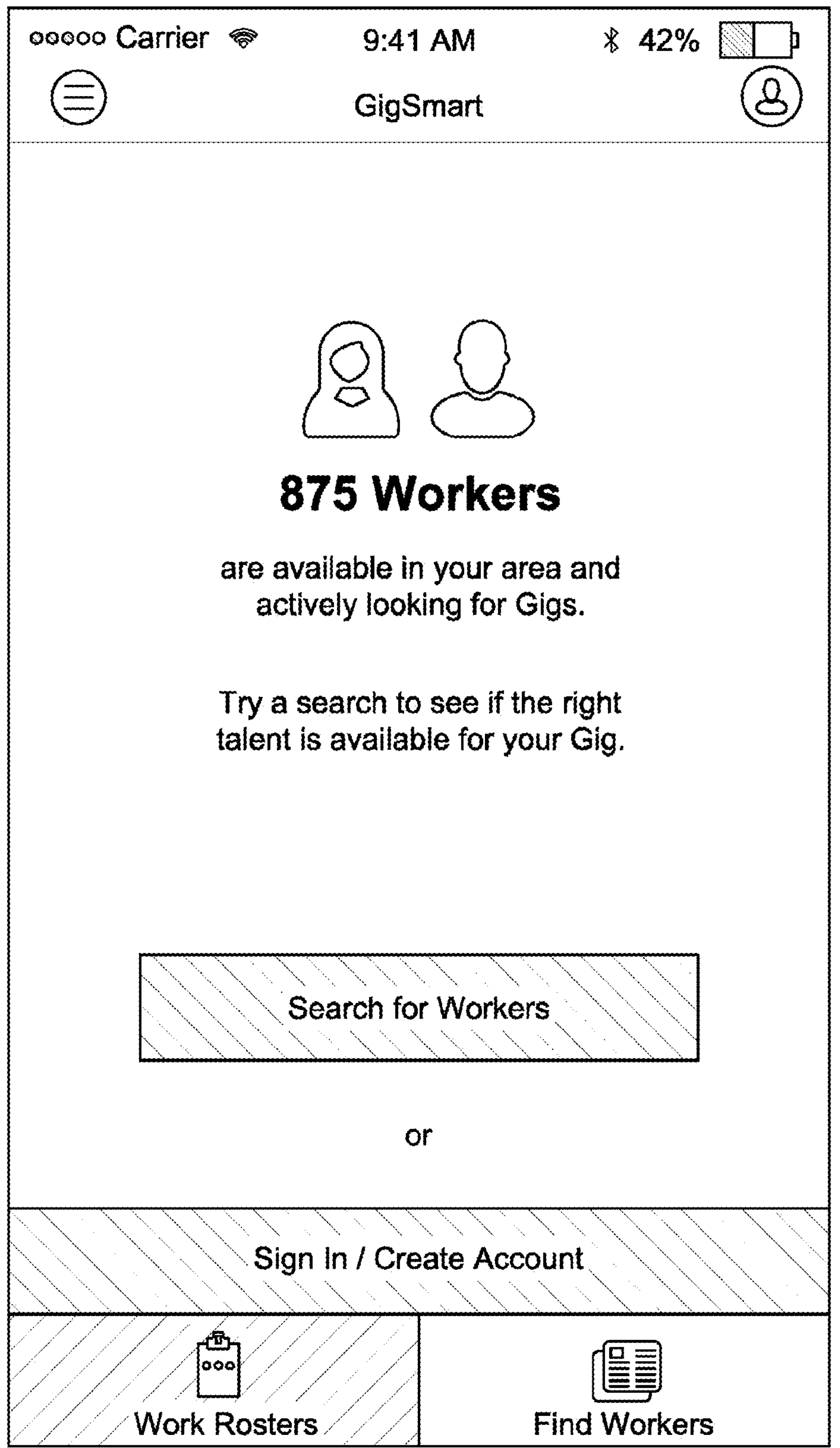
Figure 114:
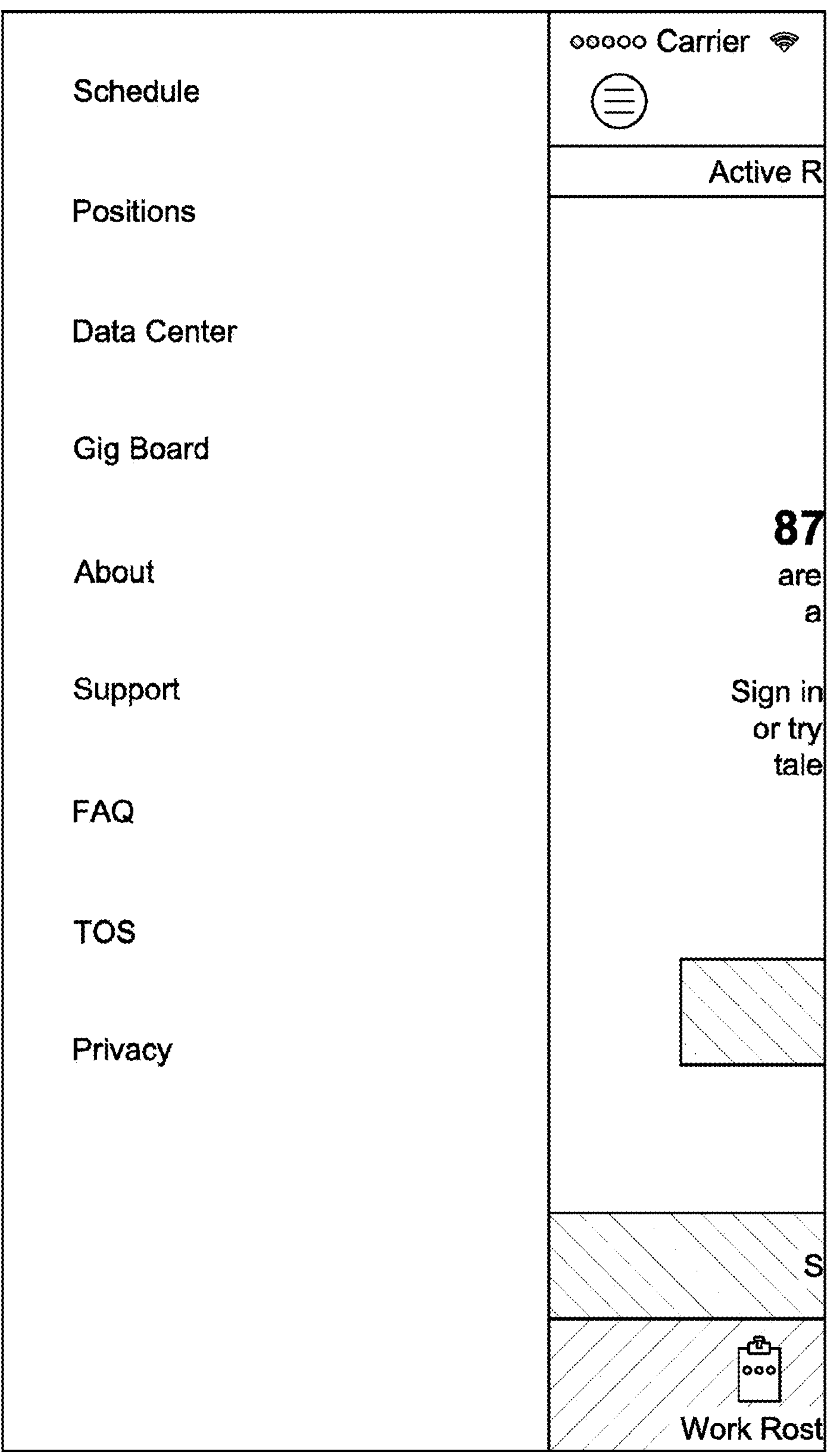
Figure 115:
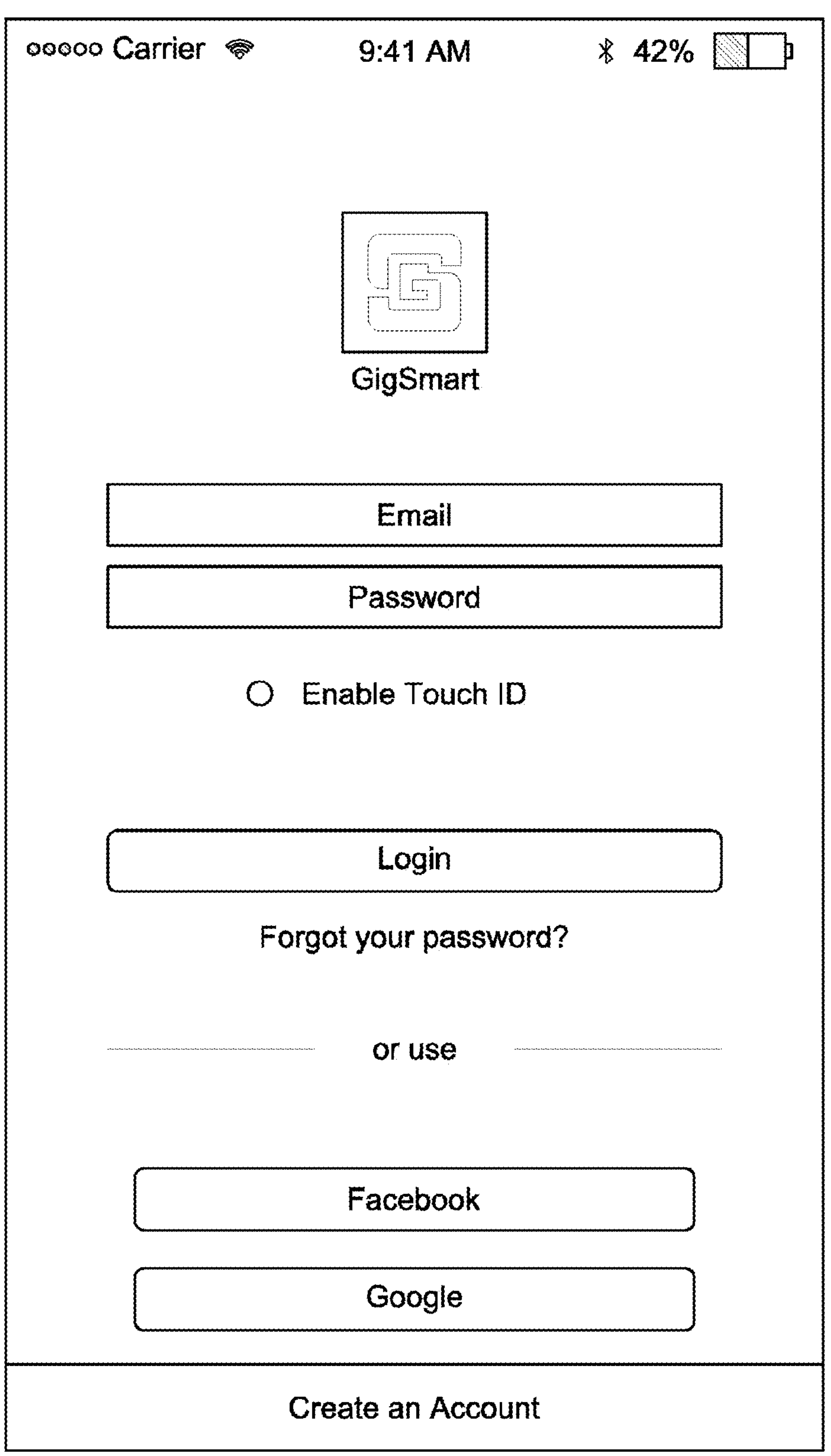
Figure 124:
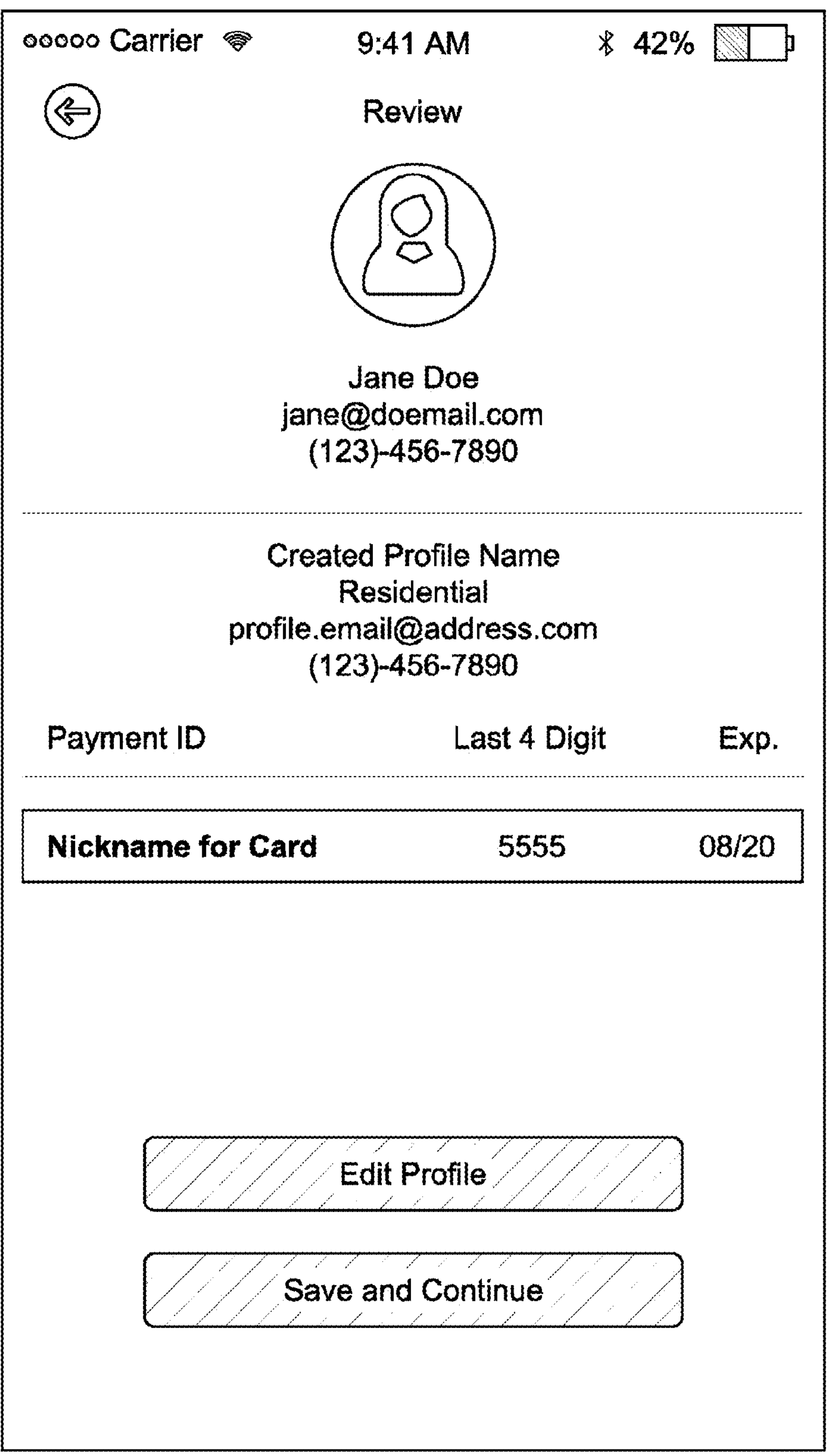
Figure 125:
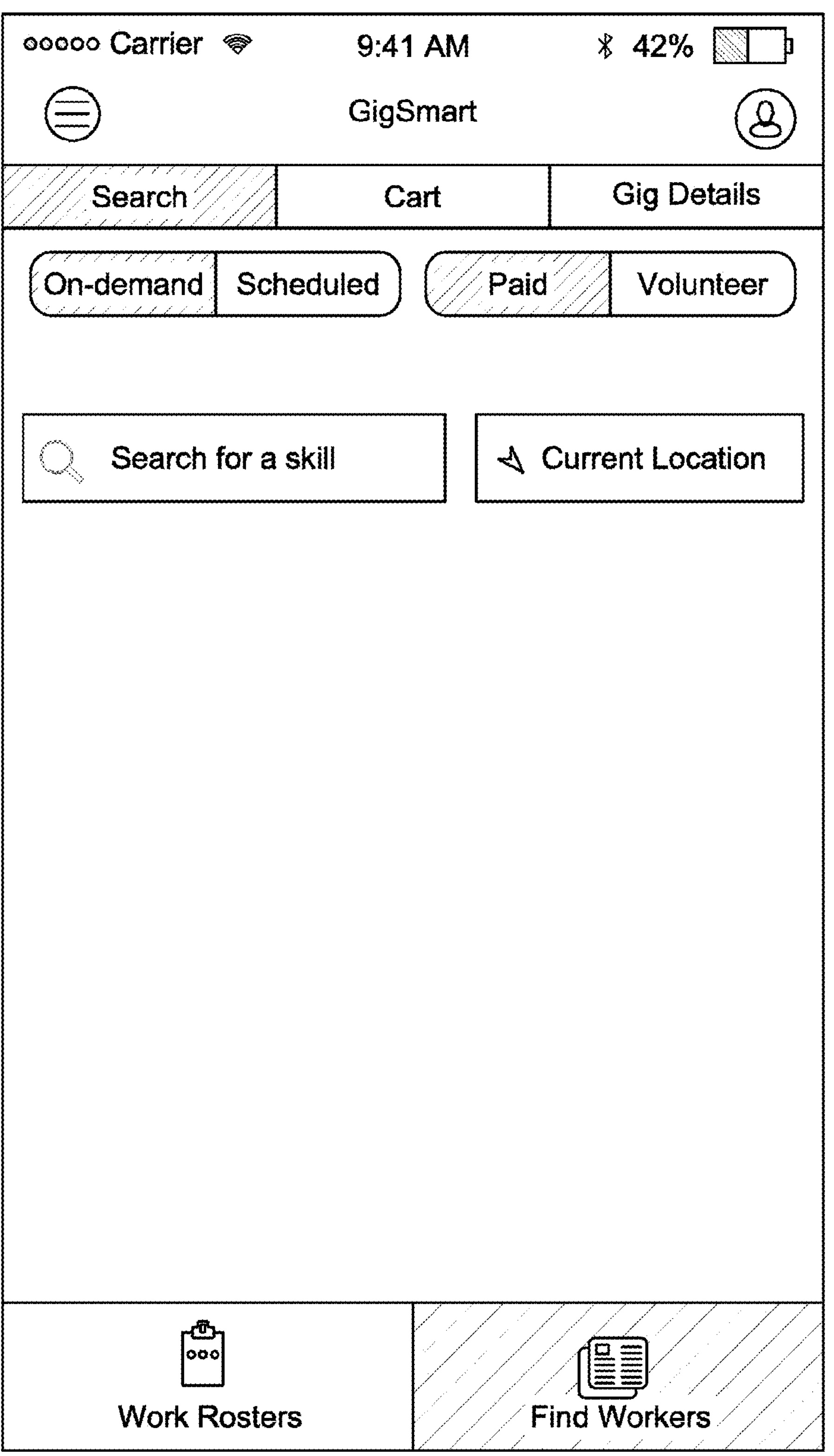
Figure 126:
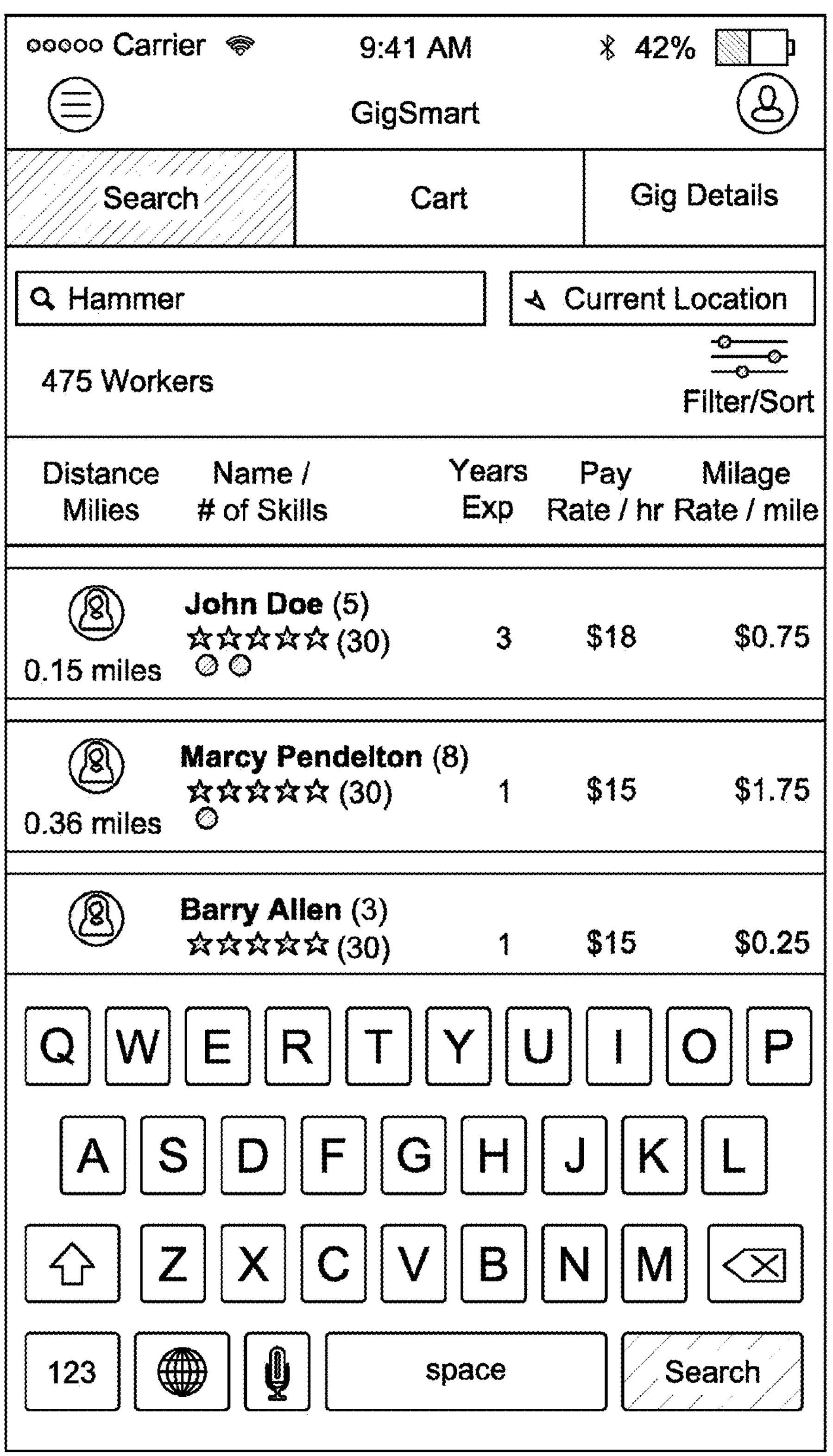
Figure 128:
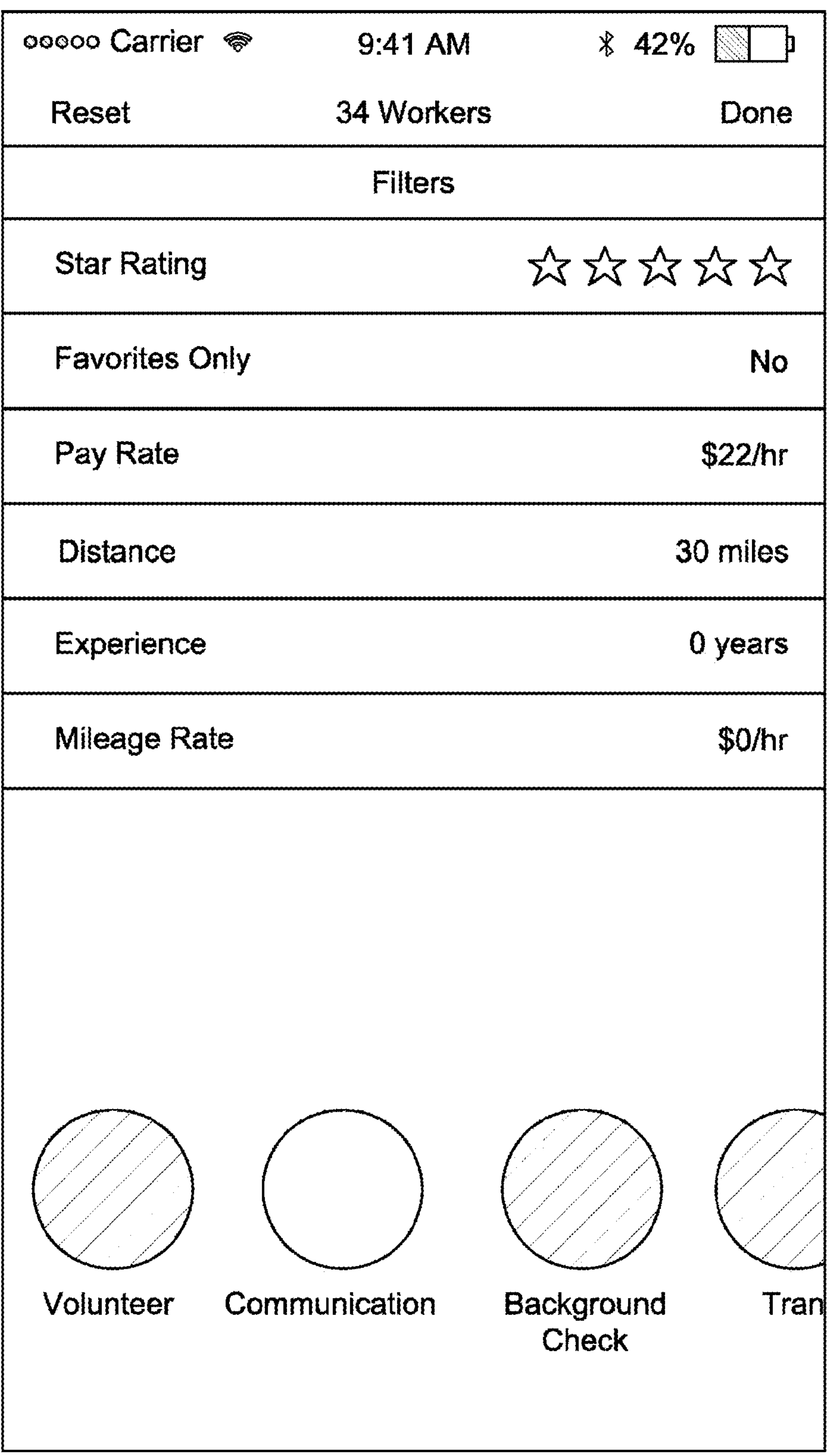
Figure 130:
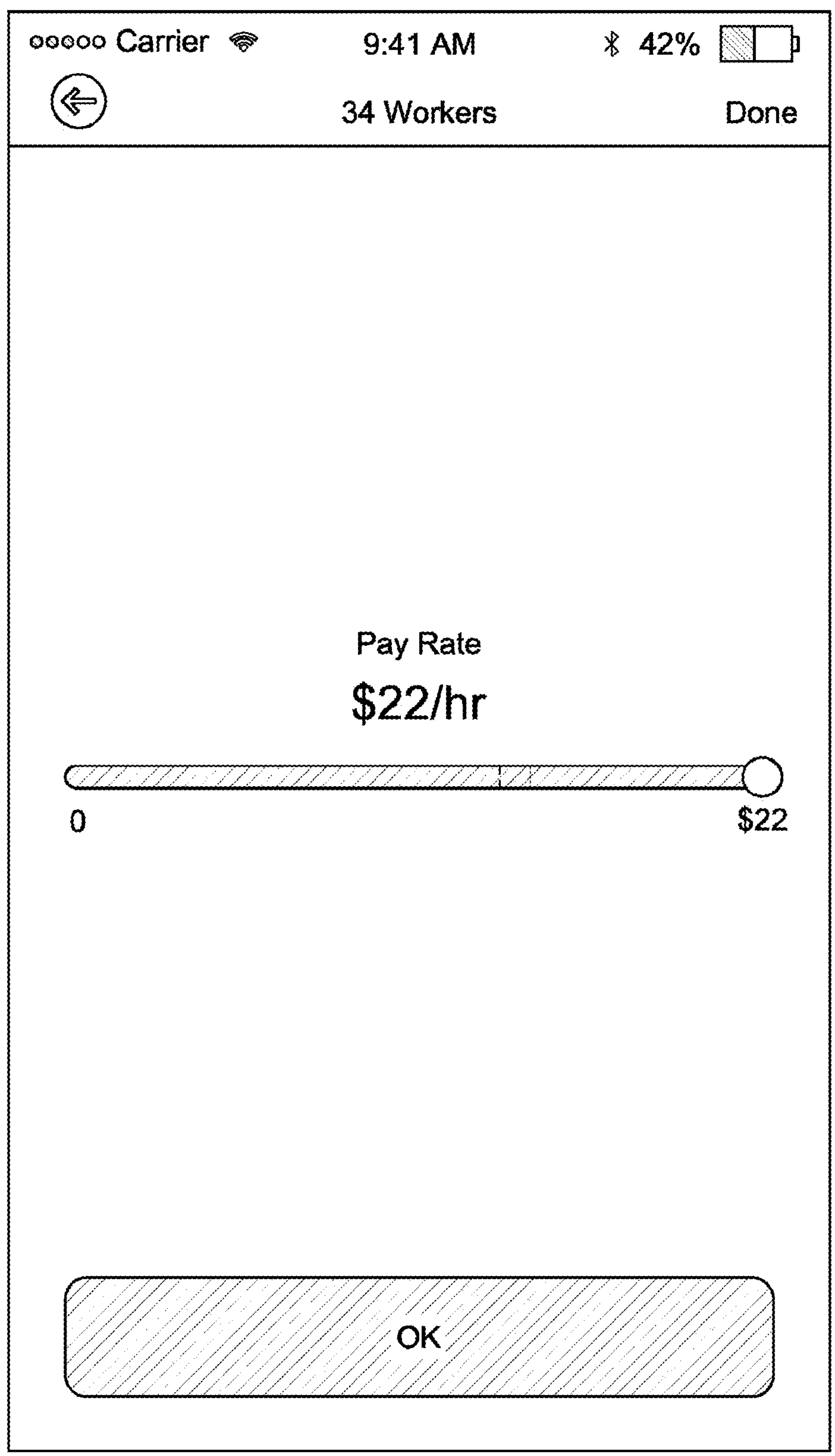
Figure 131:
Figure 132:
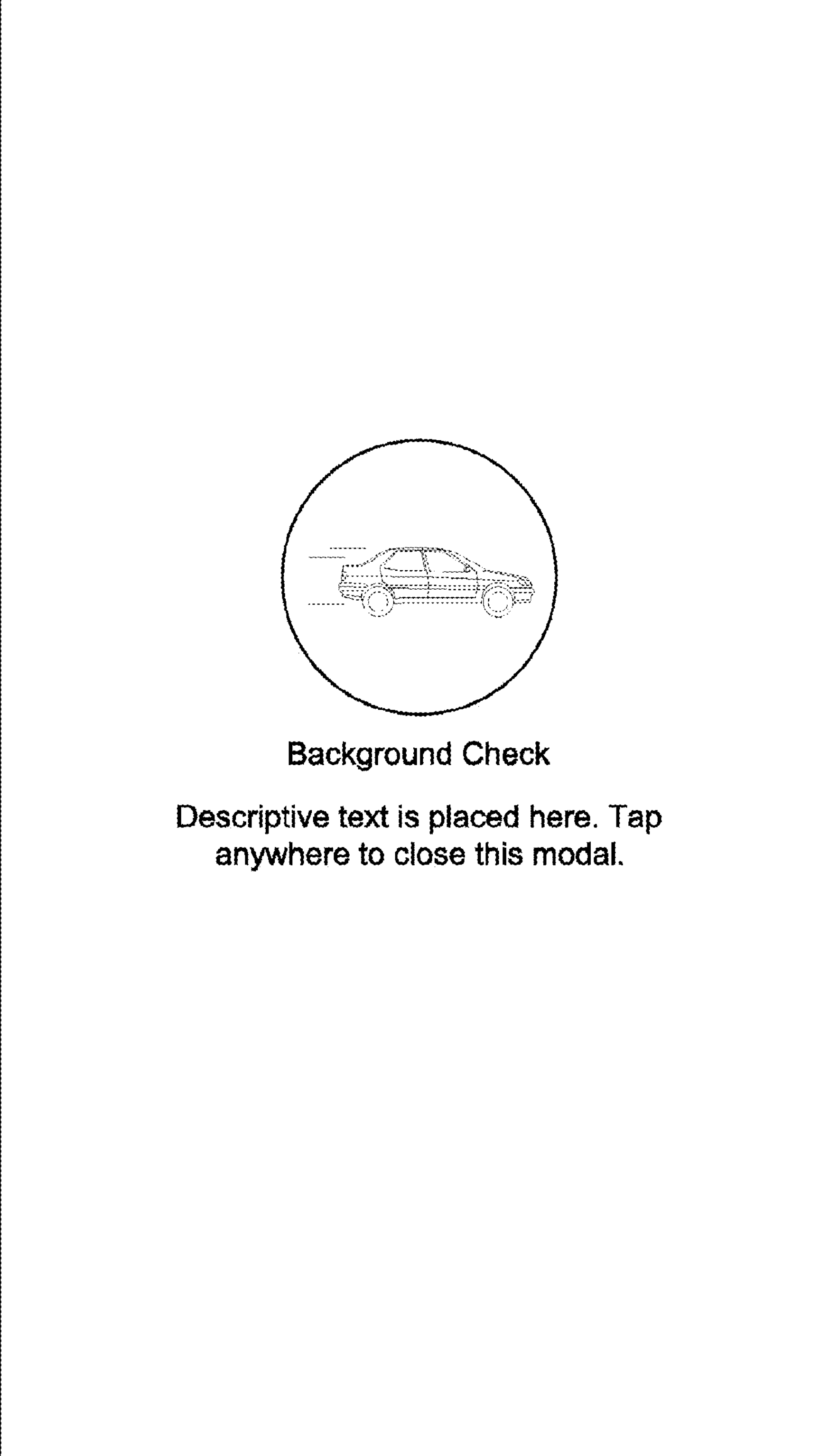
Figure 134:
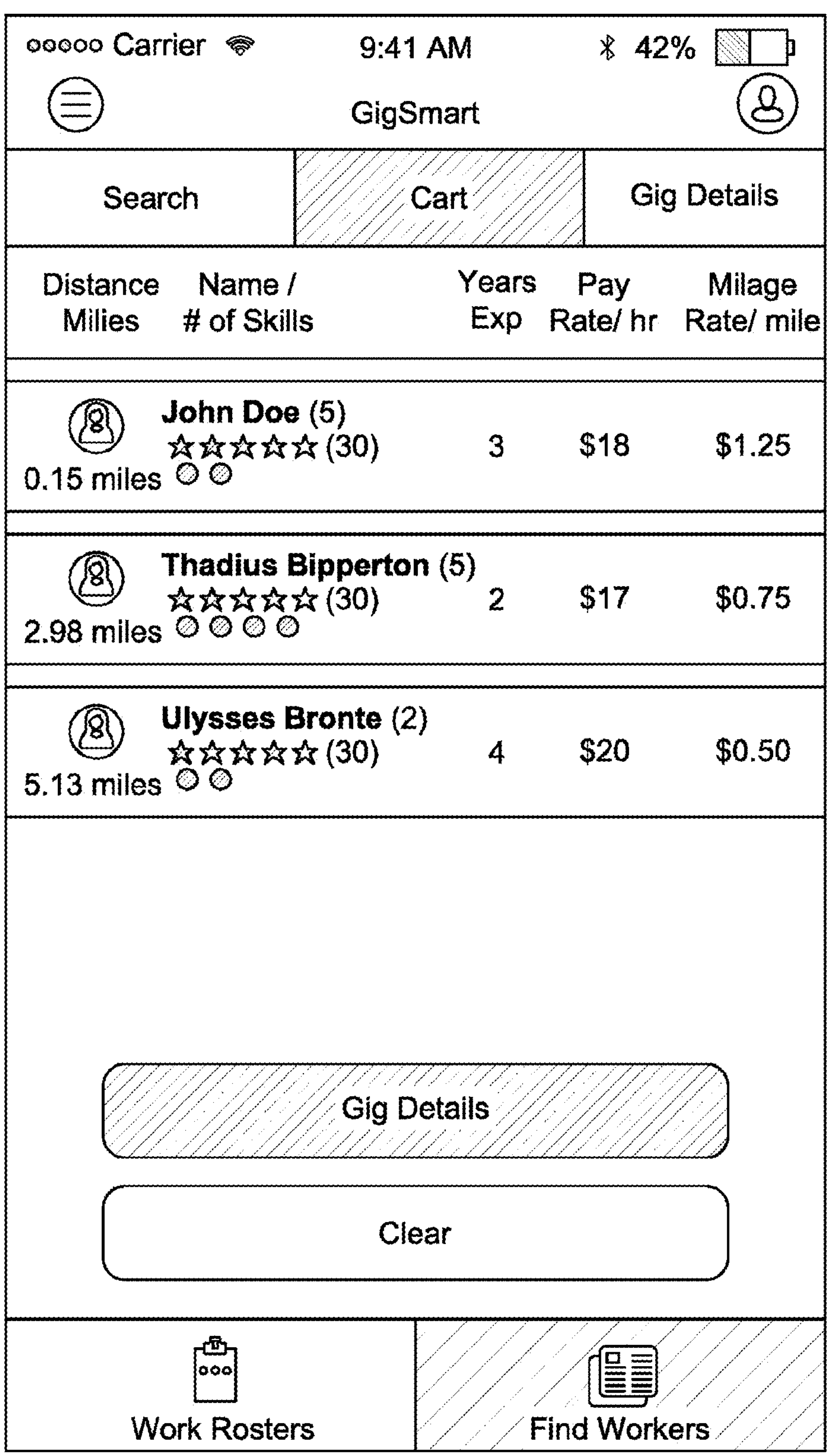
Figure 138:
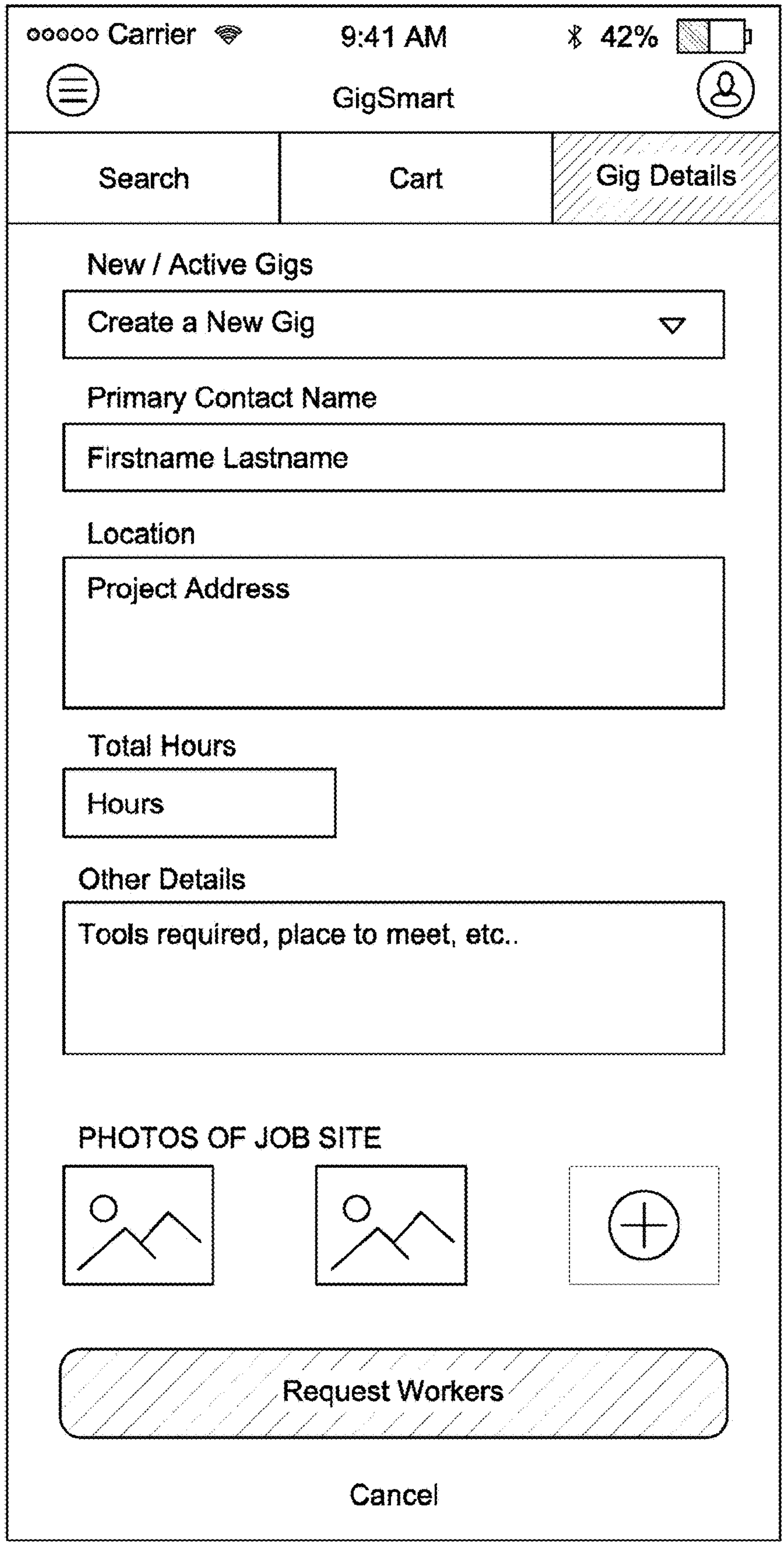
Figure 139:
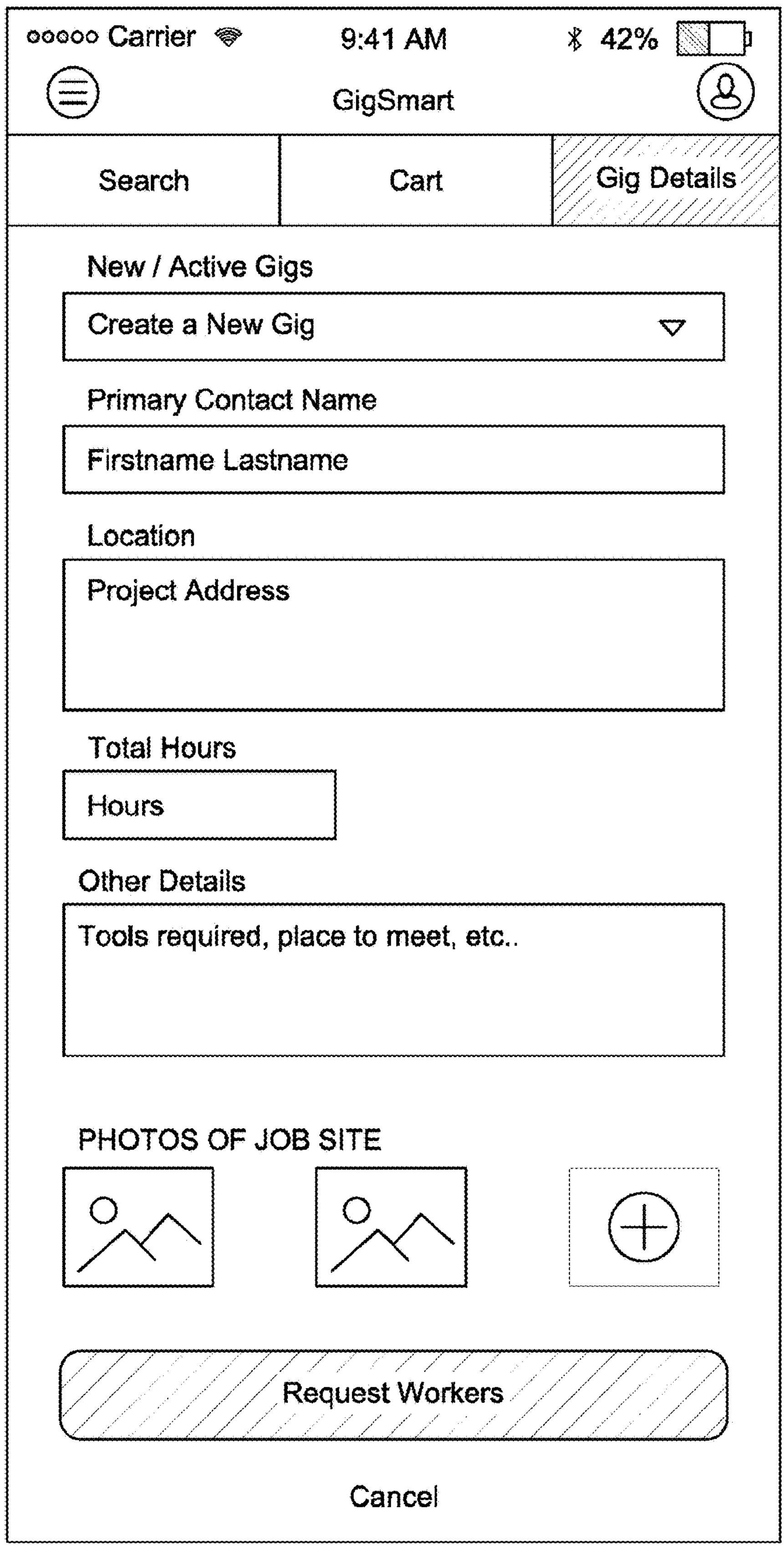
Figure 141:
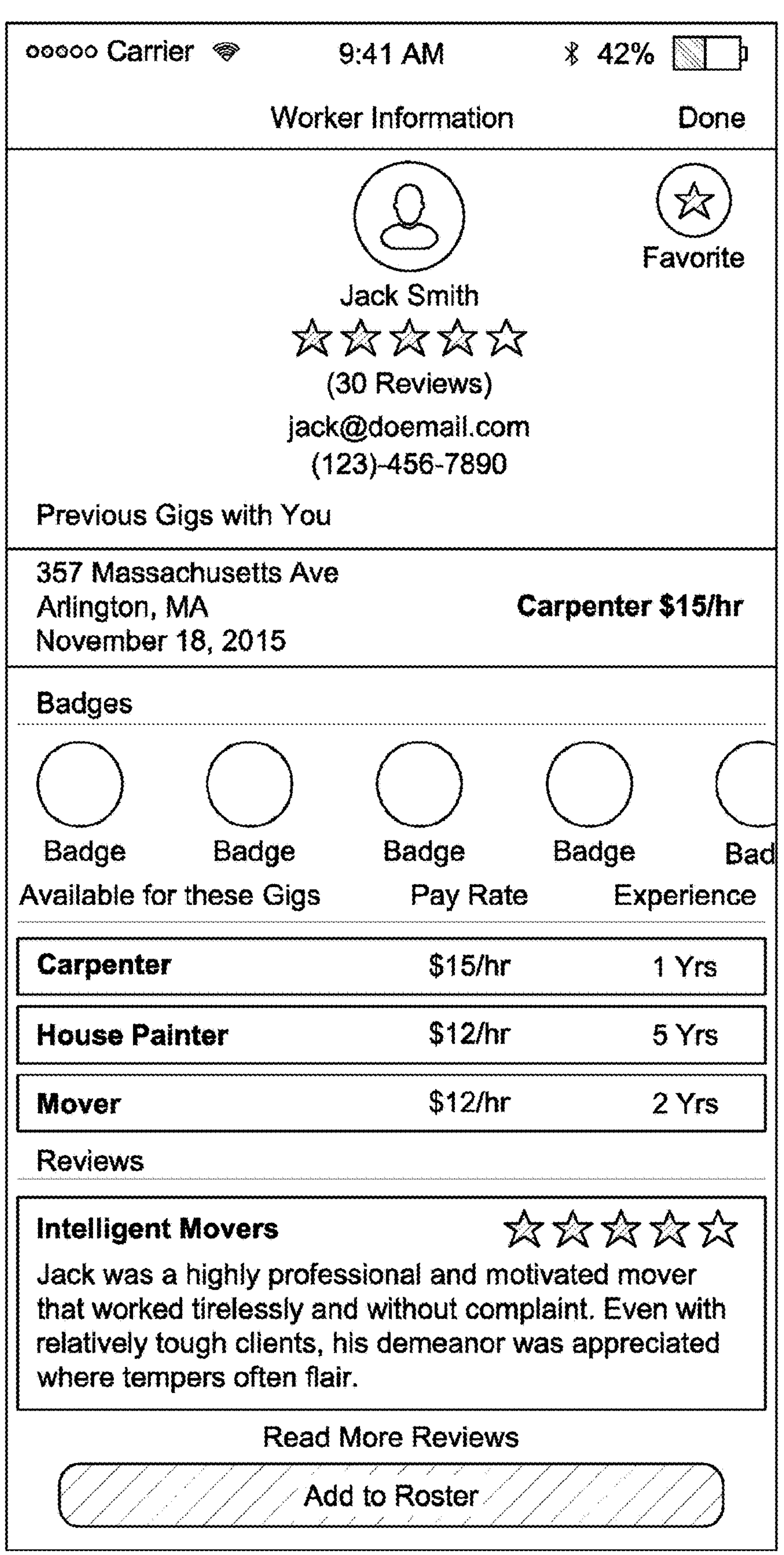
Figure 142:
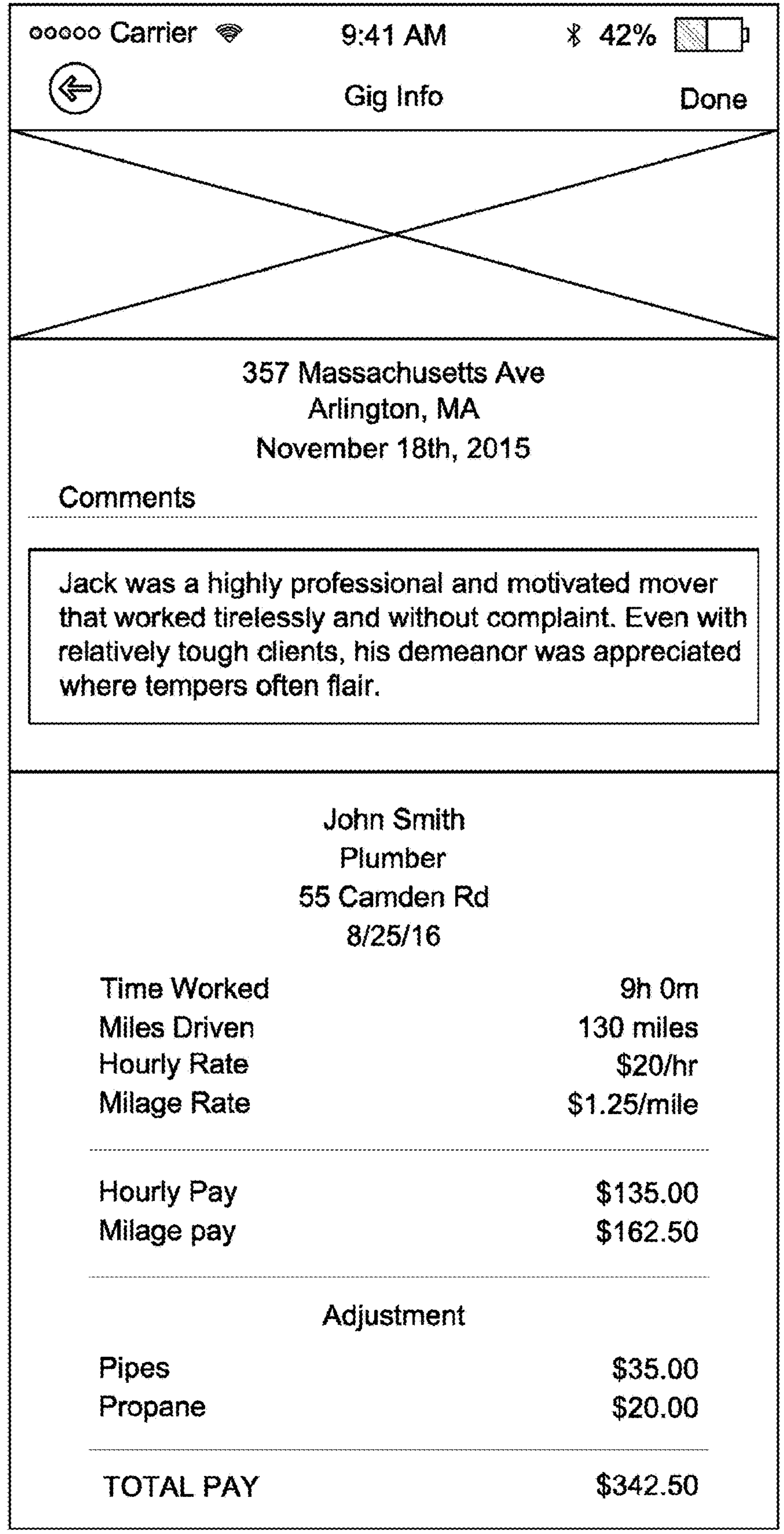
Figure 143:
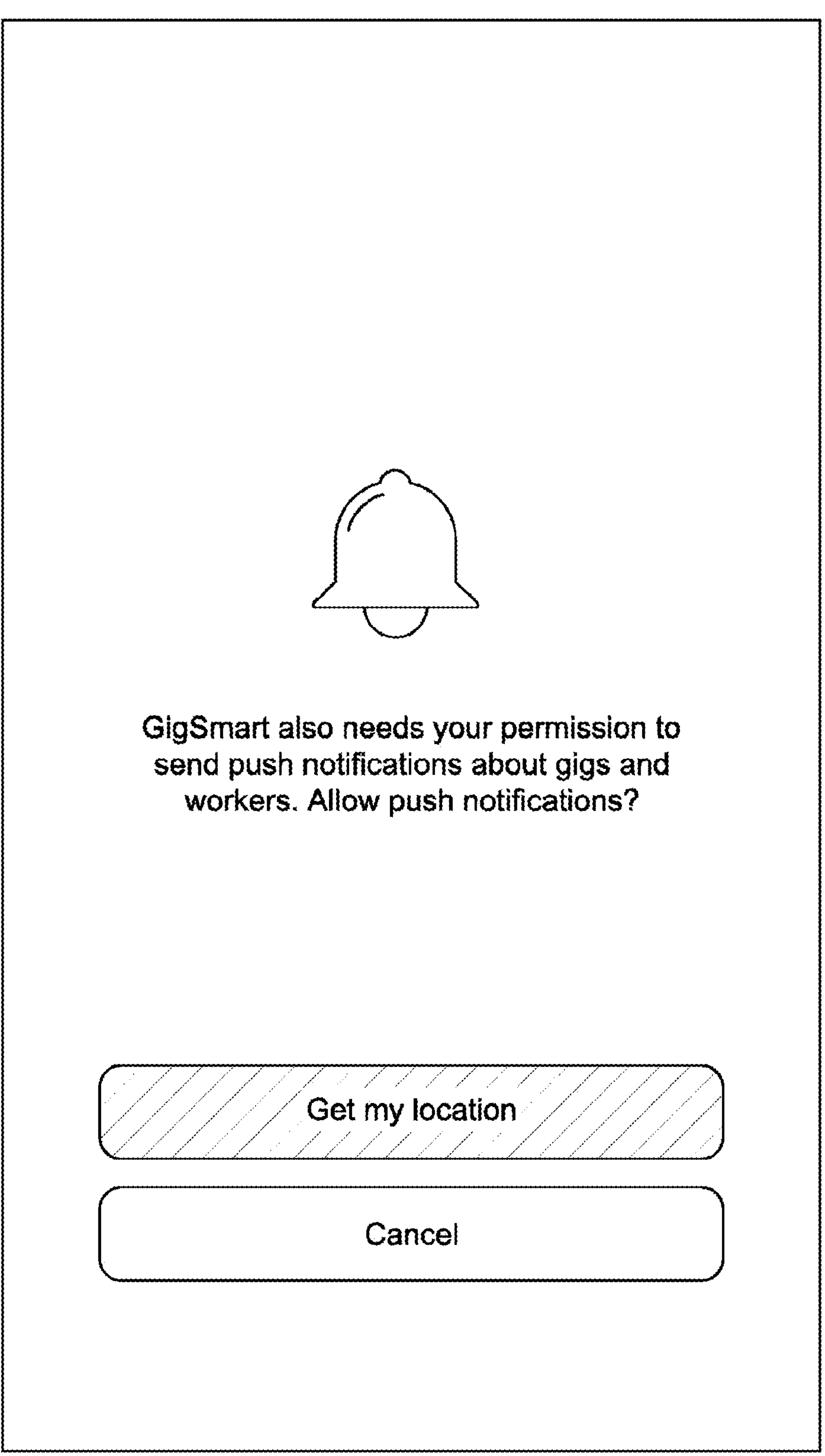
Figure 144:
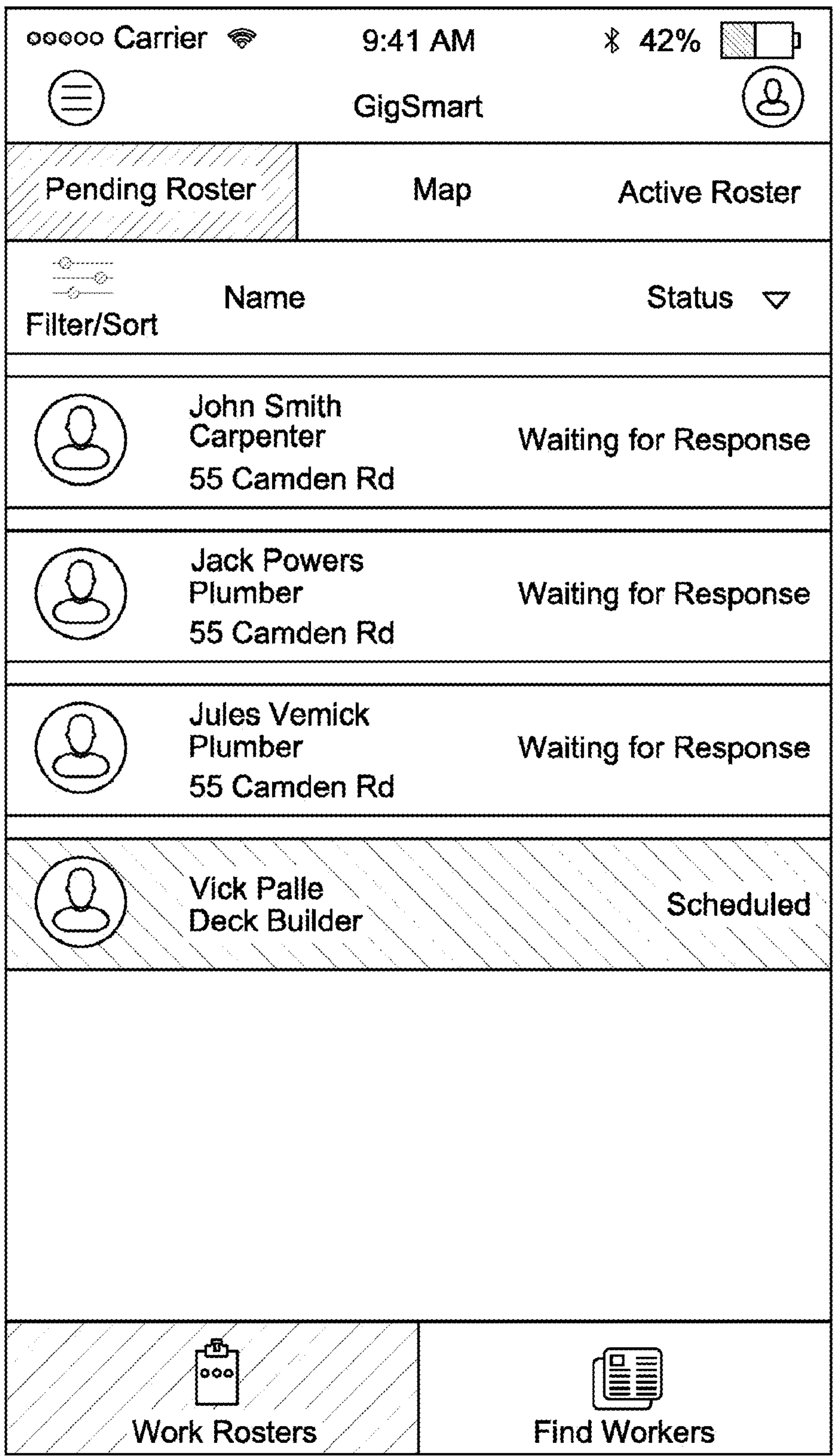
Figure 146:
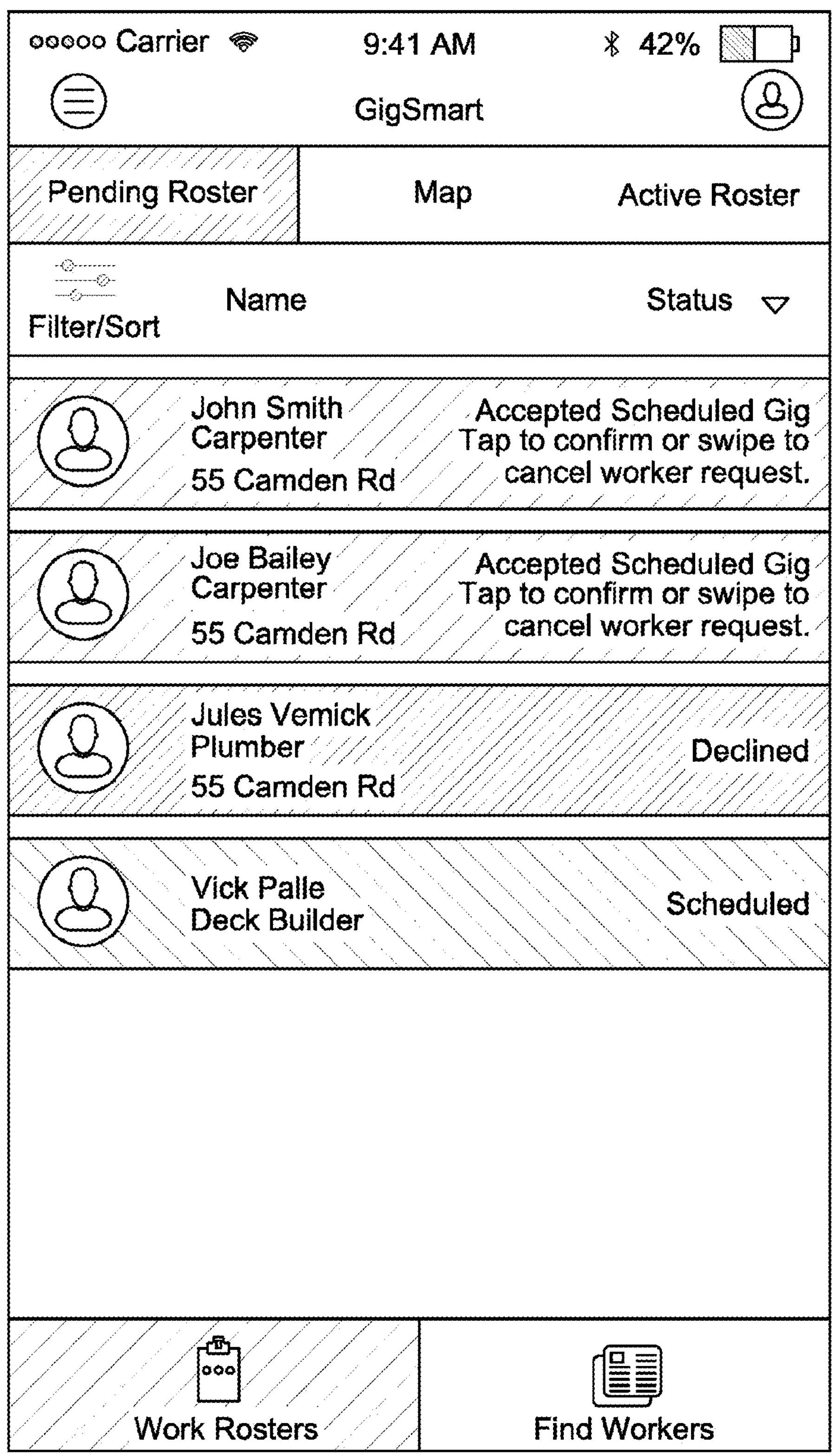
Figure 147:
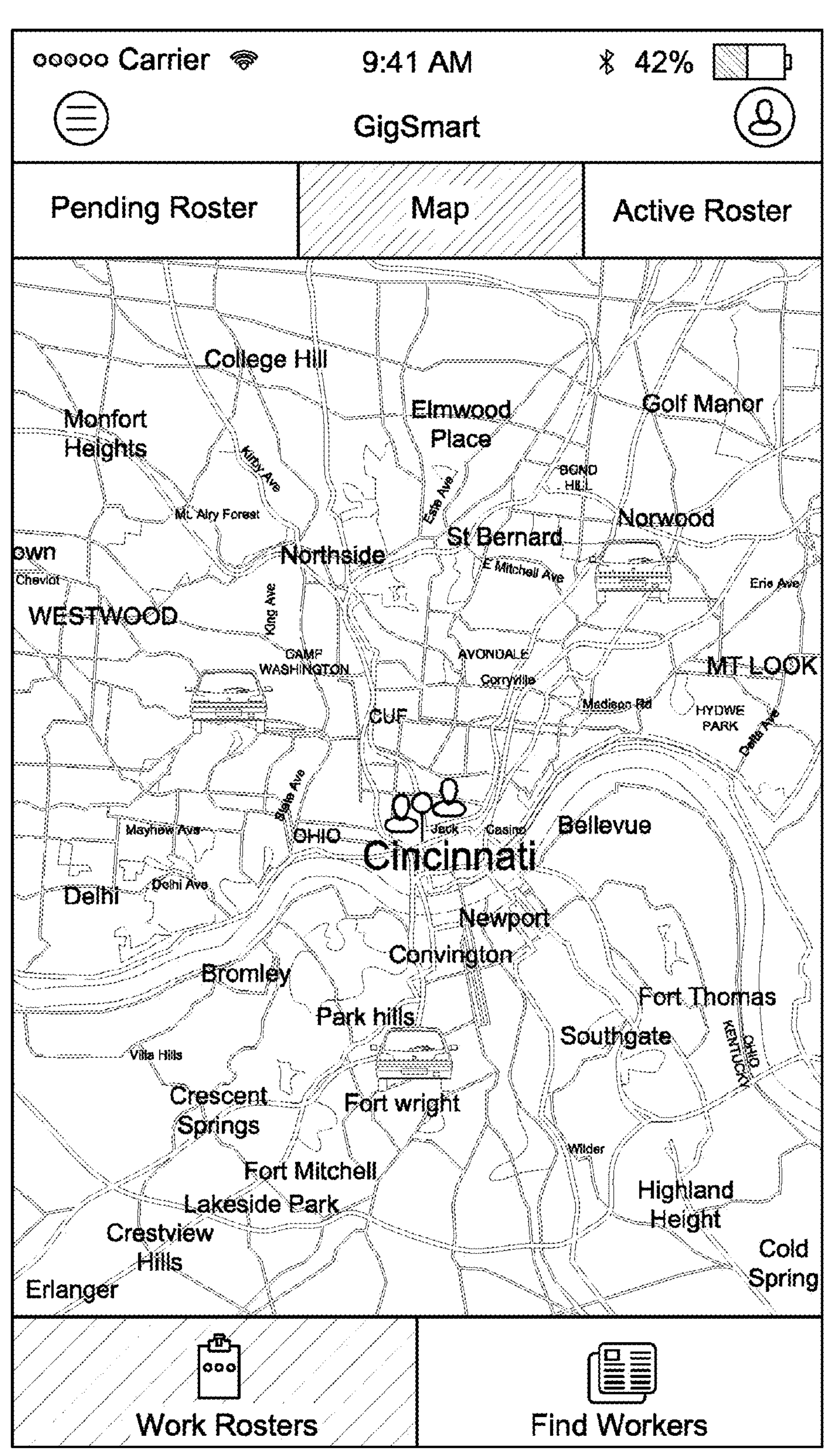
Figure 148:
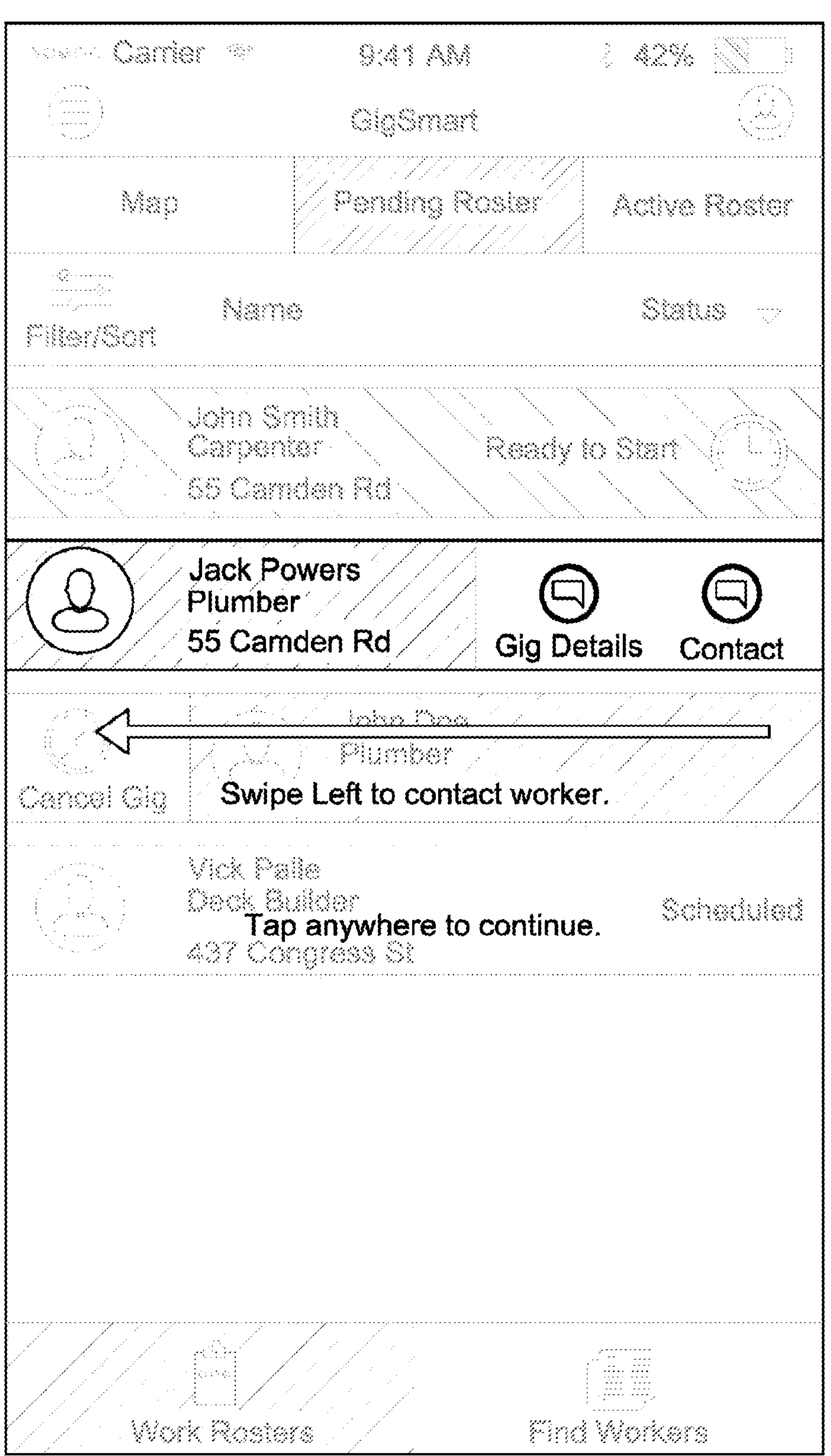
Figure 149:
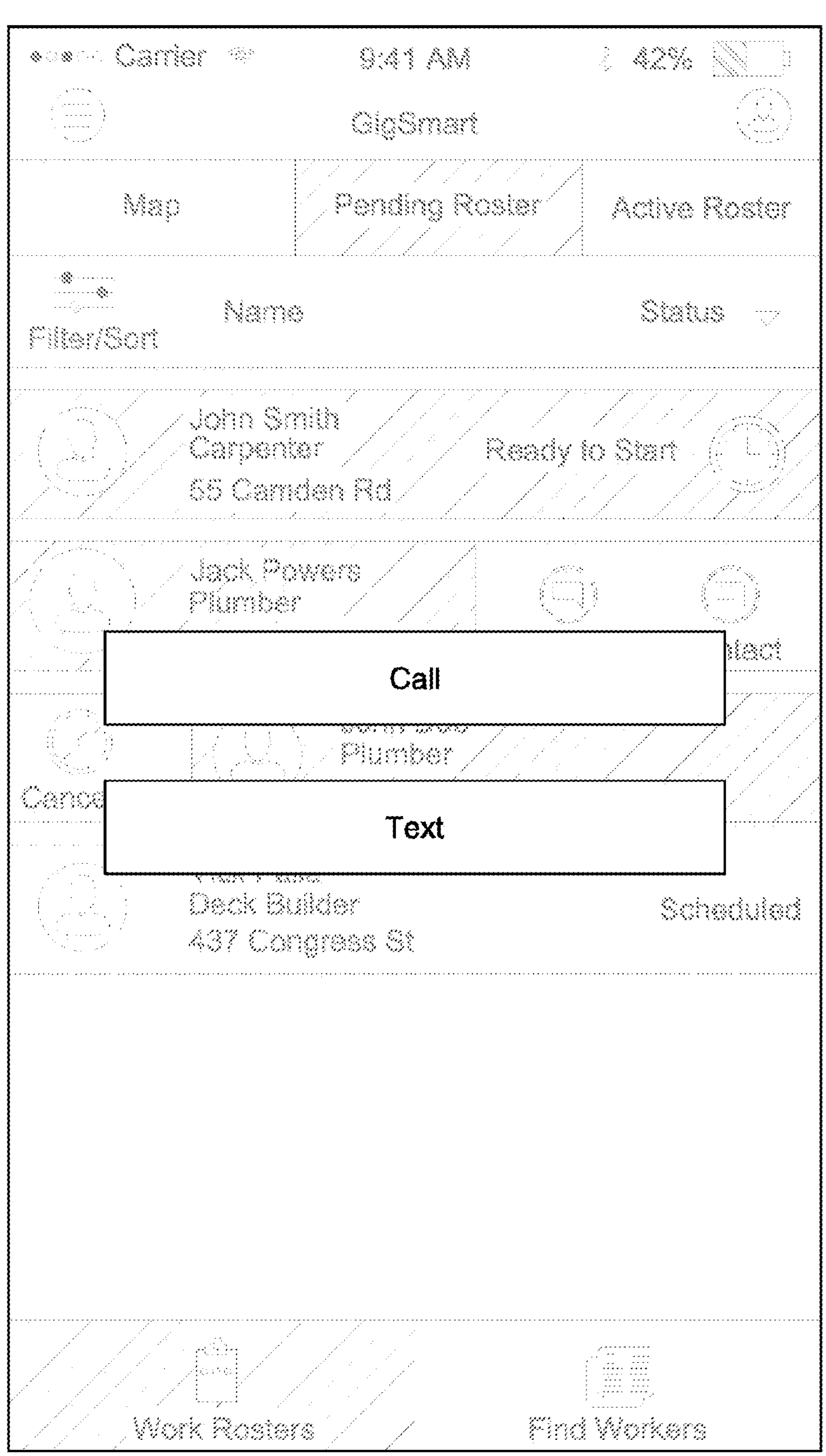
Figure 150:
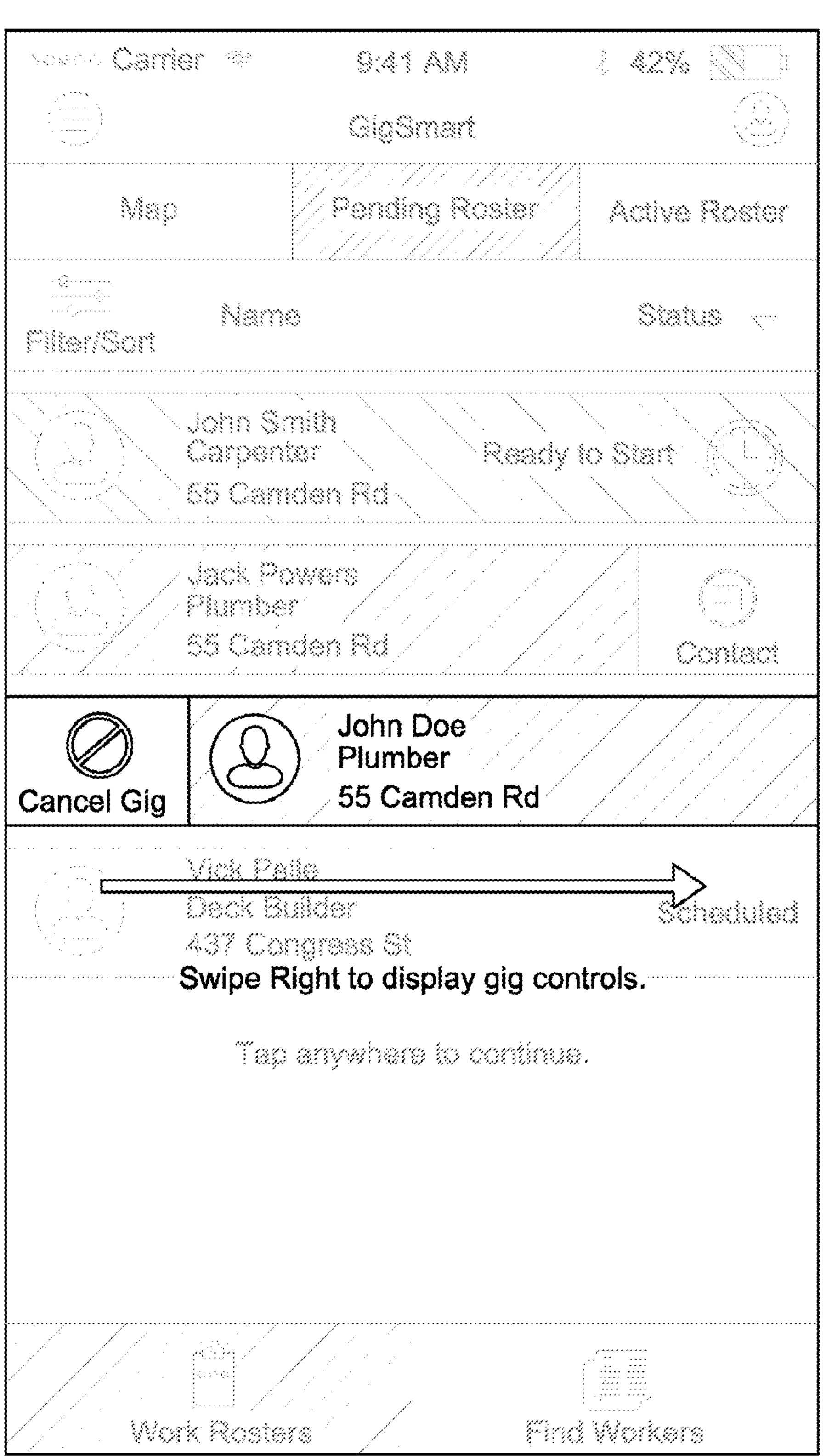
Figure 151:
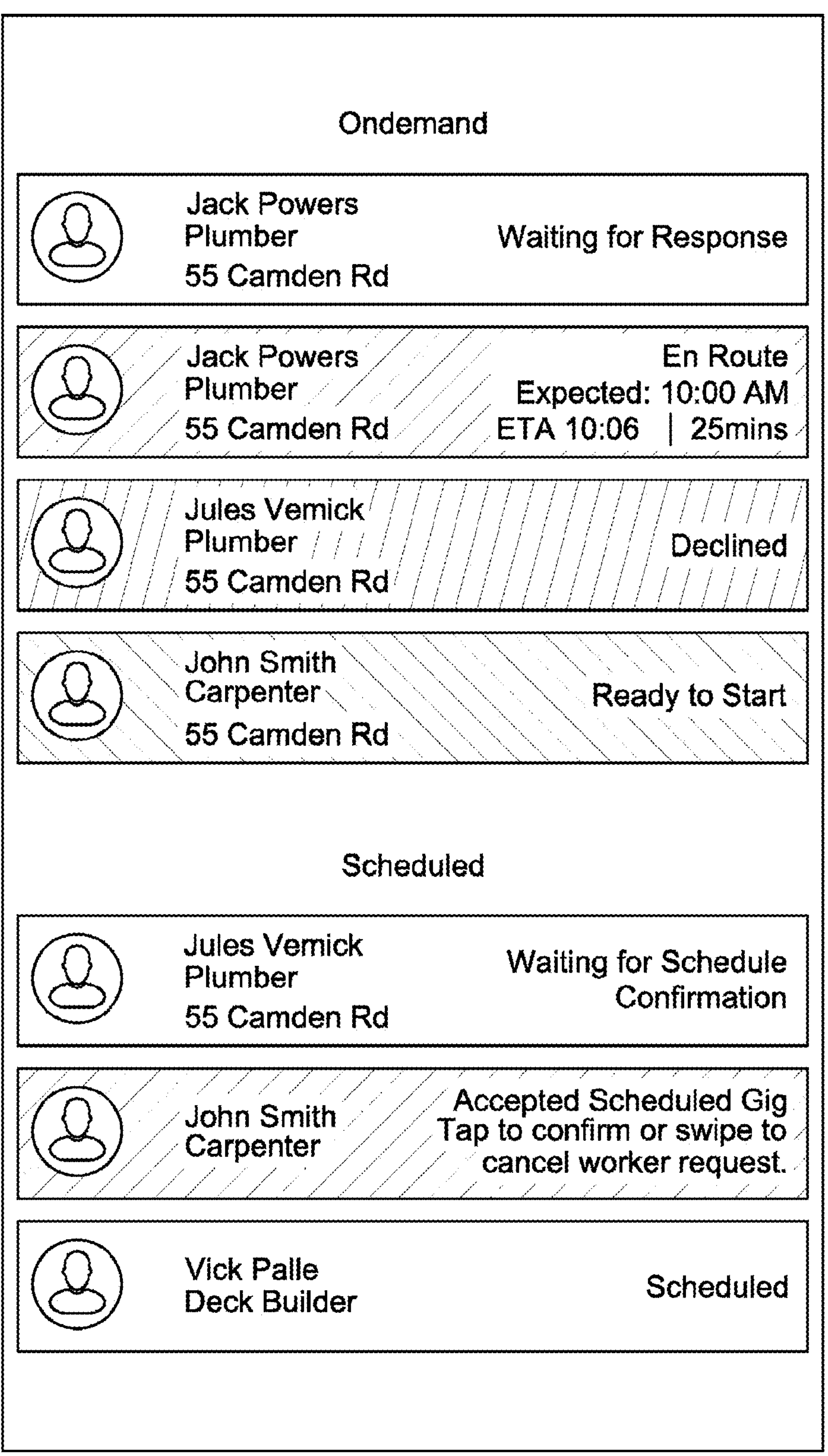
Figure 152:
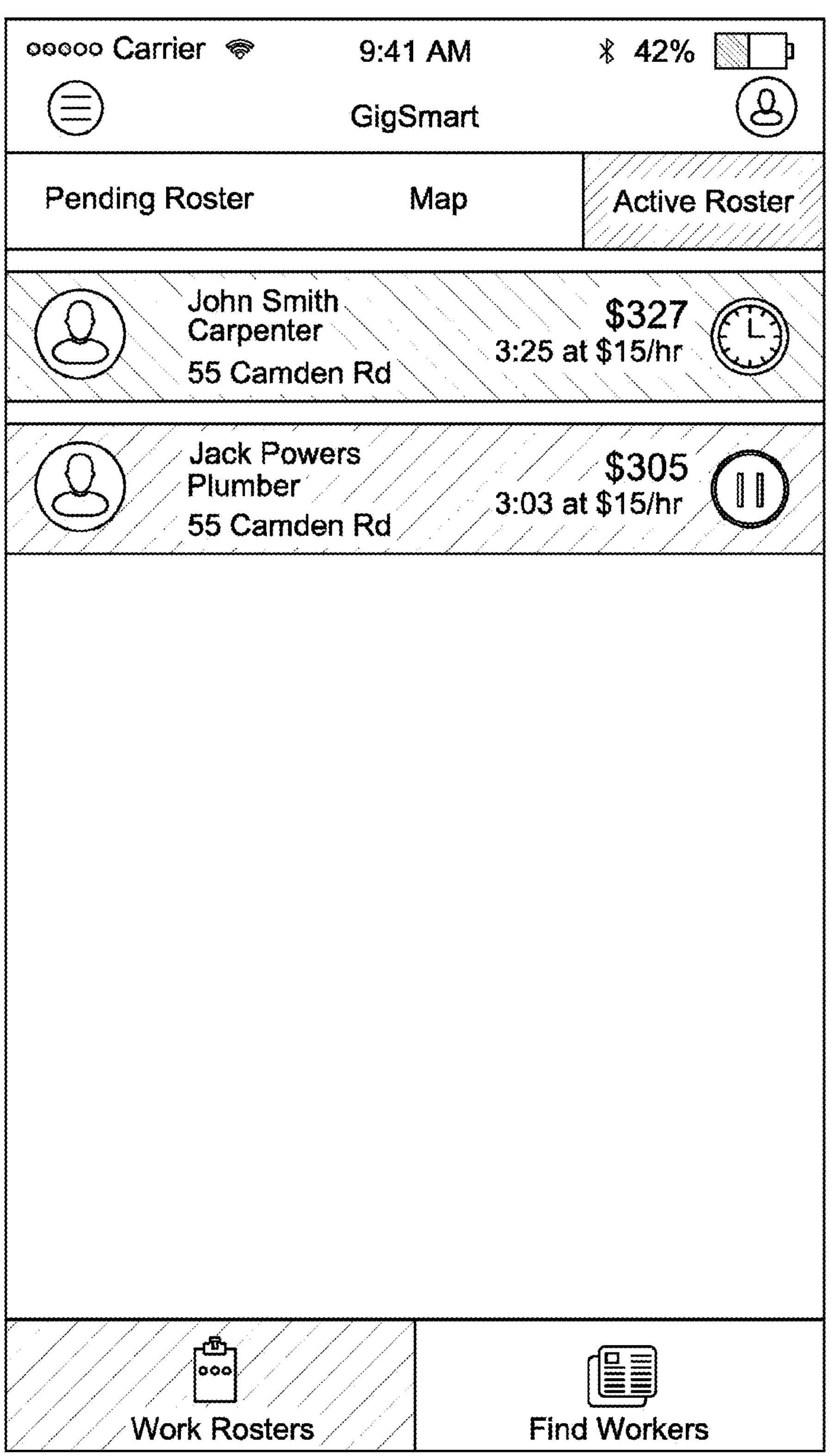
Figure 153:
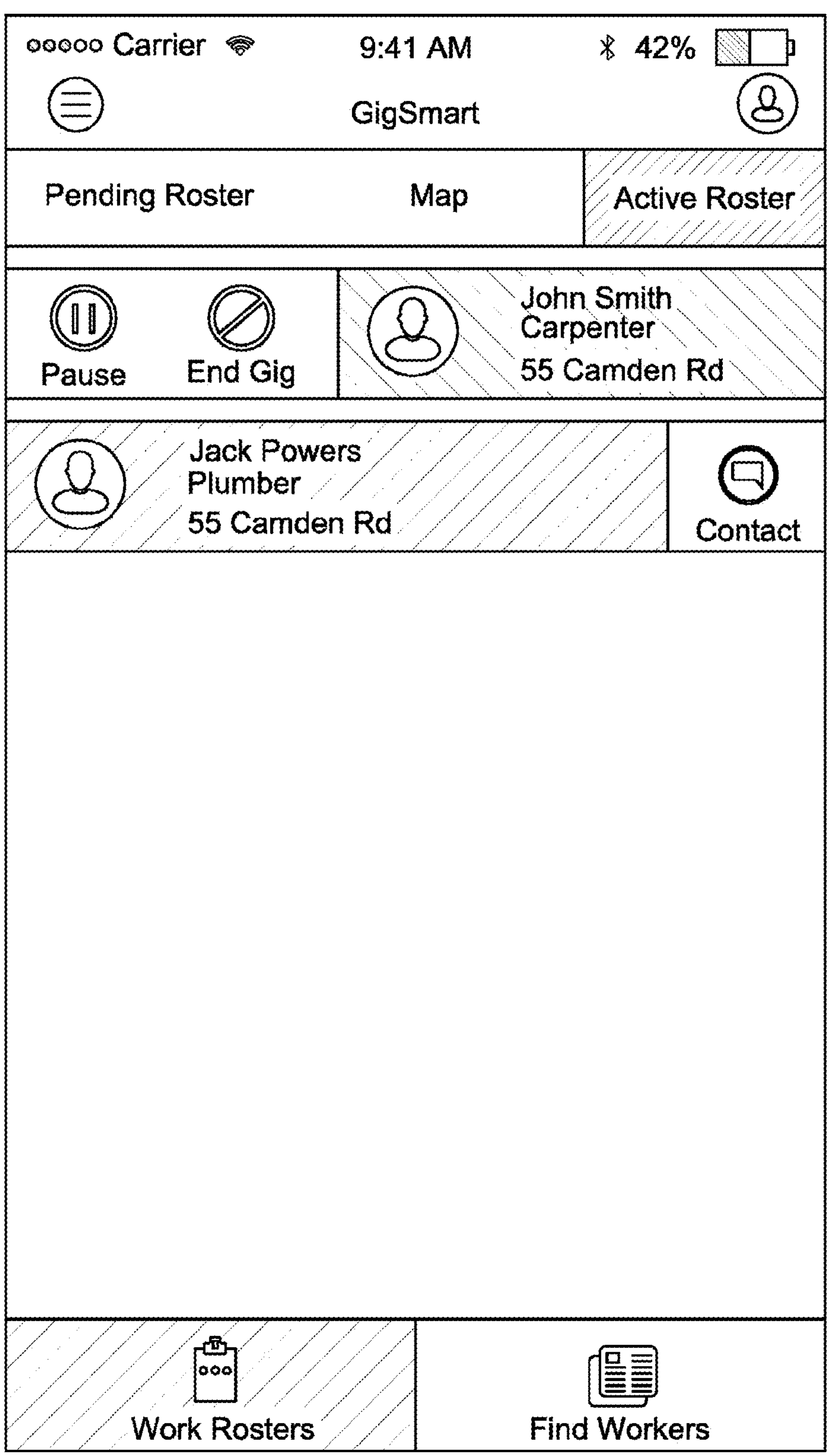
Figure 154:
Figure 156:
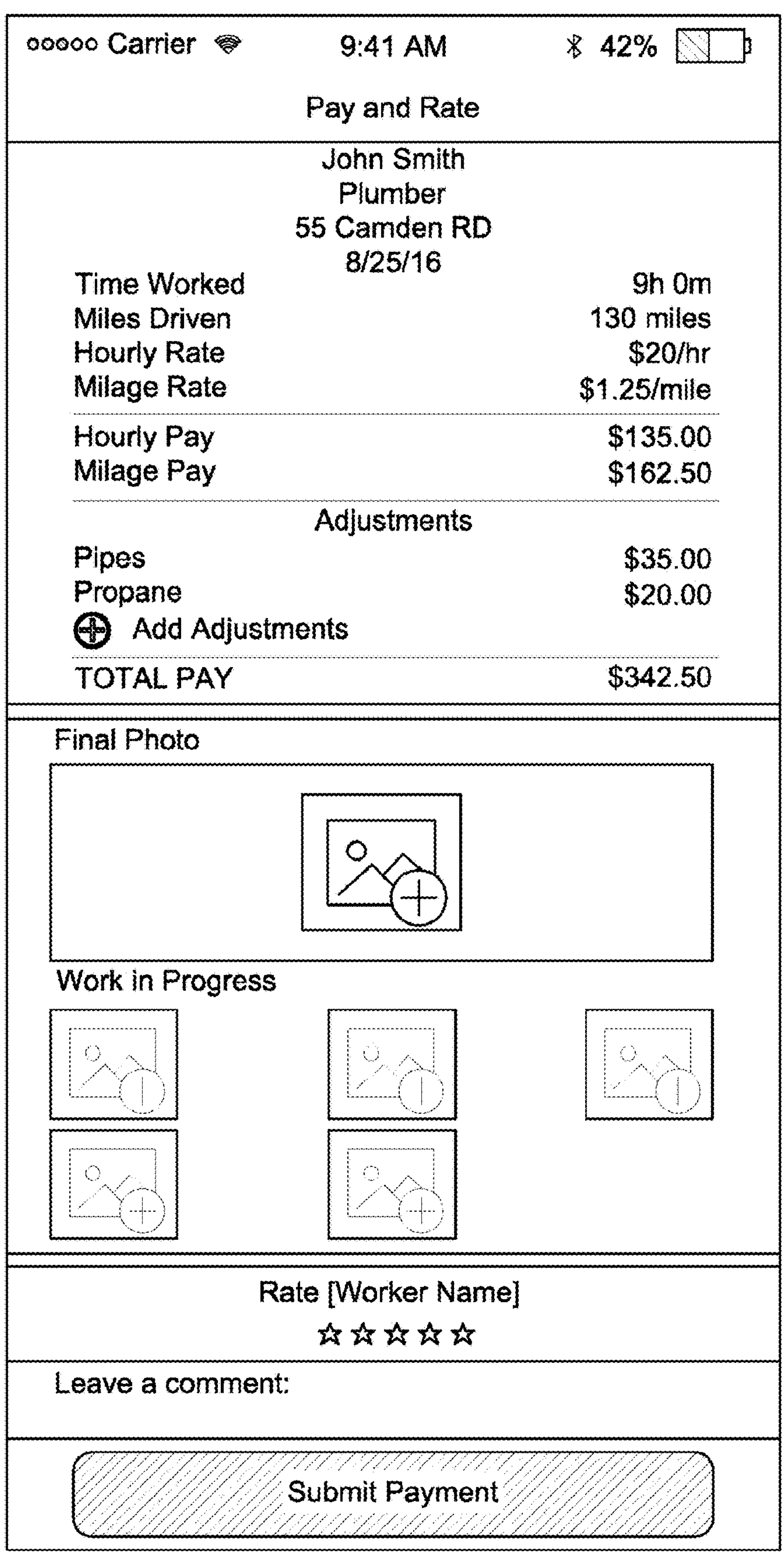
Figure 157:
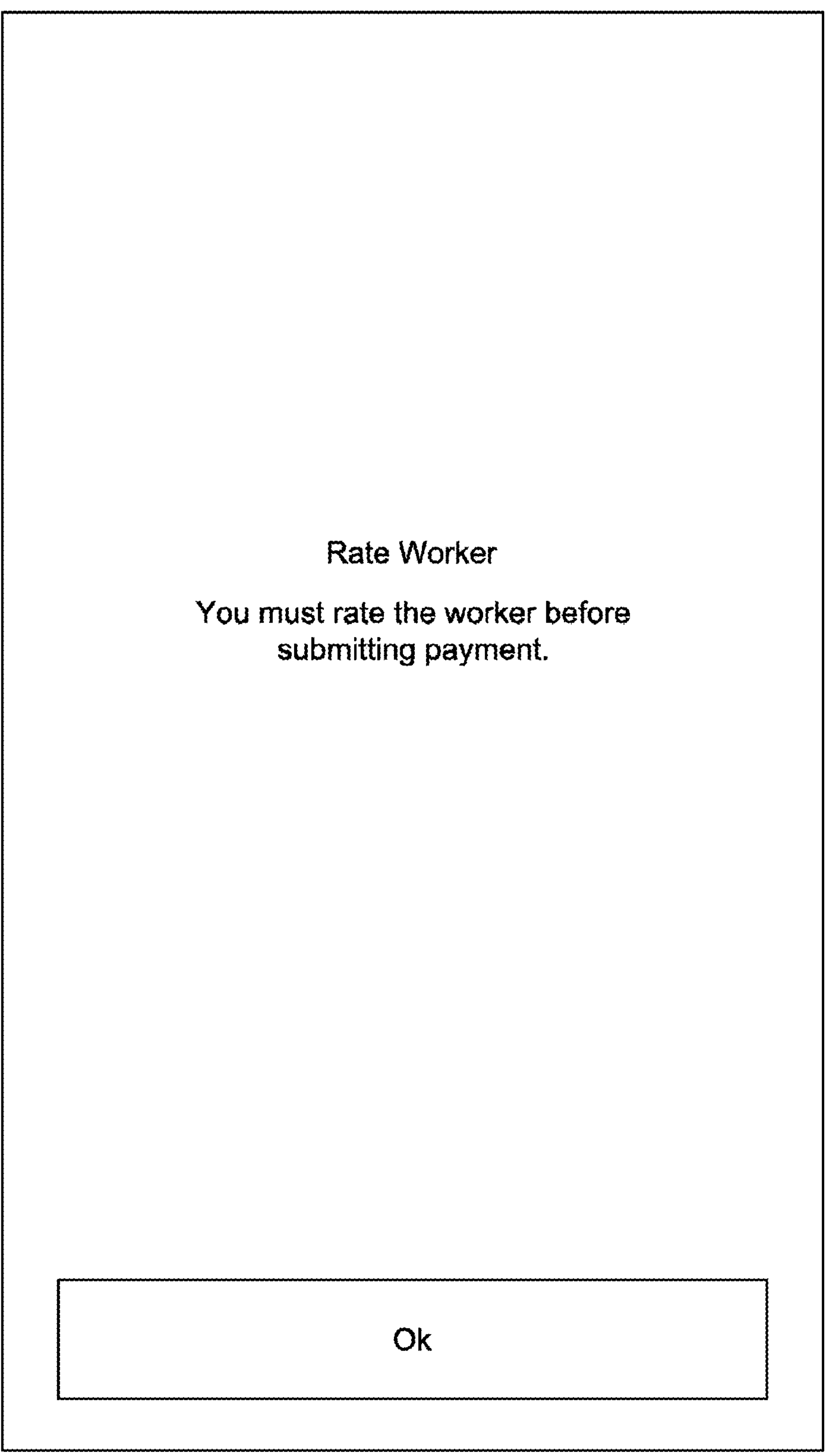
Figure 162:
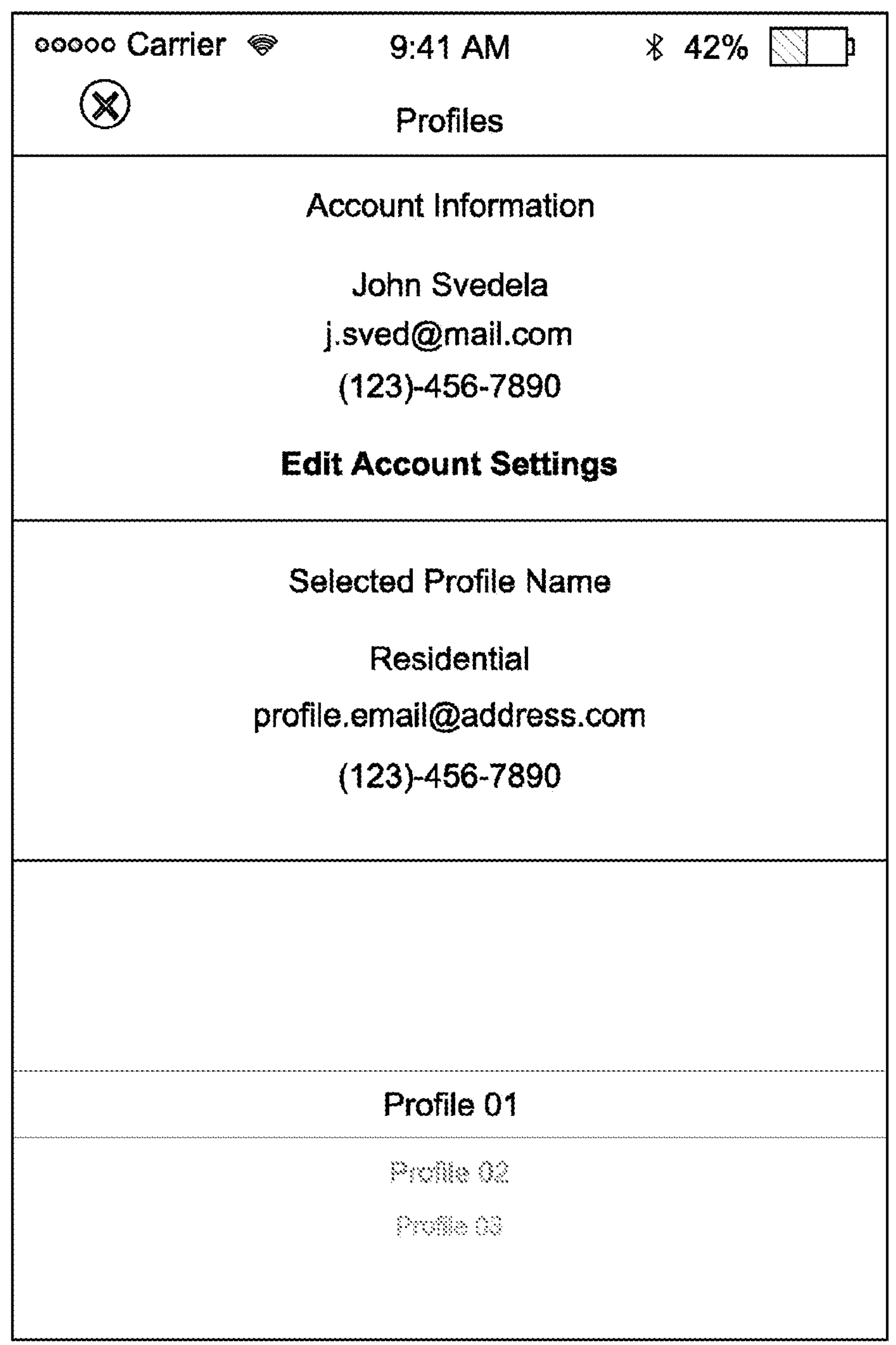
Figure 163:
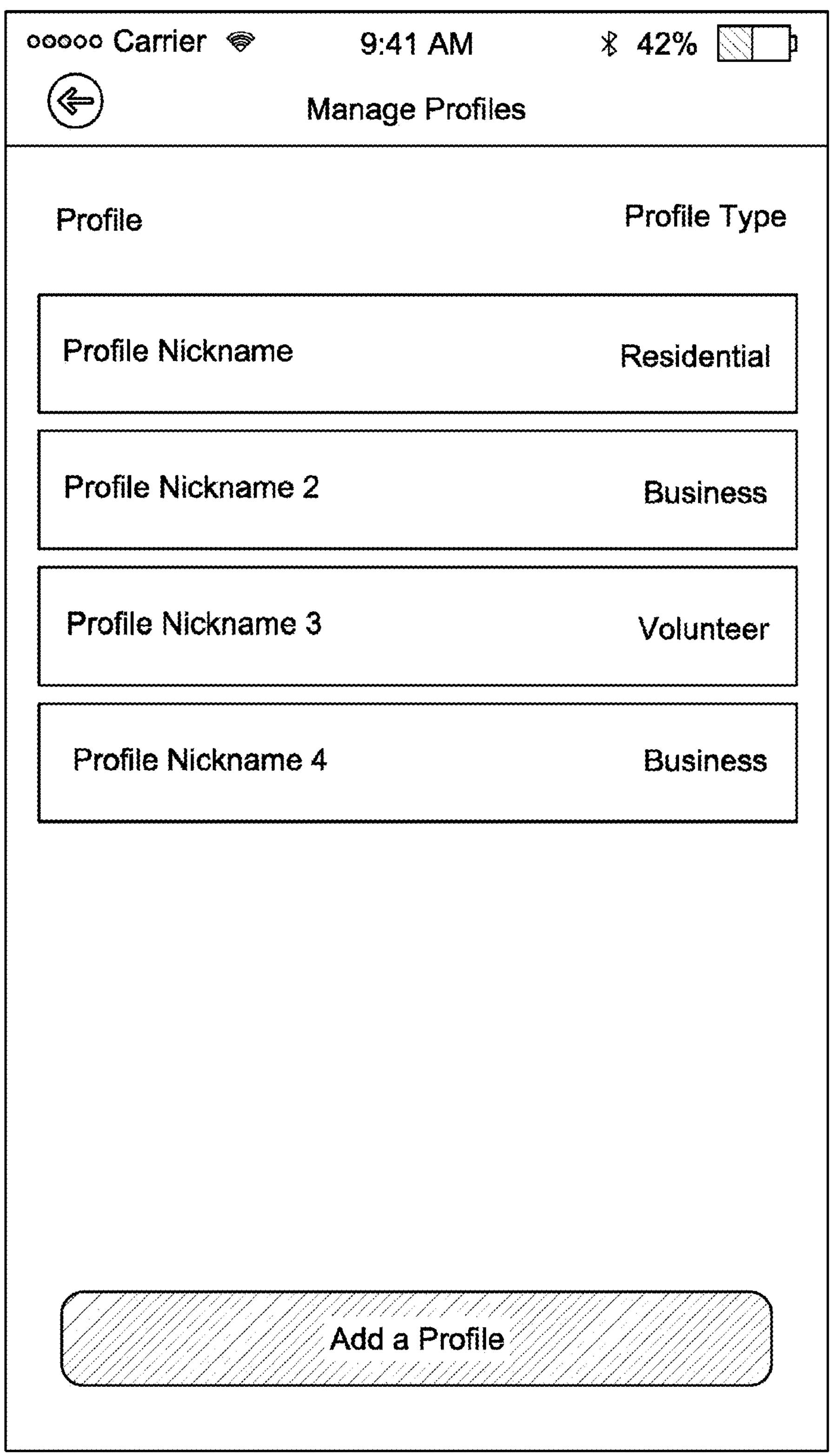
Figure 166:
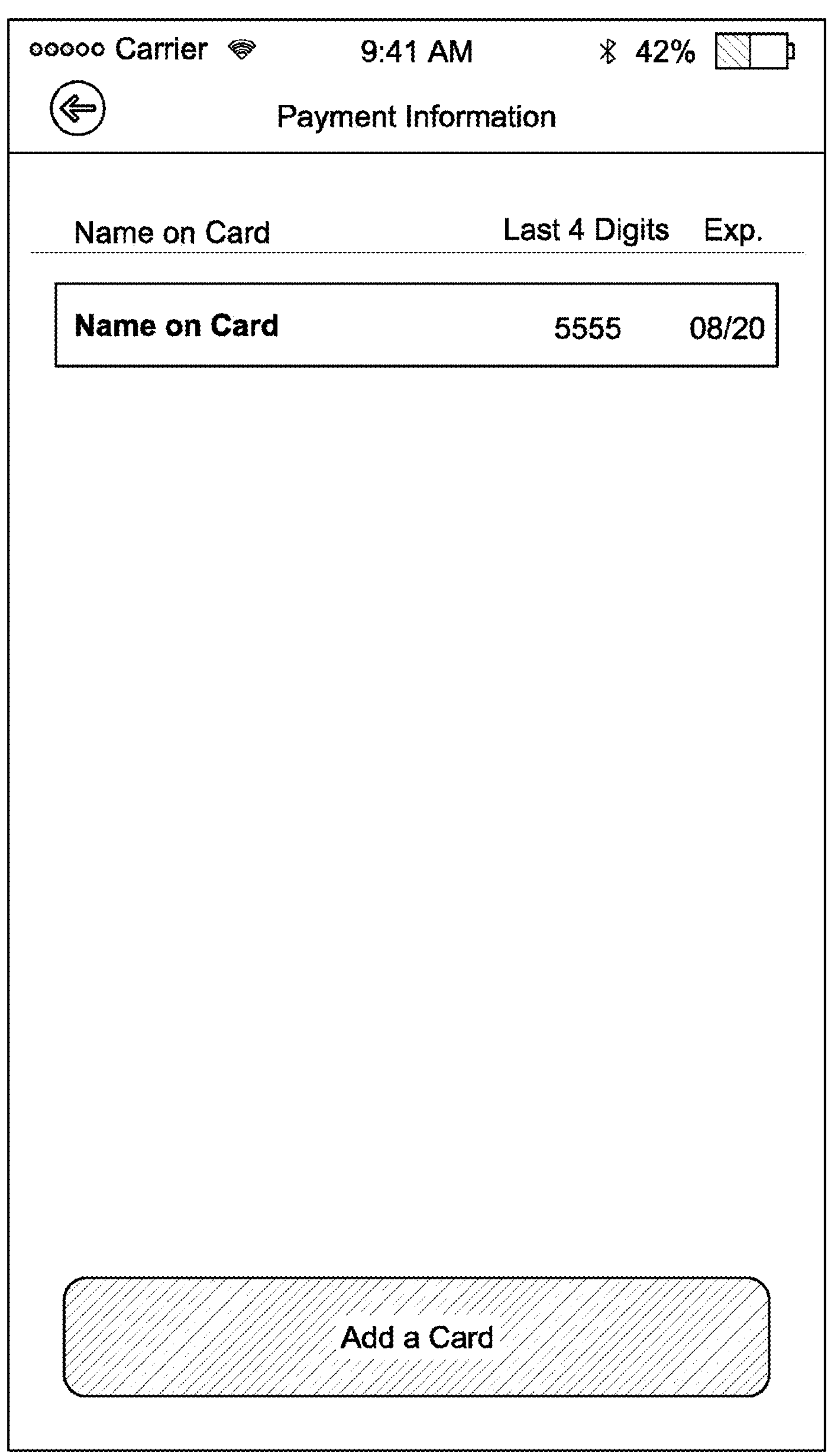
Figure 167:
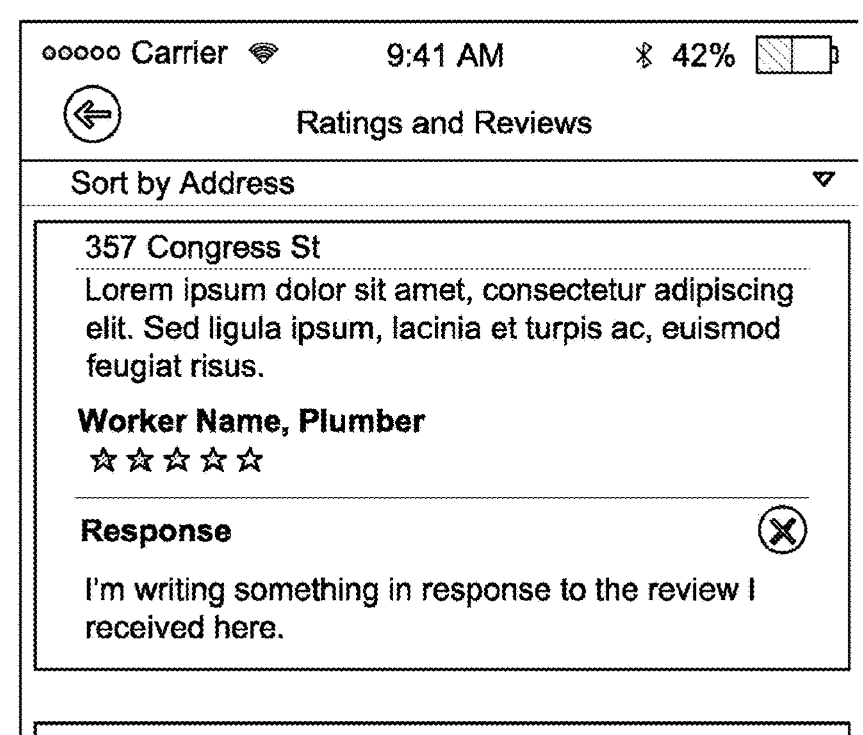
Figure 168:
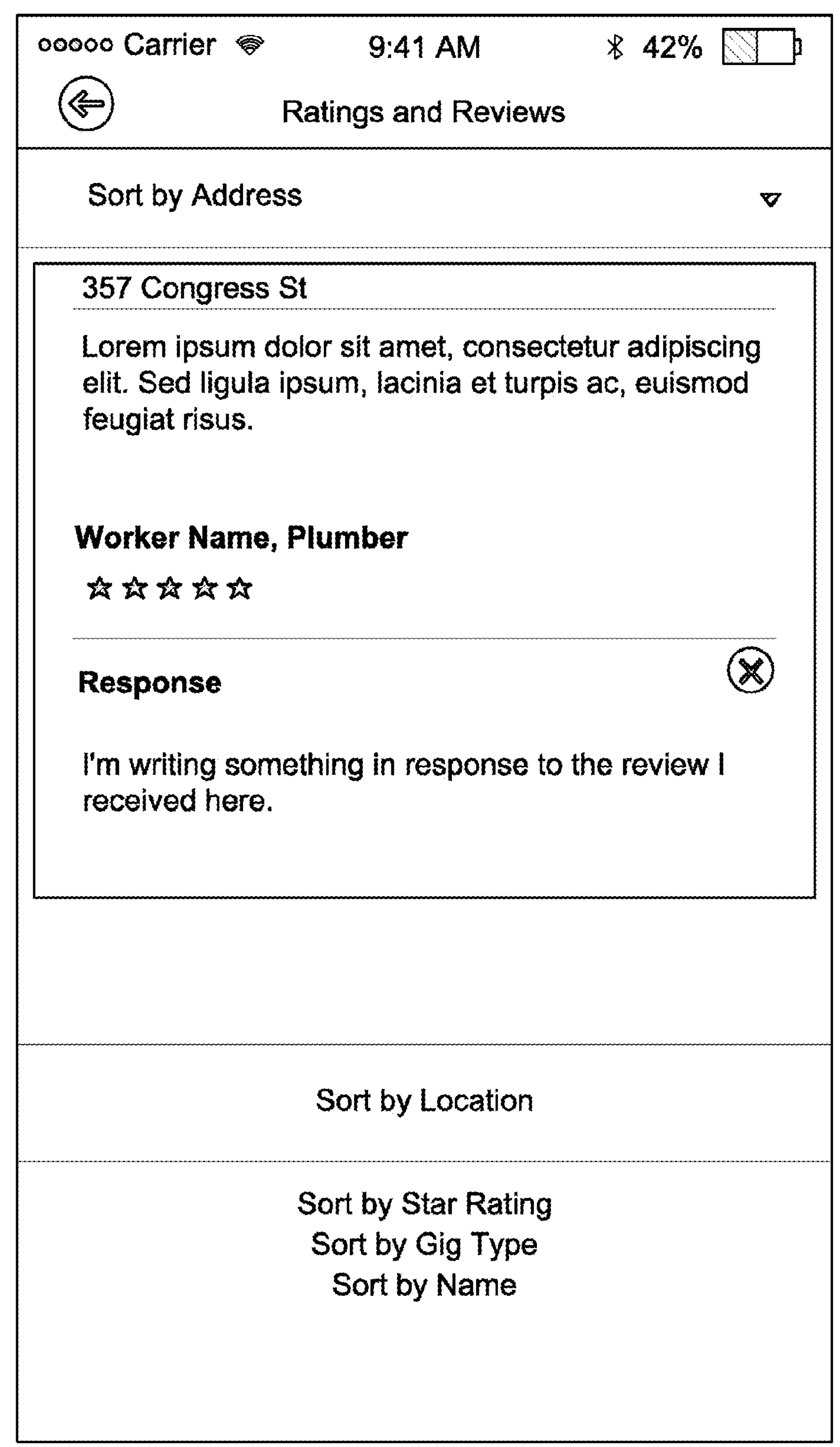
Figure 169:
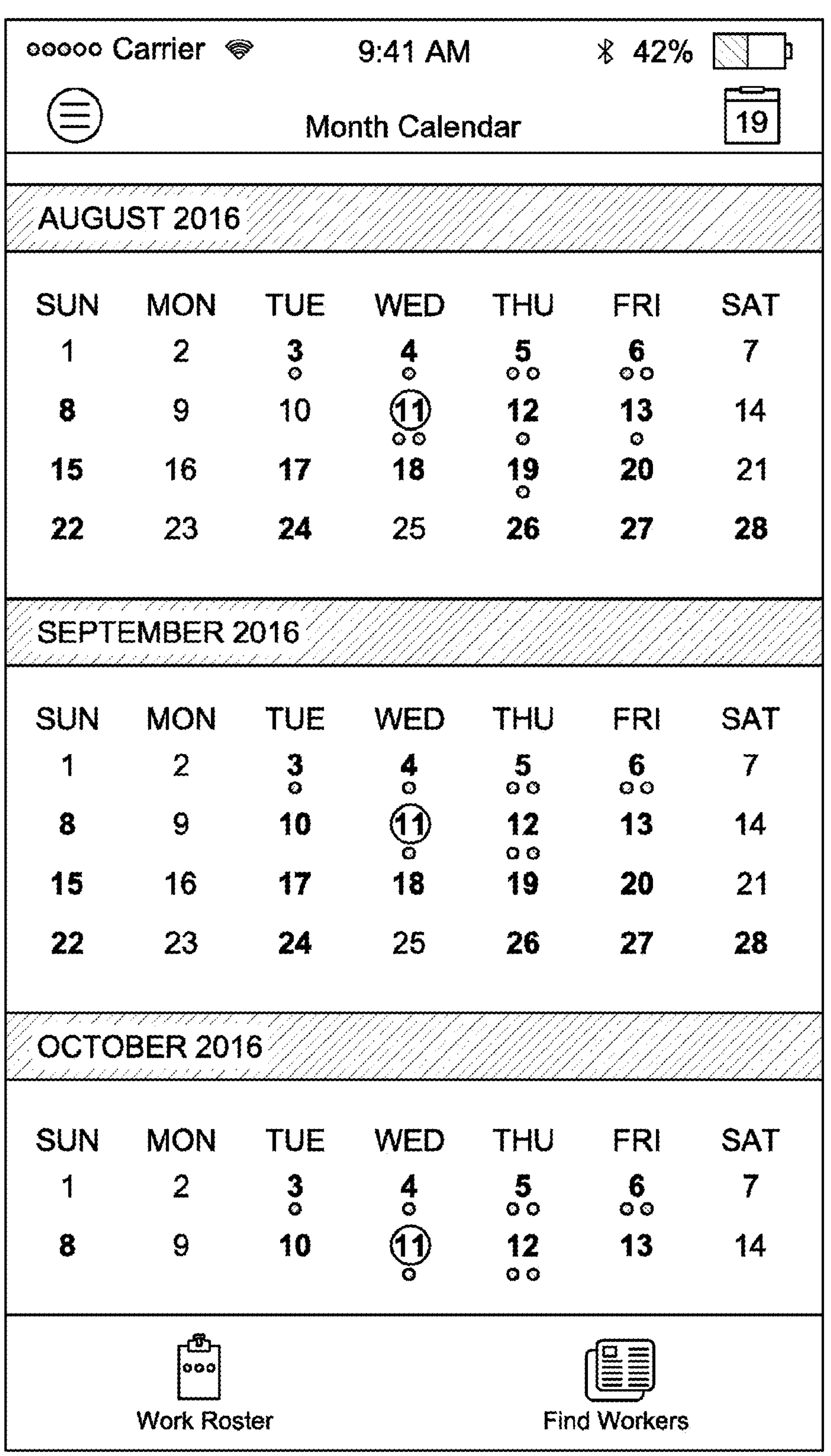
Figure 171:
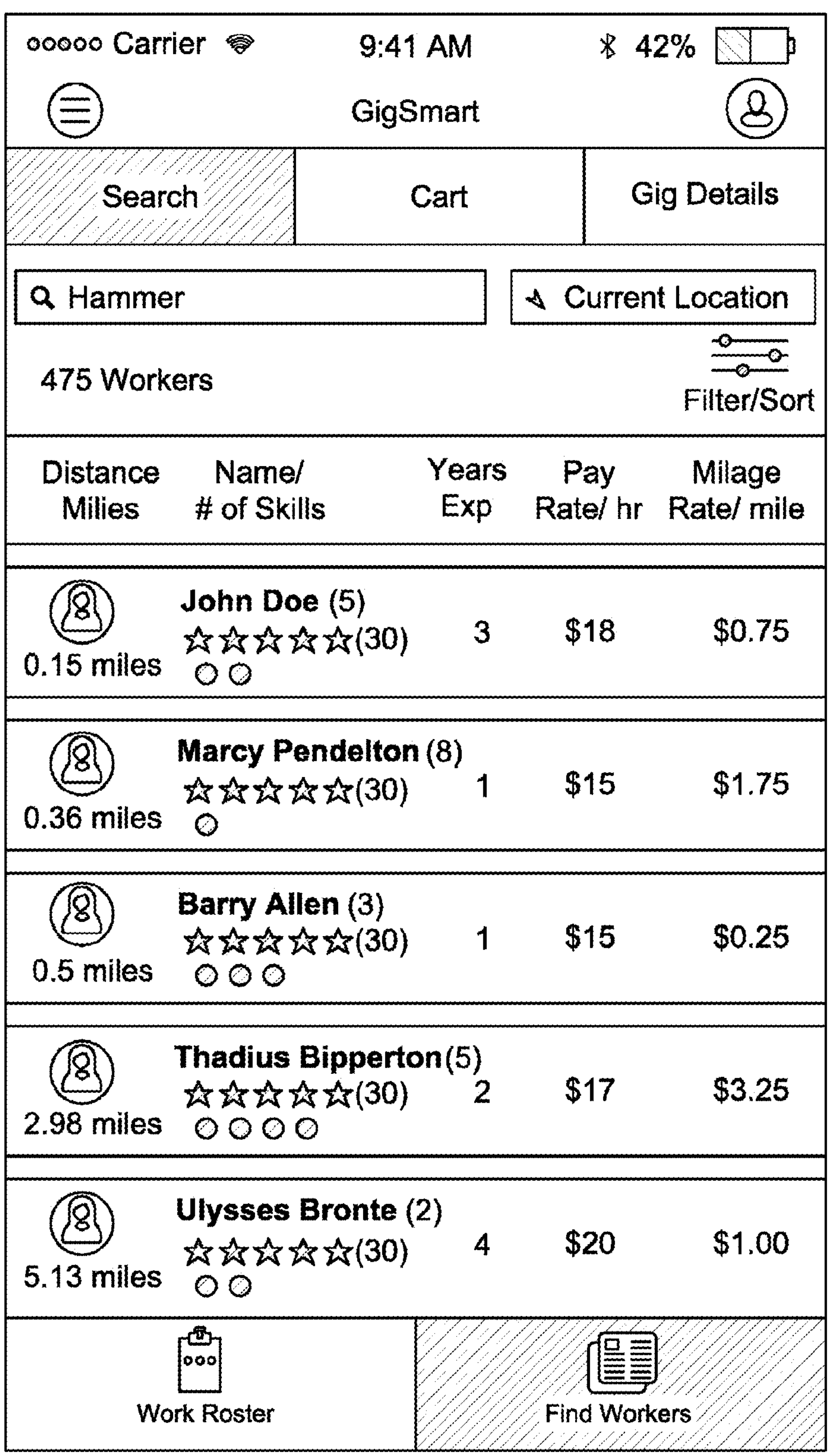
Figure 173:
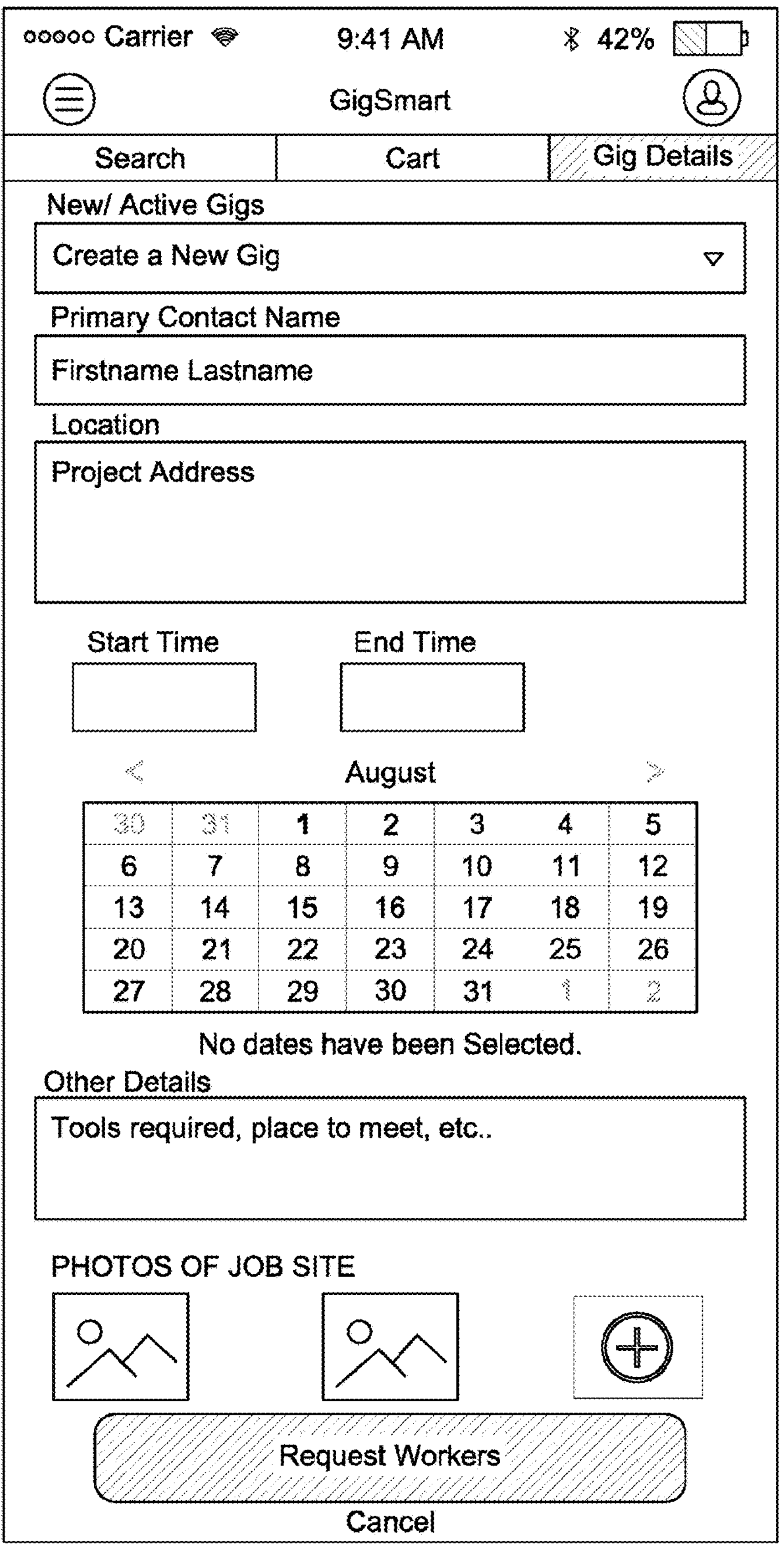
Figure 174:
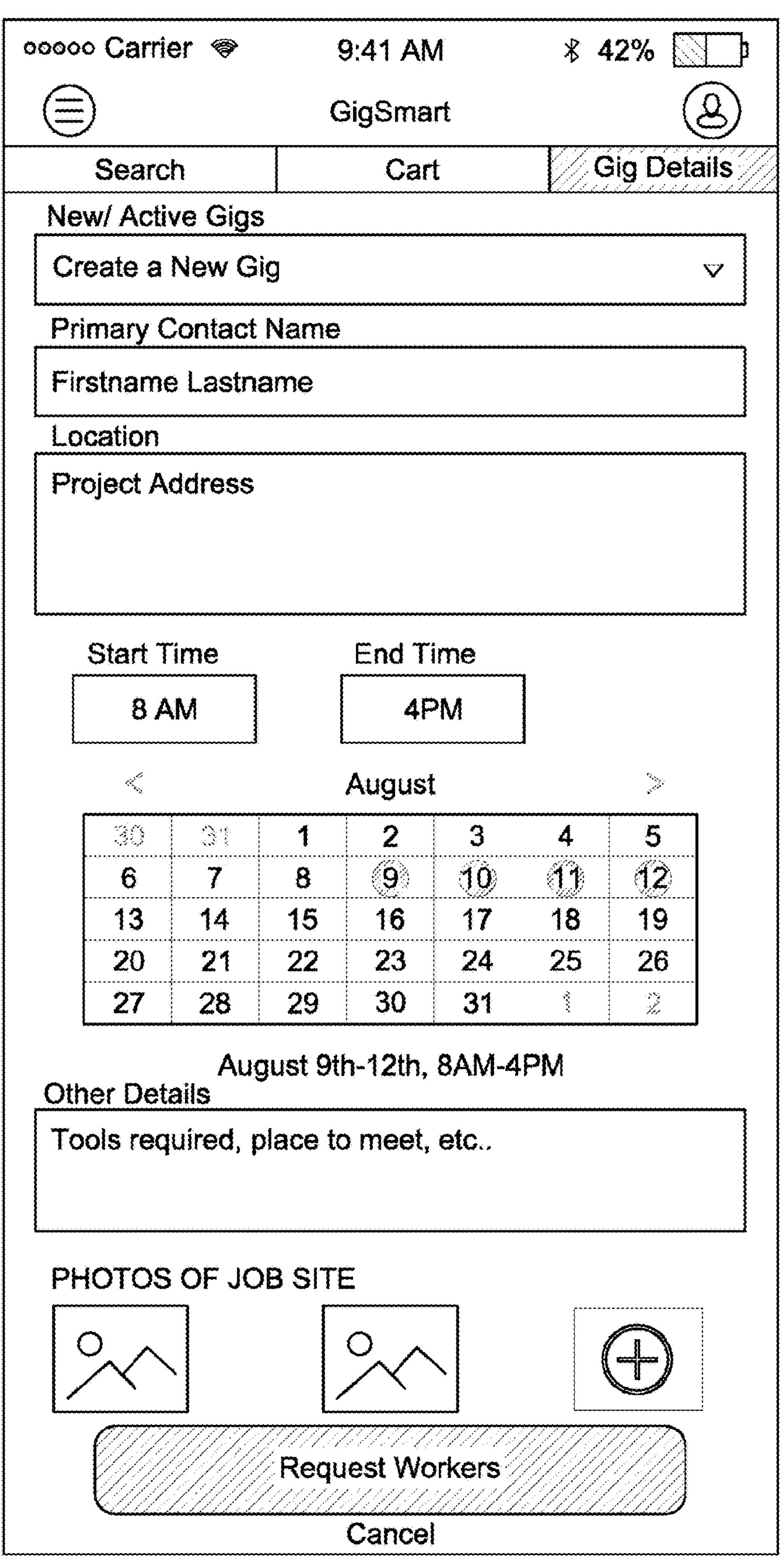
Figure 175:
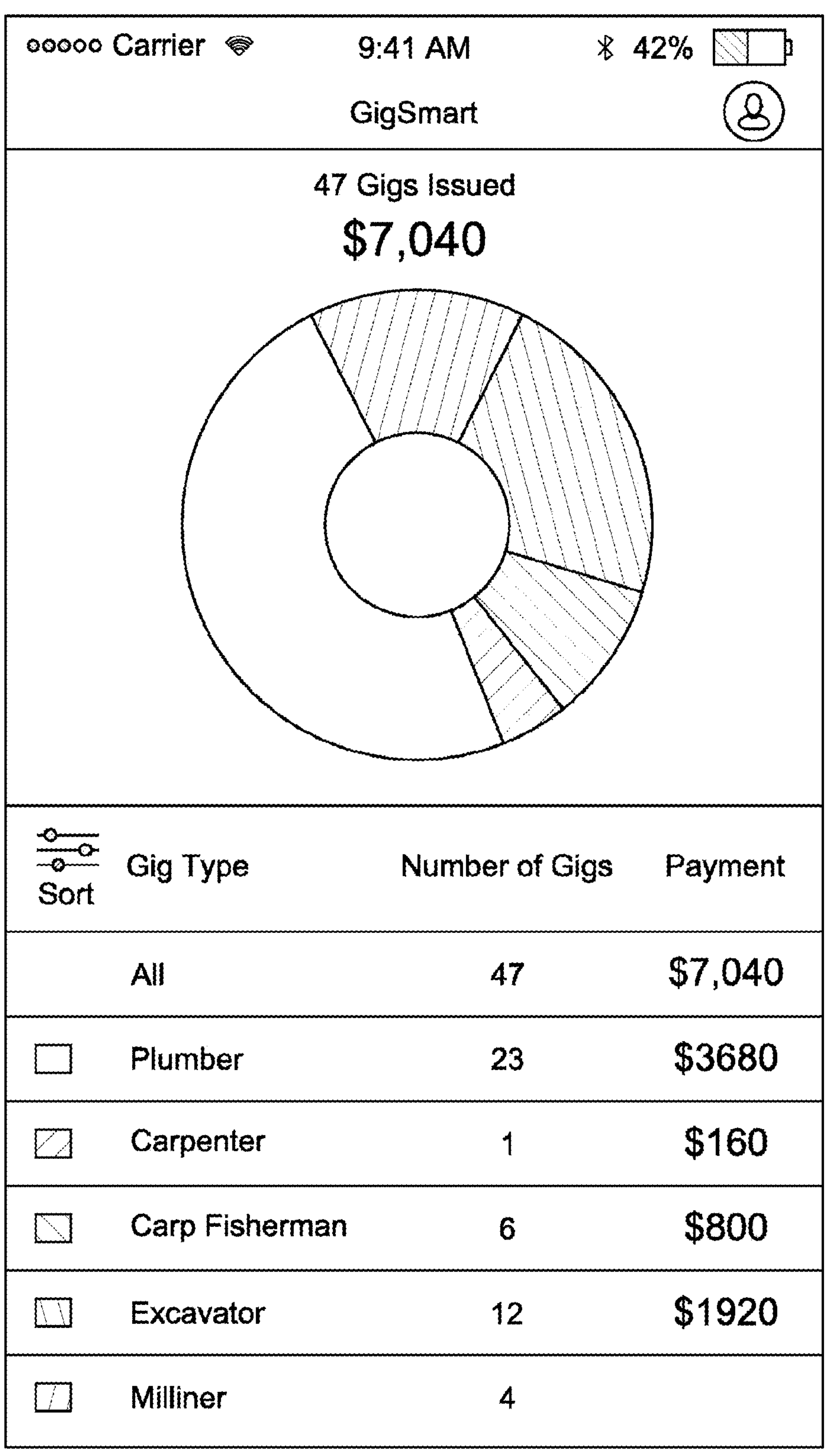
Figure 177:
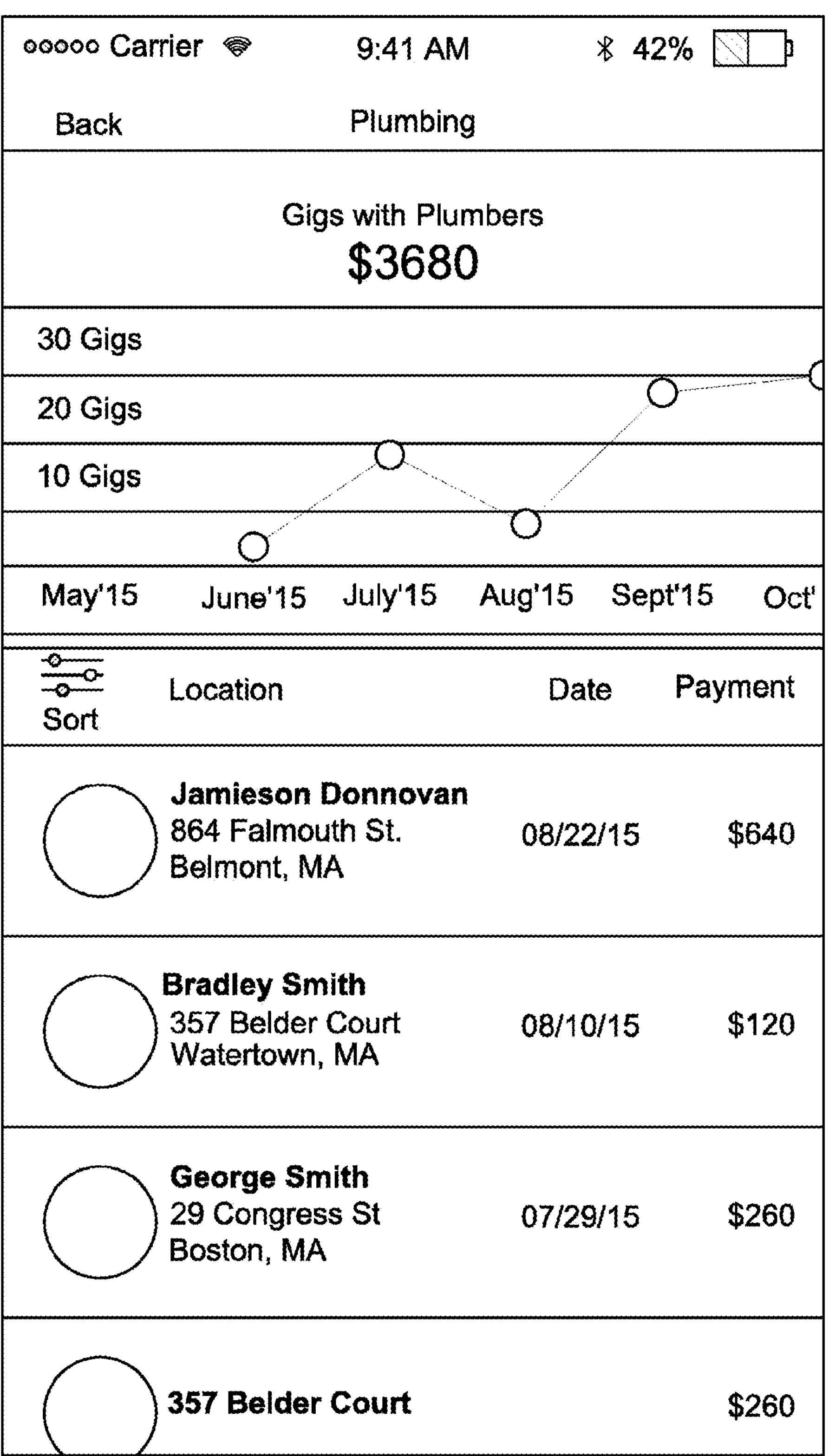
Figure 178:
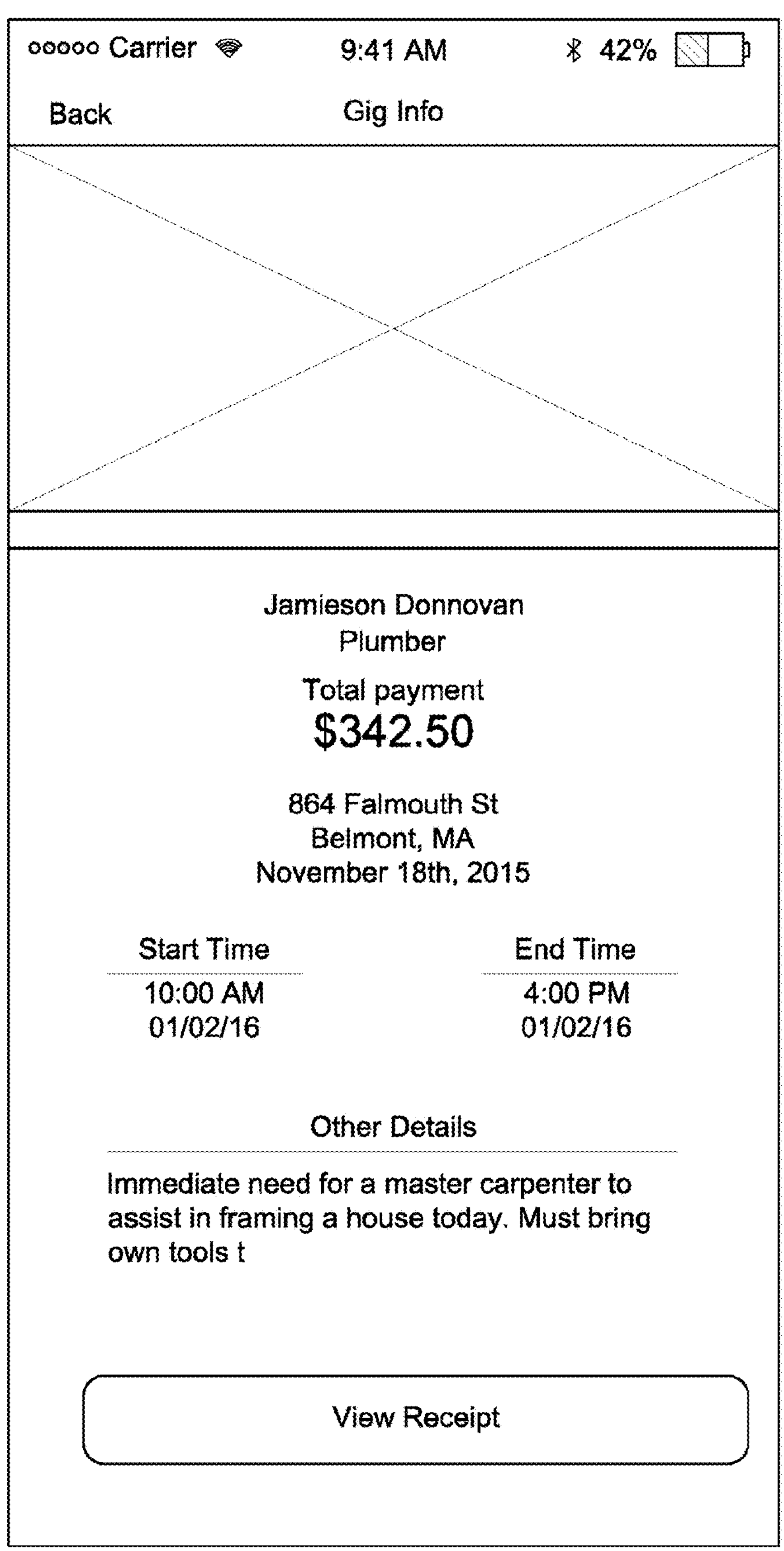
Figure 180:
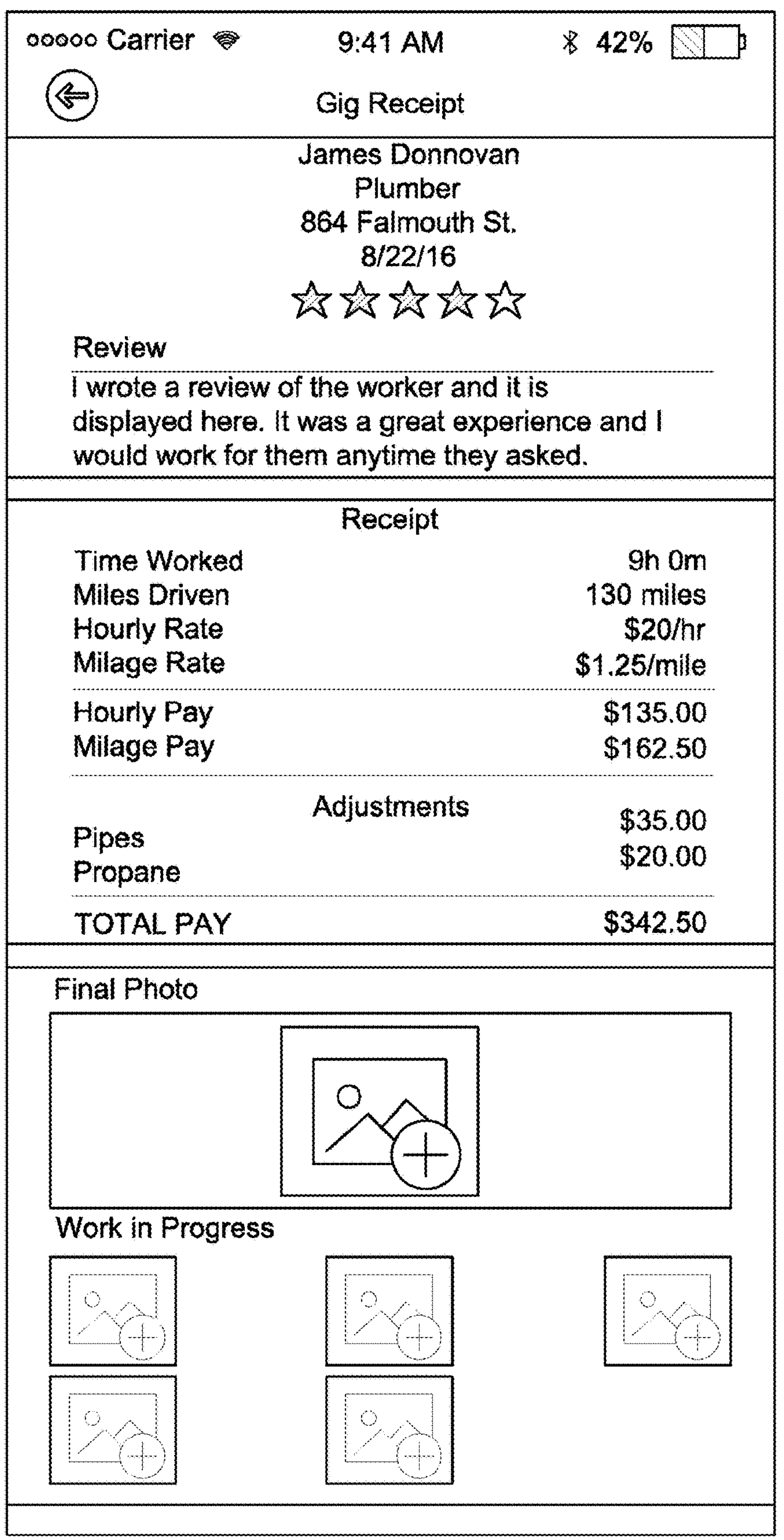
Figure 181:
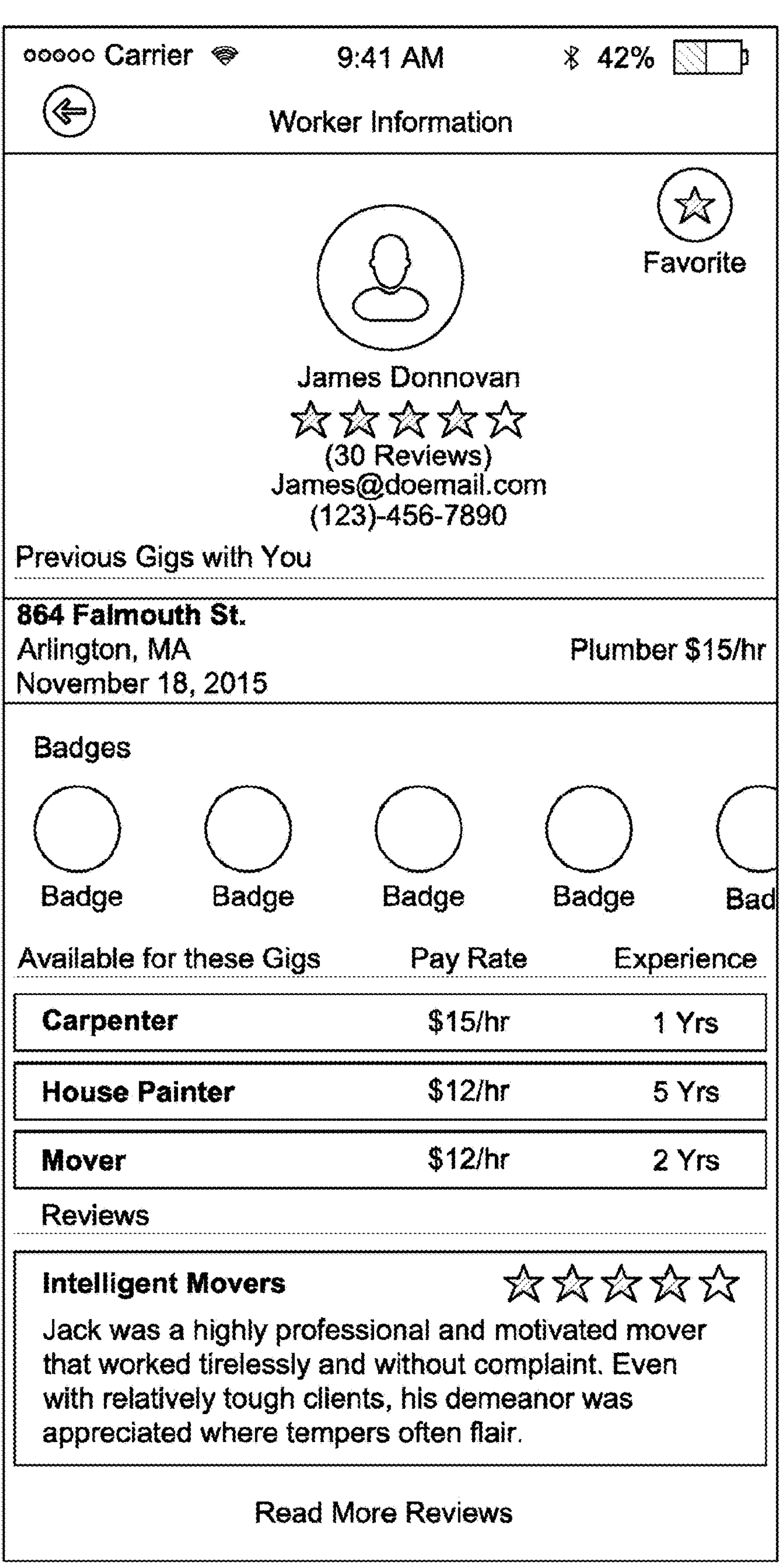
Figure 182:
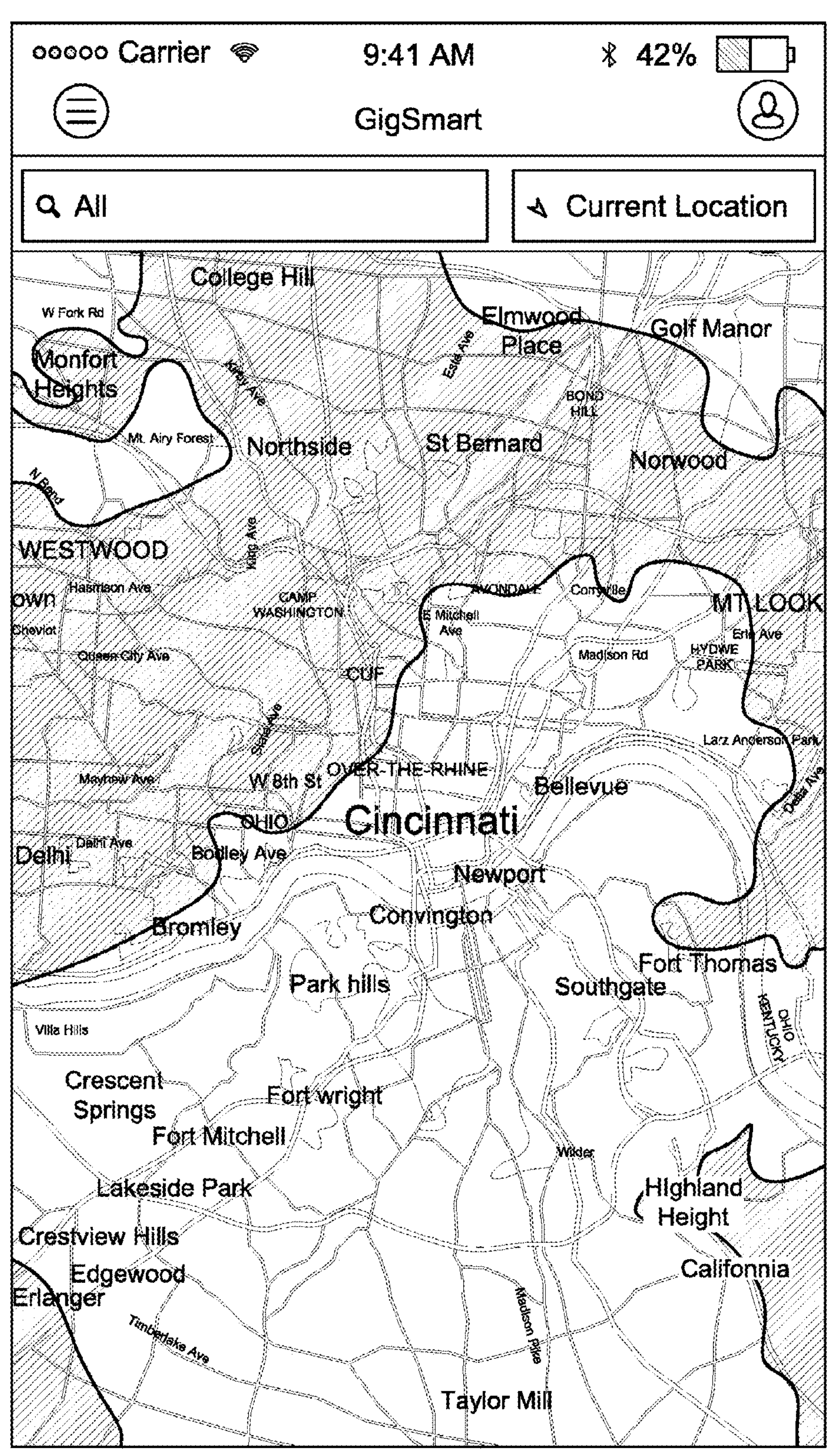
Figure 183:
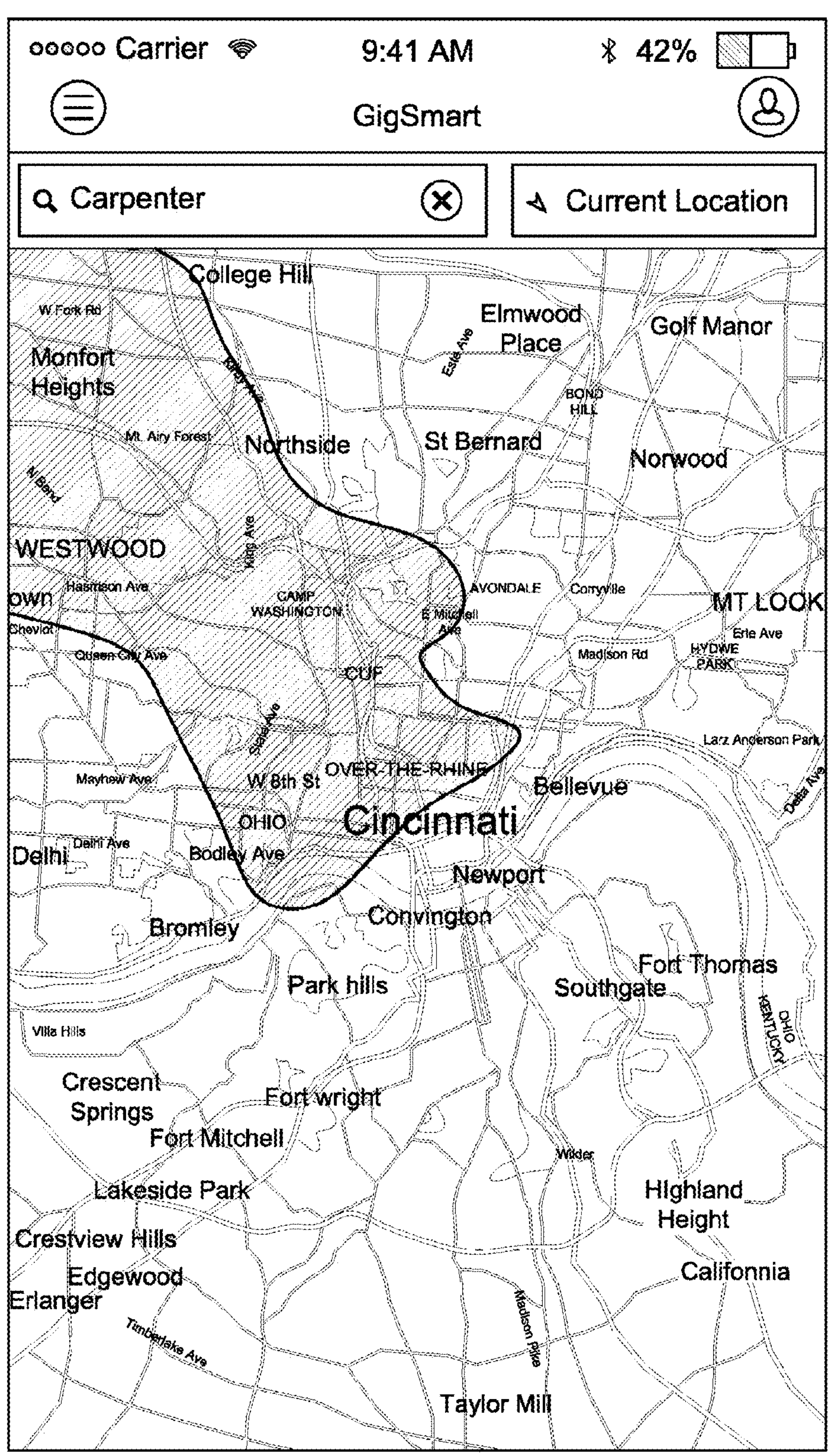
Figure 184:
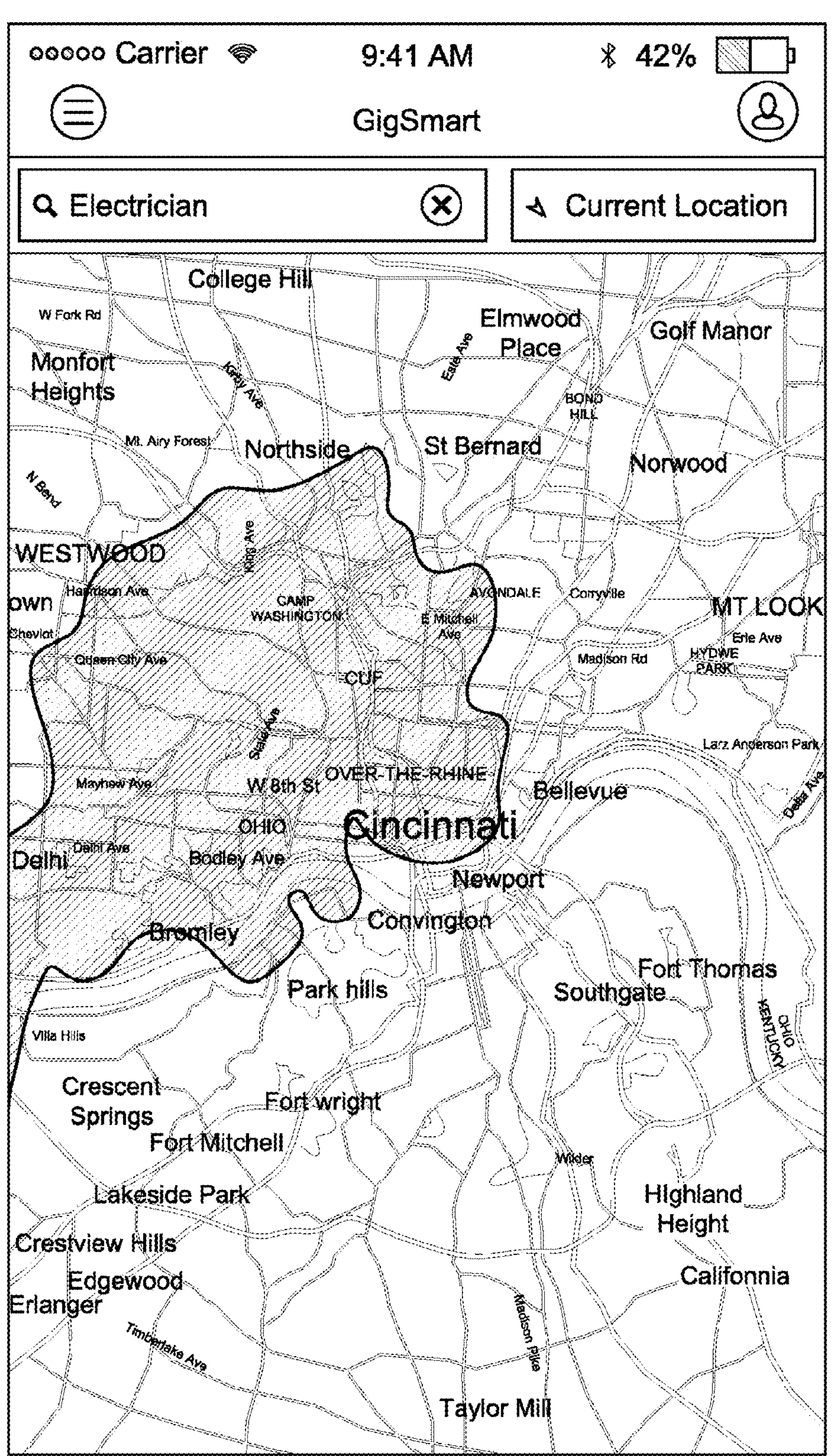
Figure 185:
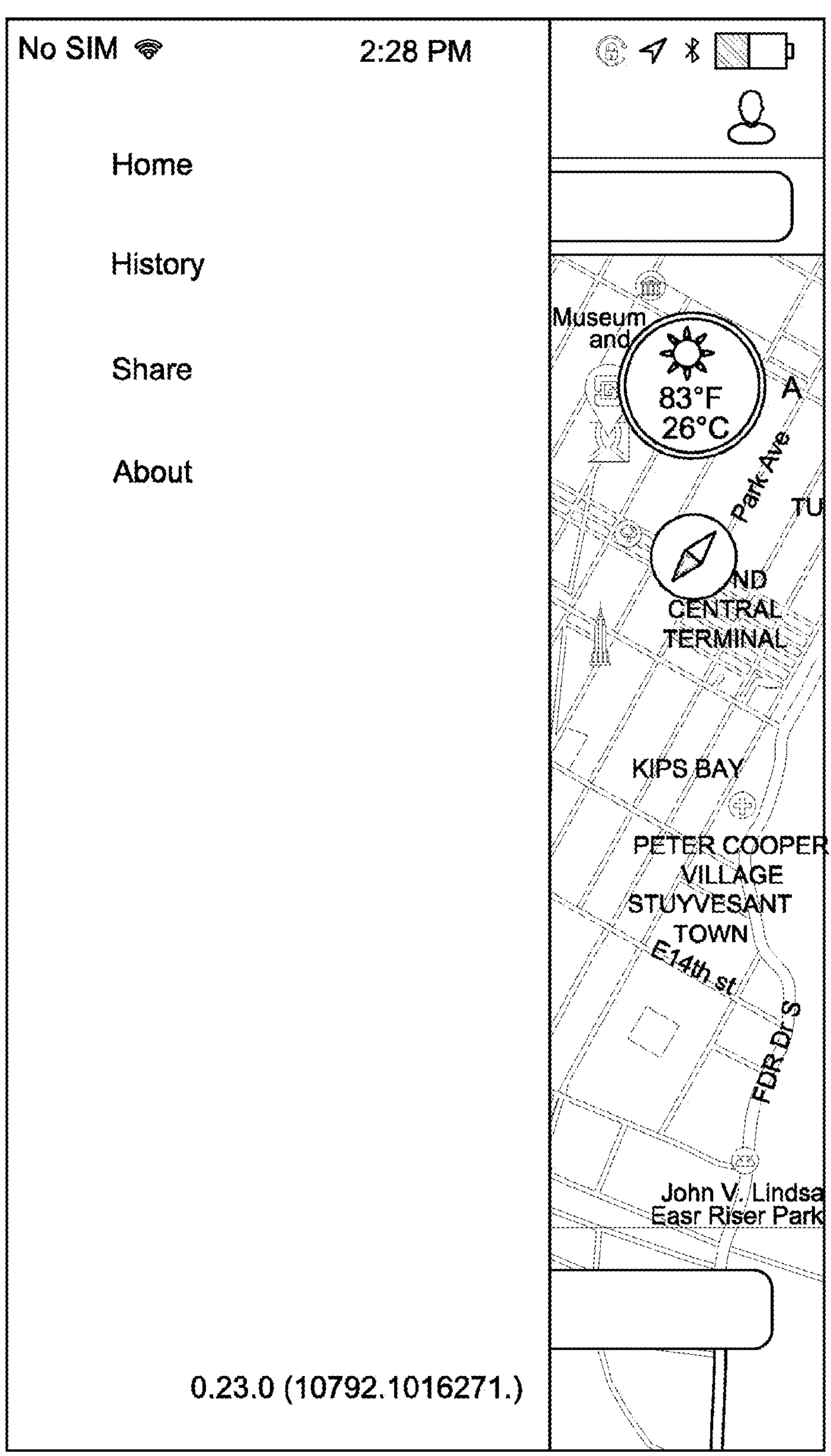
Figure 186A:
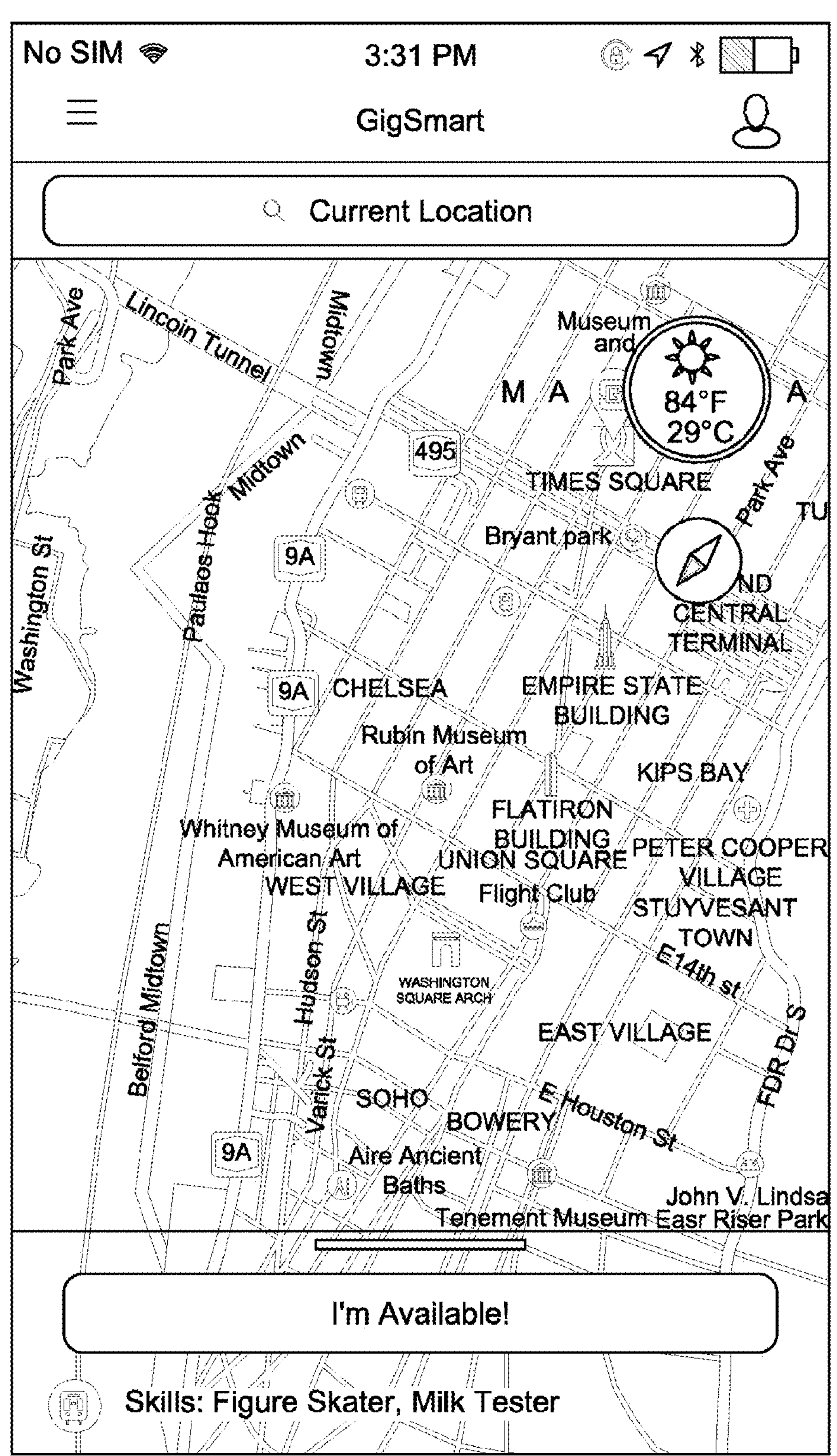
Figure 186B:
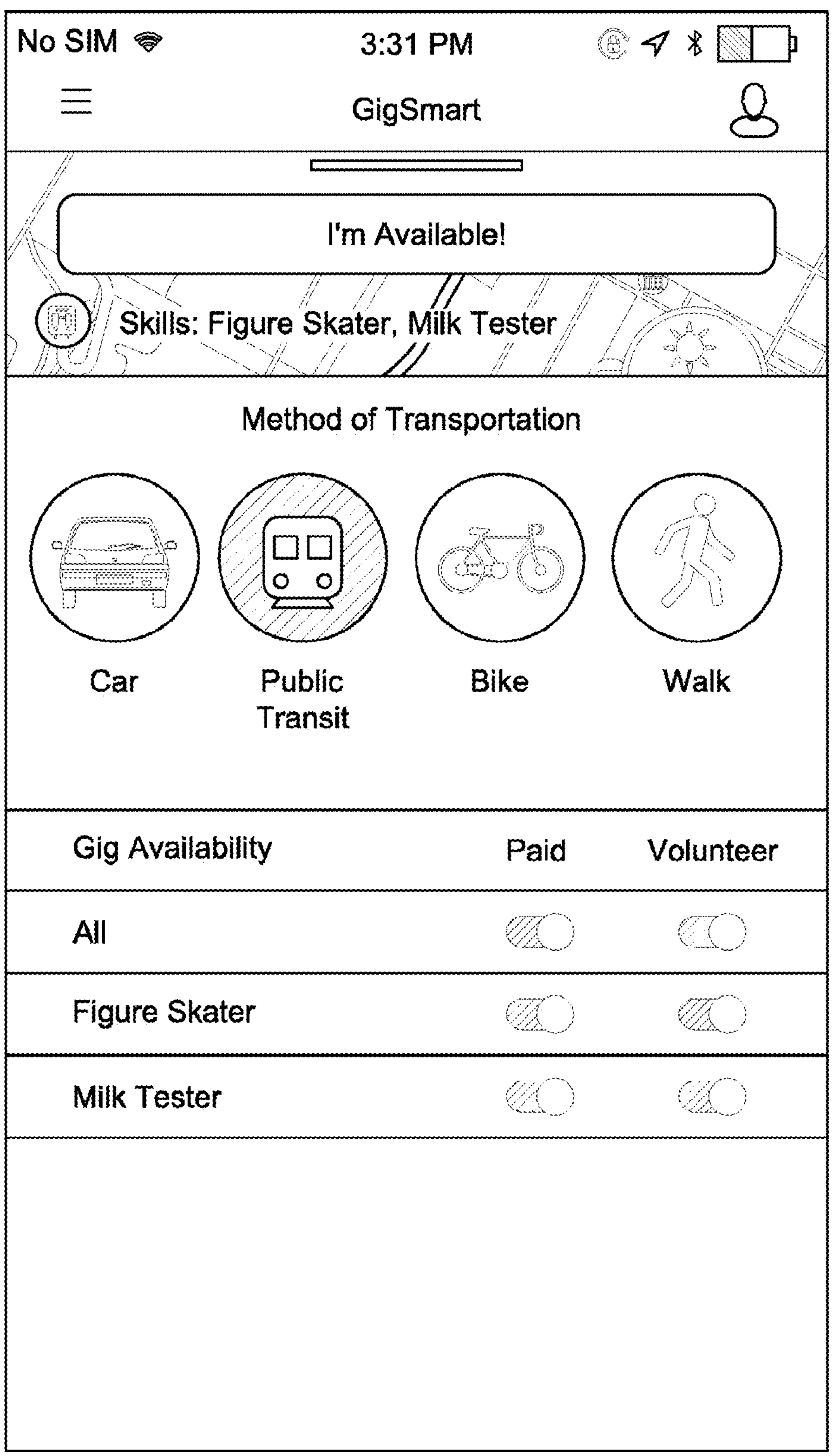
Figure 187:
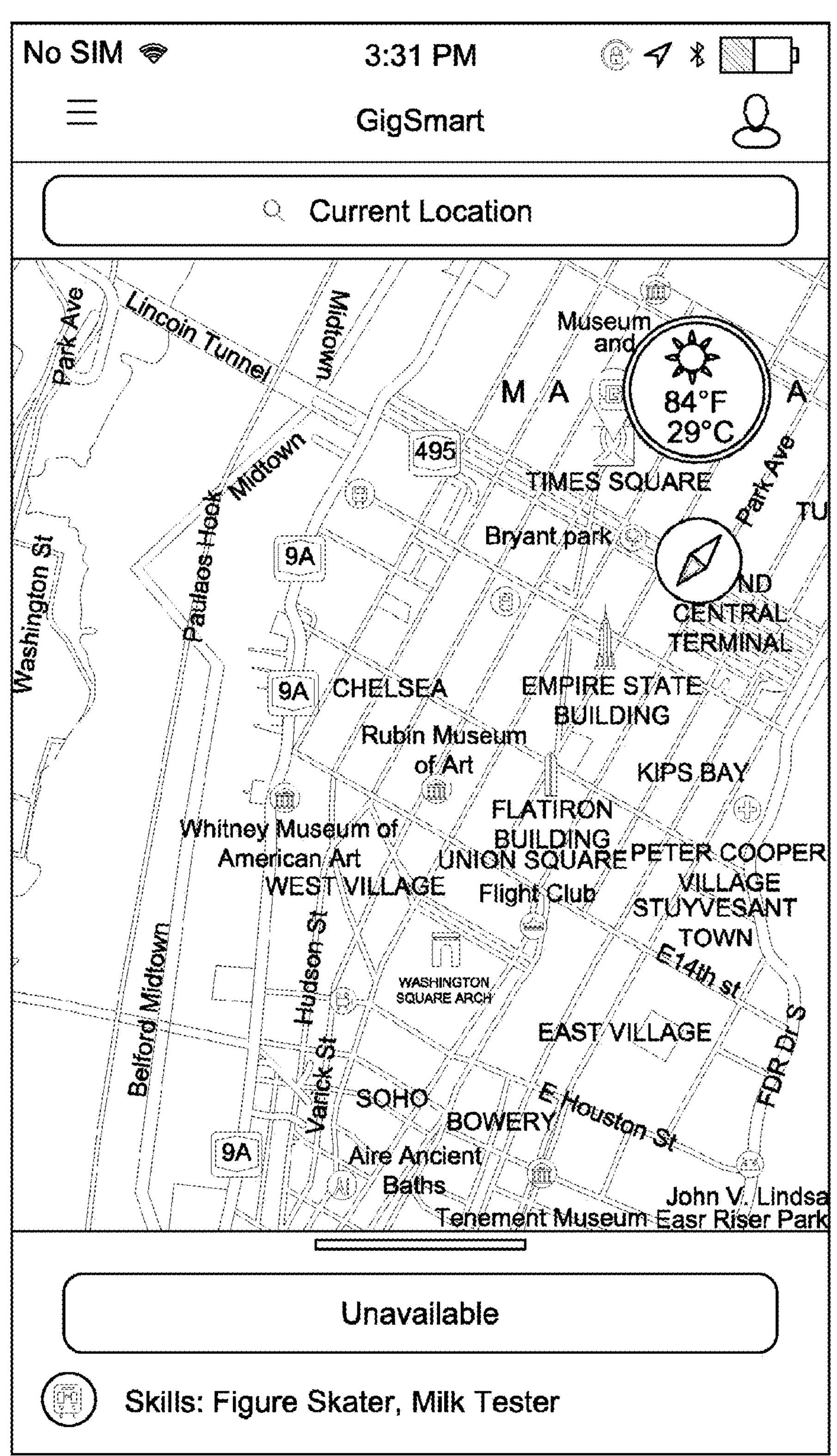
Figure 188A:
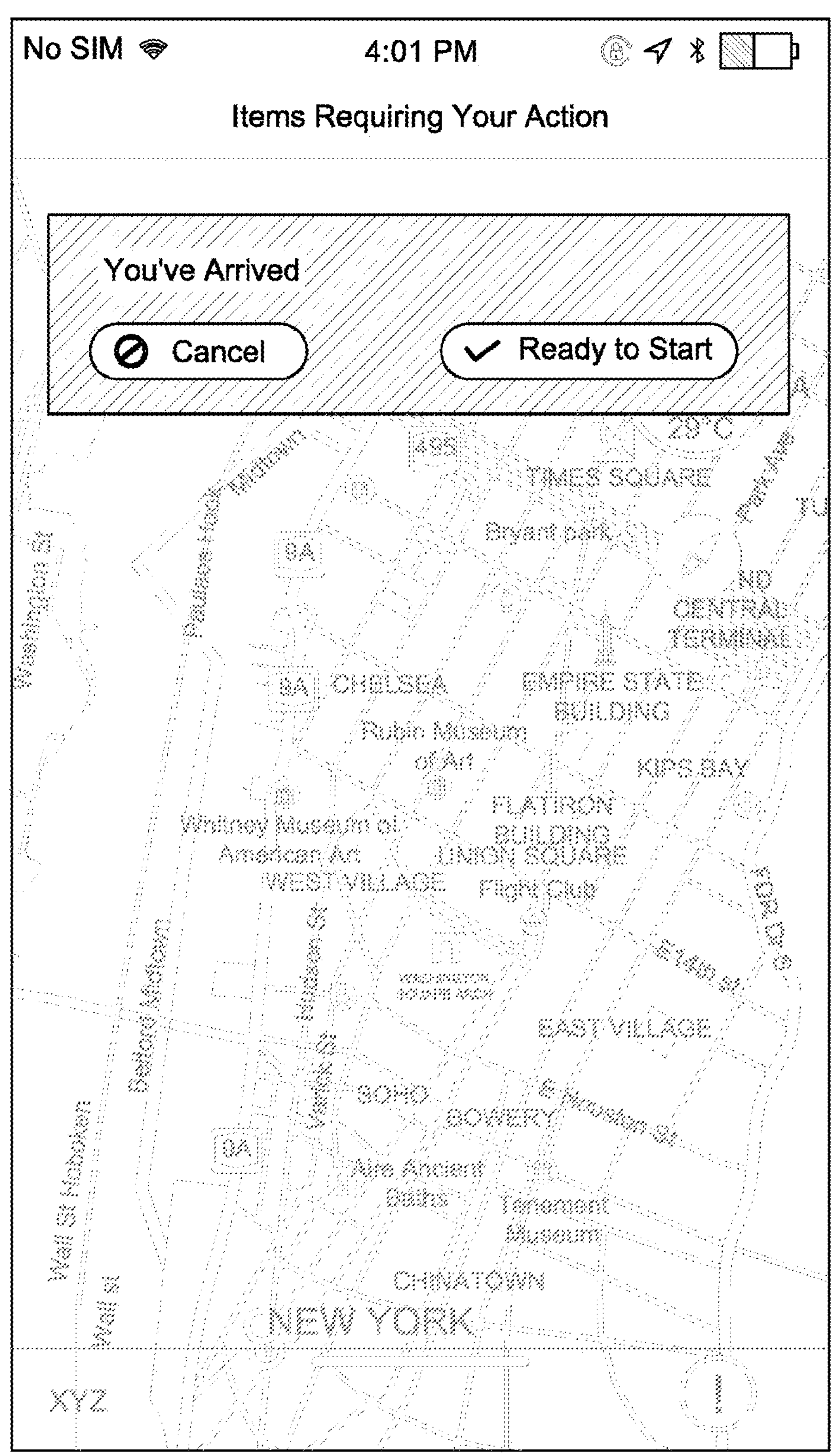
Figure 188B:
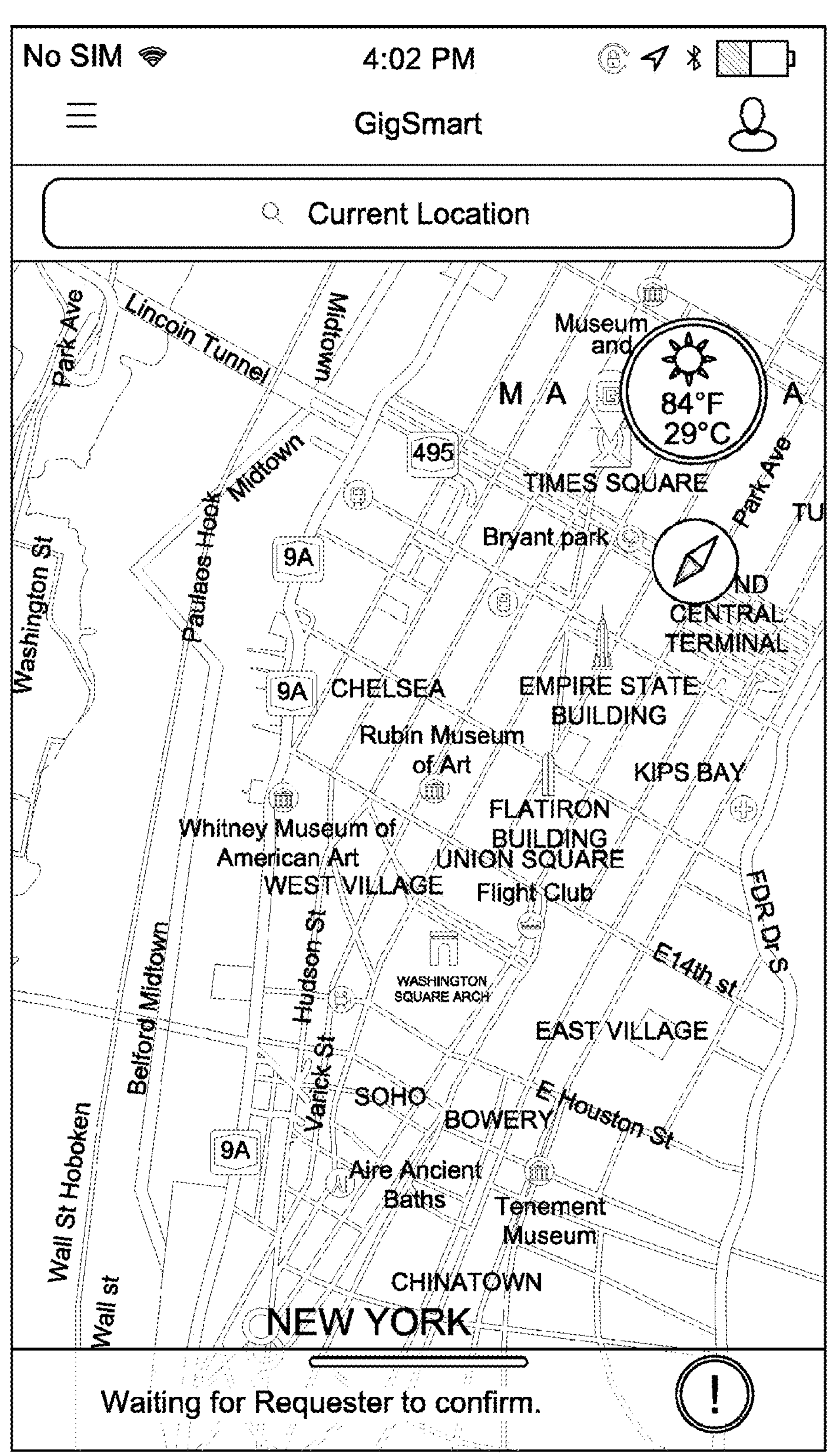
Figure 189:
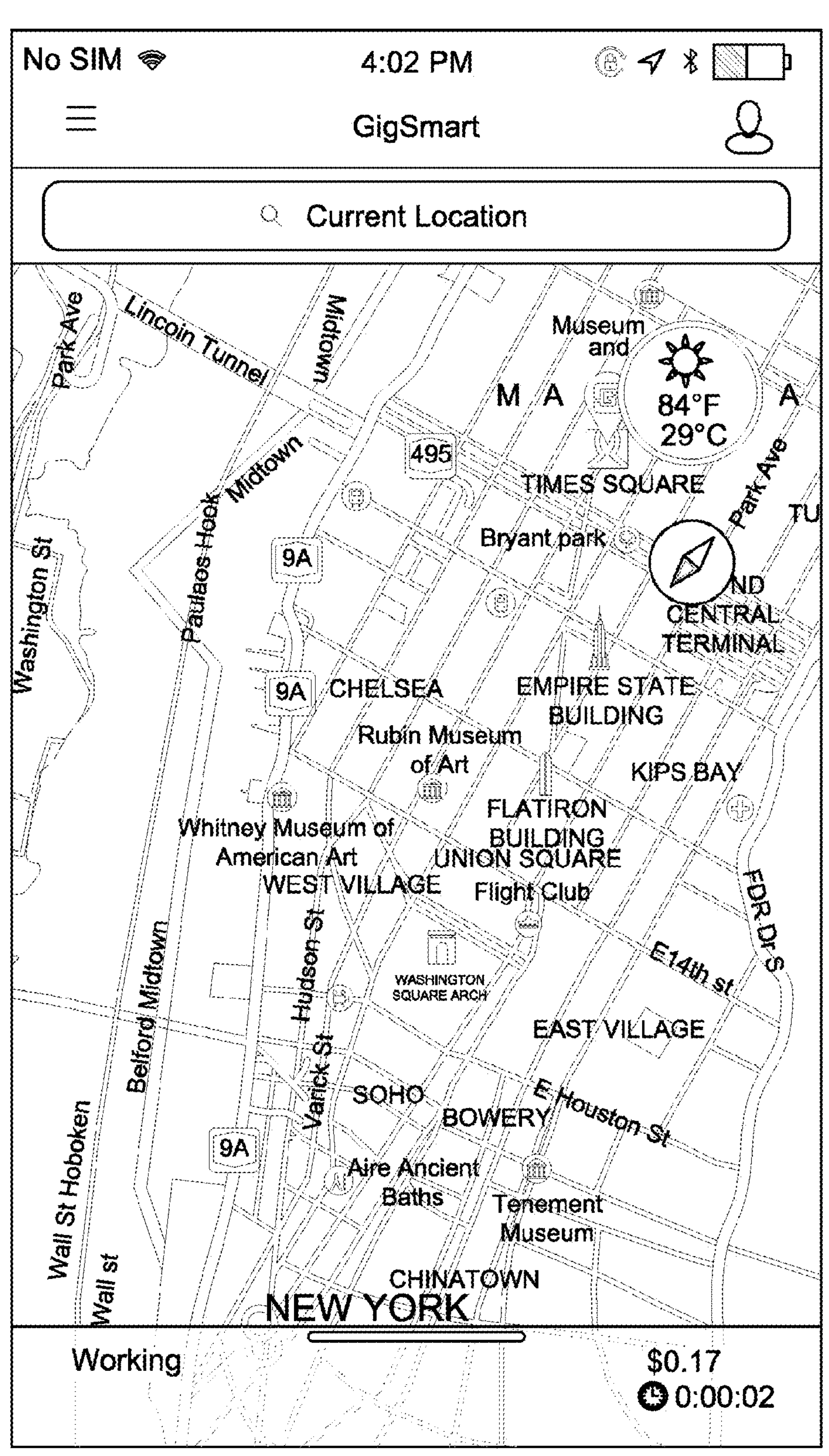
Figure 190:
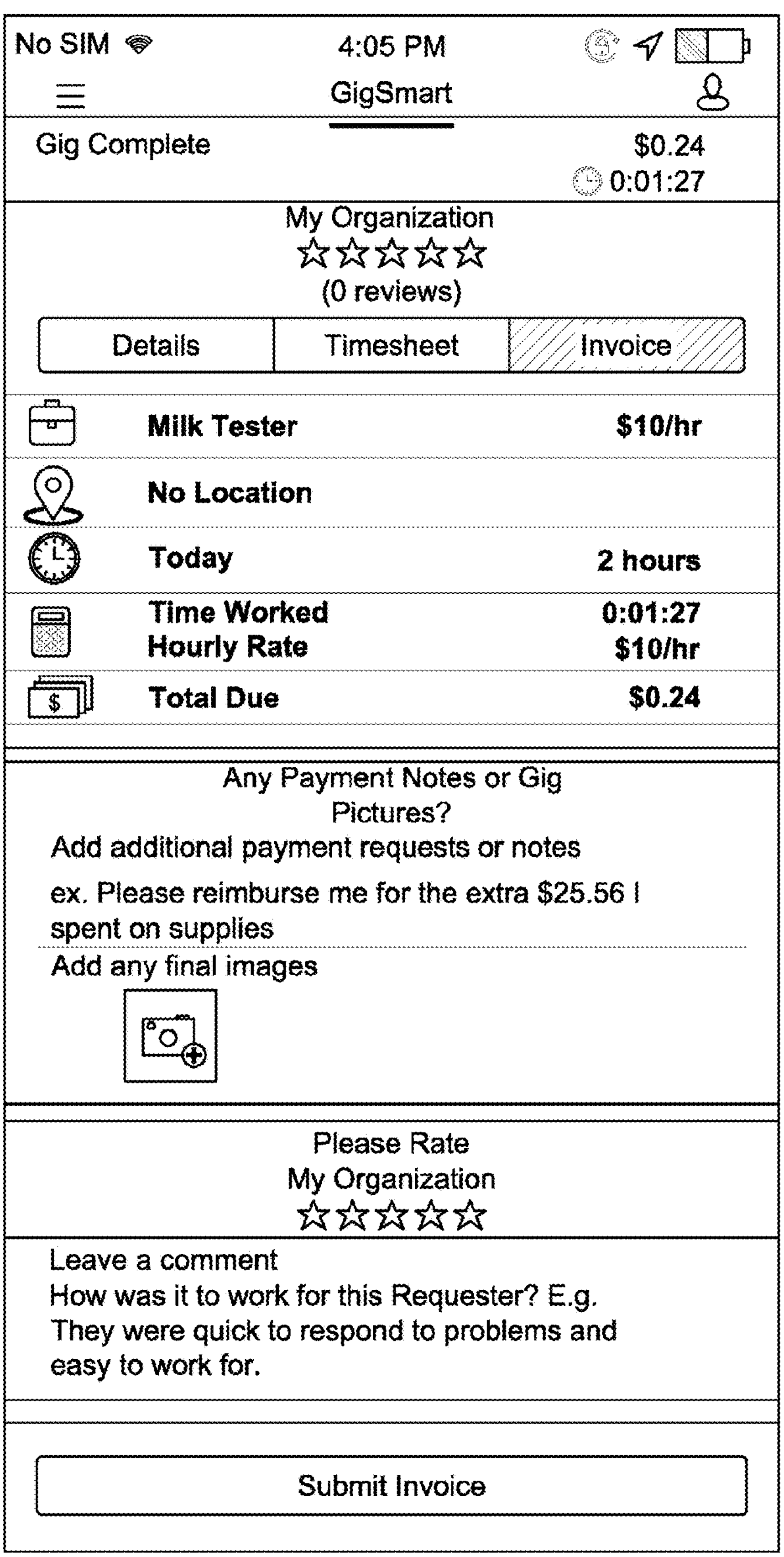
Figure 192:
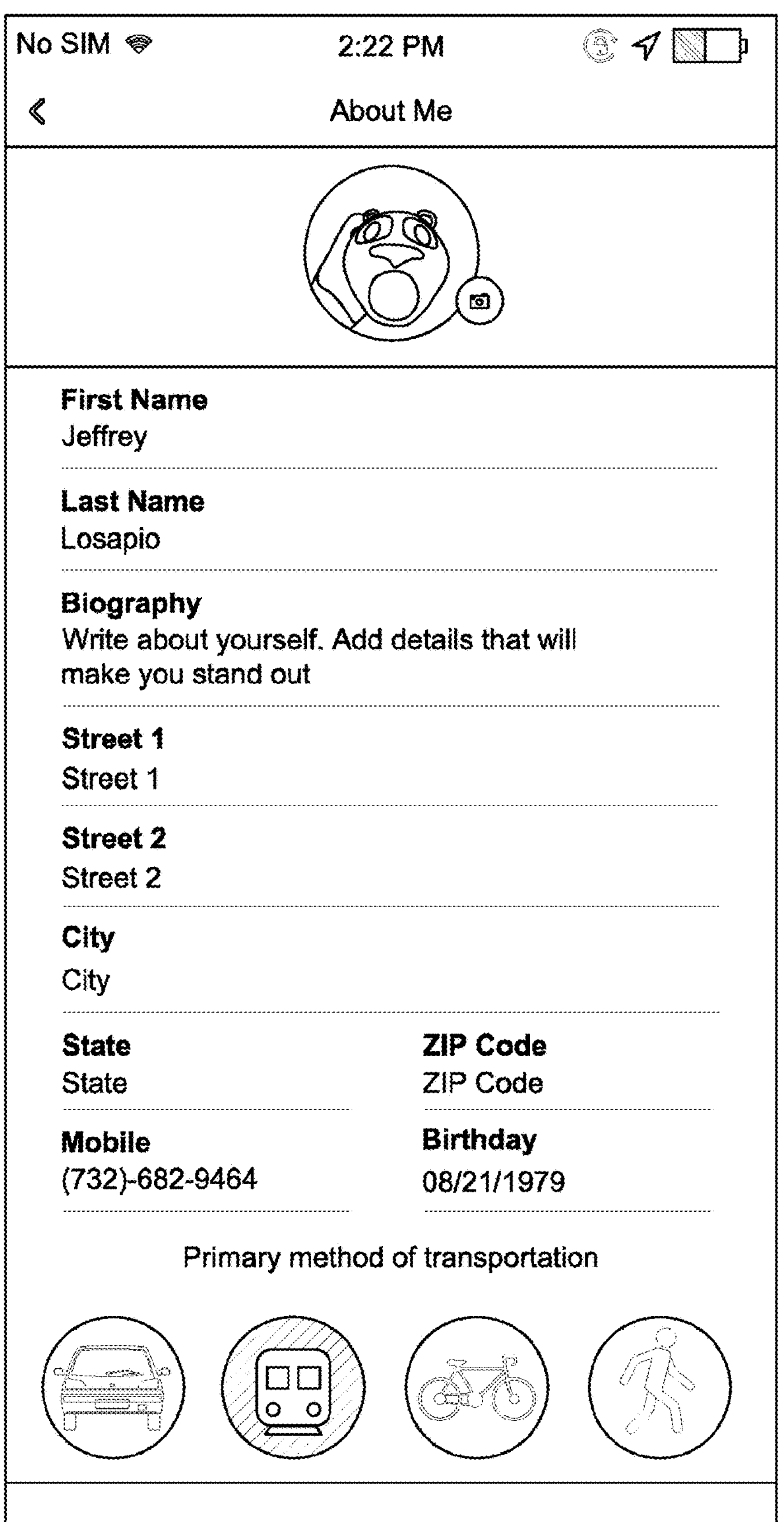
Figure 193:
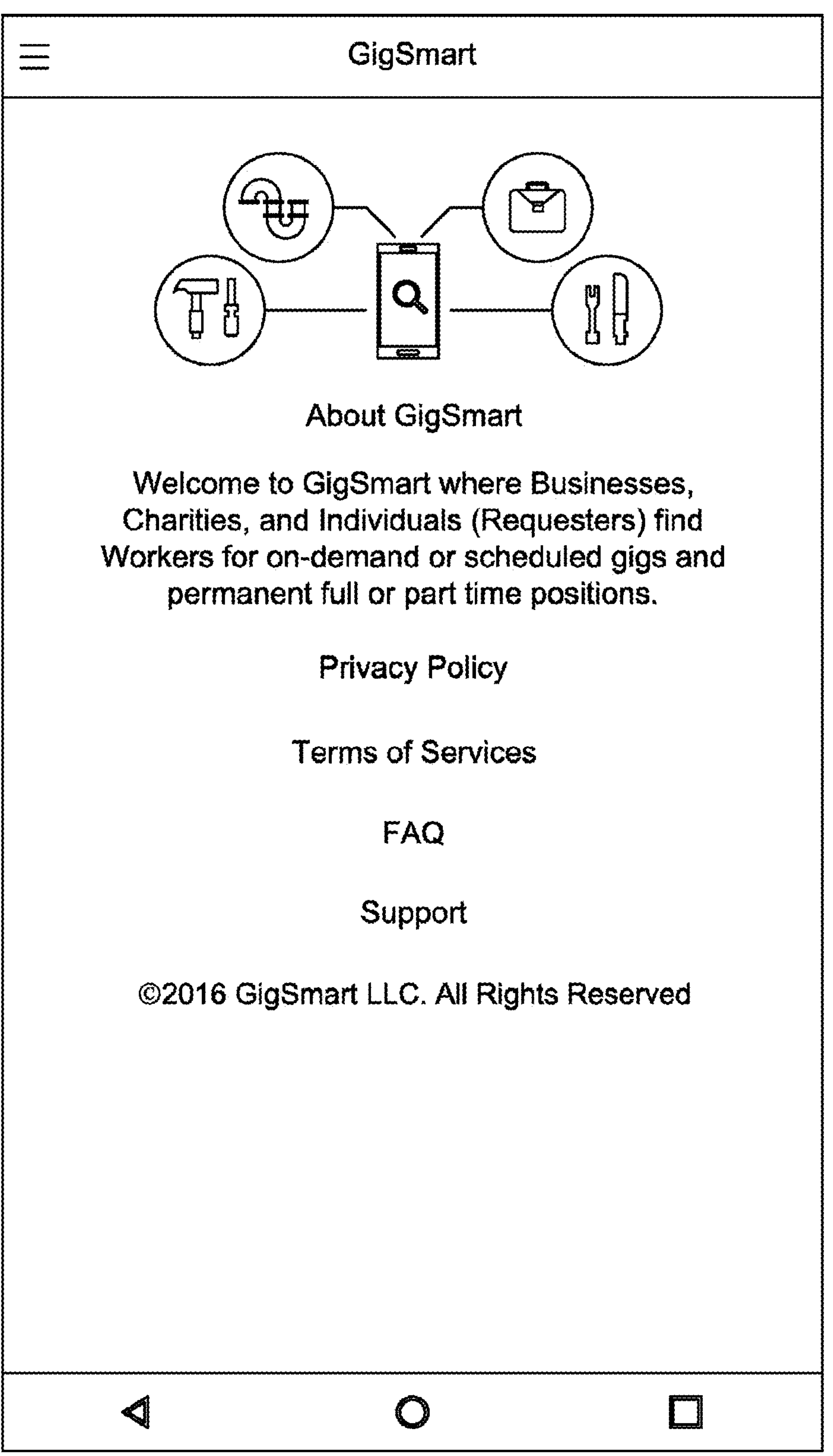
Figure 194A:
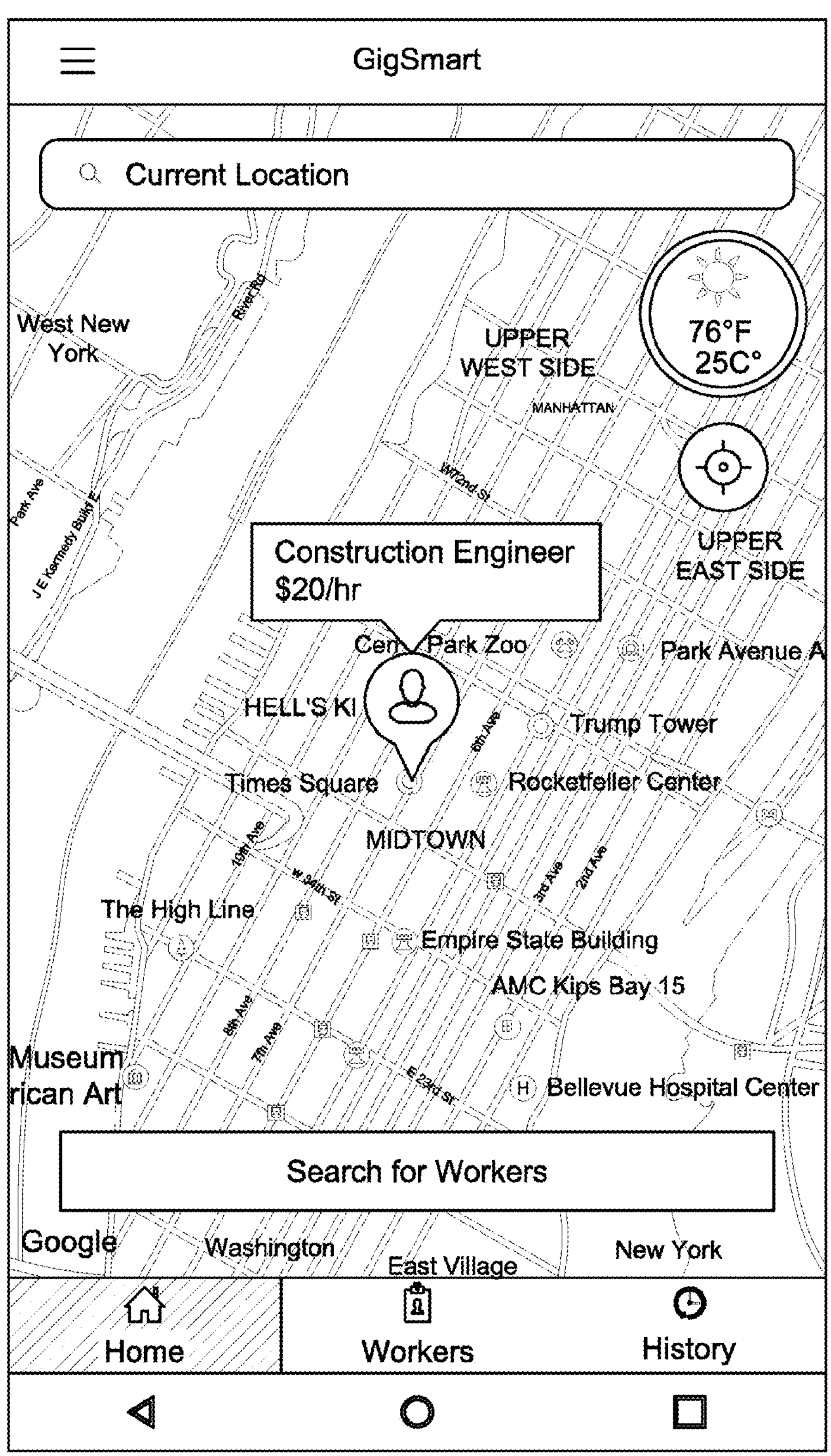
Figure 194B:
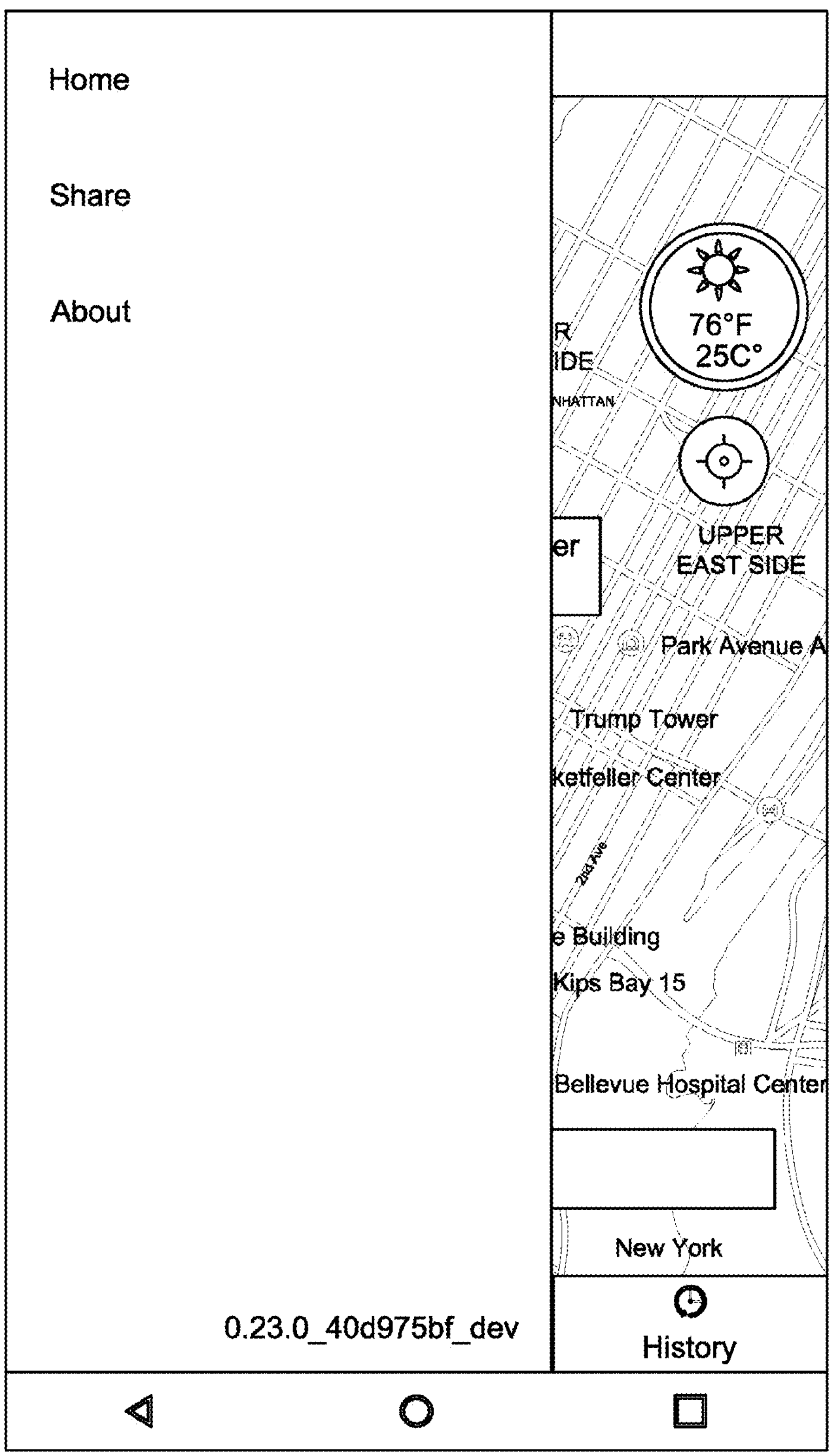
Figure 195A:
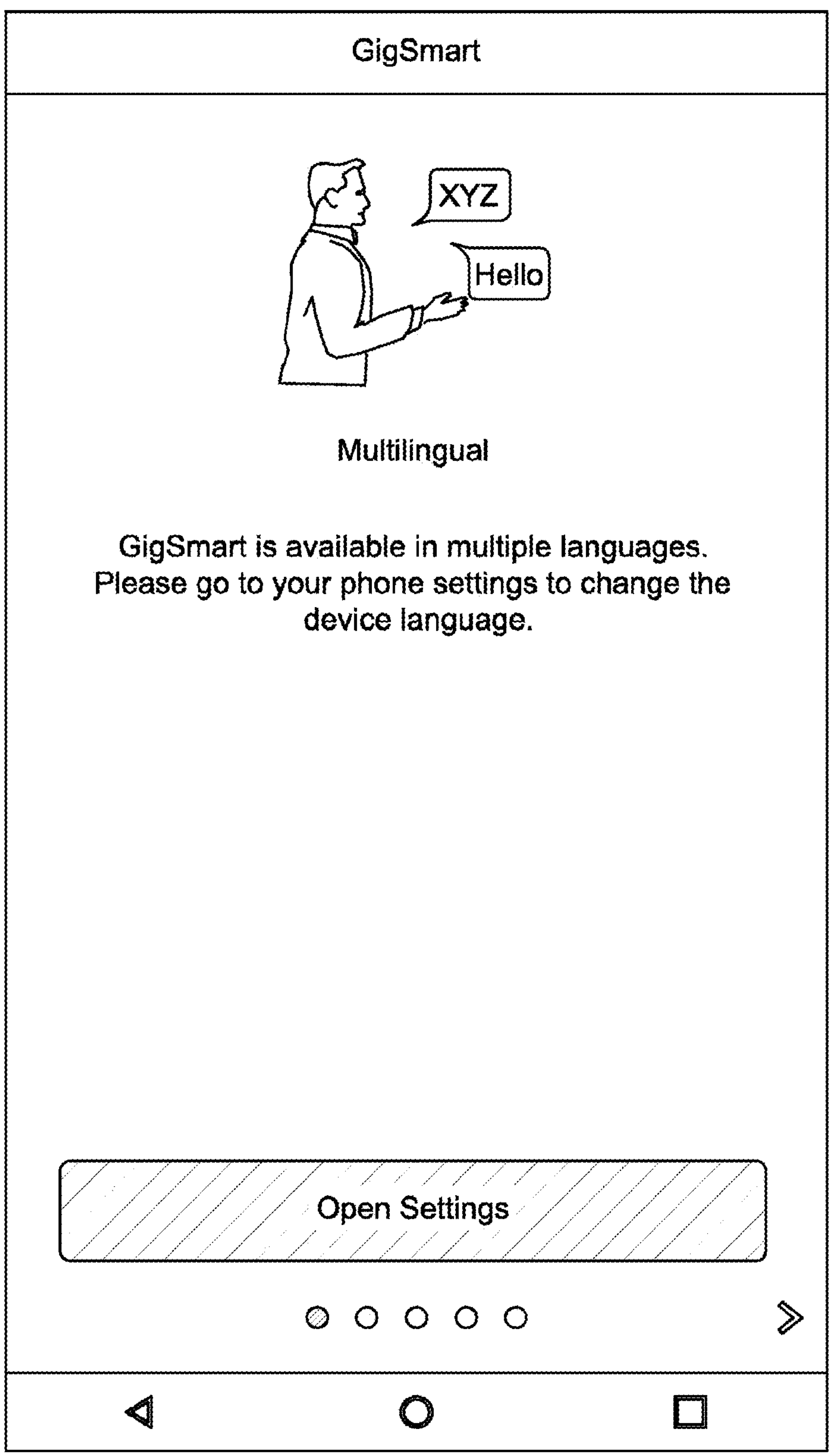
Figure 195B:
Figure 195C:
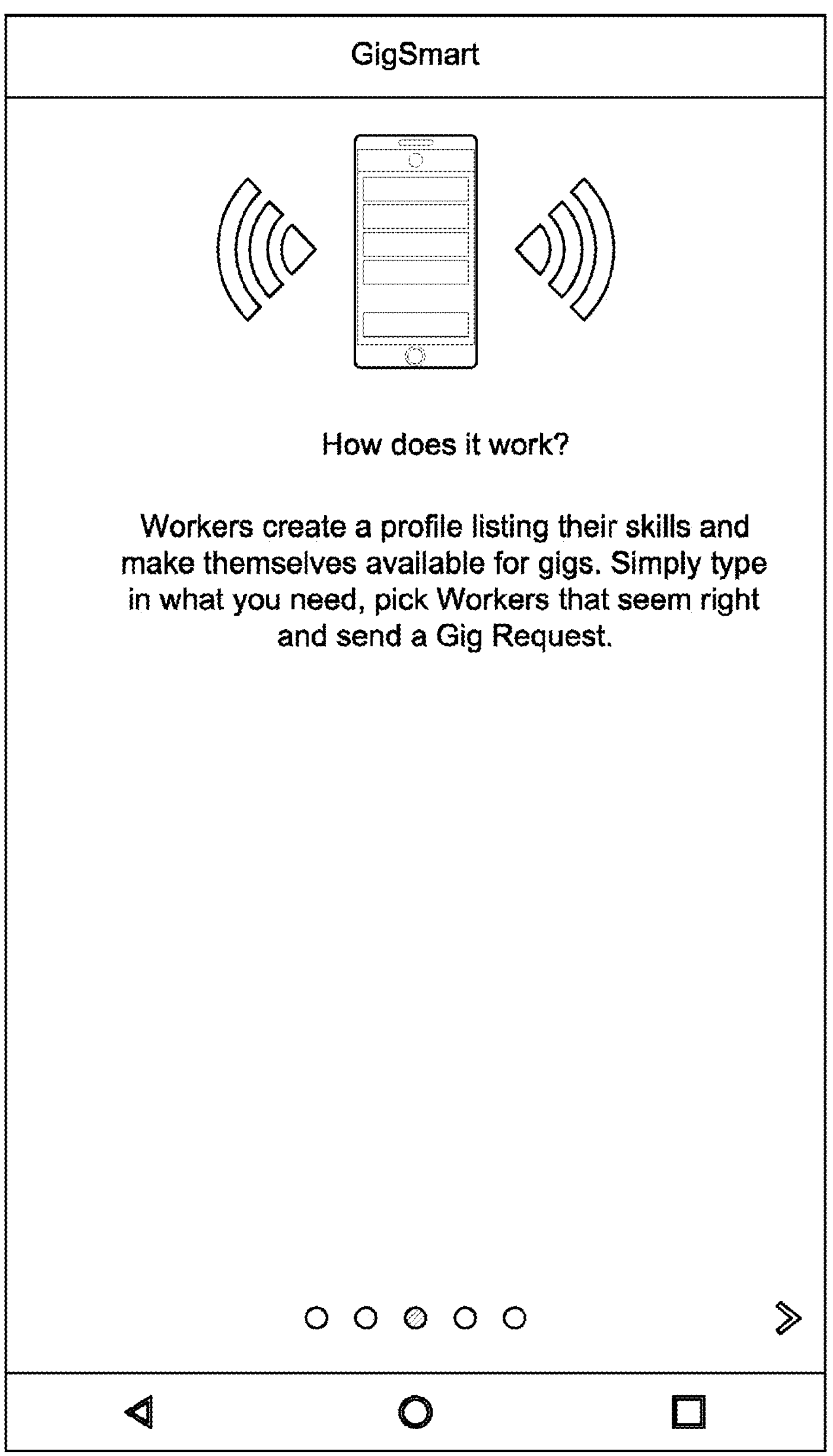
Figure 195D:
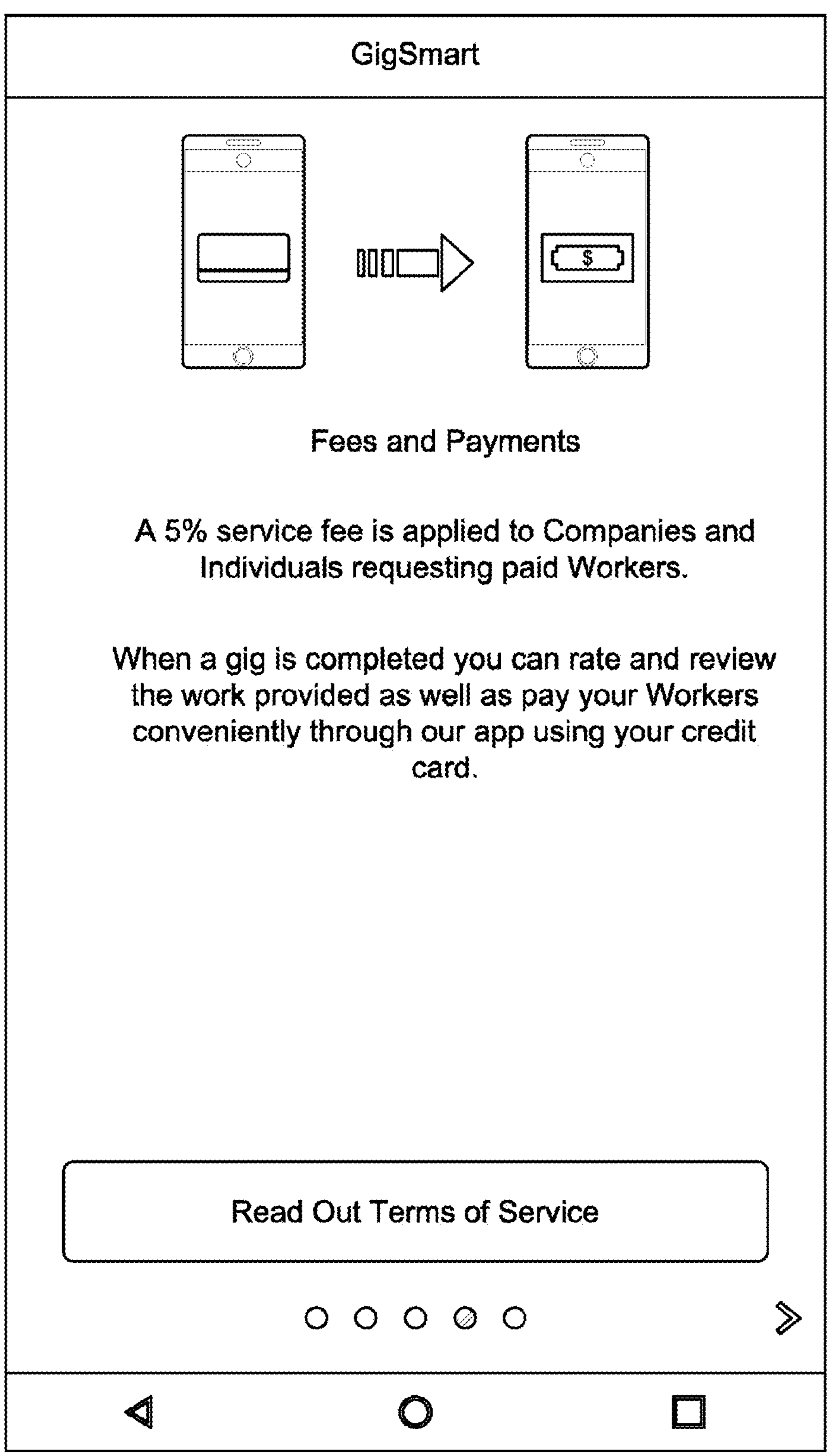
Figure 195E:
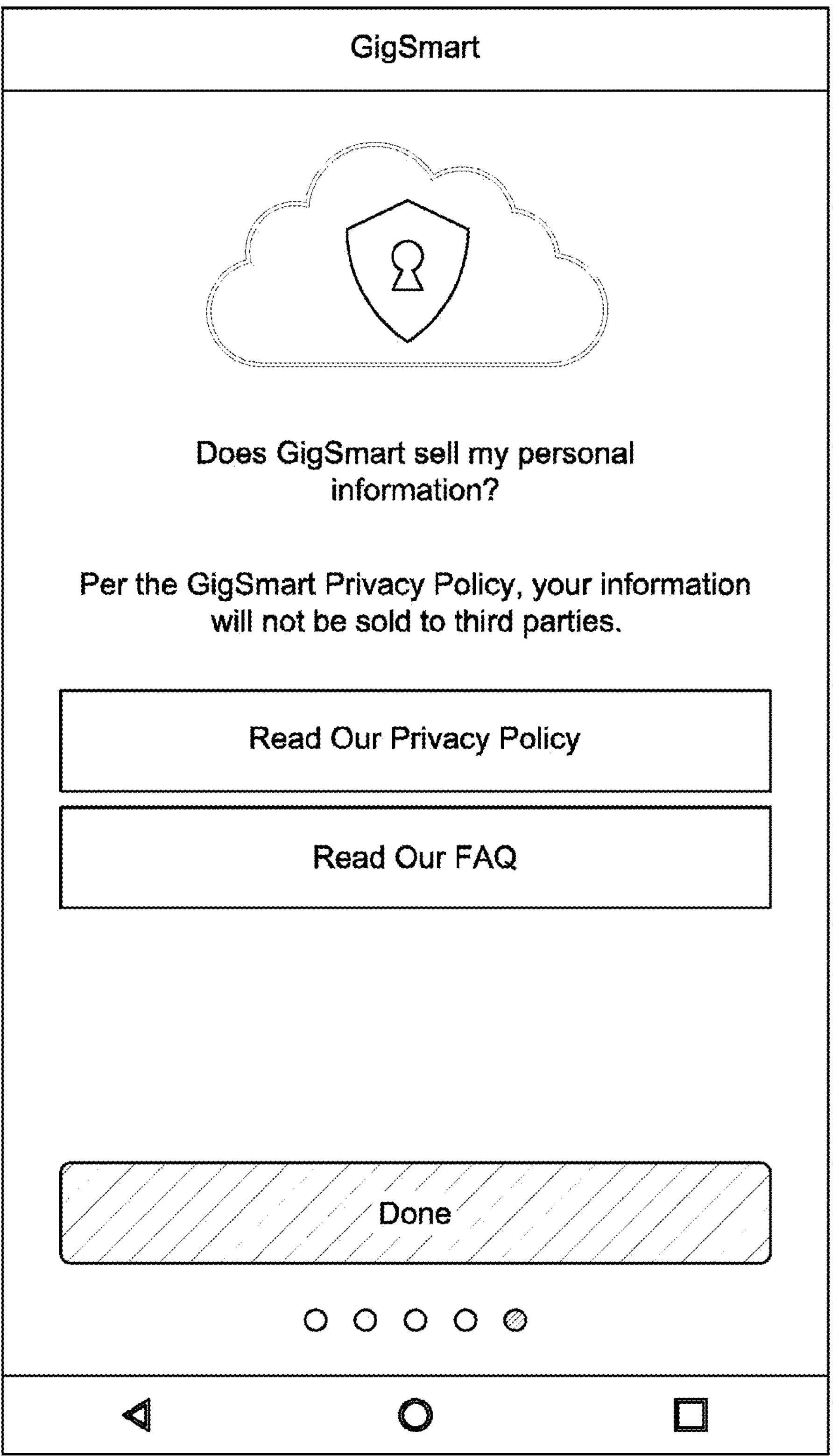
Figure 196:
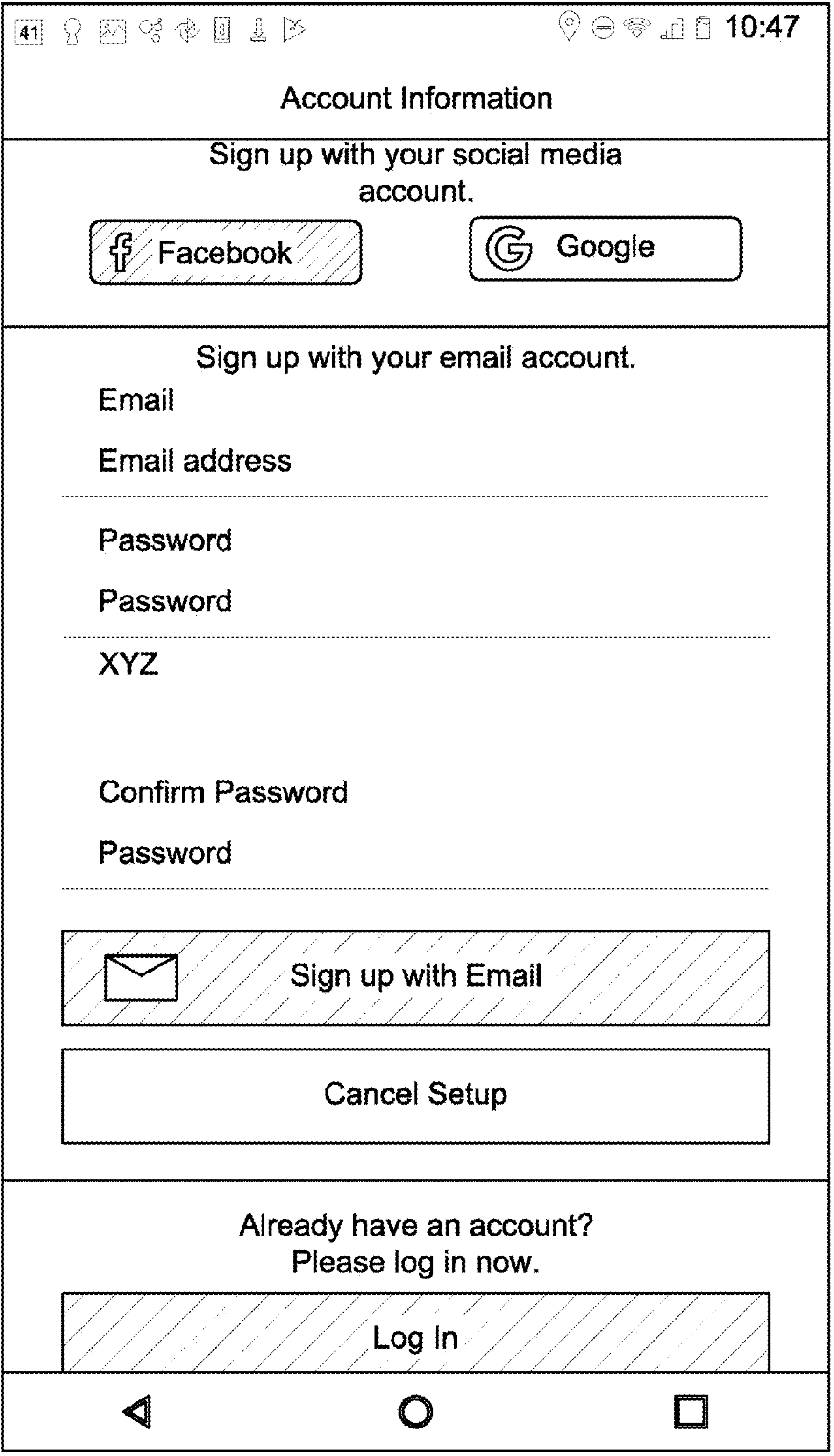
Figure 197A:
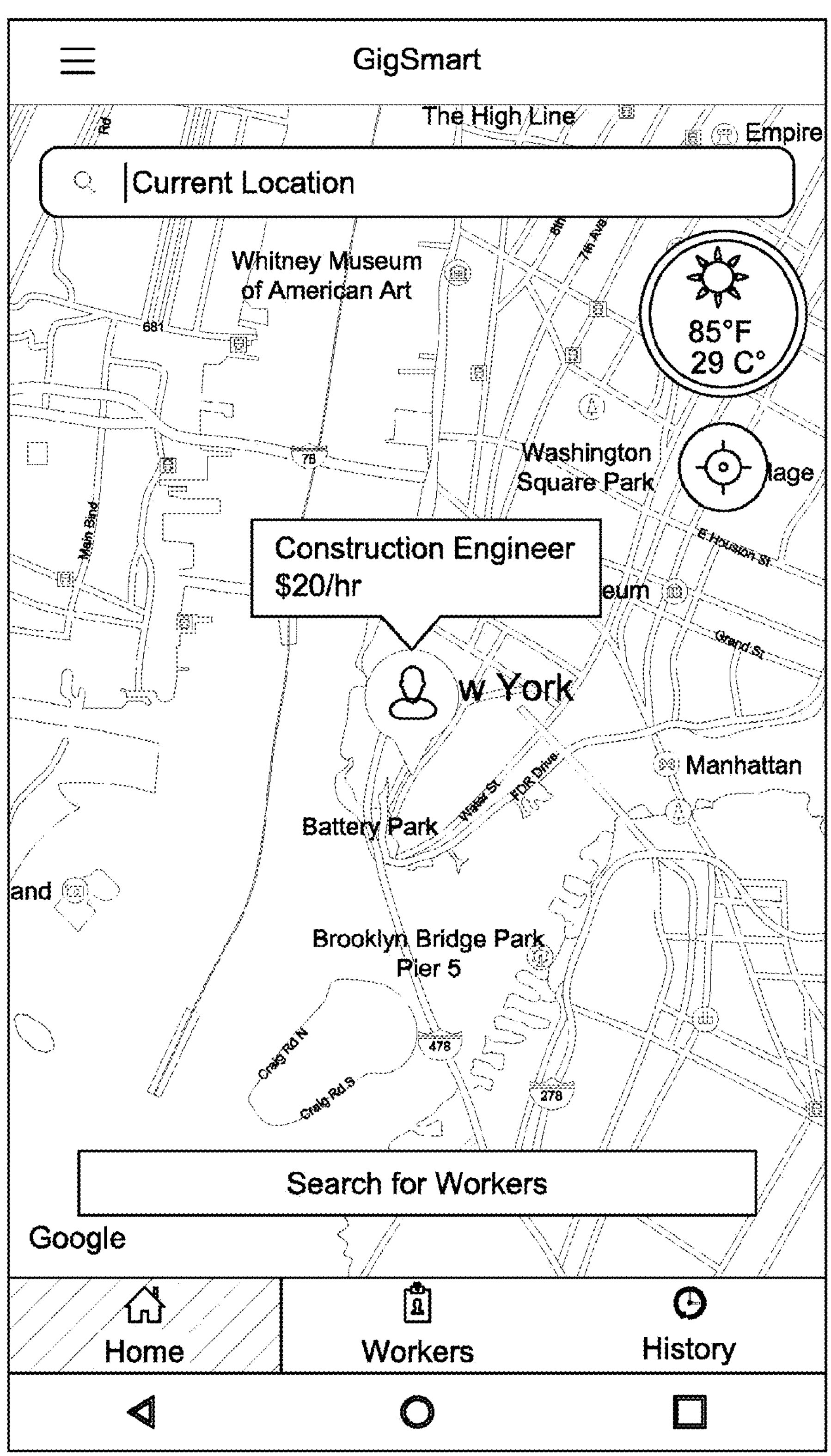
Figure 197B:
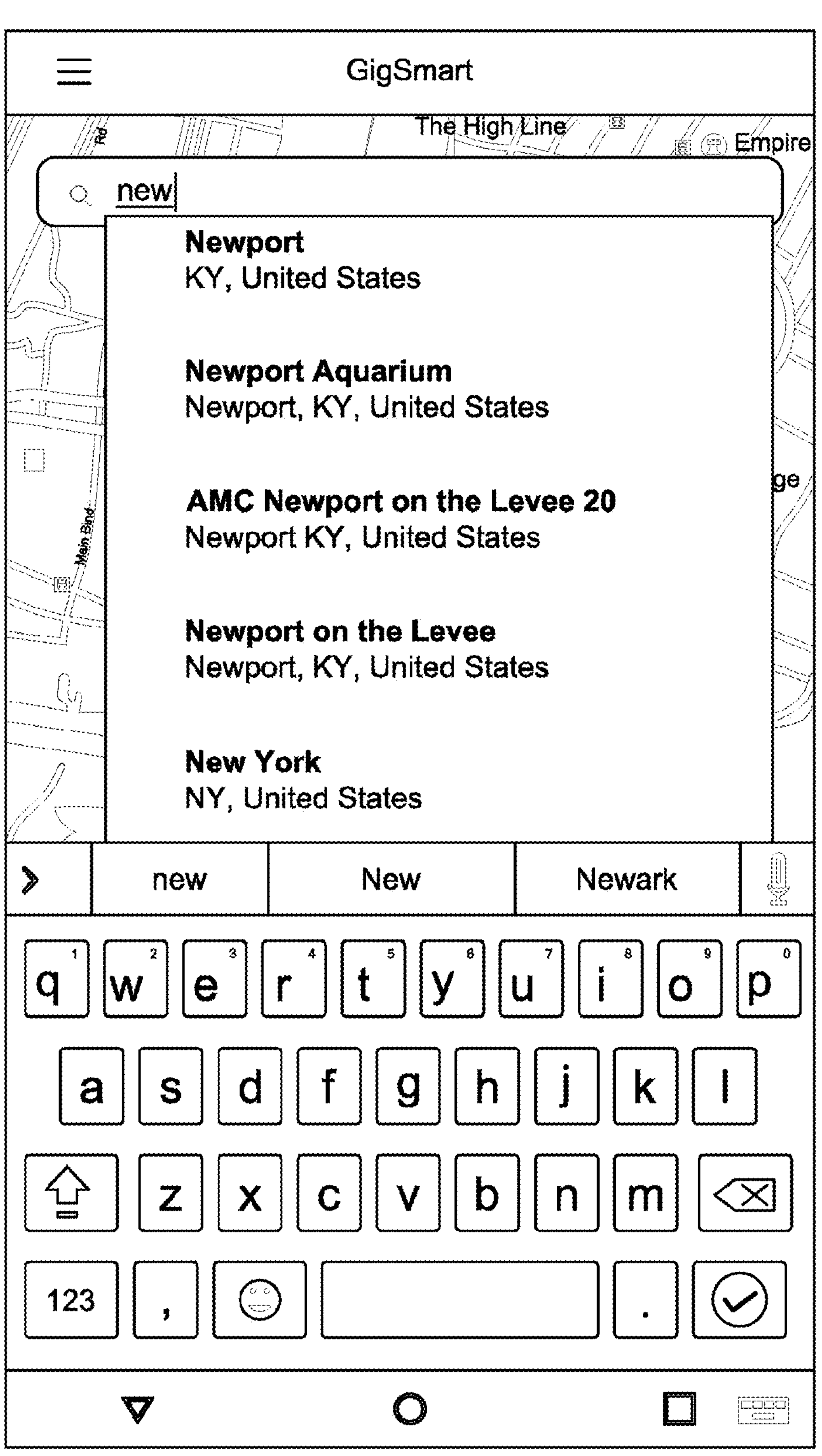
Figure 198A:
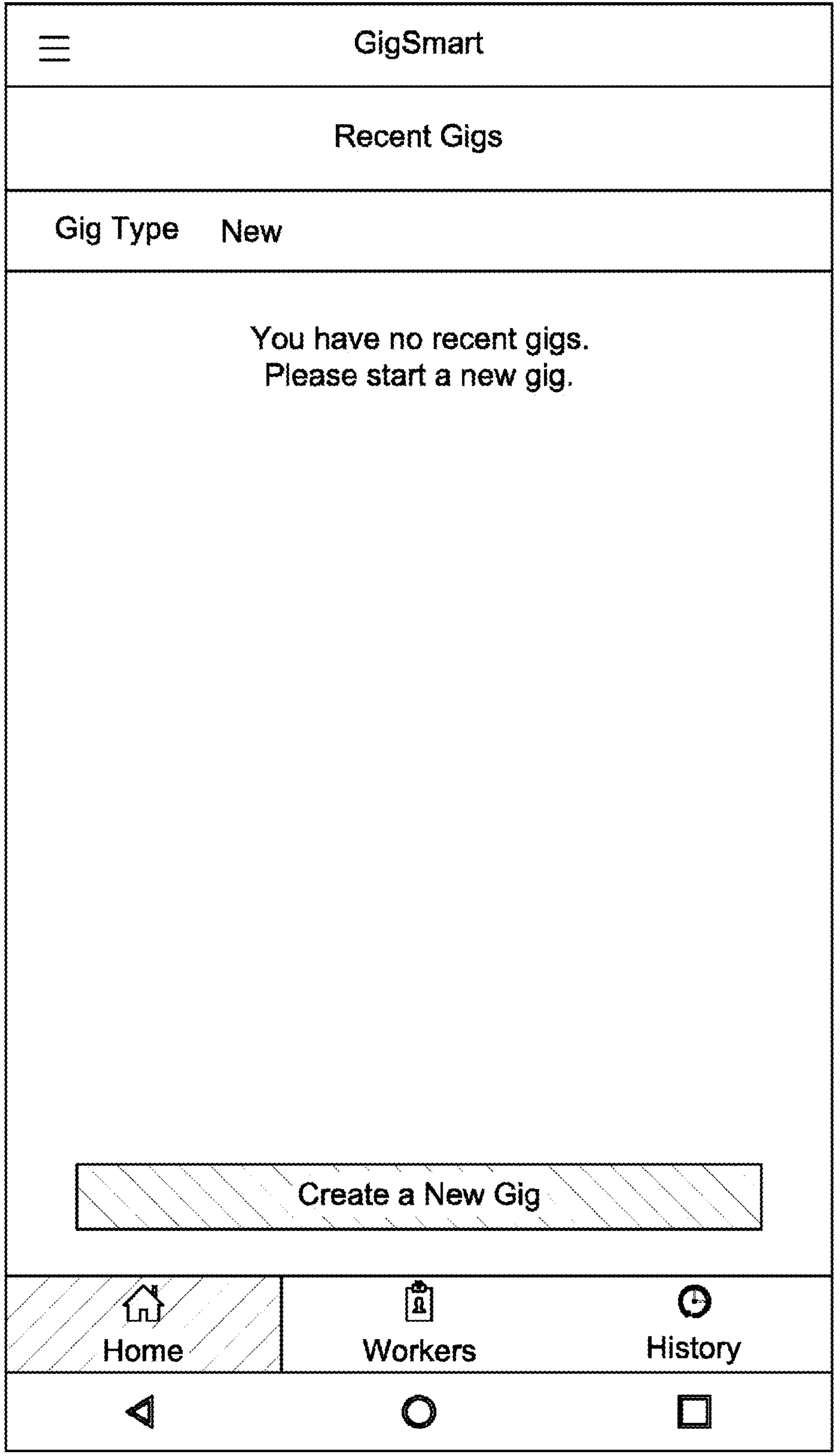
Figure 198B:
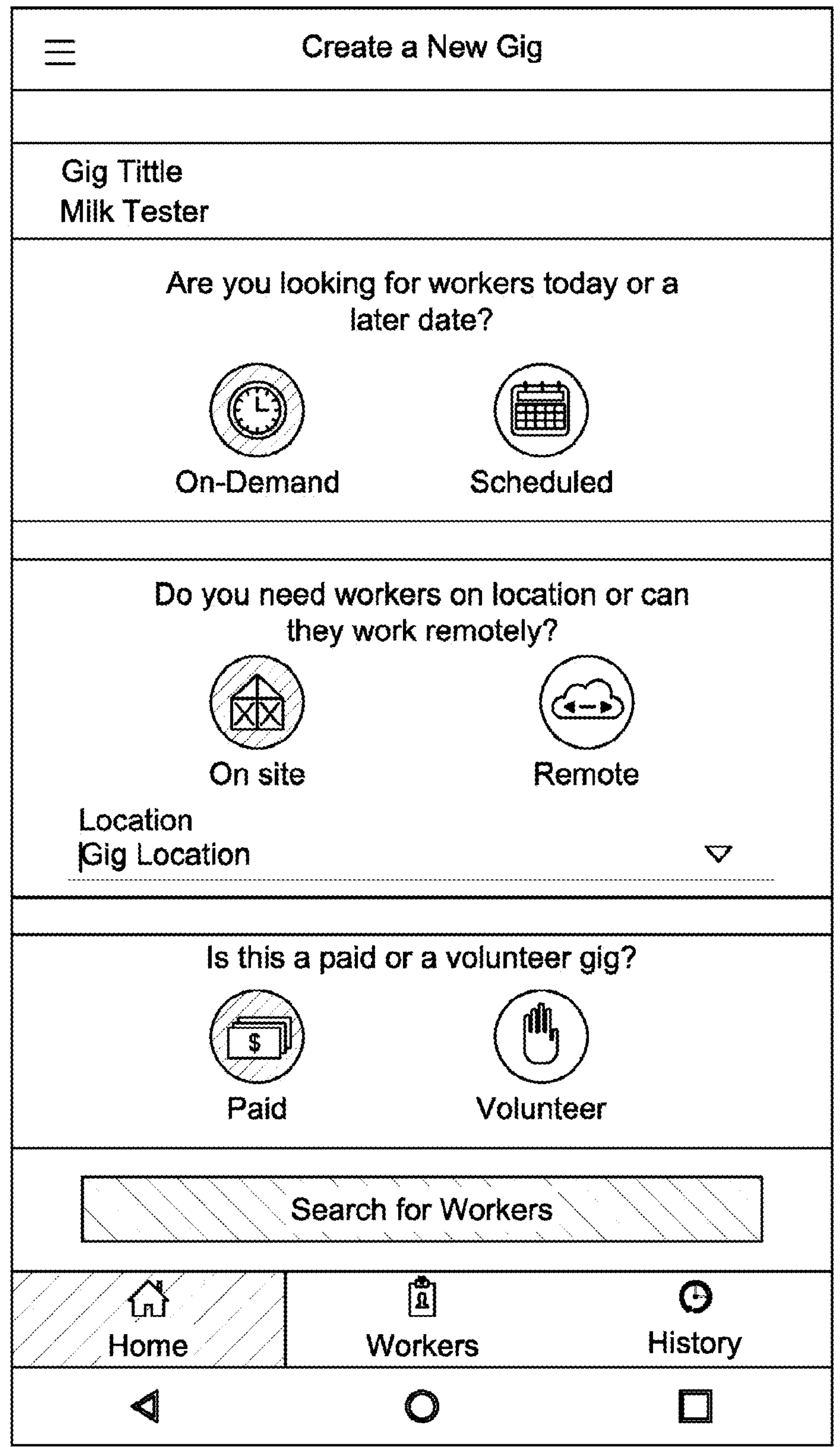
Figure 198C:
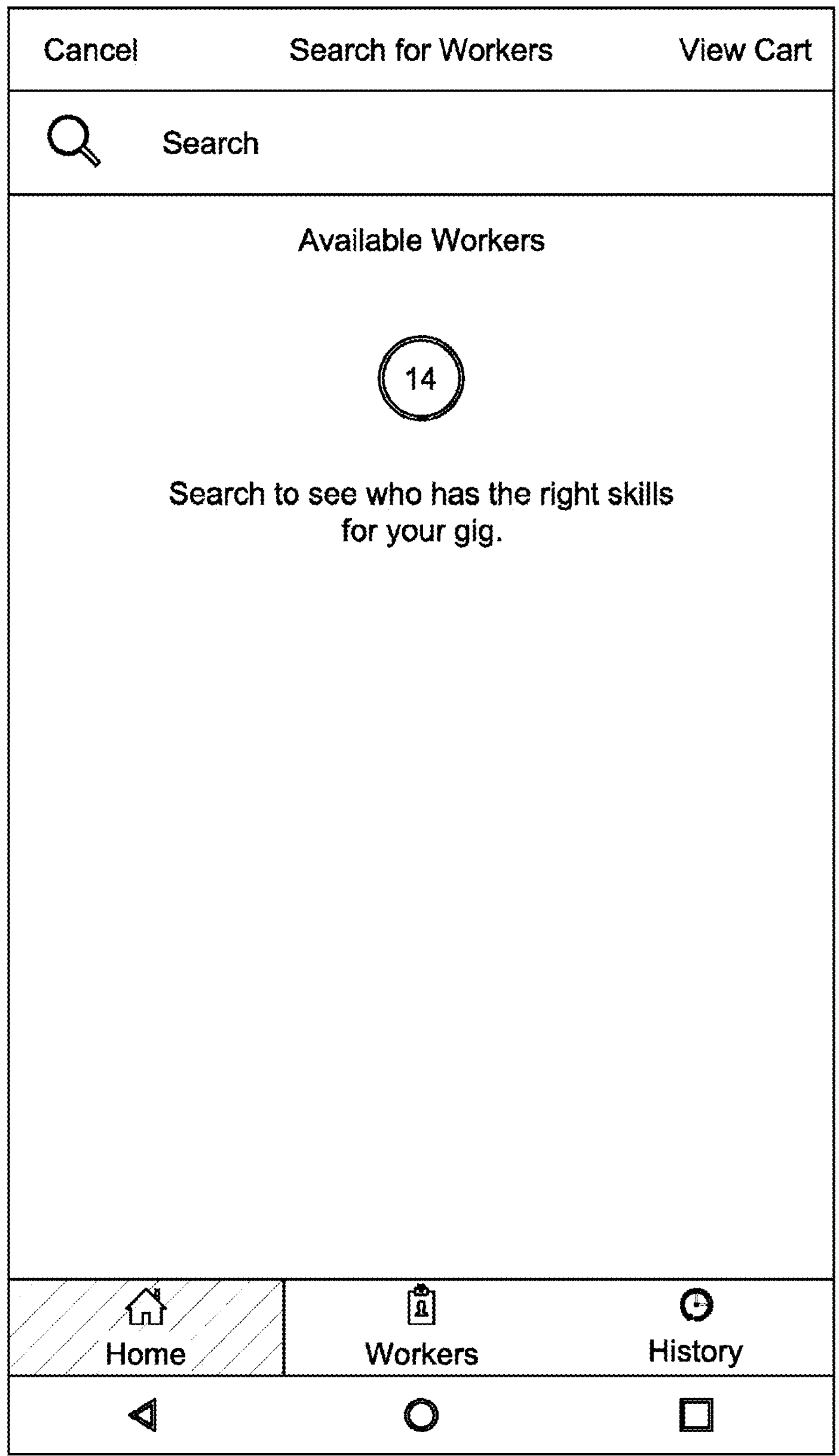
Figure 199:
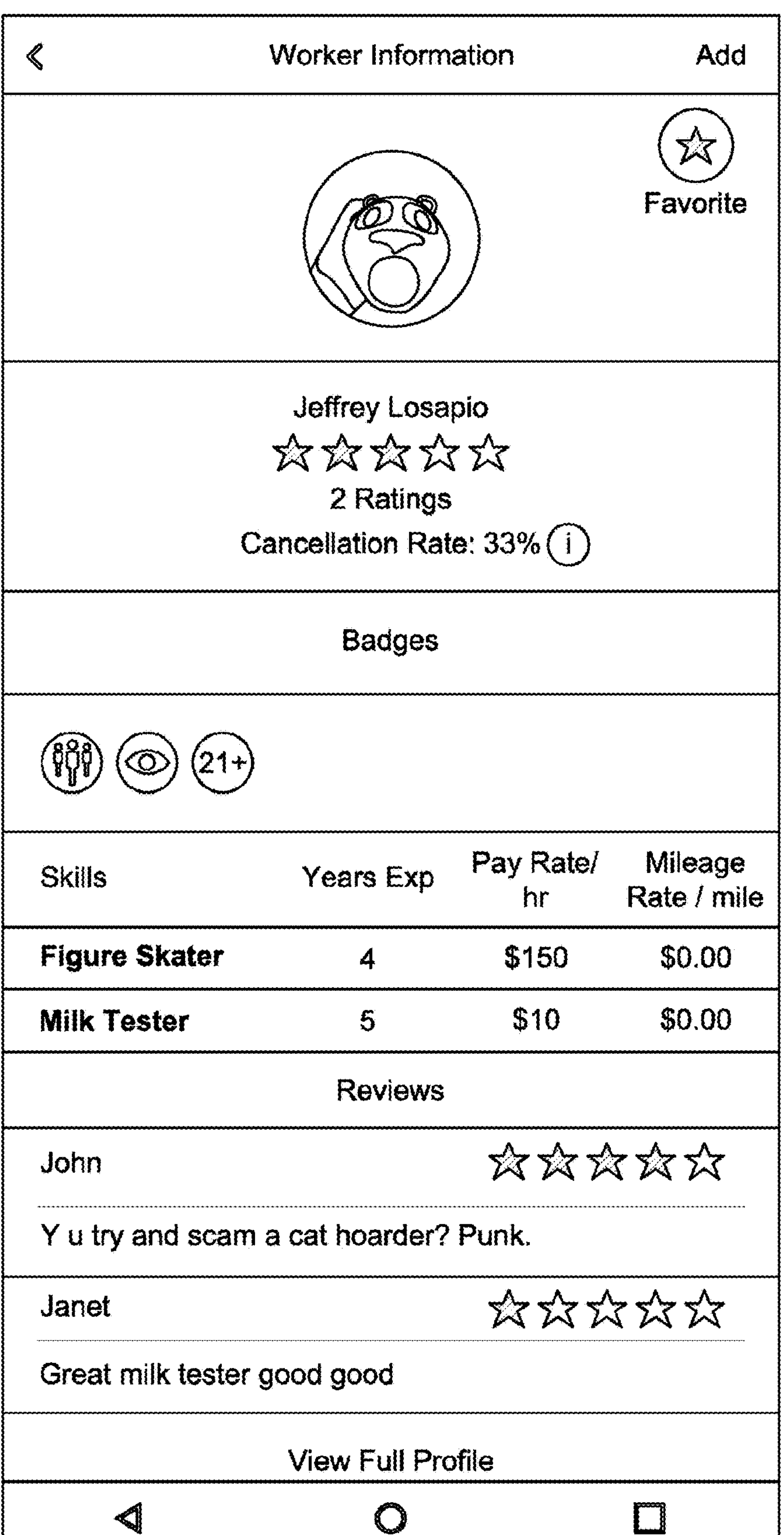
Figure 203:
Figure 204:
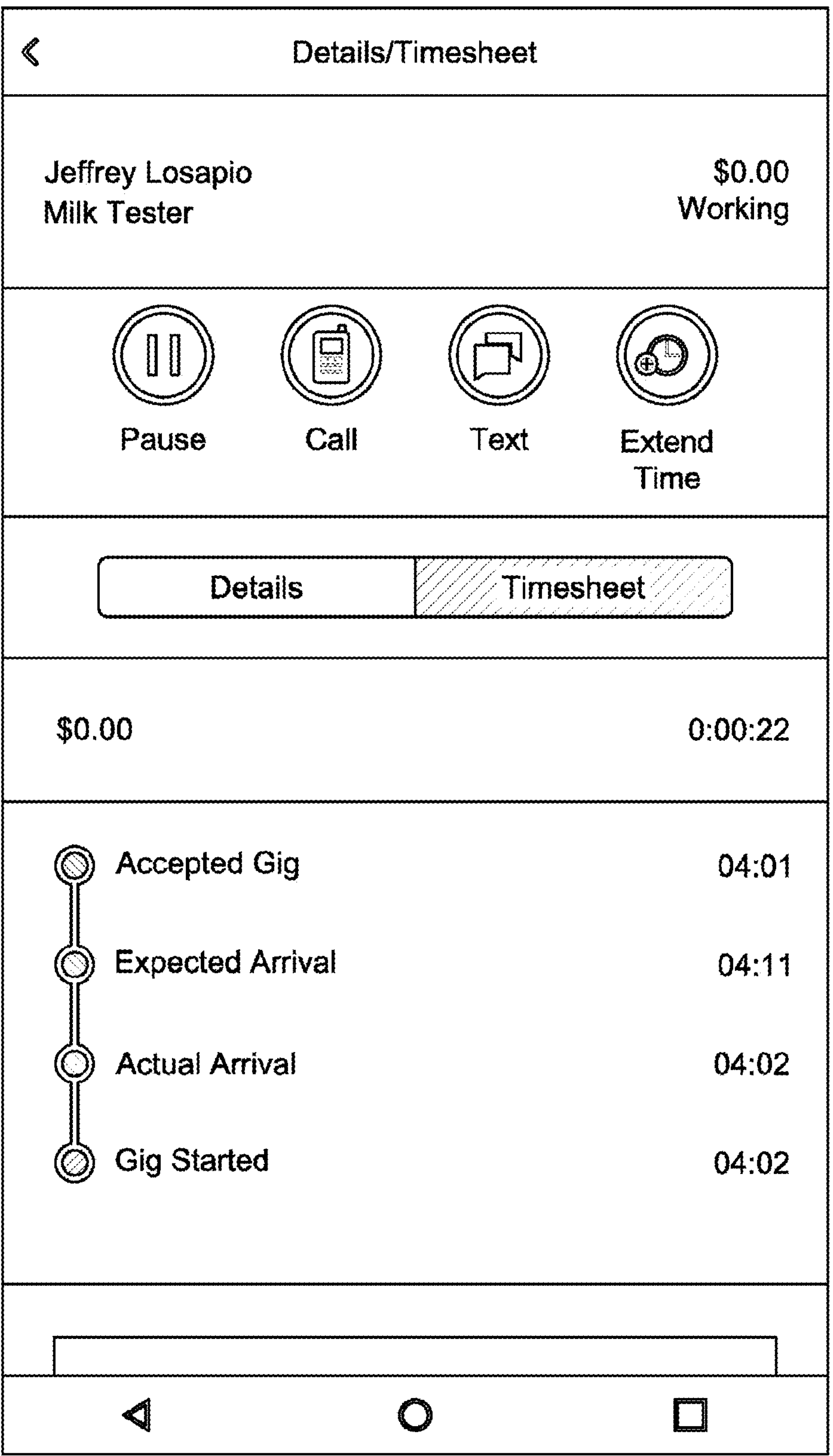
Figure 205:
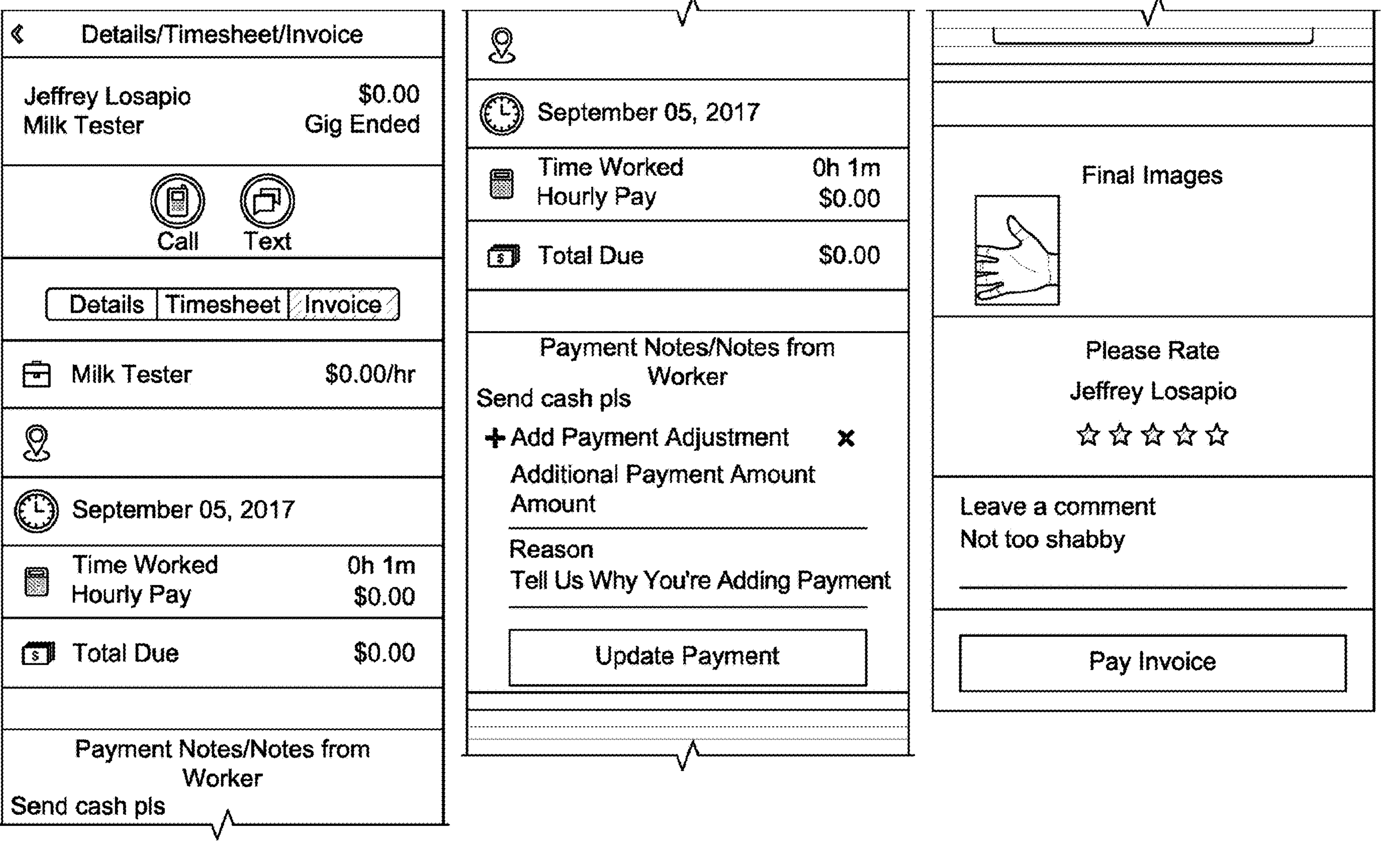
Figure 207A:
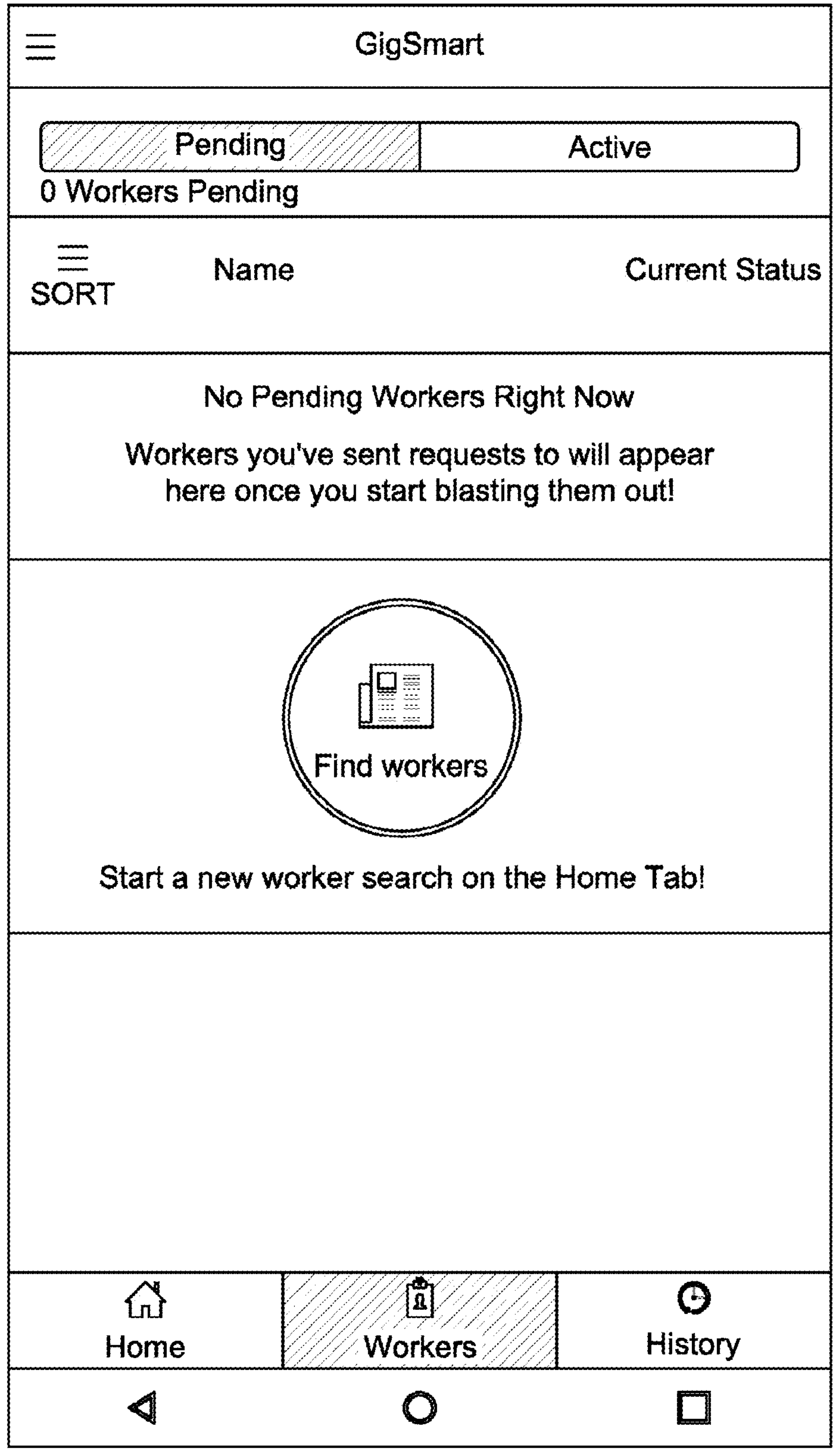
Figure 208A:
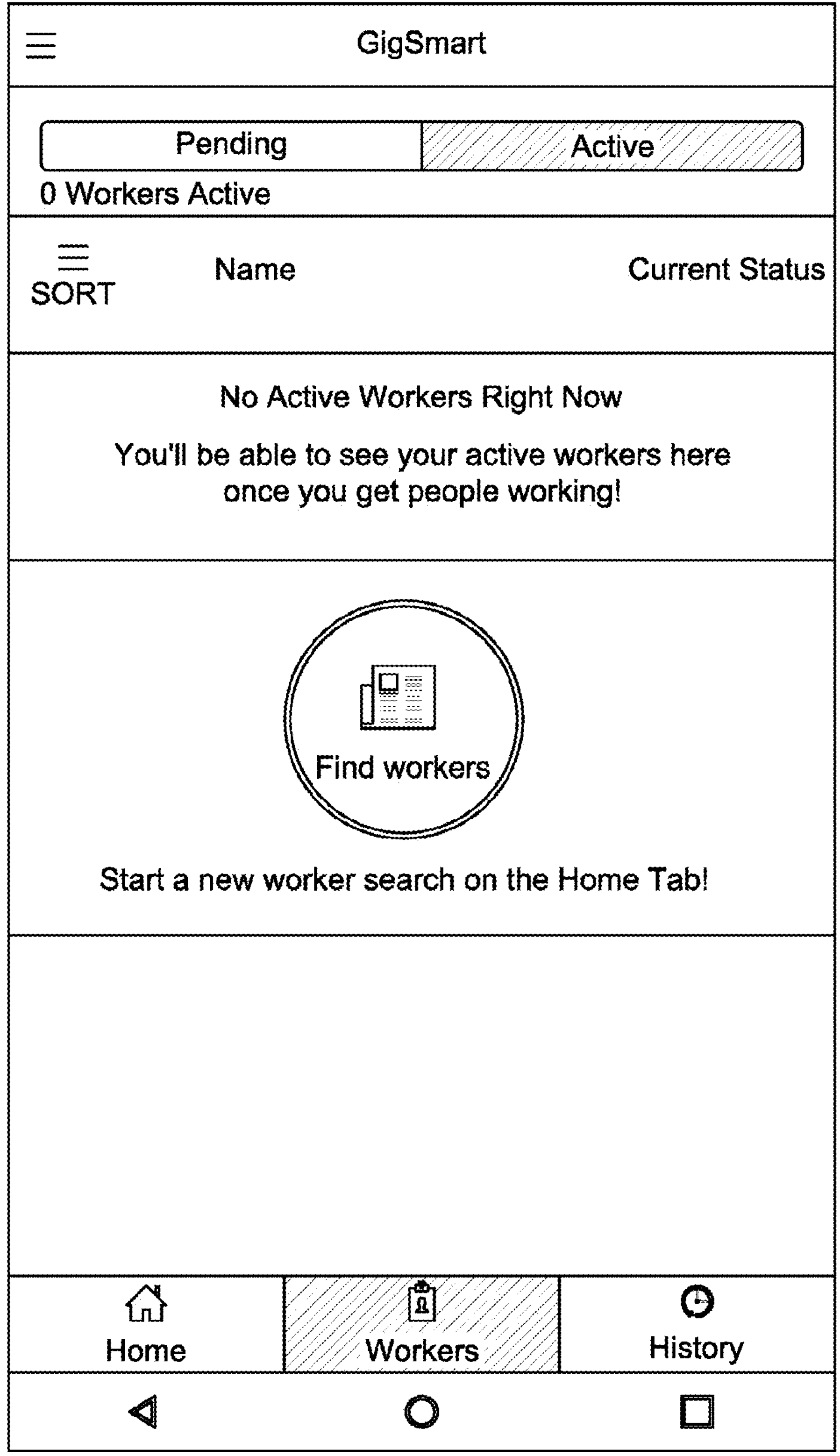
Figure 210A:
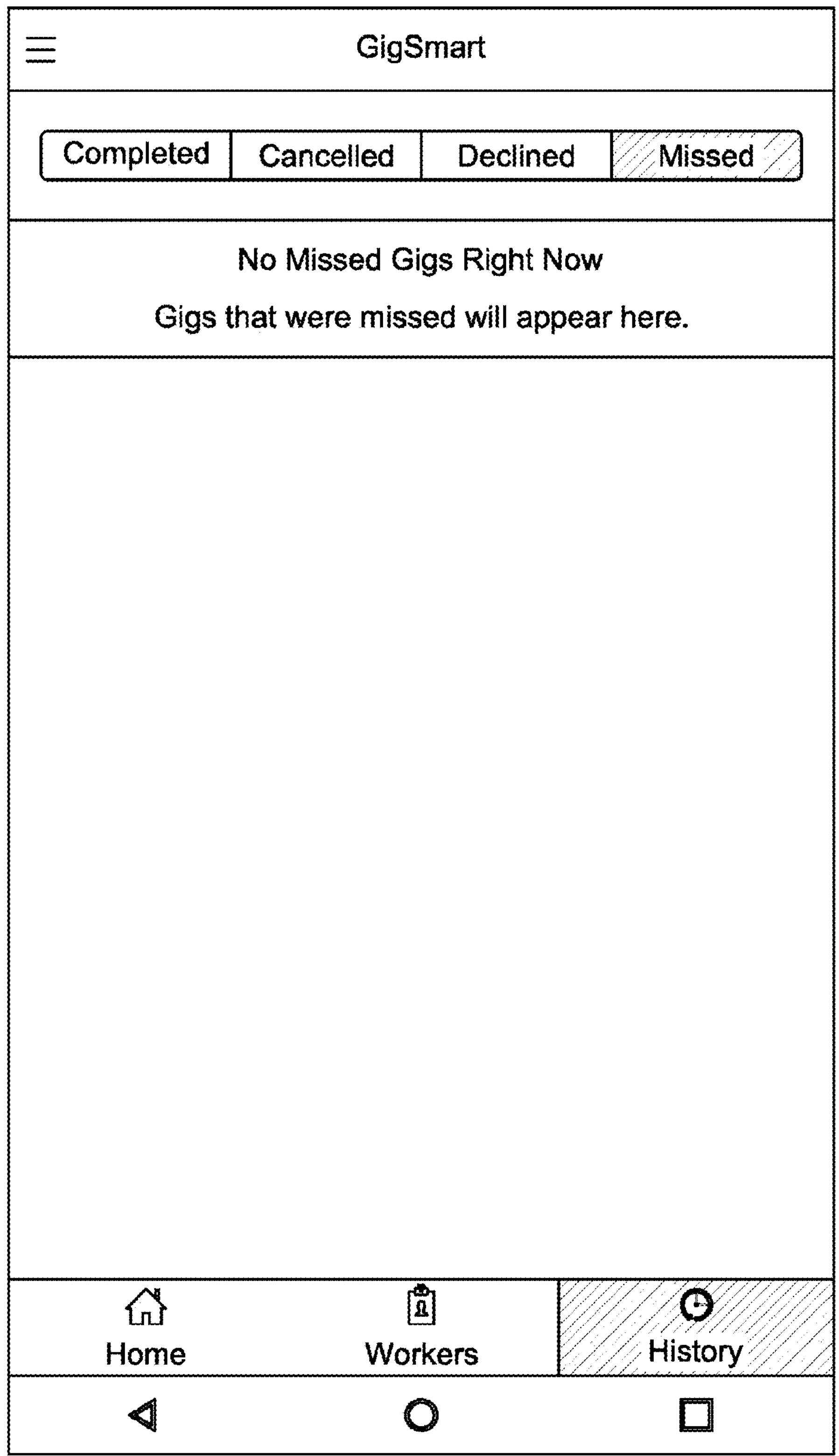
Figure 213:
Figure 214A:
Figure 214B:
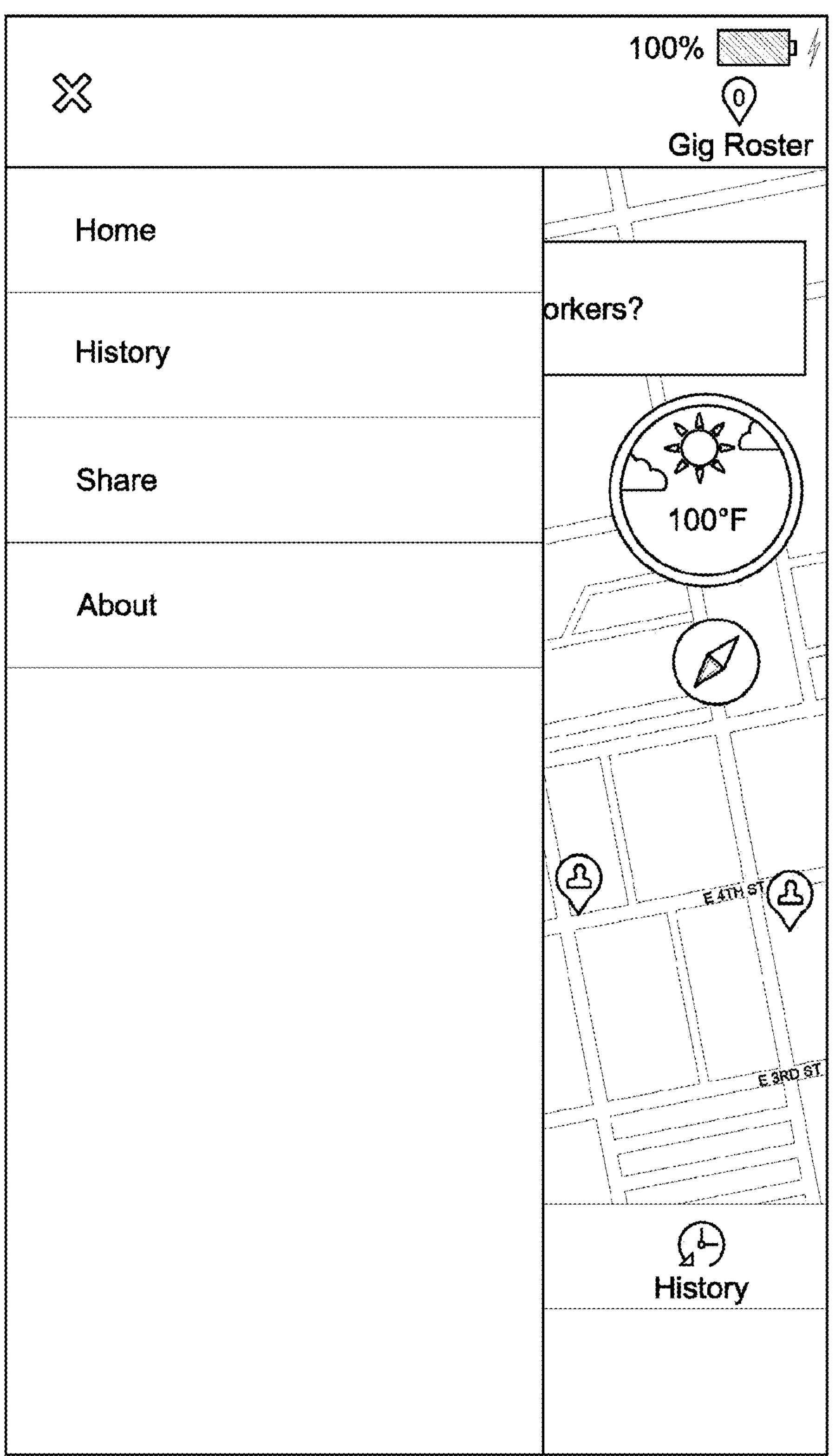
Figure 215:
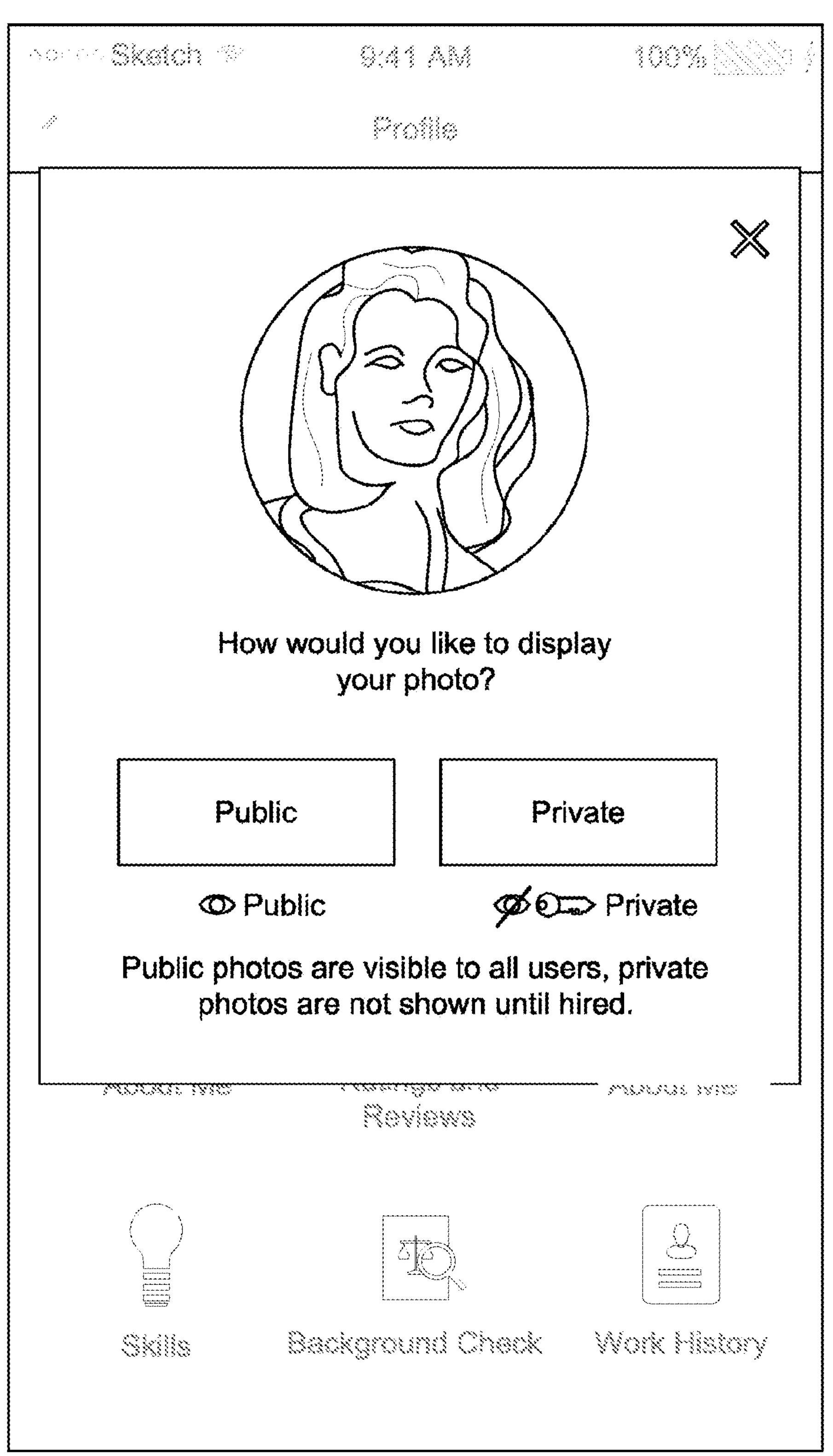
Figure 216A:
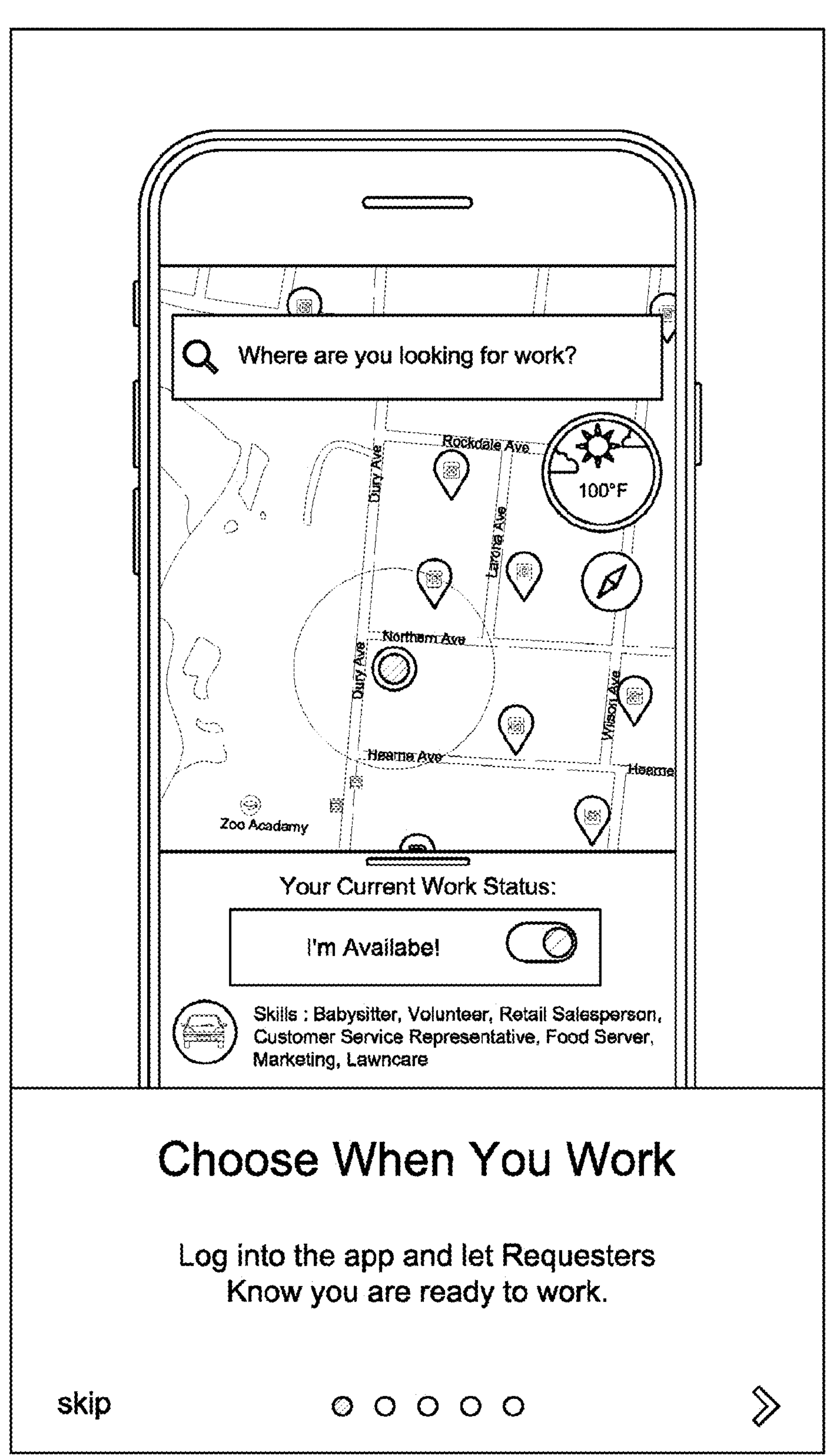
Figure 216B:
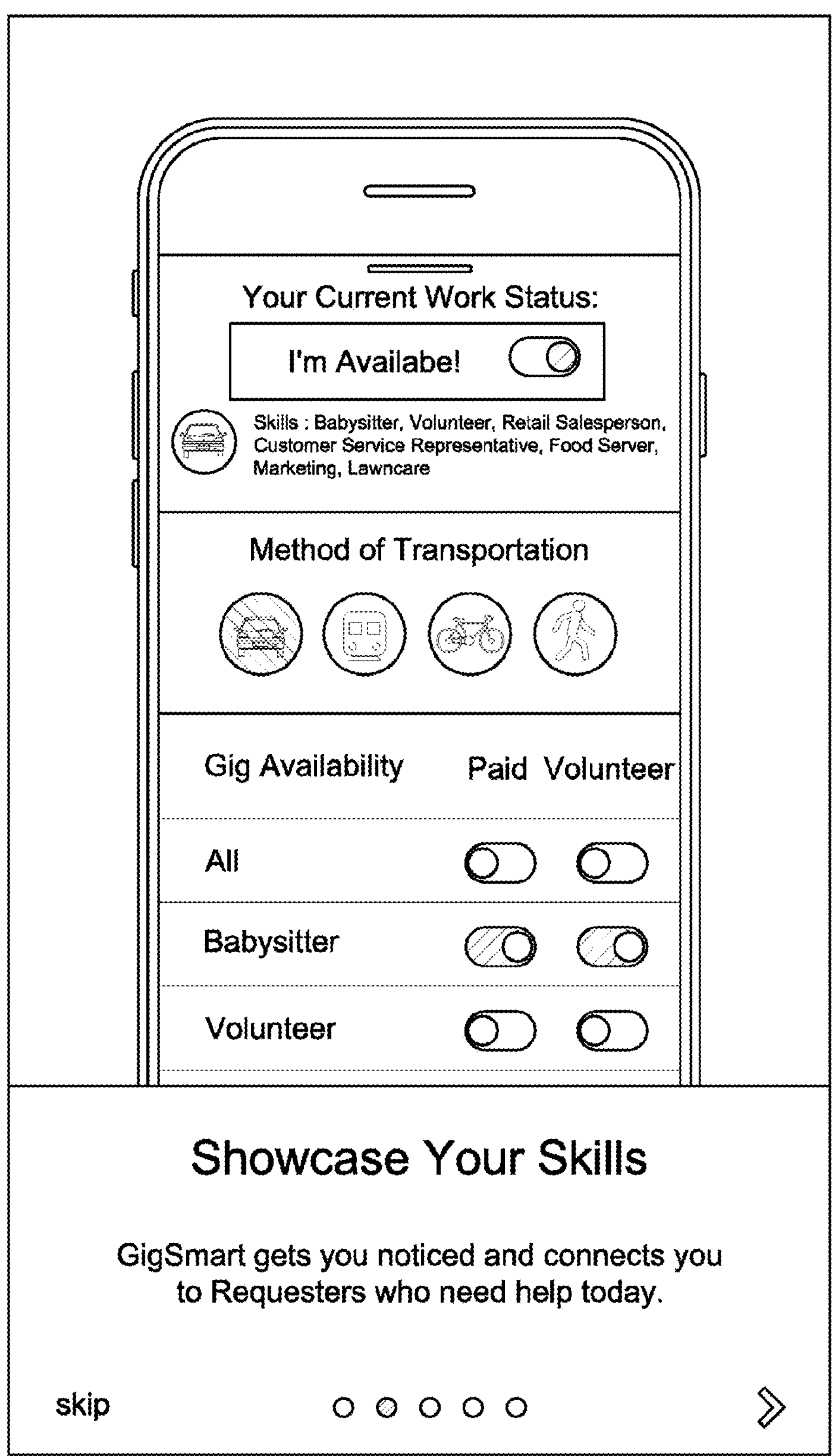
Figure 217A:
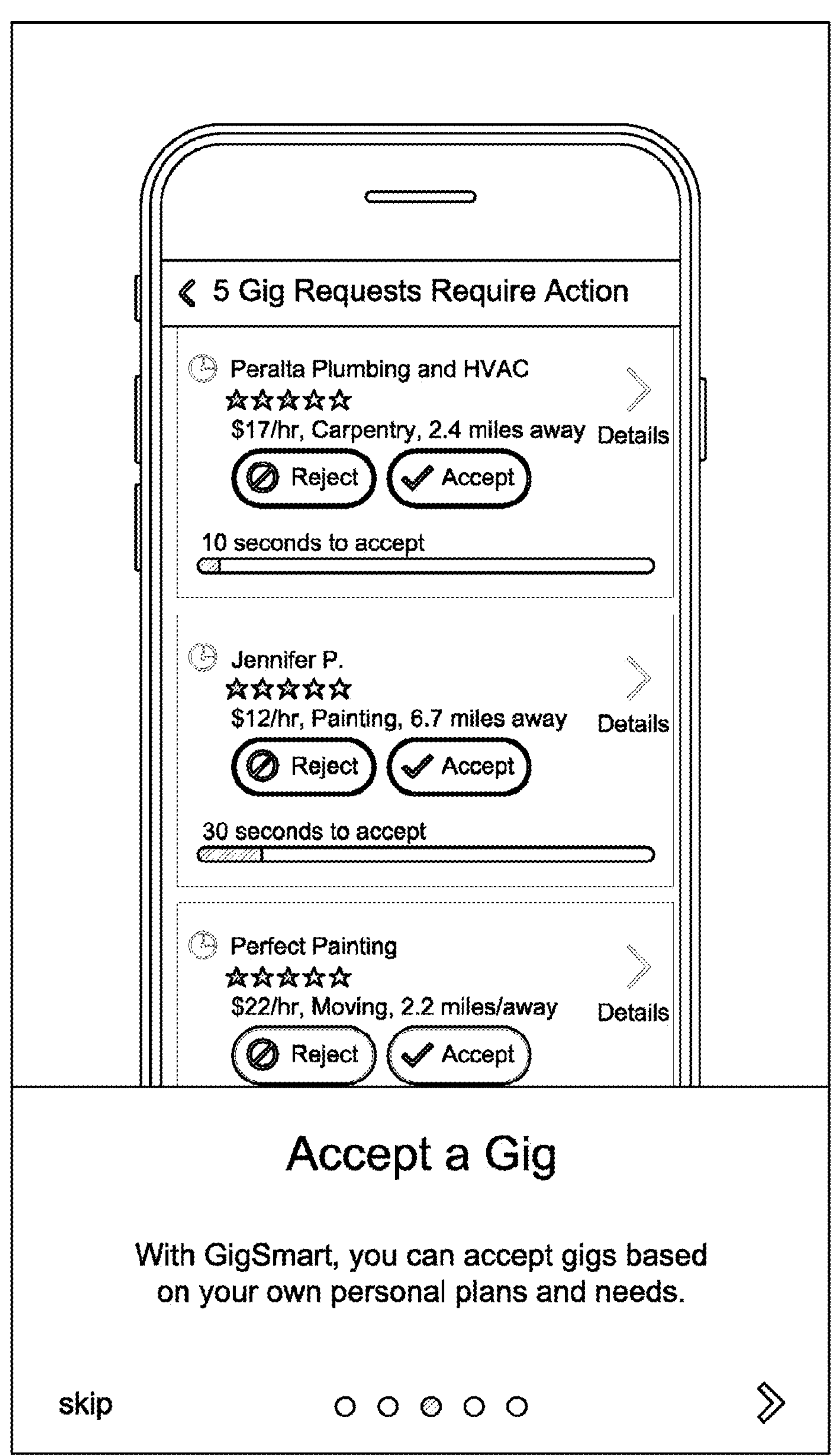
Figure 217B:
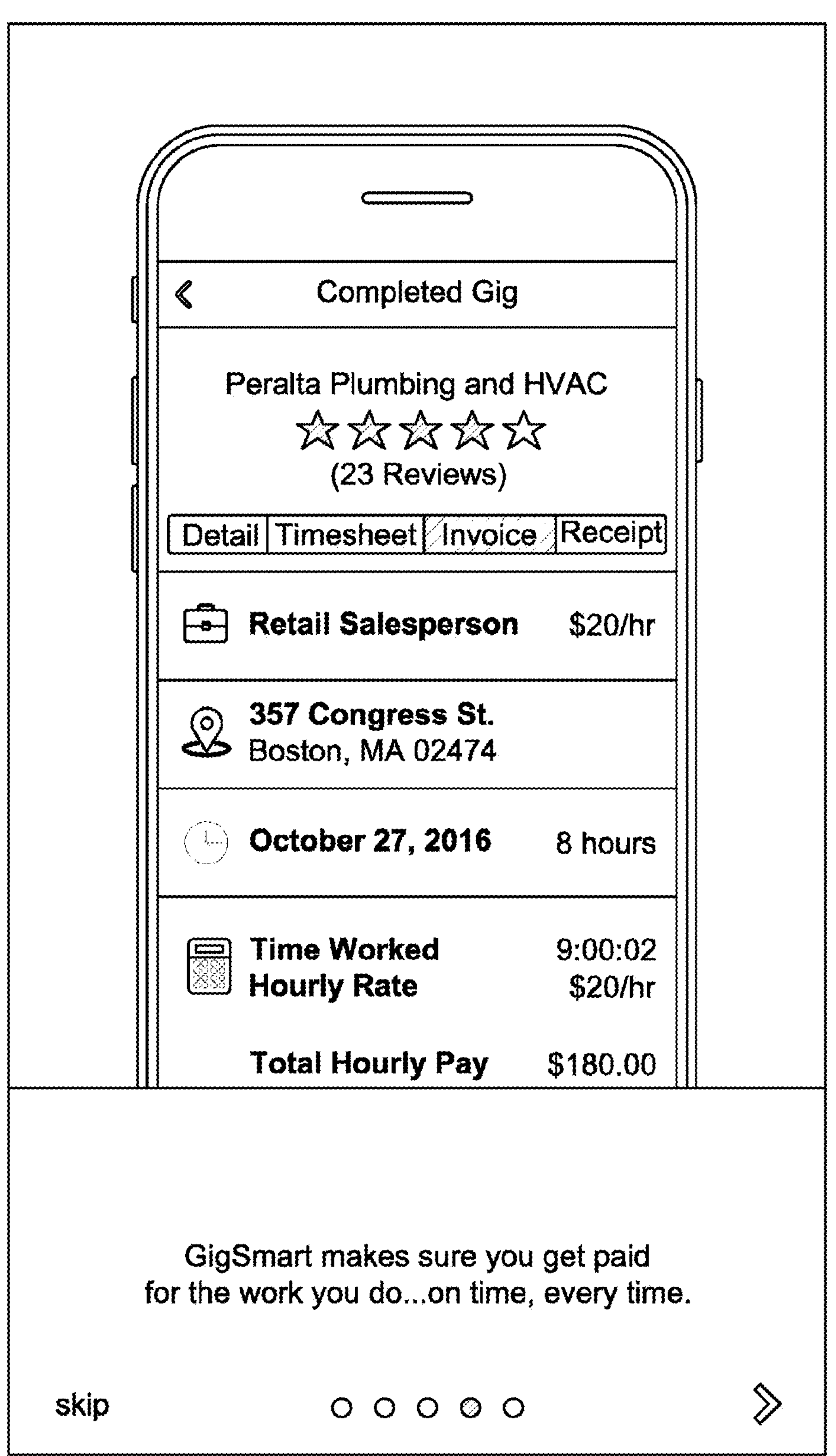
Figure 217C:
Figure 218:
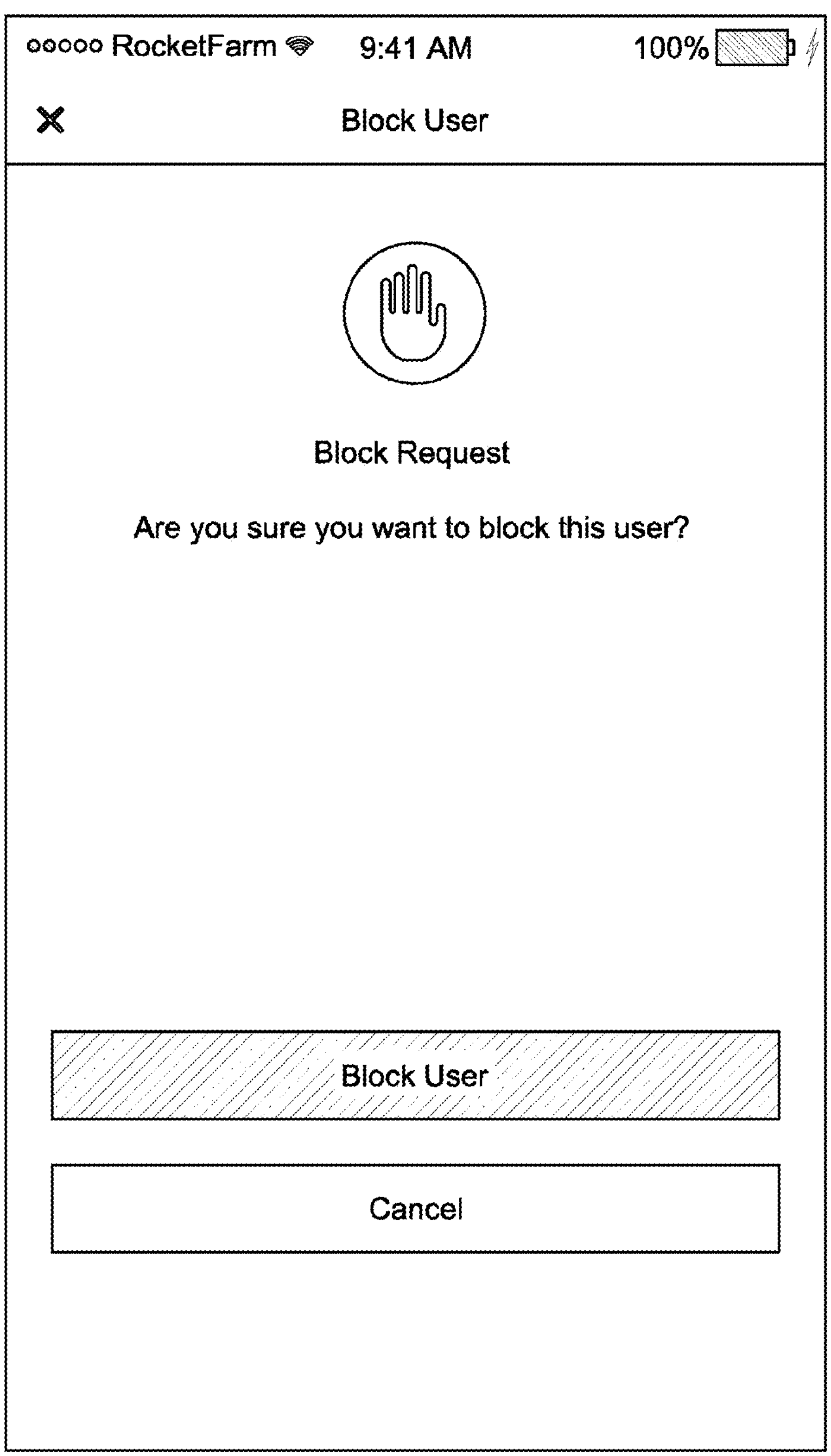
Figure 219A:
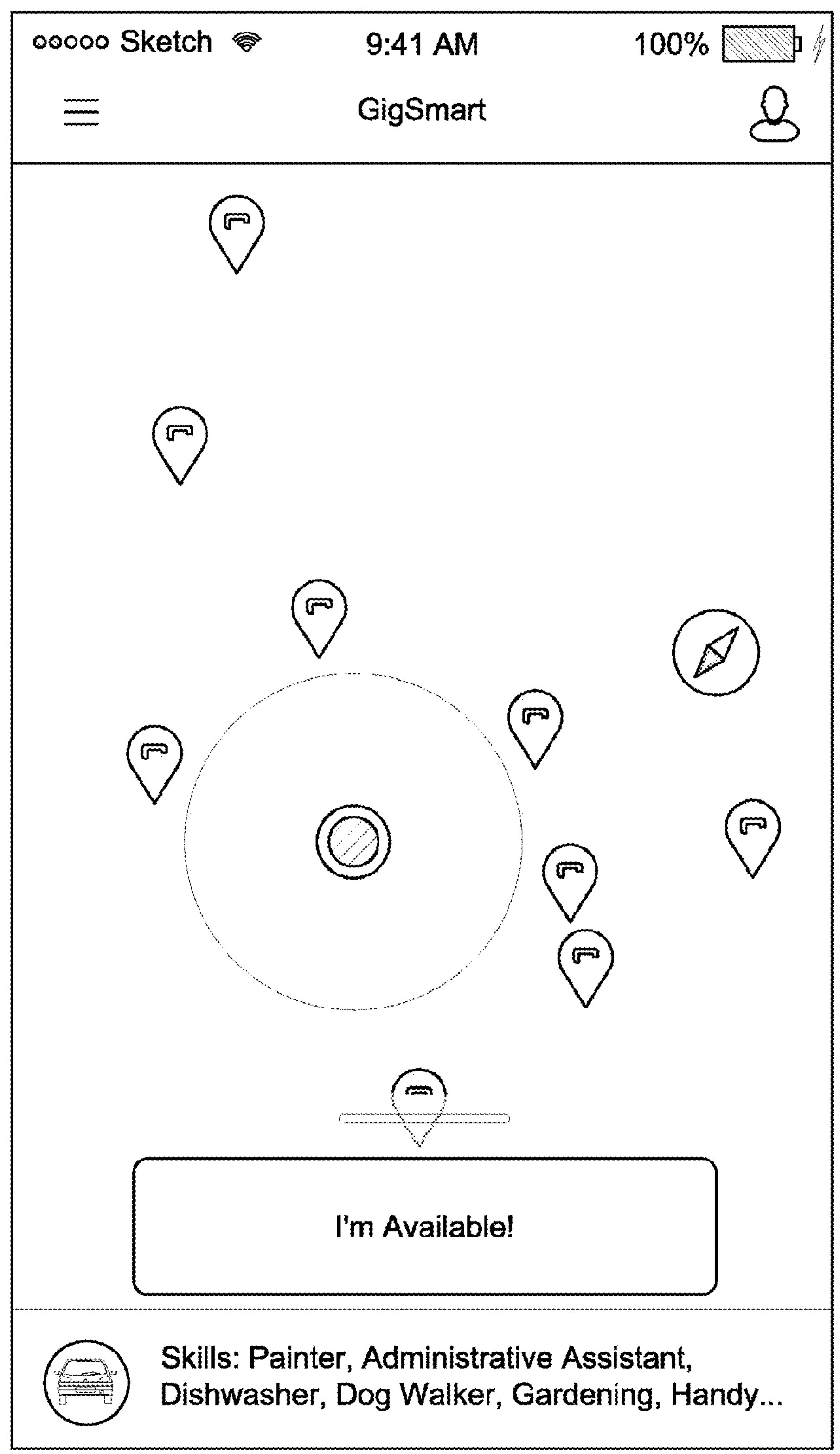
Figure 219B:
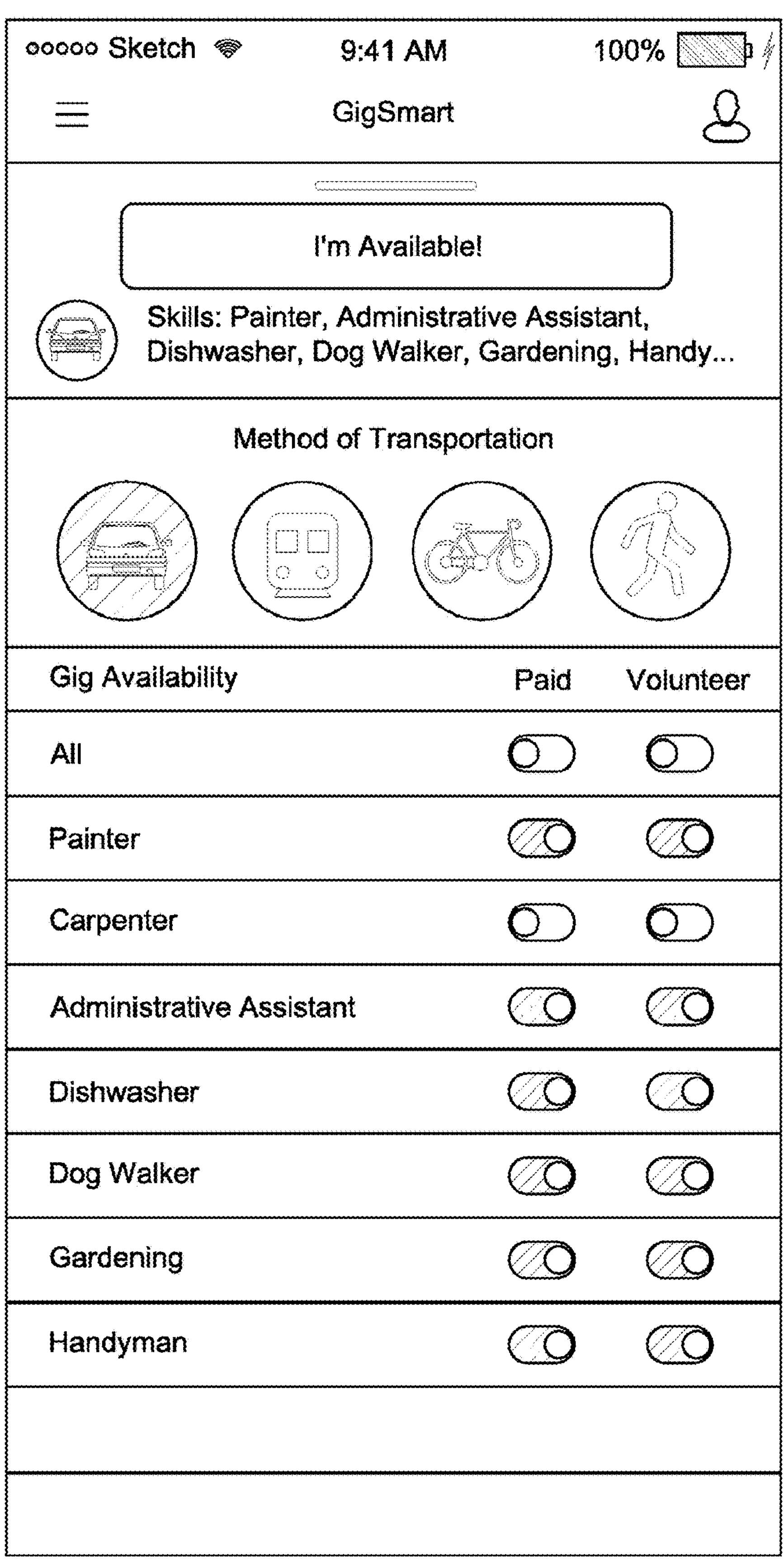
Figure 220:
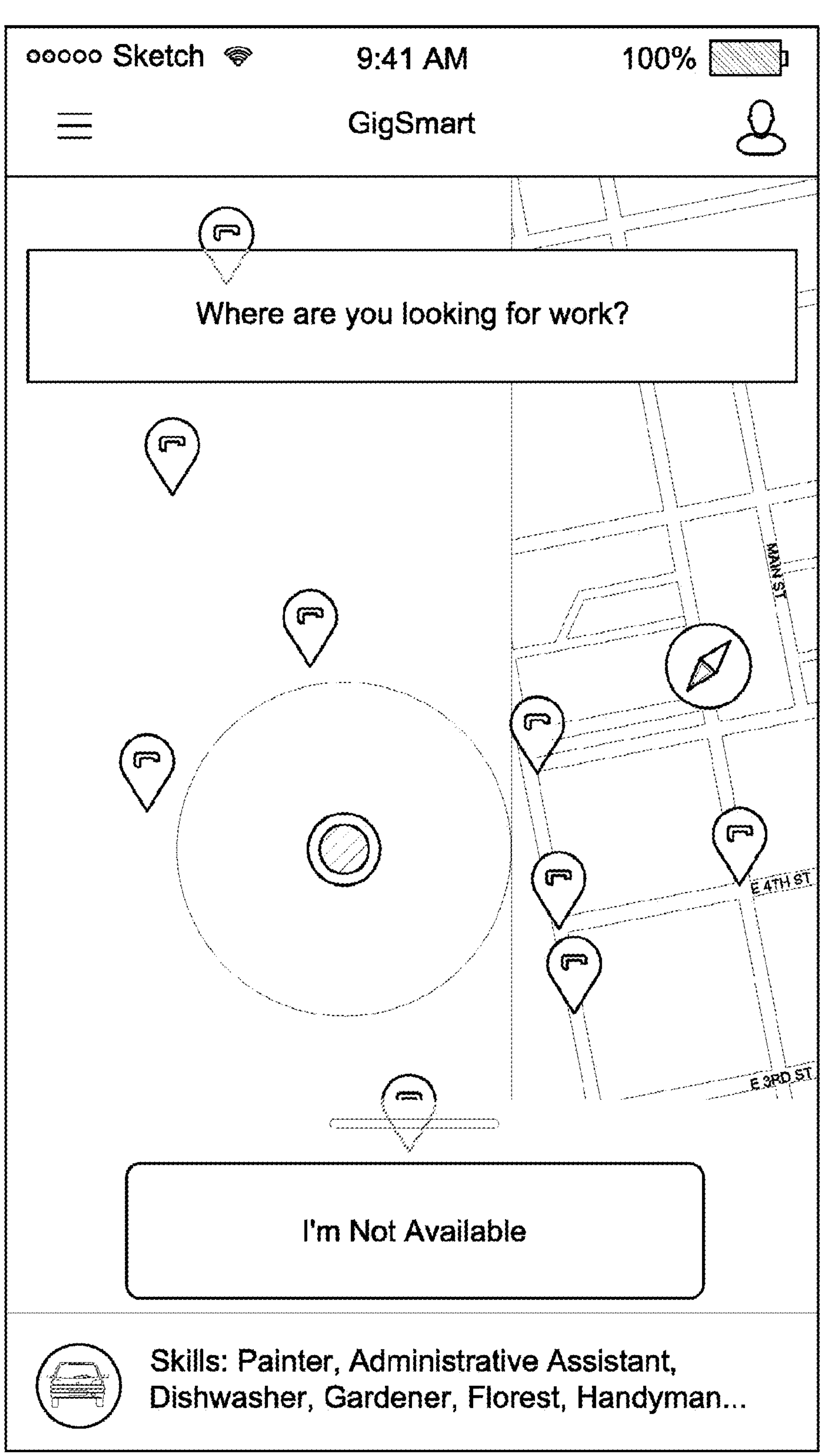
Figure 221A:
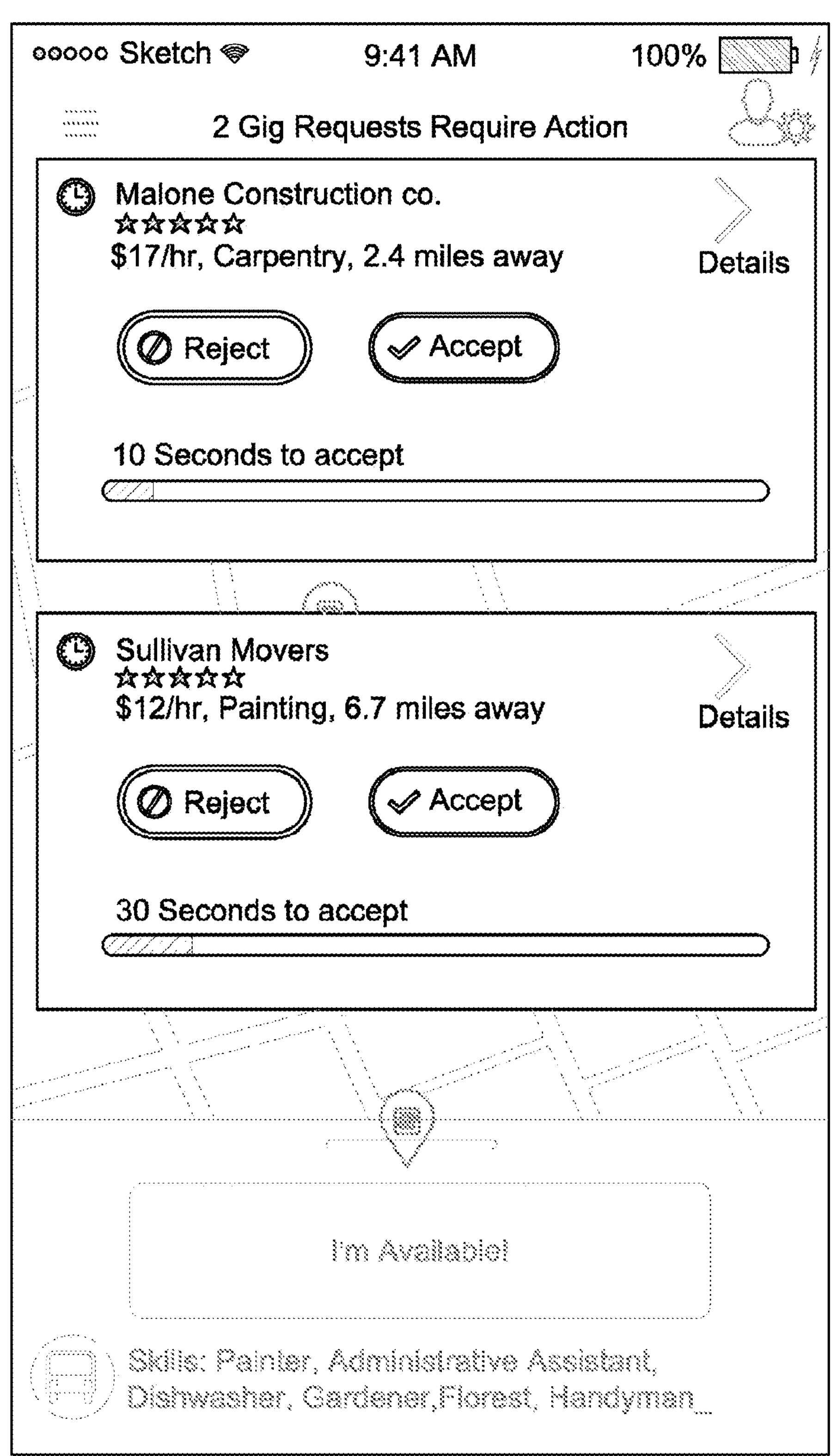
Figure 221B:
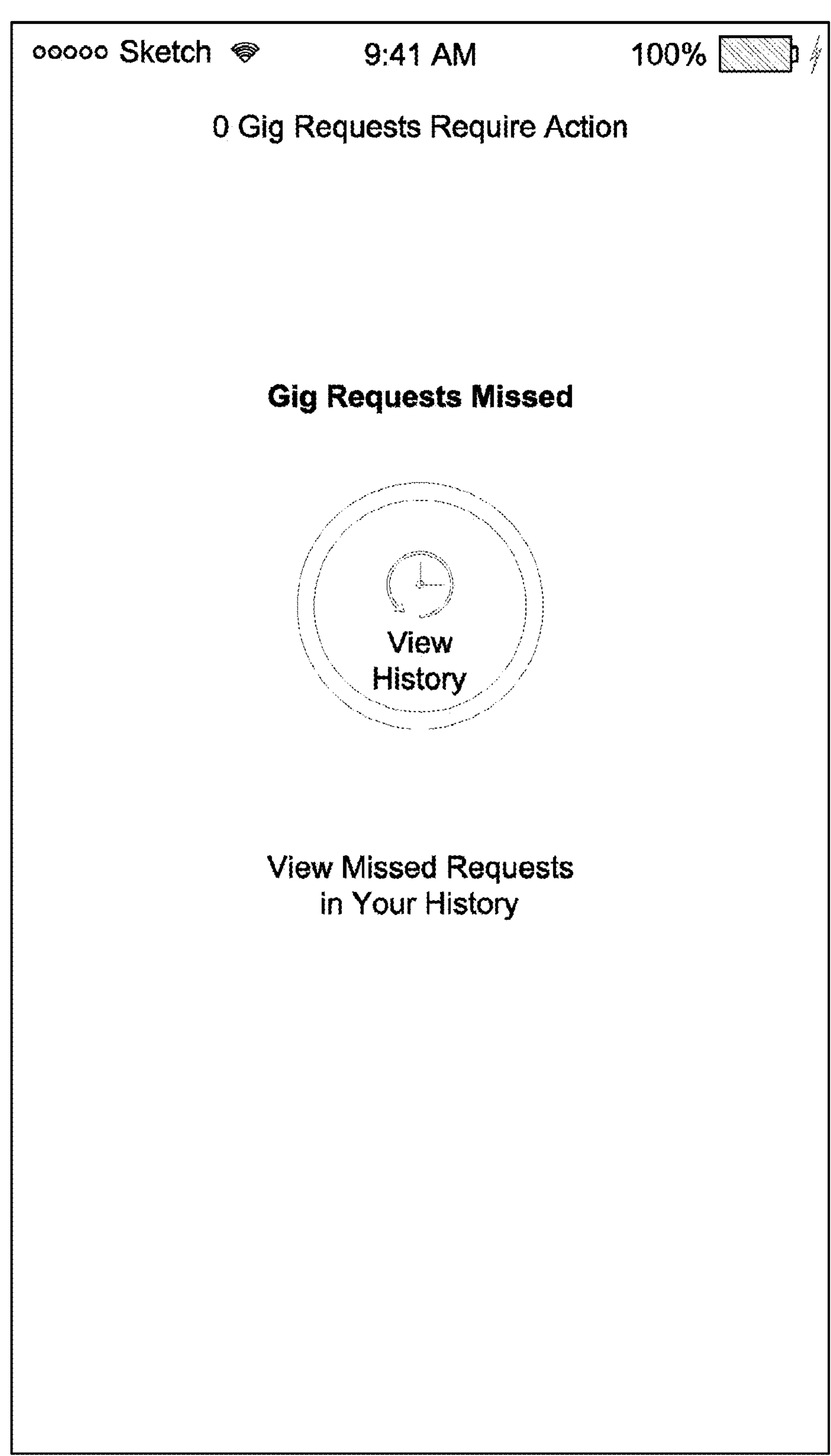
Figure 222:
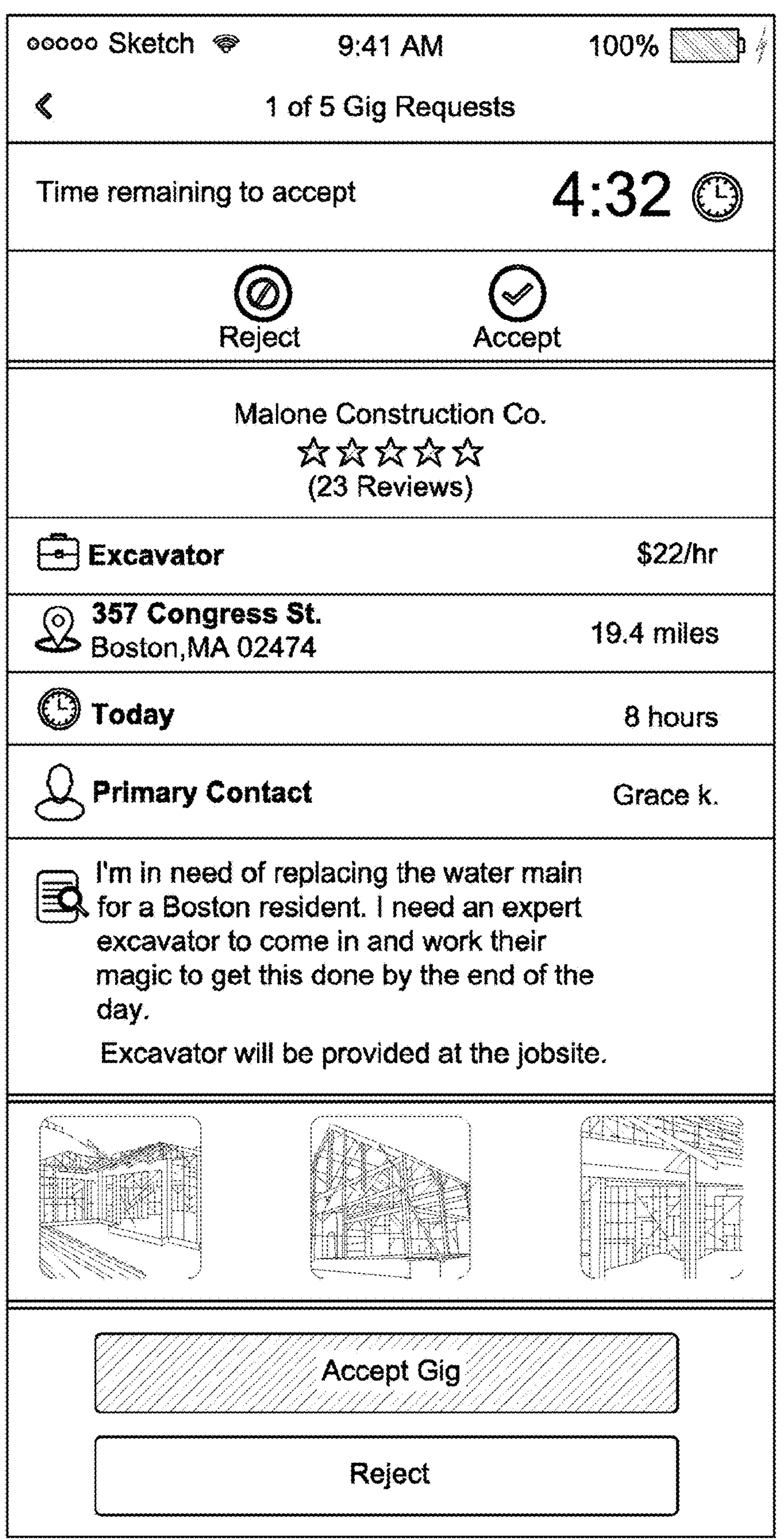
Figure 223:
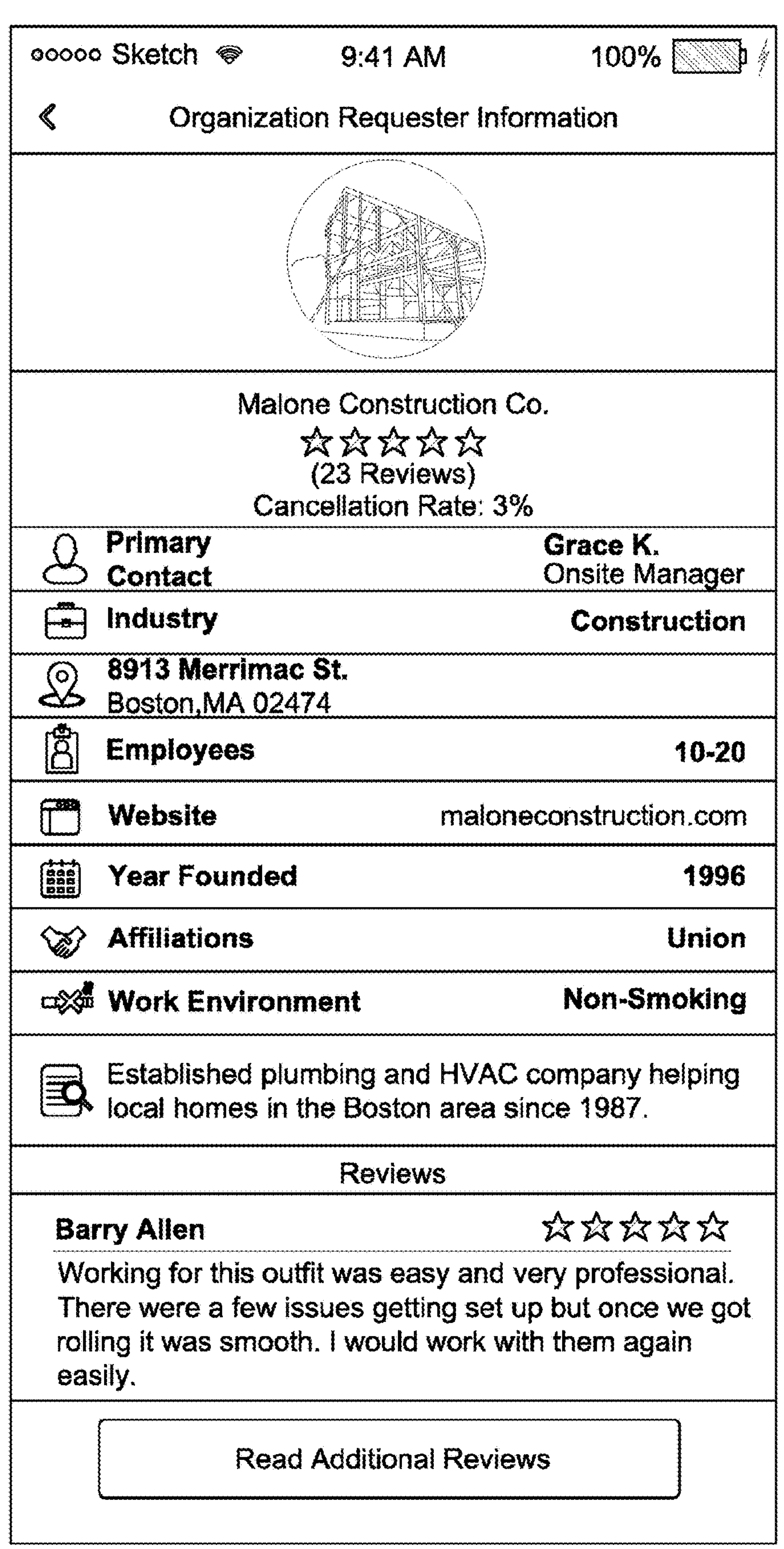
Figure 224:
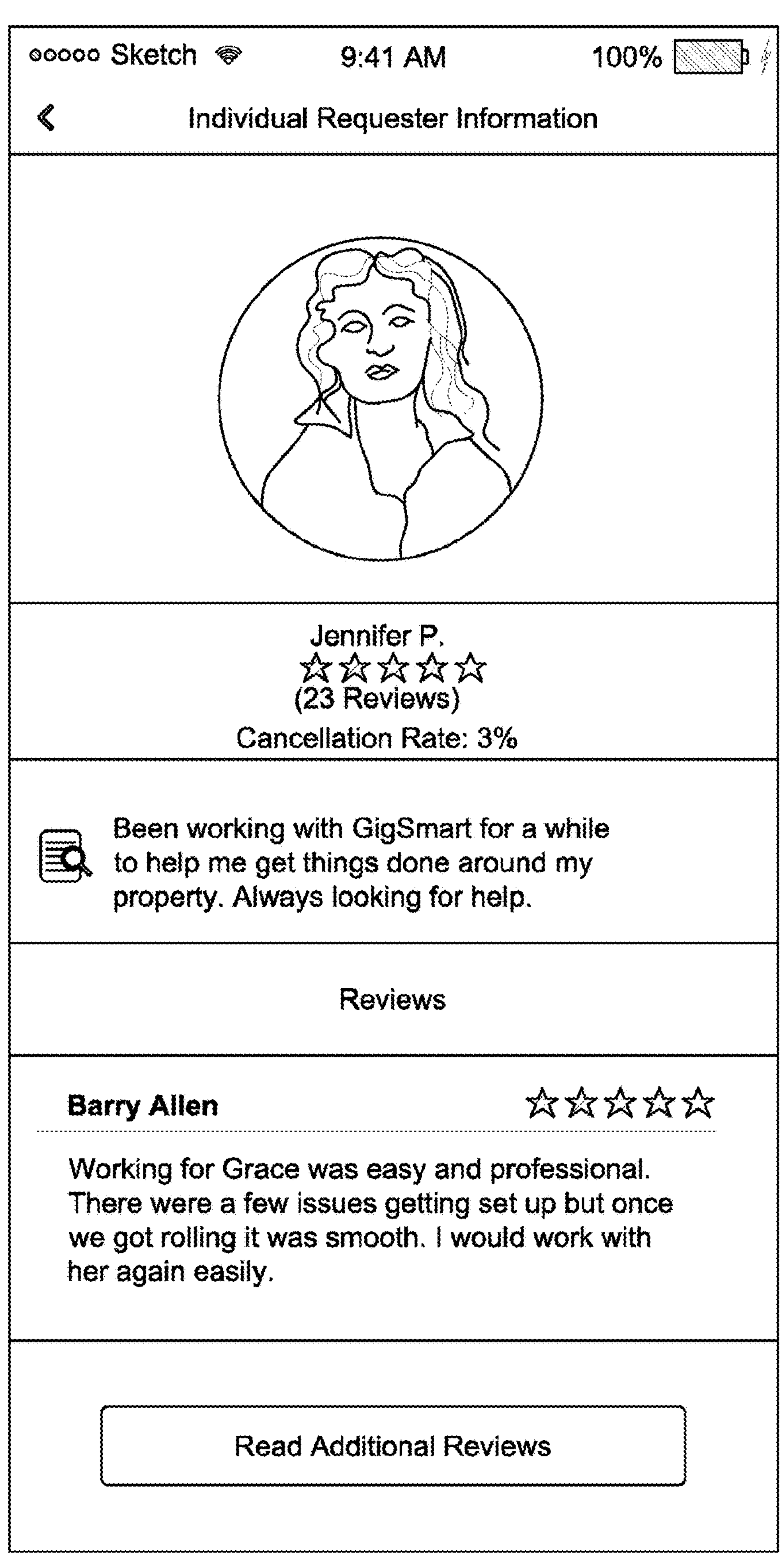
Figure 225:
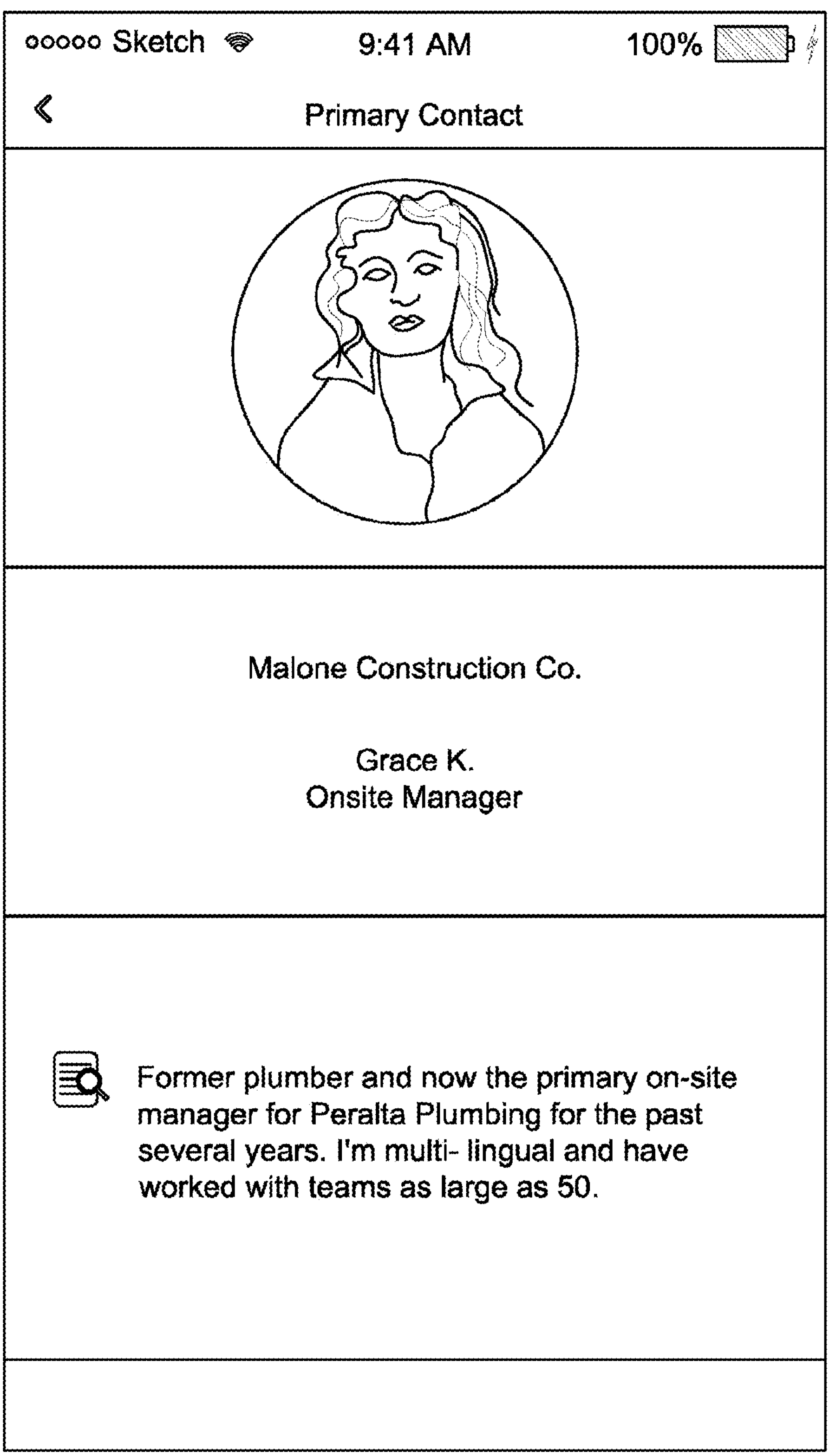
Figure 226:
Figure 227A:
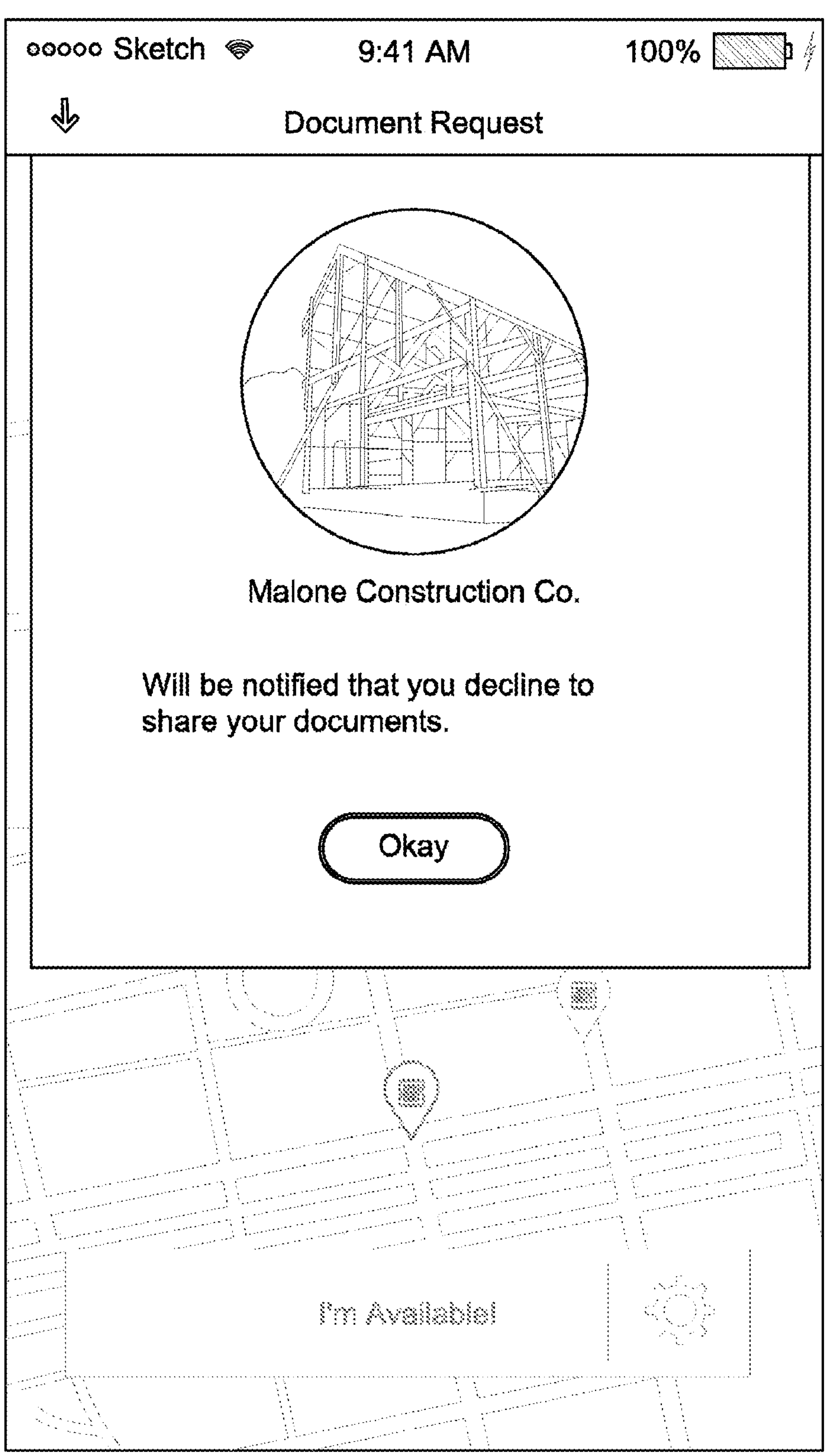
Figure 227B:
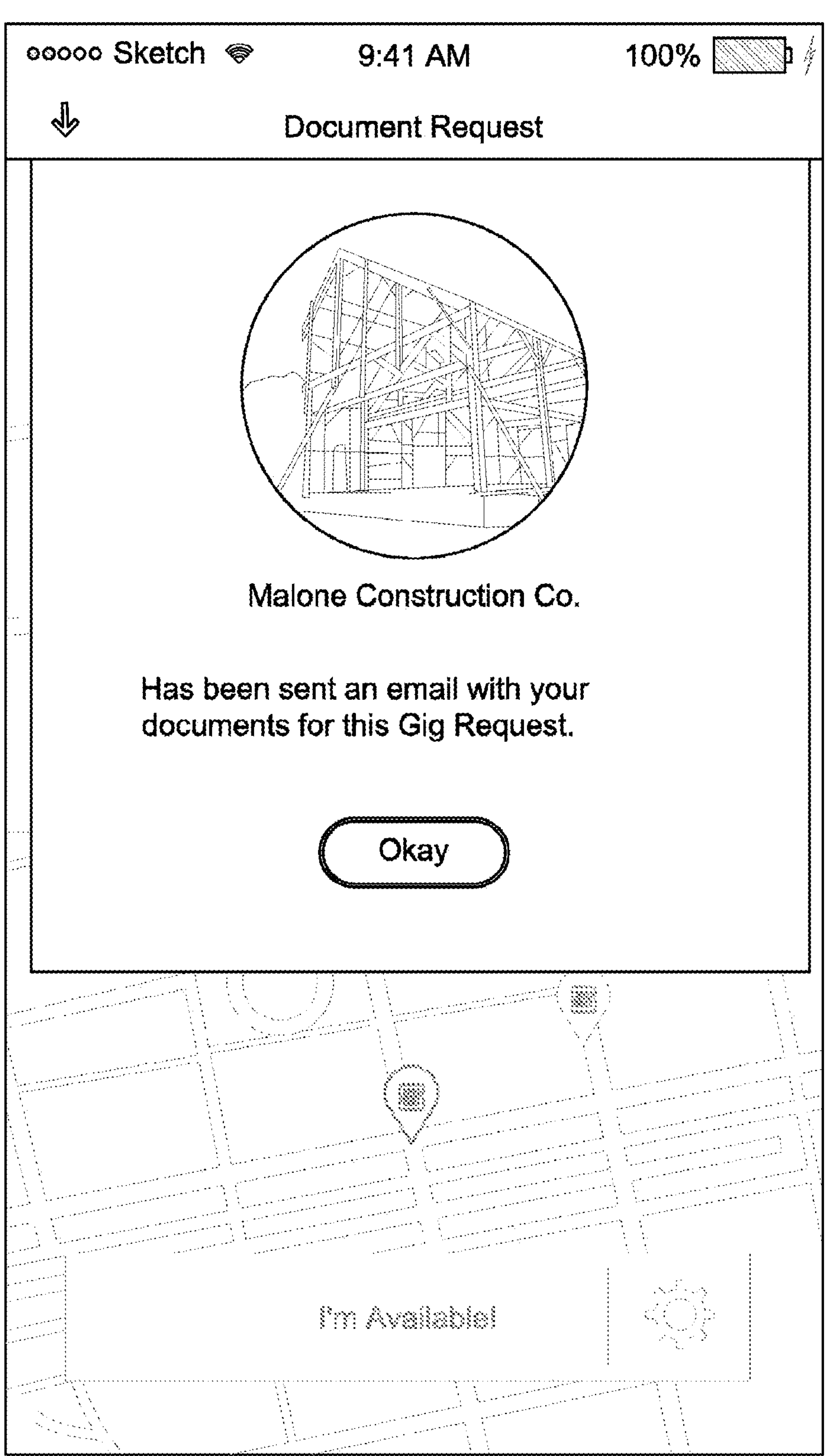
Figure 228:
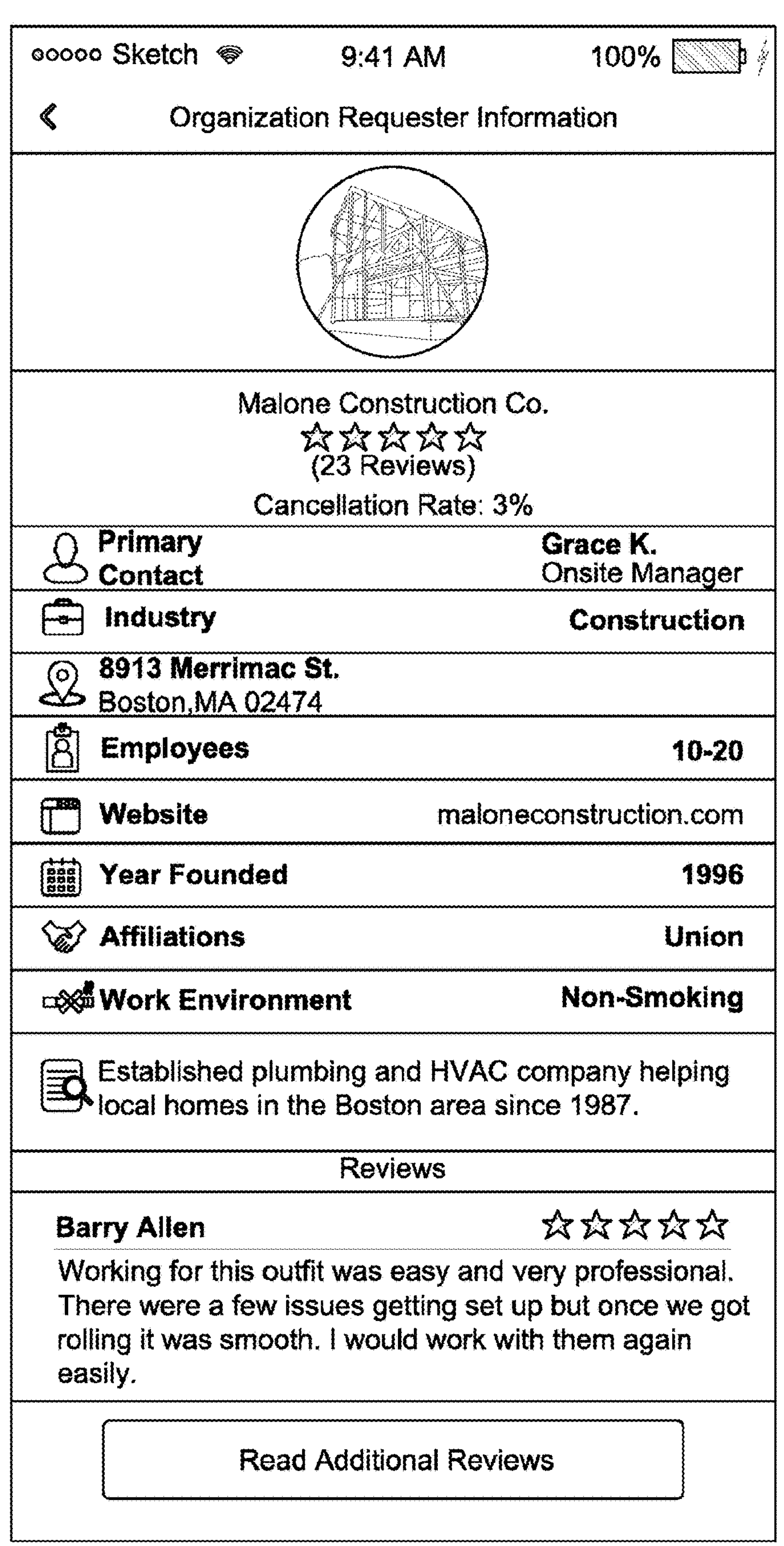
Figure 229:
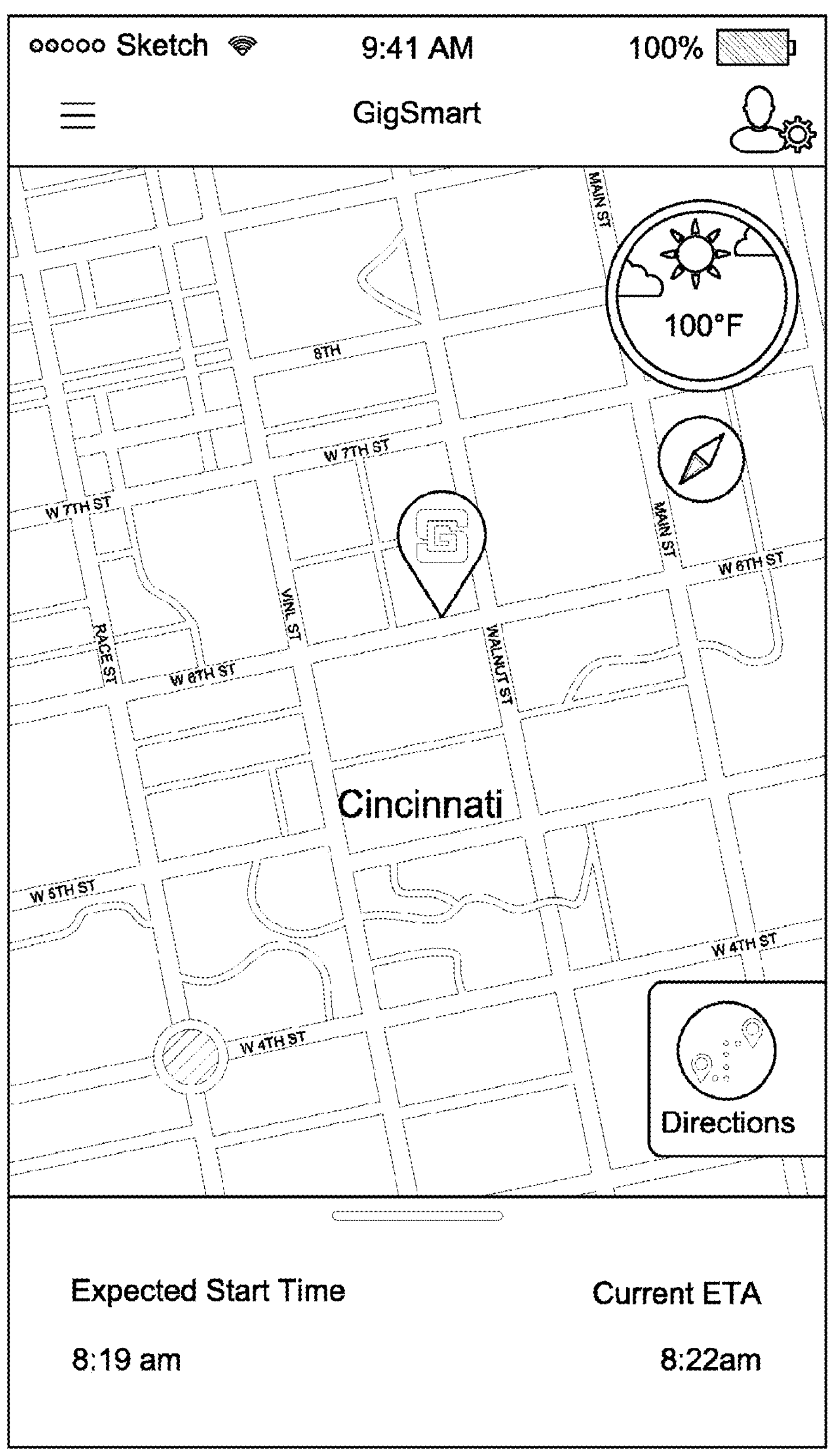
Figure 230A:
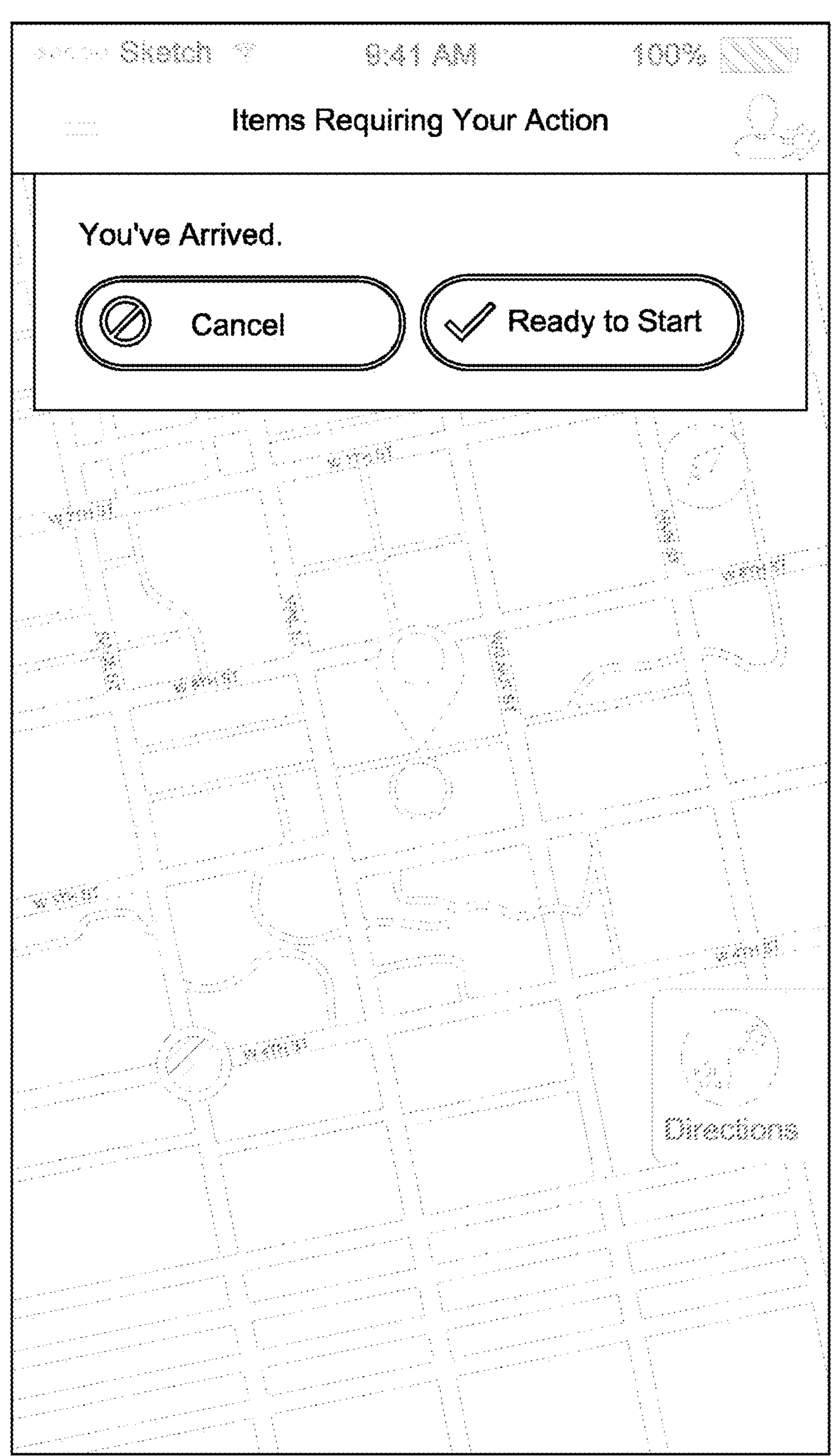
Figure 230B:
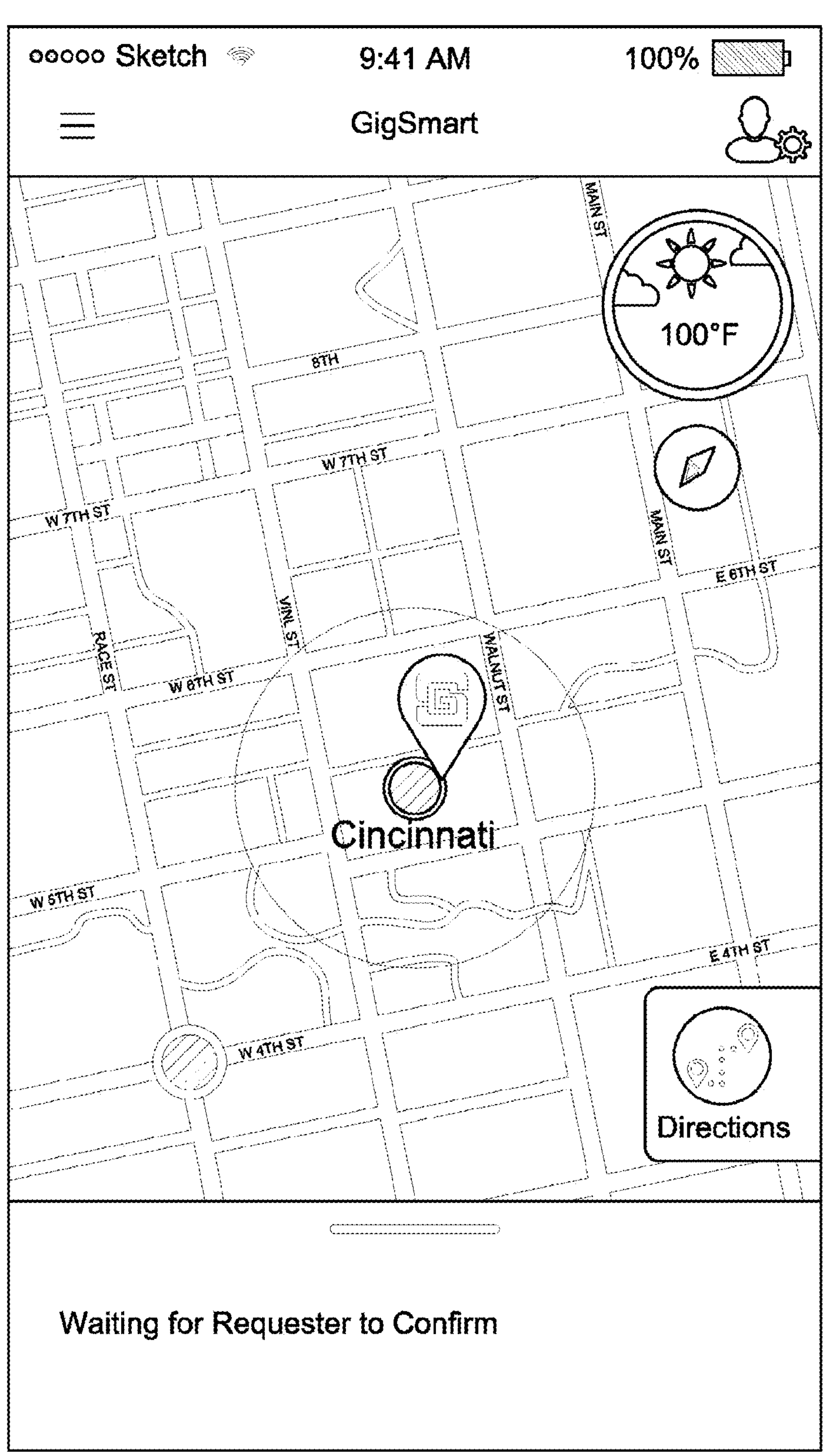
Figure 231A:
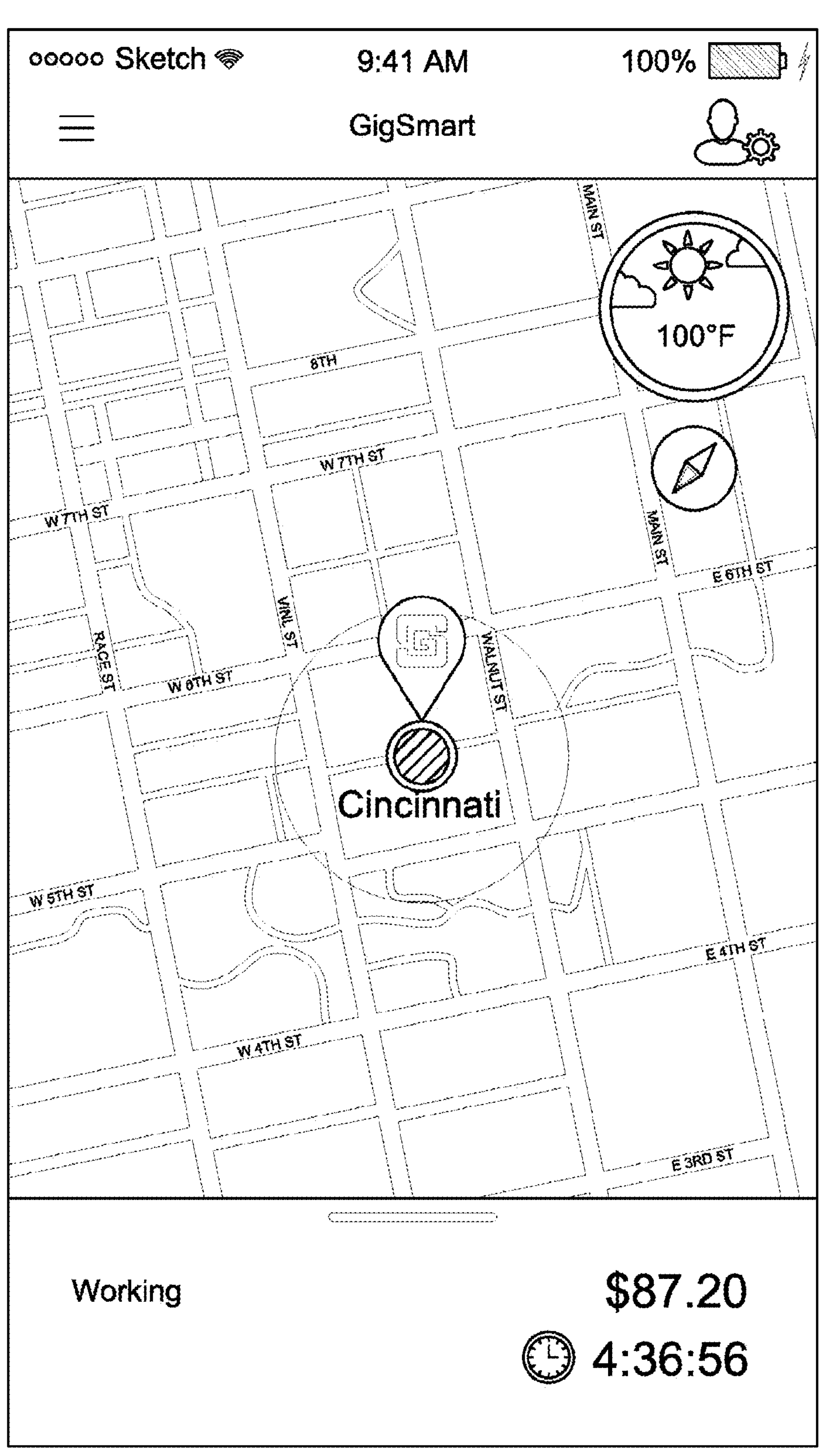
Figure 231B:
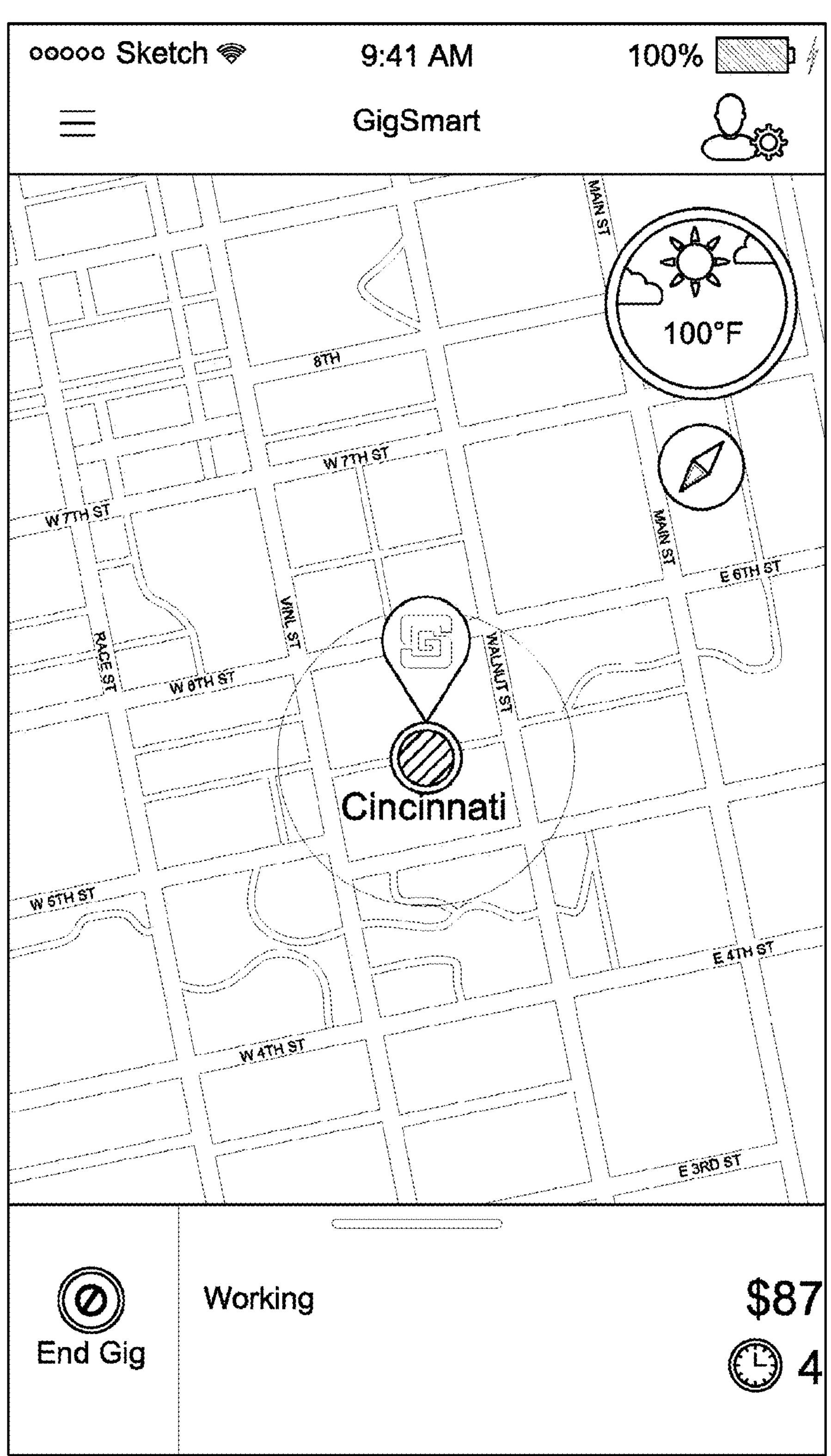
Figure 231C:
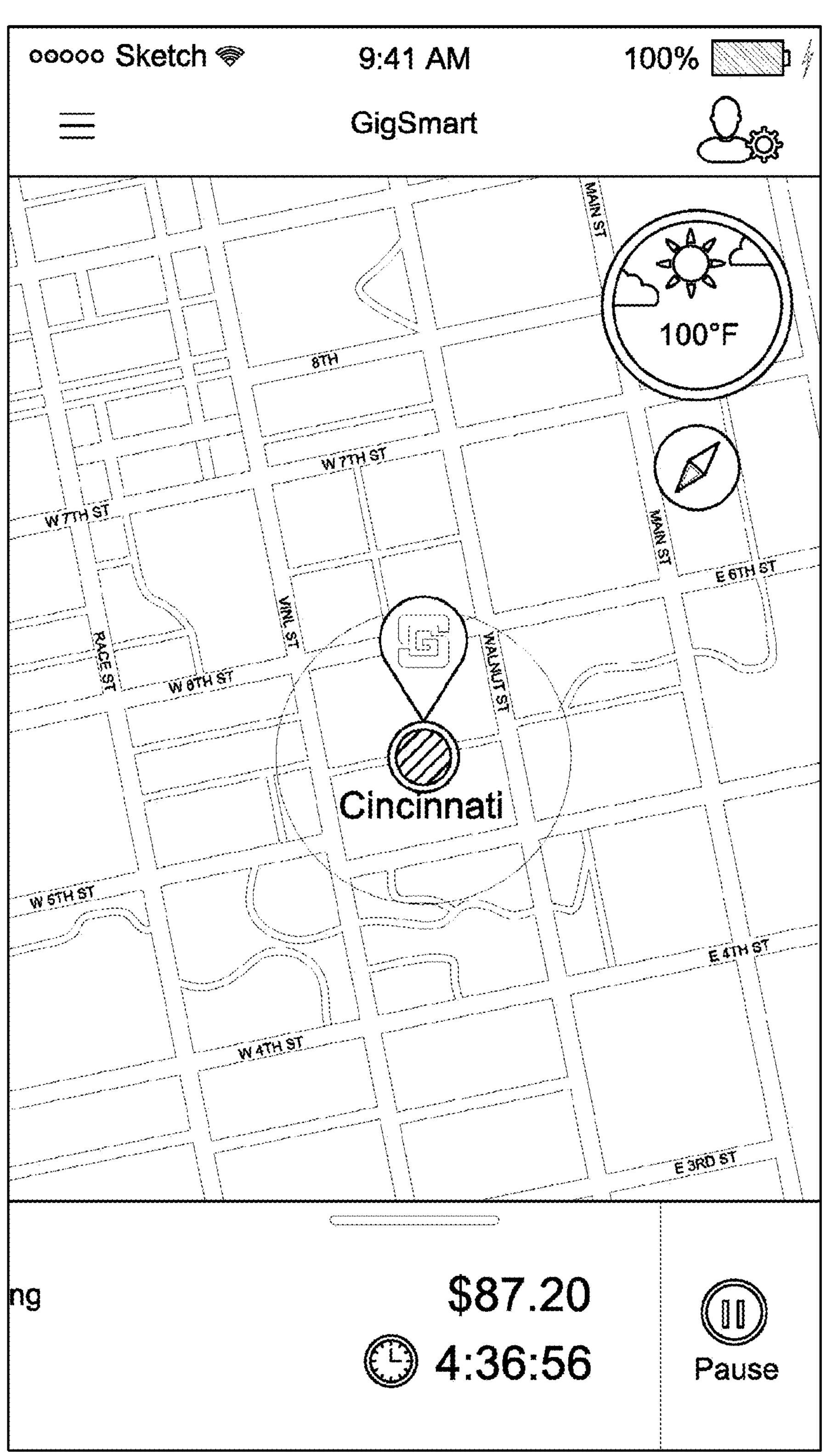
Figure 232A:
Figure 236:
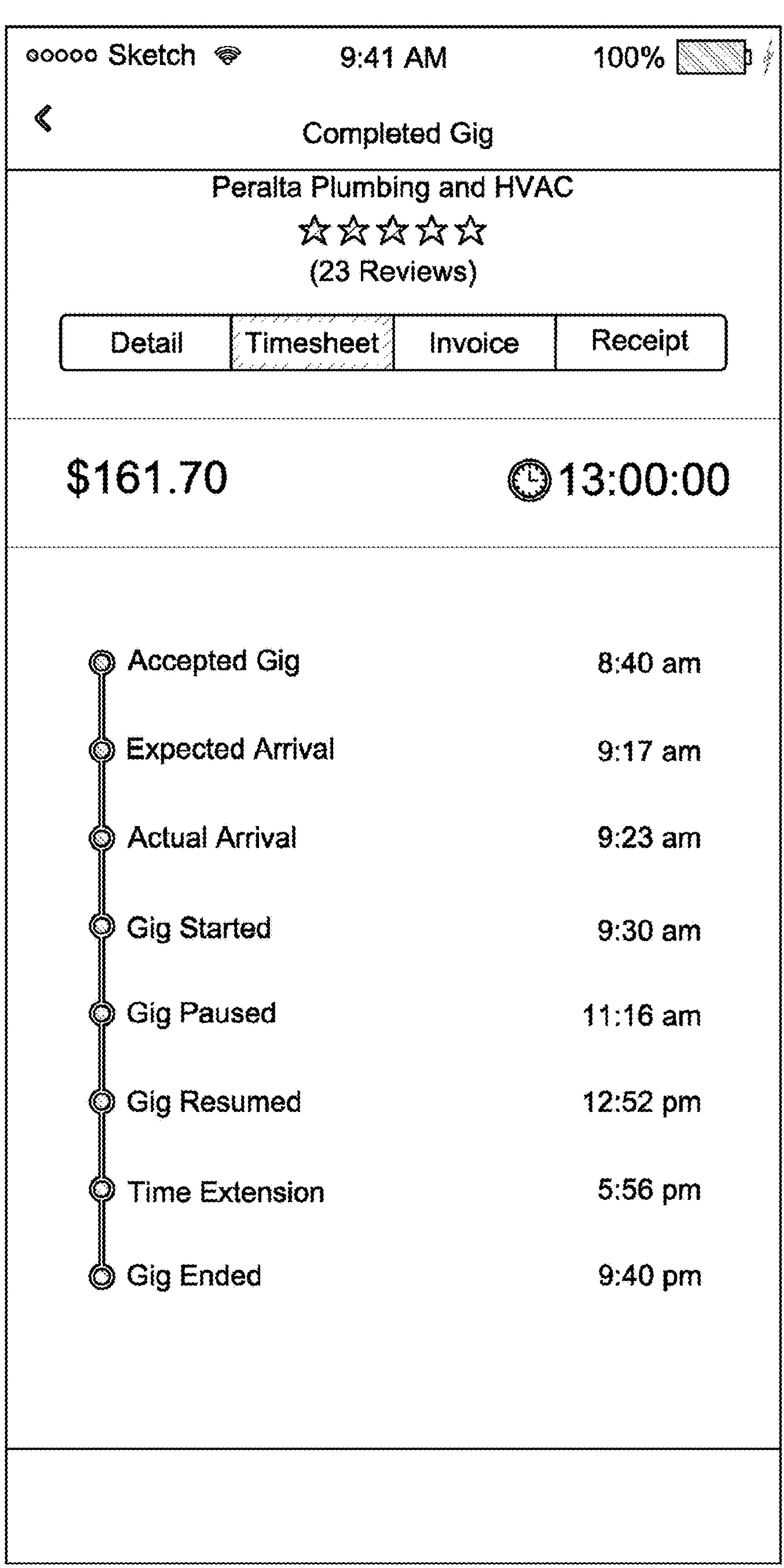
Figure 238:
Figure 240:
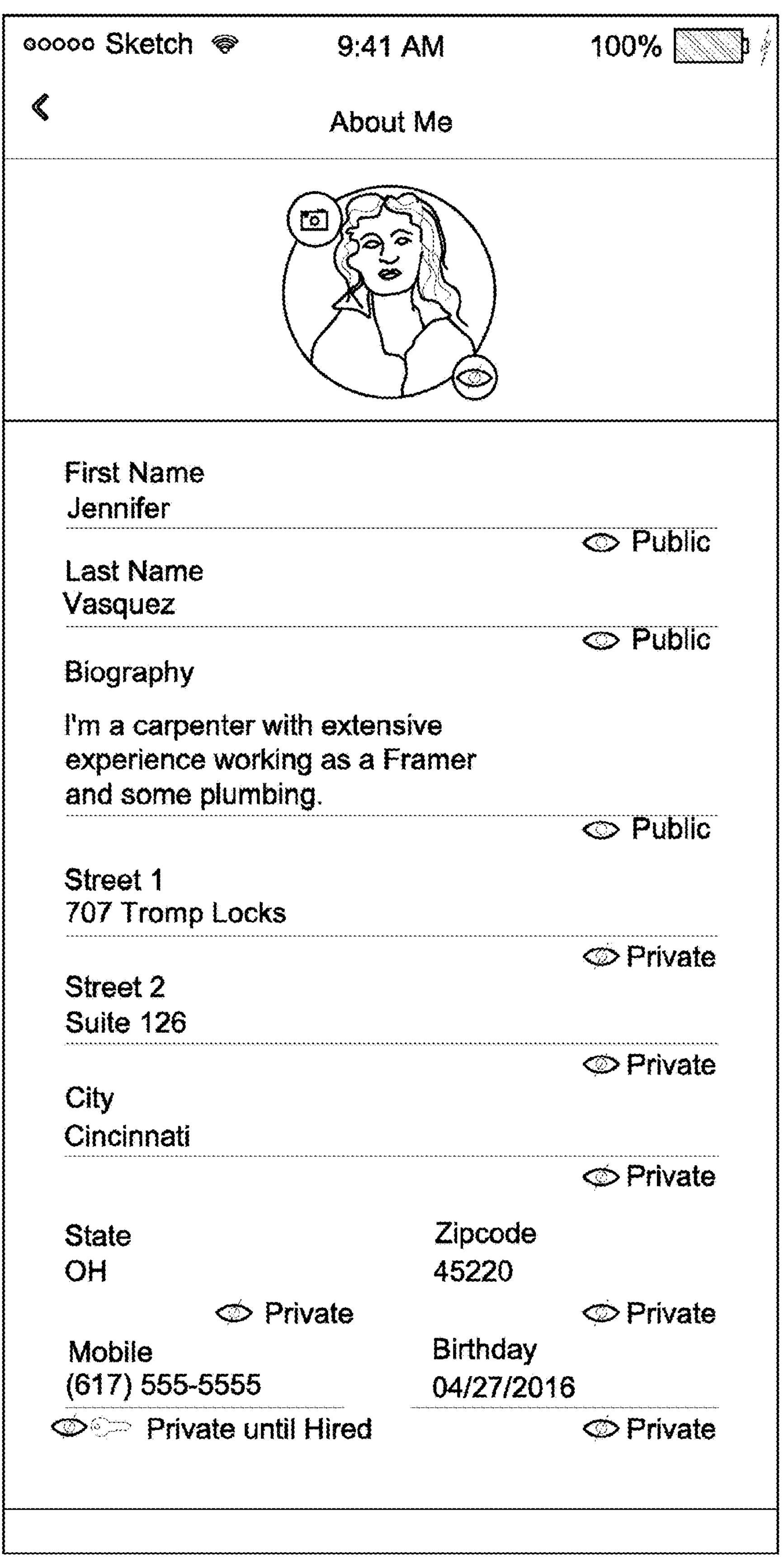
Figure 241A:
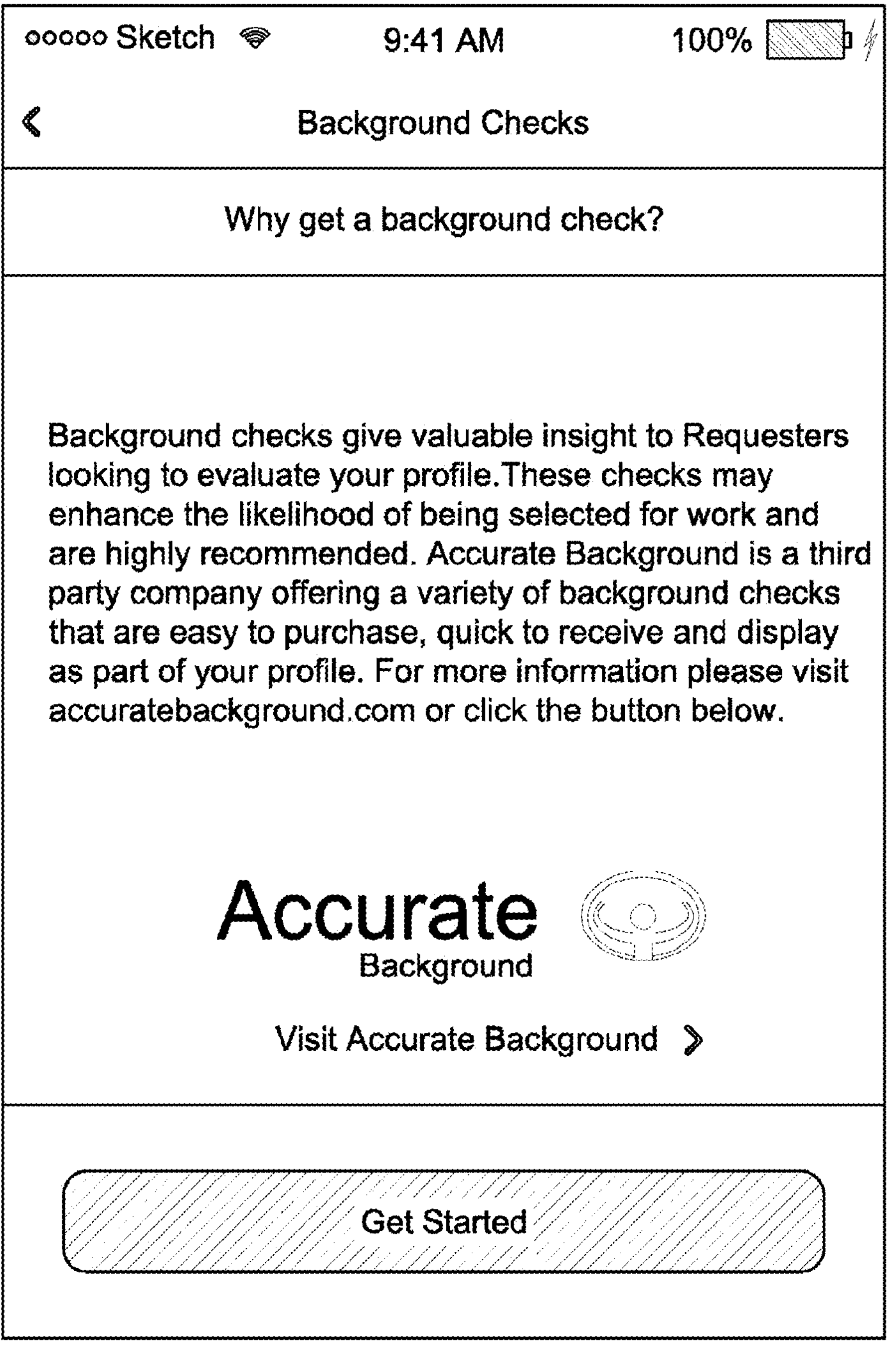
Figure 241E:
Figure 241F:
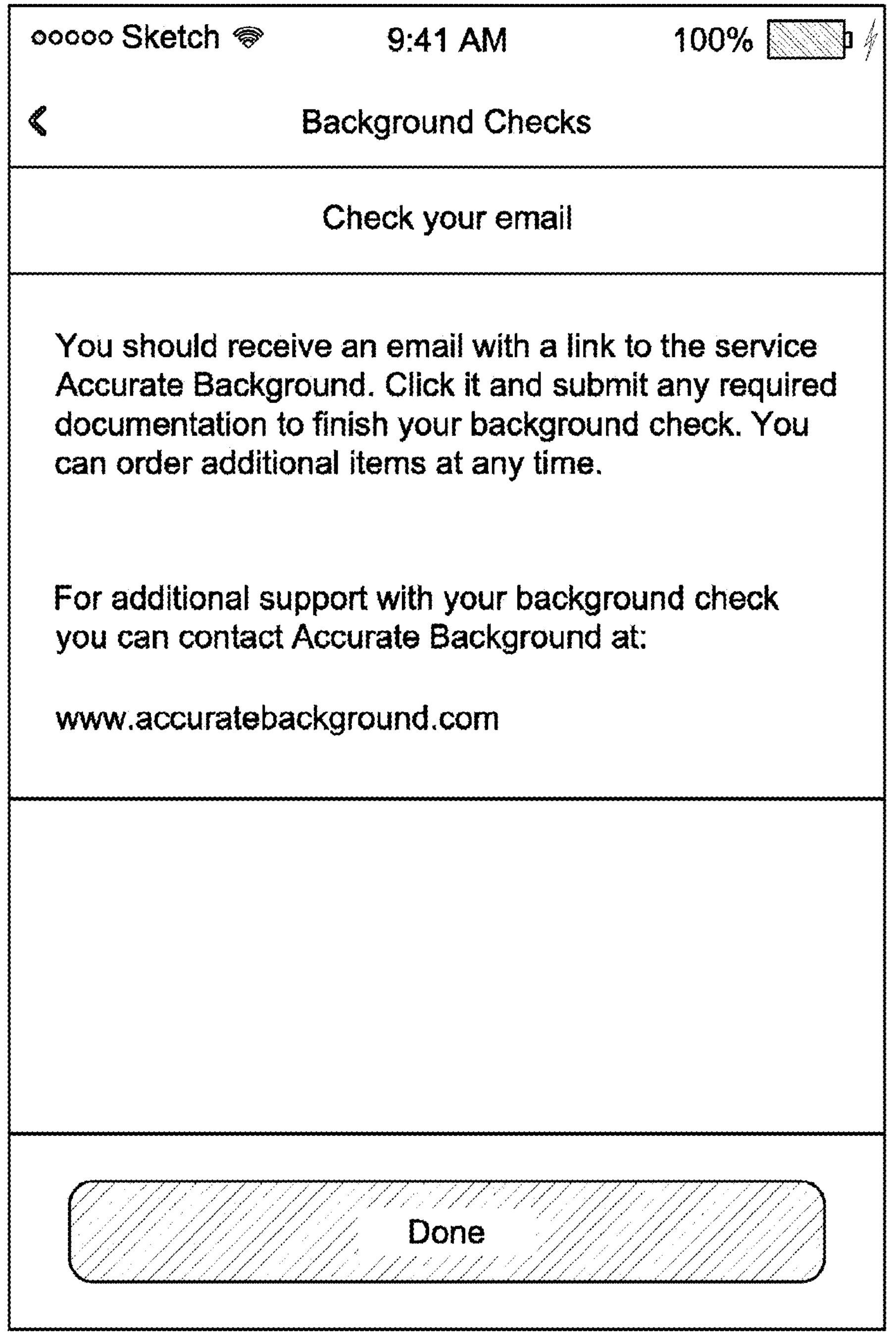
Figure 242A:
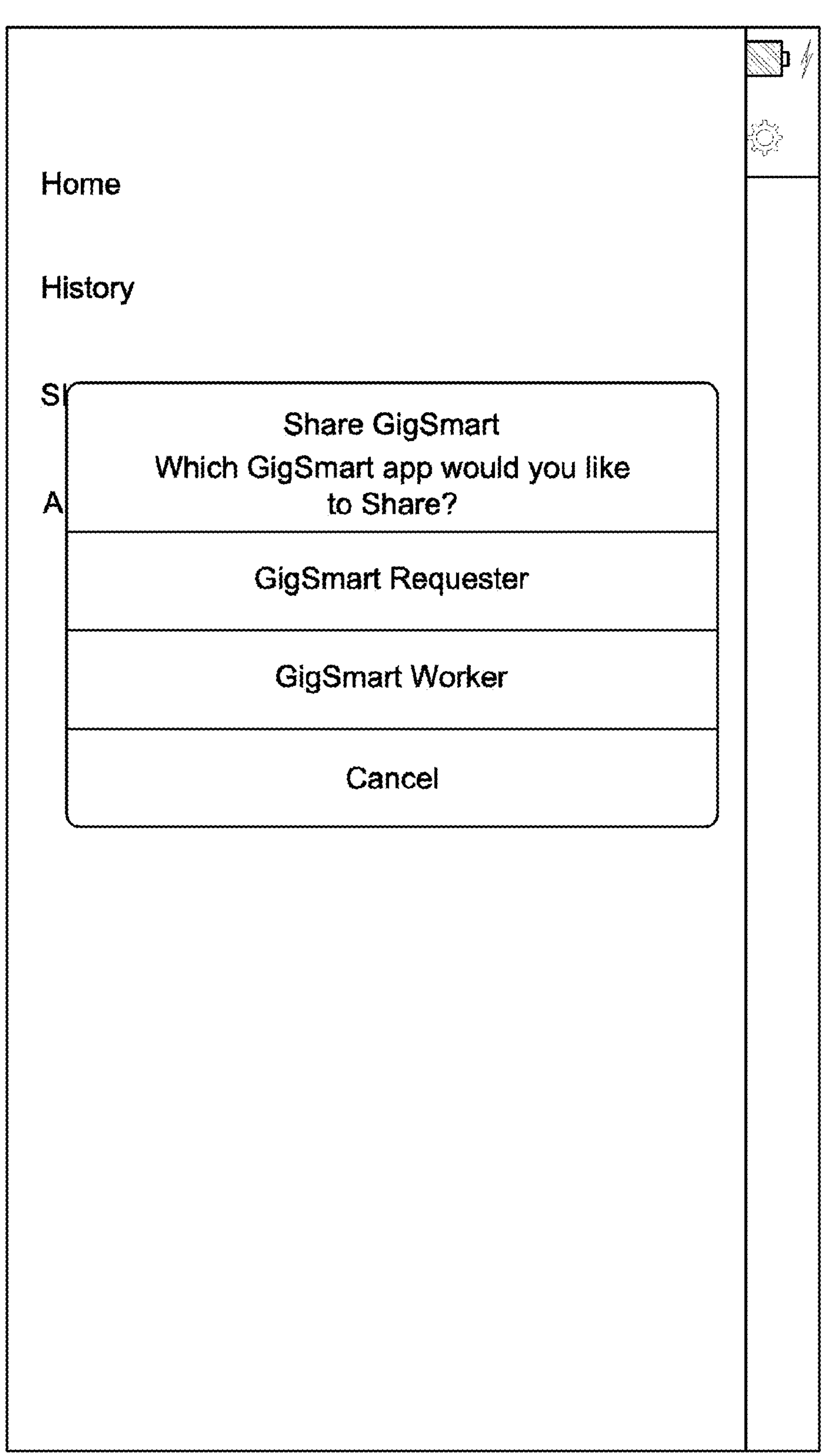
Figure 242B:
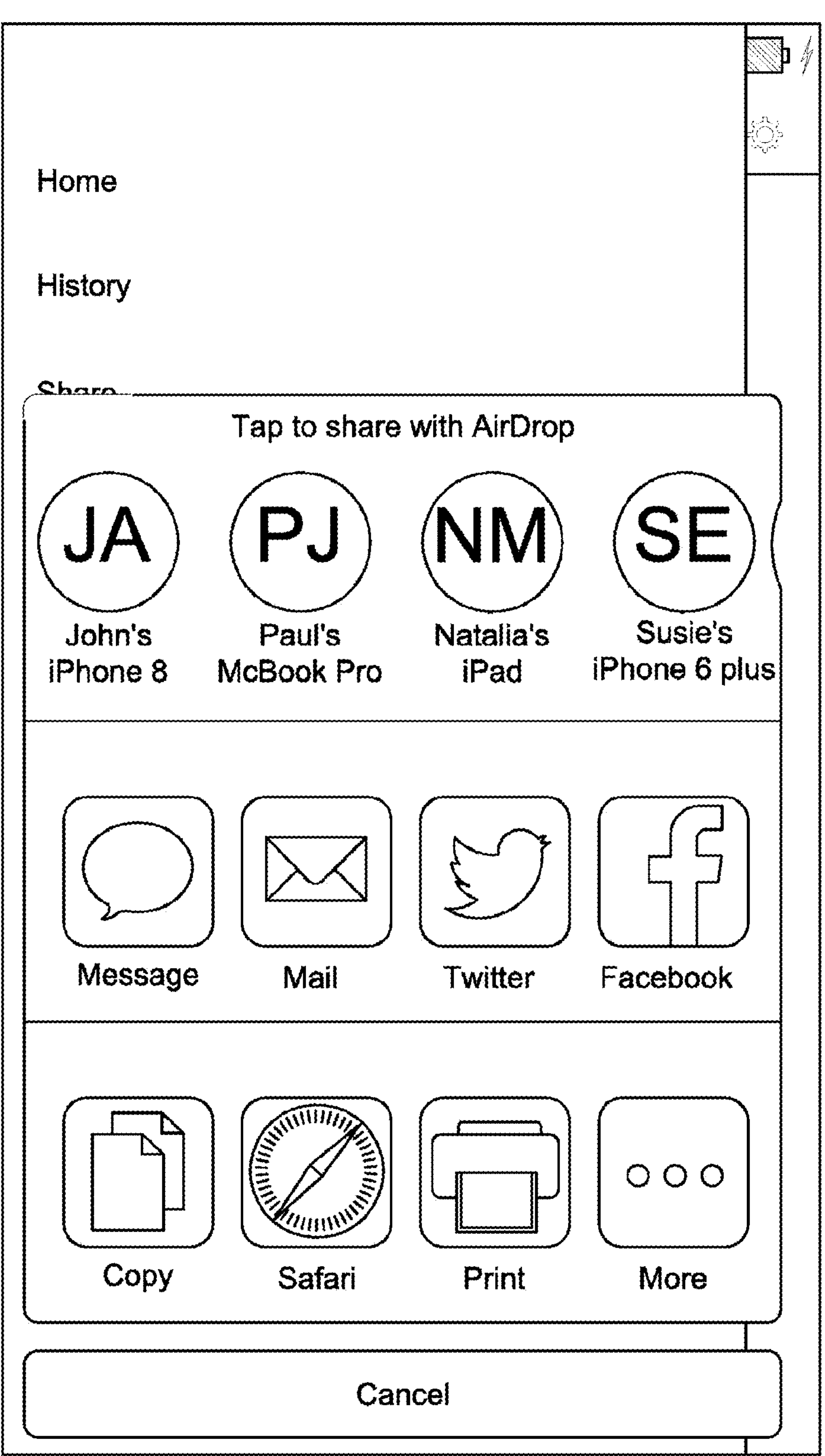
Figure 242C:
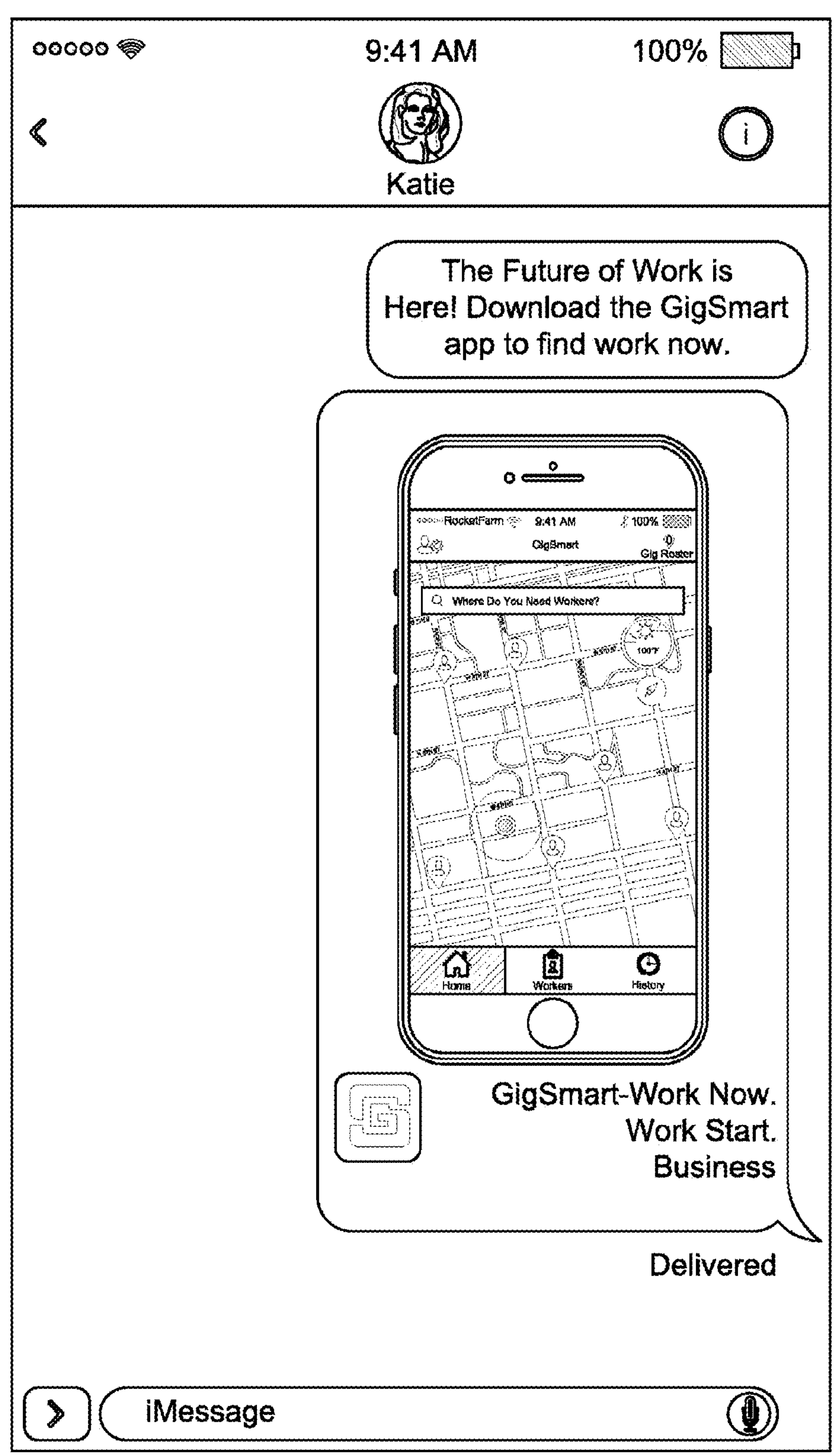
Figure 244A:
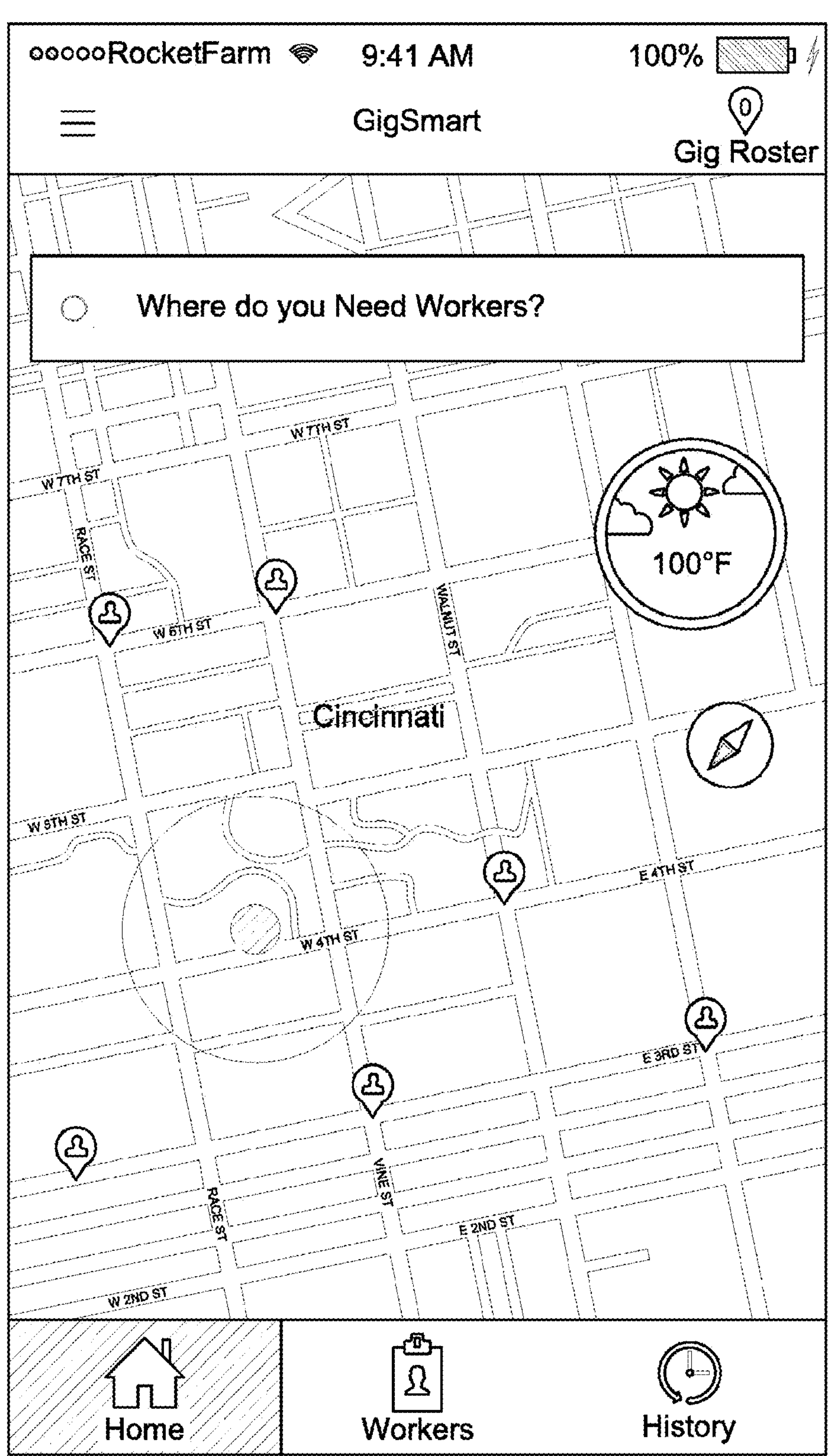
Figure 244B:
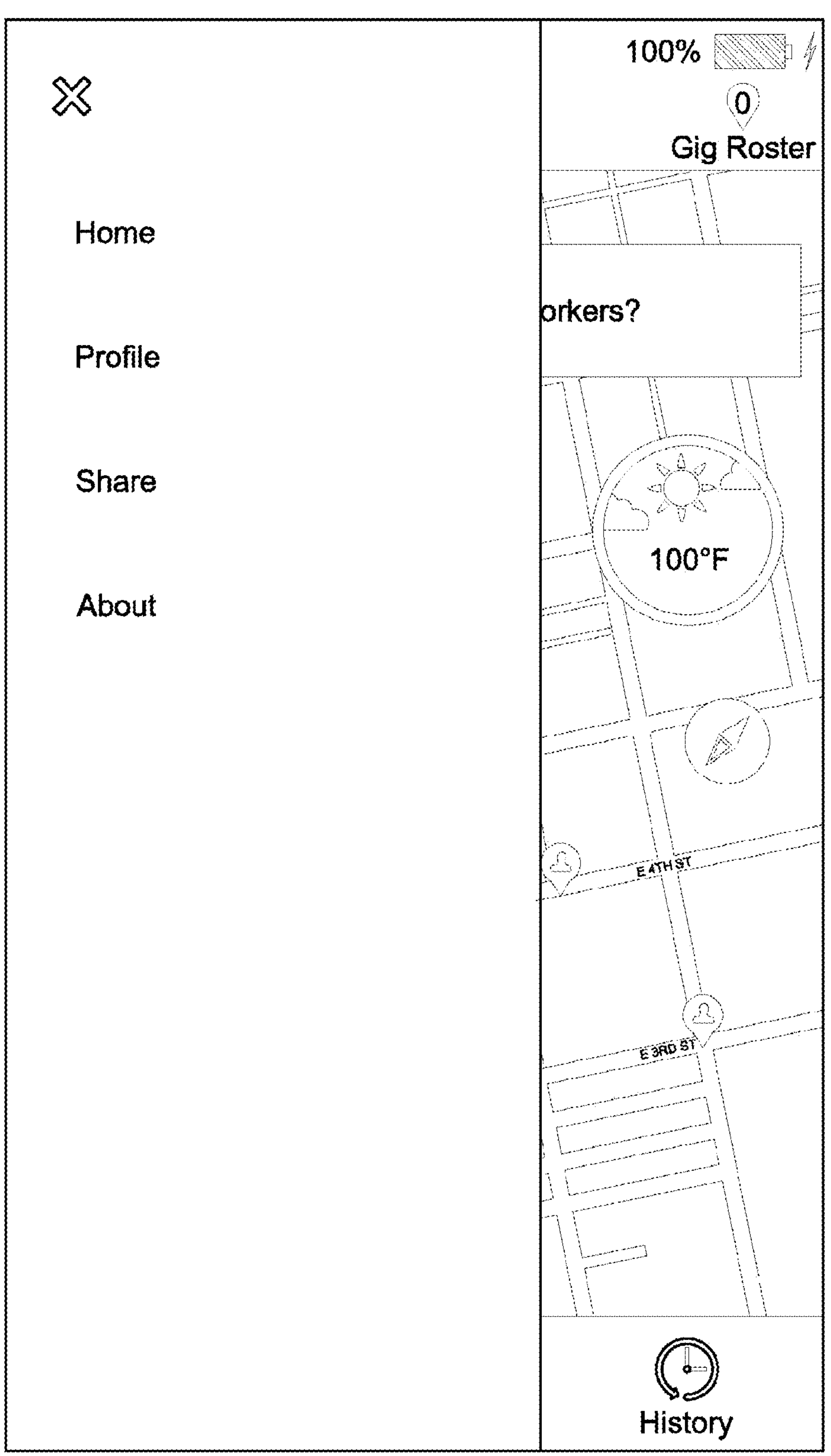
Figure 245A:
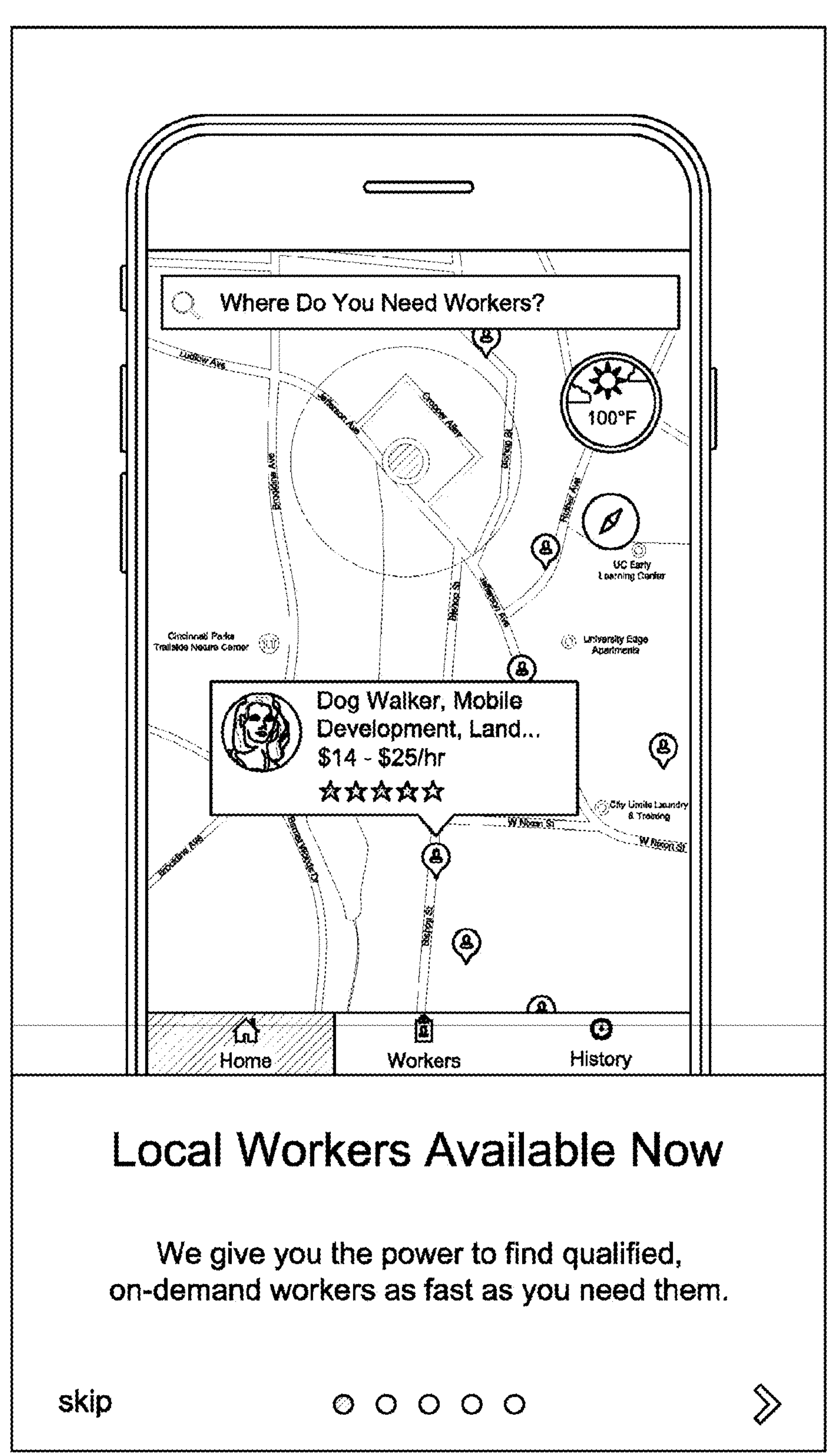
Figure 245B:
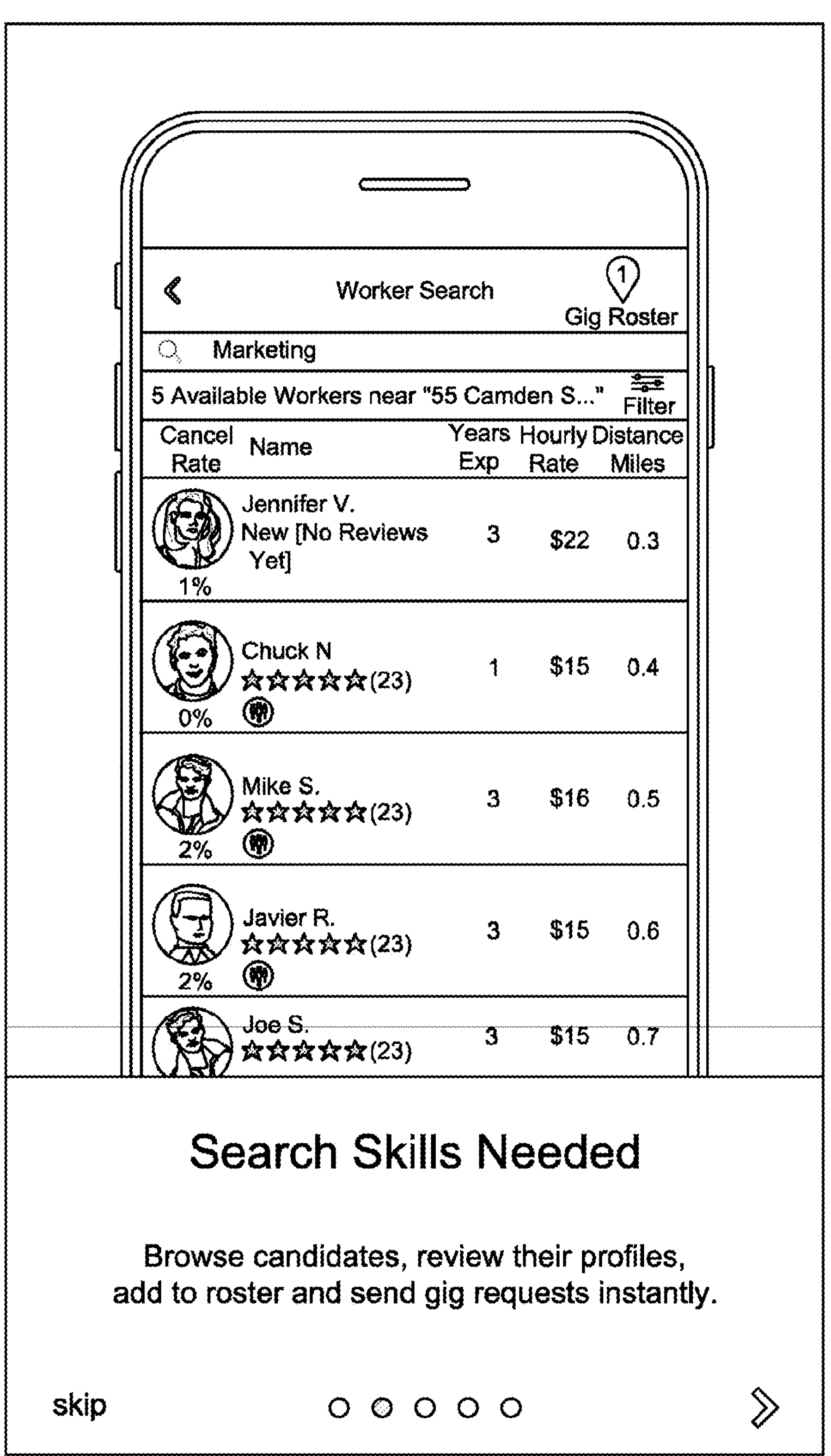
Figure 245C:
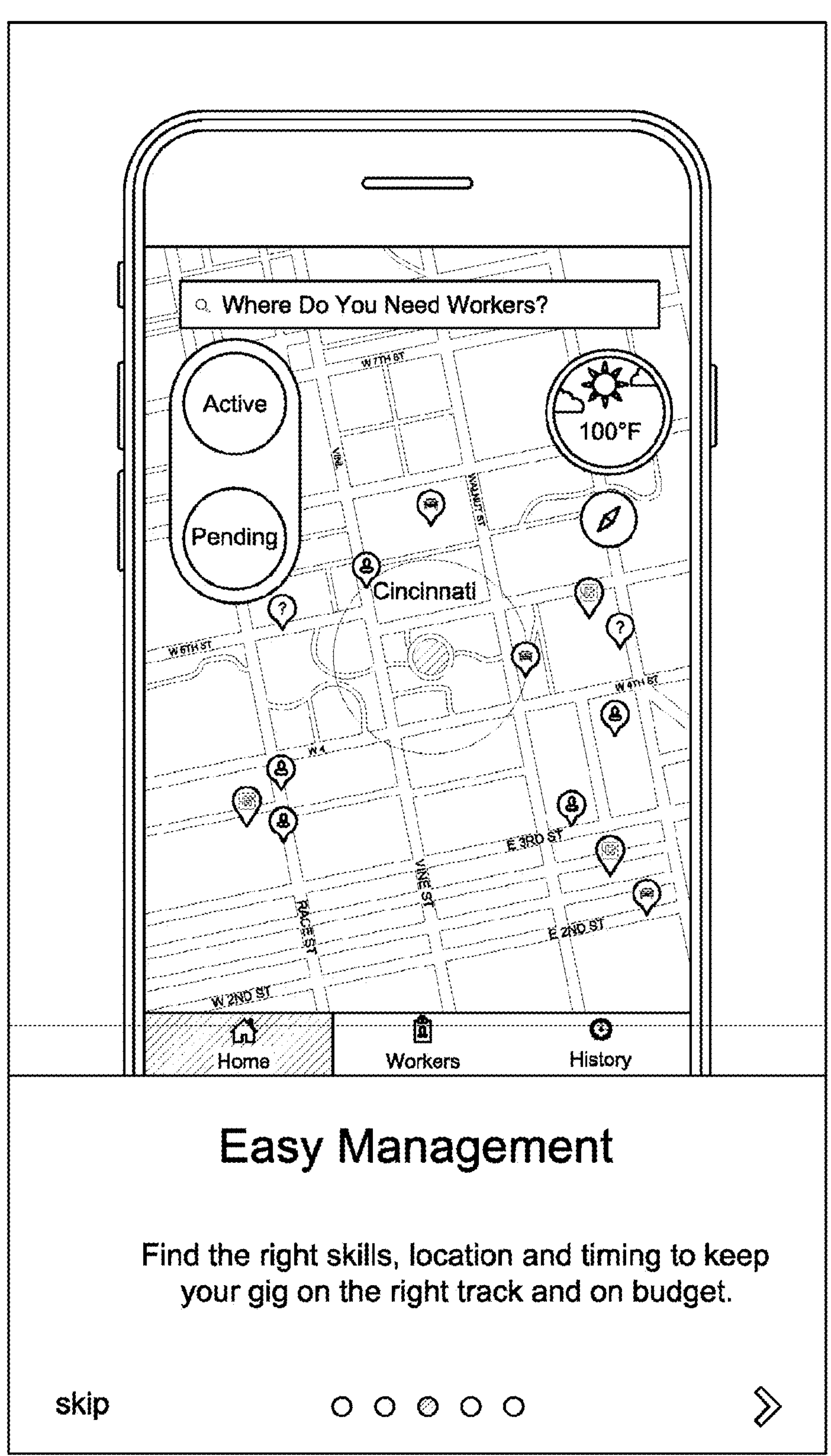
Figure 245D:
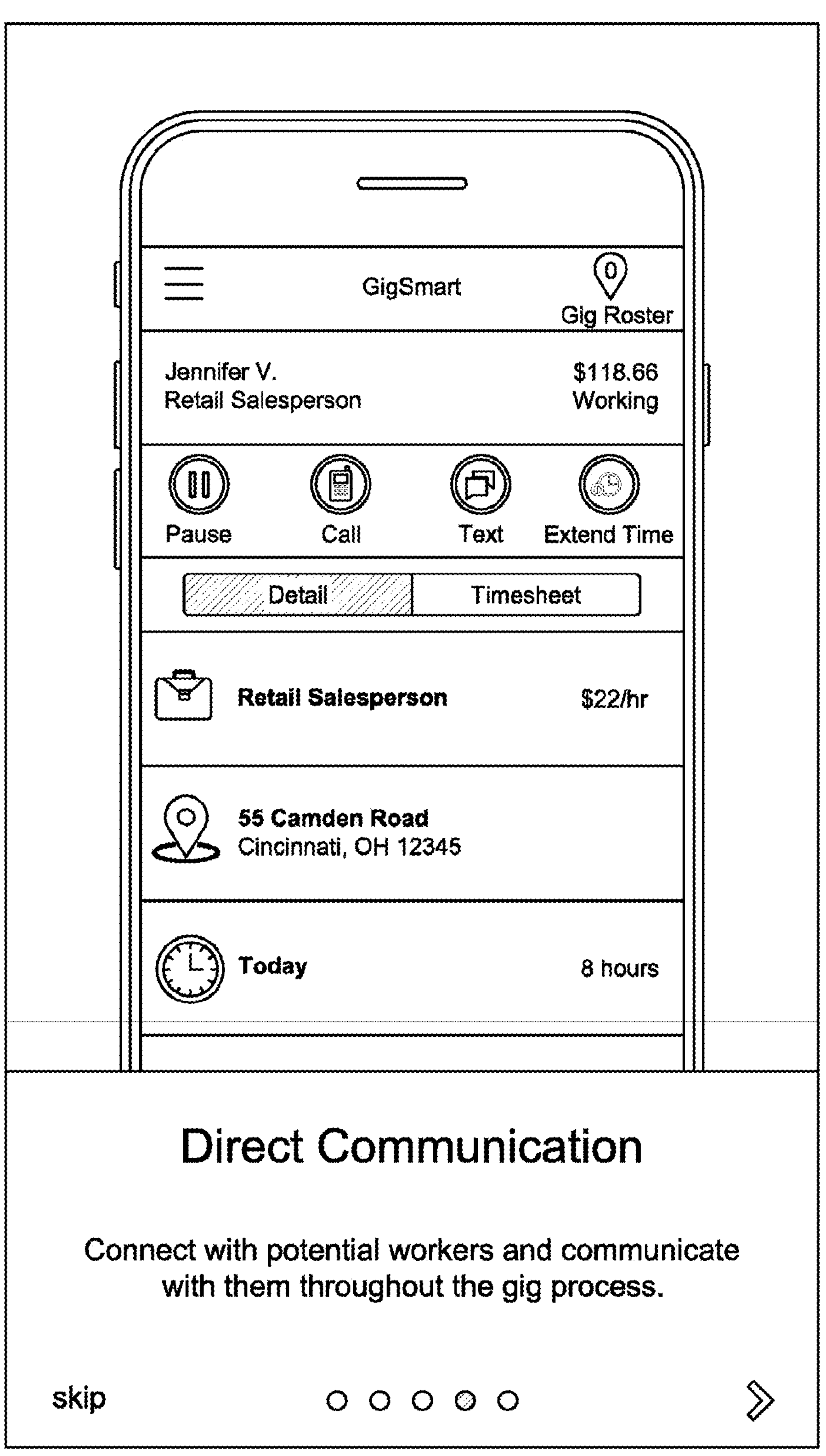
Figure 245E:
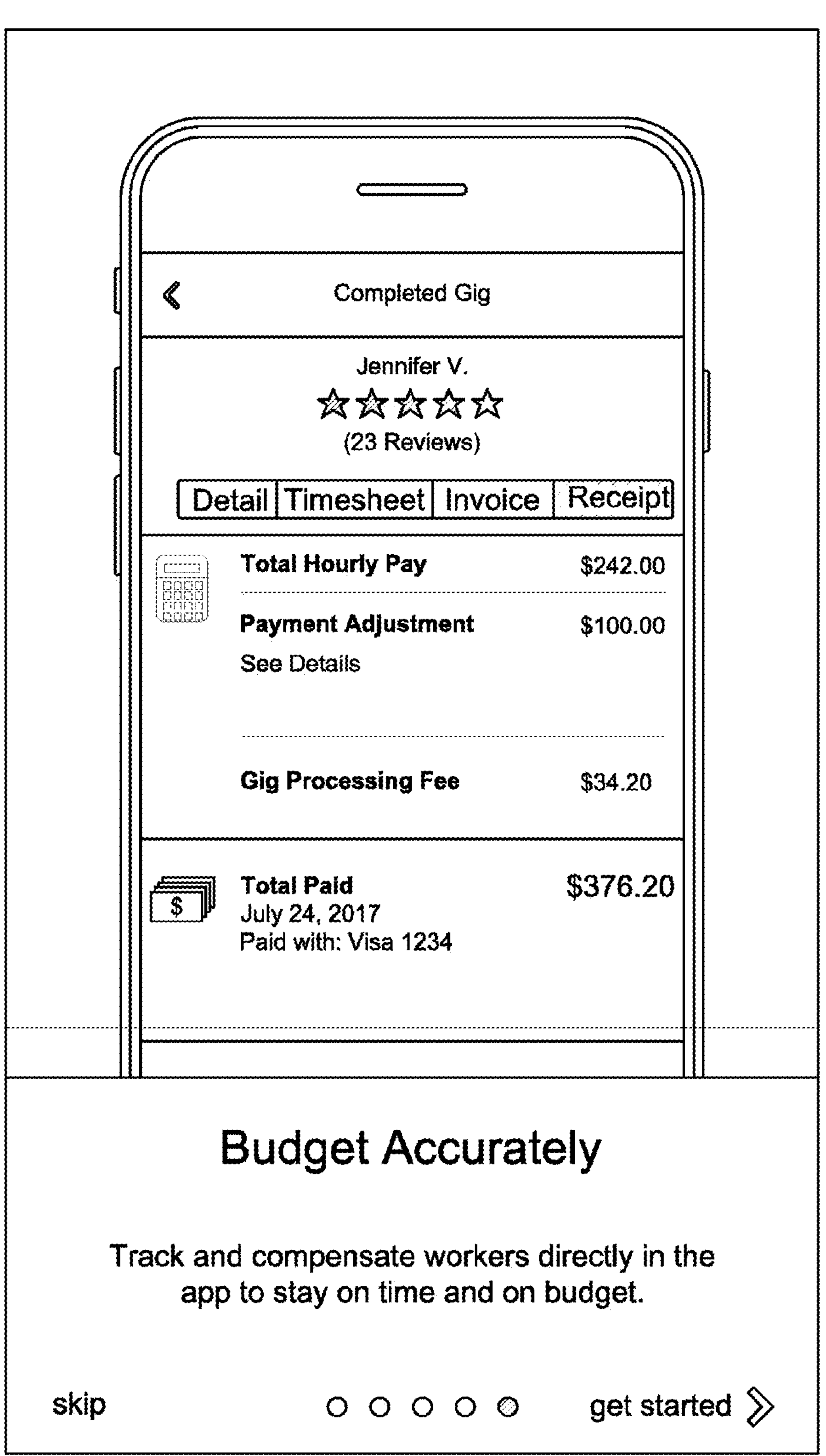
Figure 246A:
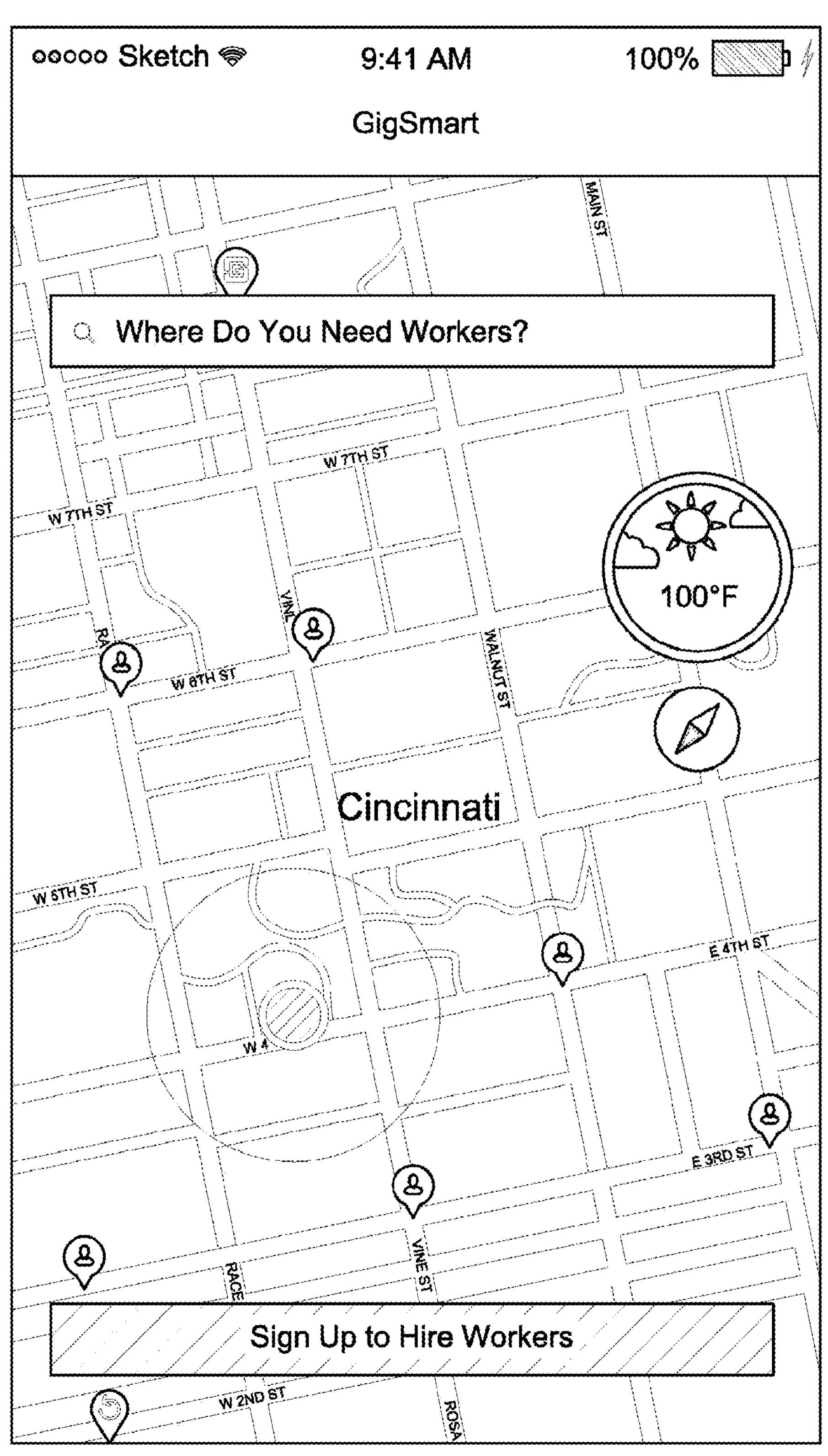
Figure 246B:
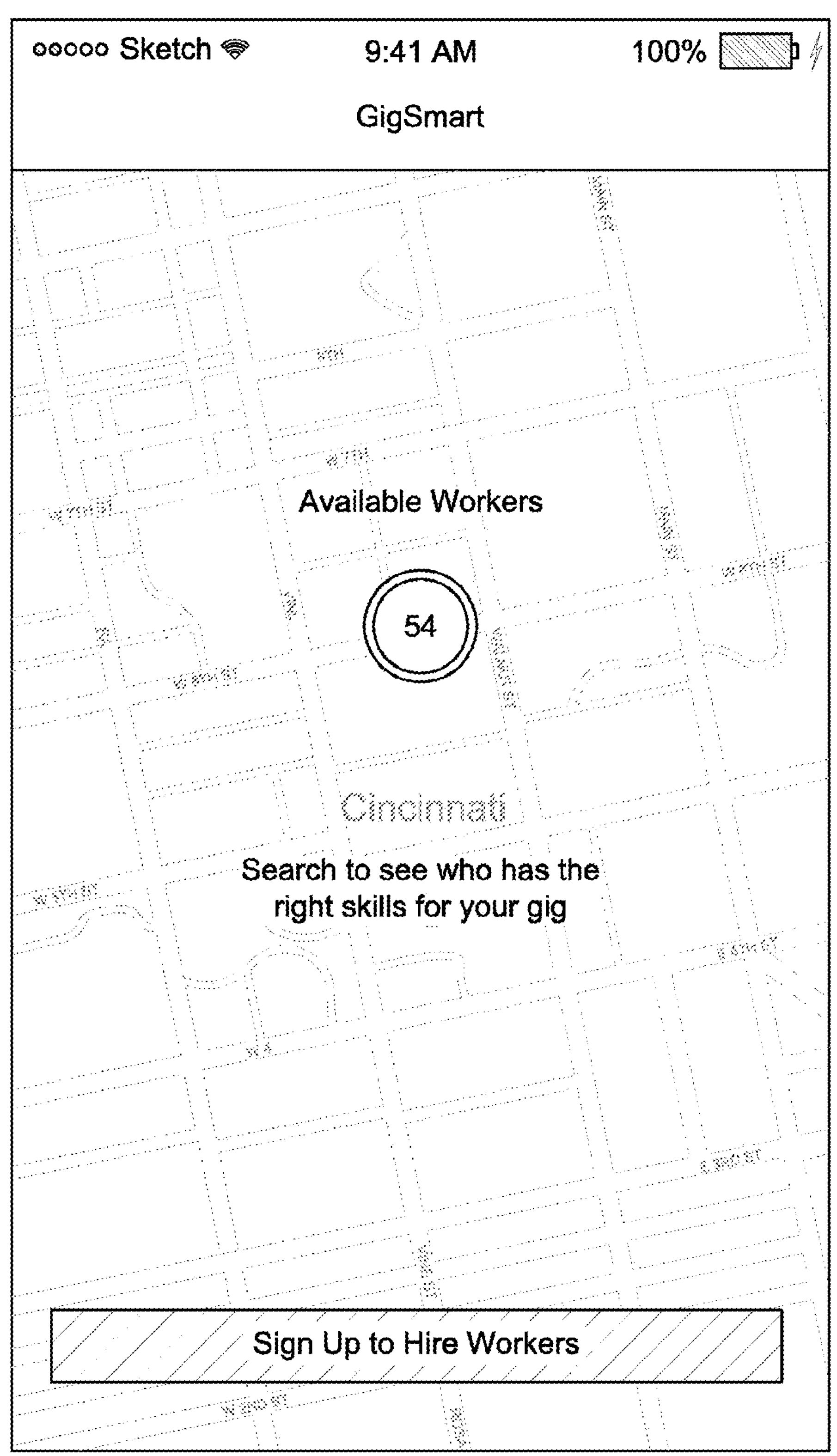
Figure 247A:
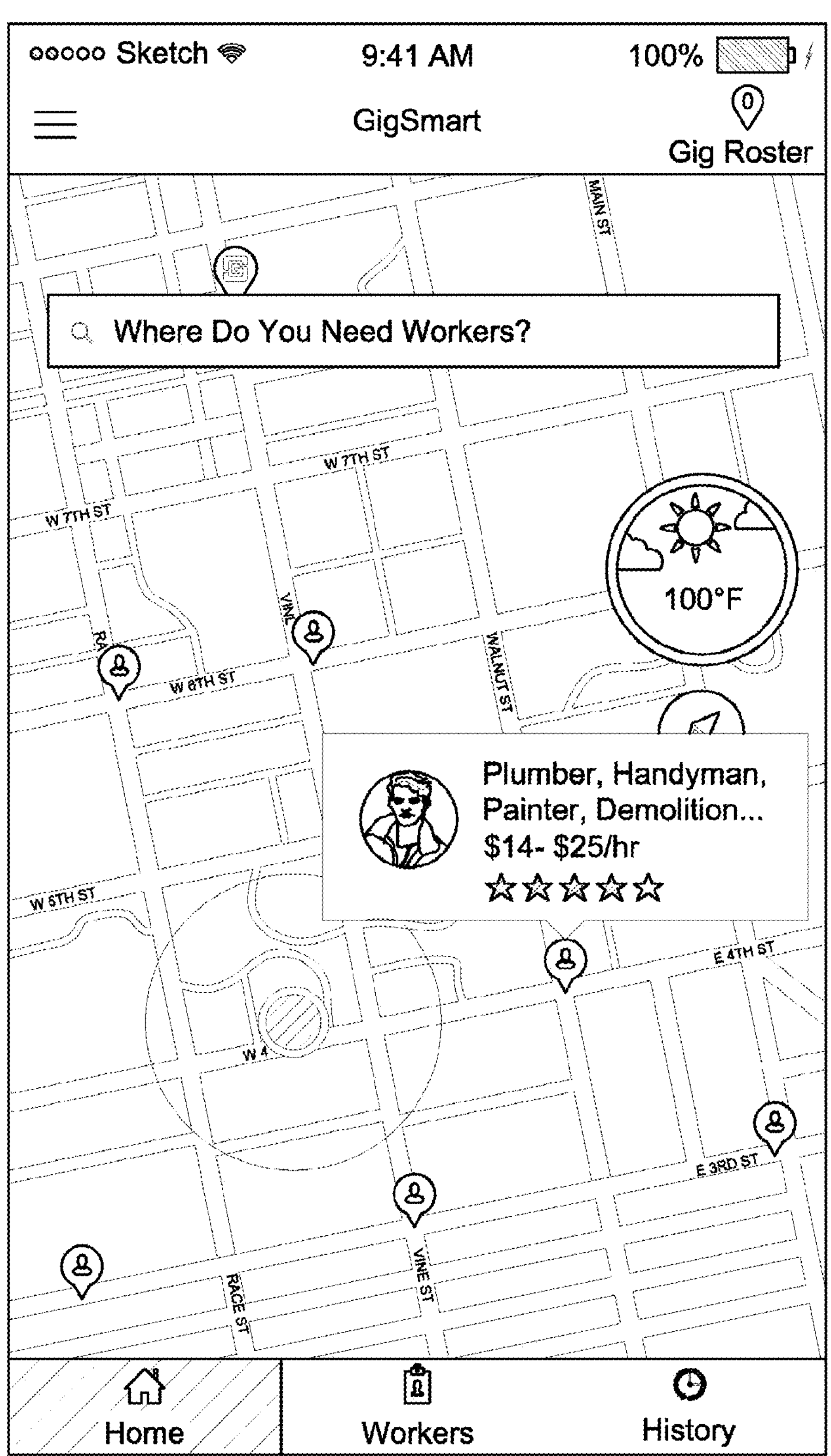
Figure 248A:
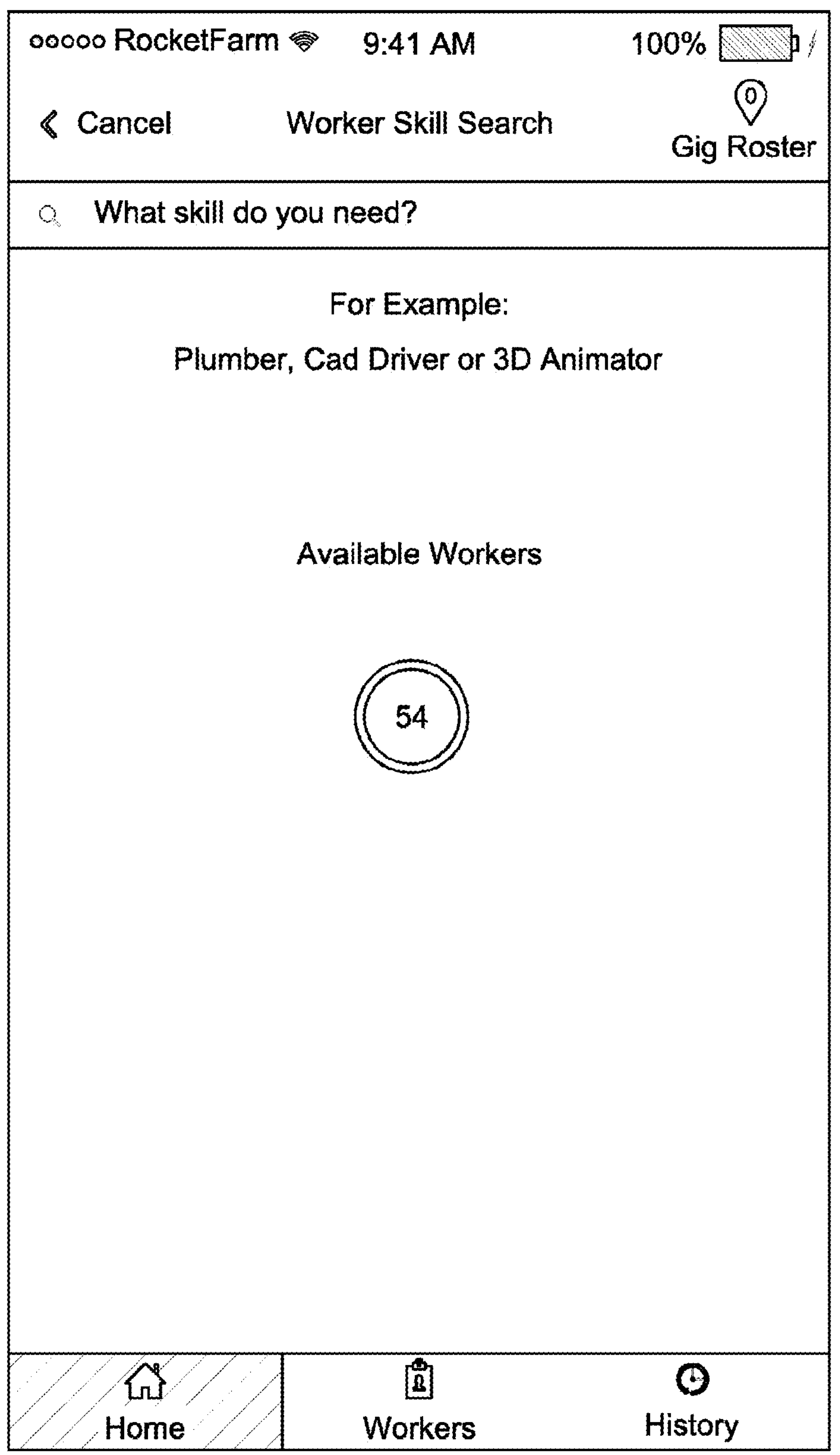
Figure 249:
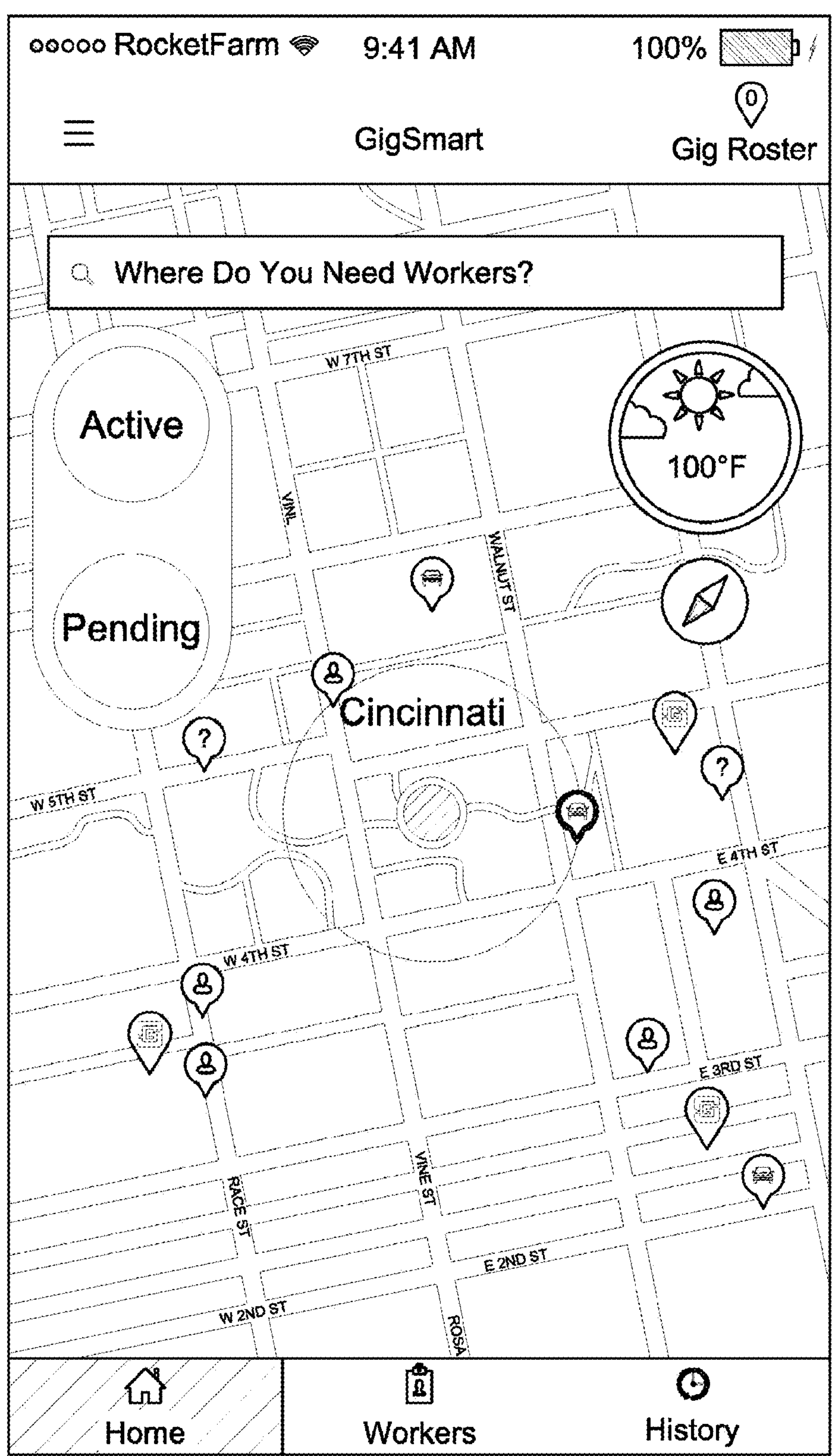
Figure 250:
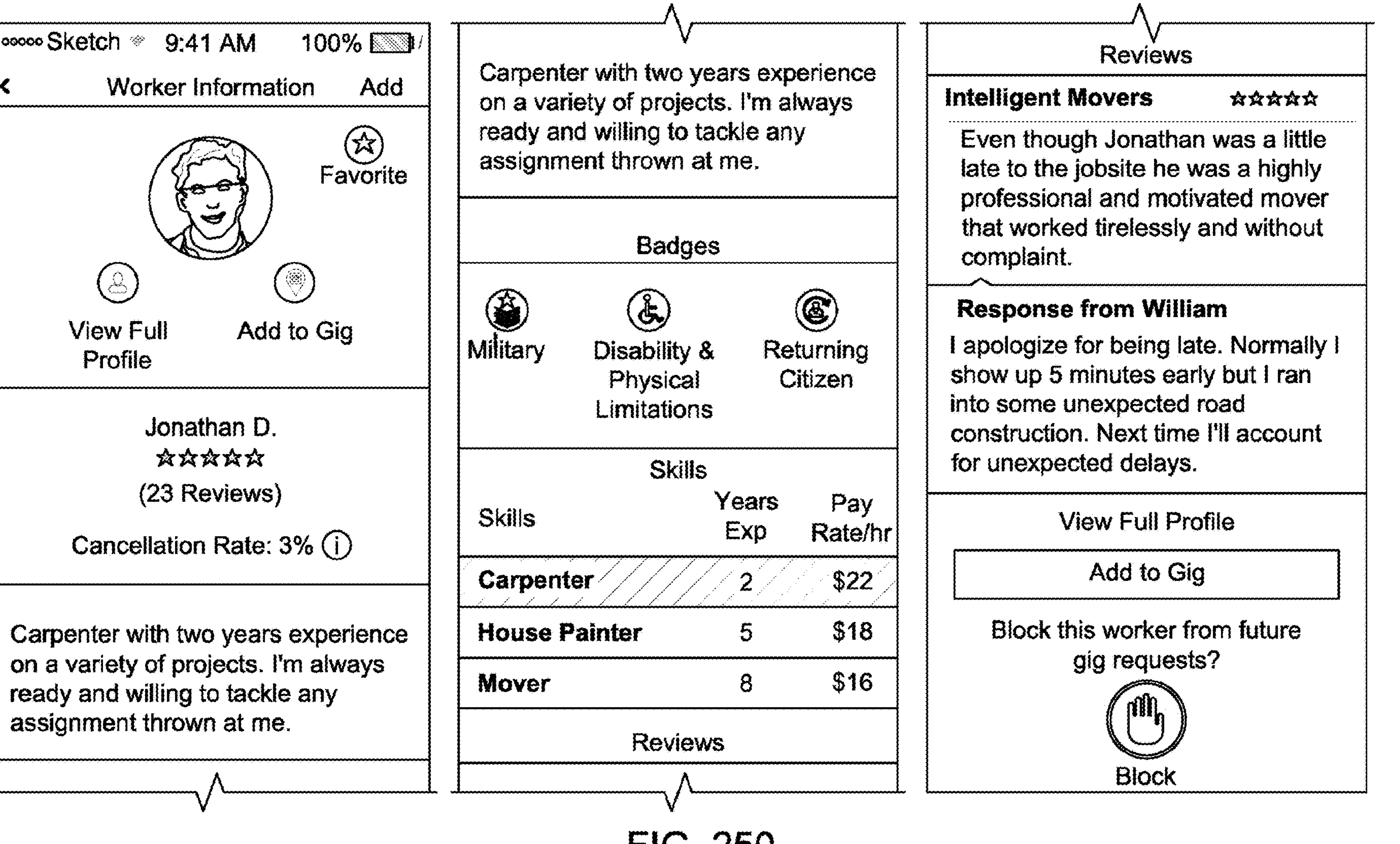
Figure 251:
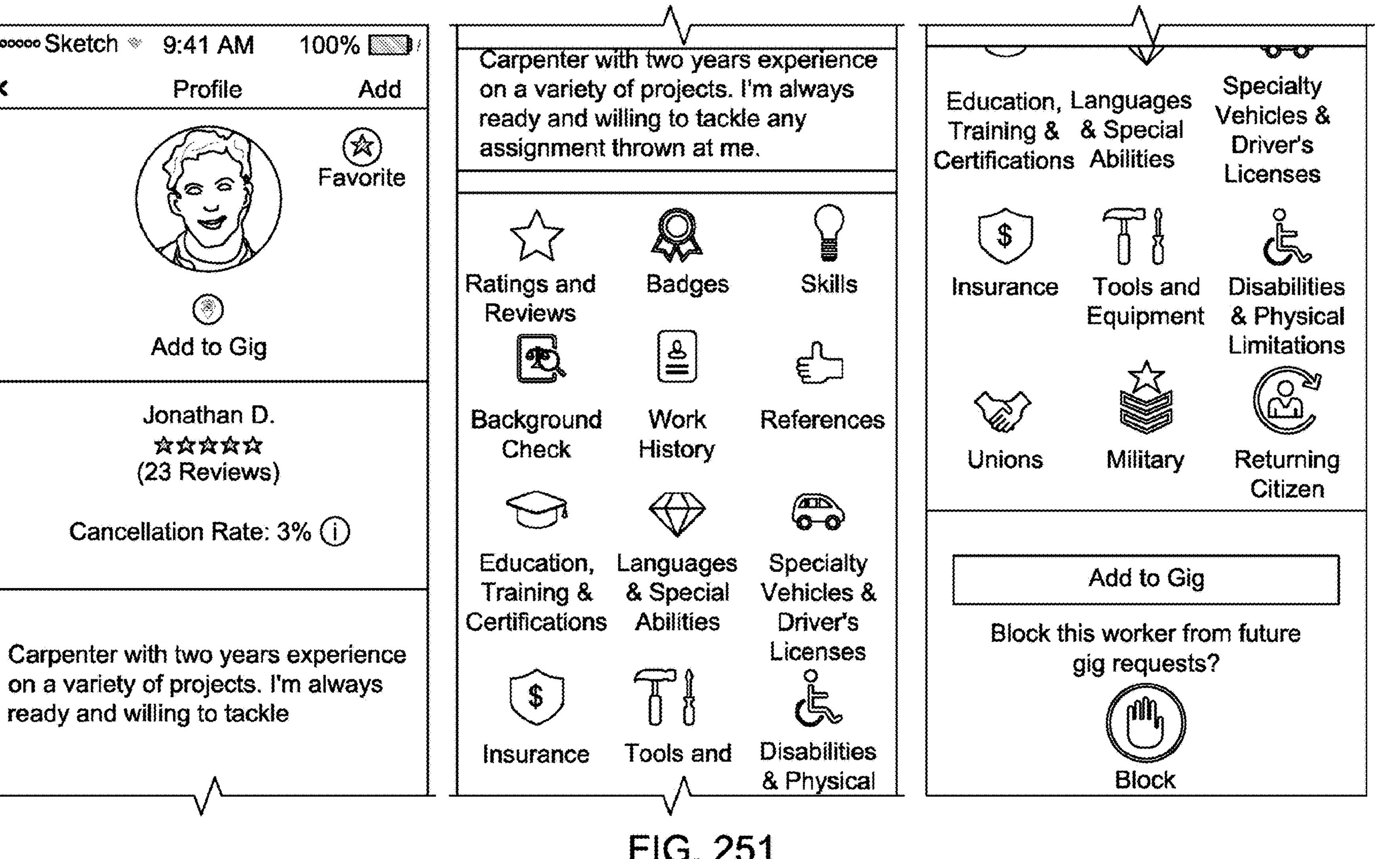
Figure 252:
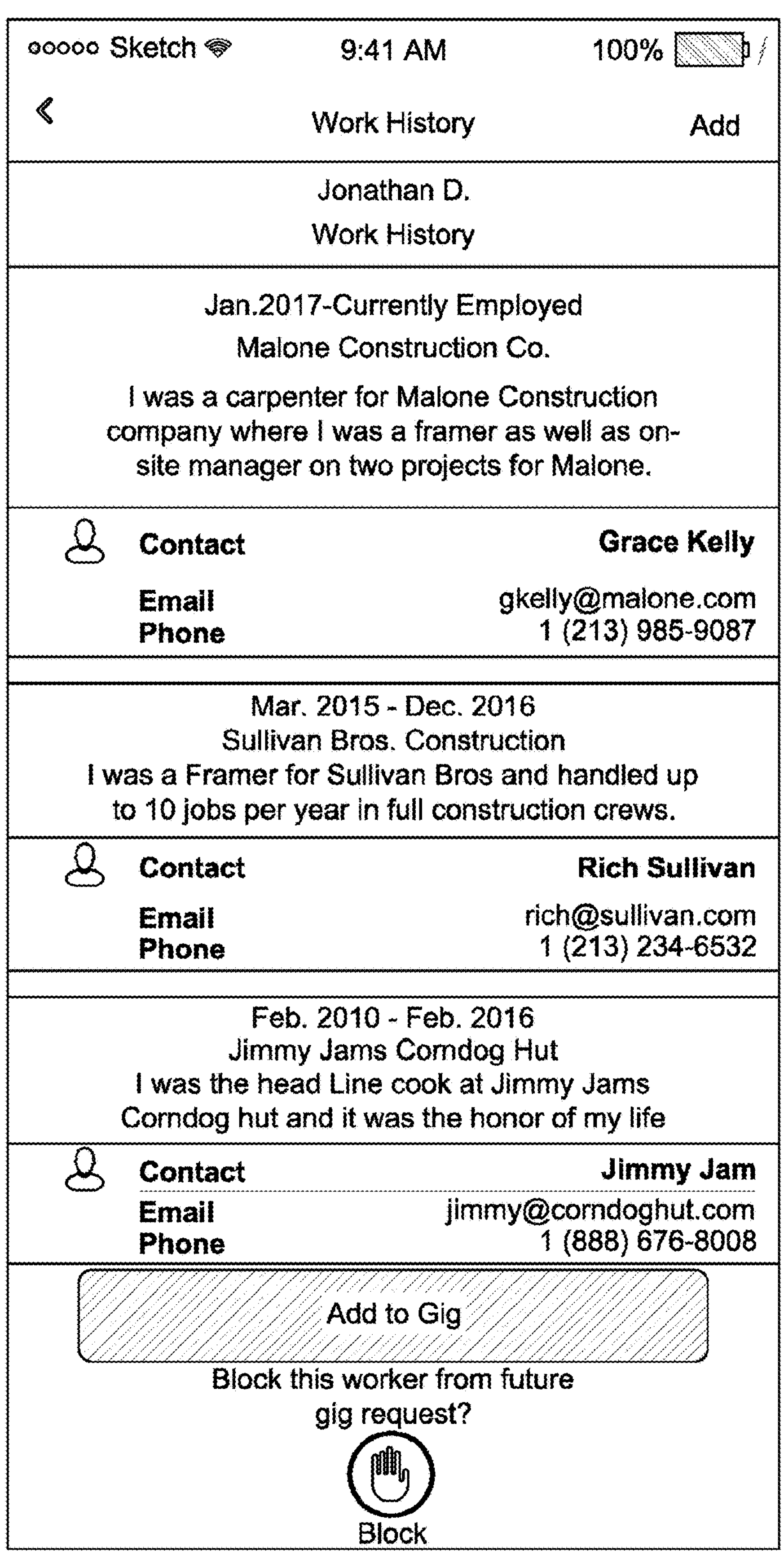
Figure 253:
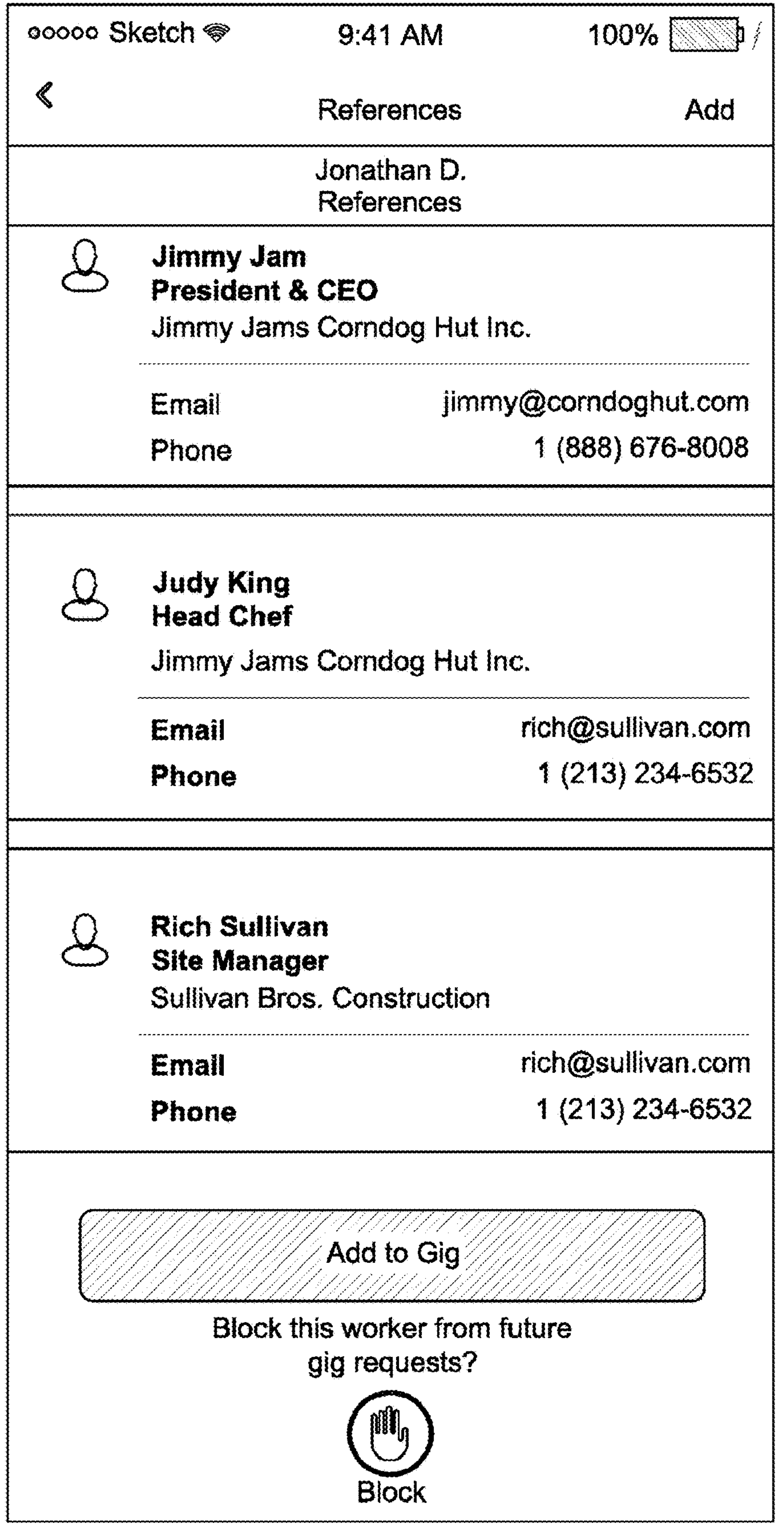
Figure 254:
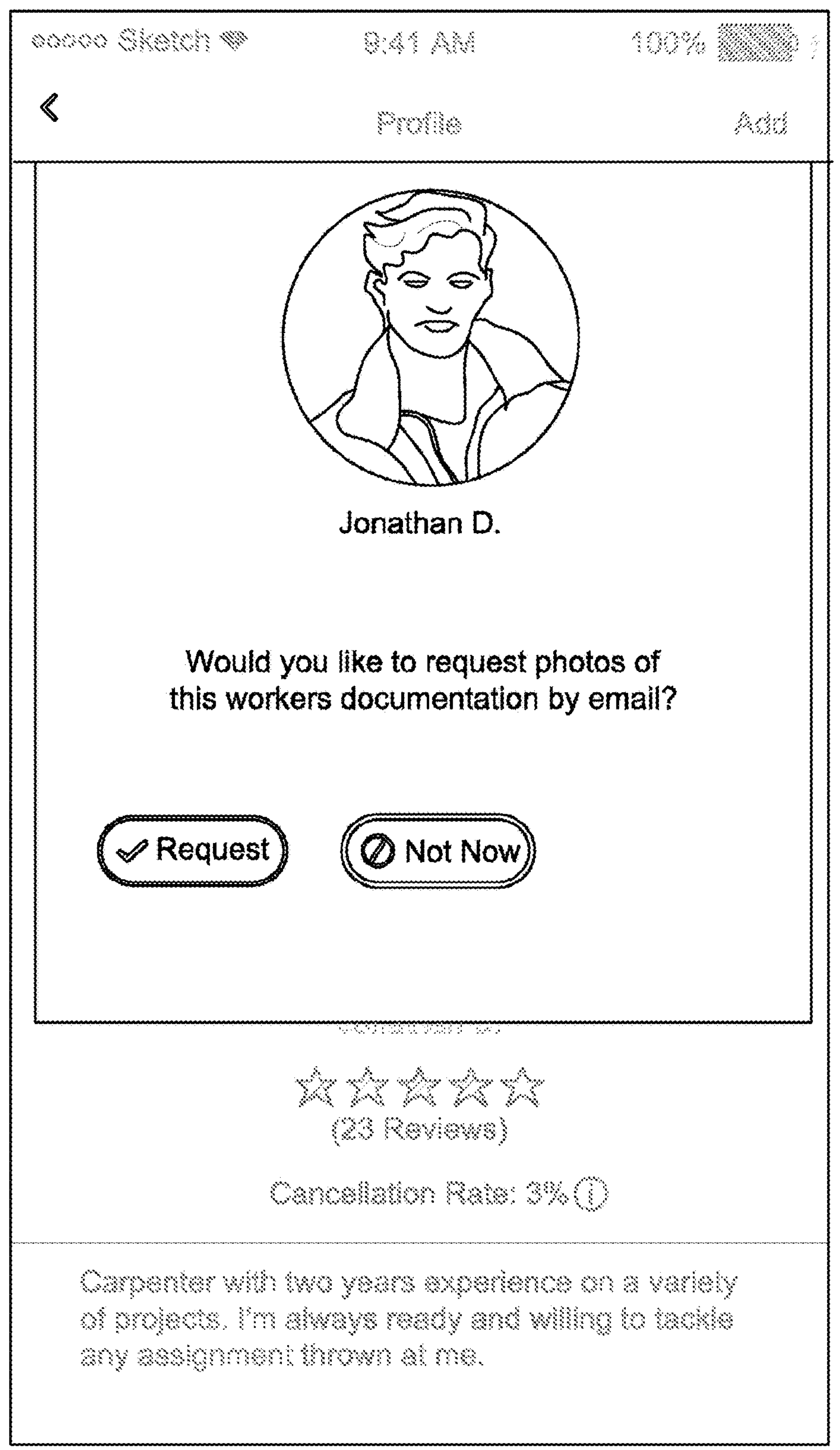
Figure 255:
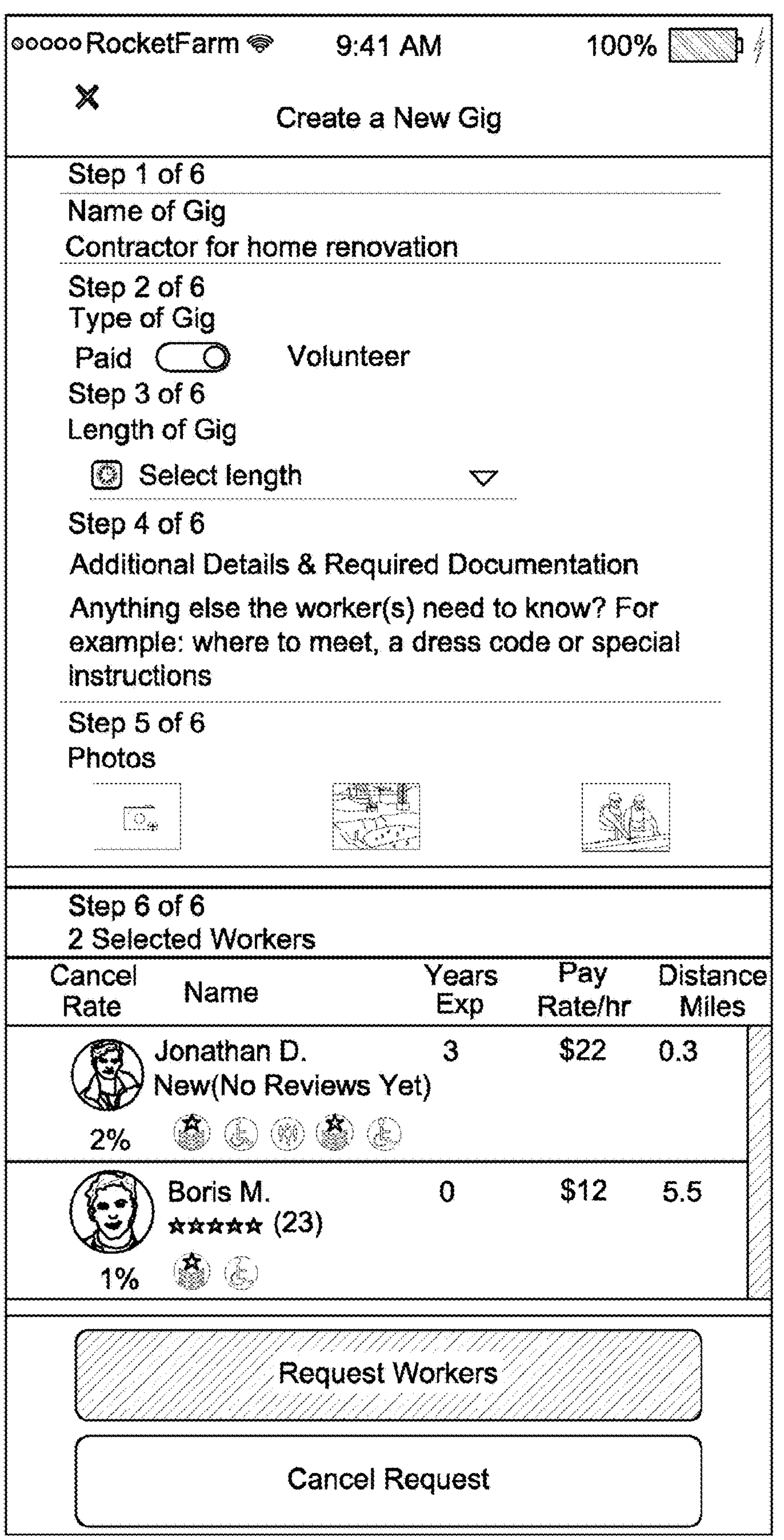
Figure 256A:
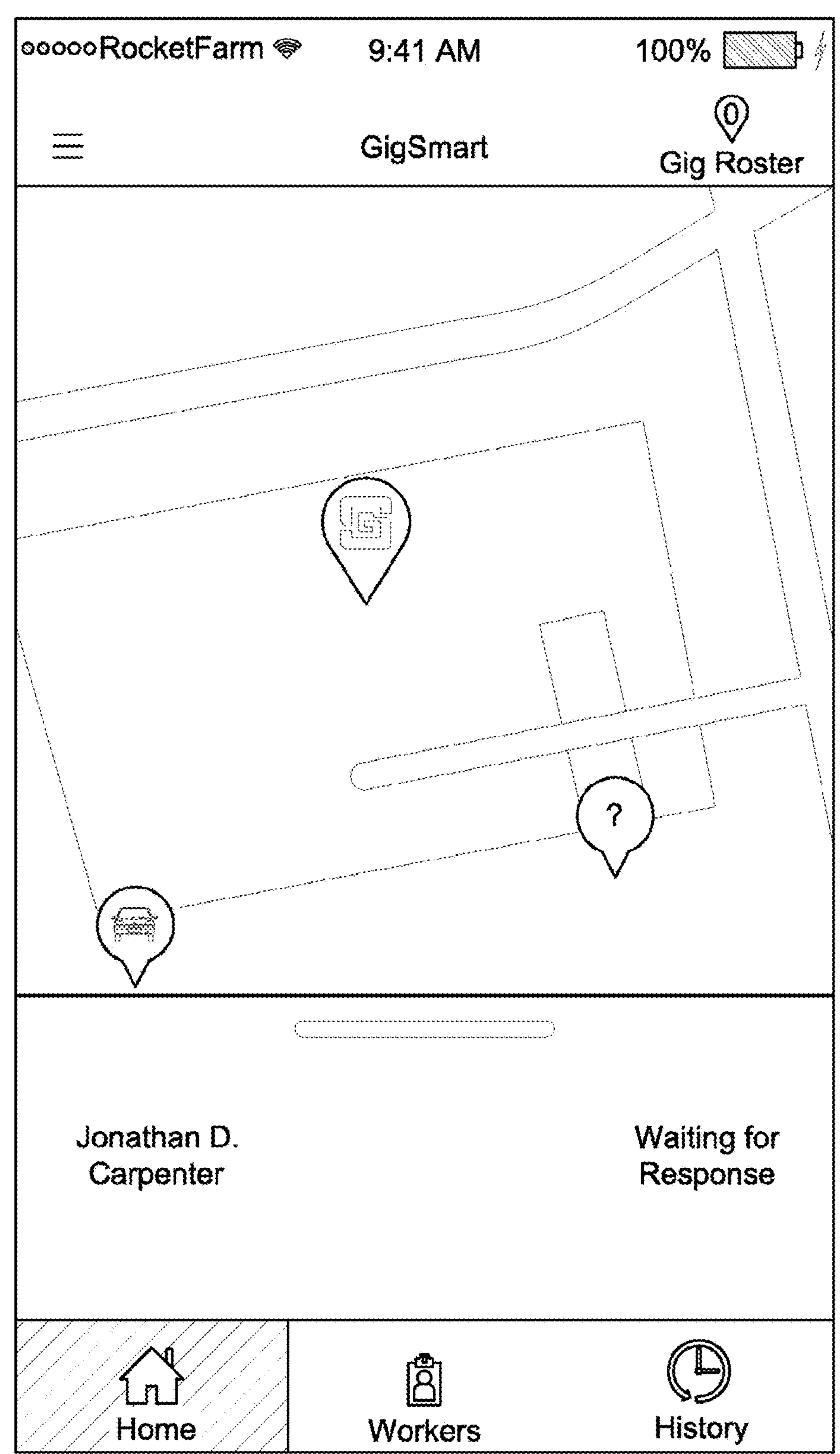
Figure 257A:
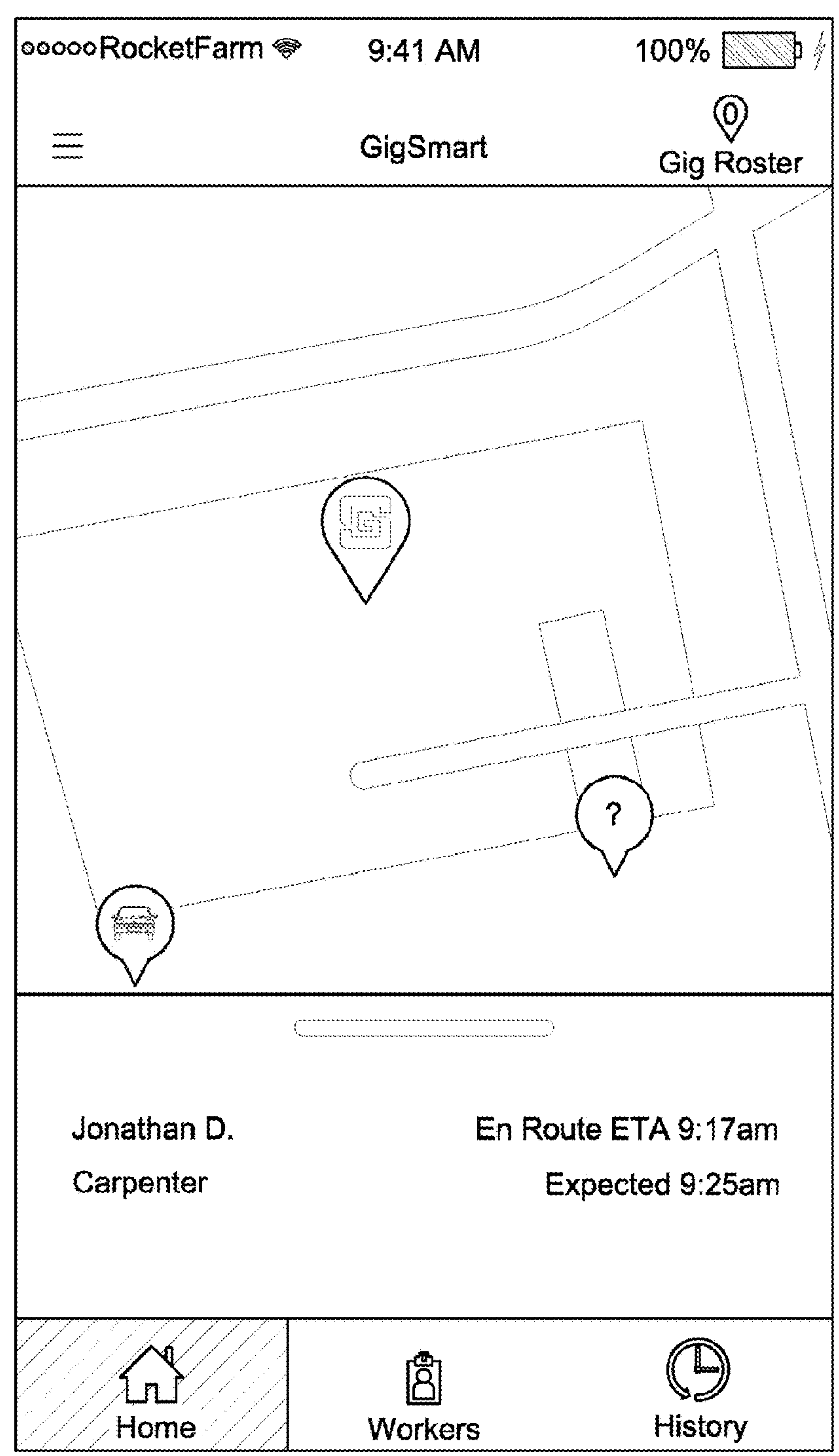
Figure 257B:
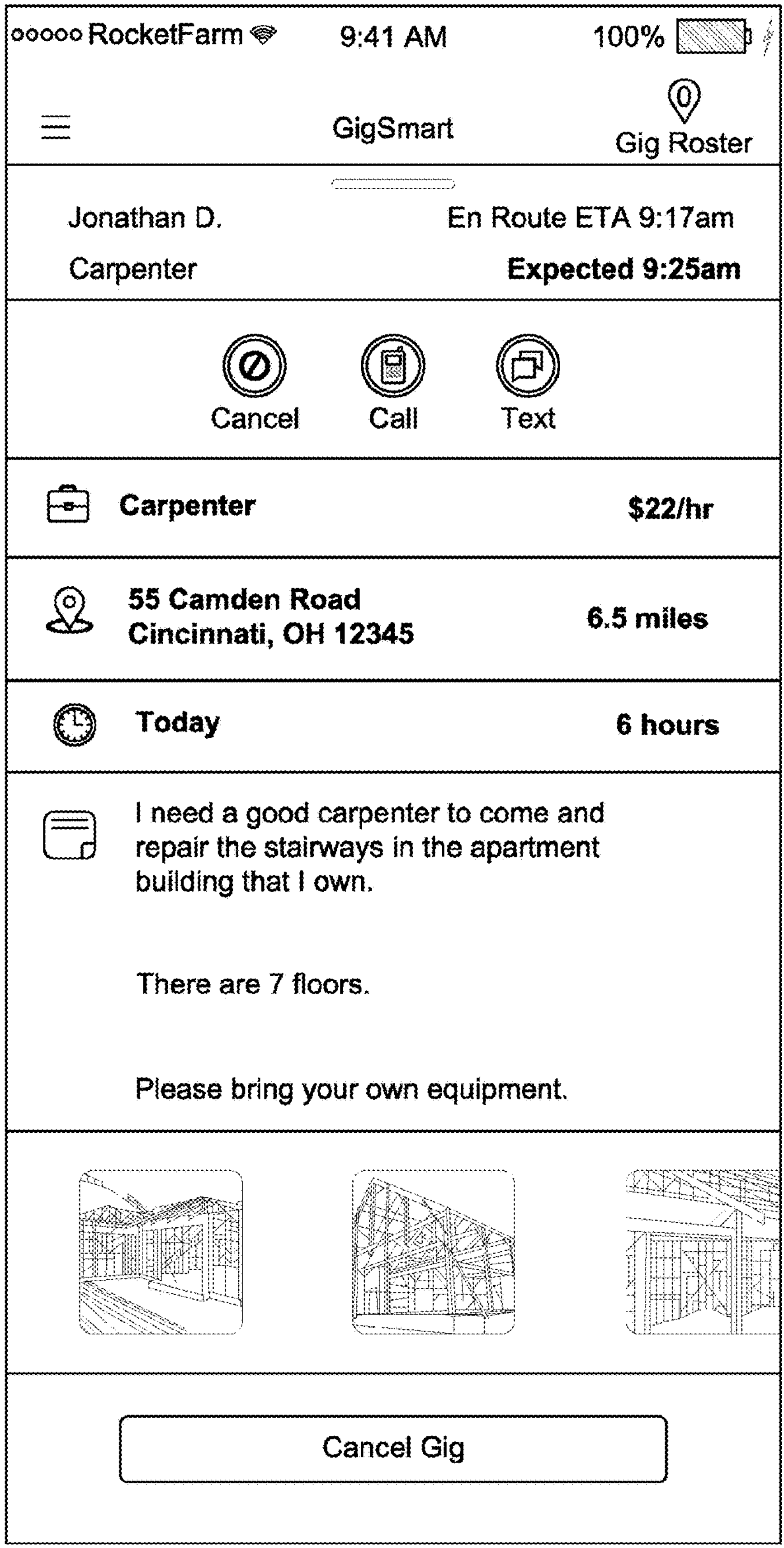
Figure 258:
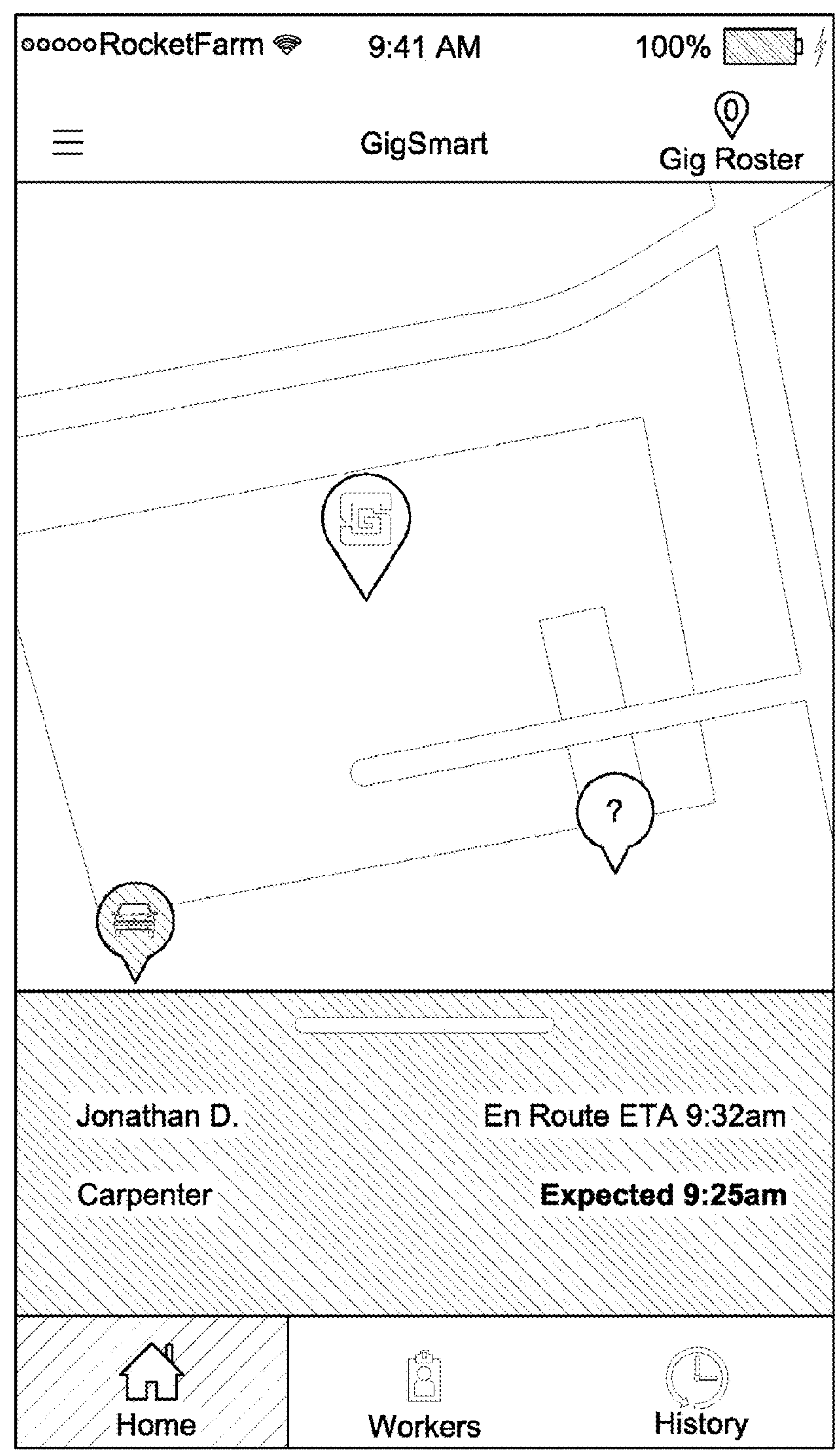
Figure 259A:
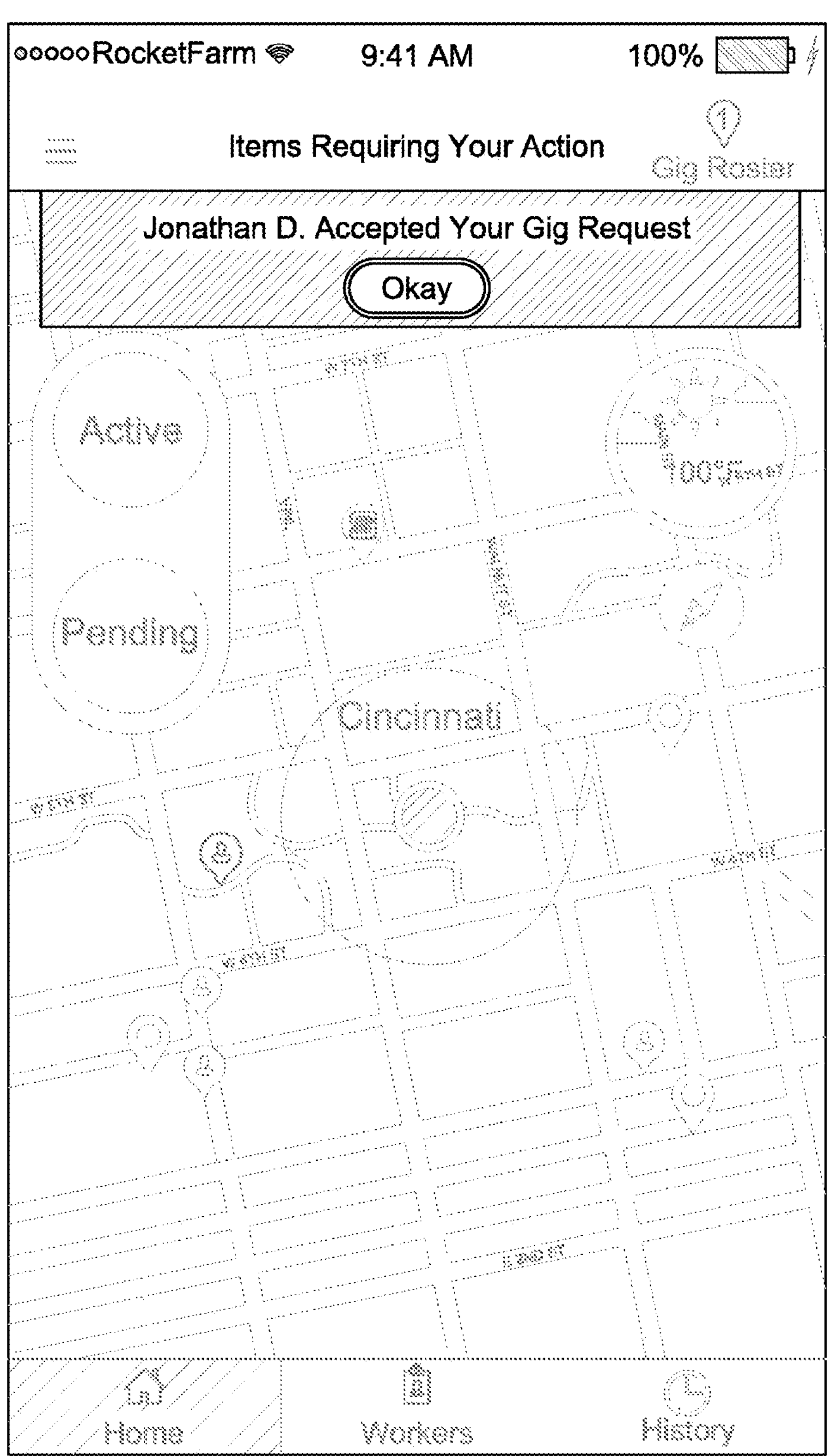
Figure 259B:
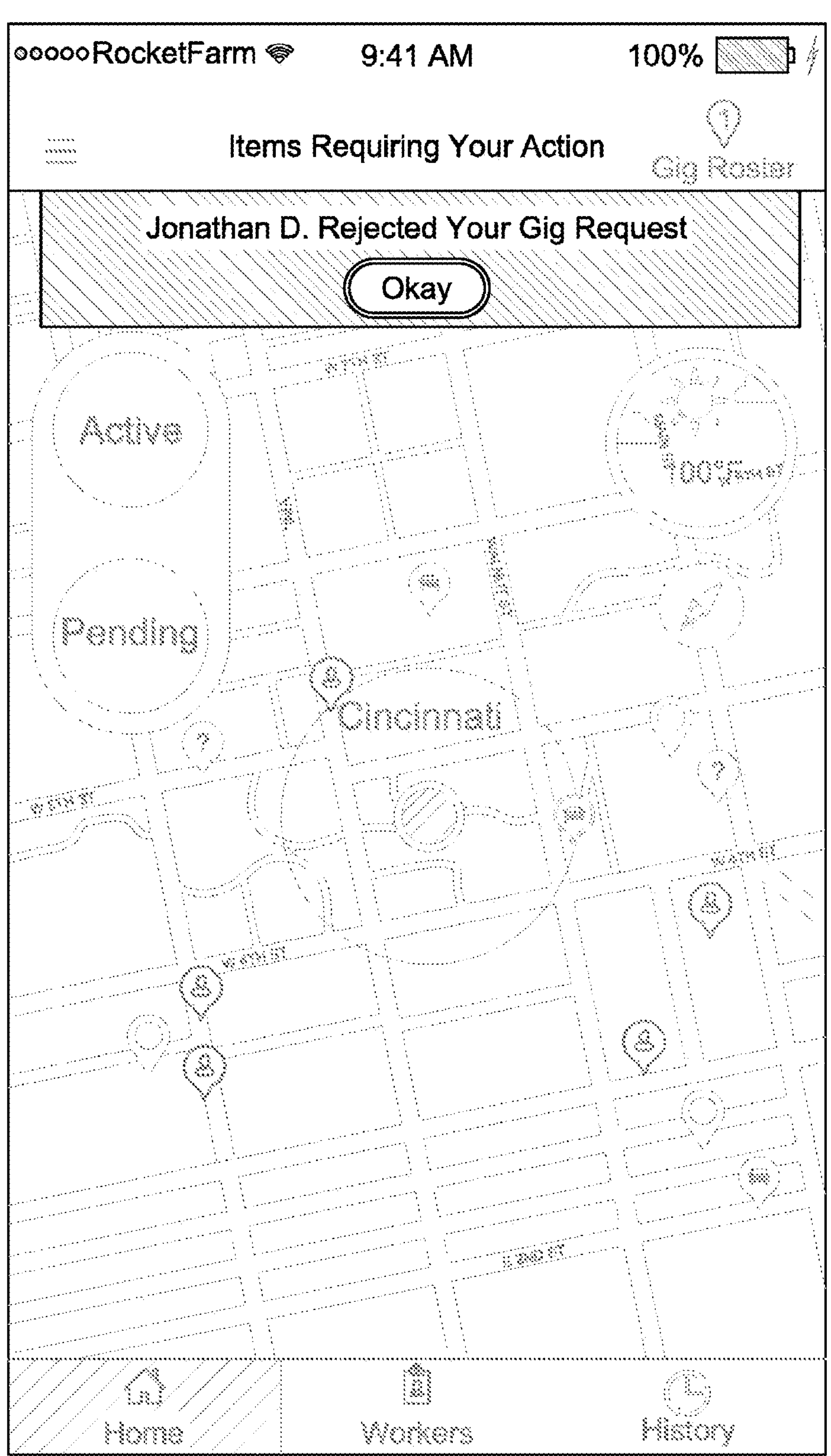
Figure 260:
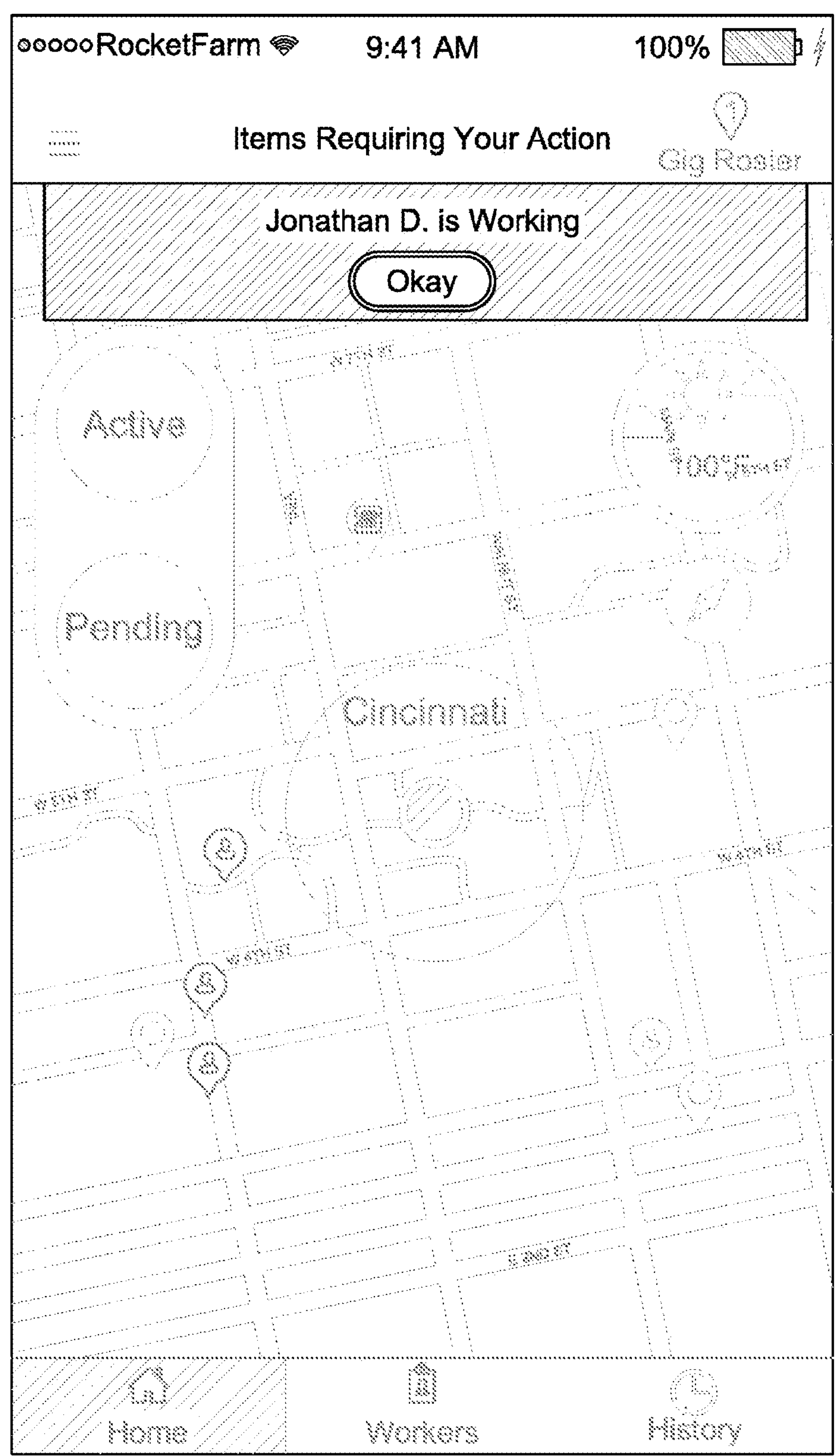
Figure 261A:
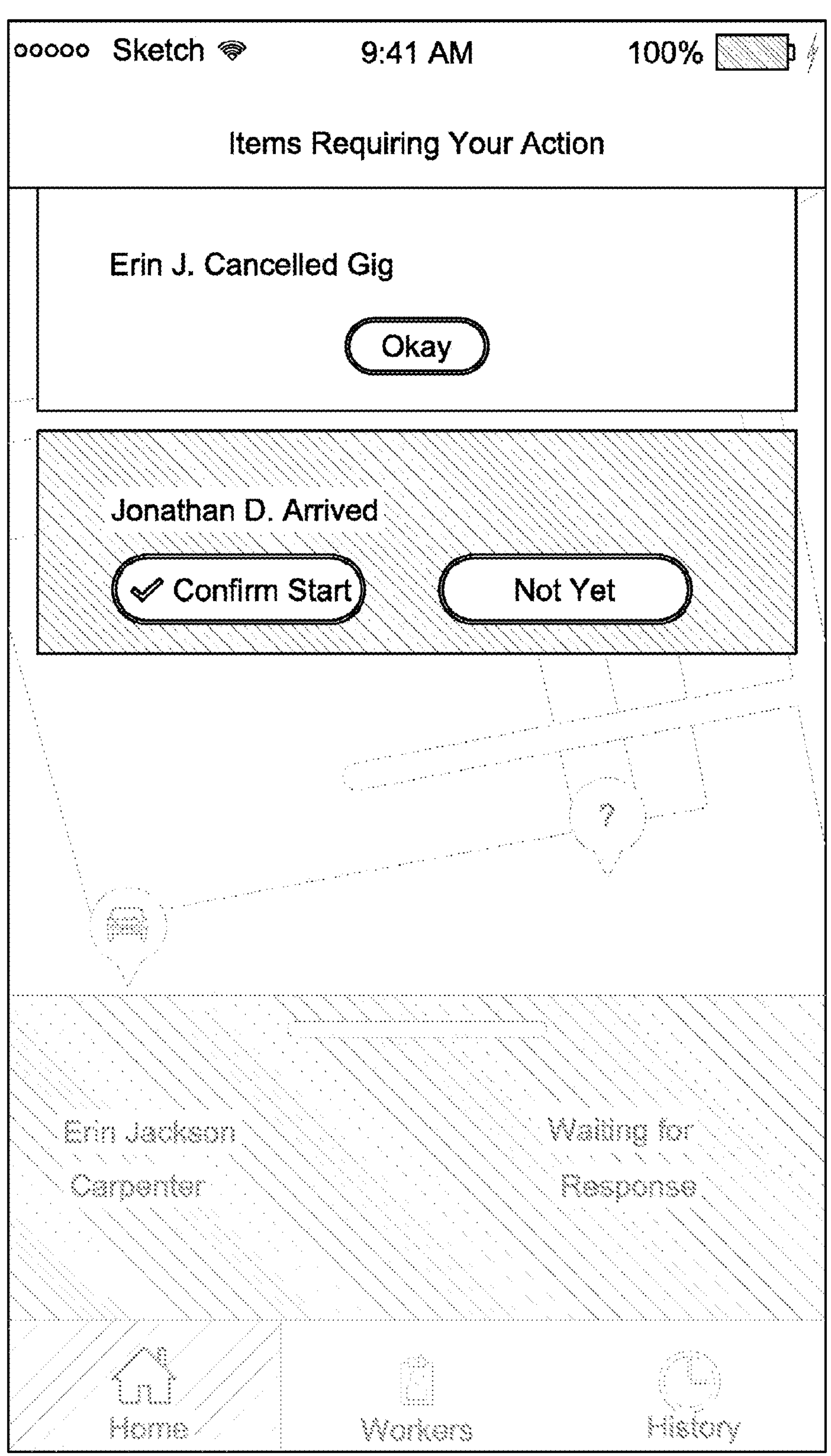
Figure 261B:
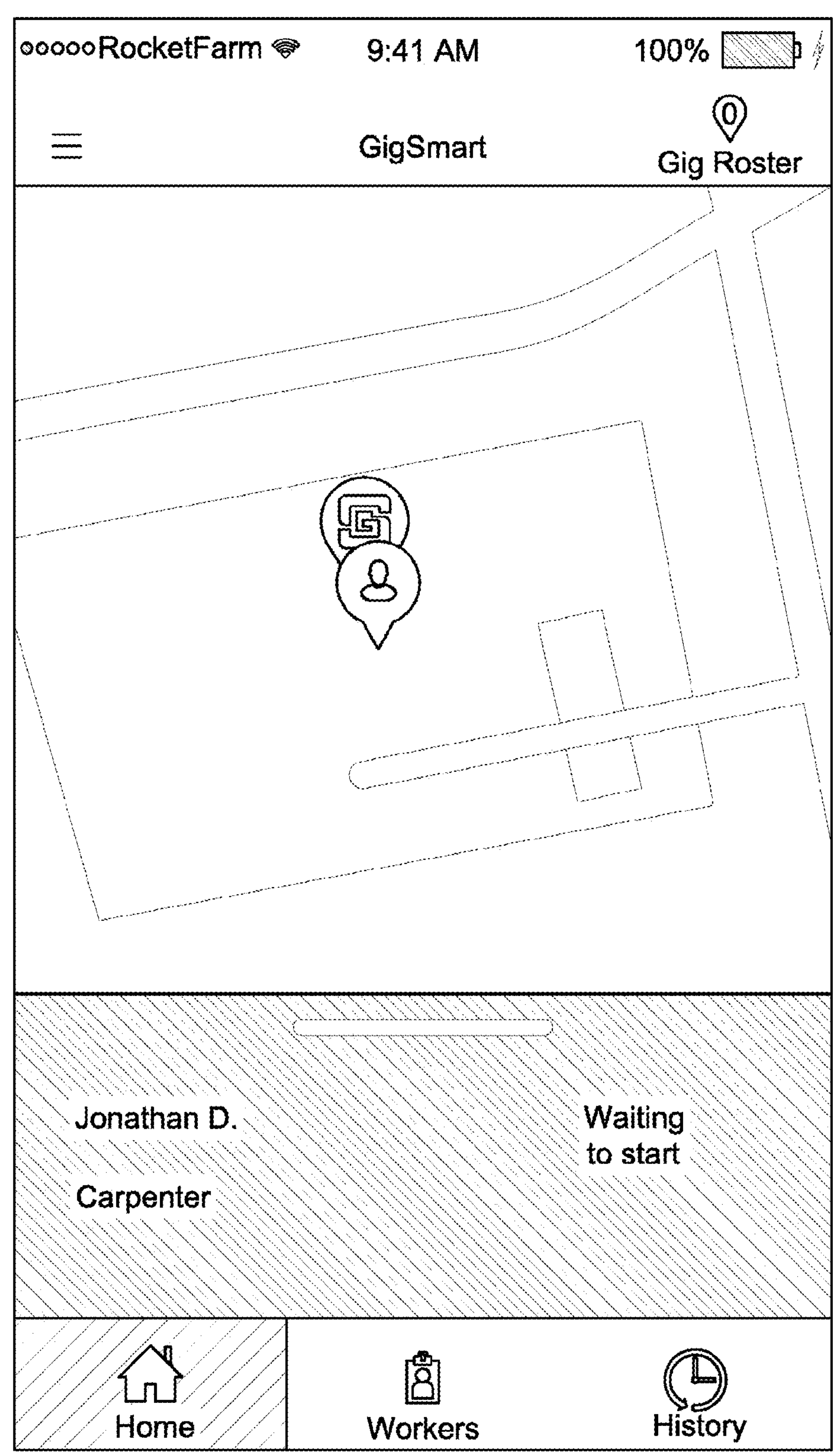
Figure 262A:
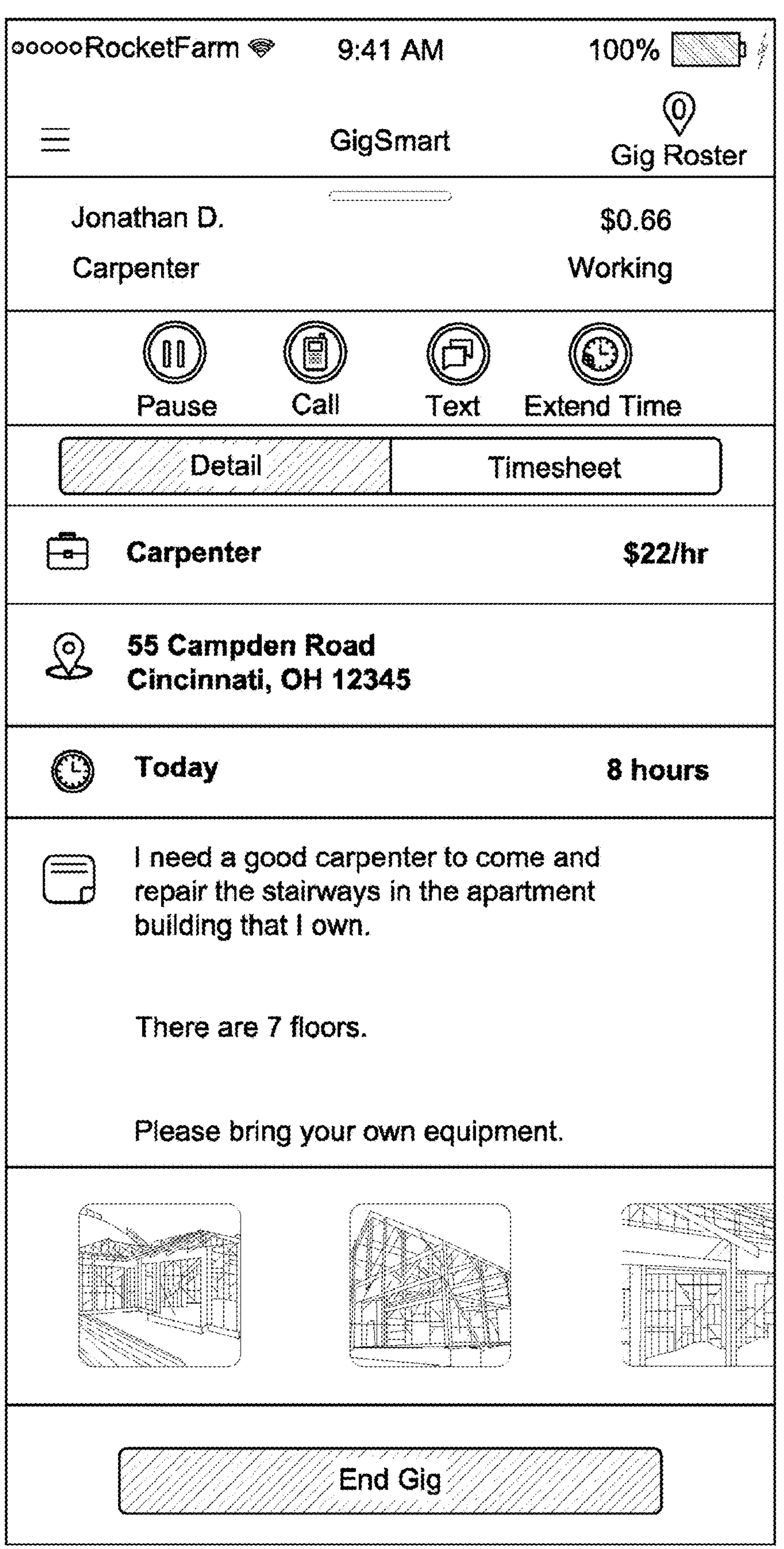
Figure 262B:
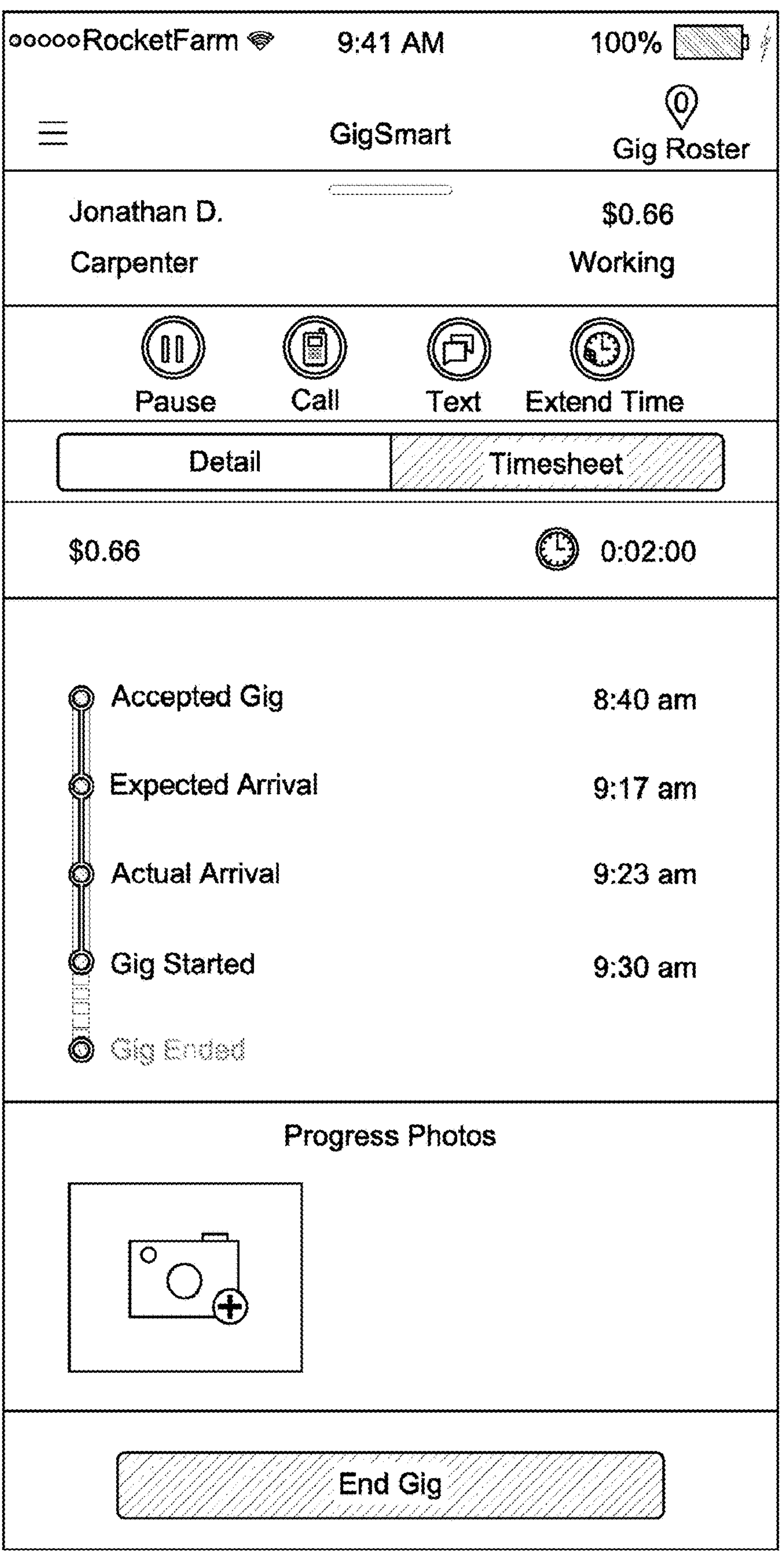
Figure 265A:
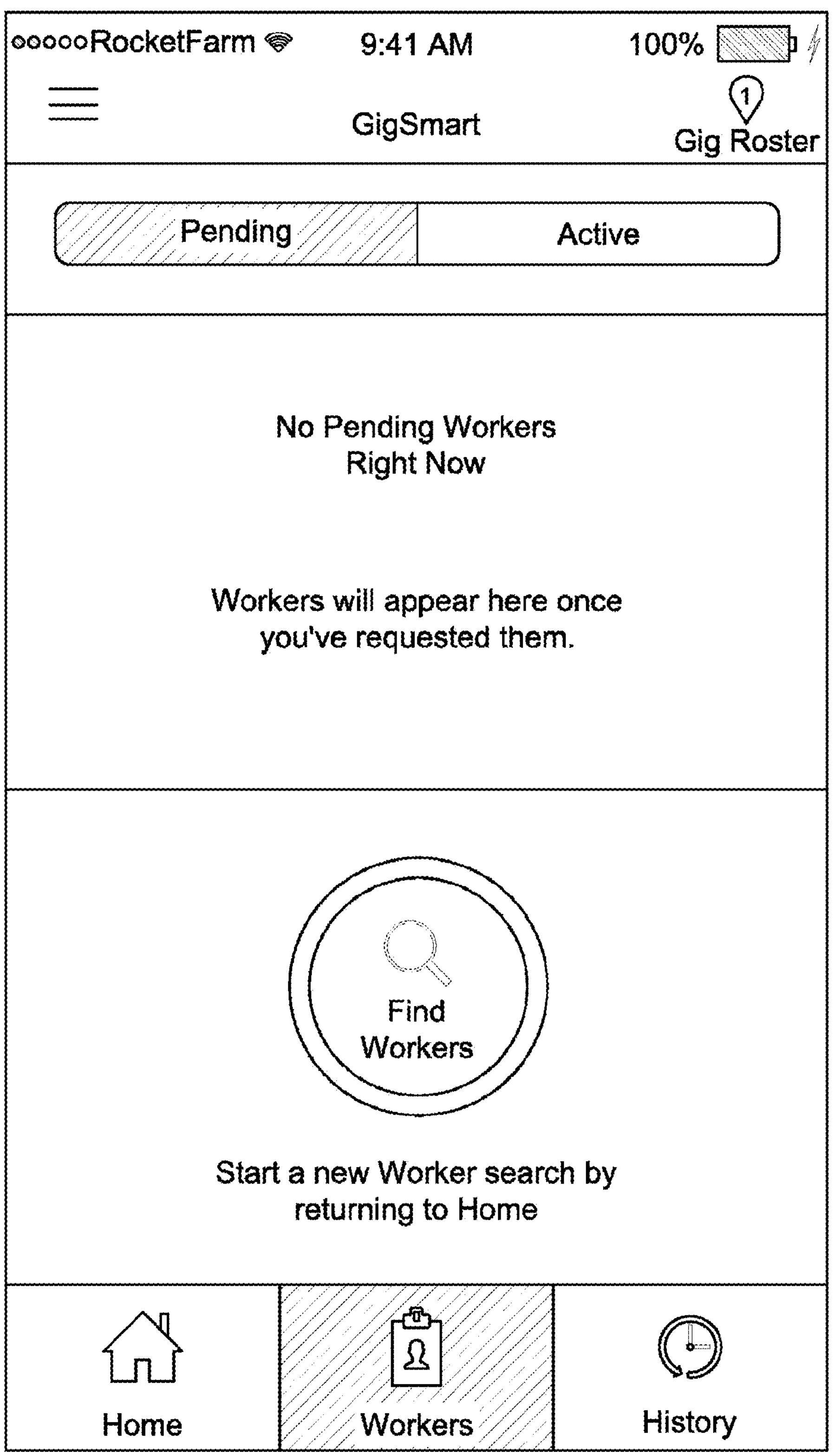
Figure 265B:
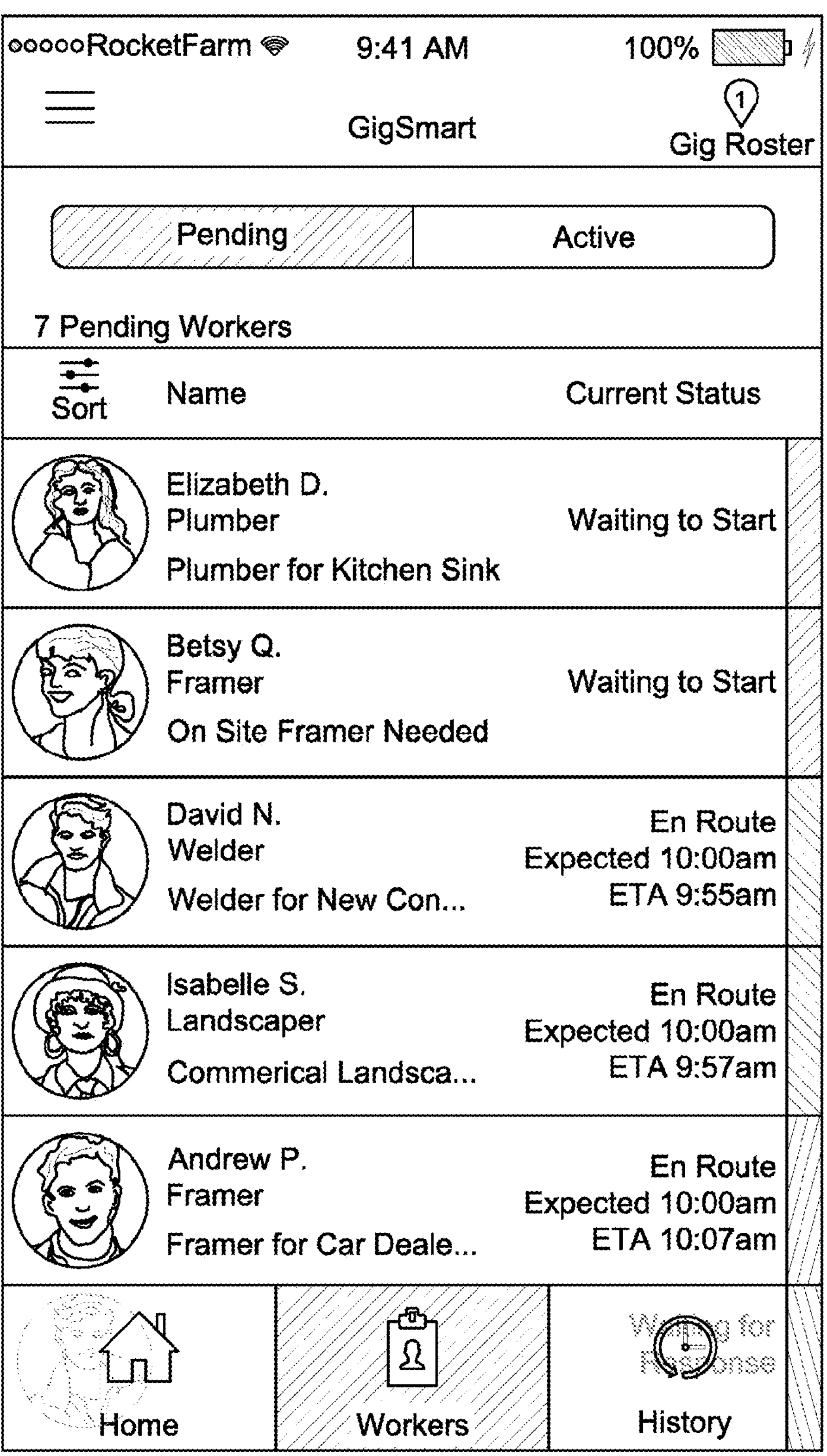
Figure 266A:
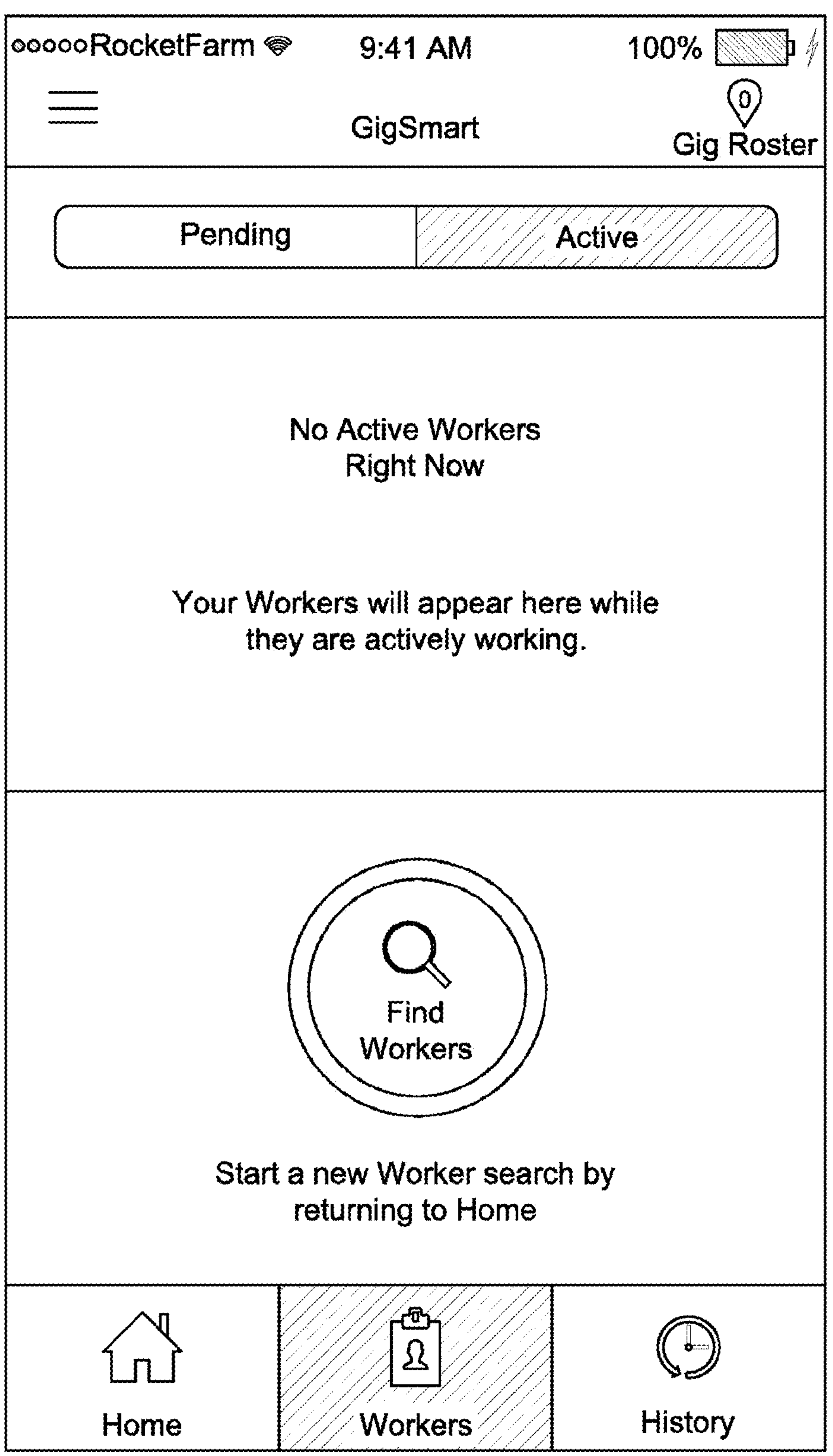
Figure 267A:
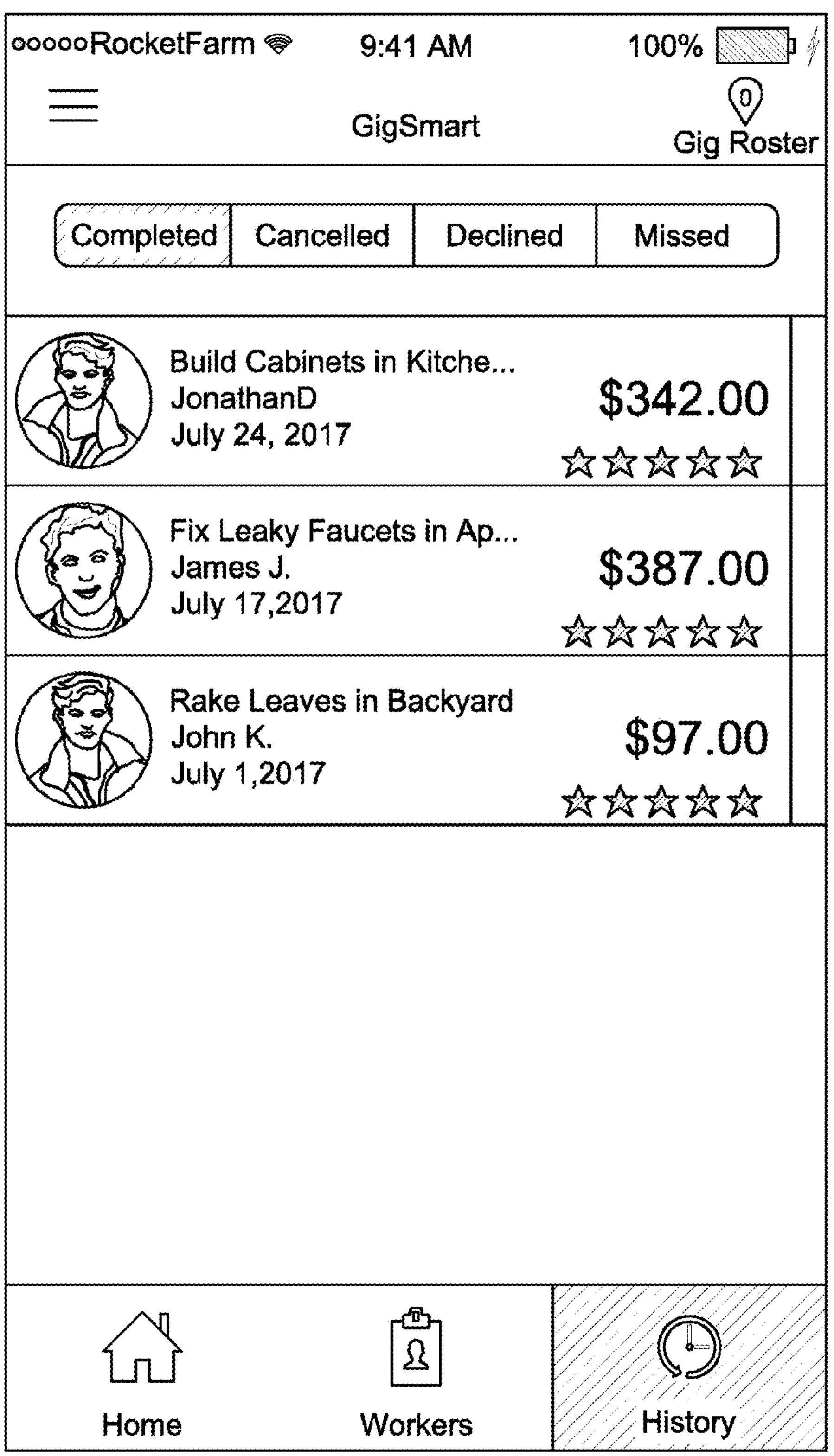
Figure 267B:
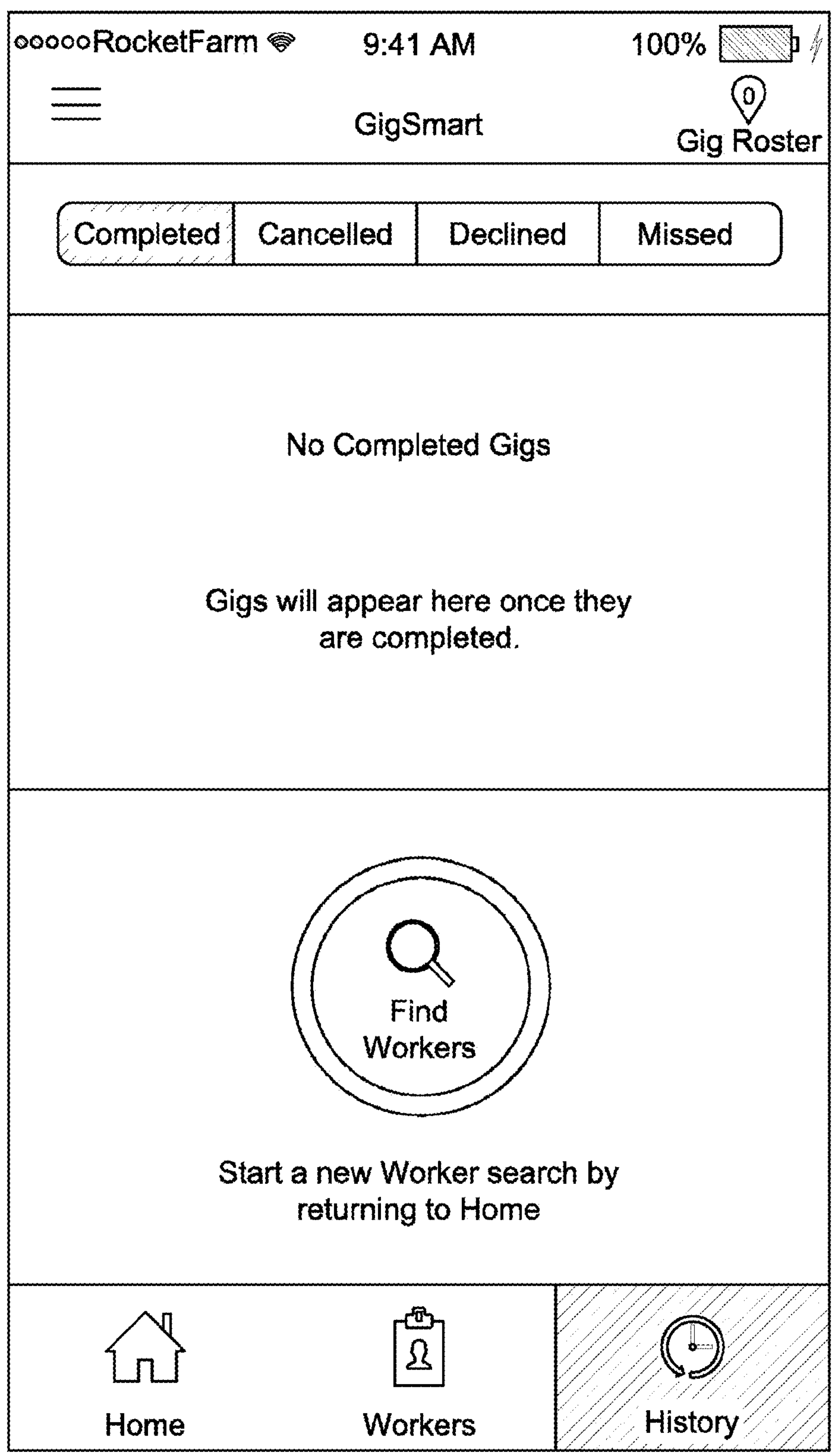
Figure 268A:
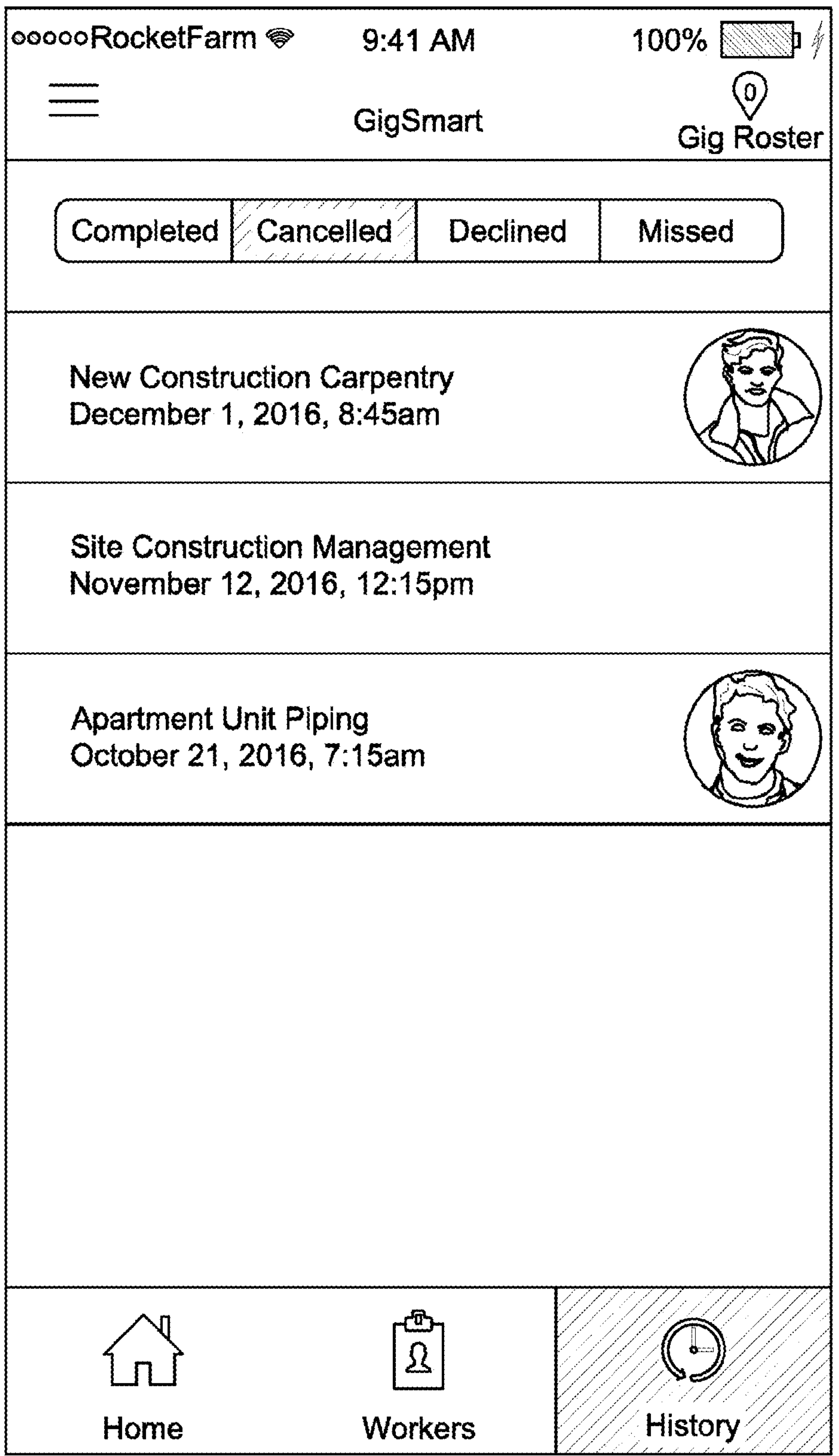
Figure 269A:
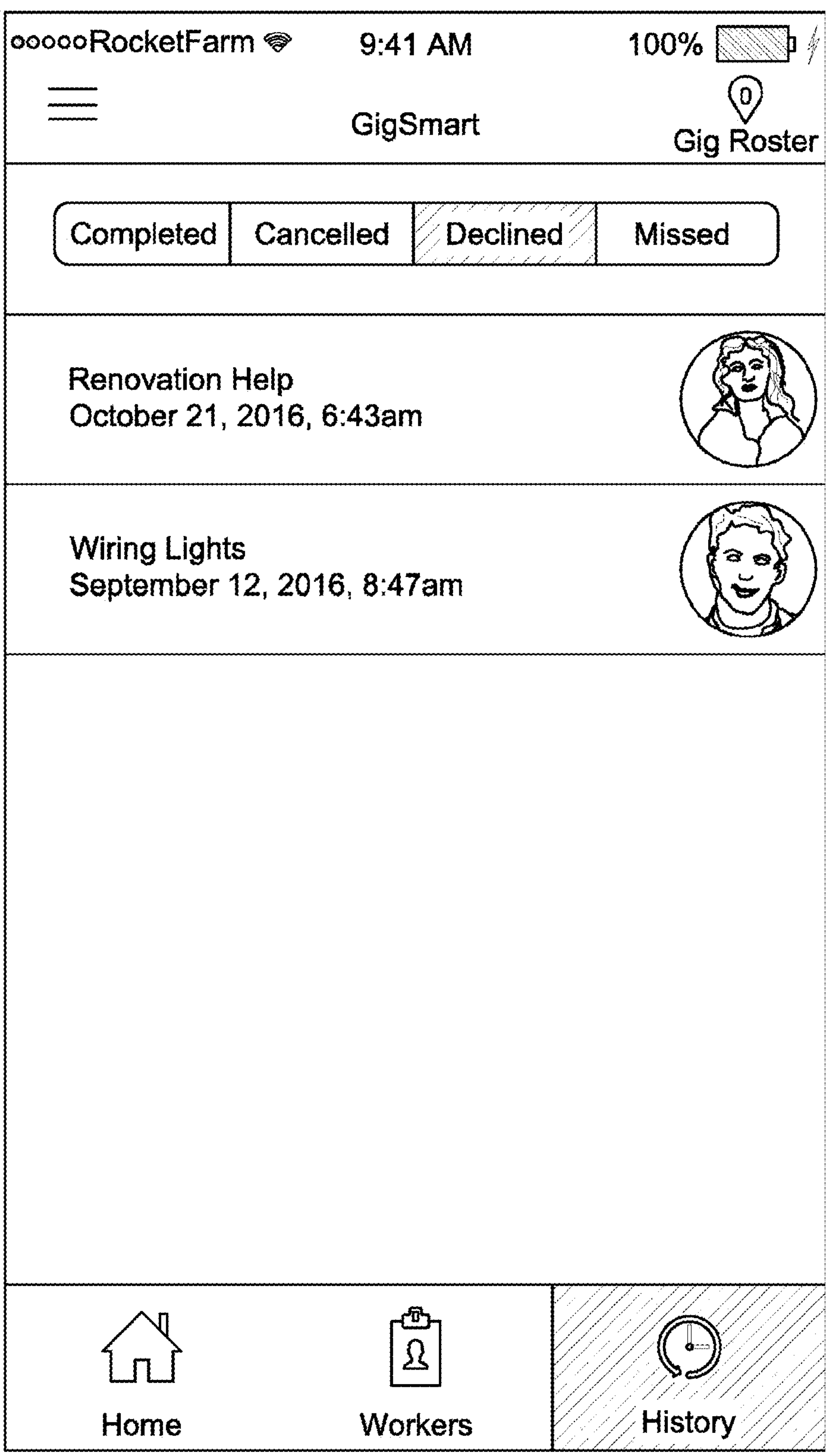
Figure 270B:
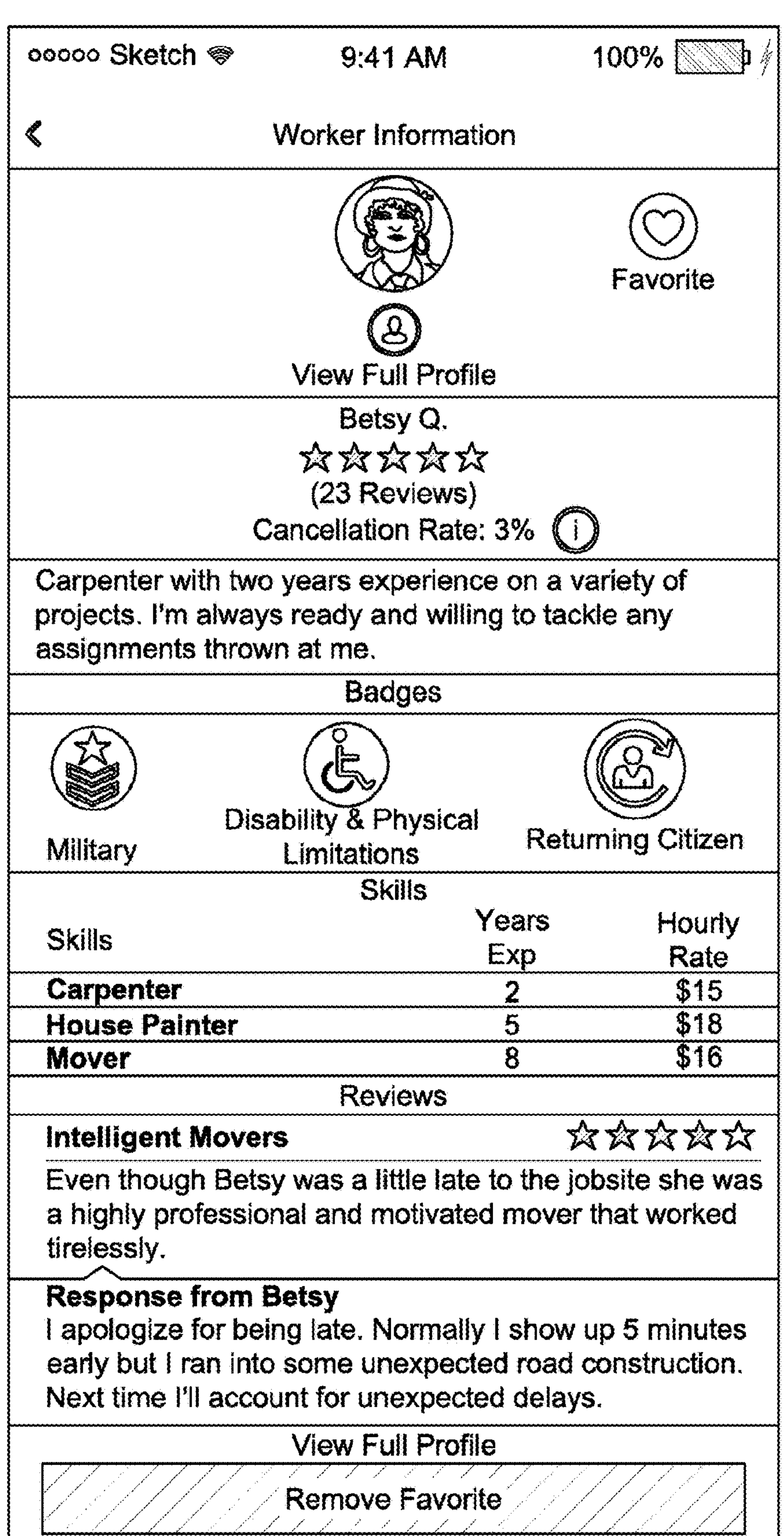
Figure 271A:
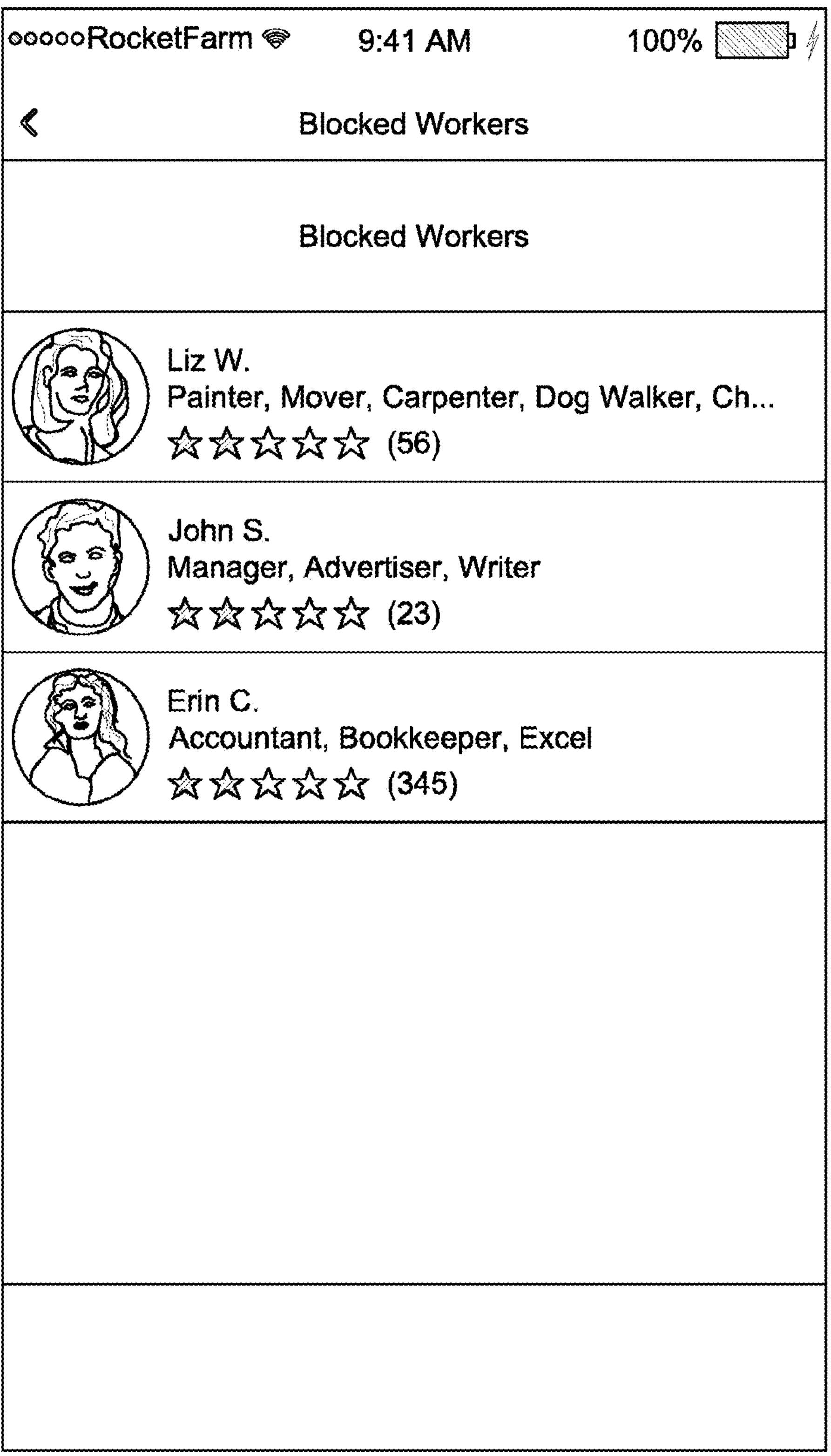
Figure 271B:
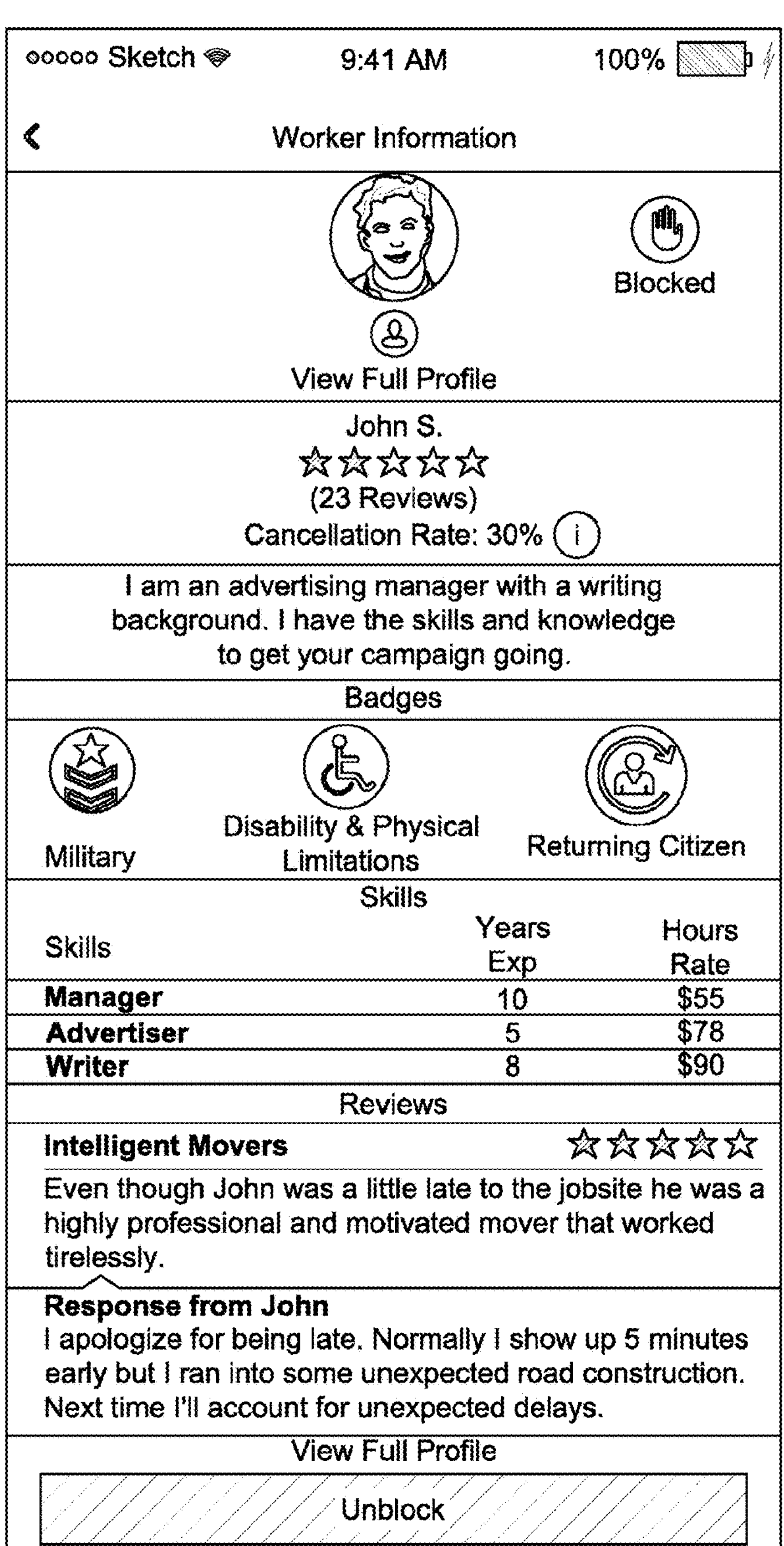
Figure 272:
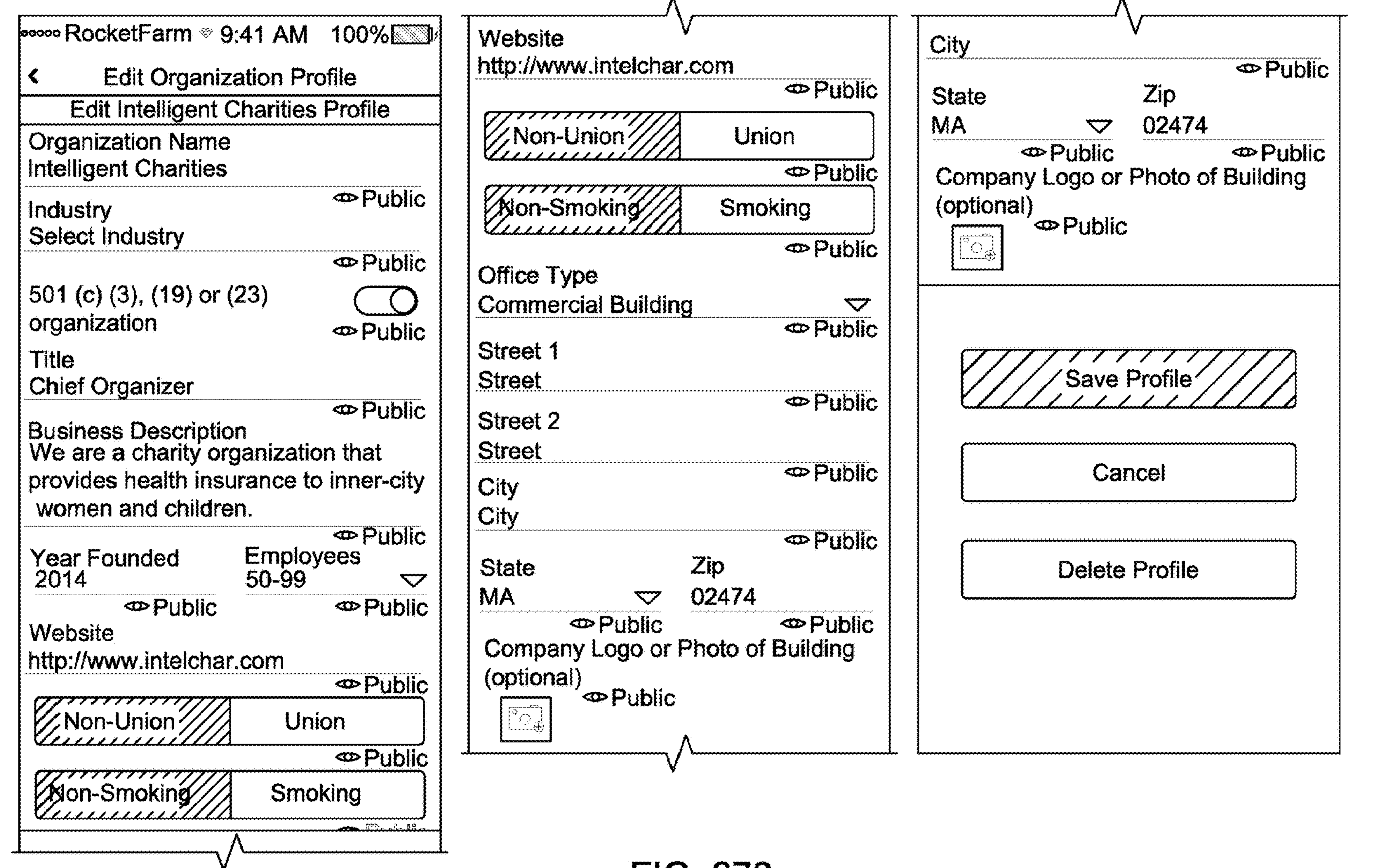
Figure 273A:
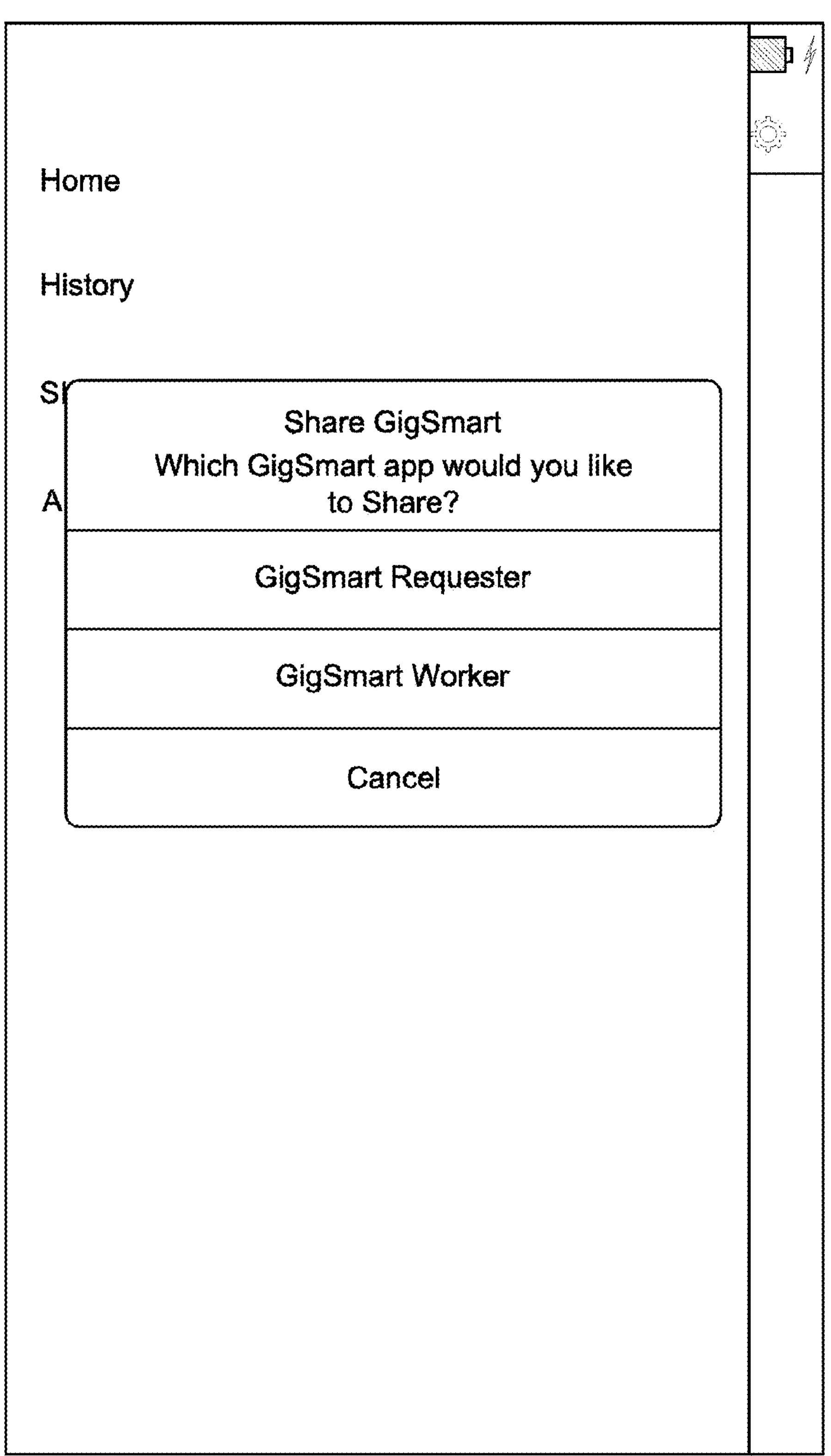
Figure 273B:
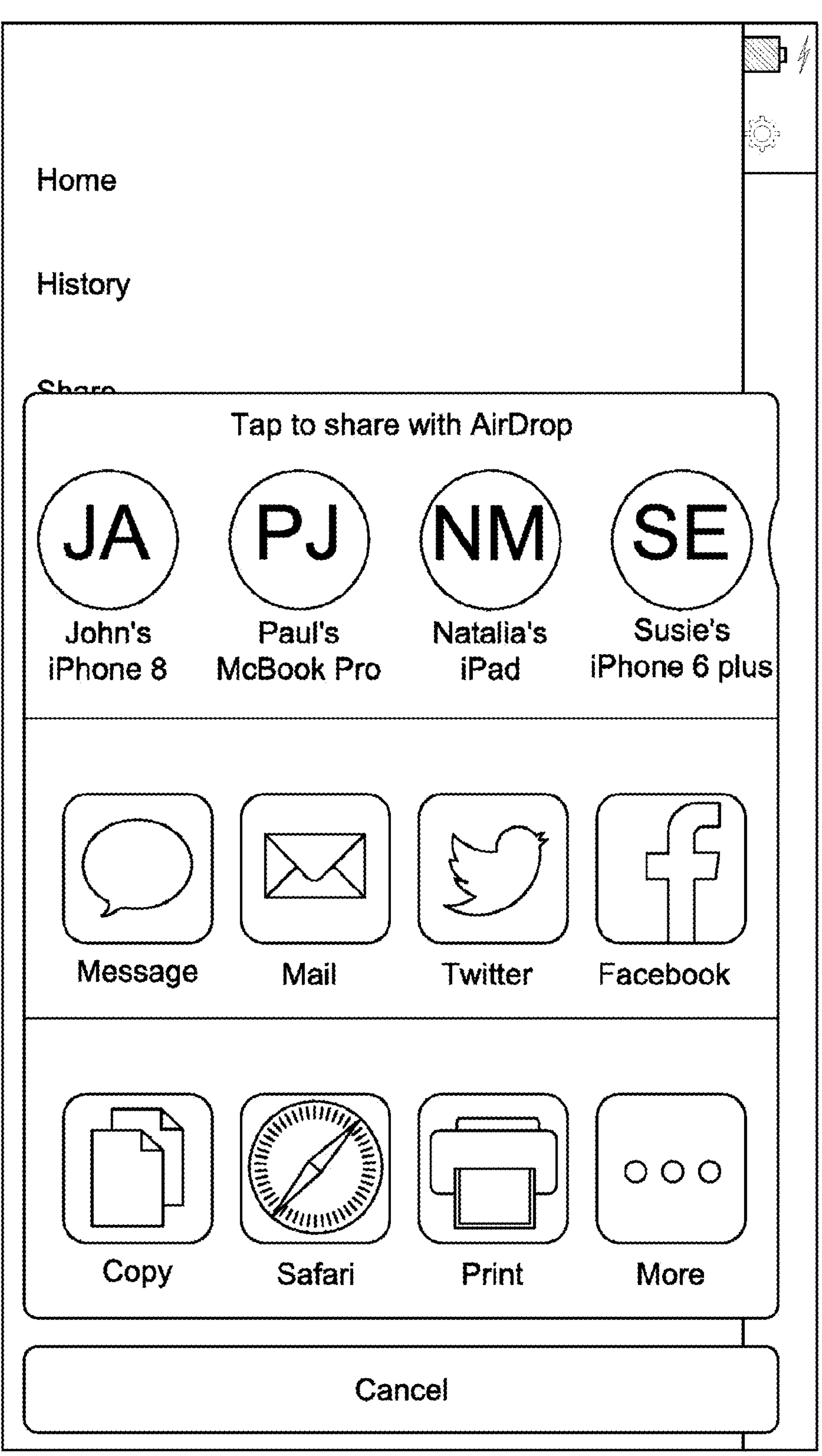
Figure 273C:
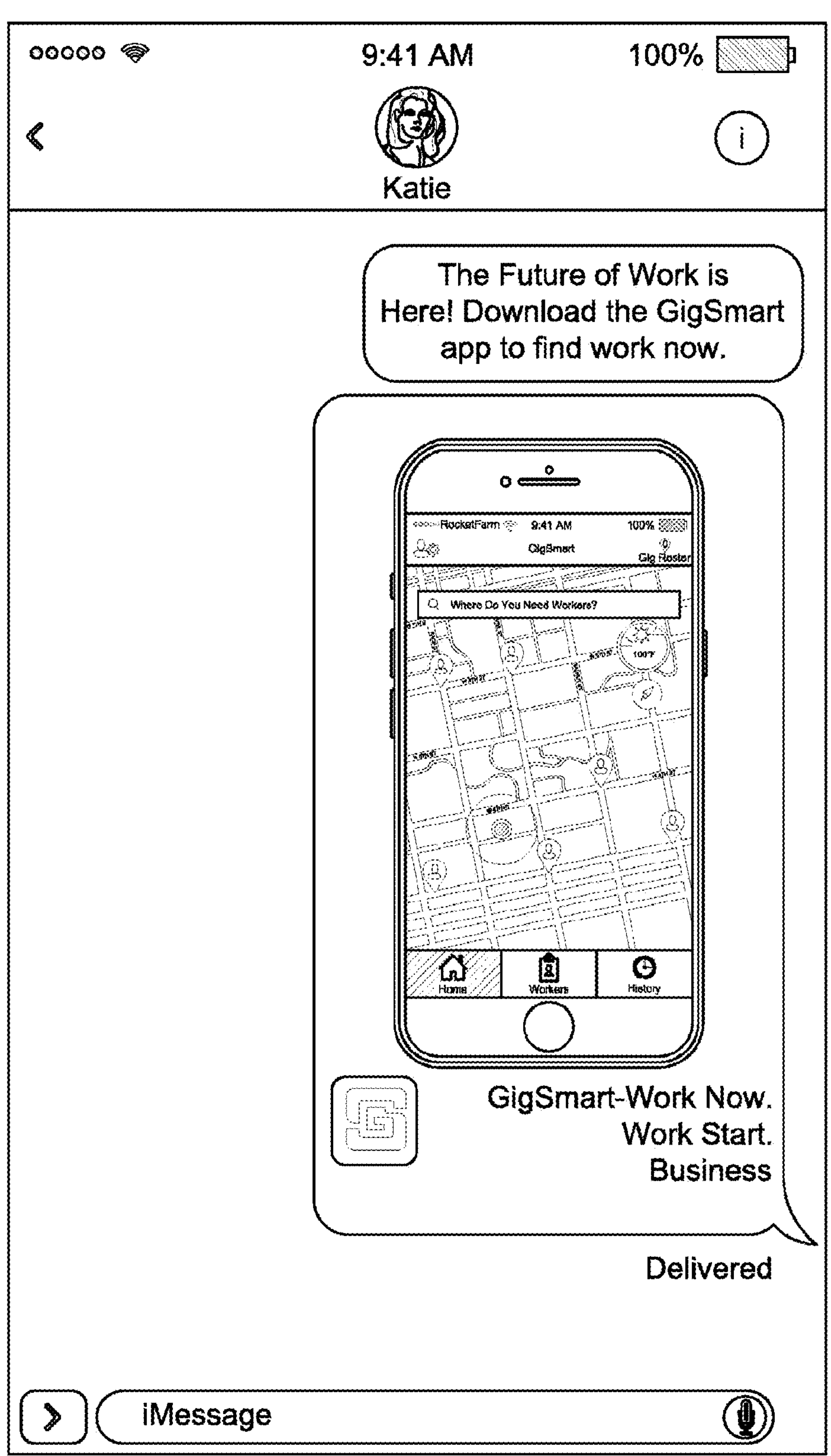

Referring now to FIGS. 20-105, select exemplary user interfaces are depicted that can be generated by an example LME computing system for presentation to service providers, such as the service provider 144 shown in FIG. 1, in accordance with various non-limiting embodiments. FIGS. 106-184 depict select exemplary user interfaces that can be generated by an example LME computing system for presentation to service users, such as the service user 142 shown in FIG. 1, in accordance with various non-limiting embodiments.

Referring now to FIGS. 185-193, select exemplary user interfaces are depicted that can be generated by an example LME computing system for presentation to service providers, such as the service provider 144 shown in FIG. 1, in accordance with various non-limiting embodiments. FIGS. 194A-213 depict select exemplary user interfaces that can be generated by an example LME computing system for presentation to service users, such as the service user 142 shown in FIG. 1, in accordance with various non-limiting embodiments.

Referring now to FIGS. 214A-243, select exemplary user interfaces are depicted that can be generated by an example LME computing system for presentation to service providers, such as the service provider 144 shown in FIG. 1, in accordance with various non-limiting embodiments. FIGS. 244A-274 depict select exemplary user interfaces that can be generated by an example LME computing system for presentation to service users, such as the service user 142 shown in FIG. 1, in accordance with various non-limiting embodiments.

As is to be appreciated by one of ordinary skill in the art, the select exemplary user interfaces provided herein are to depict examples of various features, functionality, and/or processes that can be provided by example labor marketplace exchange computing systems in accordance with the present disclosure.

In various embodiments disclosed herein, a single component can be replaced by multiple components and multiple components can be replaced by a single component to perform a given function or functions. Except where such substitution would not be operative, such substitution is within the intended scope of the embodiments.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art.

We claim:

1. An online labor marketplace exchange, comprising:

a labor marketplace exchange computing system, wherein the labor marketplace exchange computing system comprises:

a data store;

a plurality of service provider profiles stored in the data store, wherein each of the plurality of service provider profiles is associated with a respective one of a plurality of service providers and comprises an indication of equipment that the service provider has on hand; and a first graphical user interface comprising fields provided by the labor marketplace exchange computing system that are configured to receive specified search parameters from a service user for a service request, wherein the specified search parameters identify a type of equipment;

a second graphical user interface provided by the labor marketplace exchange computing system for presentment to each of the plurality of service providers to receive input from each of the plurality of service providers; and wherein the labor marketplace exchange computing system is configured to:

receive, through an input to the fields of the first graphical user interface provided by the labor marketplace exchange computing system, search parameters from the service user for the service request, wherein the received search parameters identify a type of equipment associated with the service request;

provide to the service user, through the first graphical user interface, a service provider profile, wherein the service provider profile is automatically provided to the service user in real-time response to the received search parameters;

responsive to receiving a selection of the service provider by the service user, causing a service request to be transmitted to the selected service provider;

generate a service appointment responsive to receiving an acceptance of the service request by the selected service provider;

receiving a digital photograph, wherein the digital photograph is associated with the service request and collected by the selected service provider via the second graphical user interface; and present to the service user, via the first graphical user interface, the digital photograph associated with the service request.

2. The online labor marketplace exchange of claim 1, wherein each of the plurality of service provider profiles comprises at least one photograph of the equipment that the service provider has on hand.

3. The online labor marketplace exchange of claim 2, wherein the labor marketplace exchange computing system is further configured to electronically provide to the service user the photograph of the equipment that the service provider has on hand.

4. The online labor marketplace exchange of claim 1, wherein each of the respective service providers has a documented skillset, and wherein each of the plurality of service provider profiles comprises at least one document associated with the documented skillset of each of the respective service providers.

5. The online labor marketplace exchange of claim 4, wherein the labor marketplace exchange computing system is further configured to electronically provide to the service user the at least one document associated with the documented skillset of the service prover identified by the service provider profile.

6. The online labor marketplace exchange of claim 5, wherein the at least one document electronically provided is associated with a certification of the service provider identified by the service provider profile.

7. The online labor marketplace exchange of claim 5, wherein the at least one document electronically provided comprises a background check of the service provider identified by the service provider profile.

8. The online labor marketplace exchange of claim 5, wherein one or more of the plurality of service provider profiles comprises an insurance policy.

9. A labor marketplace exchange computing system, comprising:

a data store; and a plurality of service provider profiles stored in the data store, wherein each of the plurality of service provider profiles is associated with a respective one of a plurality of service providers and comprises an indication of equipment that the service provider has on hand; and wherein the labor marketplace exchange computing system is configured to:

provide to the service user a first graphical user interface, wherein the graphical user interface comprises fields that are configured to receive specified search parameters for a service request, wherein the specified search parameters identify a type of equipment;

provide a second graphical user interface for presentment to each of the plurality of service providers to receive input from each of the plurality of service providers;

receive, through an input to the first graphical user interface, search parameters from a service user for a service request, wherein the received search parameters identify a type of equipment associated with the service request; and provide to the service user, through the first graphical user interface, a service provider profile, wherein the service provider profile is automatically provided to the service user in real-time response to the search parameters;

responsive to receiving a selection of the service provider by the service user, causing a service request to be transmitted to the selected service provider;

generate a service appointment responsive to receiving an acceptance of the service request by the selected service provider;

receive a digital photograph, wherein the digital photograph is associated with the service request and collected by the selected service provider via the second graphical user interface; and present to the service user, via the first graphical user interface, the digital photograph associated with the service request.

10. The labor marketplace exchange computing system of claim 9, wherein each of the plurality of service provider profiles comprises at least one photograph of the equipment that the service provider has on hand.

11. The labor marketplace exchange computing system of claim 10, wherein the labor marketplace exchange computing system is further configured to electronically provide to the service user the photograph of the equipment that the service provider has on hand.

12. The labor marketplace exchange computing system of claim 9, wherein each of the respective service providers has a documented skillset, and wherein each of the plurality of service provider profiles comprises at least one document associated with the documented skillset of each of the respective service providers.

13. The labor marketplace exchange computing system of claim 9, wherein the labor marketplace exchange computing system is further configured to electronically provide to the service user the at least one document associated with the documented skillset of the service provider identified by the service provider profile.

14. The labor marketplace exchange computing system of claim 9, wherein the at least one document electronically displayed comprises any of a license, a background check, and an insurance policy.

15. A labor marketplace exchange computing system, comprising:

a data store;

a plurality of service provider profiles stored in the data store, wherein each of the plurality of service provider profiles is associated with a respective one of a plurality of service providers and comprises an indication of equipment that the service provider has on hand, wherein each of the respective service providers has a documented skillset, and wherein each of the plurality of service provider profiles comprises at least one document associated with the documented skillset of each of the respective service providers;

a first graphical user interface comprising fields configured to receive specified search parameters from a service user for a service request, wherein the specified search parameters identify a type of equipment;

a second graphical user interface provided by the labor marketplace exchange computing system for presentment to each of the plurality of service providers to receive input from each of the plurality of service providers; and wherein the labor marketplace exchange computing system is configured to:

receive, through an input to the fields of the first graphical user interface provided by the labor marketplace exchange computing system, the search parameters from the service user for the service request, wherein the received search parameters identify a type of equipment associated with the service request;

provide to the service user, through the first graphical user interface, a service provider profile, wherein the service provider profile is automatically provided to the service user in real-time response to the received search parameters and based on the documented skillset;

electronically provide to the service user the at least one document associated with the documented skillset of the service provider identified by the service provider profile;

responsive to receiving a selection of the service provider by the service user, cause a service request to be transmitted to the selected service provider; and responsive to receiving an acceptance of the service request by the selected service provider, generate a service appointment responsive to receiving the acceptance of the service request by the selected service provider.

16. The labor marketplace exchange computing system of claim 15, wherein each of the plurality of service provider profiles comprises at least one photograph of the equipment that the service provider has on hand.

17. The labor marketplace exchange computing system of claim 16, wherein the labor marketplace exchange computing system is further configured to electronically provide to the service user the photograph of the equipment that the service provider has on hand.

18. The labor marketplace exchange computing system of claim 15, wherein the labor marketplace exchange computing system is further configured to:

receive a digital photograph, wherein the digital photograph is associated with the service request and collected by the selected service provider via the second graphical user interface; and present to the service user, via the first graphical user interface, the digital photograph associated with the service request.

19. The labor marketplace exchange computing system of claim 15, wherein the at least one document electronically provided is associated with a certification of the service provider identified by the service provider profile.

20. The labor marketplace exchange computing system of claim 15, wherein the at least one document electronically provided comprises a background check of the service provider identified by the service provider profile.

* * * * *